US012411599B2

(12) United States Patent
Tyler et al.

(10) Patent No.: US 12,411,599 B2
(45) Date of Patent: Sep. 9, 2025

(54) DEVICES, METHODS, AND GRAPHICAL USER INTERFACES FOR ACCESSING NOTIFICATIONS

(71) Applicant: Apple Inc., Cupertino, CA (US)

(72) Inventors: William M. Tyler, San Francisco, CA (US); Chanaka G. Karunamuni, San Jose, CA (US); Christopher P. Foss, San Francisco, CA (US); Marcos Alonso Ruiz, Oakland, CA (US); Stephen O. Lemay, Palo Alto, CA (US); Caelan G. Stack, Belmont, CA (US); Nathan de Vries, Alameda, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/635,968

(22) Filed: Apr. 15, 2024

(65) Prior Publication Data

US 2024/0281134 A1 Aug. 22, 2024

Related U.S. Application Data

(63) Continuation of application No. 18/202,863, filed on May 26, 2023, now Pat. No. 11,960,714, which is a (Continued)

(51) Int. Cl.

*G06F 3/0488* (2022.01)
*G06F 1/16* (2006.01)

(Continued)

(52) U.S. Cl.

CPC .......... *G06F 3/0488* (2013.01); *G06F 1/1694* (2013.01); *G06F 1/3262* (2013.01);

(Continued)

(58) Field of Classification Search

None

See application file for complete search history.

(56) References Cited

U.S. PATENT DOCUMENTS

| | | | |
|---|---|---|---|
| 7,770,125 | B1 | 8/2010 | Young et al. |
| 7,996,045 | B1 | 8/2011 | Bauer et al. |

(Continued)

FOREIGN PATENT DOCUMENTS

| | | | |
|---|---|---|---|
| AU | 2014 202 423 | A1 | 5/2014 |
| CN | 103176714 | A | 6/2013 |

(Continued)

OTHER PUBLICATIONS

AxureDocs, "Tutorials/Rotating Carousel Slideshow", https://docs.axure.com/axure-rp/tutorials/rotating-carousel-slideshow, Apr. 27, 2019, 9 pages.

(Continued)

*Primary Examiner* — Toan H Vu
(74) *Attorney, Agent, or Firm* — Morgan, Lewis & Bockius LLP

(57) ABSTRACT

An electronic device concurrently displays a first user interface of first software and status information for an application that is different from the first software. The status information includes content of the application. As a state of the application changes, the device updates the content of the application displayed in the status information. In response to detecting an input corresponding to a request to display a different, second user interface of different, second software, while concurrently displaying the first user interface and a respective user interface object that includes the status information, the device ceases to display the first user interface and the respective user interface object, and displays the second user interface including content of the application, including, as the state of the application changes, updating the content of the application displayed in (Continued)

the second user interface, which includes information that is different from the status information.

36 Claims, 252 Drawing Sheets

Related U.S. Application Data continuation of application No. 18/099,839, filed on Jan. 20, 2023, now Pat. No. 11,966,577, which is a continuation of application No. 17/852,235, filed on Jun. 28, 2022, now Pat. No. 11,567,654, which is a continuation of application No. 17/458,201, filed on Aug. 26, 2021, now Pat. No. 11,435,894, which is a continuation of application No. 16/915,971, filed on Jun. 29, 2020, now Pat. No. 11,106,352, which is a continuation of application No. 16/354,012, filed on Mar. 14, 2019, now Pat. No. 10,788,979, which is a continuation of application No. 15/715,005, filed on Sep. 25, 2017, now Pat. No. 10,466,889.

(60) Provisional application No. 62/507,181, filed on May 16, 2017.

(51) Int. Cl.

| | |
|---|---|
| ***G06F 1/3234*** | (2019.01) |
| ***G06F 3/01*** | (2006.01) |
| ***G06F 3/04817*** | (2022.01) |
| ***G06F 3/0485*** | (2022.01) |
| ***G06F 3/04883*** | (2022.01) |
| ***G06F 21/36*** | (2013.01) |
| ***G06F 21/62*** | (2013.01) |
| ***H04L 51/224*** | (2022.01) |
| ***H04M 1/673*** | (2006.01) |
| ***H04M 1/724*** | (2021.01) |
| *H04L 51/52* | (2022.01) |
| *H04M 1/72436* | (2021.01) |

(52) U.S. Cl.

CPC ............ *G06F 1/3265* (2013.01); *G06F 3/016* (2013.01); *G06F 3/04817* (2013.01); *G06F 3/0485* (2013.01); *G06F 3/04883* (2013.01); *G06F 21/36* (2013.01); *G06F 21/629* (2013.01); *H04L 51/224* (2022.05); *H04M 1/673* (2013.01); *H04M 1/724* (2021.01); *H04L 51/52* (2022.05); *H04M 1/72436* (2021.01); *H04M 2250/22* (2013.01)

(56) References Cited

U.S. PATENT DOCUMENTS 8,363,009 B1 1/2013 Queru
8,923,572 B2 12/2014 In et al.
8,943,440 B2 1/2015 Adderton
8,990,712 B2 3/2015 Reeves et al.
9,179,086 B2 11/2015 Abello et al.
9,715,706 B2 7/2017 Wu et al.
9,787,938 B2 10/2017 Cranfill et al.
9,886,231 B2 2/2018 Jacabsen et al.
10,019,217 B2 7/2018 Dostal et al.
10,055,088 B1 8/2018 Boggan et al.
10,097,973 B2 10/2018 Gross et al.
10,165,108 B1 12/2018 Douglas
10,261,672 B1 4/2019 Dolbakian et al.
10,606,539 B2 3/2020 Bernstein et al.
10,614,480 B2 4/2020 Genc-Kaya et al.
10,768,356 B1 9/2020 Zhang et al.
2004/0165010 A1 8/2004 Robertson et al.
2005/0184993 A1 8/2005 Ludwin et al.
2006/0112354 A1 5/2006 Park et al.
2006/0123353 A1 6/2006 Matthews et al.
2006/0129947 A1 6/2006 Hamzy et al.
2007/0050711 A1* 3/2007 Walker .................. G06Q 30/02 715/205
2007/0073656 A1 3/2007 Bandi
2007/0101279 A1 5/2007 Chaudhri et al.
2007/0157089 A1 7/2007 Van Os et al.
2007/0157097 A1 7/2007 Peters
2007/0157114 A1* 7/2007 Bishop .................... H04L 67/02 715/788
2007/0174903 A1 7/2007 Greff
2008/0005247 A9* 1/2008 Khoo .................... G06F 3/0482 709/206
2008/0068519 A1 3/2008 Adler et al.
2008/0077984 A1 3/2008 Kim
2008/0261569 A1* 10/2008 Britt ..................... G06Q 10/107 455/566
2008/0307350 A1 12/2008 Sabatelli et al.
2008/0307360 A1 12/2008 Chaudhri et al.
2009/0007007 A1 1/2009 Voros et al.
2009/0100361 A1 4/2009 Abello et al.
2009/0193364 A1 7/2009 Jarrett et al.
2009/0235149 A1 9/2009 Frohwein
2009/0254860 A1 10/2009 Seo et al.
2009/0254964 A1* 10/2009 Park ............... H04N 21/440236 386/291
2010/0122207 A1 5/2010 Kim et al.
2010/0169828 A1 7/2010 Kho et al.
2010/0287469 A1 11/2010 Wang et al.
2010/0295789 A1 11/2010 Shin et al.
2011/0004845 A1 1/2011 Ciabarra
2011/0087985 A1 4/2011 Buchanan et al.
2011/0208359 A1 8/2011 Duchene et al.
2011/0225549 A1 9/2011 Kim
2011/0252346 A1 10/2011 Chaudhri
2011/0312387 A1 12/2011 Heo et al.
2012/0011437 A1 1/2012 James et al.
2012/0023431 A1 1/2012 Roth et al.
2012/0054663 A1 3/2012 Baek et al.
2012/0079432 A1 3/2012 Lee et al.
2012/0117499 A1 5/2012 Mori et al.
2012/0117507 A1 5/2012 Tseng et al.
2012/0129495 A1 5/2012 Chae et al.
2012/0144379 A1 6/2012 Tsai
2012/0188275 A1 7/2012 Shimazu et al.
2012/0233031 A1 9/2012 Chang et al.
2012/0272230 A1 10/2012 Lee
2012/0309433 A1 12/2012 Jeong et al.
2012/0311608 A1 12/2012 Park et al.
2012/0323557 A1 12/2012 Koll et al.
2013/0014040 A1 1/2013 Jagannathan et al.
2013/0036357 A1 2/2013 Hendrickson
2013/0050119 A1 2/2013 Nemoto
2013/0076660 A1 3/2013 Reeves et al.
2013/0139109 A1 5/2013 Kim et al.
2013/0191910 A1 7/2013 Dellinger et al.
2013/0254036 A1 9/2013 Trinh et al.
2013/0305351 A1 11/2013 Narendra et al.
2013/0311920 A1 11/2013 Koo et al.
2013/0332886 A1 12/2013 Cranfill et al.
2013/0346919 A1 12/2013 Adderton
2014/0051396 A1 2/2014 Kim
2014/0063051 A1 3/2014 Wu
2014/0101572 A1 4/2014 Gunderson et al.
2014/0155123 A1 6/2014 Lee et al.
2014/0165006 A1 6/2014 Chaudhri et al.
2014/0173447 A1 6/2014 Das
2014/0189531 A1 7/2014 Murarka et al.
2014/0189577 A1 7/2014 Shuttleworth et al.
2014/0189593 A1 7/2014 Kurita et al.
2014/0189606 A1 7/2014 Shuttleworth et al.
2014/0189608 A1 7/2014 Shuttleworth et al.
2014/0201681 A1 7/2014 Mahaffey et al.
2014/0215364 A1 7/2014 Kang et al.
2014/0232739 A1 8/2014 Kim et al.
2014/0237378 A1 8/2014 Gonen et al.
2014/0282084 A1 9/2014 Murarka et al.
2014/0283142 A1 9/2014 Shepherd et al.

(56) References Cited

U.S. PATENT DOCUMENTS

| | | | |
|---|---|---|---|
| 2014/0365919 | A1 | 12/2014 | Shaw et al. |
| 2014/0365945 | A1 | 12/2014 | Karunamuni et al. |
| 2014/0365953 | A1 | 12/2014 | Zambetti et al. |
| 2014/0368442 | A1 | 12/2014 | Vahtola |
| 2014/0379801 | A1 | 12/2014 | Gupta |
| 2015/0052464 | A1 | 2/2015 | Chen et al. |
| 2015/0057945 | A1 | 2/2015 | White et al. |
| 2015/0089411 | A1 | 3/2015 | Ban et al. |
| 2015/0095819 | A1 | 4/2015 | Hong et al. |
| 2015/0106737 | A1 | 4/2015 | Montoy-Wilson et al. |
| 2015/0135086 | A1* | 5/2015 | Lee ....................... G06F 3/0482 715/739 |
| 2015/0153908 | A1 | 6/2015 | Kobayashi et al. |
| 2015/0153929 | A1 | 6/2015 | Bernstein et al. |
| 2015/0193099 | A1 | 7/2015 | Murphy |
| 2015/0227334 | A1 | 8/2015 | Dostal et al. |
| 2015/0281420 | A1 | 10/2015 | Wu et al. |
| 2015/0286352 | A1 | 10/2015 | Gu |
| 2015/0339009 | A1 | 11/2015 | Seo |
| 2015/0346976 | A1 | 12/2015 | Karunamuni et al. |
| 2015/0347612 | A1 | 12/2015 | Matsumoto |
| 2015/0370425 | A1 | 12/2015 | Chen et al. |
| 2016/0004416 | A1 | 1/2016 | Kim et al. |
| 2016/0062540 | A1 | 3/2016 | Yang et al. |
| 2016/0062570 | A1 | 3/2016 | Dascola et al. |
| 2016/0062609 | A1 | 3/2016 | Kim et al. |
| 2016/0077720 | A1 | 3/2016 | Park |
| 2016/0080551 | A1 | 3/2016 | Tseng et al. |
| 2016/0104486 | A1 | 4/2016 | Penilla et al. |
| 2016/0117079 | A1 | 4/2016 | Huang |
| 2016/0127652 | A1 | 5/2016 | Park et al. |
| 2016/0154549 | A1 | 6/2016 | Chaudhri et al. |
| 2016/0191499 | A1 | 6/2016 | Momchilov et al. |
| 2016/0202865 | A1 | 7/2016 | Dakin et al. |
| 2016/0209994 | A1 | 7/2016 | Kaufthal et al. |
| 2016/0239191 | A1 | 8/2016 | Krishnasamy |
| 2016/0283090 | A1 | 9/2016 | Seo |
| 2016/0309321 | A1 | 10/2016 | Song et al. |
| 2016/0364029 | A1 | 12/2016 | Miller et al. |
| 2016/0379427 | A1 | 12/2016 | Kimura et al. |
| 2017/0046024 | A1 | 2/2017 | Dascola et al. |
| 2017/0046025 | A1 | 2/2017 | Dascola et al. |
| 2017/0064555 | A1 | 3/2017 | Johansson et al. |
| 2017/0068410 | A1 | 3/2017 | Alonso Ruiz et al. |
| 2017/0080346 | A1 | 3/2017 | Abbas |
| 2017/0083197 | A1 | 3/2017 | Lee et al. |
| 2017/0136876 | A1 | 5/2017 | Boss et al. |
| 2017/0255476 | A1 | 9/2017 | Whitney et al. |
| 2017/0277361 | A1 | 9/2017 | Schulze et al. |
| 2017/0277400 | A1 | 9/2017 | Lee et al. |
| 2017/0277526 | A1 | 9/2017 | Shi |
| 2017/0300180 | A1 | 10/2017 | Louch et al. |
| 2017/0357437 | A1 | 12/2017 | Peterson et al. |
| 2017/0357439 | A1 | 12/2017 | Lemay et al. |
| 2017/0371530 | A1 | 12/2017 | Vranjes et al. |
| 2018/0011719 | A1 | 1/2018 | Cunningham |
| 2018/0024730 | A1 | 1/2018 | Jambou |
| 2018/0048752 | A1 | 2/2018 | Zhou |
| 2018/0077570 | A1 | 3/2018 | Hassan |
| 2018/0095564 | A1 | 4/2018 | Frohwein |
| 2018/0164963 | A1 | 6/2018 | Ku et al. |
| 2018/0176097 | A1 | 6/2018 | Russell et al. |
| 2018/0181568 | A1 | 6/2018 | Leong et al. |
| 2018/0232114 | A1 | 8/2018 | Saunshi et al. |
| 2018/0335920 | A1 | 11/2018 | Tyler |
| 2018/0335921 | A1 | 11/2018 | Karunamuni et al. |
| 2018/0335937 | A1 | 11/2018 | Hauenstein et al. |
| 2018/0335939 | A1 | 11/2018 | Karunamuni et al. |
| 2019/0073124 | A1 | 3/2019 | Li et al. |
| 2019/0095068 | A1 | 3/2019 | Suzuki et al. |
| 2019/0179500 | A1 | 6/2019 | Kim et al. |
| 2019/0212895 | A1 | 7/2019 | Tyler |
| 2019/0235687 | A1 | 8/2019 | Nam et al. |
| 2019/0302995 | A1 | 10/2019 | Robinson et al. |
| 2019/0342252 | A1 | 11/2019 | Dascola et al. |
| 2019/0391825 | A1 | 12/2019 | Jann et al. |
| 2020/0233539 | A1 | 7/2020 | Liu et al. |
| 2020/0278775 | A1 | 9/2020 | Tao et al. |
| 2020/0333935 | A1 | 10/2020 | Tyler |
| 2020/0348822 | A1 | 11/2020 | Dascola et al. |
| 2021/0014650 | A1 | 1/2021 | Steeves et al. |
| 2021/0048932 | A1 | 2/2021 | Zambetti et al. |
| 2021/0286480 | A1 | 9/2021 | Tyler et al. |
| 2021/0286487 | A1 | 9/2021 | Tyler et al. |
| 2021/0286488 | A1 | 9/2021 | Tyler et al. |
| 2021/0286489 | A1 | 9/2021 | Tyler et al. |
| 2021/0286509 | A1 | 9/2021 | Tyler et al. |
| 2021/0286510 | A1 | 9/2021 | Tyler et al. |
| 2021/0319563 | A1 | 10/2021 | Zhang et al. |
| 2021/0323406 | A1 | 10/2021 | So et al. |
| 2021/0389859 | A1 | 12/2021 | Tyler |
| 2022/0020321 | A1 | 1/2022 | Jung et al. |
| 2022/0030651 | A1 | 1/2022 | Tsai |
| 2022/0038568 | A1 | 2/2022 | Chen et al. |
| 2022/0116546 | A1 | 4/2022 | Gummadi et al. |
| 2022/0121348 | A1 | 4/2022 | Jeon et al. |
| 2022/0126201 | A1 | 4/2022 | Ma et al. |
| 2022/0224665 | A1 | 7/2022 | Zhou et al. |
| 2022/0300303 | A1 | 9/2022 | Dong |
| 2022/0326828 | A1 | 10/2022 | Tyler |
| 2022/0365645 | A1 | 11/2022 | Tyler et al. |
| 2023/0079981 | A1 | 3/2023 | Tyler et al. |
| 2023/0152957 | A1 | 5/2023 | Yoon et al. |
| 2023/0161473 | A1 | 5/2023 | Tyler |
| 2023/0297228 | A1 | 9/2023 | Tyler |
| 2023/0359314 | A1 | 11/2023 | Karunamuni et al. |
| 2023/0359315 | A1 | 11/2023 | Karunamuni et al. |
| 2023/0359316 | A1 | 11/2023 | Karunamuni et al. |
| 2023/0418426 | A1 | 12/2023 | Karunamuni et al. |
| 2024/0203155 | A1 | 6/2024 | Xu et al. |
| 2024/0211117 | A1 | 6/2024 | Tyler et al. |
| 2024/0320119 | A1 | 9/2024 | Karunamuni et al. |

FOREIGN PATENT DOCUMENTS

| | | | |
|---|---|---|---|
| CN | 103402143 | A | 11/2013 |
| CN | 104169857 | A | 11/2014 |
| CN | 1041556155 | A1 | 11/2014 |
| CN | 105094814 | A | 11/2015 |
| CN | 105264476 | A | 1/2016 |
| CN | 105871684 | A | 8/2016 |
| CN | 106201445 | A | 12/2016 |
| CN | 106462358 | A | 2/2017 |
| CN | 106502556 | A | 3/2017 |
| CN | 107491257 | A | 12/2017 |
| CN | 109313530 | A | 2/2019 |
| CN | 109981878 | A | 7/2019 |
| CN | 110174982 | A | 8/2019 |
| CN | 110622112 | A | 12/2019 |
| CN | 110678833 | A | 1/2020 |
| CN | 110678834 | A | 1/2020 |
| EP | 1768359 | A2 | 3/2007 |
| EP | 2431870 | A2 | 3/2012 |
| EP | 2645221 | A1 | 10/2013 |
| EP | 2770417 | A2 | 8/2014 |
| EP | 2818997 | A1 | 12/2014 |
| EP | 3115877 | A1 | 1/2017 |
| EP | 3296838 | A1 | 3/2018 |
| EP | 3617861 | A1 | 3/2020 |
| JP | 2008-263460 | A | 10/2008 |
| JP | 2010538394 | A | 12/2010 |
| JP | 2012527684 | A | 11/2012 |
| JP | 2012242846 | A | 12/2012 |
| JP | 2012242847 | A | 12/2012 |
| JP | 2013065294 | A | 4/2013 |
| JP | 2013131193 | A | 7/2013 |
| JP | 5932563 | B2 | 2/2014 |
| JP | 2014507740 | A | 3/2014 |
| JP | 2014164370 | A | 9/2014 |
| JP | 2015-528619 | A | 9/2015 |
| JP | 2016531340 | A | 10/2016 |
| JP | 2018523102 | A | 8/2018 |
| JP | 6663510 | B2 | 7/2019 |
| JP | 6555129 | B2 | 8/2019 |

(56) References Cited

FOREIGN PATENT DOCUMENTS

| | | | |
|---|---|---|---|
| JP | 2019-197519 | A | 11/2019 |
| KR | 20100124427 | A | 11/2010 |
| KR | 2012/0019979 | A | 3/2012 |
| KR | 2012/0031357 | A | 4/2012 |
| KR | 20120074451 | A | 7/2012 |
| KR | 20130016329 | A | 2/2013 |
| KR | 20130059857 | A | 6/2013 |
| KR | 20130129056 | A | 11/2013 |
| KR | 20130130040 | A | 11/2013 |
| KR | 20140044618 | A | 4/2014 |
| KR | 20140062180 | A | 5/2014 |
| KR | 20140099165 | A | 8/2014 |
| KR | 20150029453 | A | 3/2015 |
| KR | 20160004306 | A | 1/2016 |
| KR | 20160037230 | A | 4/2016 |
| KR | 20170100650 | A | 9/2017 |
| KR | 20180009795 | A | 1/2018 |
| KR | 20180016131 | A | 2/2018 |
| KR | 20180126440 | A | 11/2018 |
| KR | 2018/0136982 | A | 12/2018 |
| KR | 2019-0090982 | A | 8/2019 |
| KR | 2021-0002713 | A | 1/2021 |
| KR | 2022-0010978 | A | 1/2022 |
| WO | WO 2009/097555 | A2 | 8/2009 |
| WO | WO 2015/183504 | A1 | 12/2015 |
| WO | WO 2017/027526 | A1 | 2/2017 |
| WO | WO 2018/165437 | A1 | 9/2018 |
| WO | WO 2018/212997 | A1 | 11/2018 |
| WO | WO 2022/019484 | A1 | 1/2022 |
| WO | WO 2022/241014 | A1 | 11/2022 |

OTHER PUBLICATIONS

Brandon Butch, "7 Awesome iPhone Widgets for IOS 12!", www.youtube.com/watch?v=2_oML60dqs, 2018, 40 pages.
Coding in Flow, "App Widget Part 5—Widget Stackview / Listview on Click Listener—Android Studio Tutorial", www.youtube.com/watch?v=4RQ40gQd), Jul. 6, 2018, 8 pages.
Gonzales, "Disable Proactive Search on Your iPhone or iPad in iOS 9, Gadget Hacks", https://ios.gadgethacks.com/how-to-disable-proactive-search-your-iphone-or-ipad-ios-9-0162396, Sep. 9, 2015, 7 pages.
Google, "JINA App Drawer, App Organizer, Sidebar & Folders", https://www.jinadrawer.com, May 13, 2020, 12 pages.
IBertz, "Nova Launcher: My Home Screen Setup Tutorial", https://www.youtube.com/watch?v=HSxA3BmPtg4, Jul. 29, 2016, 4 pages.
Jain, "Context Based Adaptation of Application Icons in Mobile Computing Devices", 2013 Third World Congress on Information and Communication Technologies (WICT), IEEE, Dec. 15-18, 2013, 6 pages.
Jansen, "How to Use Nova Launcher to Become an Android Superstar", https://www.digitaltrends.com/mobile/how-to-use-nova-launcher, Nov. 25, 2017, 57 pages.
Knight, "Nova Launcher 101 How to Organize Your App Drawer with Tab Groups", https://android.gadgethacks.com/how-to-/nova-launcher-101-organize-your-app-drawer-with-tab-groups-0182579/, Aug. 8, 2018, 9 pages.
Roe, "The Windows 10 Recycle Bin: All You Need to Know", https://www.digitalcitizen.life/simple-questions-what-recycle-bin, Jun. 1, 2020, 11 pages.
Sinha, "10 Cool Nova Launcher Tricks You Should Know", https://beebom.com/cool-nova-launcher-tricks, Oct. 31, 2017, 16 pages.
Smith, "I Keep Over 200 Apps on My iPhone—Here's the System I Use to Organize Them All", https:/www.businessinsider.com/apple-iphone-apps-organization-home-screen-2018-7#ibreak-my-home-screen-into-three-sections-the-dock-shortcuts-and-folders-2, Apr. 9, 2019, 18 pages.
StateofArt, "LG G2 Quick Tips—Adding Widgets to the Home Screen", https://www.youtube.com/watch?v=9xEwmiNoKok, Oct. 2013, 5 pages.
Techno Window, "How to Add a Widget (Weather & Clock) on Home-Screen—Samsung Galaxy A7 (2018)", https://www.youtube.com/watch?v=Iz3bE8nFaBM, Jan. 25, 2019, 3 pages.
TechwithBrett, "Android 101: Home Screen Customization (Feat, Galaxy S8+)", https://www.youtube.com/watch?v=Z51pw3Gqv5s, Apr. 25, 2017, 3 pages.
Thomas, "Add a Smart App Drawer to Any Launcher & Get Automatic Sorting Features", https://android.gadgethacks.com/how-to/add-smart-app_drawer-any-launcher-get-automatic-sorting-features-0176049/, Jan. 27, 2017, 6 pages.
Wagoner, "Nova Launcher: Everything You Need to Know!", https://www.androidcentral.com/nova-launcher, Nov. 10, 2017, 18 pages.
Wallen, "Pro-Tip: Remove Unnecessary Pages on Your Android Home Screen, https:/www.techrepublic.com/article/pro-tip-remove-unnecessary Pages on Your Android Home Screen", Jul. 3, 2014, 11 pages.
Weisinger, "Foldery Multicon folder widget", https://play.google.com/store/apps/details?id=com.urysoft.folder&hl=en_US, Apr. 20, 2020, 3 pages.
YouTube, "Android 4.2 Lock Screen Widgets, https://www.youtube.com/watch?v=ZpN8Wyu_z6Y", Nov. 12, 2012, 3 pages.
YouTube, "How to Pin a Note to the Home Screen", https://www.youtube.com/watch?v=G2ju31lg_0, Jun. 30, 2018, 3 pages.
YouTube, "Galaxy Note 10.1—How to Remove or Add Widgets and Icons", https://www.youtube.com/watch?v=MS0e-tk-ZmIU, Dec. 31, 2013, 3 pages.
YouTube, "How to Edit Home Screen and Add Widgets (Samsung Galaxy S5)", https://www.youtube.com/watch?v=PRJrAanymL8, Oct. 7, 2014, 3 pages.
YouTube, "How to Move Multiple Icons at Once in iOS 11", https://www.youtube.com/watch?v=Z8I-MT2QD8M, Jun. 18, 2017, 7 pages.
YouTube, "How to Resize Widgets on Samsung Galaxy S4", https://www.youtube.com/watch?v=g-hAXHPAnUU, May 22, 2014, 3 pages.
YouTube, "How to Restore Home Screen Layout", https://www.youtube.com/watch?v=R2FJ8dJqW1s, Feb. 13, 2018, 3 pages.
YouTube, "Pocketnow, iOS 9 Beta 1 Hands-On: More Mature by the Update", https://www.youtube,.com/watch?v=KquzF8580-M, Jun. 10, 2015, 4 pages.
YouTube, "Removing Home Screen on Galaxy S7 by Tapping and Holding a Home Screen", https://www.youtube.com/watch?v=l2Ovja1FvGI, Mar. 24, 2016, 3 pages.
YouTube, "StateofTech, Samsung Galaxy S9 Tips—How to Customize the App Drawer", https://www.youtube.com/watch?v =_TGwDH2AmDA, Apr. 18, 2018, 3 pages.
YouTube, "Windows 10 Tips and Tricks Using Cascade Stacked and Side by Side View and How to Undo", https:/www.youtube.com/watch?v=ECu9S96Z968, Mar. 2, 2016, 3 pages.
Notice of Allowance, dated Dec. 14, 2018, received in U.S. Appl. No. 15/715,005, 9 pages.
Notice of Allowance, dated Jun. 25, 2019, received in U.S. Appl. No. 15/715,005, 9 pages.
Notice of Allowance, dated Mar. 4, 2020, received in U.S. Appl. No. 16/354,012, 8 pages.
Notice of Allowance, dated Jul. 1, 2020, received in U.S. Appl. No. 16/354,012, 8 pages.
Office Action, dated Nov. 18, 2022, received in Chinese Patent Application No. 201880032712.8, which corresponds with U.S. Appl. No. 16/354,012, 2 pages.
Notice of Allowance, dated Apr. 5, 2023, received in Chinese Patent Application No. 201880032712.8, which corresponds with U.S. Appl. No. 16/354,012, 2 pages.
Office Action, dated Dec. 14, 2023, received in European Patent Application No. 18730196.5, which corresponds with U.S. Appl. No. 16/354,012, 6 pages.
Office Action, dated Jan. 4, 2021, received in U.S. Appl. No. 17/027,353, 29 pages.
Final Office Action, dated Apr. 6, 2021, received in U.S. Appl. No. 17/027,353, 31 pages.
Office Action, dated Oct. 27, 2021, received in U.S. Appl. No. 17/027,353, 34 pages.

(56) References Cited

OTHER PUBLICATIONS

Notice of Allowance, dated Feb. 24, 2022, received in U.S. Appl. No. 17/027,353, 9 pages.
Notice of Allowance, dated Apr. 29, 2022, received in U.S. Appl. No. 17/027,353, 7 pages.
Office Action, dated May 5, 2021, received in Australian Patent Application No. 2020239727, which corresponds with U.S. Appl. No. 17/027,353, 7 pages.
Office Action, dated Oct. 18, 2021, received in Australian Patent Application No. 2020239727, which corresponds with U.S. Appl. No. 17/027,353, 2 pages.
Notice of Allowance, dated Dec. 2, 2021, received in Australian Patent Application No. 2020239727, which corresponds with U.S. Appl. No. 17/027,353, 3 pages.
Certificate of grant, dated Mar. 31, 2022, received in Australian Patent Application No. 2020239727, which corresponds with U.S. Appl. No. 17/027,353, 3 pages.
Innovation Patent, dated Apr. 28, 2021, received in Australian Patent Application No. 2021101401, which corresponds with U.S. Appl. No. 17/027,353, 5 pages.
Office Action, dated May 28, 2021, received in Australian Patent Application No. 2021101401, which corresponds with U.S. Appl. No. 17/027,353, 6 pages.
Certificate of Examination, dated Aug. 12, 2021, received in Australian Patent Application No. 2021101401, which corresponds with U.S. Appl. No. 17/027,353, 4 pages.
Patent, dated Jun. 30, 2023, received in Chinese Patent Application No. 201880032712.8, which corresponds with U.S. Appl. No. 17/027,353, 5 pages.
Office Action, dated Dec. 18, 2020, received in Danish Patent Application No. 2020-70608, which corresponds with U.S. Appl. No. 17/027,353, 10 pages.
Office Action, dated Aug. 23, 2021, received in Danish Patent Application No. 2020-70608, which corresponds with U.S. Appl. No. 17/027,353, 6 pages.
Office Action, dated Jun. 8, 2022, received in Danish Patent Application No. 2020-70608, which corresponds with U.S. Appl. No. 17/027,353, 5 pages.
Office Action, dated Dec. 2, 2021, received in Indian Patent Application No. 202014041464, which corresponds with U.S. Appl. No. 17/027,353, 10 pages.
Office Action, dated Jan. 28, 2022, received in Japanese Patent Application No. 2020-160219, which corresponds with U.S. Appl. No. 17/027,353, 2 pages.
Final Office Action, dated Sep. 9, 2022, received in Japanese Patent Application No. 2020-160219, which corresponds with U.S. Appl. No. 17/027,353, 2 pages.
Patent, dated Jan. 17, 2023, received in Japanese Patent Application No. 2020-160219, which corresponds with U.S. Appl. No. 17/027,353, 3 pages.
Office Action, dated Oct. 20, 2022, received in Korean Patent Application No. 2020-0124016, which corresponds with U.S. Appl. No. 17/027,353, 16 pages.
Office Action, dated Apr. 26, 2023, received in Korean Patent Application No. 2020-0124016, which corresponds with U.S. Appl. No. 17/027,353, 2 pages.
Notice of Allowance, dated Nov. 28, 2023, received in Korean Patent Application No. 2020-0124016, which corresponds with U.S. Appl. No. 17/027,353, 2 pages.
Notice of Allowance, dated Apr. 29, 2021, received in U.S. Appl. No. 16/915,971, 9 pages.
Office Action, dated Feb. 2, 2021, received in U.S. Appl. No. 17/027,382, 16 pages.
Notice of Allowance, dated Apr. 28, 2021, received in U.S. Appl. No. 17/027,382, 10 pages.
Notice of Allowance, dated Aug. 31, 2021, received in U.S. Appl. No. 17/027,382, 6 pages.
Office Action, dated Mar. 31, 2021, received in Australian Patent Application No. 2020239725, which corresponds with U.S. Appl. No. 17/027,382, 6 pages.
Office Action, dated Sep. 28, 2021, received in Australian Patent Application No. 2020239725, which corresponds with U.S. Appl. No. 17/027,382, 6 pages.
Office Action, dated Jan. 27, 2022, received in Australian Patent Application No. 2020239725, which corresponds with U.S. Appl. No. 17/027,382, 2 pages.
Notice of Allowance, dated Mar. 2, 2022, received in Australian Patent Application No. 2020239725, which corresponds with U.S. Appl. No. 17/027,382, 3 pages.
Certificate of Grant, dated Jun. 30, 2022, received in Australian Patent Application No. 2020239725, which corresponds with U.S. Appl. No. 17/027,382, 3 pages.
Office Action, dated Dec. 23, 2020, received in Danish Patent Application No. 2020-70636, which corresponds with U.S. Appl. No. 17/027,382, 9 pages.
Office Action, dated Sep. 29, 2021, received in Danish Patent Application No. 2020-70636, which corresponds with U.S. Appl. No. 17/027,382, 4 pages.
Office Action, dated Jul. 1, 2022, received in Danish Patent Application No. 2020-70636, which corresponds with U.S. Appl. No. 17/027,382, 4 pages.
Office Action, dated Dec. 1, 2021, received in Indian Patent Application No. 202014041329, which corresponds with U.S. Appl. No. 17/027,382, 10 pages.
Notice of Allowance, dated Jan. 28, 2022, received in Japanese Patent Application No. 2020-160220, which corresponds with U.S. Appl. No. 17/027,382, 2 pages.
Patent, dated Feb. 21, 2022, received in Japanese Patent Application No. 2020-160220, which corresponds with U.S. Appl. No. 17/027,382, 2 pages.
Office Action, dated Oct. 14, 2022, received in Korean Patent Application No. 2020-0123650, which corresponds with U.S. Appl. No. 17/027,382, 9 pages.
Notice of Allowance, dated Sep. 26, 2023, received in Korean Patent Application No. 2020-0123650, which corresponds with U.S. Appl. No. 17/027,382, 2 pages.
Patent, dated Dec. 21, 2023, received in Korean Patent Application No. 2020-0123650, which corresponds with U.S. Appl. No. 17/027,382, 5 pages.
Office Action, dated Jan. 6, 2021, received in U.S. Appl. No. 17/027,400, 45 pages.
Final Office action, dated Apr. 29, 2021, received in U.S. Appl. No. 17/027,400, 46 pages.
Office action, dated Oct. 14, 2021, received in U.S. Appl. No. 17/027,400, 43 pages.
Final Office action, dated Mar. 23, 2022, received in U.S. Appl. No. 17/027,400, 51 pages.
Office action, dated Sep. 29, 2022, received in U.S. Appl. No. 17/027,400, 45 pages.
Notice of Allowance, dated Mar. 31, 2023, received in U.S. Appl. No. 17/027,400, 49 pages.
Office Action, dated Apr. 23, 2021, received in Australian Patent Application No. 2020239726, which corresponds with U.S. Appl. No. 17/027,400, 8 pages.
Notice of Allowance, dated Jul. 23, 2021, received in Australian Patent Application No. 2020239726, which corresponds with U.S. Appl. No. 17/027,400, 3 pages.
Patent, dated Nov. 18, 2021, received in Australian Patent Application No. 2020239726, which corresponds with U.S. Appl. No. 17/027,400, 4 pages.
Office Action, dated Oct. 4, 2021, received in Danish Patent Application No. 2020 70637, which corresponds with U.S. Appl. No. 17/027,400, 4 pages.
Office Action, dated May 20, 2022, received in Danish Patent Application No. 2020 70637, which corresponds with U.S. Appl. No. 17/027,400, 4 pages.
Office Action, dated Dec. 2, 2021, received in Indian Patent Application No. 202014041330, which corresponds with U.S. Appl. No. 17/027,400,10 pages.
Office Action, dated Feb. 4, 2022, received in Japanese Patent Application No. 2020-160173, which corresponds with U.S. Appl. No. 17/027,400, 2 pages.

(56) References Cited

OTHER PUBLICATIONS

Patent, dated Dec. 19, 2022, received in Japanese Patent Application No. 2020-160173, which corresponds with U.S. Appl. No. 17/027,400, 2 pages.
Office Action, dated Jul. 12, 2022, received in Korean Patent Application No. 2020-0124017, which corresponds with U.S. Appl. No. 17/027,400, 12 pages.
Notice of Allowance, dated Jan. 9, 2023, received in Korean Patent Application No. 2020-0124017, which corresponds with U.S. Appl. No. 17/027,400, 2 pages.
Patent, dated Jan. 30, 2023, received in Korean Patent Application No. 2020-0124017, which corresponds with U.S. Appl. No. 17/027,400, 4 pages.
Office Action, dated Jan. 8, 2021, received in U.S. Appl. No. 17/027,416, 35 pages.
Notice of Allowance, dated Apr. 19, 2021, received in U.S. Appl. No. 17/027,416, 8 pages.
Notice of Allowance, dated Jul. 28, 2021, received in U.S. Appl. No. 17/027,416, 9 pages.
Office Action, dated Apr. 29, 2021, received in Australian Patent Application No. 2020239728, which corresponds with U.S. Appl. No. 17/027,416, 7 pages.
Notice of Acceptance, dated Aug. 20, 2021, received in Australian Patent Application No. 2020239728, which corresponds with U.S. Appl. No. 17/027,416, 3 pages.
Patent, dated Dec. 23, 2021, received in Australian Patent Application No. 2020239728, which corresponds with U.S. Appl. No. 17/027,416, 3 pages.
Office Action, dated Dec. 22, 2020, received in Danish Patent Application No. 2020-70638, which corresponds with U.S. Appl. No. 17/027,416, 6 pages.
Office Action, dated Nov. 5, 2021, received in Danish Patent Application No. 2020239728, which corresponds with U.S. Appl. No. 17/027,416, 5 pages.
Office Action, dated Aug. 17, 2022, received in Danish Patent Application No. 2020239728, which corresponds with U.S. Appl. No. 17/027,416, 2 pages.
Office Action, dated Dec. 2, 2021, received in Indian Patent Application No. 202014041465, which corresponds with U.S. Appl. No. 17/027,416, 8 pages.
Office Action, dated Jan. 28, 2022, received in Japanese Patent Application No. 2020-160174, which corresponds with U.S. Appl. No. 17/027,416, 2 pages.
Notice of Allowance, dated Sep. 5, 2022, received in Japanese Patent Application No. 2020-160174, which corresponds with U.S. Appl. No. 17/027,416, 1 page.
Patent, dated Oct. 3, 2022, received in Japanese Patent Application No. 2020-160174, which corresponds with U.S. Appl. No. 17/027,416, 5 pages.
Office Action, dated Oct. 17, 2022, received in Korean Patent Application No. 2020-0123829, which corresponds with U.S. Appl. No. 17/027,416, 11 pages.
Notice of Allowance, dated Jun. 15, 2023, received in Korean Patent Application No. 2020-0123829, which corresponds with U.S. Appl. No. 17/027,416, 2 pages.
Office Action, dated Dec. 22, 2020, received in U.S. Appl. No. 17/027,429, 23 pages.
Notice of Allowance, dated Apr. 13, 2021, received in U.S. Appl. No. 17/027,429, 9 pages.
Notice of Allowance, dated Oct. 29, 2021, received in U.S. Appl. No. 17/027,429, 7 pages.
Office Action, dated May 6, 2021, received in Australian Patent Application No. 2020239731, which corresponds with U.S. Appl. No. 17/027,429, 6 pages.
Notice of Acceptance, dated Oct. 6, 2021, received in Australian Patent Application No. 2020239731, which corresponds with U.S. Appl. No. 17/027,429, 3 pages.
Office Action, dated Jan. 6, 2021, received in Danish Patent Application No. 2020-70639, which corresponds with U.S. Appl. No. 17/027,429, 9 pages.
Office Action, dated Sep. 9, 2021, received in Danish Patent Application No. 2020-70639, which corresponds with U.S. Appl. No. 17/027,429, 3 pages.
Intent to Grant, dated Oct. 19, 2021, received in Danish Patent Application No. 2020-70639, which corresponds with U.S. Appl. No. 17/027,429, 2 pages.
Notice of Allowance, dated Jan. 10, 2022, received in Danish Patent Application No. 2020-70639, which corresponds with U.S. Appl. No. 17/027,429, 2 pages.
Patent, dated Mar. 21, 2022, received in Danish Patent Application No. 2020-70639, which corresponds with U.S. Appl. No. 17/027,429, 5 pages.
Office Action, dated Dec. 6, 2021, received in Indian Patent Application No. 202014041463, which corresponds with U.S. Appl. No. 17/027,429, 9 pages.
Notice of Allowance, dated Feb. 4, 2022, received in Japanese Patent Application No. 2020-160175, which corresponds with U.S. Appl. No. 17/027,429, 2 pages.
Patent, dated Feb. 16, 2022, received in Japanese Patent Application No. 2020-160175, which corresponds with U.S. Appl. No. 17/027,429, 3 pages.
Office Action, dated Oct. 17, 2022, received in Korean Patent Application No. 2020-0123583, which corresponds with U.S. Appl. No. 17/027,429, 3 pages.
Office Action, dated Jan. 7, 2021, received in U.S. Appl. No. 17/027,441, 15 pages.
Notice of Allowance, dated Apr. 13, 2021, received in U.S. Appl. No. 17/027,441, 5 pages.
Office Action, dated Oct. 21, 2021, received in U.S. Appl. No. 17/027,441, 24 pages.
Notice of Allowance, dated Feb. 25, 2022, received in U.S. Appl. No. 17/027,441, 26 pages.
Office Action, dated May 28, 2021, received in Australian Patent Application No. 2020239732, which corresponds with U.S. Appl. No. 17/027,441, 6 pages.
Office Action, dated Sep. 8, 2021, received in Australian Patent Application No. 2020239732, which corresponds with U.S. Appl. No. 17/027,441, 5 pages.
Notice of Allowance, dated Feb. 16, 2022, received in Australian Patent Application No. 2020239732, which corresponds with U.S. Appl. No. 17/027,441, 3 pages.
Patent, dated Jun. 23, 2022, received in Australian Patent Application No. 2020239732, which corresponds with U.S. Appl. No. 17/027,441, 4 pages.
Office Action, dated Dec. 23, 2020, received in Danish Patent Application No. 2020-70640, which corresponds to U.S. Appl. No. 17/027,441, 9 pages.
Office Action, dated Jul. 23, 2021, received in Danish Patent Application No. 2020-70640, which corresponds with U.S. Appl. No. 17/027,441, 3 pages.
Intent to Grant, dated Dec. 9, 2021, received in Danish Patent Application No. 2020-70640, which corresponds with U.S. Appl. No. 17/027,441, 2 pages.
Notice of Allowance, dated Feb. 10, 2022, received in Danish Patent Application No. 2020-70640, which corresponds with U.S. Appl. No. 17/027,441, 2 pages.
Patent, dated May 11, 2022, received in Danish Patent Application No. 2020-70640, which corresponds with U.S. Appl. No. 17/027,441, 5 pages.
Office Action, dated Dec. 3, 2021, received in Indian Patent Application No. 202014041328, which corresponds with U.S. Appl. No. 17/027,441, 7 pages.
Patent, dated Dec. 9, 2023, received in Indian Patent Application No. 202014041328, which corresponds with U.S. Appl. No. 17/027,441, 3 pages.
Office Action, dated Feb. 4, 2022, received in Japanese Patent Application No. 2020-160176, which corresponds with U.S. Appl. No. 17/027,441, 2 pages.
Notice of Allowance, dated Oct. 14, 2022, received in Japanese Patent Application No. 2020-160176, which corresponds with U.S. Appl. No. 17/027,441, 2 pages.

(56) References Cited

OTHER PUBLICATIONS

Patent, dated Nov. 9, 2022, received in Japanese Patent Application No. 20-160176, which corresponds with U.S. Appl. No. 17/027,441, 2 pages.
Office Action, dated Jul. 12, 2022, received in Korean Patent Application No. 2020-0124095, which corresponds with U.S. Appl. No. 17/027,441, 11 pages.
Notice of Allowance, dated Jan. 13, 2023, received in Korean Patent Application No. 2020-0124095, which corresponds with U.S. Appl. No. 17/027,441, 2 pages.
Patent, dated Jan. 30, 2023, received in Korean Patent Application No. 2020-0124095, which corresponds with U.S. Appl. No. 17/027,441, 4 pages.
Notice of Allowance, dated Feb. 24, 2022, received in U.S. Appl. No. 17/458,201, 8 pages.
Notice of Allowance, dated Jun. 8, 2022, received in U.S. Appl. No. 17/458,201, 8 pages.
Office Action, dated Sep. 9, 2023, received in Chines Patent Application No. 202211283826.4, which corresponds with U.S. Appl. No. 17/458,201, 3 pages.
Notice of Allowance, dated Jun. 22, 2023, received in U.S. Appl. No. 17/950,680, 10 pages.
Office Action, dated Dec. 1, 2023, received in Japanese Patent Application No. 2022-151726, which corresponds with U.S. Appl. No. 17/950,680, 8 pages.
Office Action, dated Apr. 19, 2023, received in Australian Patent Application No. 2022203104, 3 pages.
Office Action, dated Jan. 19, 2024, received in Australian Patent Application No. 2022203104, 3 pages.
Notice of Allowance, dated Sep. 8, 2022, received in U.S. Appl. No. 17/852,235, 8 pages.
Notice of Allowance, dated Nov. 10, 2022, received in U.S. Appl. No. 17/852,235, 7 pages.
Notice of allowance, dated Jul. 24, 2023, received in U.S. Appl. No. 17/815,894, 11 pages.
Notice of allowance, dated Nov. 8, 2023, received in U.S. Appl. No. 17/815,894, 9 pages.
Office Action, dated Aug. 17, 2023, received in U.S. Appl. No. 17/950,694, 35 pages.
Final Office Action, dated Dec. 15, 2023, received in U.S. Appl. No. 17/950,694, 32 pages.
Office Action, dated Dec. 1, 2023, received in Japanese Patent Application No. 2022-151739, which corresponds with U.S. Appl. No. 17/950,694, 8 pages.
Office Action, dated Feb. 10, 2023, received in U.S. Appl. No. 17/950,707, 9 pages.
Notice of Allowance, dated Mar. 7, 2023, received in U.S. Appl. No. 17/950,707, 9 pages.
Office Action, dated Dec. 4, 2023, received in Japanese Patent Application No. 2022-151743, which corresponds with U.S. Appl. No. 17/950,707, 9 pages.
Office Action, dated Feb. 16, 2023, received in U.S. Appl. No. 17/950,718, 20 pages.
Final Office Action, dated May 25, 2023, received in U.S. Appl. No. 17/950,718, 21 pages.
Office Action, dated Oct. 5, 2023, received in U.S. Appl. No. 17/950,718, 22 pages.
Office Action, dated Mar. 9, 2023, received in U.S. Appl. No. 17/950,766, 27 pages.
Notice of Allowance, dated Apr. 26, 2023, received in U.S. Appl. No. 17/950,766, 26 pages.
Office Action, dated Feb. 15, 2023, received in U.S. Appl. No. 17/967,528, 17 pages.
Office Action, dated Jun. 29, 2023, received in U.S. Appl. No. 17/967,528, 17 pages.
Notice of Allowance, dated Oct. 12, 2023, received in U.S. Appl. No. 17/967,528, 5 pages.
Office Action, dated Apr. 13, 2023, received in U.S. Appl. No. 18/099,839, 6 pages.
Notice of Allowance, dated Jun. 13, 2023, received in U.S. Appl. No. 18/099,839, 6 pages.
Office Action, dated Aug. 30, 2023, received in U.S. Appl. No. 18/202,863, 6 pages.
Notice of Allowance, dated Nov. 7, 2023, received in U.S. Appl. No. 18/202,863, 8 pages.
Invitation to Pay Additional Fees, dated Aug. 28, 2018, received in International Patent Application No. PCT/US2018/032395, which corresponds with U.S. Appl. No. 15/715,005, 17 pages.
International Search Report and Written Opinion, dated Nov. 6, 2018, received in International Patent Application No. PCT/US2018/032395, which corresponds with U.S. Appl. No. 15/715,005, 20 pages.
Invitation to Pay Additional Fees, dated Jun. 9, 2021, received in International Patent Application No. PCT/US2021/021776, which corresponds with U.S. Appl. No. 17/027,353, 17 pages.
International Search Report and Written Opinion, dated Aug. 3, 2021, received in International Patent Application No. PCT/US2021/021776, which corresponds with U.S. Appl. No. 17/027,353, 20 pages.
Extended European Search Report, dated Jan. 13, 2023, received in European Patent Application No. 22203850.7, 13 pages.
International Search Report and Written Opinion, dated Oct. 10, 2023, received in International Patent Application No. PCT/US2023/020889, which corresponds with U.S. Appl. No. 17/950,680, 46 pages.
Office Action, dated Mar. 20, 2024, received in Chinese Patent Application No. 202210933711.9, which corresponds with U.S. Appl. No. 17/027,429, 2 pages.
Final Office Action, dated Feb. 7, 2024, received in U.S. Appl. No. 17/950,718, 25 pages.
Office Action, dated Mar. 26, 2024, received in Korean Patent Application No. 2024-0008075, which corresponds with U.S. Appl. No. 17/967,528, 7 pages.
U.S. Appl. No. 11/747,969 B1, filed Sep. 25, 2023, Karunamuni.
U.S. Appl. No. 11/762,538 B2, filed Sep. 19, 2023, Tyler et al.
U.S. Appl. No. 11/775,128 B1, filed Oct. 3, 2023, Karunamuni.
U.S. Appl. No. 11/842,028 B2, filed Dec. 12, 2023, Karunamuni.
Phandroid, “A Closer Look at Android N Multi-Window Mode”, https.//www.youtube.com/watch?v=pTAOB1cw-Qw, Mar. 11, 2016, 3 pages.
Youtube, “A Summary of 2016”, https://www.youtube.com/watch?v=Tva8zmbOso, 2016, 3 pages.
Patent, dated Jul. 2, 2024, received in Indian Patent Application No. 202014041464, which corresponds with U.S. Appl. No. 17/027,382, 2 pages.
Patent, dated Nov. 29, 2024, received in Indian Patent Application No. 202014041329, which corresponds with U.S. Appl. No. 17/027,382, 6 pages.
Decision to Grant, dated Jun. 20, 2024, received in European Patent Application No. 21715721.3, 4 pages.
Patent, dated Jul. 17, 2024, received in European Patent Application No. 21715721.3, 4 pages.
Office Action, dated Jul. 5, 2024, received in Chinese Patent Application No. 202211283826.4, which corresponds with U.S. Appl. No. 17/458,201, 1 page.
Office Action, dated Nov. 16, 2024, received in Chinese Patent Application No. 202211283826.4, which corresponds with U.S. Appl. No. 17/458,201, 1 page.
Office Action, dated Feb. 21, 2025, received in European Patent Application No. 22196821.7, which corresponds with U.S. Appl. No. 17/950,680, 12 pages.
Final Office Action, dated Jul. 1, 2024, received in Japanese Patent Application No. 2022-151726, which corresponds with U.S. Appl. No. 17/950,680, 4 pages.
Notice of Allowance, dated Oct. 25, 2024, received in Japanese Patent Application No. 2022-151726, which corresponds with U.S. Appl. No. 17/950,680, 2 pages.
Office Action, dated Sep. 25, 2024, received in Korean Patent Application No. 2022-0120282, which corresponds with U.S. Appl. No. 17/950,680, 11 pages.

(56) References Cited

OTHER PUBLICATIONS

Notice of Allowance, dated Mar. 7, 2025, received in Korean Patent Application No. 2022-0120282, which corresponds with U.S. Appl. No. 17/950,680, 3 pages.
Grant Certificate, dated Jul. 25, 2024, received in Australian Patent Application No. 2022203104, 3 pages.
Office Action, dated Mar. 18, 2024, received in Japanese Patent Application No. 2022-200447, which corresponds with U.S. Appl. No. 17/815,894, 4 pages.
Notice of Allowance, dated Jun. 17, 2024, received in Japanese Patent Application No. 2022-200447, which corresponds with U.S. Appl. No. 17/815,894, 2 pages.
Patent, dated Jul. 19, 2024, received in Japanese Patent Application No. 2022- 200447, which corresponds with U.S. Appl. No. 17/815,894, 5 pages.
Office Action, dated Jun. 3, 2024, received in U.S. Appl. No. 17/950,694, 56 pages.
Final Office Action, dated Nov. 12, 2024, received in U.S. Appl. No. 17/950,694, 38 pages.
Office Action, dated Feb. 21, 2025, received in European Patent Application No. 22196926.4, which corresponds with U.S. Appl. No. 17/950,694, 13 pages.
Final Office Action, dated Jul. 1, 2024, received in Japanese Patent Application No. 2022-151739, which corresponds with U.S. Appl. No. 17/950,694, 4 pages.
Notice of Allowance, dated Oct. 25, 2024, , received in Japanese Patent Application No. 2022-151739, which corresponds with U.S. Appl. No. 17/950,694, 2 pages.
Office Action, dated Oct. 22, 2024, received in European Patent Application No. 2219634.8, which corresponds with U.S. Appl. No. 16/862,376, 14 pages.
Notice of Allowance, dated Jul. 1, 2024, received in Japanese Patent Application No. 2022-151743, which corresponds with U.S. Appl. No. 17/950,707, 2 pages.
Patent, dated Jul. 30, 2024, received in Japanese Patent Application No. 2022- 151743, which corresponds with U.S. Appl. No. 17/950,707, 3 pages.
Office Action, dated Jan. 24, 2025, received in U.S. Appl. No. 17/950,718, 29 pages.
Notice of Allowance, dated Nov. 21, 2024, received in U.S. Appl. No. 18/243,058, 10 pages.
Office Action, dated Sep. 16, 2024, received in U.S. Appl. No. 18/593,688, 20 pages.
Notice of Allowance, dated Mar. 28, 2025, received in U.S. Appl. No. 18/593,688, 5 pages.
International Search Report and Written Opinion, dated Aug. 13, 2024, received in International Patent Application No. PCT/US2024/020810, 18 pages.
Written Opinion, dated Feb. 10, 2025, received in International Patent Application No. PCT/US2024/020810, 11 pages.
Office Action, dated May 19, 2025, received in Indian Patent Application No. 202217052297, 11 pages.
Office Action, dated May 7, 2025, received in U.S. Appl. No. 17/950,694, 34 pages.
Office Action, dated May 21, 2025, received in Indian 202214054060, which corresponds with U.S. Appl. No. 16/862,376, 10 pages.
Final Office Action, dated May 19, 2025, received in U.S. Appl. No. 17/950,718, 30 pages.
Office Action, dated Apr. 28, 2025, received in Korean Patent Application No. 2024-0008075, which corresponds with U.S. Appl. No. 17/967,528, 5 pages.
Office Action, dated Jun. 26, 2025, received in Australian 2024204717, which corresponds with U.S. Appl. No. 17/967,528, 4 pages.
Office Action, dated Jun. 18, 2025, received in Japanese Patent Application No. 2024-114137, which corresponds with U.S. Appl. No. 17/967,870, 6 pages.

* cited by examiner

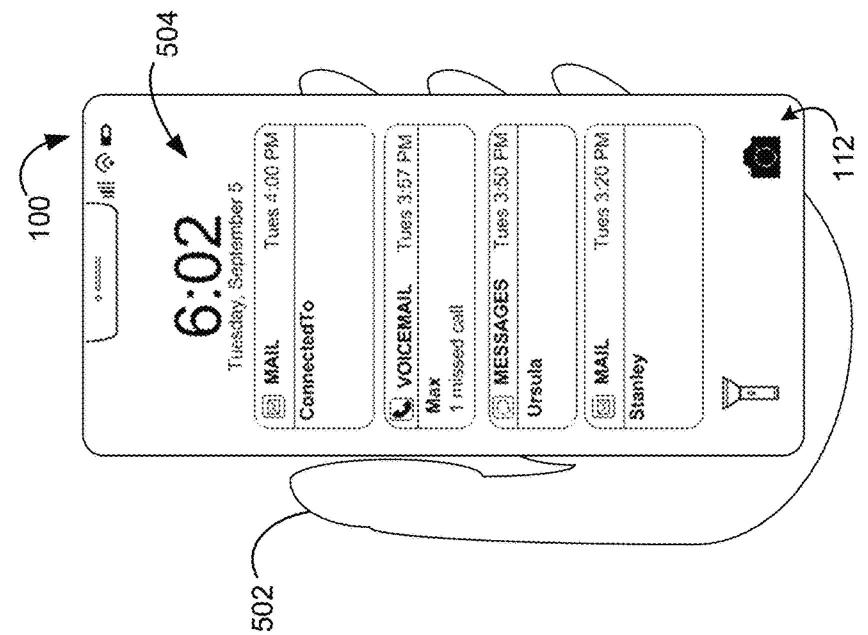
Figure 5A4
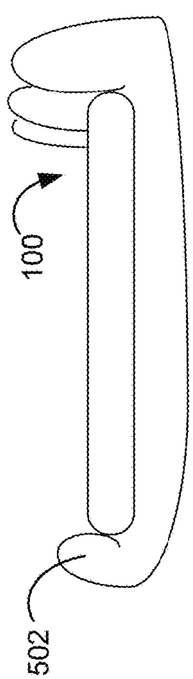
Figure 5A1
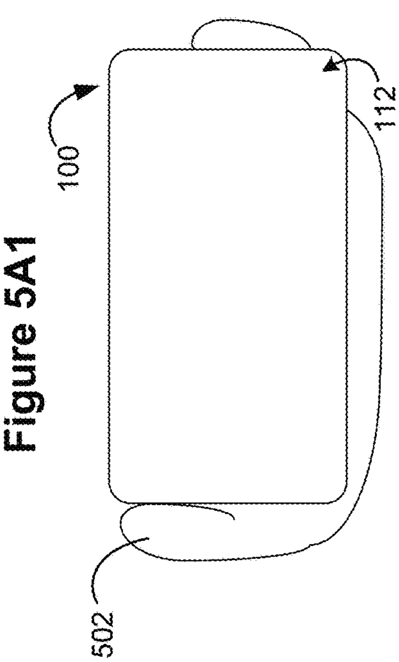
Figure 5A2
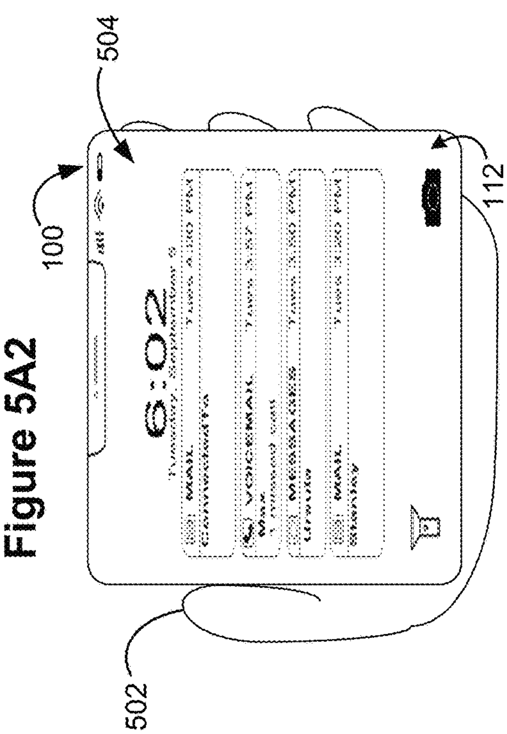
Figure 5A3

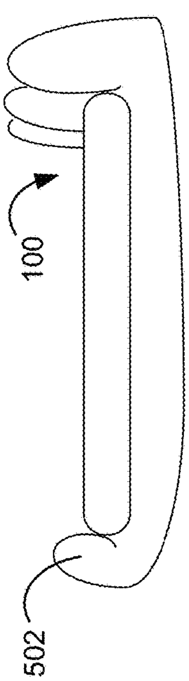
Figure 5EC1
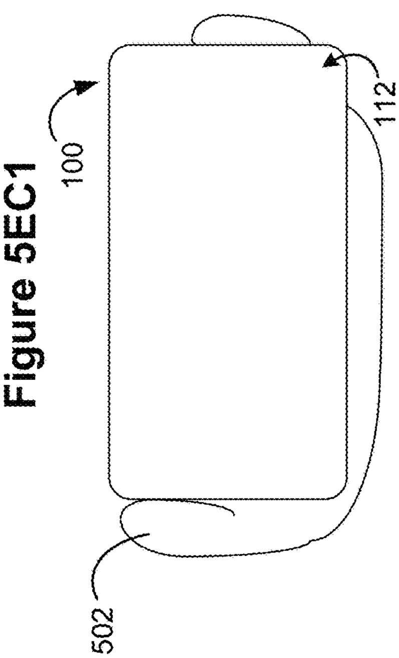
Figure 5EC2
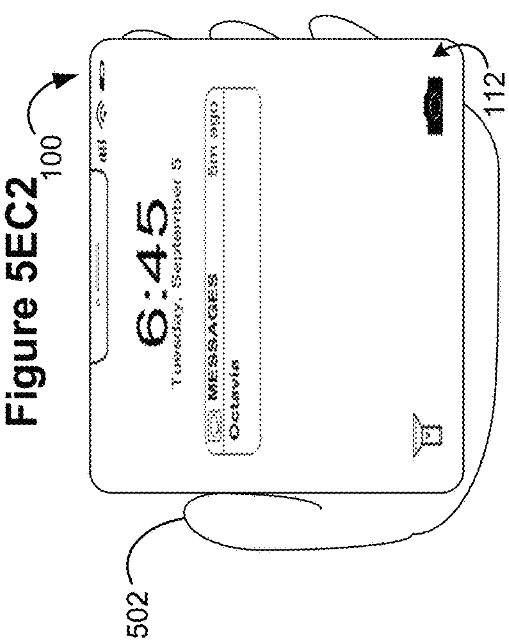
Figure 5EC3
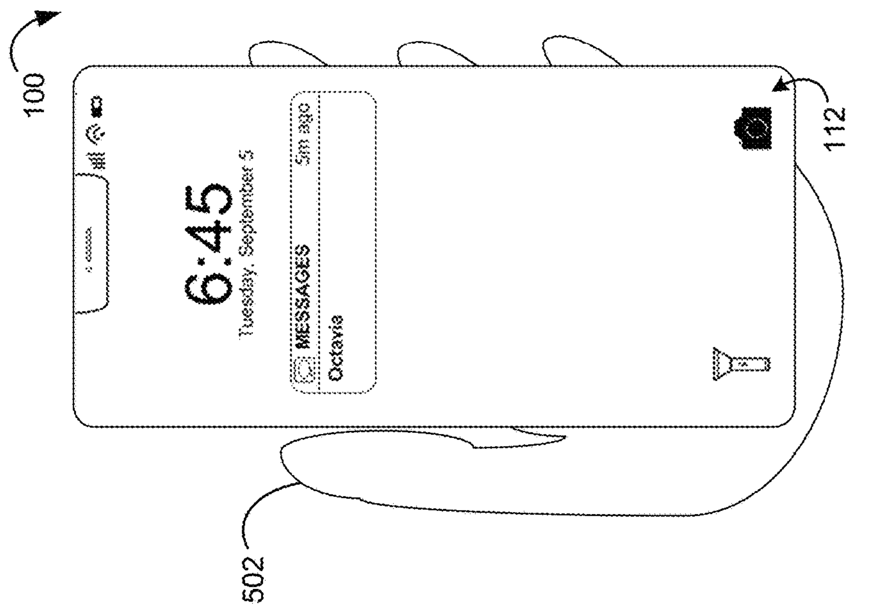
Figure 5EC4

Figure 6A:
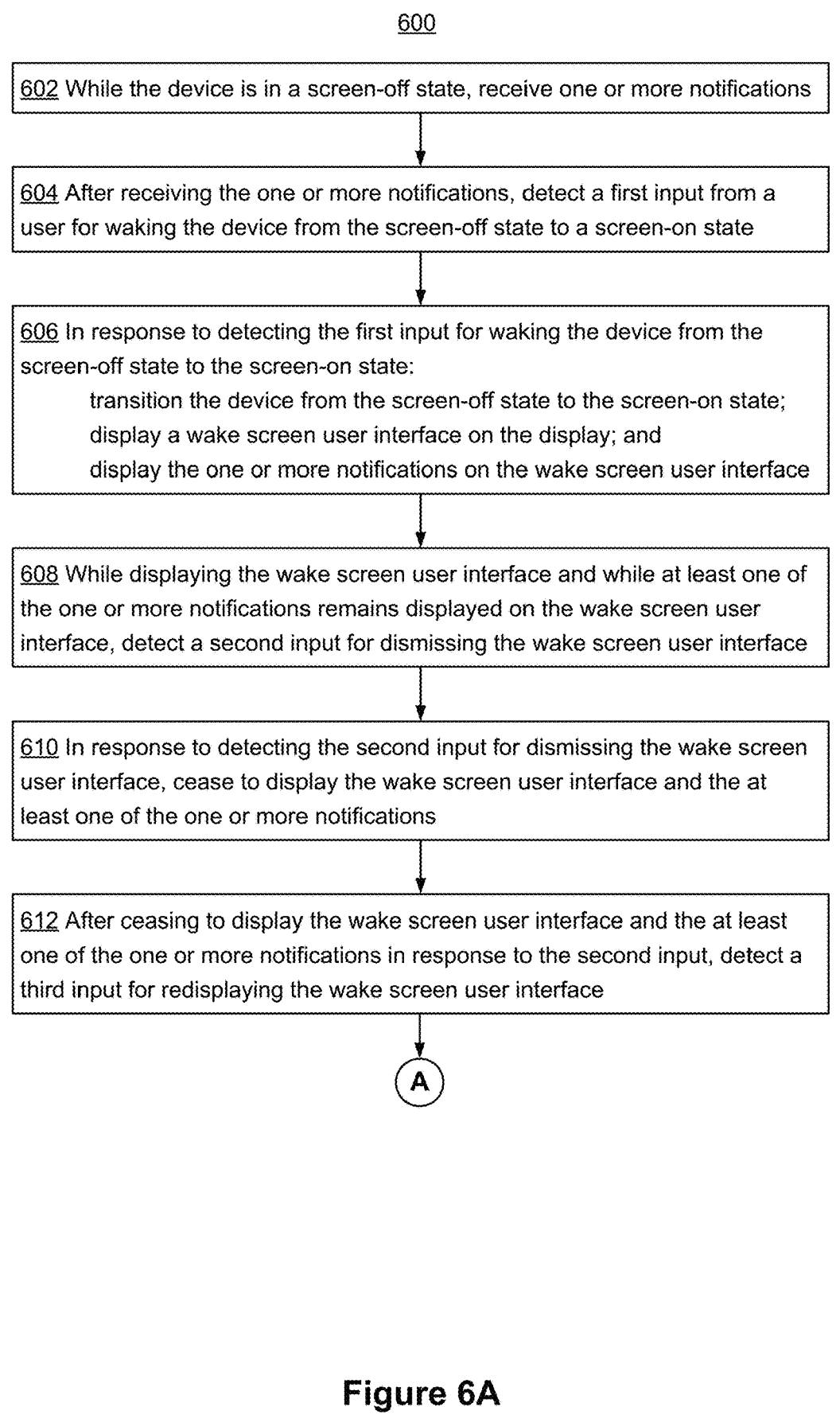

600

602 While the device is in a screen-off state, receive one or more notifications 604 After receiving the one or more notifications, detect a first input from a user for waking the device from the screen-off state to a screen-on state 606 In response to detecting the first input for waking the device from the screen-off state to the screen-on state:

- transition the device from the screen-off state to the screen-on state;
- display a wake screen user interface on the display; and
- display the one or more notifications on the wake screen user interface 608 While displaying the wake screen user interface and while at least one of the one or more notifications remains displayed on the wake screen user interface, detect a second input for dismissing the wake screen user interface 610 In response to detecting the second input for dismissing the wake screen user interface, cease to display the wake screen user interface and the at least one of the one or more notifications 612 After ceasing to display the wake screen user interface and the at least one of the one or more notifications in response to the second input, detect a third input for redisplaying the wake screen user interface

Figure 6B:
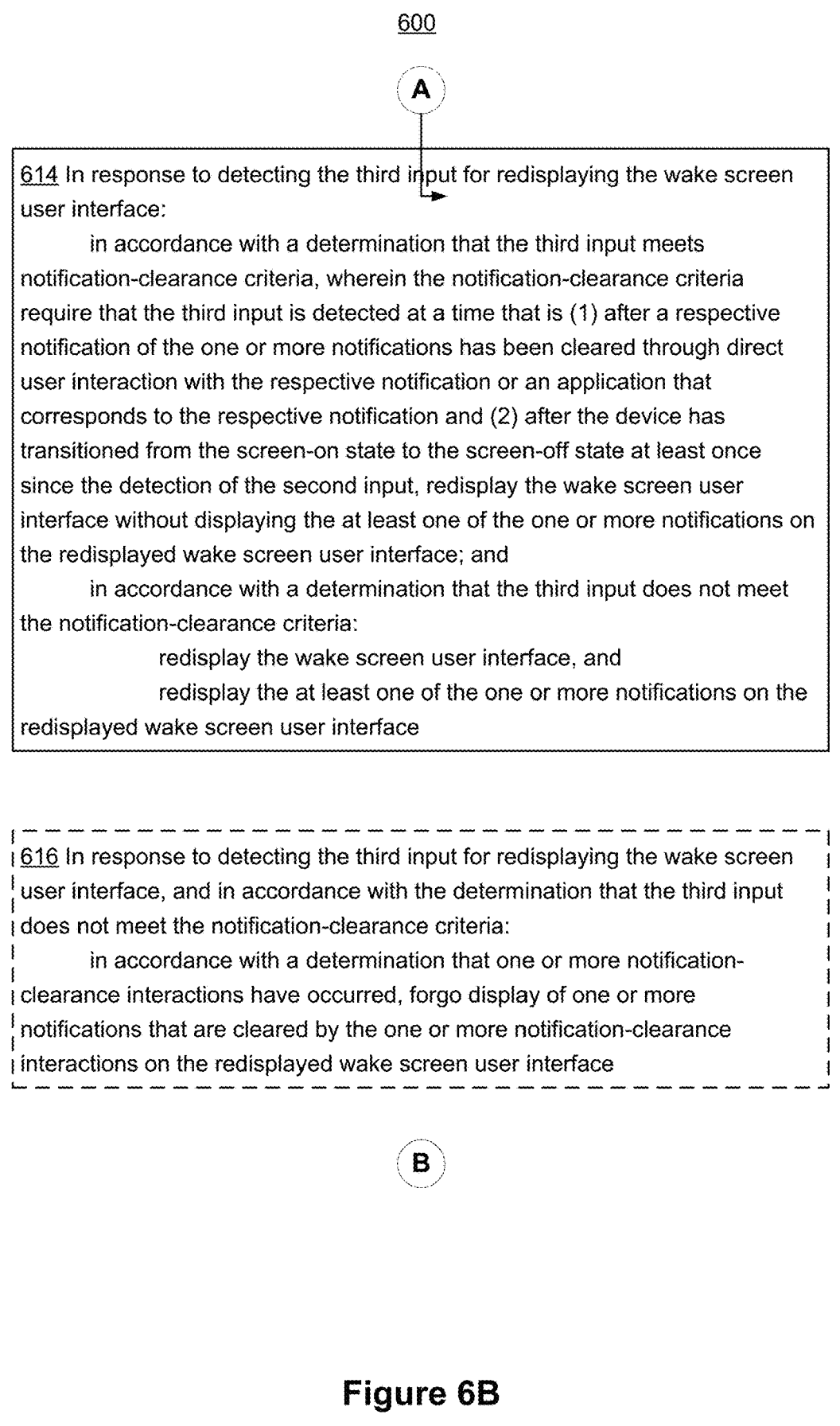

614 In response to detecting the third input for redisplaying the wake screen user interface:

in accordance with a determination that the third input meets notification-clearance criteria, wherein the notification-clearance criteria require that the third input is detected at a time that is (1) after a respective notification of the one or more notifications has been cleared through direct user interaction with the respective notification or an application that corresponds to the respective notification and (2) after the device has transitioned from the screen-on state to the screen-off state at least once since the detection of the second input, redisplay the wake screen user interface without displaying the at least one of the one or more notifications on the redisplayed wake screen user interface; and in accordance with a determination that the third input does not meet the notification-clearance criteria:

redisplay the wake screen user interface, and redisplay the at least one of the one or more notifications on the redisplayed wake screen user interface 616 In response to detecting the third input for redisplaying the wake screen user interface, and in accordance with the determination that the third input does not meet the notification-clearance criteria:

in accordance with a determination that one or more notification-clearance interactions have occurred, forgo display of one or more notifications that are cleared by the one or more notification-clearance interactions on the redisplayed wake screen user interface

Figure 6C:
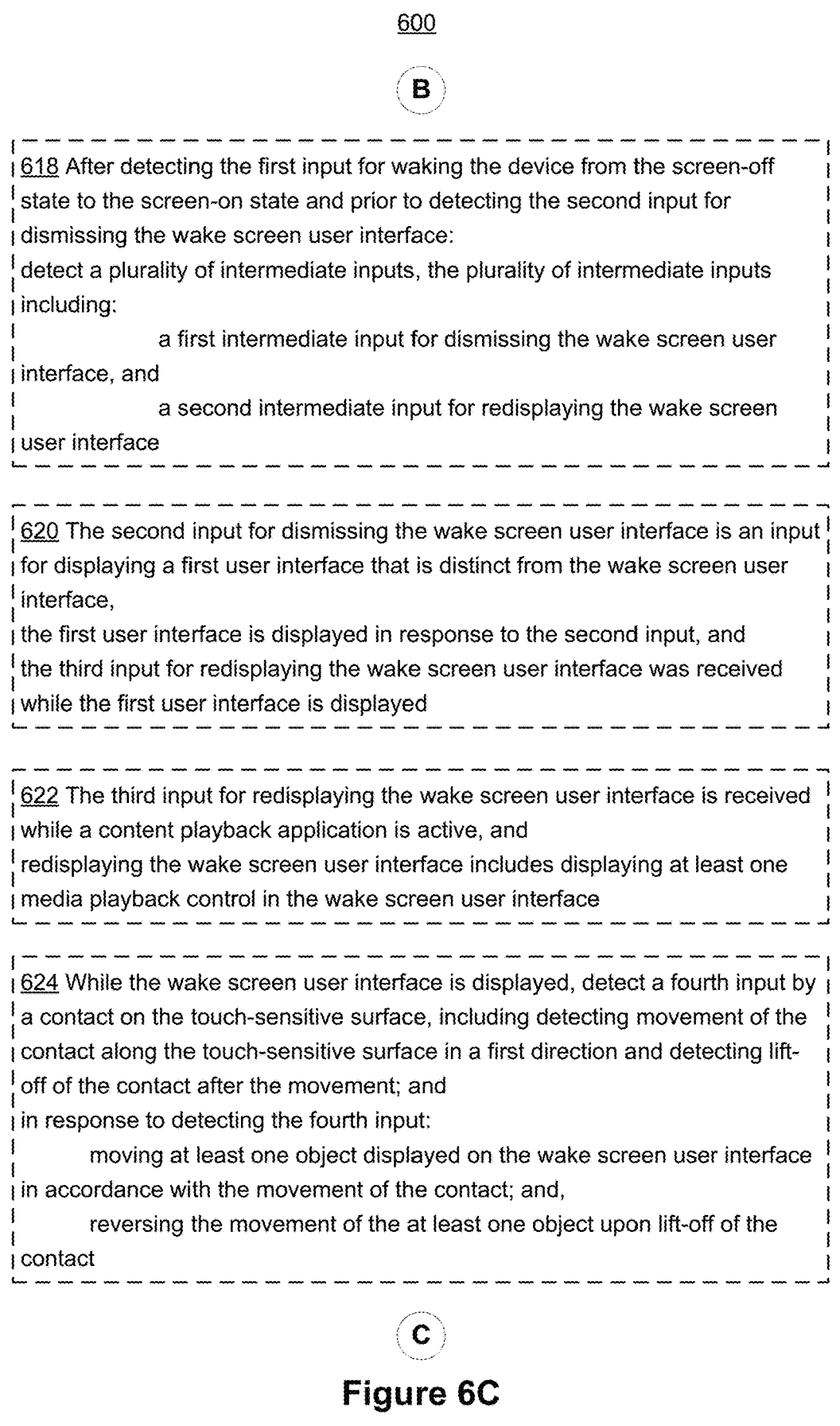

618 After detecting the first input for waking the device from the screen-off state to the screen-on state and prior to detecting the second input for dismissing the wake screen user interface:
detect a plurality of intermediate inputs, the plurality of intermediate inputs including:
a first intermediate input for dismissing the wake screen user interface, and
a second intermediate input for redisplaying the wake screen user interface 620 The second input for dismissing the wake screen user interface is an input for displaying a first user interface that is distinct from the wake screen user interface,
the first user interface is displayed in response to the second input, and
the third input for redisplaying the wake screen user interface was received while the first user interface is displayed 622 The third input for redisplaying the wake screen user interface is received while a content playback application is active, and
redisplaying the wake screen user interface includes displaying at least one media playback control in the wake screen user interface 624 While the wake screen user interface is displayed, detect a fourth input by a contact on the touch-sensitive surface, including detecting movement of the contact along the touch-sensitive surface in a first direction and detecting lift-off of the contact after the movement; and
in response to detecting the fourth input:
moving at least one object displayed on the wake screen user interface in accordance with the movement of the contact; and,
reversing the movement of the at least one object upon lift-off of the contact

Figure 6D:
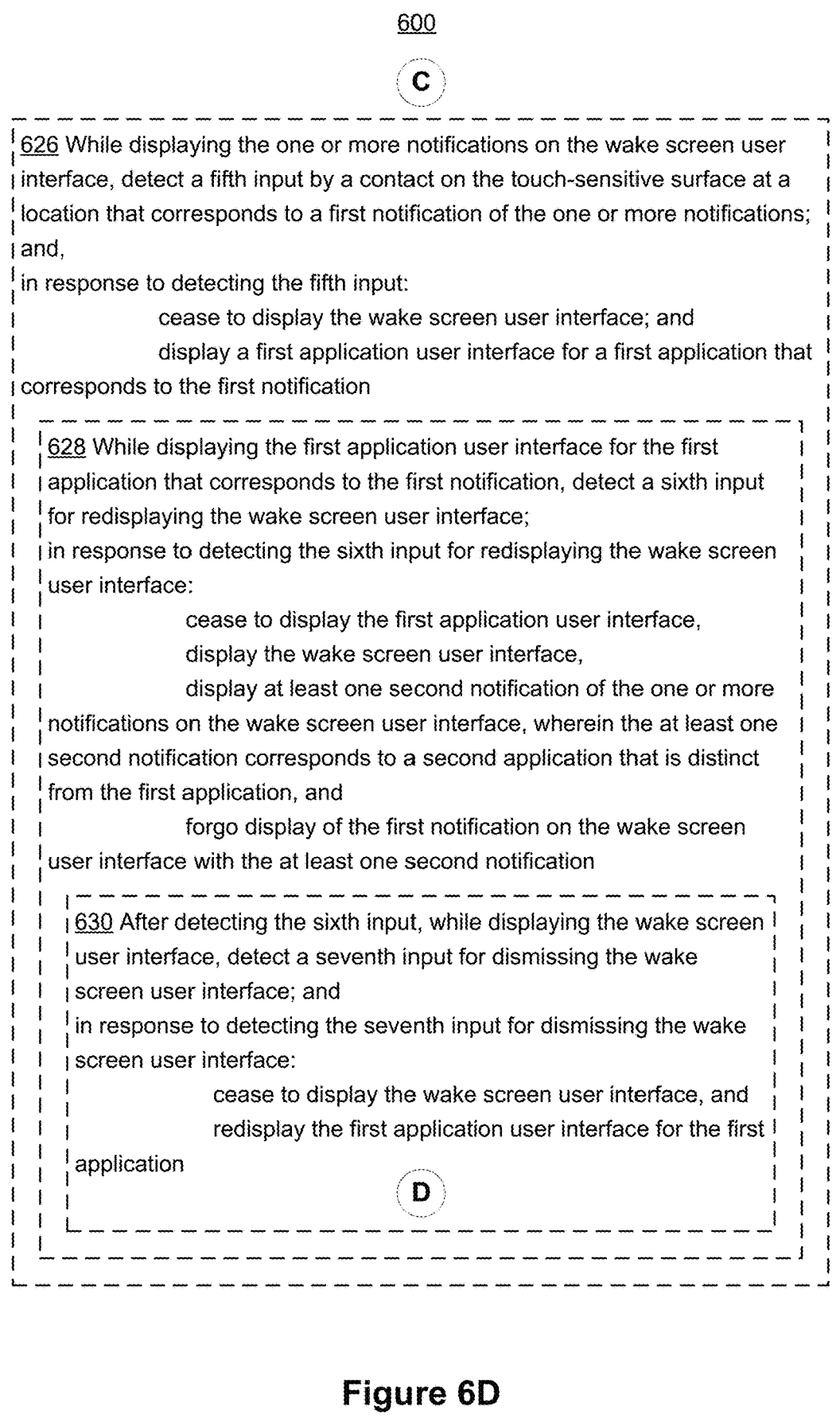

626 While displaying the one or more notifications on the wake screen user interface, detect a fifth input by a contact on the touch-sensitive surface at a location that corresponds to a first notification of the one or more notifications; and,
in response to detecting the fifth input:
cease to display the wake screen user interface; and
display a first application user interface for a first application that corresponds to the first notification 628 While displaying the first application user interface for the first application that corresponds to the first notification, detect a sixth input for redisplaying the wake screen user interface;
in response to detecting the sixth input for redisplaying the wake screen user interface:
cease to display the first application user interface,
display the wake screen user interface,
display at least one second notification of the one or more notifications on the wake screen user interface, wherein the at least one second notification corresponds to a second application that is distinct from the first application, and
forgo display of the first notification on the wake screen user interface with the at least one second notification 630 After detecting the sixth input, while displaying the wake screen user interface, detect a seventh input for dismissing the wake screen user interface; and
in response to detecting the seventh input for dismissing the wake screen user interface:
cease to display the wake screen user interface, and
redisplay the first application user interface for the first application

Figure 6E:
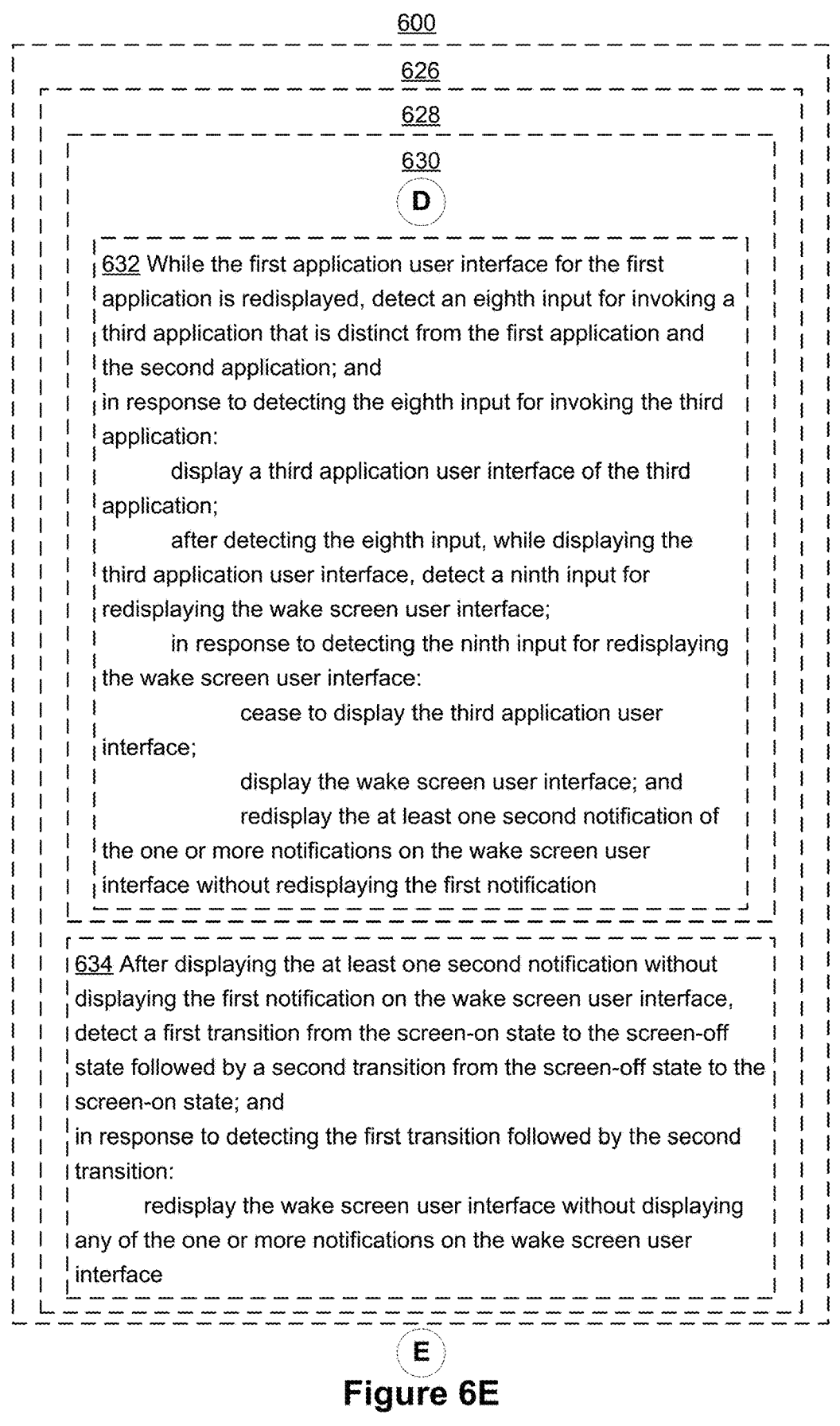

632 While the first application user interface for the first application is redisplayed, detect an eighth input for invoking a third application that is distinct from the first application and the second application; and
in response to detecting the eighth input for invoking the third application:
display a third application user interface of the third application;
after detecting the eighth input, while displaying the third application user interface, detect a ninth input for redisplaying the wake screen user interface;
in response to detecting the ninth input for redisplaying the wake screen user interface:
cease to display the third application user interface;
display the wake screen user interface; and
redisplay the at least one second notification of the one or more notifications on the wake screen user interface without redisplaying the first notification 634 After displaying the at least one second notification without displaying the first notification on the wake screen user interface, detect a first transition from the screen-on state to the screen-off state followed by a second transition from the screen-off state to the screen-on state; and
in response to detecting the first transition followed by the second transition:
redisplay the wake screen user interface without displaying any of the one or more notifications on the wake screen user interface

Figure 6F:
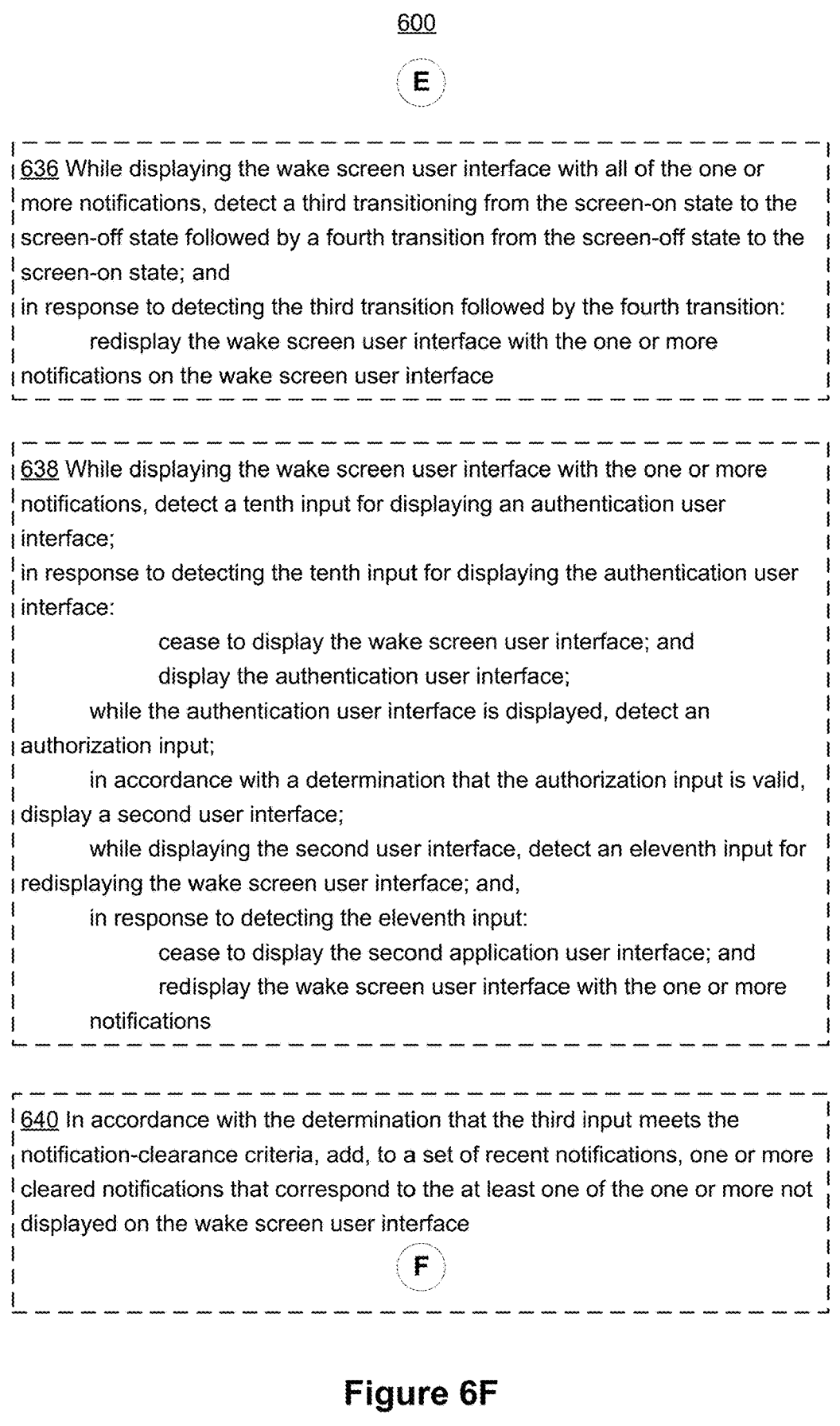

636 While displaying the wake screen user interface with all of the one or more notifications, detect a third transitioning from the screen-on state to the screen-off state followed by a fourth transition from the screen-off state to the screen-on state; and
in response to detecting the third transition followed by the fourth transition:
redisplay the wake screen user interface with the one or more notifications on the wake screen user interface 638 While displaying the wake screen user interface with the one or more notifications, detect a tenth input for displaying an authentication user interface;
in response to detecting the tenth input for displaying the authentication user interface:
cease to display the wake screen user interface; and
display the authentication user interface;
while the authentication user interface is displayed, detect an authorization input;
in accordance with a determination that the authorization input is valid, display a second user interface;
while displaying the second user interface, detect an eleventh input for redisplaying the wake screen user interface; and,
in response to detecting the eleventh input:
cease to display the second application user interface; and
redisplay the wake screen user interface with the one or more notifications 640 In accordance with the determination that the third input meets the notification-clearance criteria, add, to a set of recent notifications, one or more cleared notifications that correspond to the at least one of the one or more not displayed on the wake screen user interface

Figure 6G:
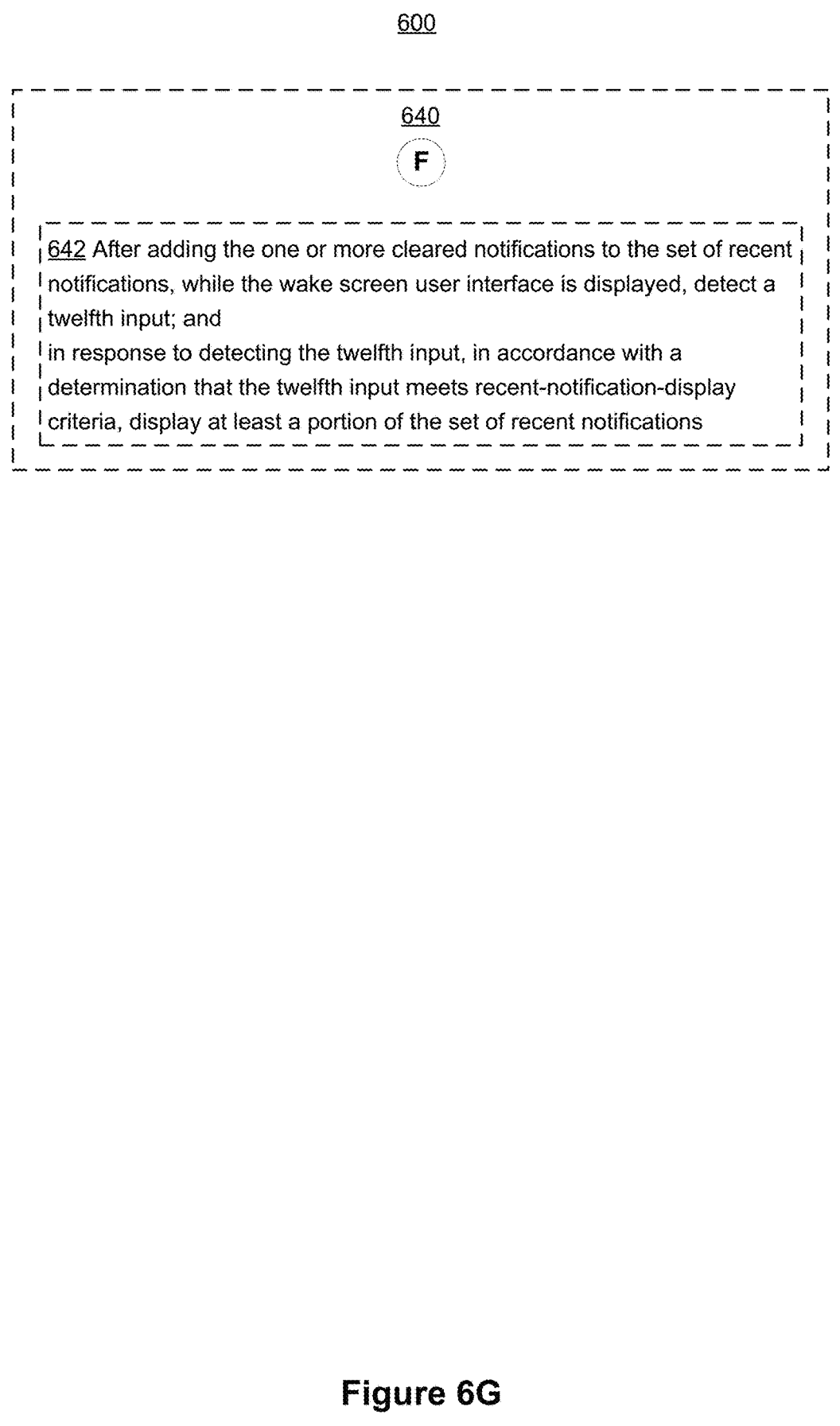

642 After adding the one or more cleared notifications to the set of recent notifications, while the wake screen user interface is displayed, detect a twelfth input; and
in response to detecting the twelfth input, in accordance with a determination that the twelfth input meets recent-notification-display criteria, display at least a portion of the set of recent notifications

Figure 7A:
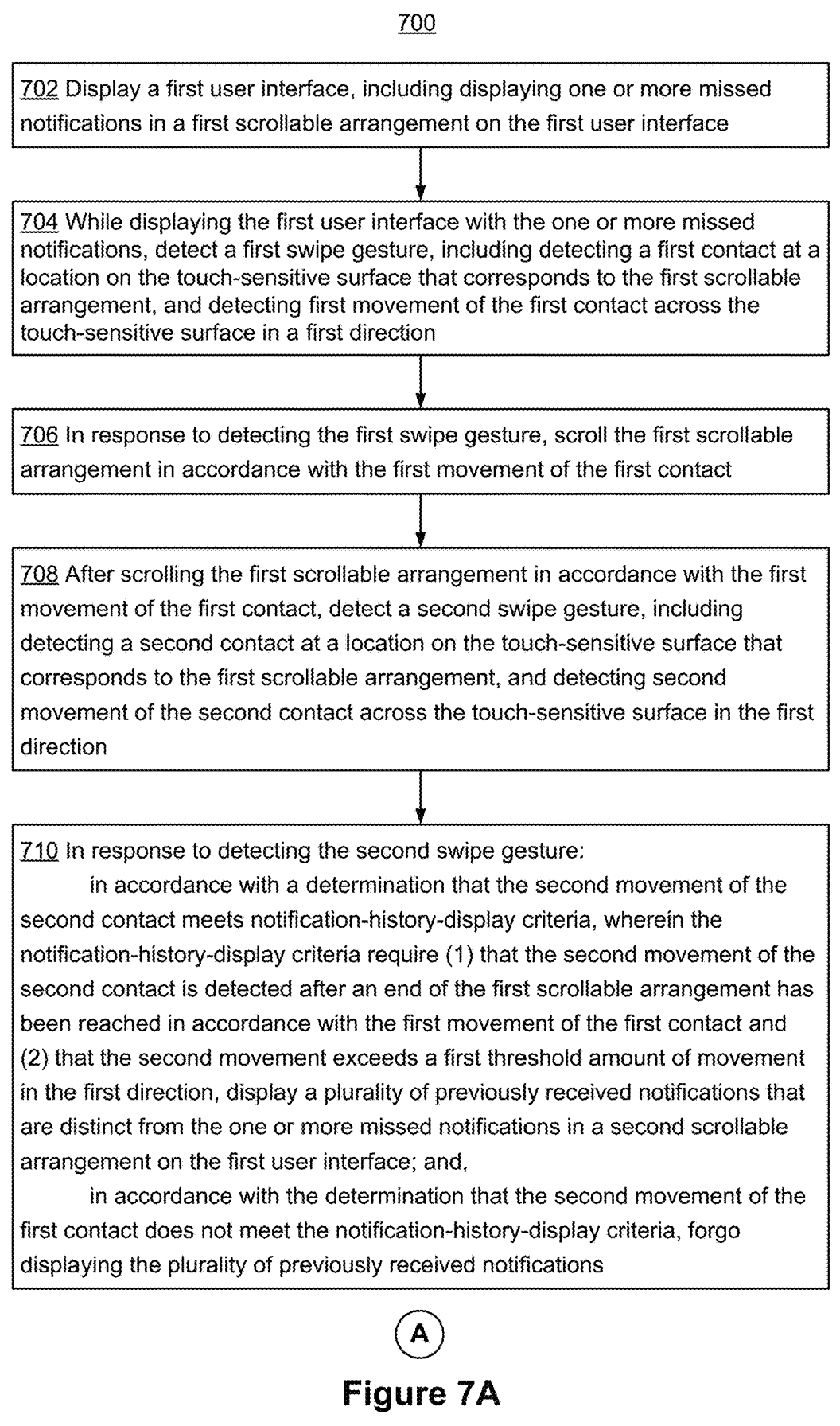

702 Display a first user interface, including displaying one or more missed notifications in a first scrollable arrangement on the first user interface 704 While displaying the first user interface with the one or more missed notifications, detect a first swipe gesture, including detecting a first contact at a location on the touch-sensitive surface that corresponds to the first scrollable arrangement, and detecting first movement of the first contact across the touch-sensitive surface in a first direction 706 In response to detecting the first swipe gesture, scroll the first scrollable arrangement in accordance with the first movement of the first contact 708 After scrolling the first scrollable arrangement in accordance with the first movement of the first contact, detect a second swipe gesture, including detecting a second contact at a location on the touch-sensitive surface that corresponds to the first scrollable arrangement, and detecting second movement of the second contact across the touch-sensitive surface in the first direction 710 In response to detecting the second swipe gesture:

in accordance with a determination that the second movement of the second contact meets notification-history-display criteria, wherein the notification-history-display criteria require (1) that the second movement of the second contact is detected after an end of the first scrollable arrangement has been reached in accordance with the first movement of the first contact and (2) that the second movement exceeds a first threshold amount of movement in the first direction, display a plurality of previously received notifications that are distinct from the one or more missed notifications in a second scrollable arrangement on the first user interface; and, in accordance with the determination that the second movement of the first contact does not meet the notification-history-display criteria, forgo displaying the plurality of previously received notifications

Figure 7B:
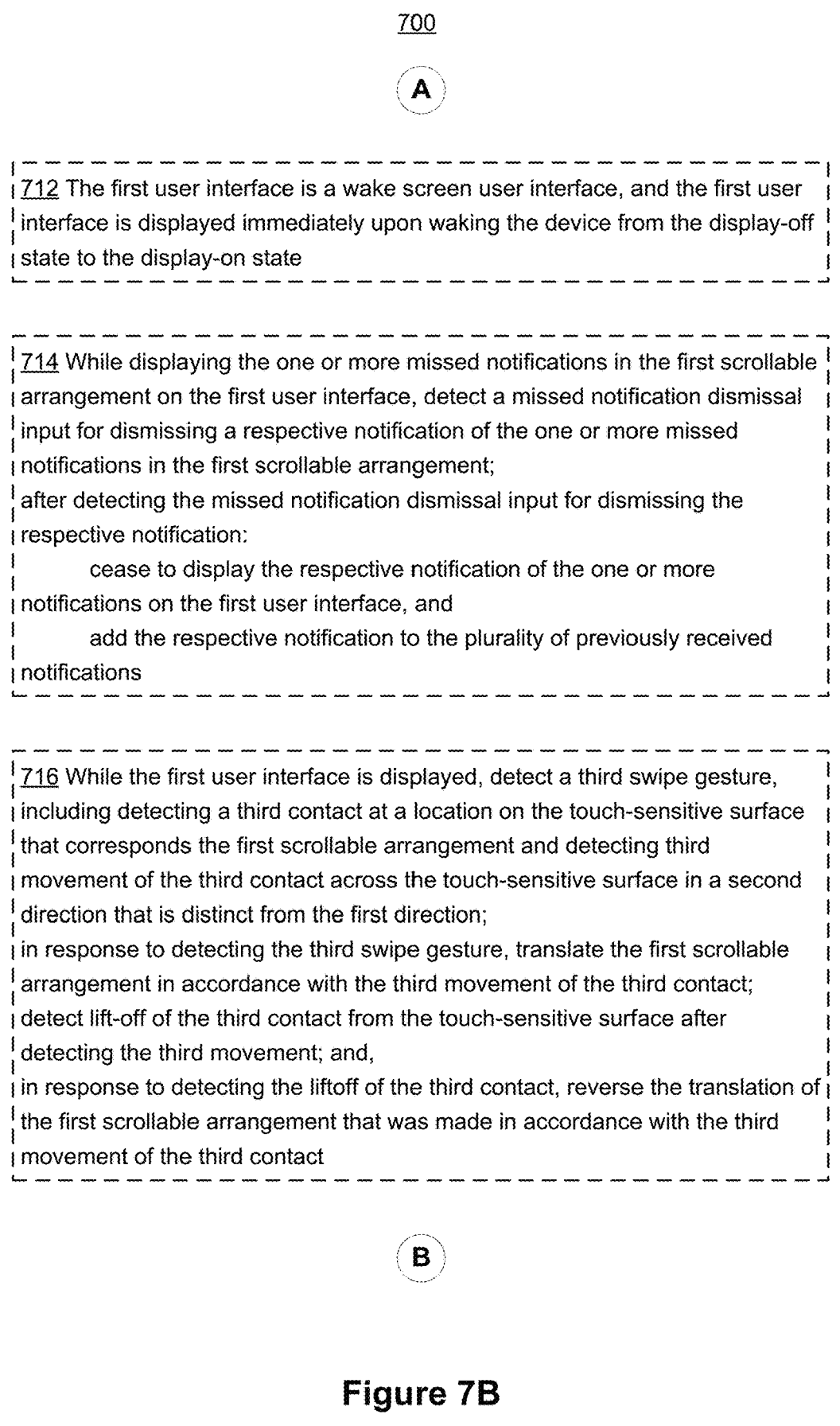

712 The first user interface is a wake screen user interface, and the first user interface is displayed immediately upon waking the device from the display-off state to the display-on state 714 While displaying the one or more missed notifications in the first scrollable arrangement on the first user interface, detect a missed notification dismissal input for dismissing a respective notification of the one or more missed notifications in the first scrollable arrangement;
after detecting the missed notification dismissal input for dismissing the respective notification:
cease to display the respective notification of the one or more notifications on the first user interface, and
add the respective notification to the plurality of previously received notifications 716 While the first user interface is displayed, detect a third swipe gesture, including detecting a third contact at a location on the touch-sensitive surface that corresponds the first scrollable arrangement and detecting third movement of the third contact across the touch-sensitive surface in a second direction that is distinct from the first direction;
in response to detecting the third swipe gesture, translate the first scrollable arrangement in accordance with the third movement of the third contact;
detect lift-off of the third contact from the touch-sensitive surface after detecting the third movement; and,
in response to detecting the liftoff of the third contact, reverse the translation of the first scrollable arrangement that was made in accordance with the third movement of the third contact

Figure 7C:
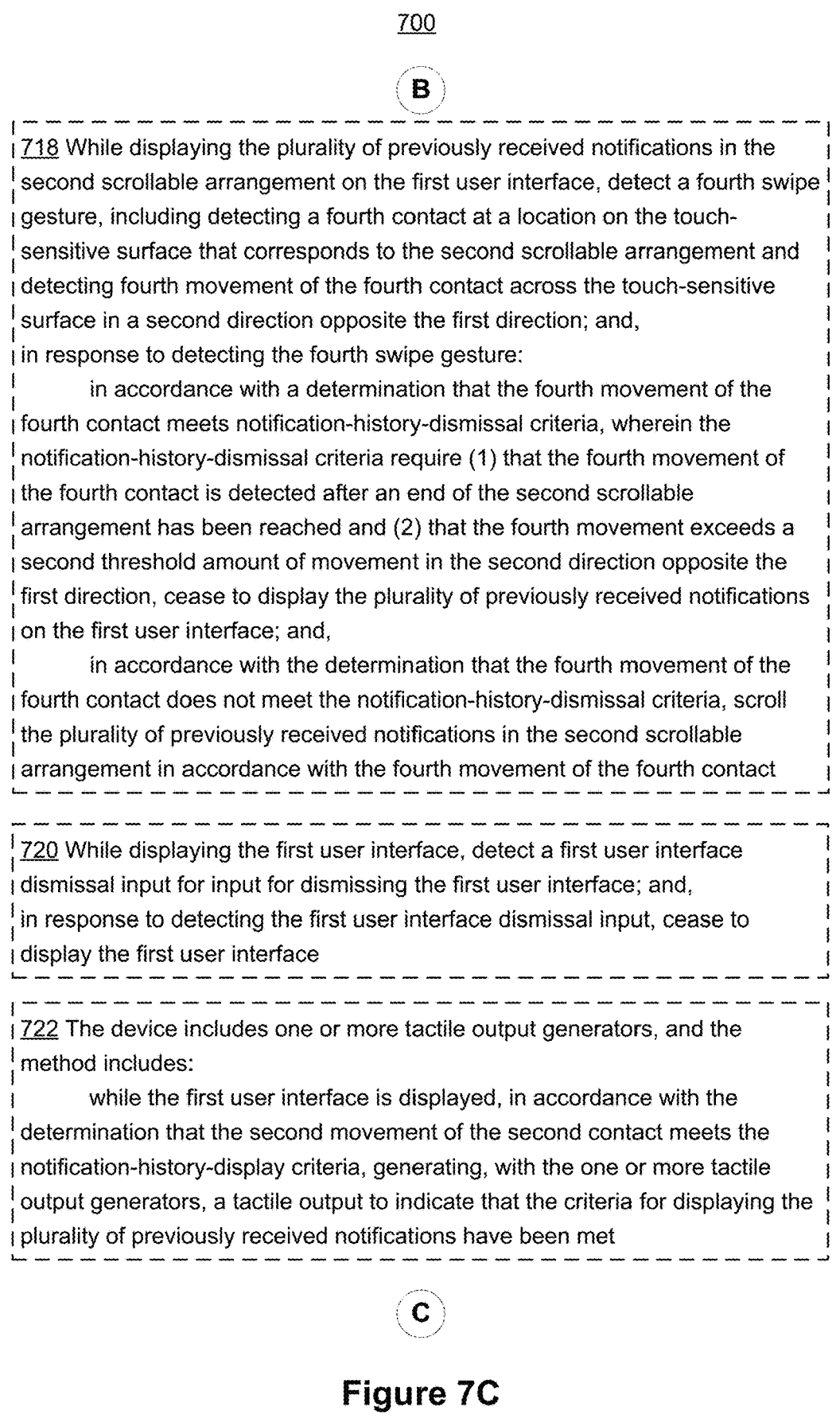

718 While displaying the plurality of previously received notifications in the second scrollable arrangement on the first user interface, detect a fourth swipe gesture, including detecting a fourth contact at a location on the touch-sensitive surface that corresponds to the second scrollable arrangement and detecting fourth movement of the fourth contact across the touch-sensitive surface in a second direction opposite the first direction; and,
in response to detecting the fourth swipe gesture:

in accordance with a determination that the fourth movement of the fourth contact meets notification-history-dismissal criteria, wherein the notification-history-dismissal criteria require (1) that the fourth movement of the fourth contact is detected after an end of the second scrollable arrangement has been reached and (2) that the fourth movement exceeds a second threshold amount of movement in the second direction opposite the first direction, cease to display the plurality of previously received notifications on the first user interface; and, in accordance with the determination that the fourth movement of the fourth contact does not meet the notification-history-dismissal criteria, scroll the plurality of previously received notifications in the second scrollable arrangement in accordance with the fourth movement of the fourth contact 720 While displaying the first user interface, detect a first user interface dismissal input for input for dismissing the first user interface; and,
in response to detecting the first user interface dismissal input, cease to display the first user interface 722 The device includes one or more tactile output generators, and the method includes:

while the first user interface is displayed, in accordance with the determination that the second movement of the second contact meets the notification-history-display criteria, generating, with the one or more tactile output generators, a tactile output to indicate that the criteria for displaying the plurality of previously received notifications have been met

Figure 7D:
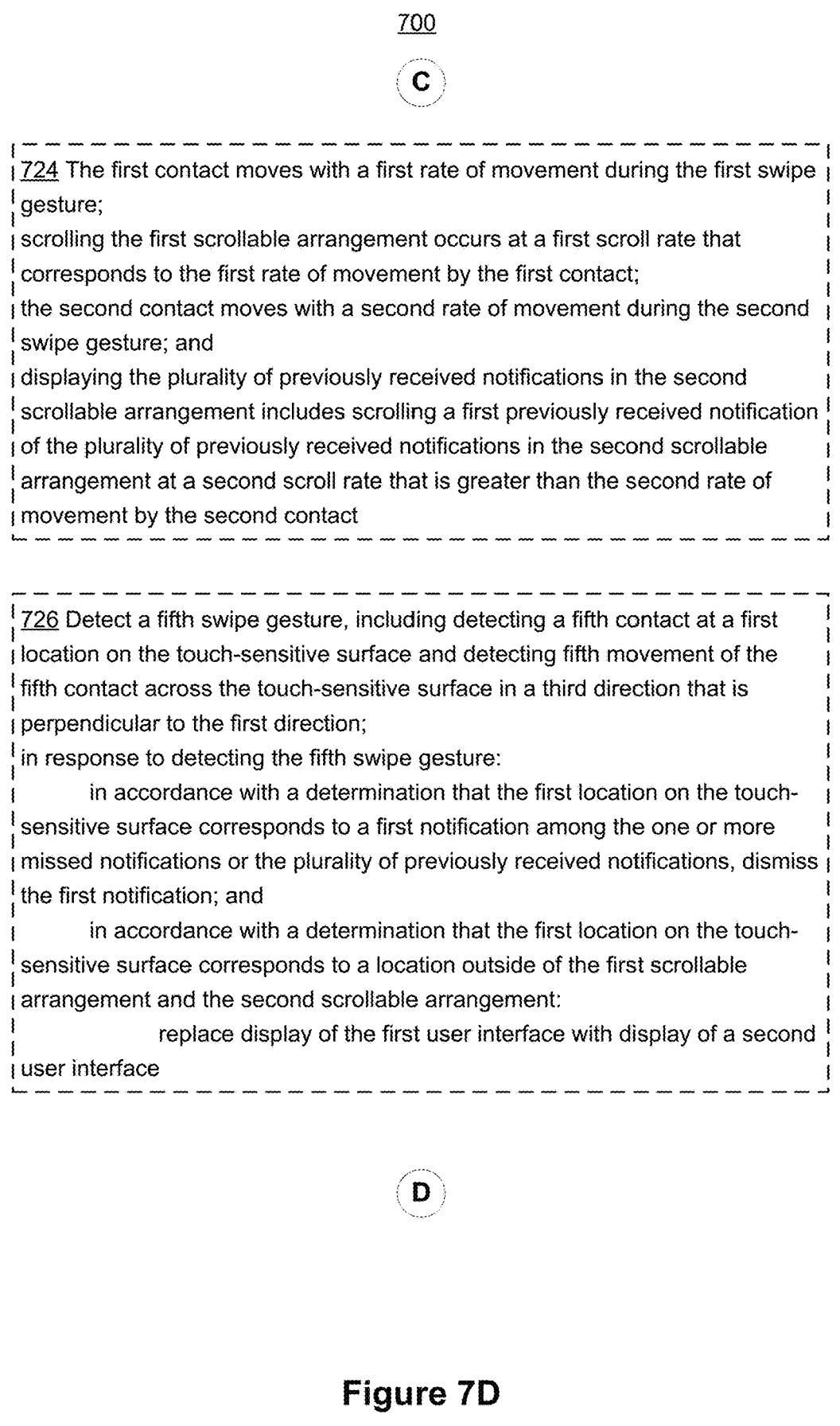

724 The first contact moves with a first rate of movement during the first swipe gesture;
scrolling the first scrollable arrangement occurs at a first scroll rate that corresponds to the first rate of movement by the first contact;
the second contact moves with a second rate of movement during the second swipe gesture; and
displaying the plurality of previously received notifications in the second scrollable arrangement includes scrolling a first previously received notification of the plurality of previously received notifications in the second scrollable arrangement at a second scroll rate that is greater than the second rate of movement by the second contact 726 Detect a fifth swipe gesture, including detecting a fifth contact at a first location on the touch-sensitive surface and detecting fifth movement of the fifth contact across the touch-sensitive surface in a third direction that is perpendicular to the first direction;
in response to detecting the fifth swipe gesture:
in accordance with a determination that the first location on the touch-sensitive surface corresponds to a first notification among the one or more missed notifications or the plurality of previously received notifications, dismiss the first notification; and
in accordance with a determination that the first location on the touch-sensitive surface corresponds to a location outside of the first scrollable arrangement and the second scrollable arrangement:
replace display of the first user interface with display of a second user interface

Figure 7E:
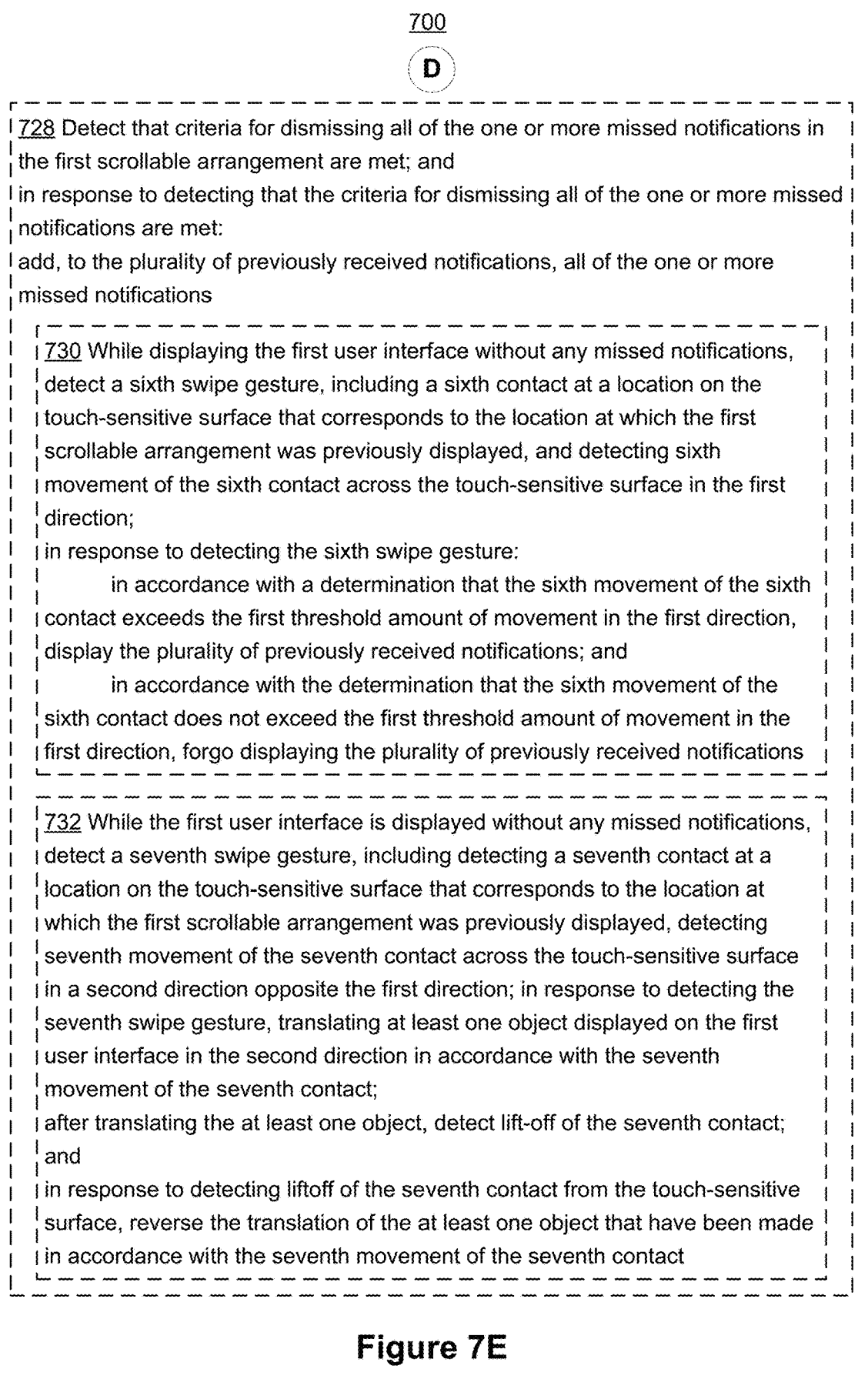

728 Detect that criteria for dismissing all of the one or more missed notifications in the first scrollable arrangement are met; and
in response to detecting that the criteria for dismissing all of the one or more missed notifications are met:
add, to the plurality of previously received notifications, all of the one or more missed notifications 730 While displaying the first user interface without any missed notifications, detect a sixth swipe gesture, including a sixth contact at a location on the touch-sensitive surface that corresponds to the location at which the first scrollable arrangement was previously displayed, and detecting sixth movement of the sixth contact across the touch-sensitive surface in the first direction;
in response to detecting the sixth swipe gesture:
in accordance with a determination that the sixth movement of the sixth contact exceeds the first threshold amount of movement in the first direction, display the plurality of previously received notifications; and
in accordance with the determination that the sixth movement of the sixth contact does not exceed the first threshold amount of movement in the first direction, forgo displaying the plurality of previously received notifications 732 While the first user interface is displayed without any missed notifications, detect a seventh swipe gesture, including detecting a seventh contact at a location on the touch-sensitive surface that corresponds to the location at which the first scrollable arrangement was previously displayed, detecting seventh movement of the seventh contact across the touch-sensitive surface in a second direction opposite the first direction; in response to detecting the seventh swipe gesture, translating at least one object displayed on the first user interface in the second direction in accordance with the seventh movement of the seventh contact;
after translating the at least one object, detect lift-off of the seventh contact; and
in response to detecting liftoff of the seventh contact from the touch-sensitive surface, reverse the translation of the at least one object that have been made in accordance with the seventh movement of the seventh contact

Figure 8A:
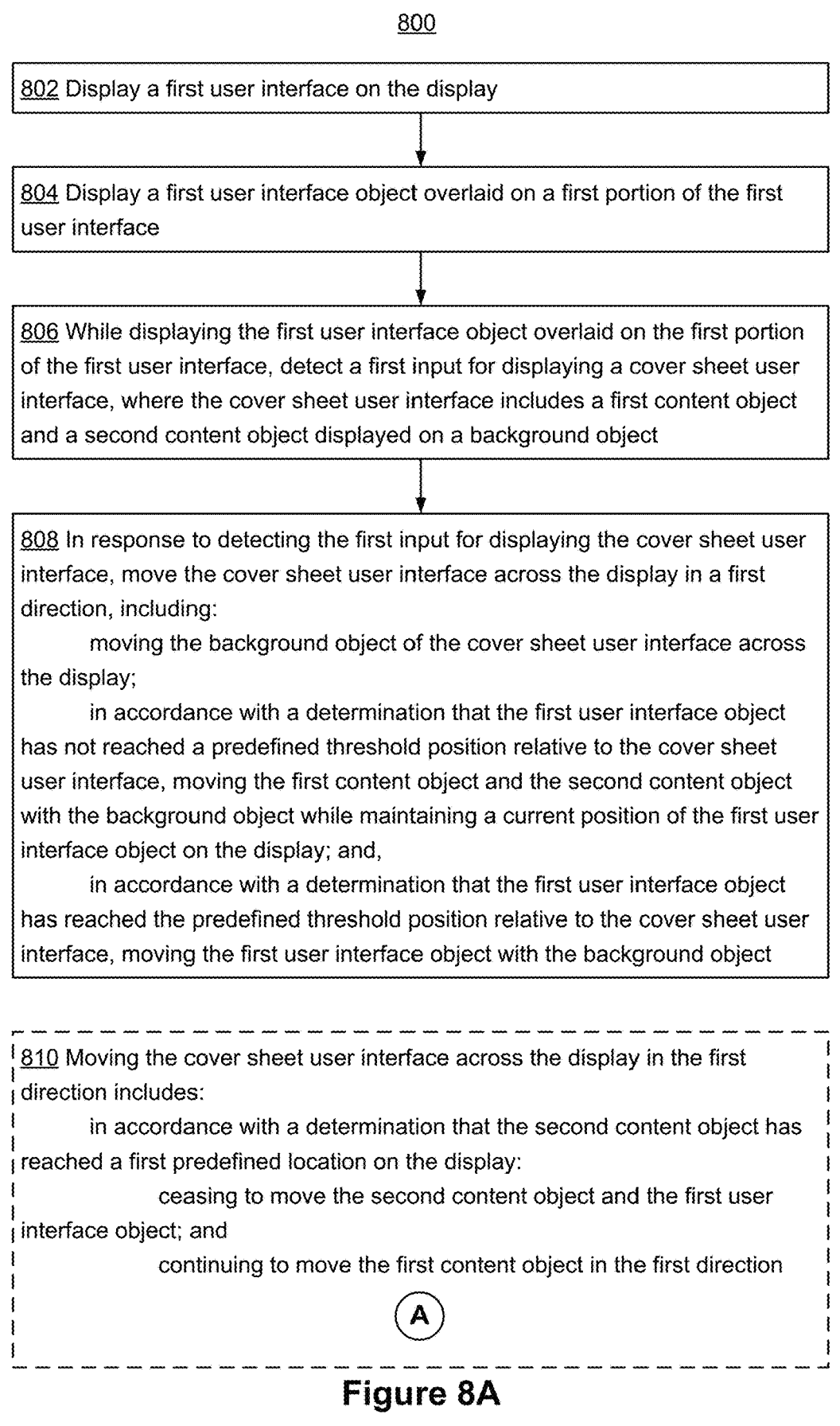

802 Display a first user interface on the display

804 Display a first user interface object overlaid on a first portion of the first user interface 806 While displaying the first user interface object overlaid on the first portion of the first user interface, detect a first input for displaying a cover sheet user interface, where the cover sheet user interface includes a first content object and a second content object displayed on a background object 808 In response to detecting the first input for displaying the cover sheet user interface, move the cover sheet user interface across the display in a first direction, including:

moving the background object of the cover sheet user interface across the display;

in accordance with a determination that the first user interface object has not reached a predefined threshold position relative to the cover sheet user interface, moving the first content object and the second content object with the background object while maintaining a current position of the first user interface object on the display; and, in accordance with a determination that the first user interface object has reached the predefined threshold position relative to the cover sheet user interface, moving the first user interface object with the background object 810 Moving the cover sheet user interface across the display in the first direction includes:

in accordance with a determination that the second content object has reached a first predefined location on the display:

ceasing to move the second content object and the first user interface object; and continuing to move the first content object in the first direction

Figure 8B:
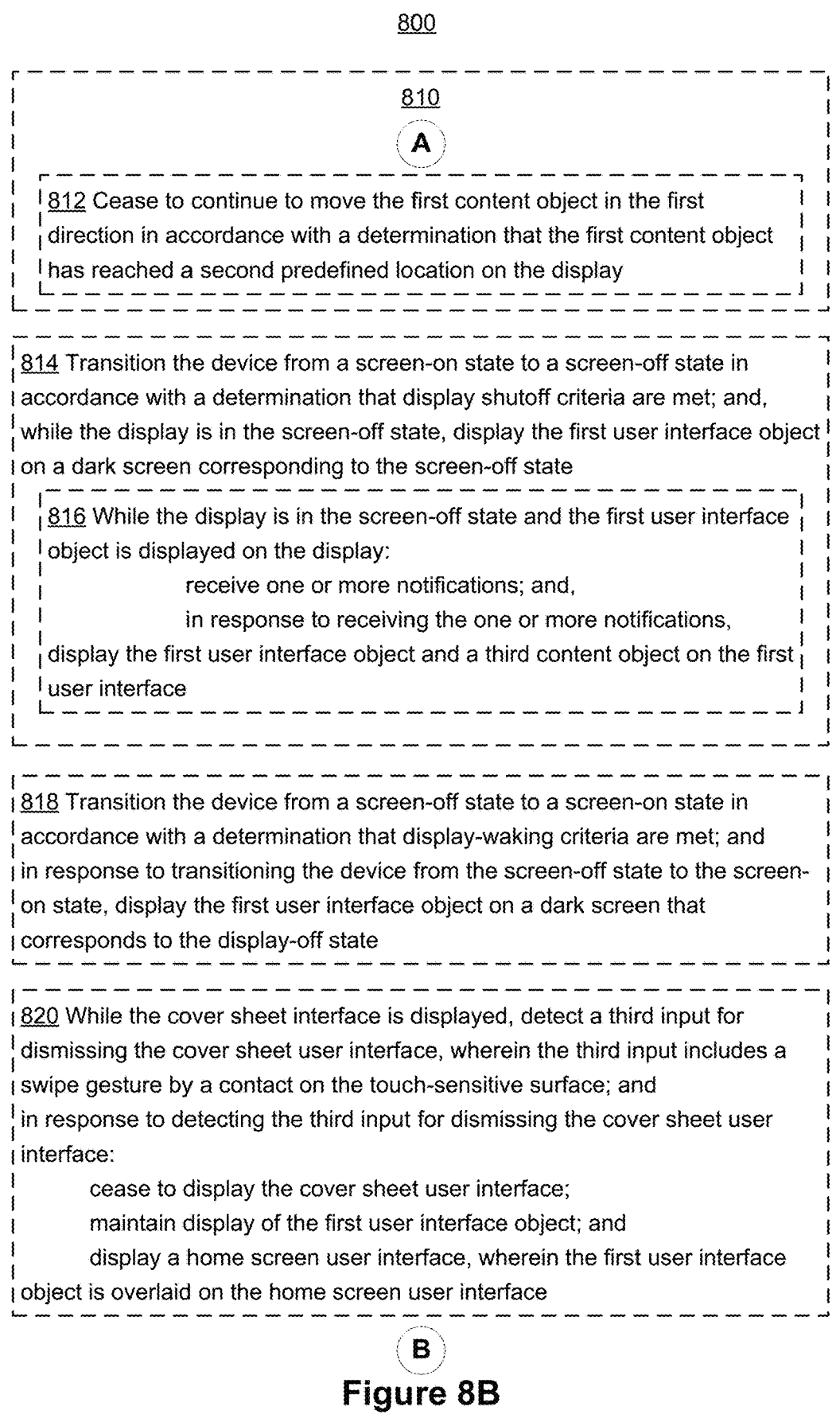

812 Cease to continue to move the first content object in the first direction in accordance with a determination that the first content object has reached a second predefined location on the display 814 Transition the device from a screen-on state to a screen-off state in accordance with a determination that display shutoff criteria are met; and, while the display is in the screen-off state, display the first user interface object on a dark screen corresponding to the screen-off state 816 While the display is in the screen-off state and the first user interface object is displayed on the display:
receive one or more notifications; and,
in response to receiving the one or more notifications, display the first user interface object and a third content object on the first user interface 818 Transition the device from a screen-off state to a screen-on state in accordance with a determination that display-waking criteria are met; and in response to transitioning the device from the screen-off state to the screen-on state, display the first user interface object on a dark screen that corresponds to the display-off state 820 While the cover sheet interface is displayed, detect a third input for dismissing the cover sheet user interface, wherein the third input includes a swipe gesture by a contact on the touch-sensitive surface; and
in response to detecting the third input for dismissing the cover sheet user interface:
cease to display the cover sheet user interface;
maintain display of the first user interface object; and
display a home screen user interface, wherein the first user interface object is overlaid on the home screen user interface (B)

Figure 8C:
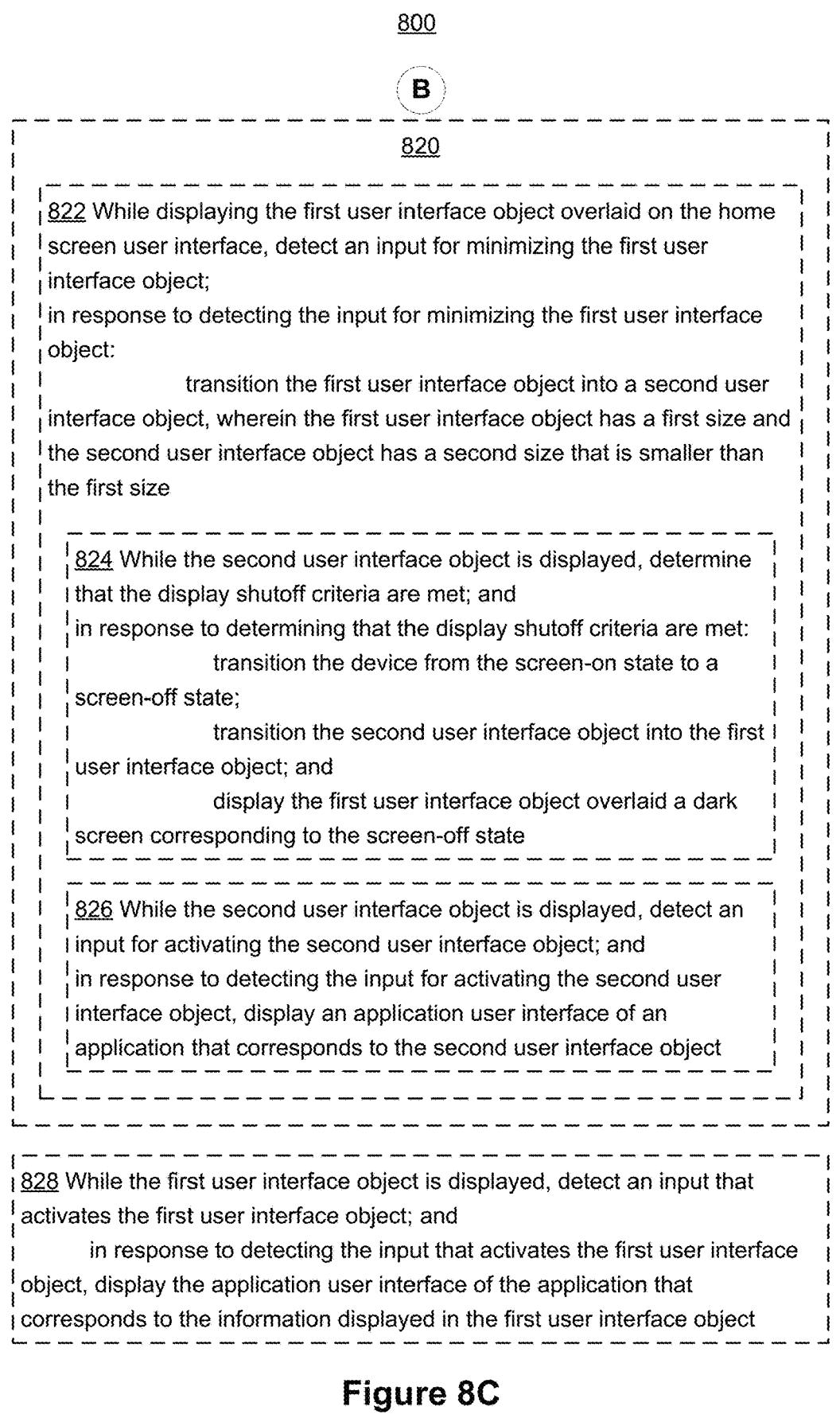

822 While displaying the first user interface object overlaid on the home screen user interface, detect an input for minimizing the first user interface object;
in response to detecting the input for minimizing the first user interface object:
transition the first user interface object into a second user interface object, wherein the first user interface object has a first size and the second user interface object has a second size that is smaller than the first size 824 While the second user interface object is displayed, determine that the display shutoff criteria are met; and
in response to determining that the display shutoff criteria are met:
transition the device from the screen-on state to a screen-off state;
transition the second user interface object into the first user interface object; and
display the first user interface object overlaid a dark screen corresponding to the screen-off state 826 While the second user interface object is displayed, detect an input for activating the second user interface object; and
in response to detecting the input for activating the second user interface object, display an application user interface of an application that corresponds to the second user interface object 828 While the first user interface object is displayed, detect an input that activates the first user interface object; and
in response to detecting the input that activates the first user interface object, display the application user interface of the application that corresponds to the information displayed in the first user interface object

Figure 9A:
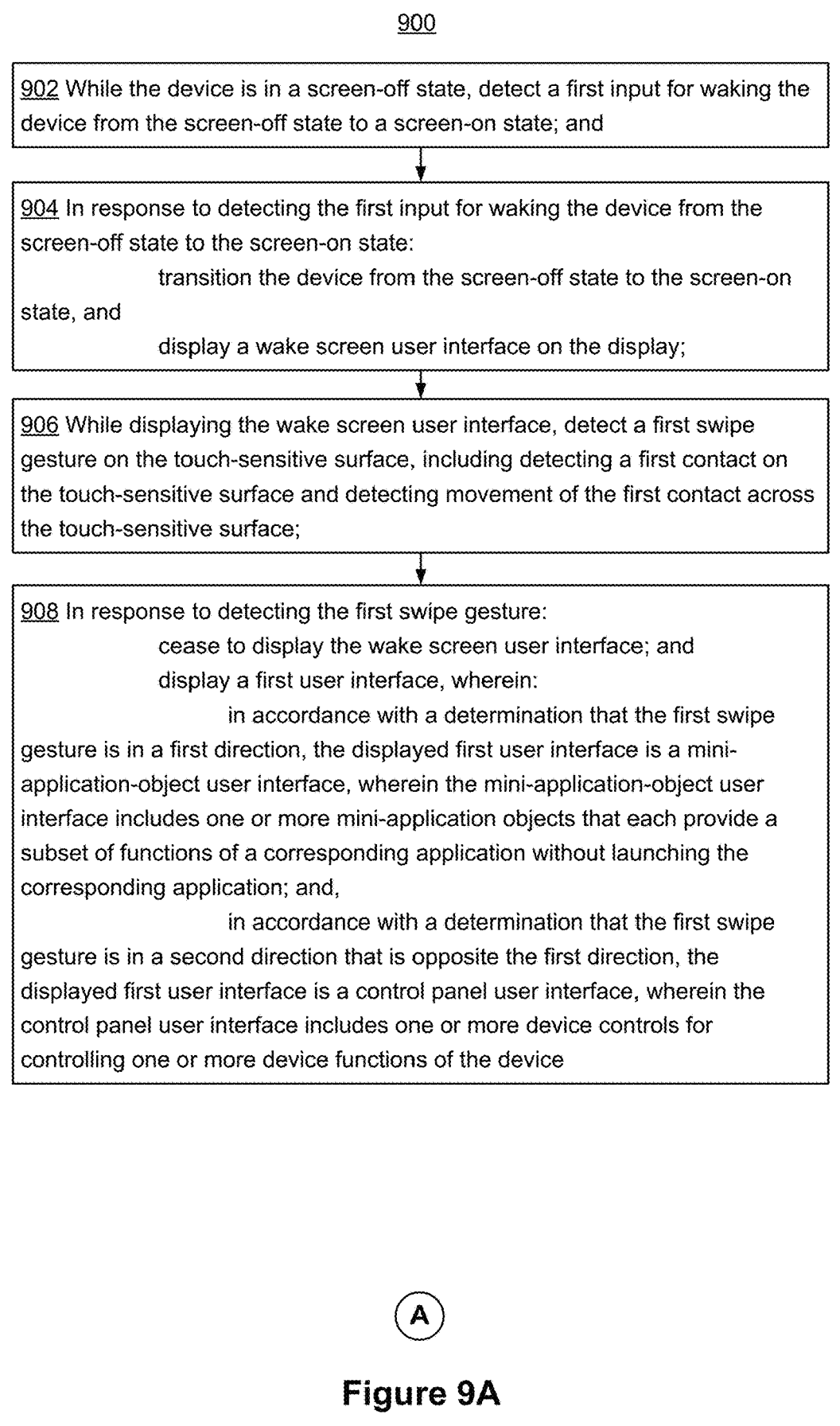

902 While the device is in a screen-off state, detect a first input for waking the device from the screen-off state to a screen-on state; and 904 In response to detecting the first input for waking the device from the screen-off state to the screen-on state:
transition the device from the screen-off state to the screen-on state, and
display a wake screen user interface on the display;

906 While displaying the wake screen user interface, detect a first swipe gesture on the touch-sensitive surface, including detecting a first contact on the touch-sensitive surface and detecting movement of the first contact across the touch-sensitive surface;

908 In response to detecting the first swipe gesture:
cease to display the wake screen user interface; and
display a first user interface, wherein:
in accordance with a determination that the first swipe gesture is in a first direction, the displayed first user interface is a mini-application-object user interface, wherein the mini-application-object user interface includes one or more mini-application objects that each provide a subset of functions of a corresponding application without launching the corresponding application; and,
in accordance with a determination that the first swipe gesture is in a second direction that is opposite the first direction, the displayed first user interface is a control panel user interface, wherein the control panel user interface includes one or more device controls for controlling one or more device functions of the device

Figure 9B:
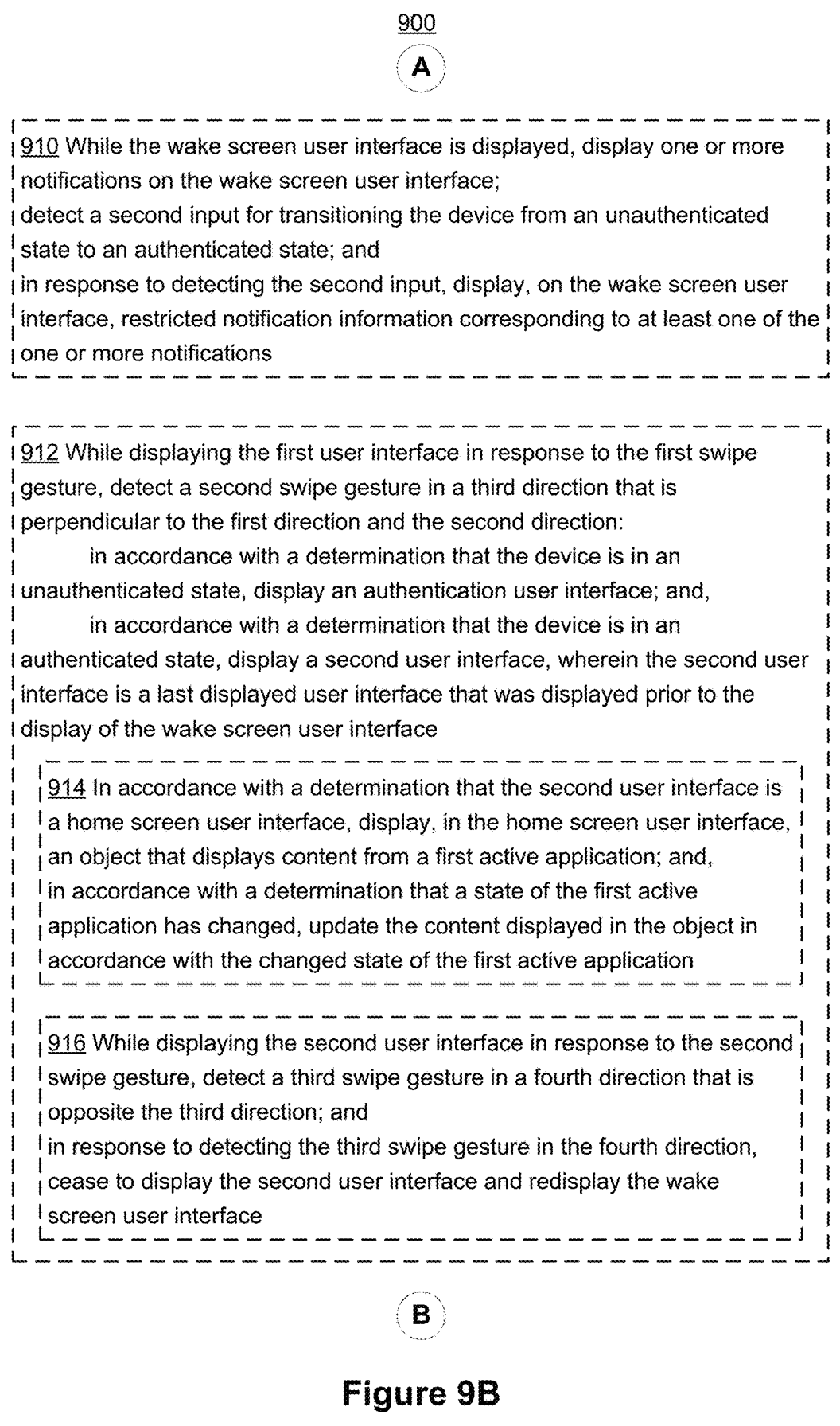

910 While the wake screen user interface is displayed, display one or more notifications on the wake screen user interface;
detect a second input for transitioning the device from an unauthenticated state to an authenticated state; and
in response to detecting the second input, display, on the wake screen user interface, restricted notification information corresponding to at least one of the one or more notifications 912 While displaying the first user interface in response to the first swipe gesture, detect a second swipe gesture in a third direction that is perpendicular to the first direction and the second direction:
in accordance with a determination that the device is in an unauthenticated state, display an authentication user interface; and,
in accordance with a determination that the device is in an authenticated state, display a second user interface, wherein the second user interface is a last displayed user interface that was displayed prior to the display of the wake screen user interface 914 In accordance with a determination that the second user interface is a home screen user interface, display, in the home screen user interface, an object that displays content from a first active application; and,
in accordance with a determination that a state of the first active application has changed, update the content displayed in the object in accordance with the changed state of the first active application 916 While displaying the second user interface in response to the second swipe gesture, detect a third swipe gesture in a fourth direction that is opposite the third direction; and
in response to detecting the third swipe gesture in the fourth direction, cease to display the second user interface and redisplay the wake screen user interface

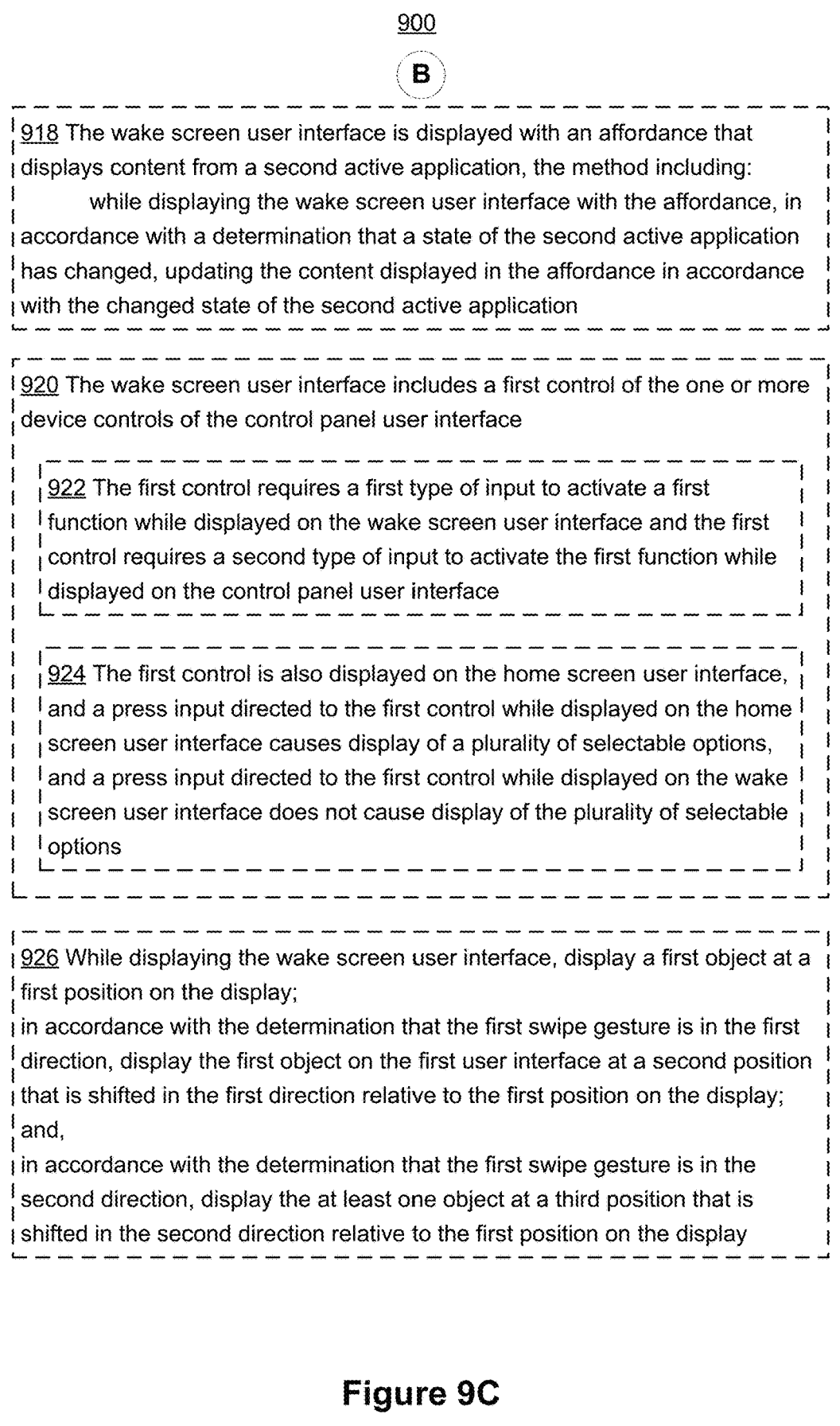

918 The wake screen user interface is displayed with an affordance that displays content from a second active application, the method including:
while displaying the wake screen user interface with the affordance, in accordance with a determination that a state of the second active application has changed, updating the content displayed in the affordance in accordance with the changed state of the second active application 920 The wake screen user interface includes a first control of the one or more device controls of the control panel user interface 922 The first control requires a first type of input to activate a first function while displayed on the wake screen user interface and the first control requires a second type of input to activate the first function while displayed on the control panel user interface 924 The first control is also displayed on the home screen user interface, and a press input directed to the first control while displayed on the home screen user interface causes display of a plurality of selectable options, and a press input directed to the first control while displayed on the wake screen user interface does not cause display of the plurality of selectable options 926 While displaying the wake screen user interface, display a first object at a first position on the display;
in accordance with the determination that the first swipe gesture is in the first direction, display the first object on the first user interface at a second position that is shifted in the first direction relative to the first position on the display; and,
in accordance with the determination that the first swipe gesture is in the second direction, display the at least one object at a third position that is shifted in the second direction relative to the first position on the display

Figure 9C

DEVICES, METHODS, AND GRAPHICAL USER INTERFACES FOR ACCESSING NOTIFICATIONS

RELATED APPLICATIONS

This application is a continuation of U.S. application Ser. No. 18/202,863, filed May 26, 2023, which is a continuation of U.S. patent application Ser. No. 18/099,839, filed Jan. 20, 2023, now U.S. Pat. No. 11,966,577, which is a continuation of U.S. application Ser. No. 17/852,235, filed Jun. 28, 2022, now U.S. Pat. No. 11,567,654, which is a continuation of U.S. application Ser. No. 17/458,201, filed Aug. 26, 2021, now U.S. Pat. No. 11,435,894, which is a continuation of U.S. application Ser. No. 16/915,971, filed Jun. 29, 2020, now U.S. Pat. No. 11,106,352, which is a continuation of U.S. application Ser. No. 16/354,012, filed Mar. 14, 2019, now U.S. Pat. No. 10,788,979, which is a continuation of U.S. application Ser. No. 15/715,005, filed Sep. 25, 2017, now U.S. Pat. No. 10,466,889, which claims priority to U.S. Provisional Application No. 62/507,181, filed May 16, 2017, which are hereby incorporated by reference in their entirety.

TECHNICAL FIELD

This relates generally to electronic devices with touch-sensitive surfaces, including but not limited to electronic devices with touch-sensitive surfaces that include user interfaces for displaying notifications.

BACKGROUND

The use of portable electronic devices has increased significantly in recent years, with many applications typically residing in the memory of such devices. Exemplary applications include messaging applications, calendar applications and social media applications. Electronic devices often receive communications for these applications, which contain information of importance to users. These electronic devices then often provide notifications that correspond to the received communications.

Exemplary communications include instant messages, calendar invitations, social media updates, microblog posts and news stories. Exemplary notifications associated with these communications may include digital images, video, text, icons, control elements (such as buttons) and/or other graphics to notify users of the receipt of these communications. Exemplary applications receiving communications and generating notifications include instant messaging applications (e.g., iMessage from Apple Inc. of Cupertino, California), calendar applications (e.g., iCal or Calendar from Apple Inc. of Cupertino, California), social networking applications, microblogging applications, and news applications.

But user interfaces for accessing notifications, and methods of navigating to and from such interfaces, are cumbersome and inefficient. For example, the notifications may be displayed in a confusing manner, and navigation to and from interfaces that contain notifications may also be confusing. These methods take longer than necessary, thereby wasting energy. This latter consideration is particularly important in battery-operated devices.

SUMMARY

Accordingly, there is a need for electronic devices with faster, more efficient methods and interfaces for accessing notifications. Such methods and interfaces optionally complement or replace conventional methods for accessing notifications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a device having a display and a touch-sensitive surface. The method includes: while the device is in a screen-off state, receiving one or more notifications; after receiving the one or more notifications, detecting a first input from a user for waking the device from the screen-off state to a screen-on state; in response to detecting the first input for waking the device from the screen-off state to the screen-on state: transitioning the device from the screen-off state to the screen-on state; displaying a wake screen user interface on the display; and displaying the one or more notifications on the wake screen user interface; while displaying the wake screen user interface and while at least one of the one or more notifications remains displayed on the wake screen user interface, detecting a second input for dismissing the wake screen user interface; in response to detecting the second input for dismissing the wake screen user interface, ceasing to display the wake screen user interface and the at least one of the one or more notifications; after ceasing to display the wake screen user interface and the at least one of the one or more notifications in response to the second input, detecting a third input for redisplaying the wake screen user interface; in response to detecting the third input for redisplaying the wake screen user interface: in accordance with a determination that the third input meets notification-clearance criteria, wherein the notification-clearance criteria require that the third input is detected at a time that is (1) after a respective notification of the one or more notifications has been cleared through direct user interaction with the respective notification or an application that corresponds to the respective notification and (2) after the device has transitioned from the screen-on state to the screen-off state at least once since the detection of the second input, redisplaying the wake screen user interface without displaying the at least one of the one or more notifications on the redisplayed wake screen user interface; and in accordance with a determination that the third input does not meet the notification-clearance criteria: redisplaying the wake screen user interface, and redisplaying the at least one of the one or more notifications on the redisplayed wake screen user interface.

In accordance with some embodiments, a method is performed at a device having a display and a touch-sensitive surface. The method includes: displaying a first user interface, including displaying one or more missed notifications in a first scrollable arrangement on the first user interface; while displaying the first user interface with the one or more missed notifications, detecting a first swipe gesture, including detecting a first contact at a location on the touch-sensitive surface that corresponds to the first scrollable arrangement, and detecting first movement of the first contact across the touch-sensitive surface in a first direction; in response to detecting the first swipe gesture, scrolling the first scrollable arrangement in accordance with the first movement of the first contact; after scrolling the first scrollable arrangement in accordance with the first movement of the first contact, detecting a second swipe gesture, including detecting a second contact at a location on the touch-sensitive surface that corresponds to the first scrollable arrangement, and detecting second movement of the second contact across the touch-sensitive surface in the first direction; in response to detecting the second swipe gesture: in accordance with a determination that the second movement of the second contact meets notification-history-display criteria, wherein the notification-history-display criteria require (1) that the second movement of the second contact is detected after an end of the first scrollable arrangement has been reached in accordance with the first movement of the first contact and (2) that the second movement exceeds a first threshold amount of movement in the first direction, displaying a plurality of previously received notifications that are distinct from the one or more missed notifications in a second scrollable arrangement on the first user interface; and, in accordance with the determination that the second movement of the first contact does not meet the notification-history-display criteria, forgoing displaying the plurality of previously received notifications.

In accordance with some embodiments, a method is performed at a device having a display and a touch-sensitive surface. The method includes: displaying a first user interface on the display; displaying a first user interface object overlaid on a first portion of the first user interface; while displaying the first user interface object overlaid on the first portion of the first user interface, detecting a first input for displaying a cover sheet user interface, where the cover sheet user interface includes a first content object and a second content object displayed on a background object; in response to detecting the first input for displaying the cover sheet user interface, moving the cover sheet user interface across the display in a first direction, including: moving the background object of the cover sheet user interface across the display; in accordance with a determination that the first user interface object has not reached a predefined threshold position relative to the cover sheet user interface, moving the first content object and the second content object with the background object while maintaining a current position of the first user interface object on the display; and, in accordance with a determination that the first user interface object has reached the predefined threshold position relative to the cover sheet user interface, moving the first user interface object with the background object.

In accordance with some embodiments, a method is performed at a device having a display and a touch-sensitive surface. The method includes: while the device is in a screen-off state, detecting a first input for waking the device from the screen-off state to a screen-on state; and in response to detecting the first input for waking the device from the screen-off state to the screen-on state: transitioning the device from the screen-off state to the screen-on state, and displaying a wake screen user interface on the display; while displaying the wake screen user interface, detecting a first swipe gesture on the touch-sensitive surface, including detecting a first contact on the touch-sensitive surface and detecting movement of the first contact across the touch-sensitive surface; in response to detecting the first swipe gesture: ceasing to display the wake screen user interface; and displaying a first user interface, wherein: in accordance with a determination that the first swipe gesture is in a first direction, the displayed first user interface is a mini-application-object user interface, wherein the mini-application-object user interface includes one or more mini-application objects that each provide a subset of functions of a corresponding application without launching the corresponding application; and, in accordance with a determination that the first swipe gesture is in a second direction that is opposite the first direction, the displayed first user interface is a control panel user interface, wherein the control panel user interface includes one or more device controls for controlling one or more device functions of the device.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, are provided with improved interfaces for accessing notifications and improved navigation to and from such interfaces, thereby increasing the effectiveness, efficiency, and user satisfaction with such devices. Such methods and interfaces may complement or replace conventional methods for providing accessing notifications.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5A4, 5B-5EB, 5EC1-5EC4, 5ED-5GF, and 5GH-5HR illustrate example user interfaces for providing access to notifications on a cover sheet user interface in accordance with some embodiments.

FIGS. 6A-6G are flow diagrams of a process for clearing sets of notifications, in accordance with some embodiments.

FIGS. 7A-7E are flow diagrams of a process for displaying notification history, in accordance with some embodiments.

FIGS. 8A-8C are flow diagrams of a process for displaying updating information from an application in a floating banner, in accordance with some embodiments.

FIGS. 9A-9C are flow diagrams of a process for navigation using a cover sheet, in accordance with some embodiments.

DESCRIPTION OF EMBODIMENTS

Figure 1A:
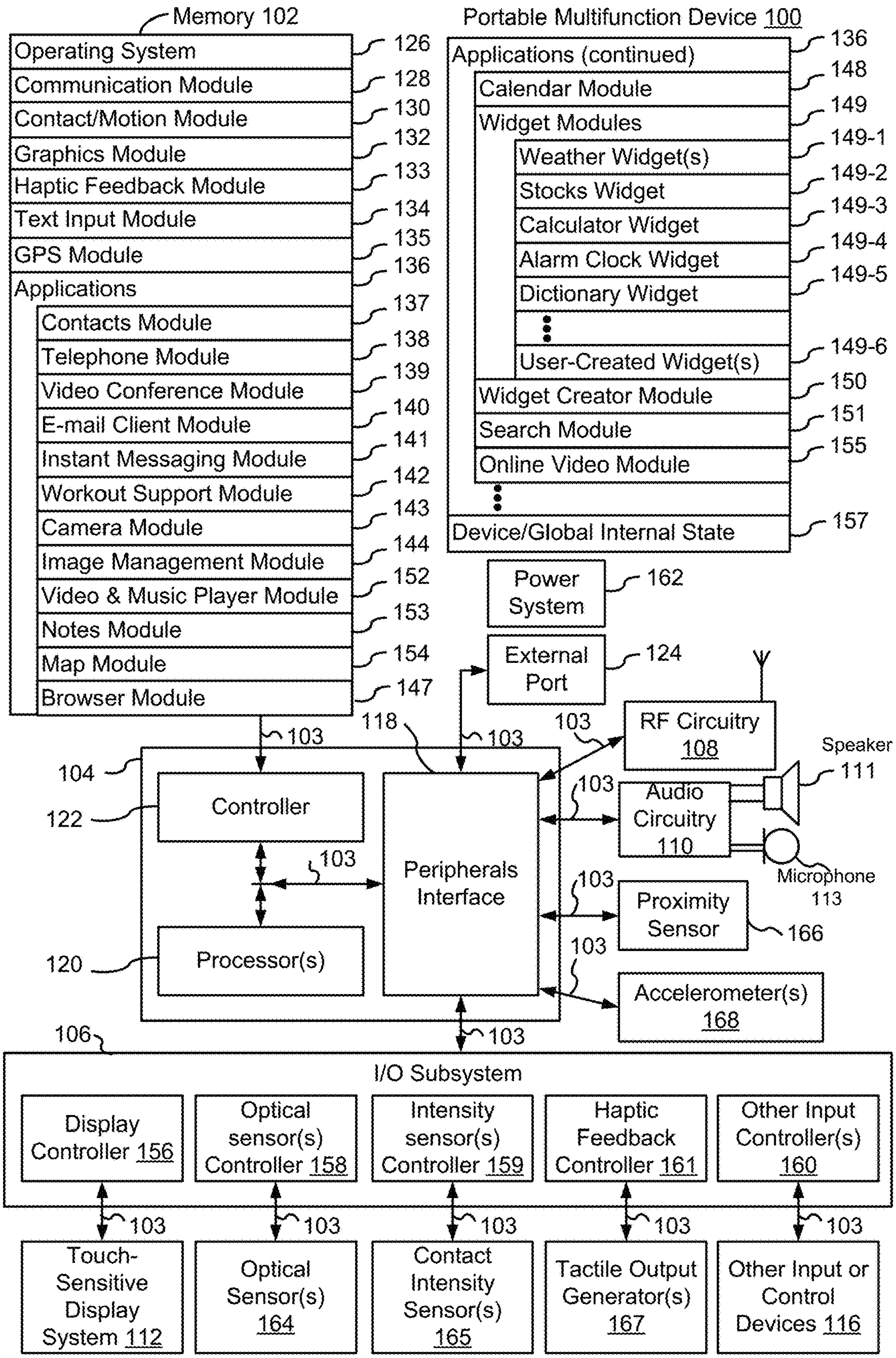
FIG. 1A is a block diagram illustrating a portable multifunction device with a touch-sensitive display, in accordance with some embodiments.

A number of different approaches for navigating to, displaying, and/or interacting with notification content and user interfaces that display notifications are described herein. Using one or more of these approaches (optionally in conjunction with each other) reduces the number, extent, and/or nature of the inputs from a user and provides a more efficient human-machine interface. For battery-operated devices, these improvements conserve power and increase the time between battery charges. These approaches describe improved methods for:

- clearing individual notifications and clearing sets of notifications;
- displaying notification history;
- displaying updating information from an application in a floating banner; and
- navigating from a user interface that displays notifications to adjacent user interfaces that display device controls and/or application controls.

The methods, devices, and GUIs described herein display notifications on a cover sheet to present recent information received and/or generated by applications installed on a device, which makes the user-device interface more efficient in multiple ways. For example, they provide more efficient ways to retain sets of notifications, clear sets of notifications, display missed notifications, display previously cleared notifications in a notification history, access information from an active mode of an application using a banner that is displayed in user interfaces other than the application user interface, and access additional user interfaces from a cover sheet user interface.

Below, FIGS. 1A-1B, 2, and 3 provide a description of example devices. FIGS. 4A-4B and 5A-5HR illustrate example user interfaces for providing access to notifications on a cover sheet user interface. FIGS. 6A-6G illustrate a flow diagram of a method of clearing notifications in accordance with some embodiments. FIGS. 7A-7E illustrate a flow diagram of a method of displaying notification history in accordance with some embodiments. FIGS. 8A-8C illustrate a flow diagram of a method of displaying updating information from an application in a floating banner in accordance with some embodiments. FIGS. 9A-9C illustrate a flow diagram of a method of navigation using a cover sheet in accordance with some embodiments. The user interfaces in FIGS. 5A-5HR are used to illustrate the processes in FIGS. 6A-6G, 7A-7E, 8A-8C, and 9A-9C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
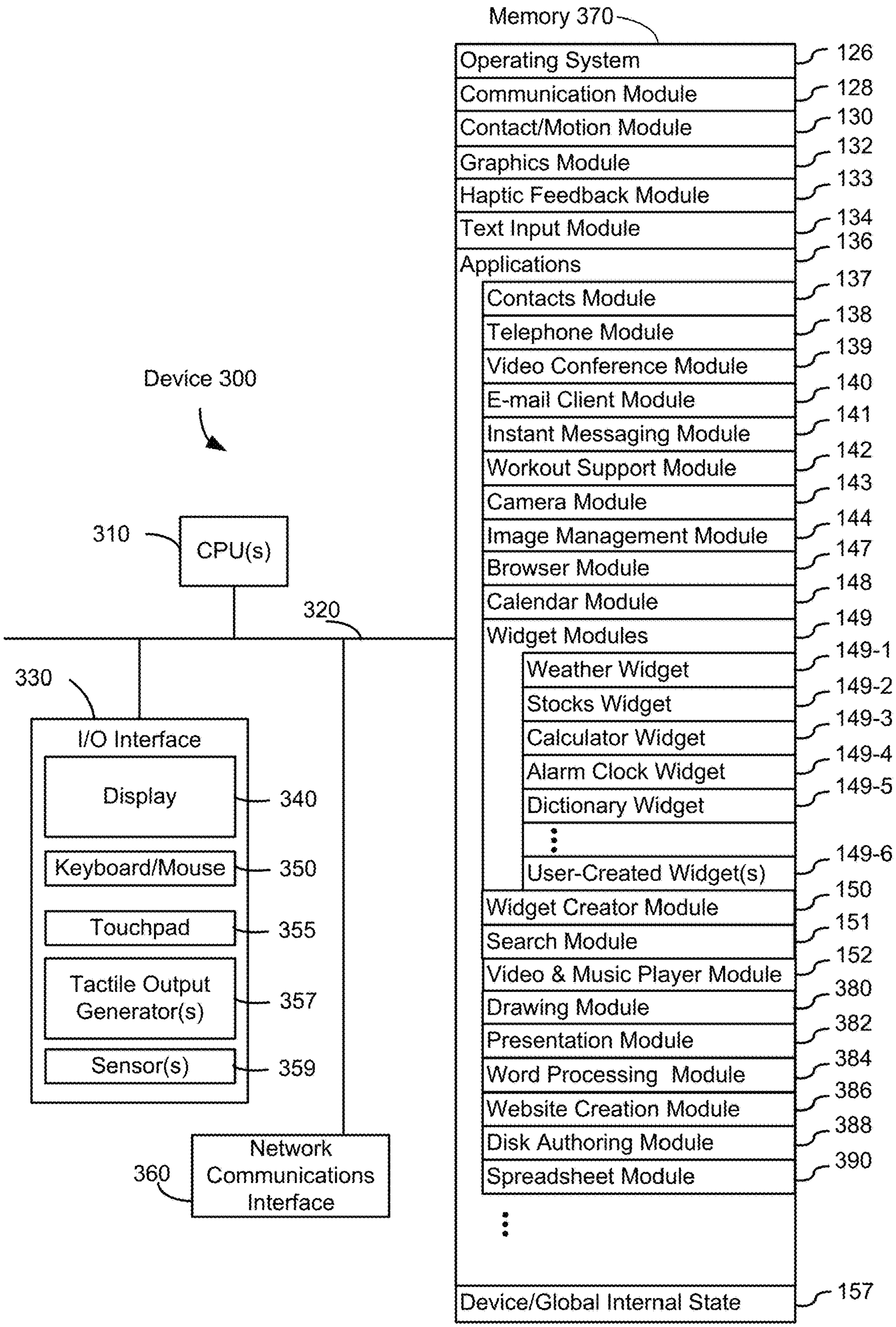
FIG. 3 is a block diagram of an example multifunction device with a display and a touch-sensitive surface, in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture-which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather mini applications, local yellow page mini applications, and map/navigation mini applications).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- mini application modules 149, which optionally include one or more of: weather mini application 149-1, stocks mini application 149-2, calculator mini application 149-3, alarm clock mini application 149-4, dictionary mini application 149-5, and other mini applications obtained by the user, as well as user-created mini applications 149-6;
- mini application creator module 150 for making user-created mini applications 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, mini application modules 149 are mini-applications that are, optionally, downloaded and used by a user (e.g., weather mini application 149-1, stocks mini application 149-2, calculator mini application 149-3, alarm clock mini application 149-4, and dictionary mini application 149-5) or created by the user (e.g., user-created mini application 149-6). In some embodiments, a mini application includes an HTML (Hypertext Markup Language) file, a CSS (Cascading Style Sheets) file, and a JavaScript file. In some embodiments, a mini application includes an XML (Extensible Markup Language) file and a JavaScript file (e.g., Yahoo! Mini applications).

In conjunction with RF circuitry 108, touch-sensitive display system 112, display system controller 156, contact module 130, graphics module 132, text input module 134, and browser module 147, the mini application creator module 150 includes executable instructions to create mini applications (e.g., turning a user-specified portion of a web page into a mini application).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
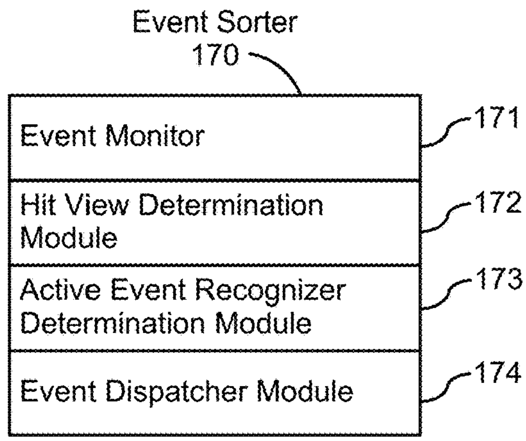
FIG. 1B is a block diagram illustrating example components for event handling, in accordance with some embodiments.
Figure 1B:
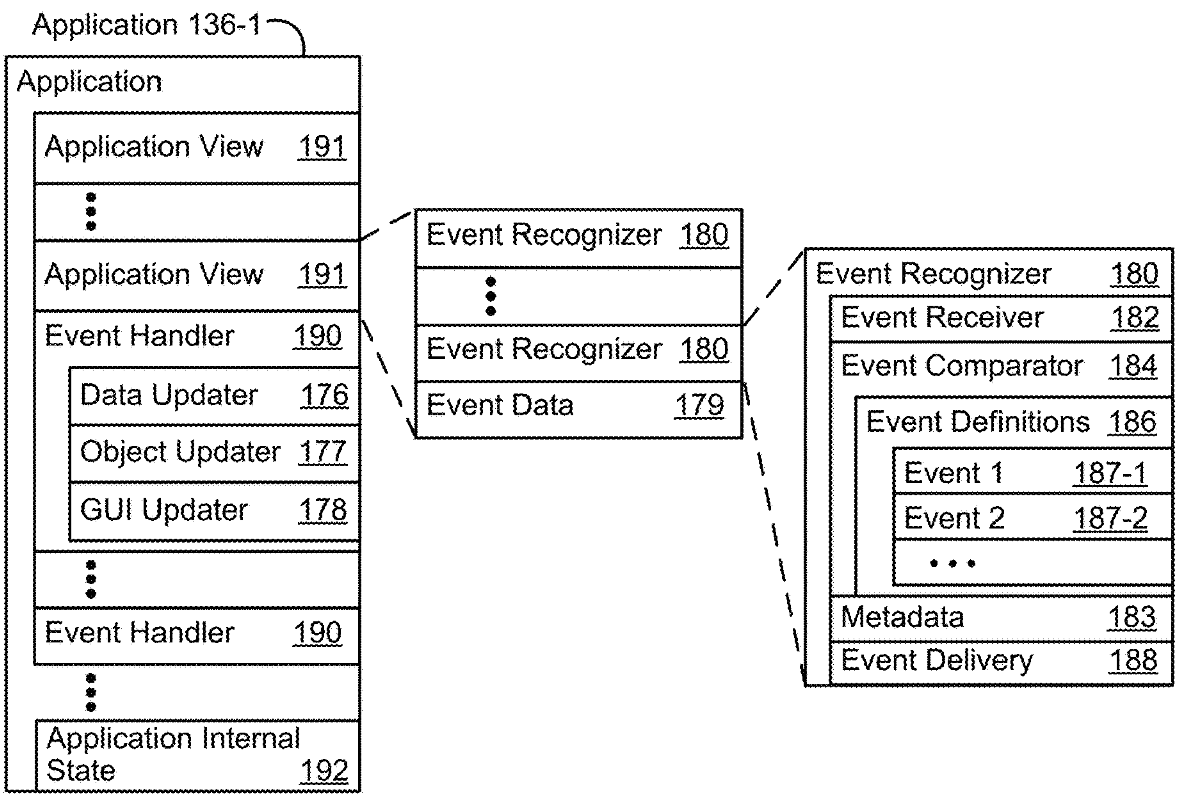

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
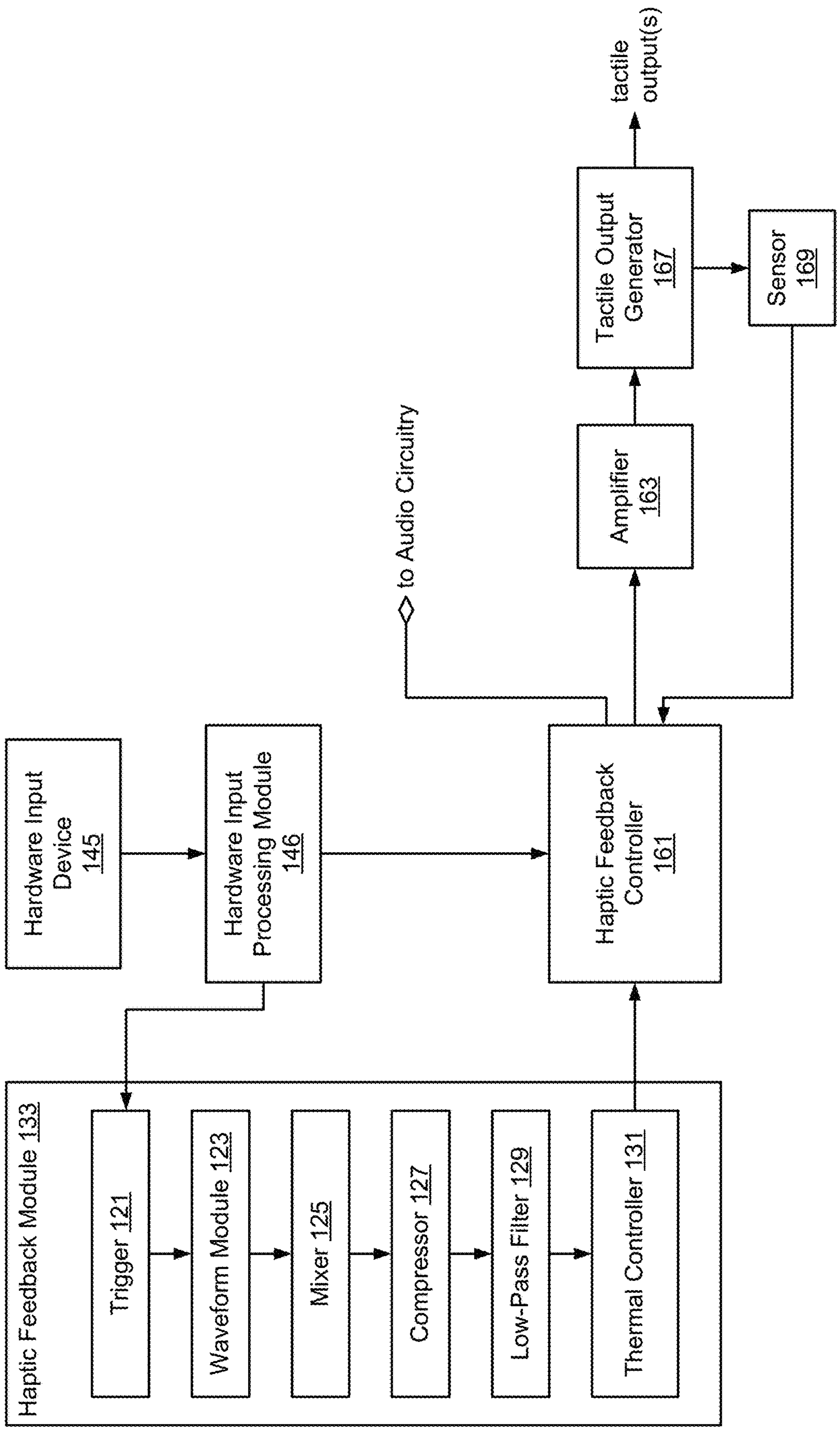
FIG. 1C is a block diagram illustrating a tactile output module, in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2:
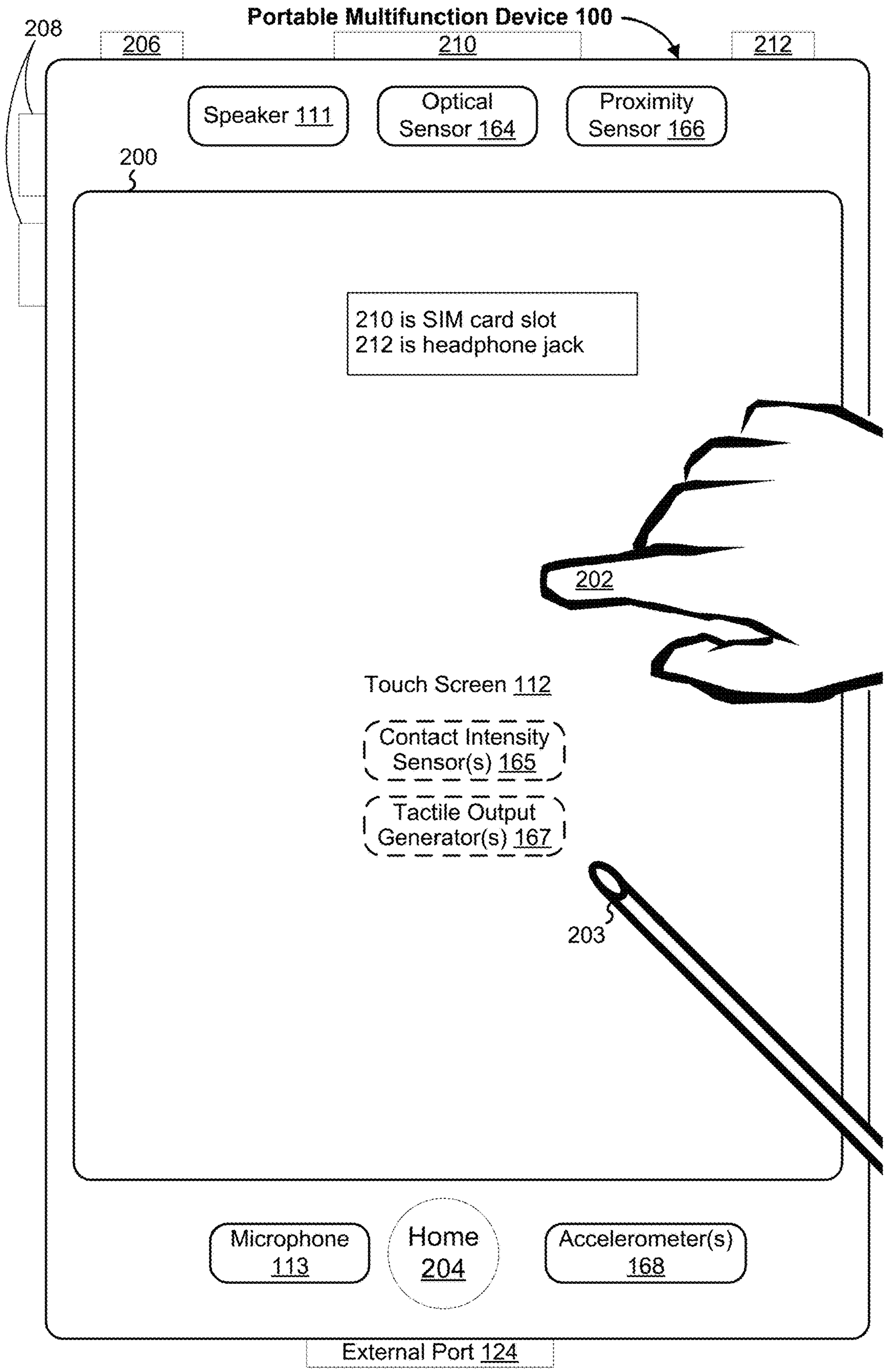
FIG. 2 illustrates a portable multifunction device having a touch screen, in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as “home” or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child’s learning toy), a gaming system, or a control device (e.g., a home or industrial controller). Device 300 typically includes one or more processing units (CPU’s) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces (“UI”) that are, optionally, implemented on portable multifunction device 100.

Figure 4A:
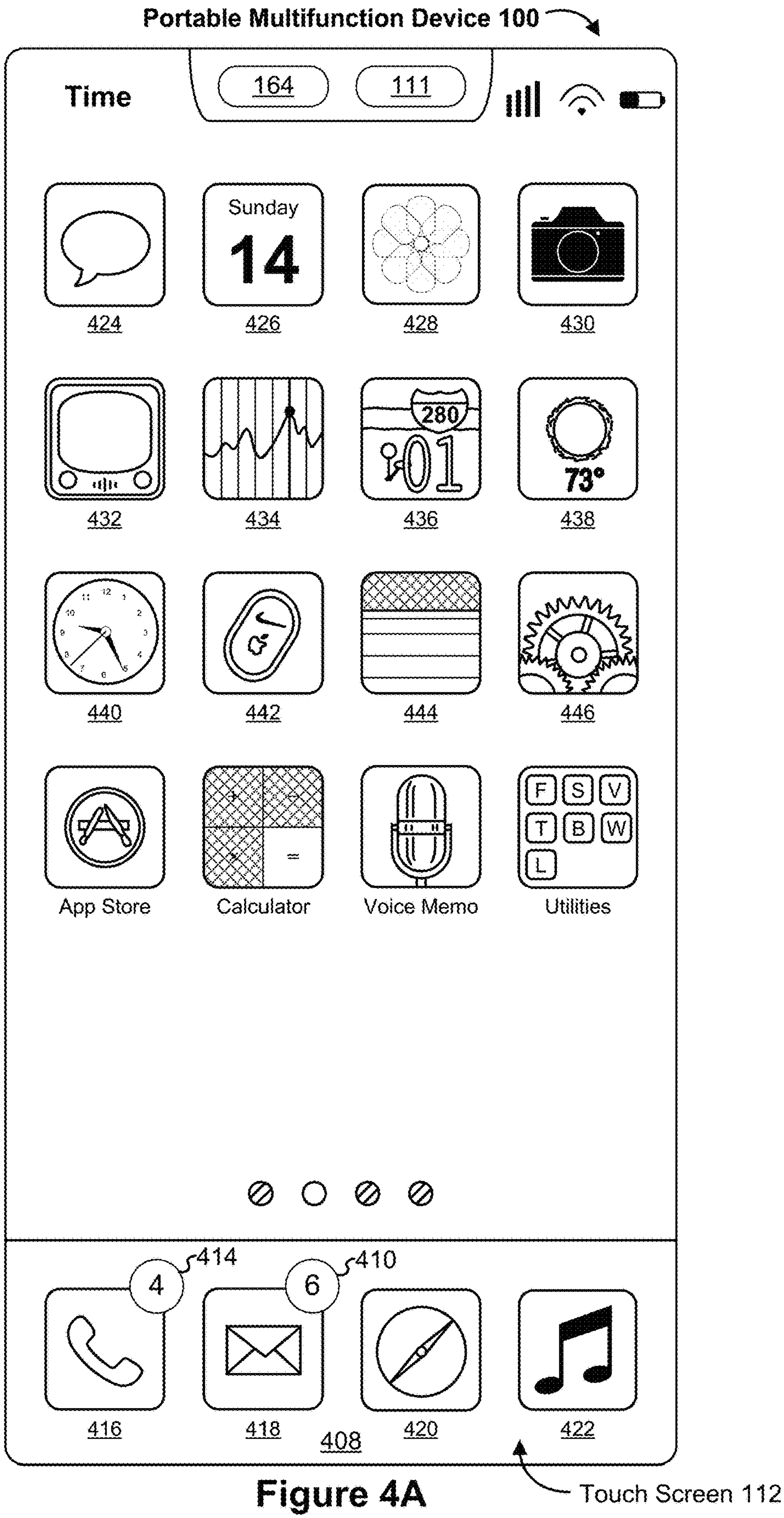
FIG. 4A illustrates an example user interface for a menu of applications on a portable multifunction device, in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled “Phone,” which optionally includes an indicator 414 of the number of missed calls or voicemail messages;
  - Icon 418 for e-mail client module 140, labeled “Mail,” which optionally includes an indicator 410 of the number of unread e-mails;
  - Icon 420 for browser module 147, labeled “Browser;” and
  - Icon 422 for video and music player module 152, labeled “Music;” and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks mini application 149-2, labeled "Stocks;"

Icon 436 for map module 154, labeled "Maps;"

Icon 438 for weather mini application 149-1, labeled "Weather;"

Icon 440 for alarm clock mini application 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
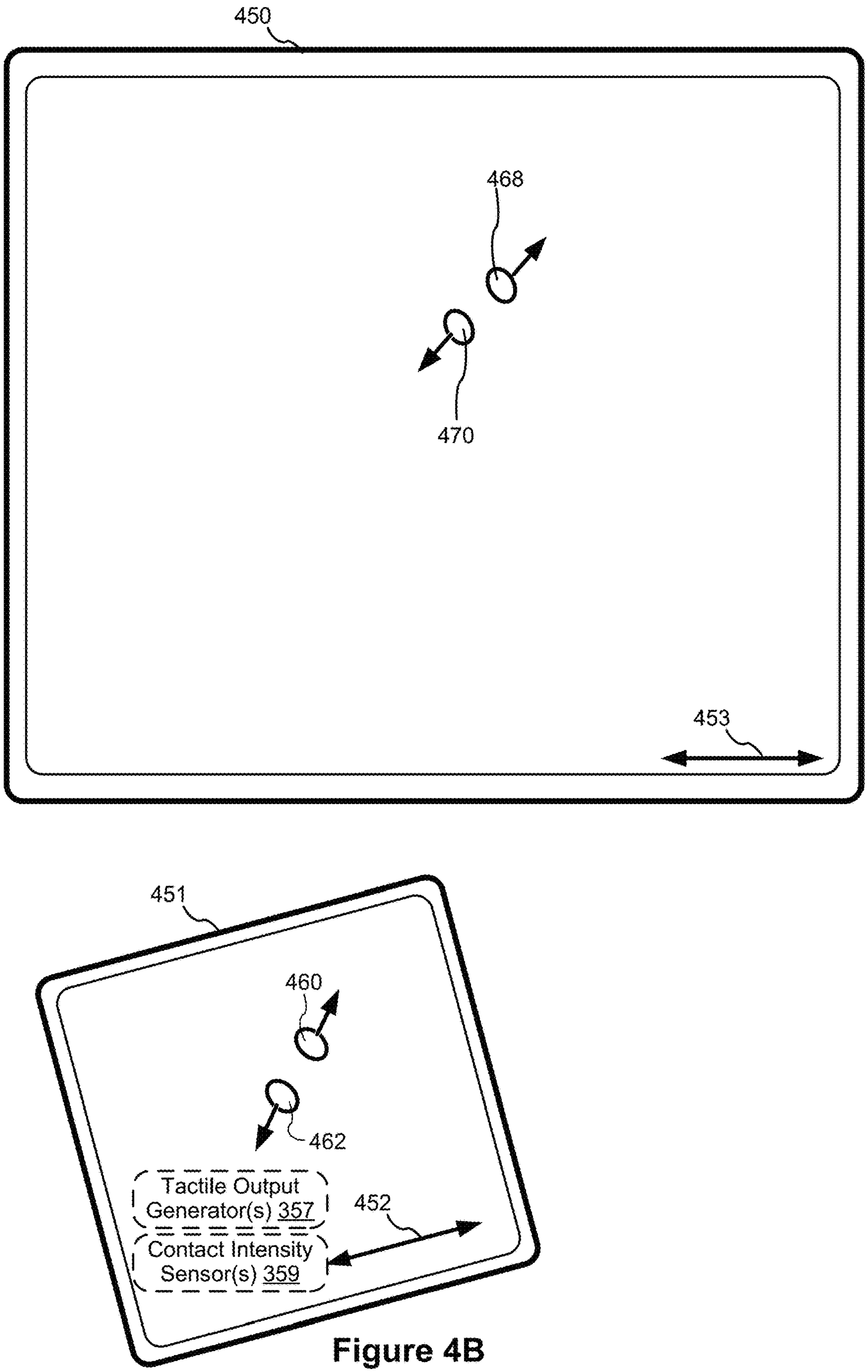
FIG. 4B illustrates an example user interface for a multifunction device with a touch-sensitive surface that is separate from the display, in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
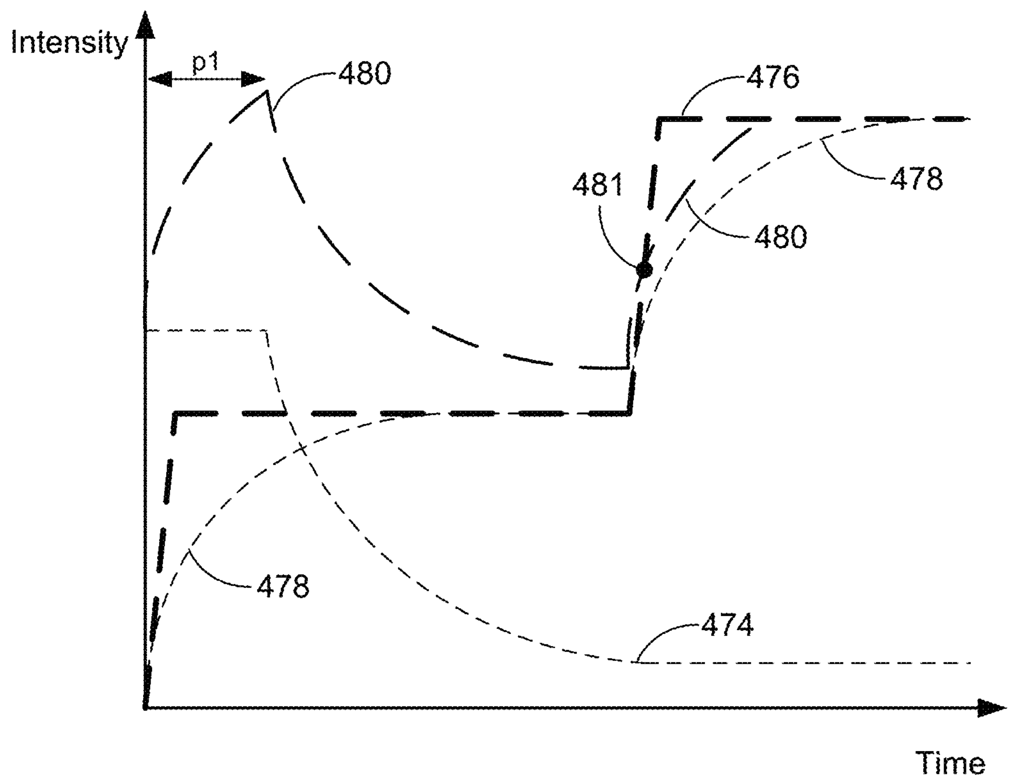
FIGS. 4C-4E illustrate examples of dynamic intensity thresholds, in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
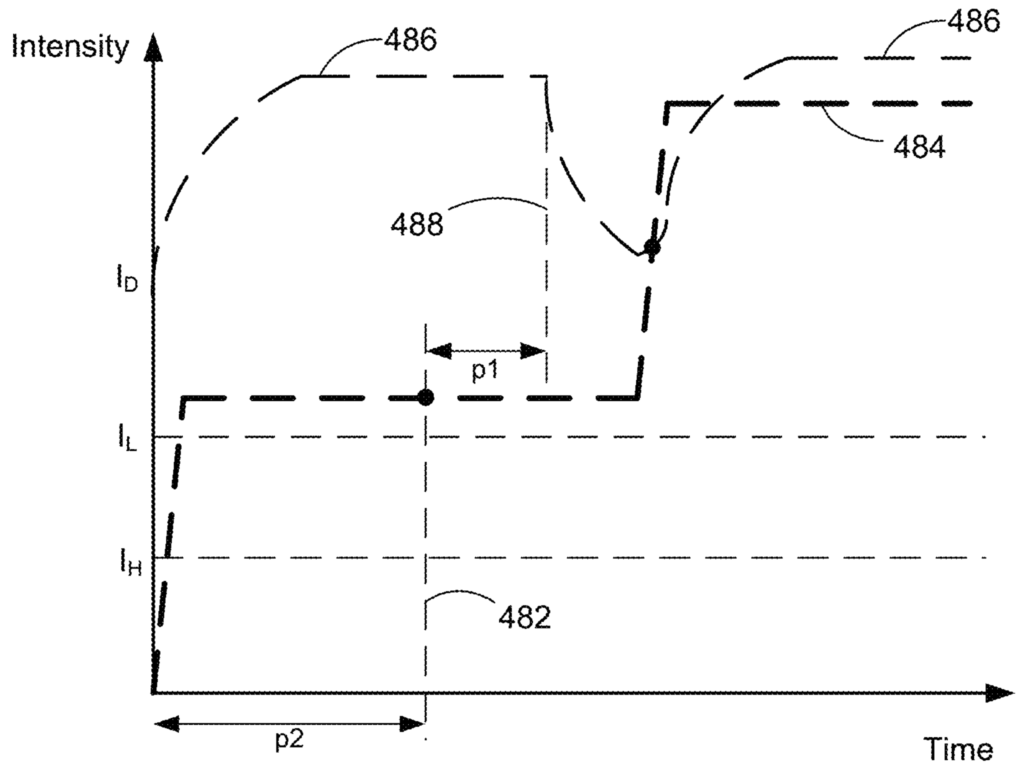

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
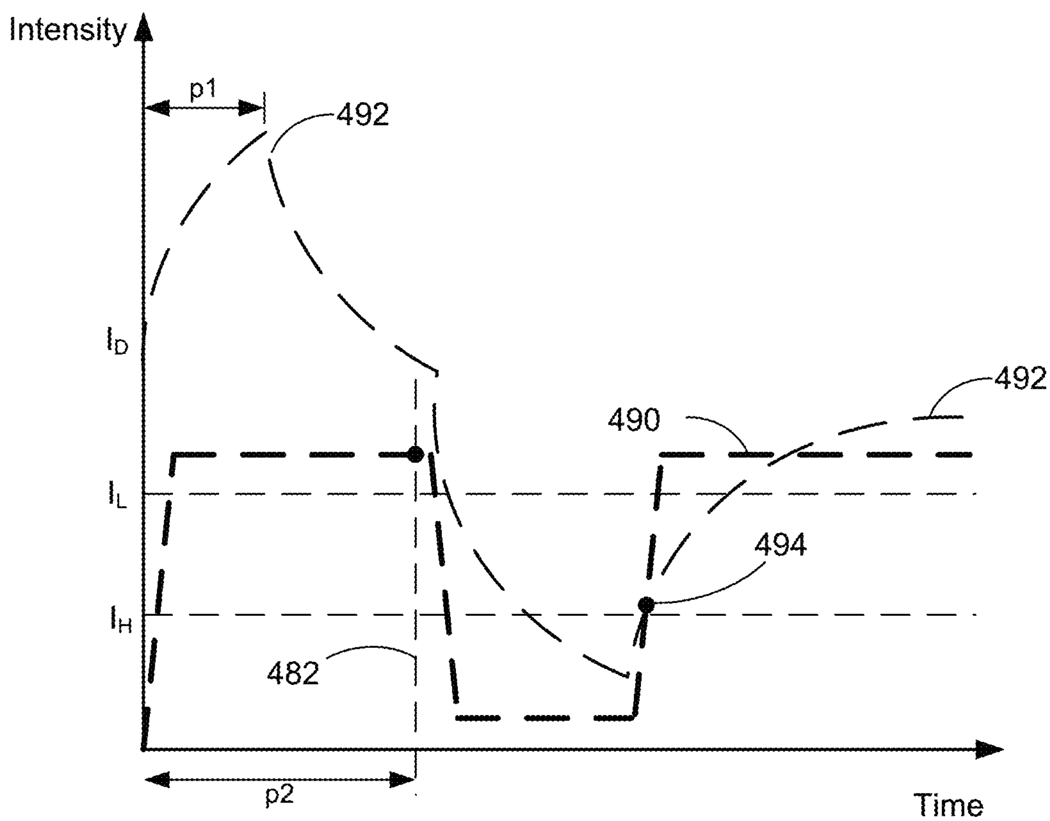

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

Figure 5B:
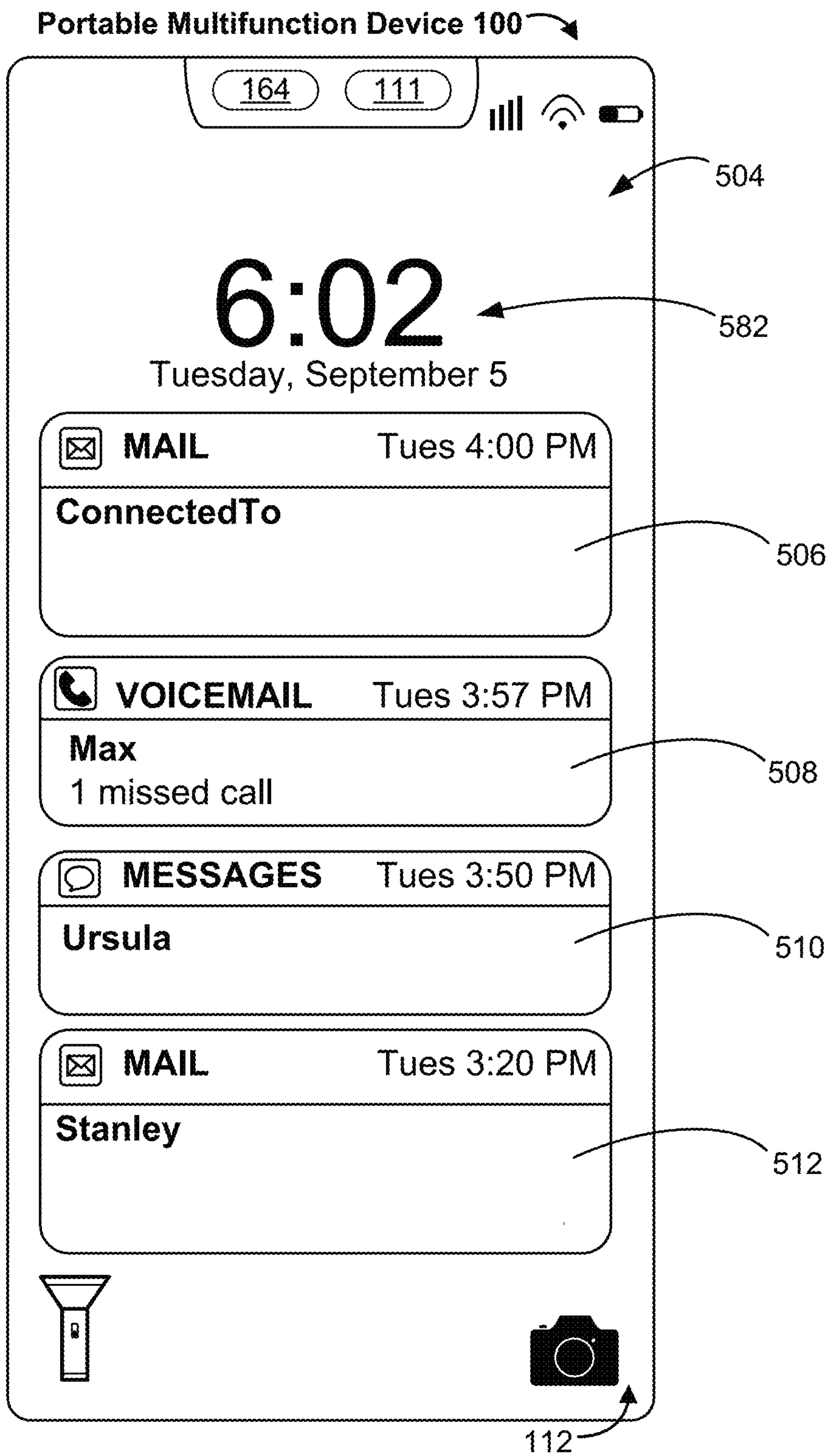
Figure 5C:
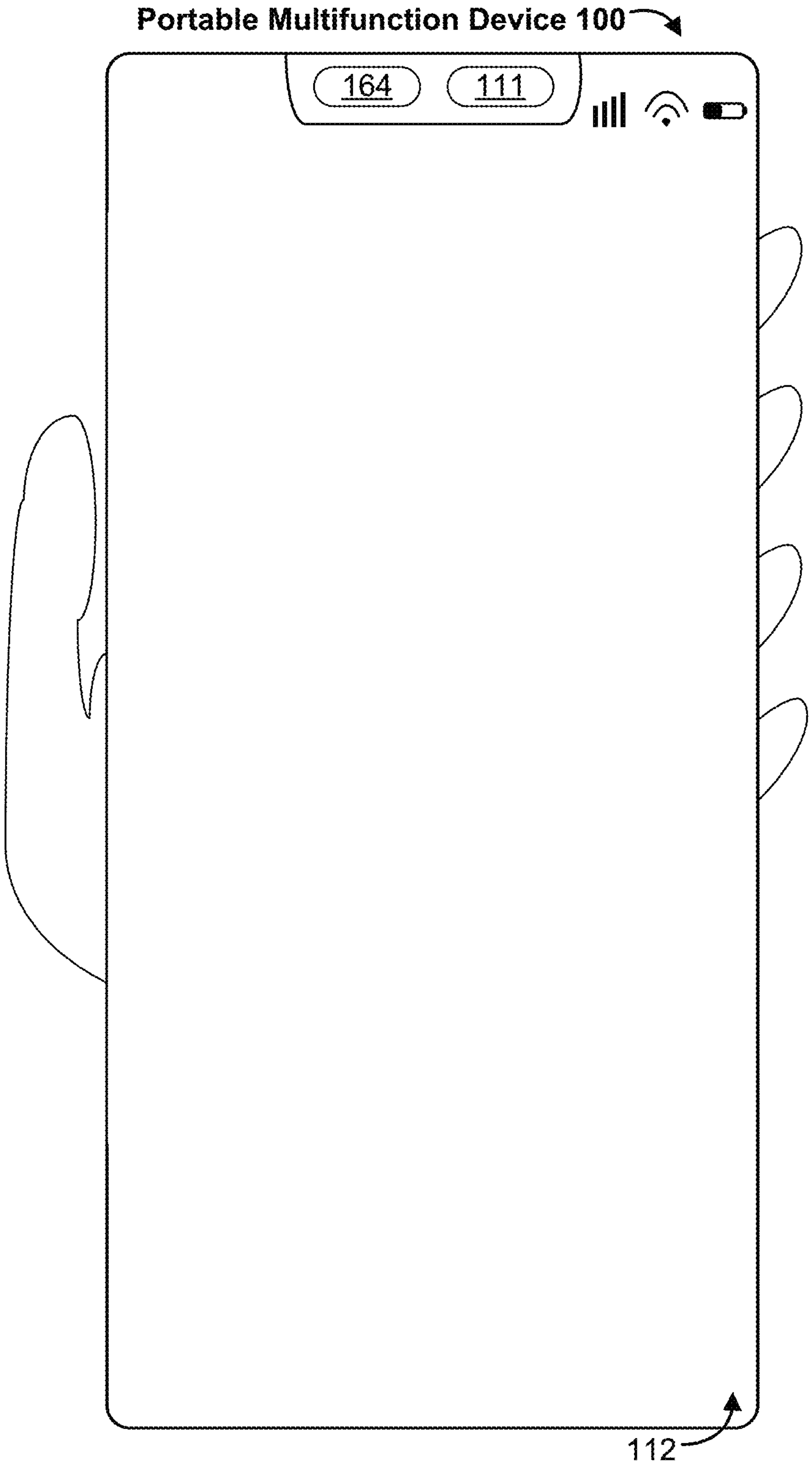
Figure 5D:
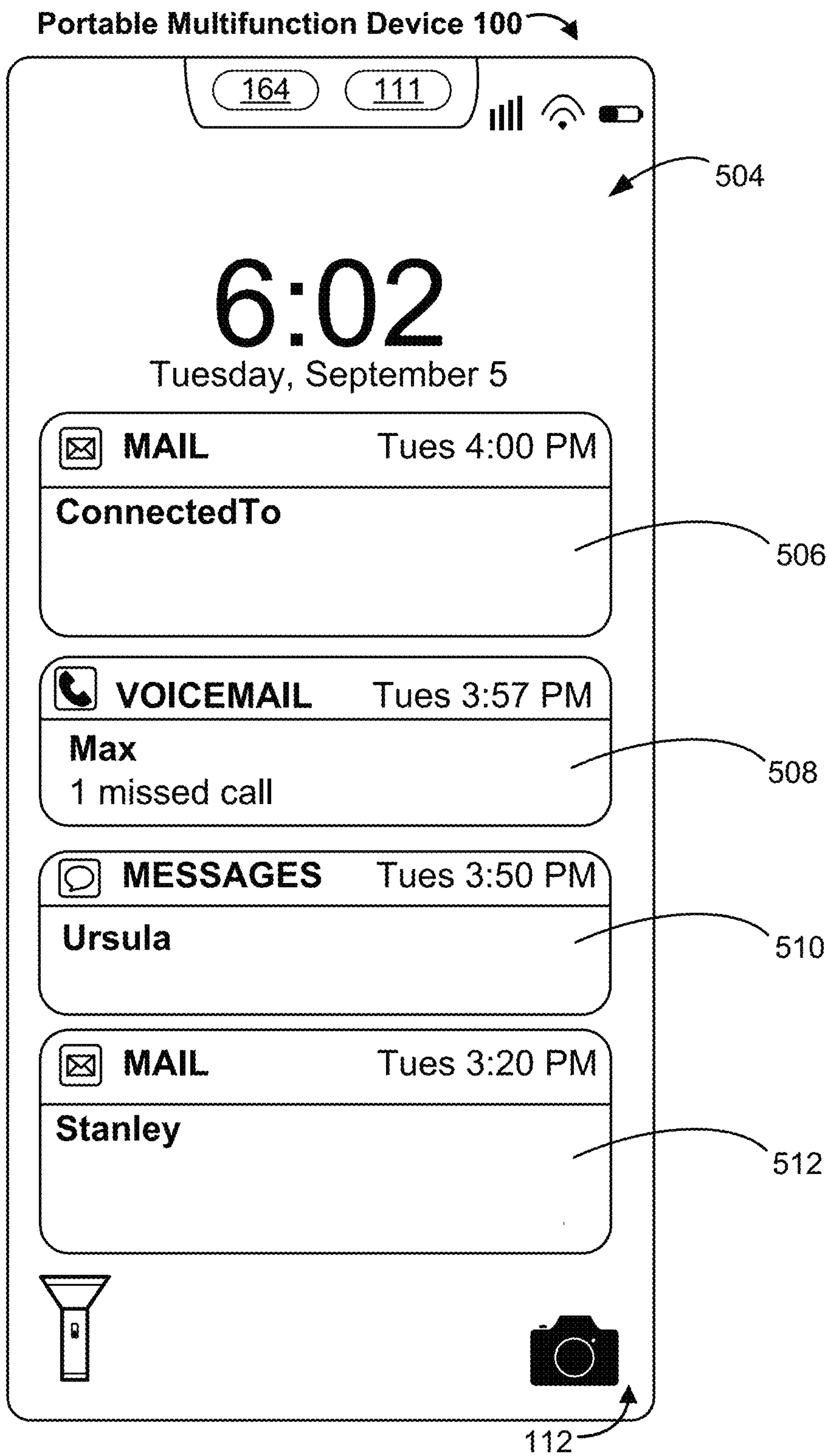
Figure 5E:
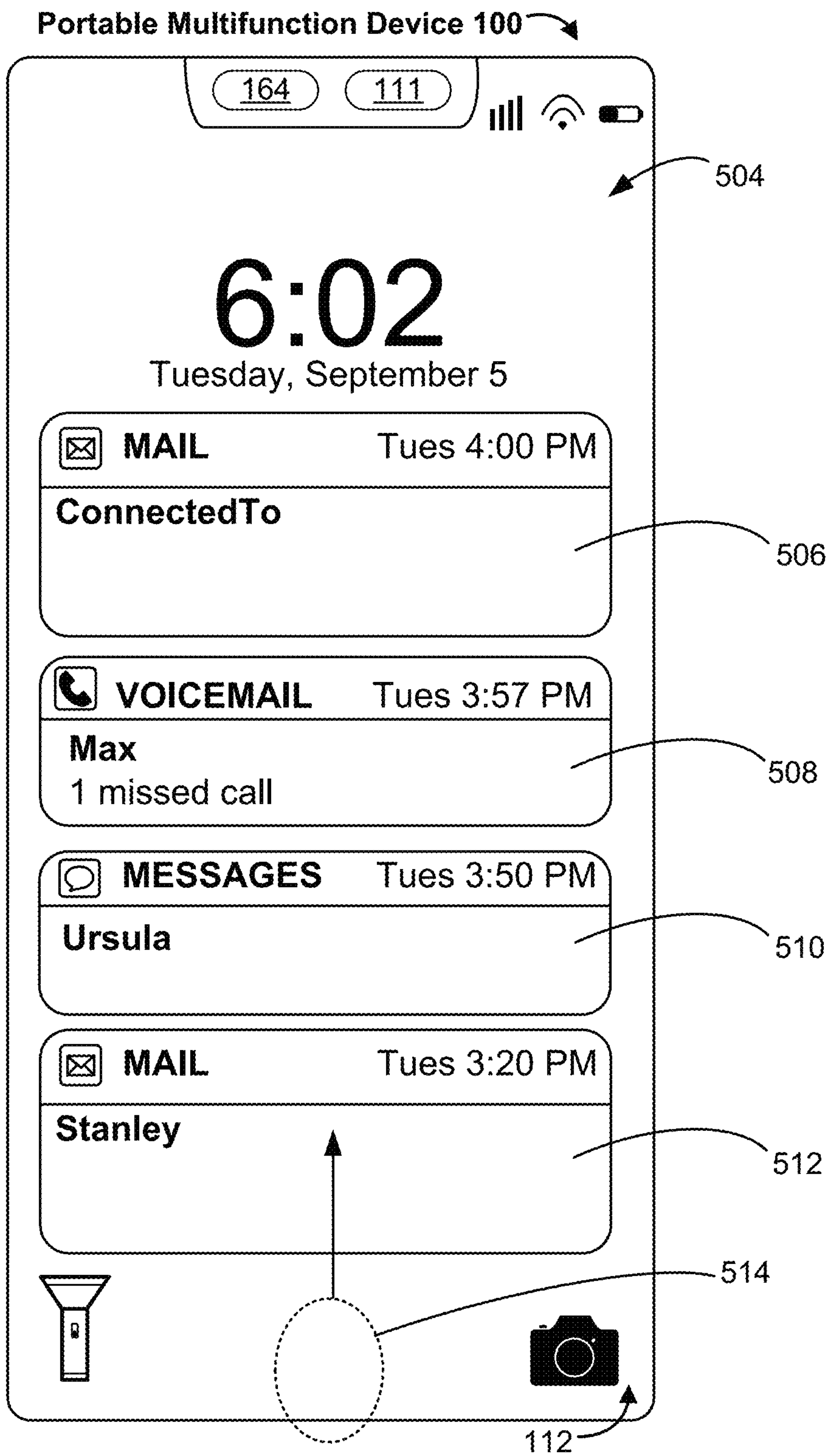
Figure 5F:
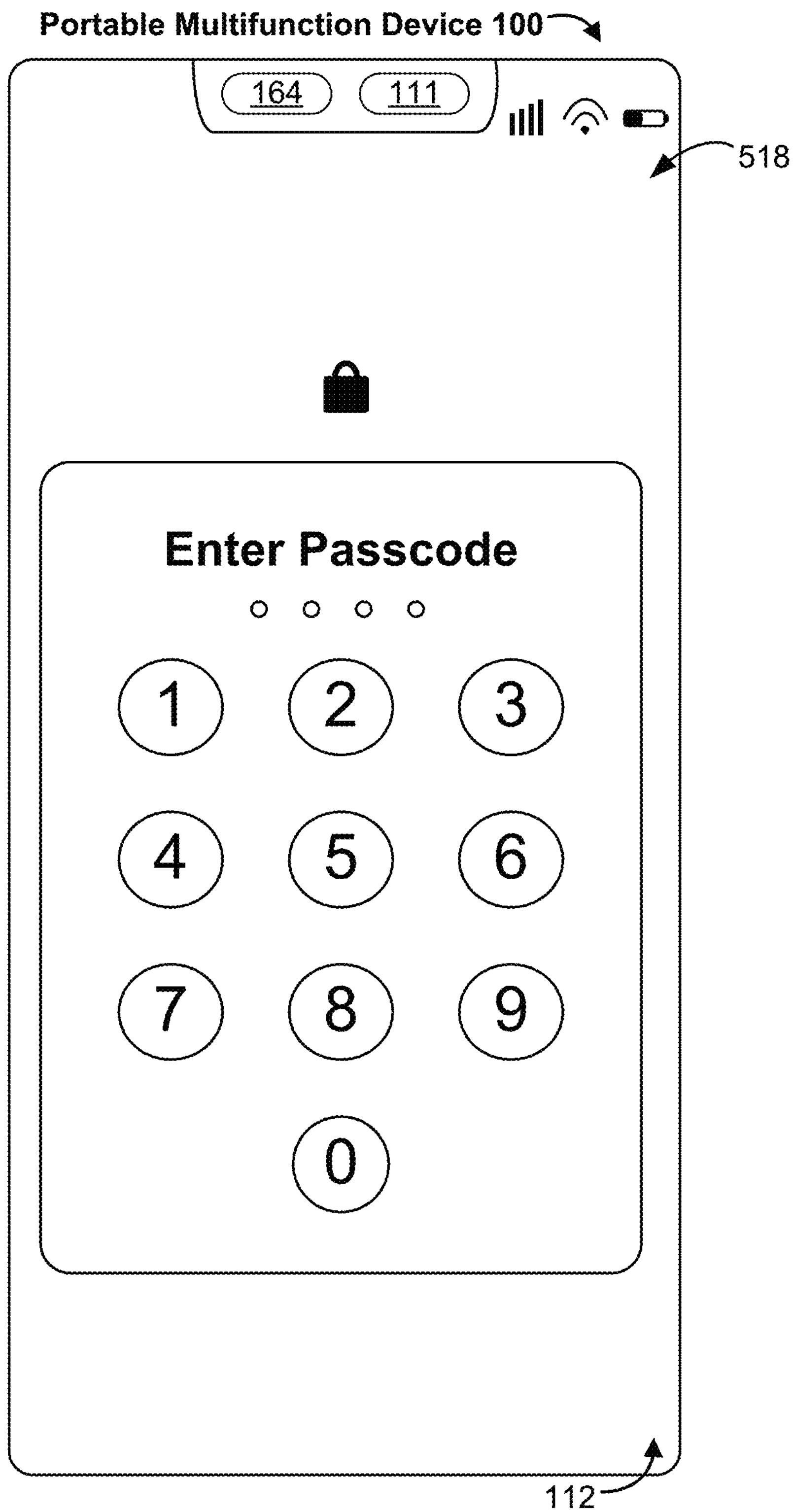
Figure 5G:
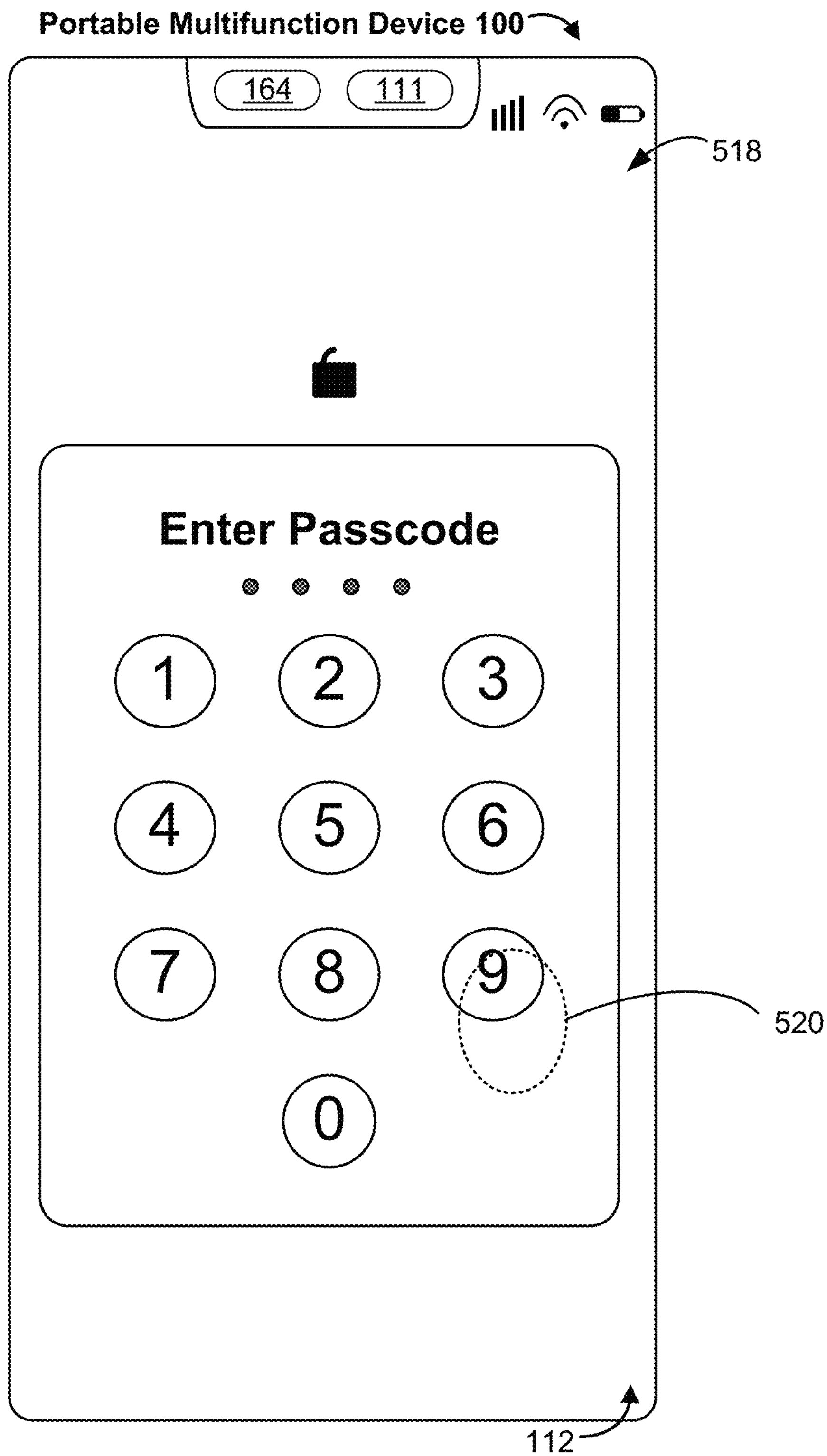
Figure 5H:
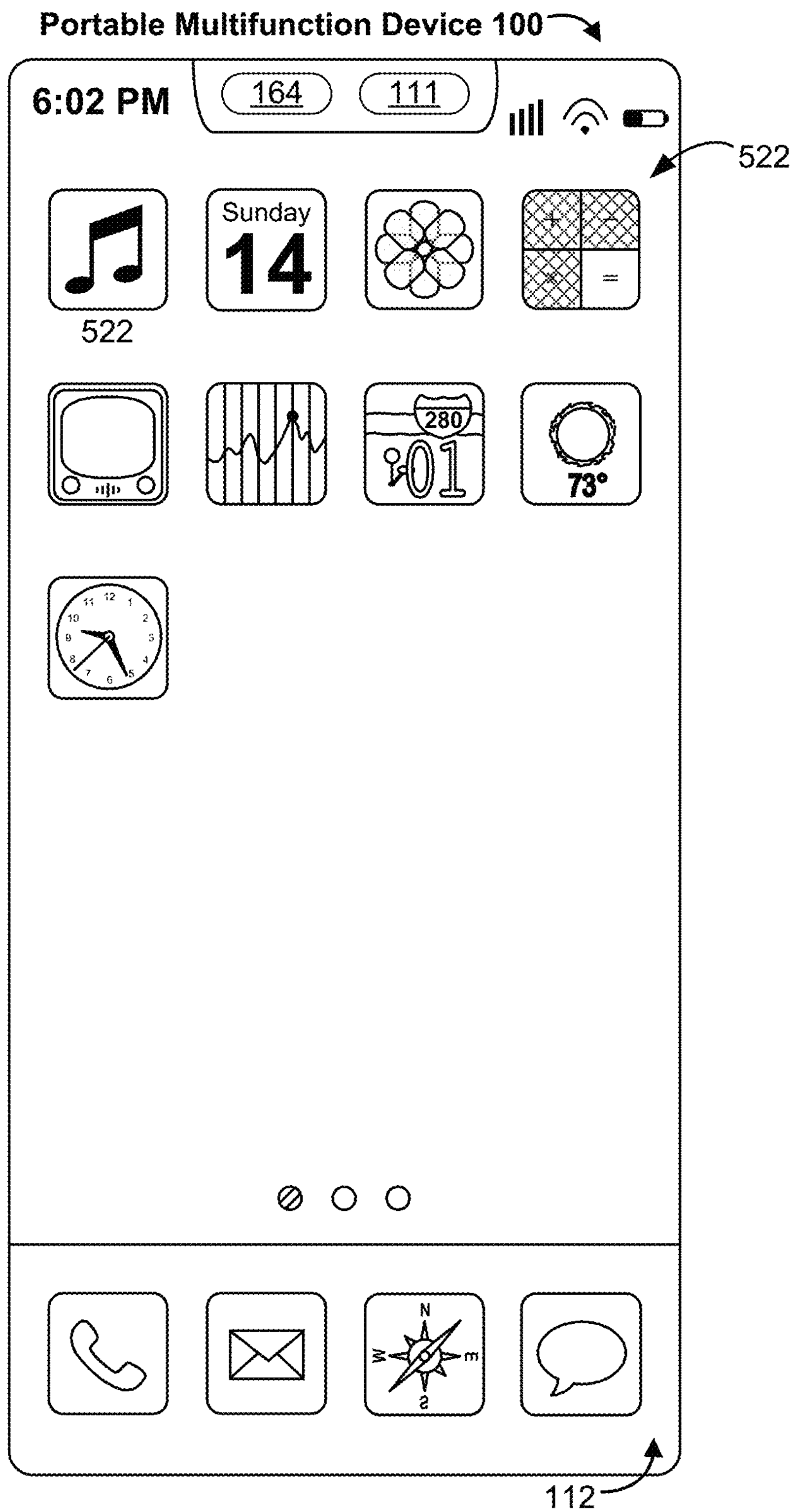
Figure 5I:
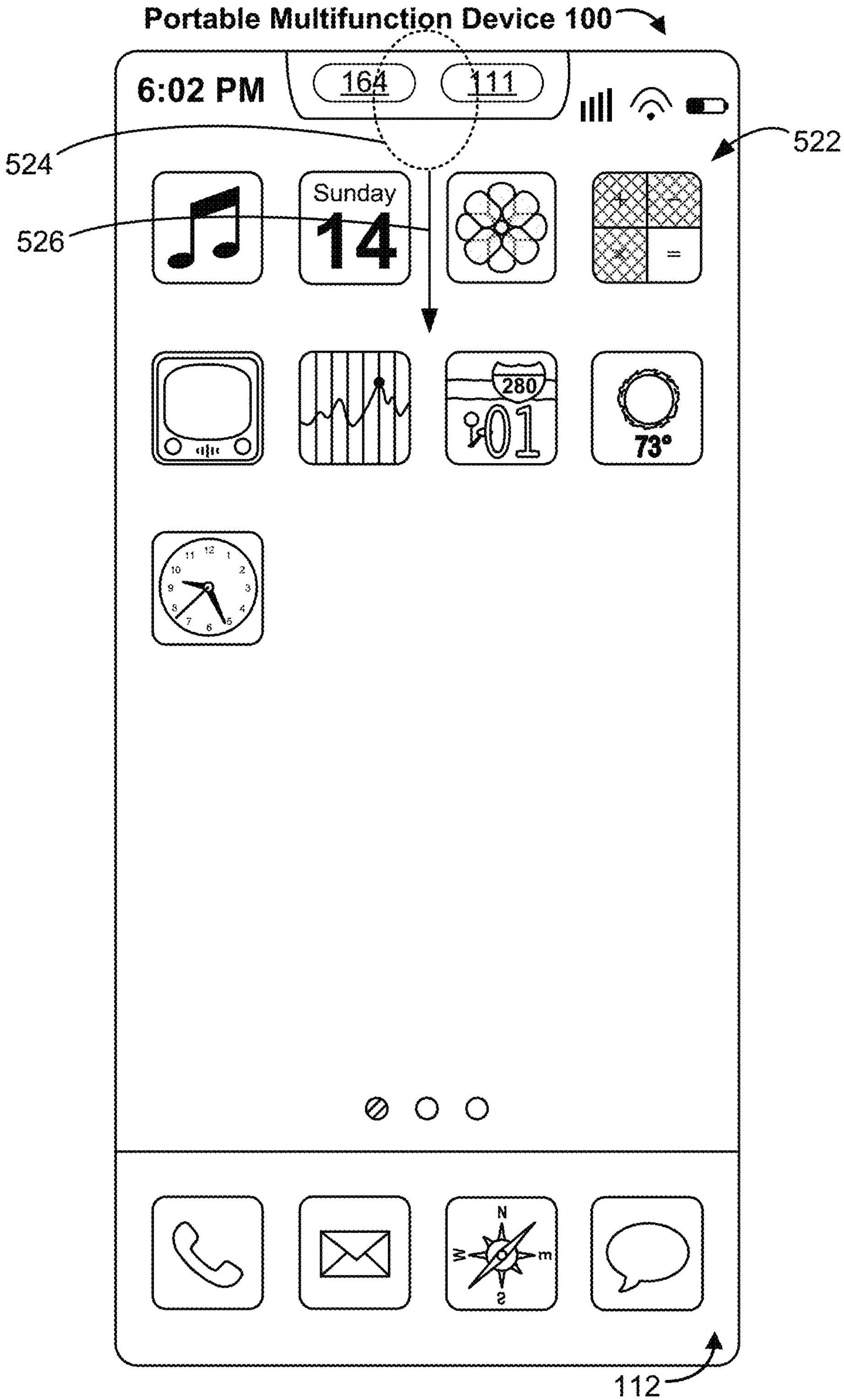
Figure 5J:
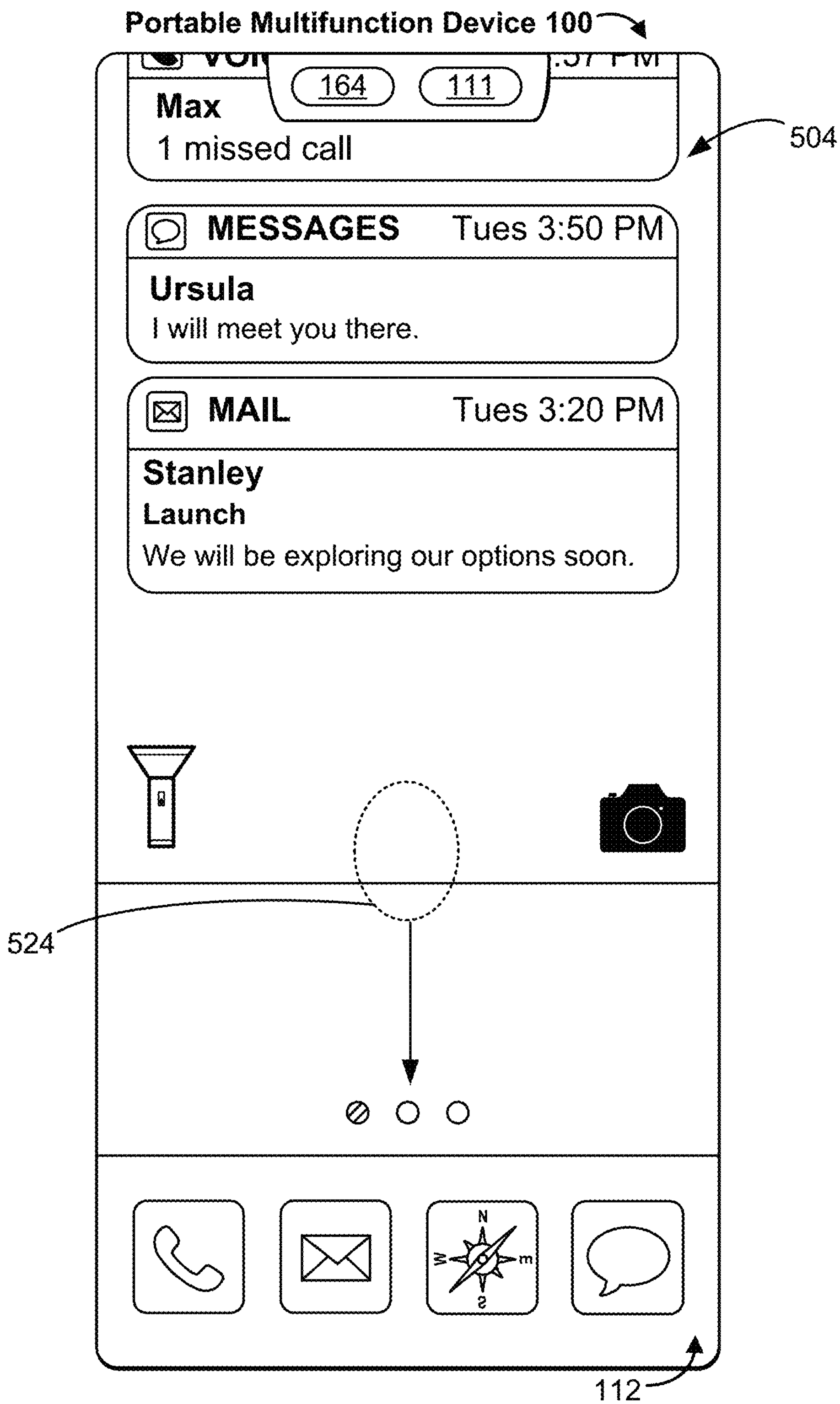
Figure 5K:
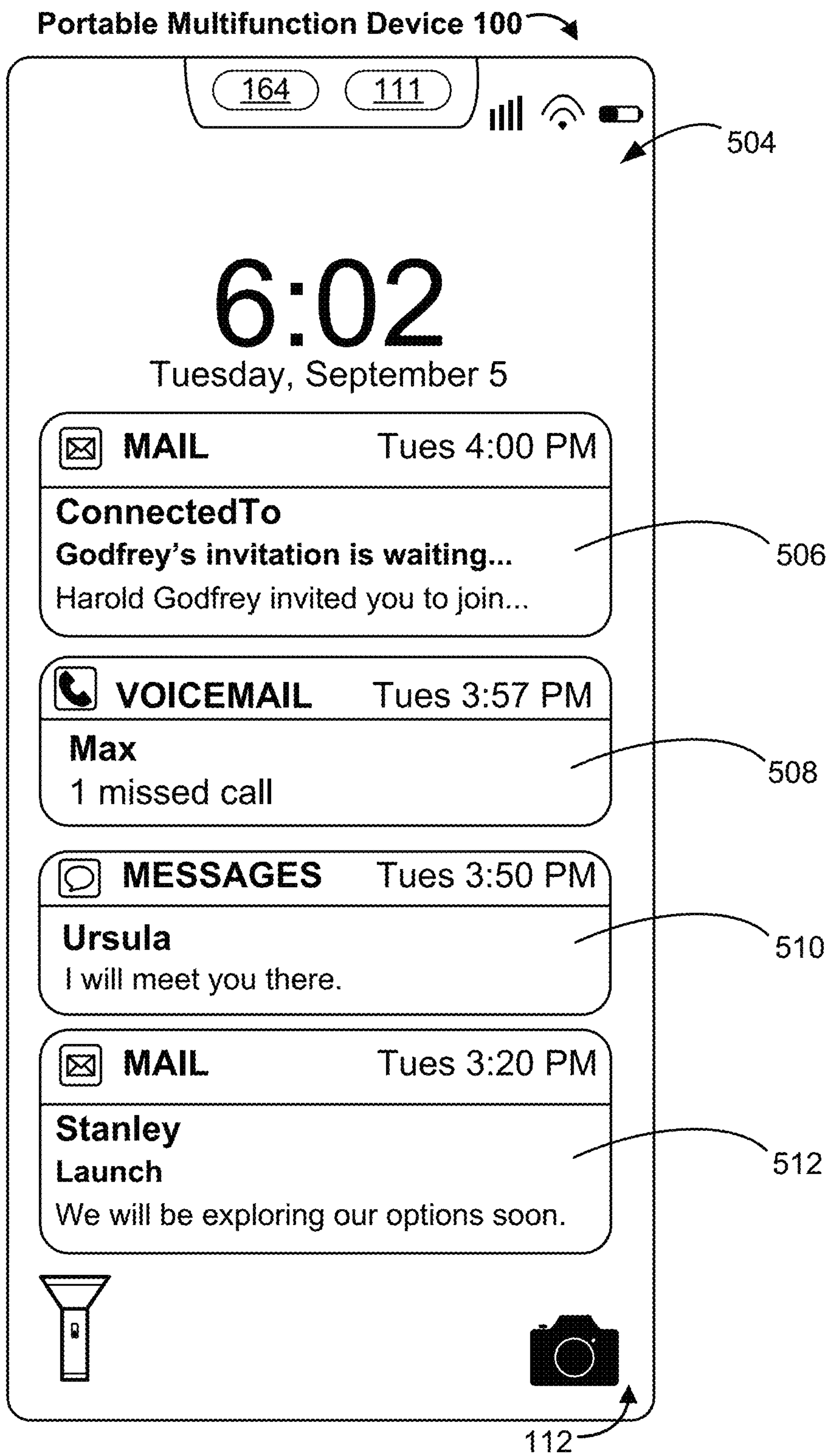
Figure 5L:
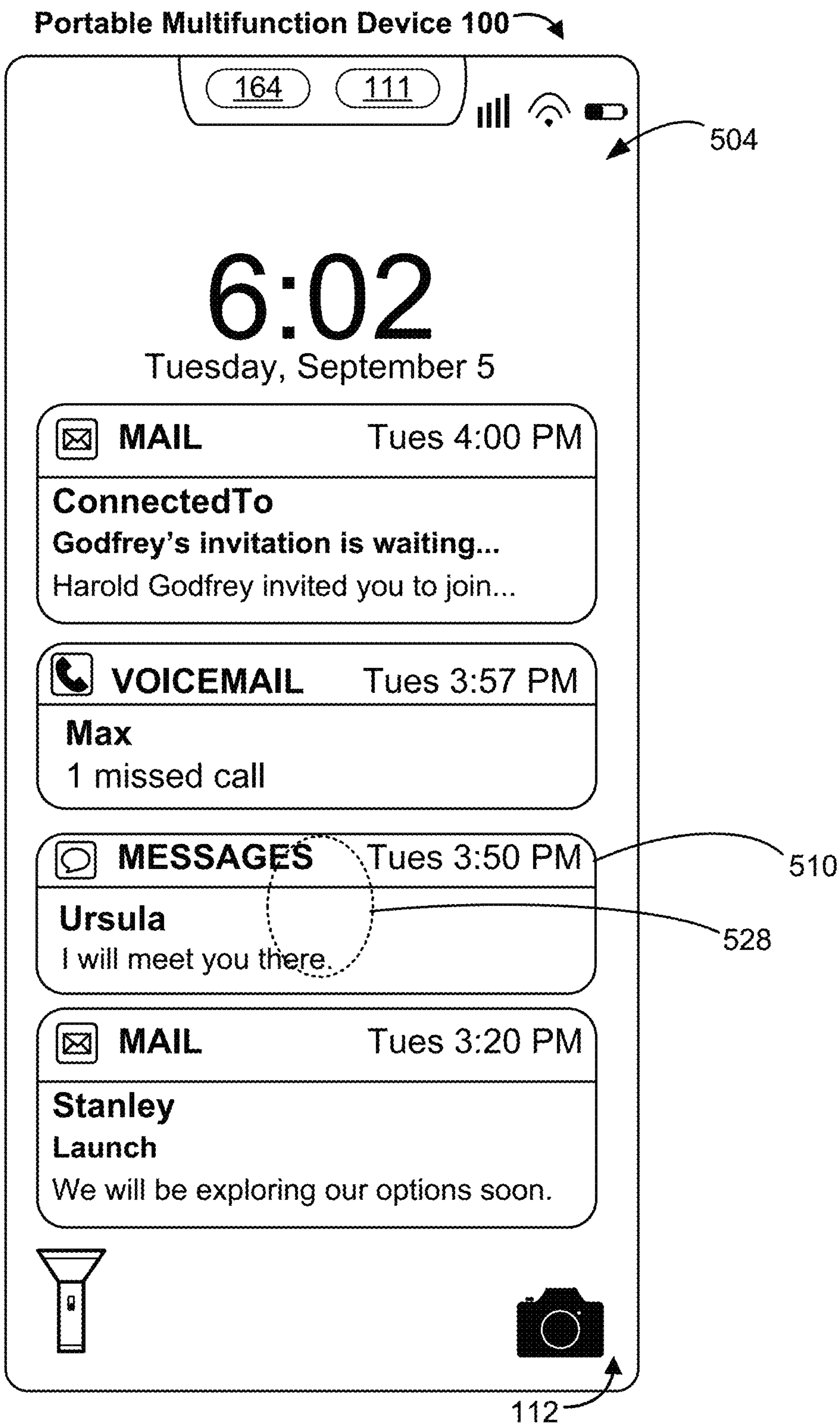
Figure 5M:
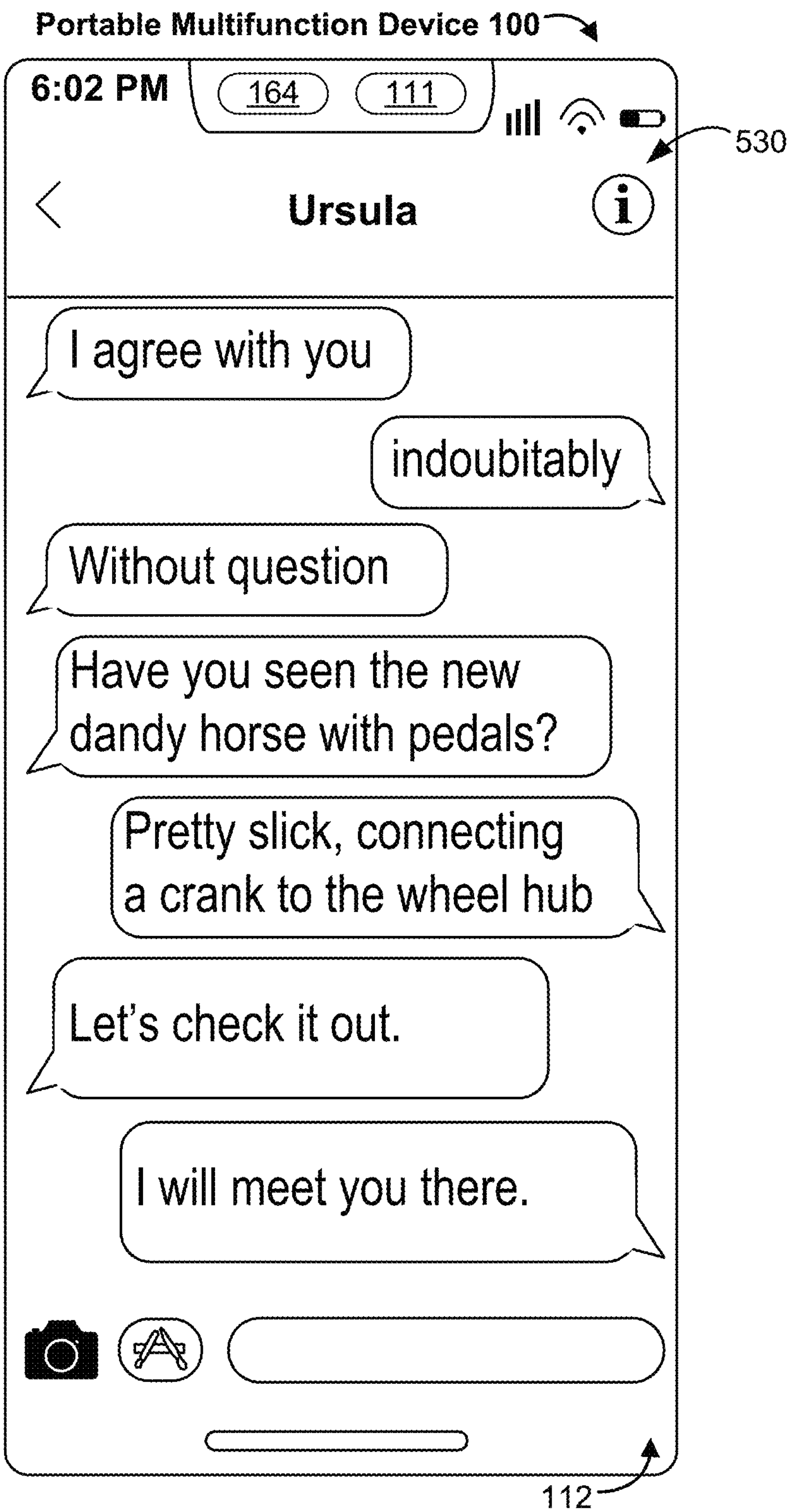
Figure 5N:
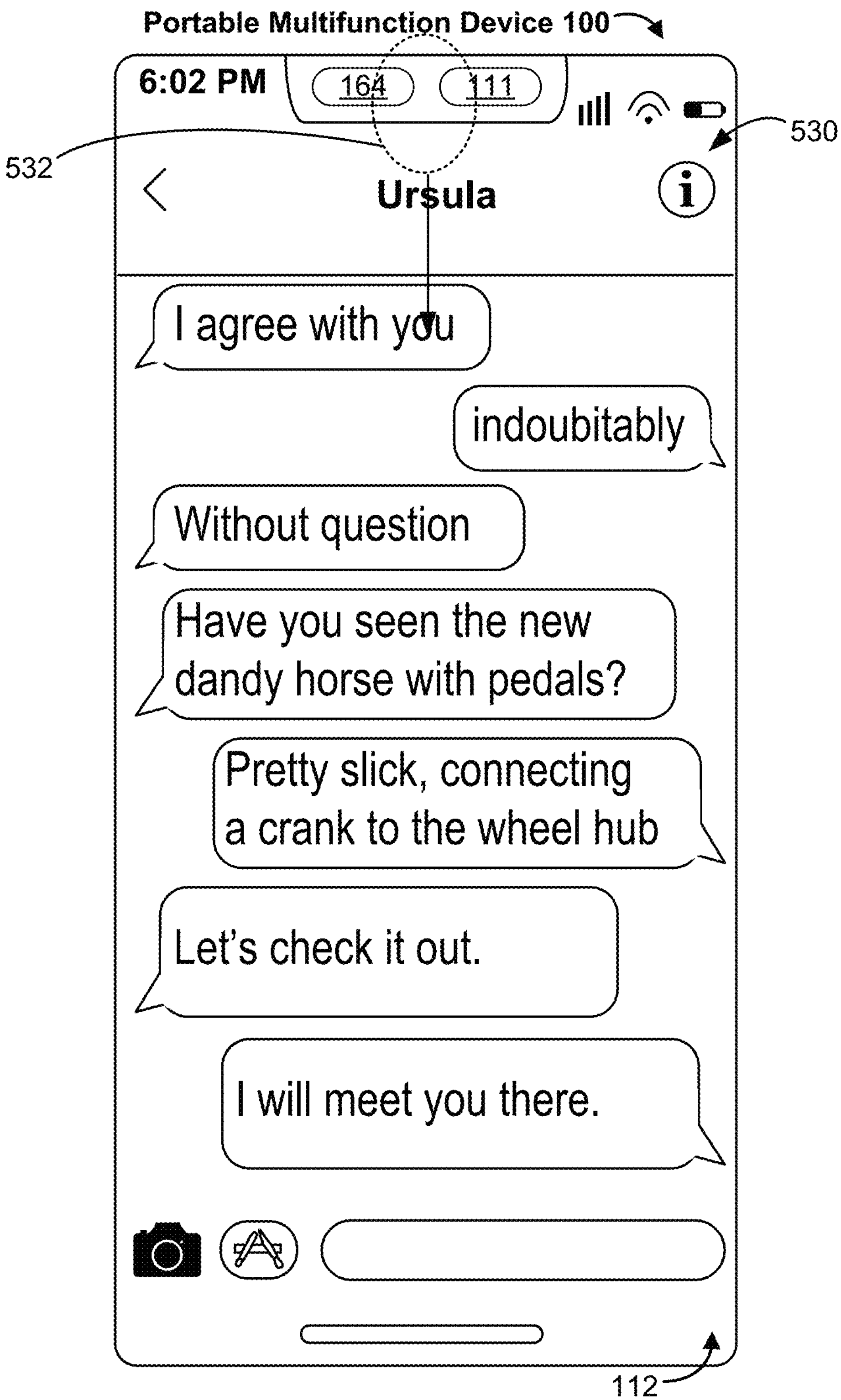
Figure 5O:
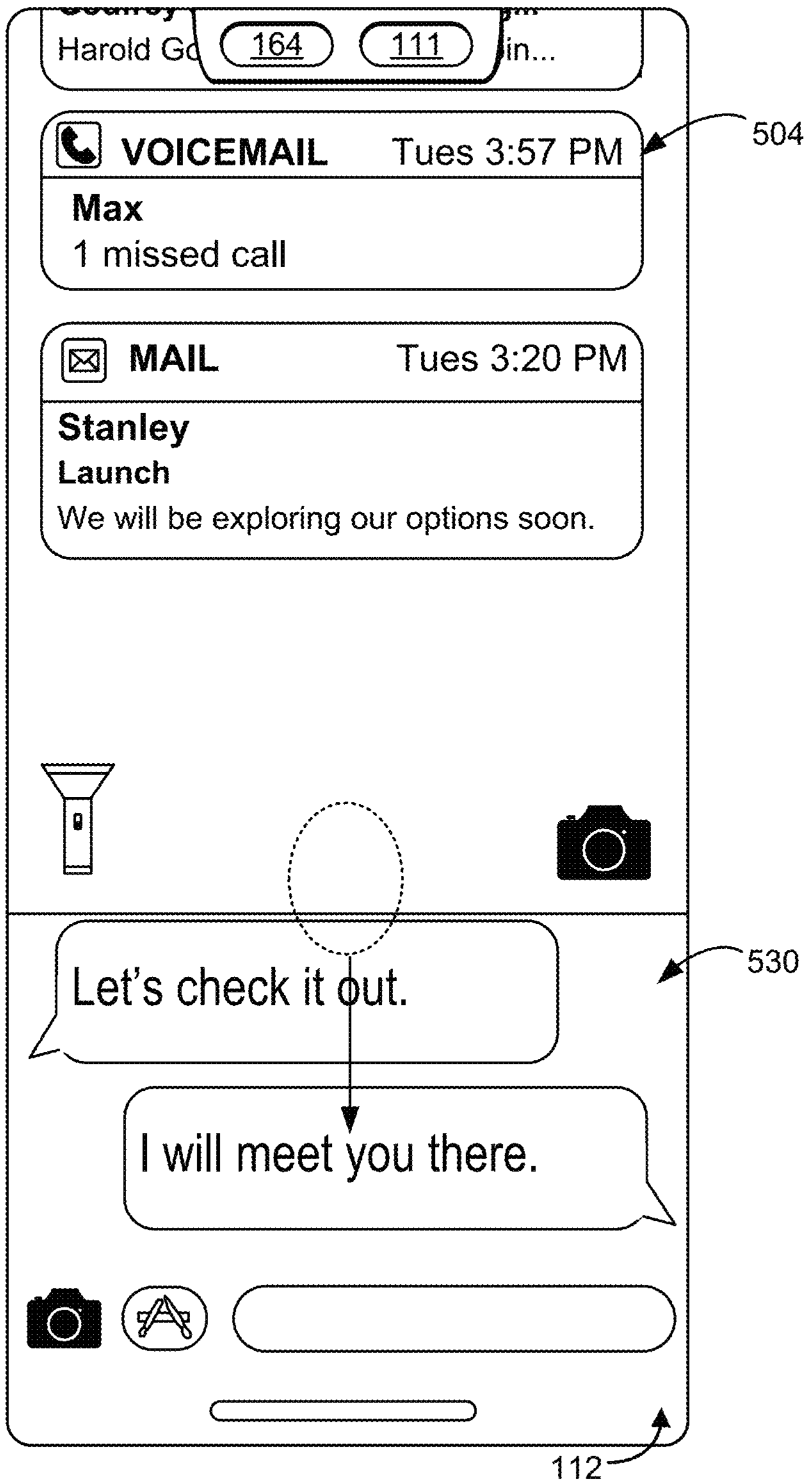
Figure 5P:
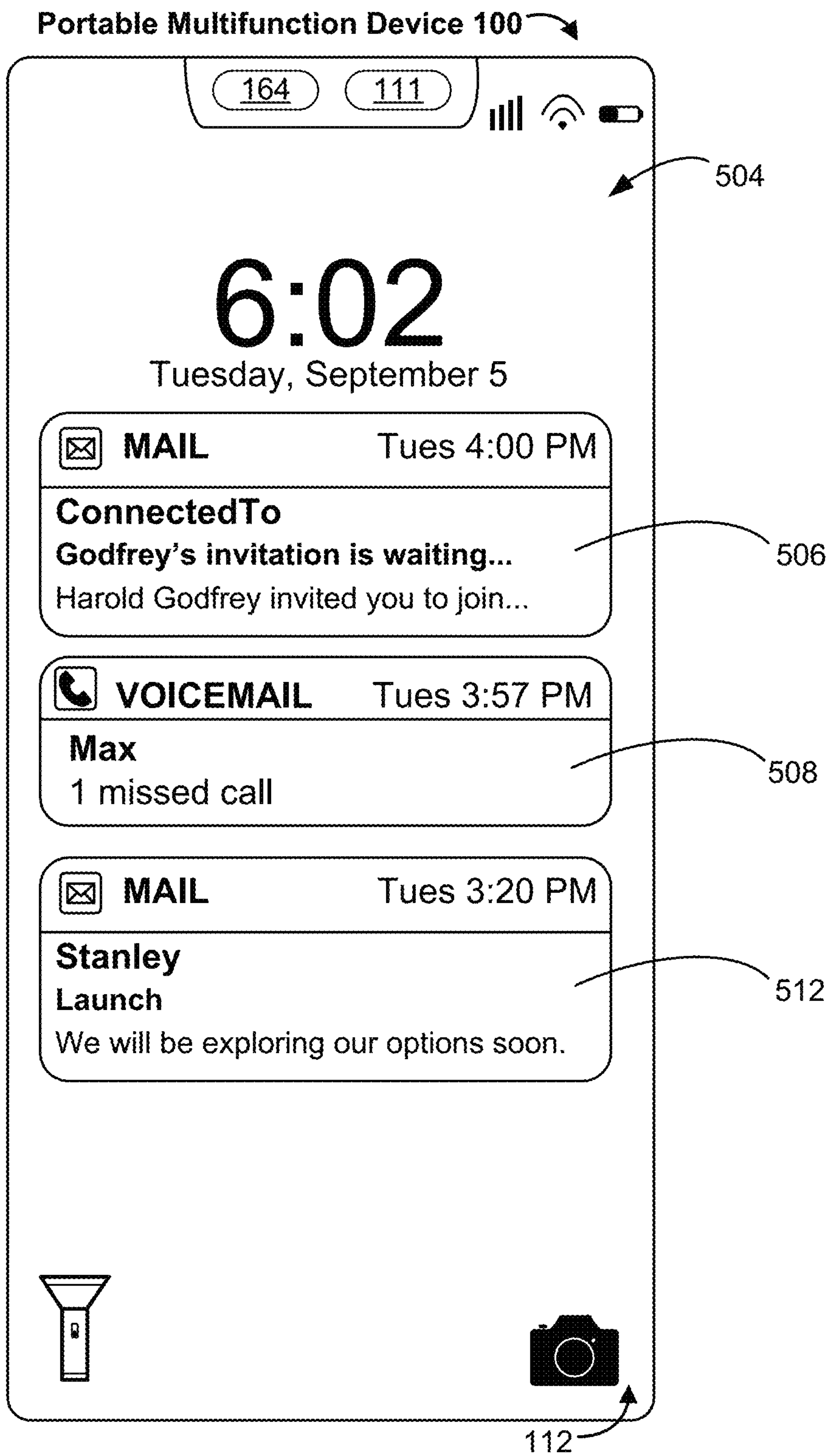
Figure 5Q:
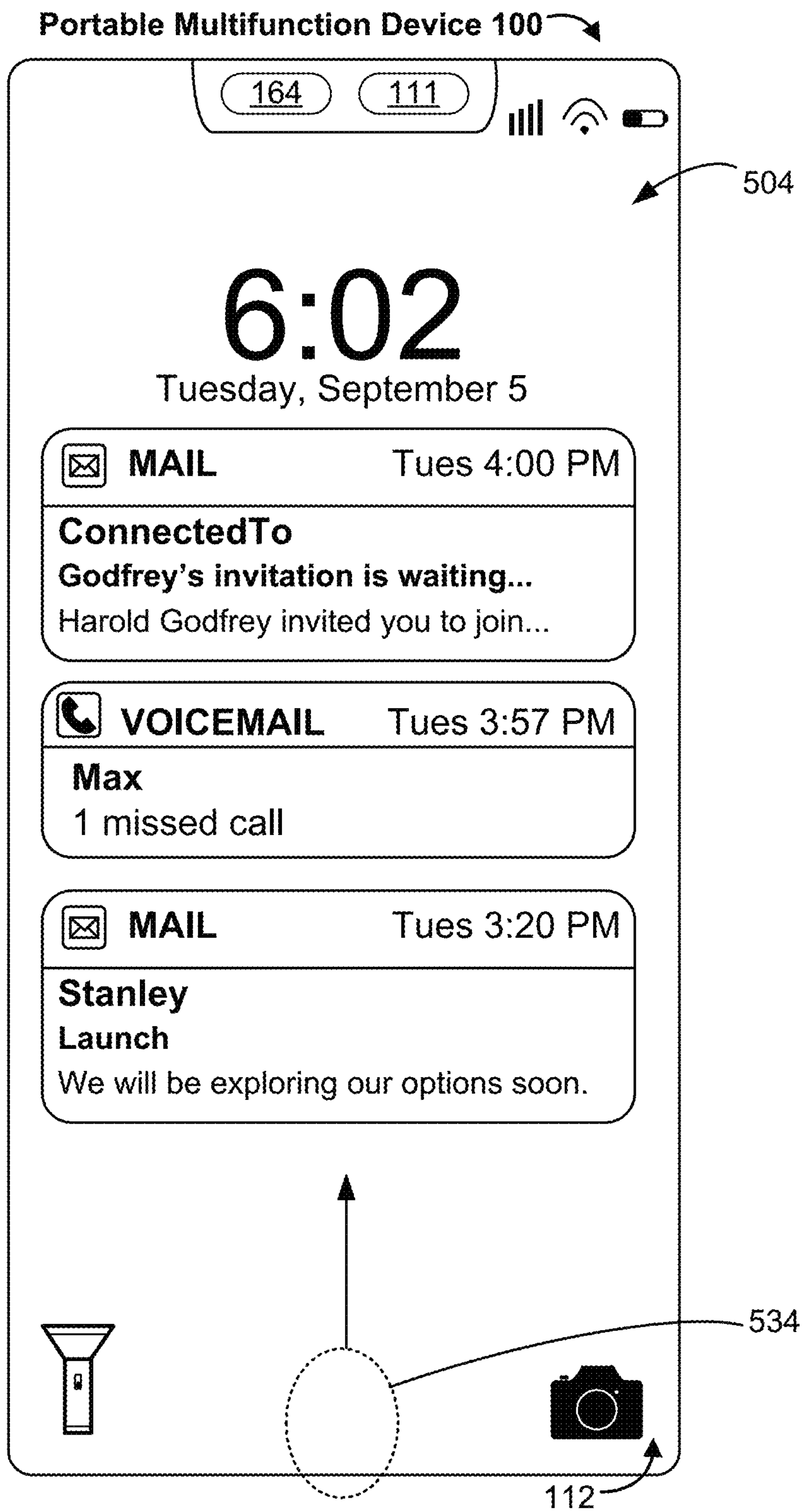
Figure 5R:
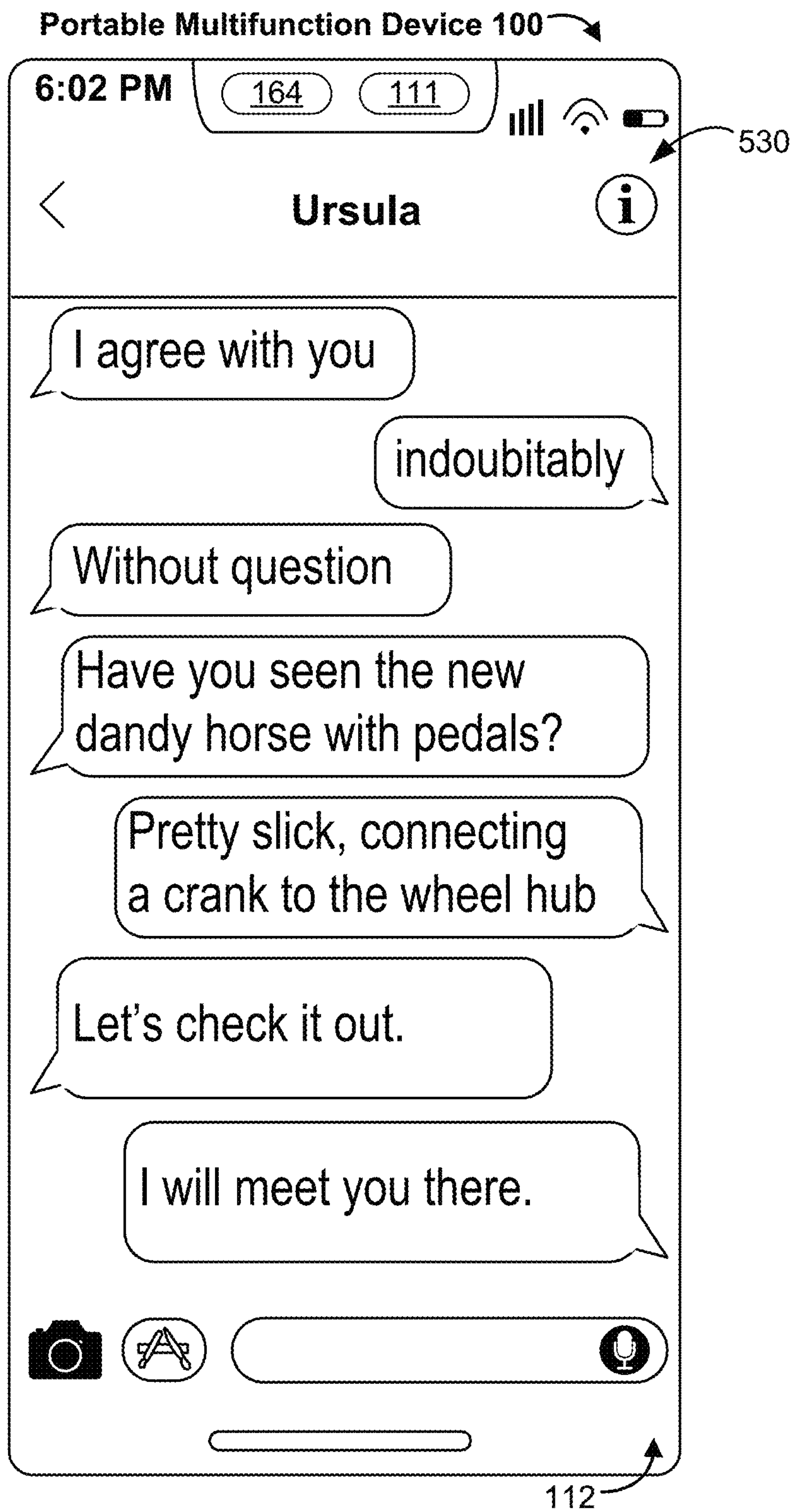
Figure 5S:
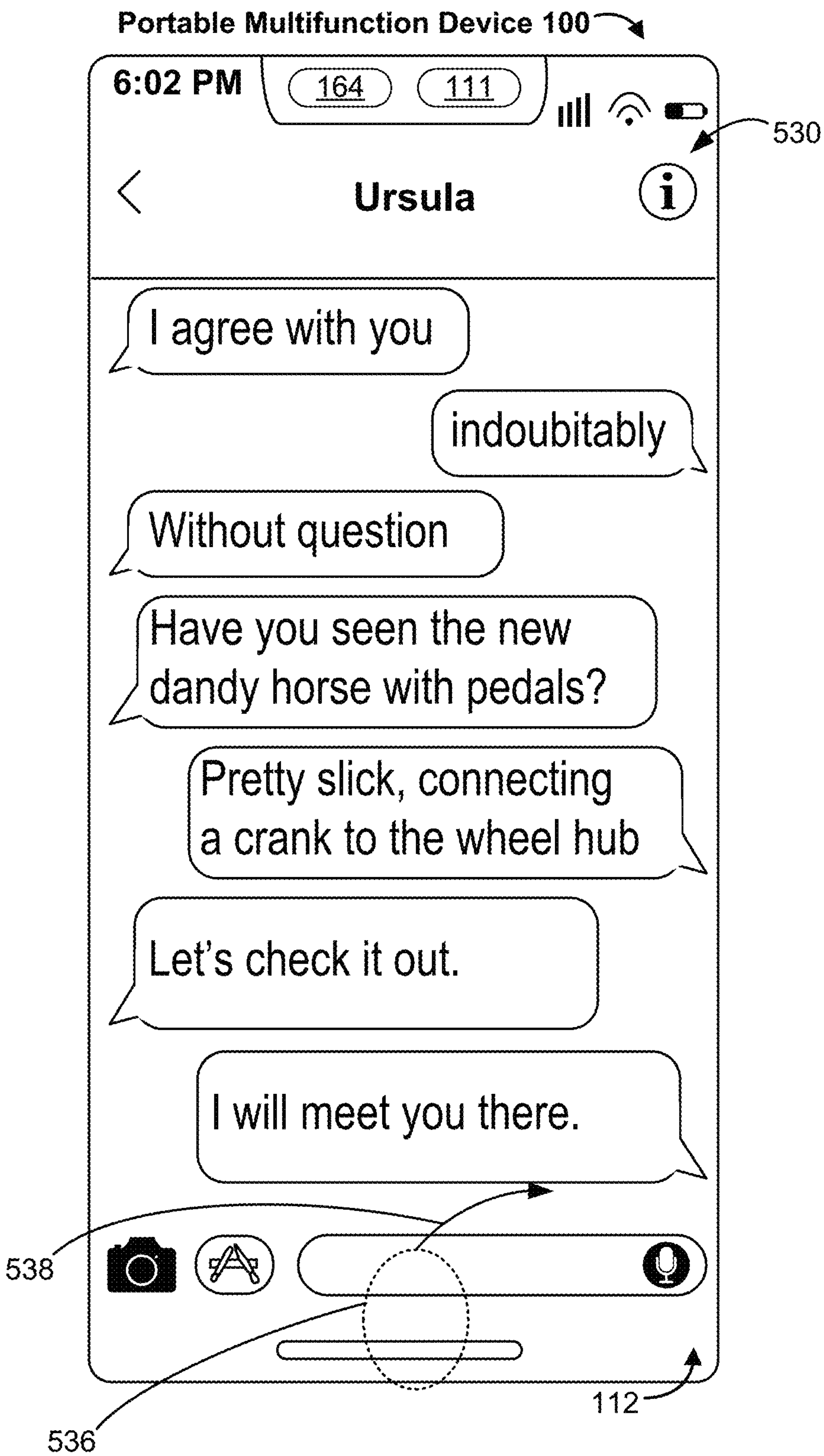
Figure 5T:
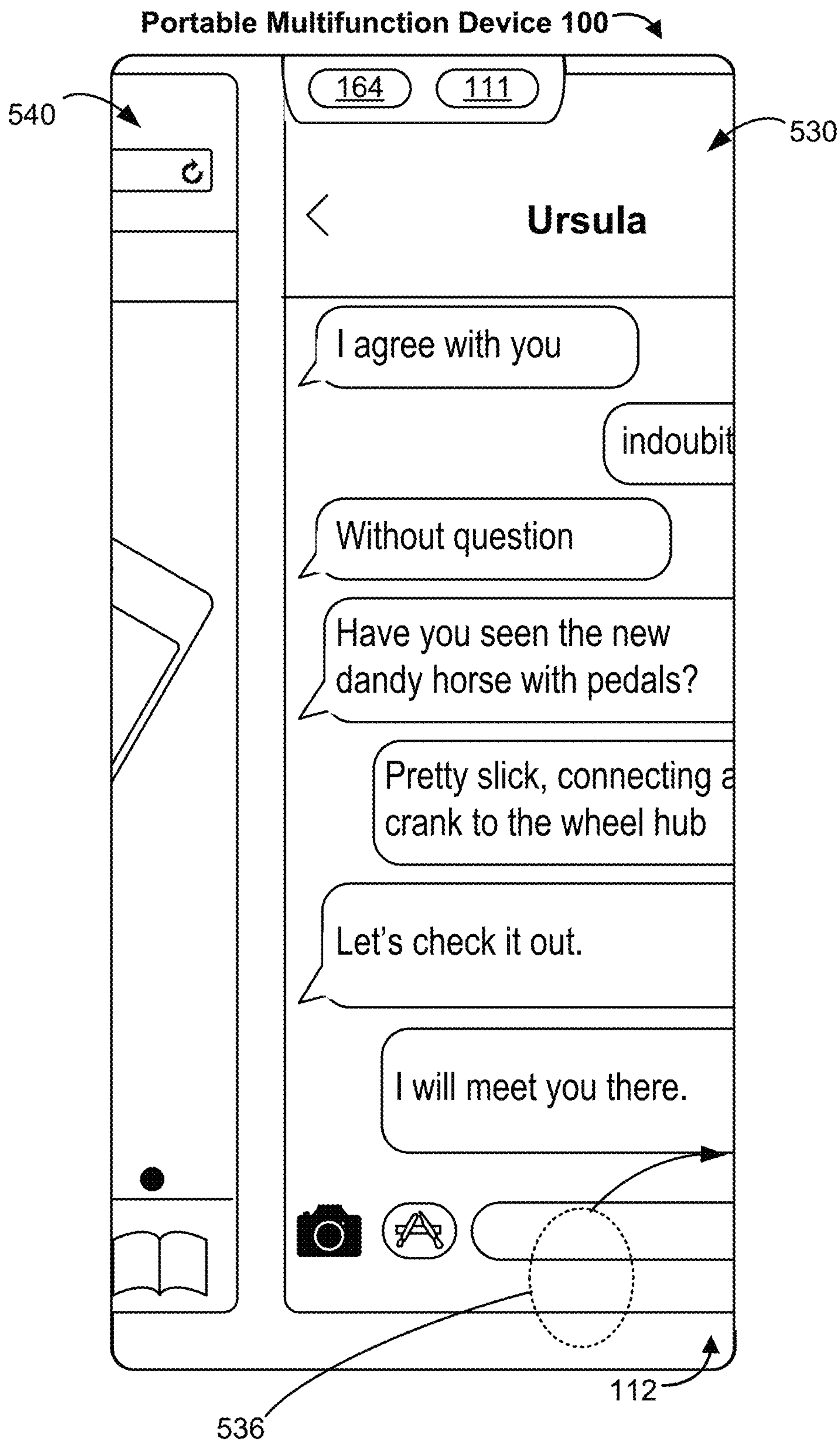
Figure 5U:
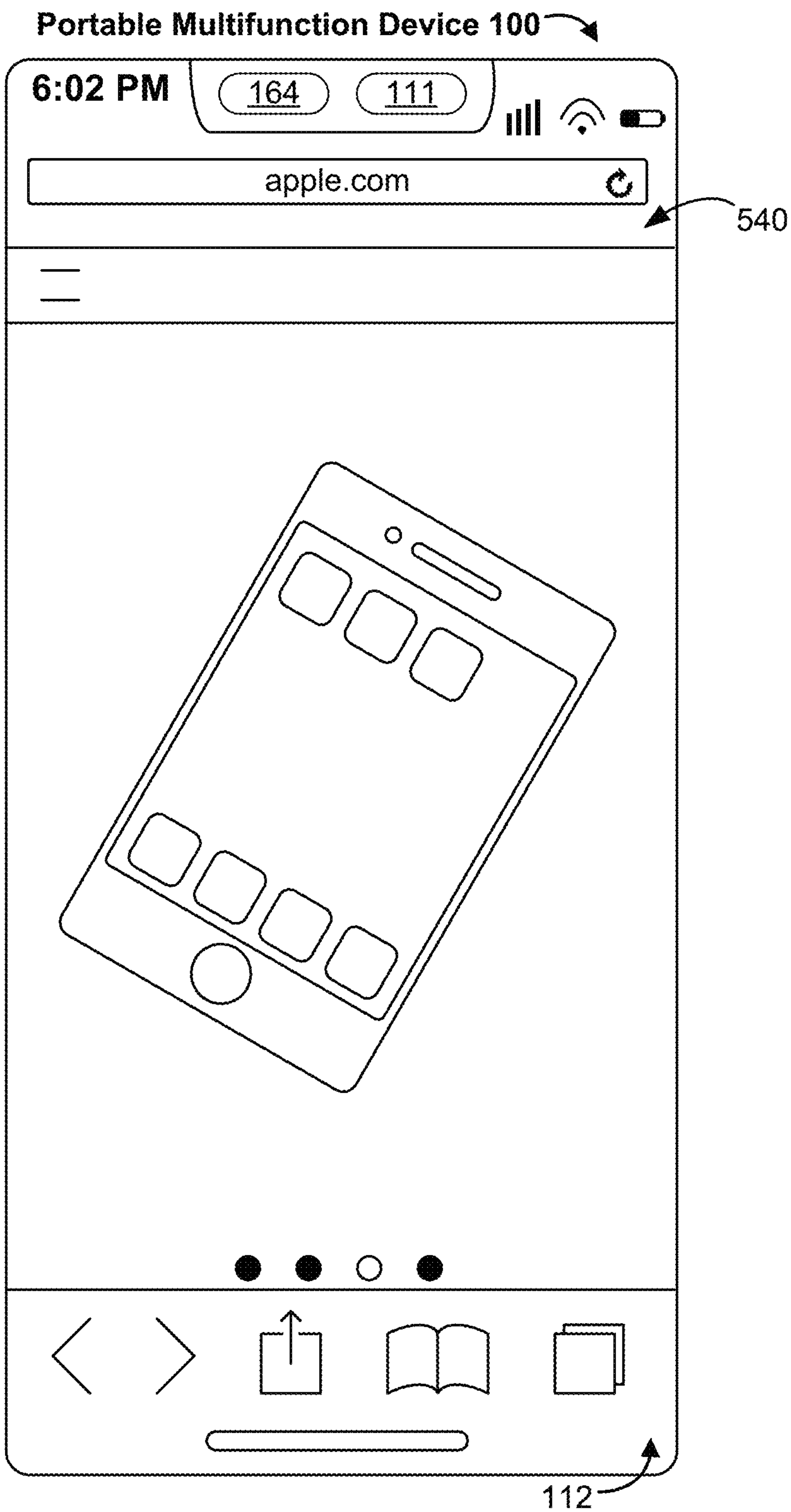
Figure 5V:
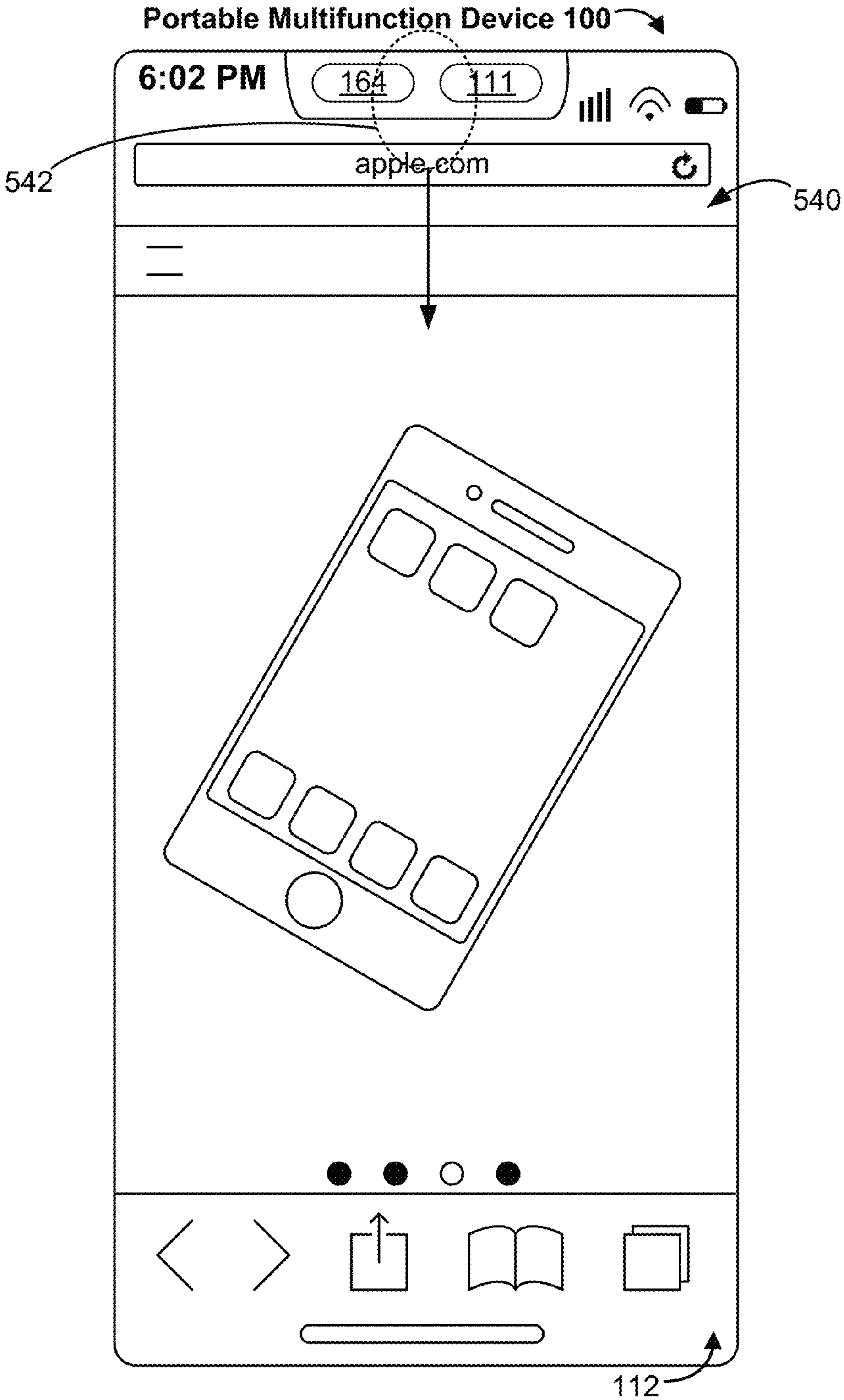
Figure 5W:
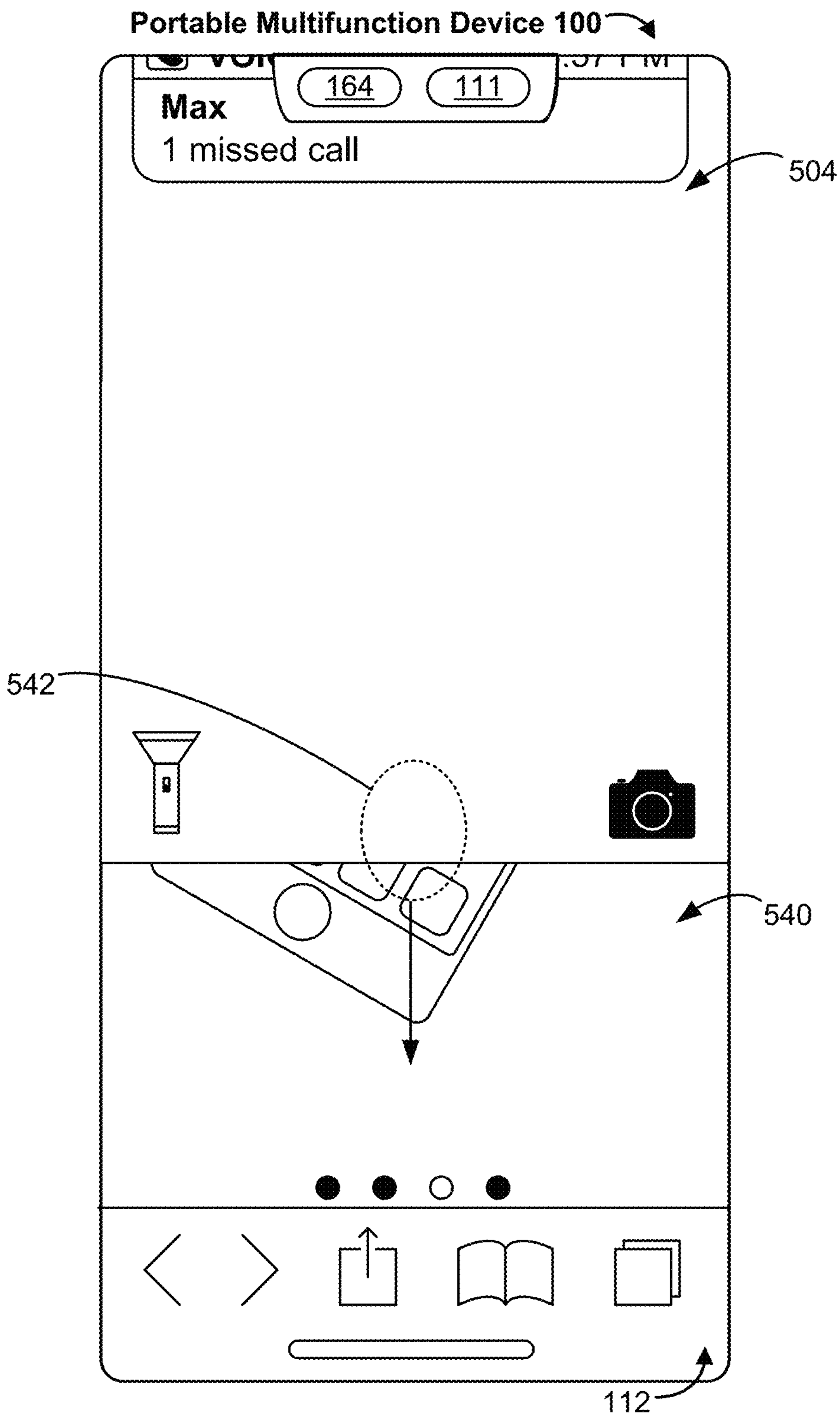
Figure 5X:
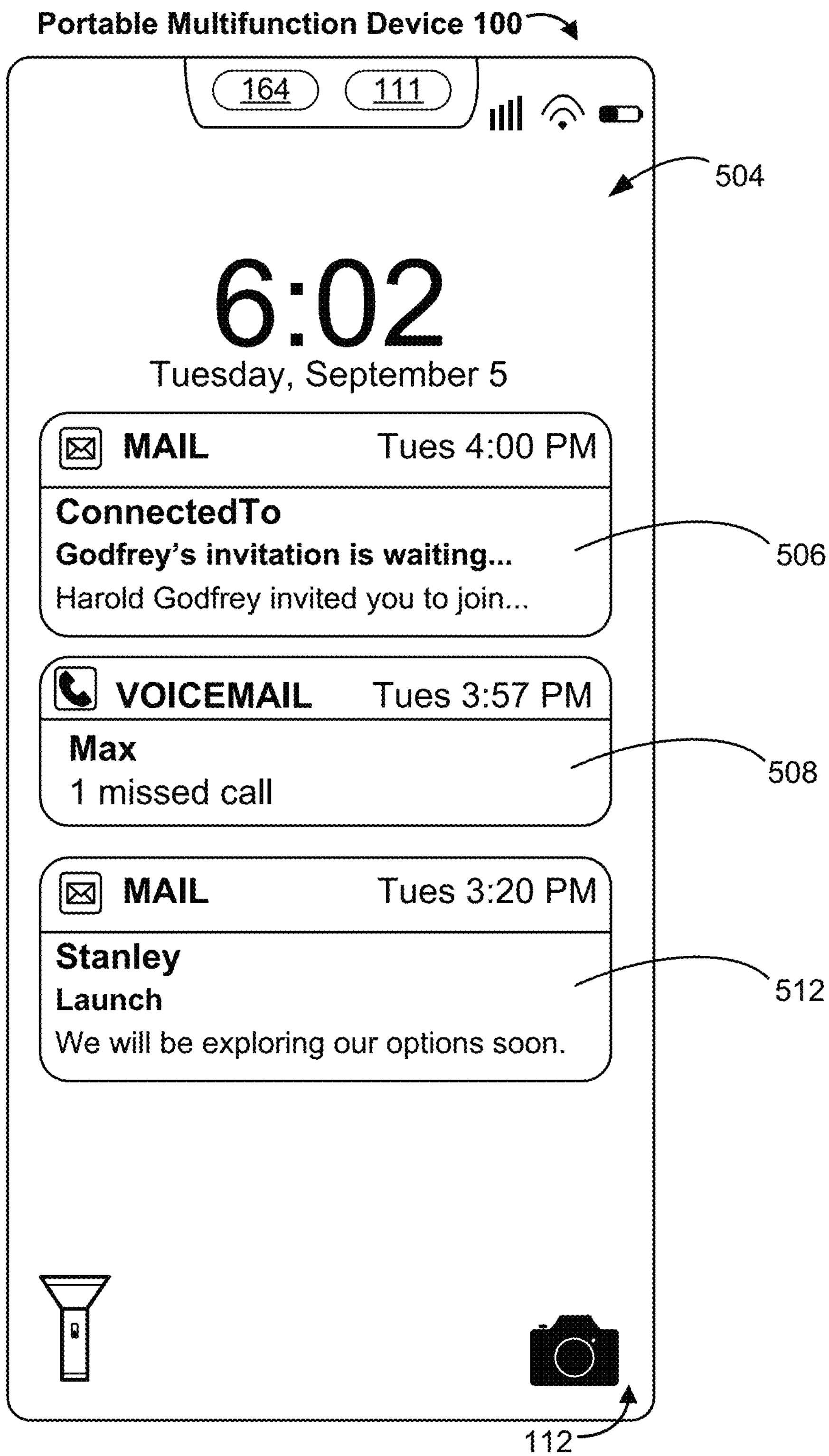
Figure 5Y:
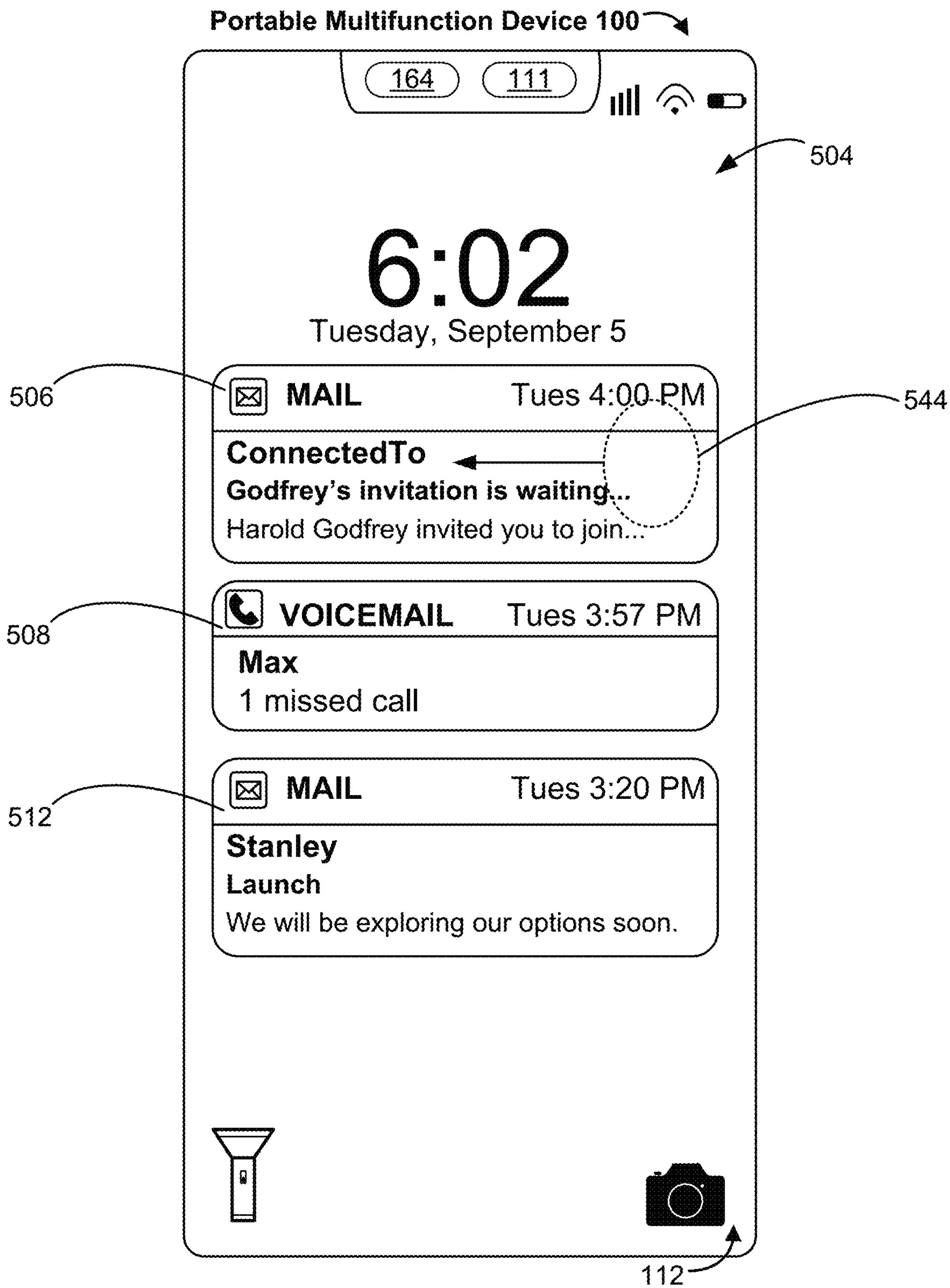
Figure 5Z:
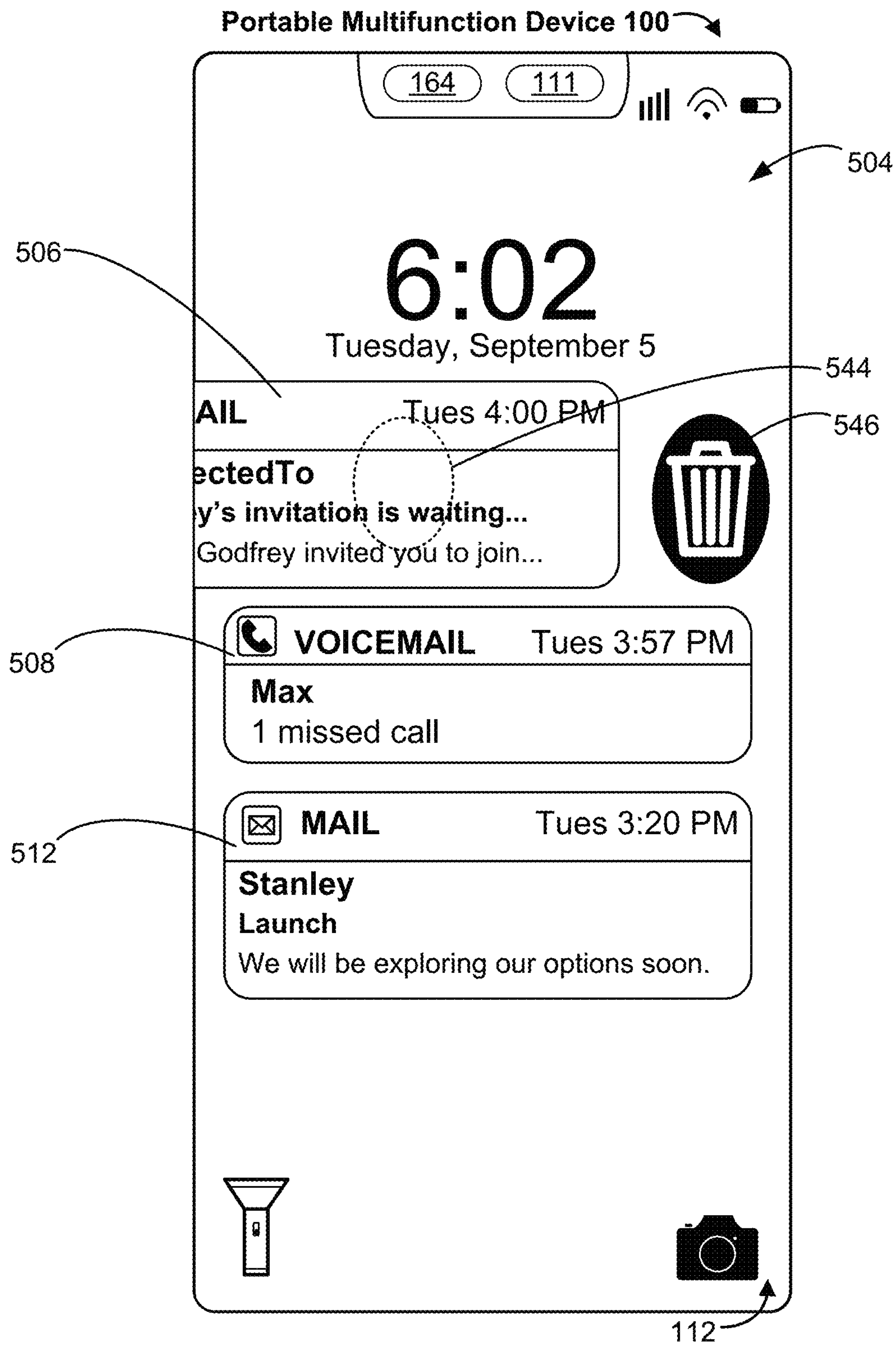
Figure 5A:
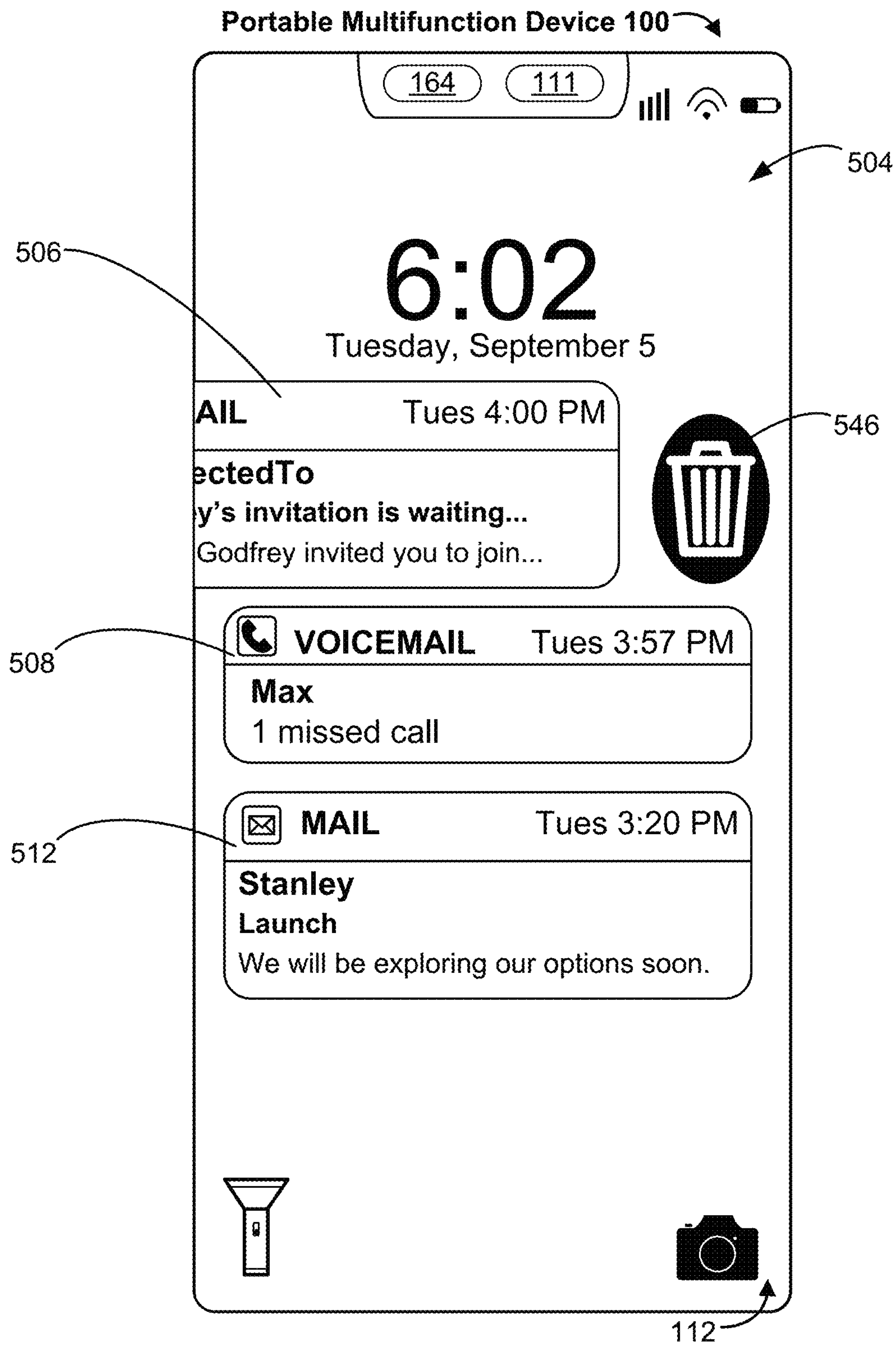
Figure 5A:
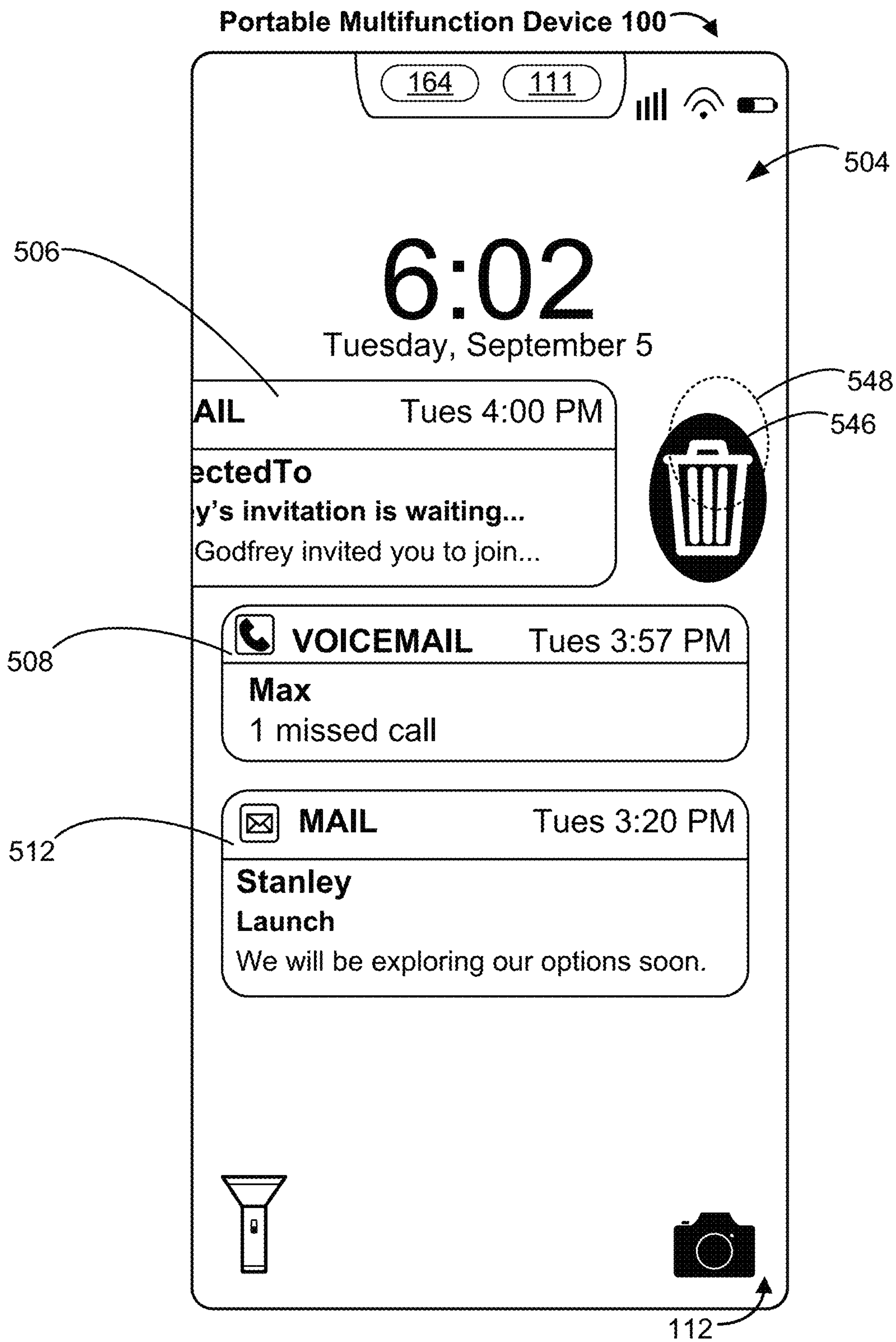
Figure 5A:
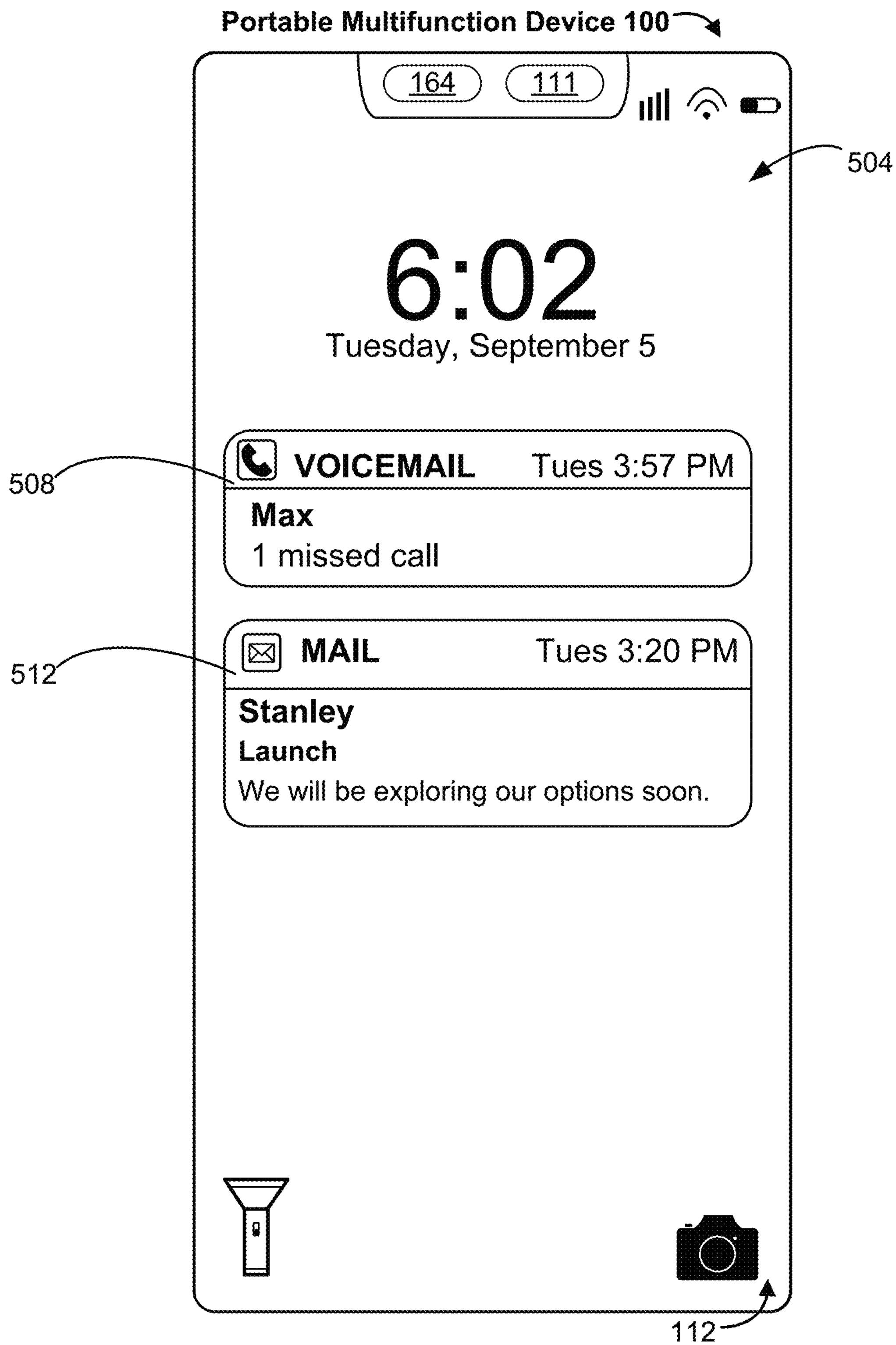
Figure 5A:
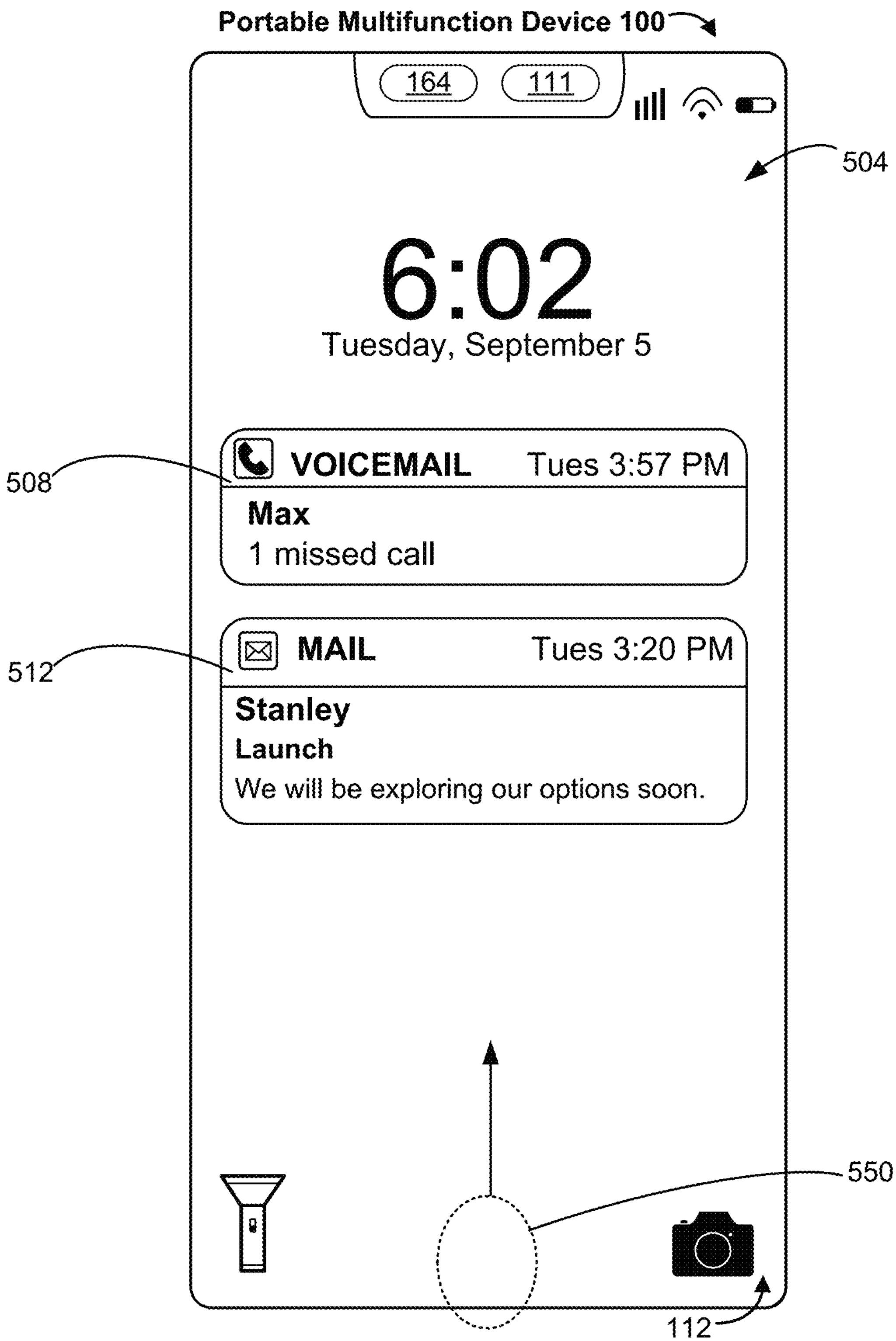
Figure 5A:
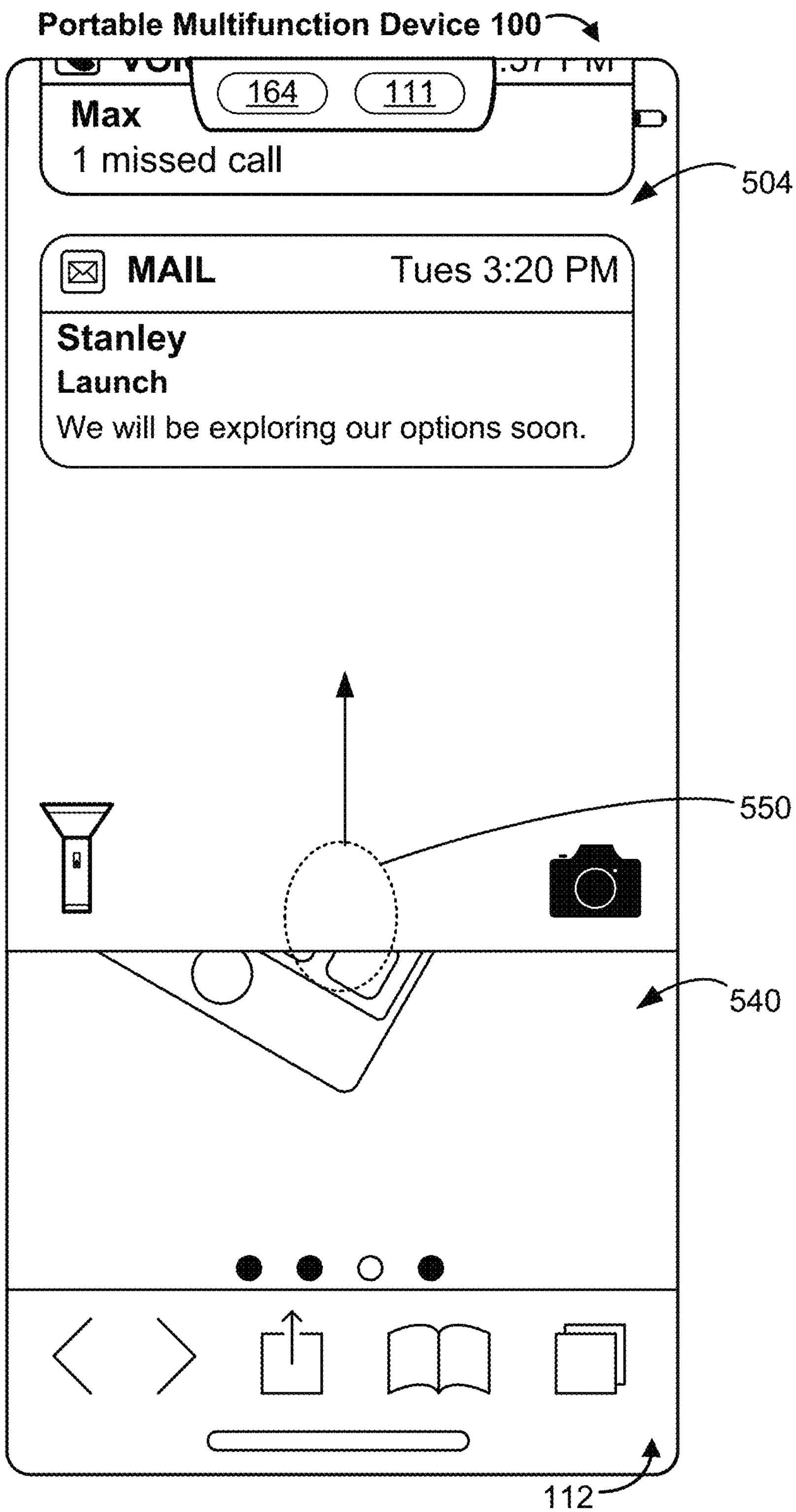
Figure 5A:
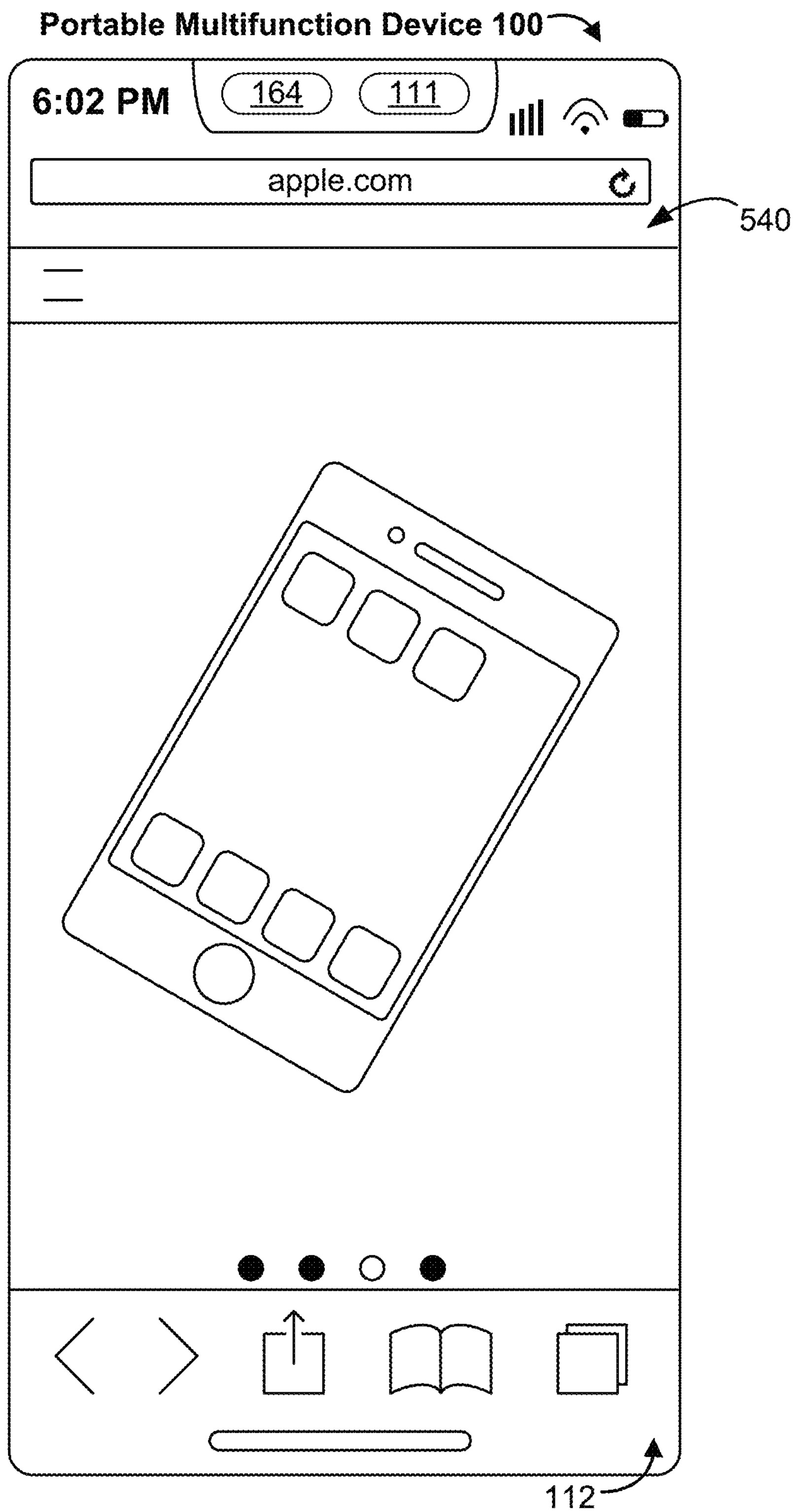
Figure 5A:
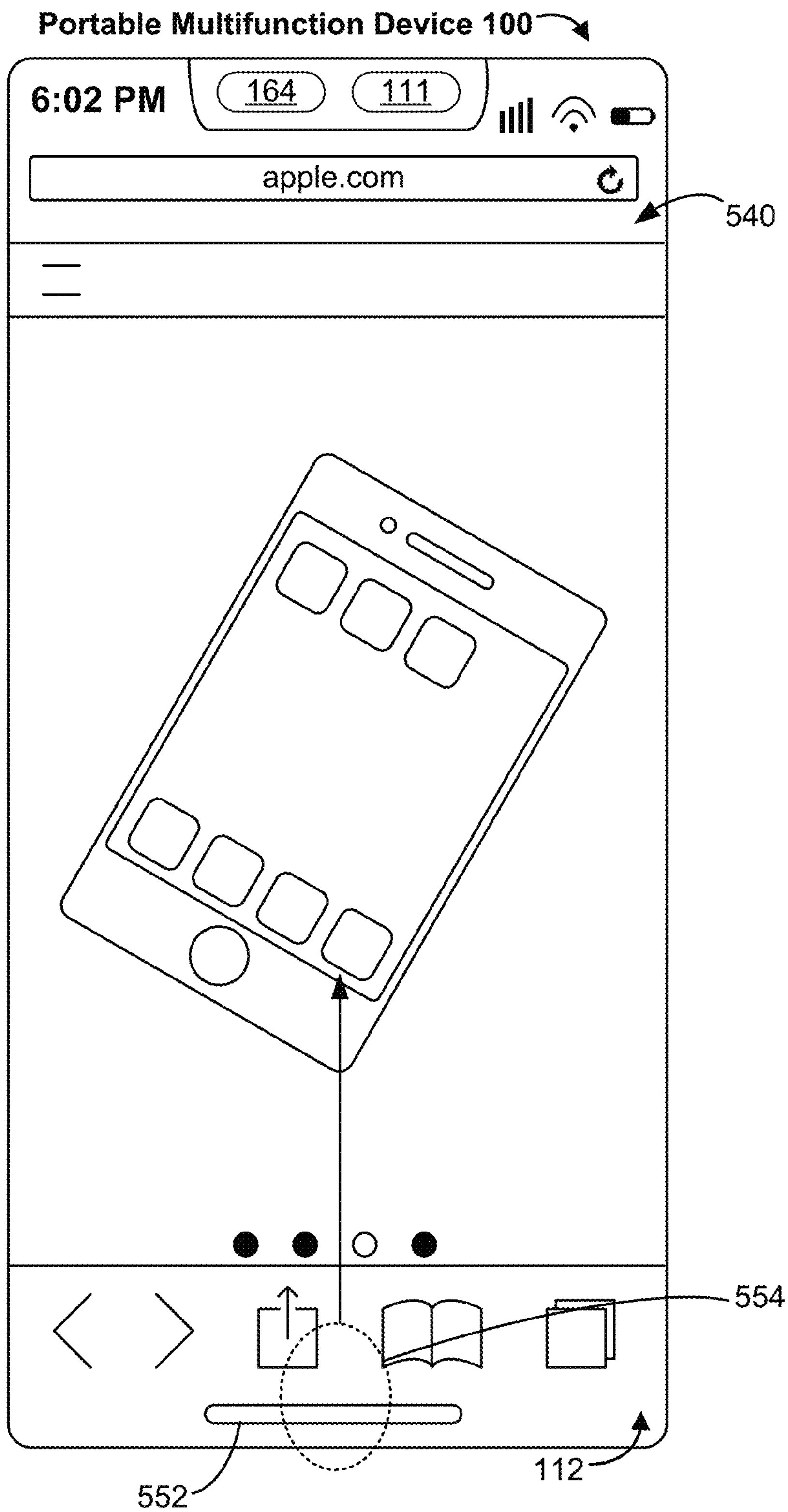
Figure 5A:
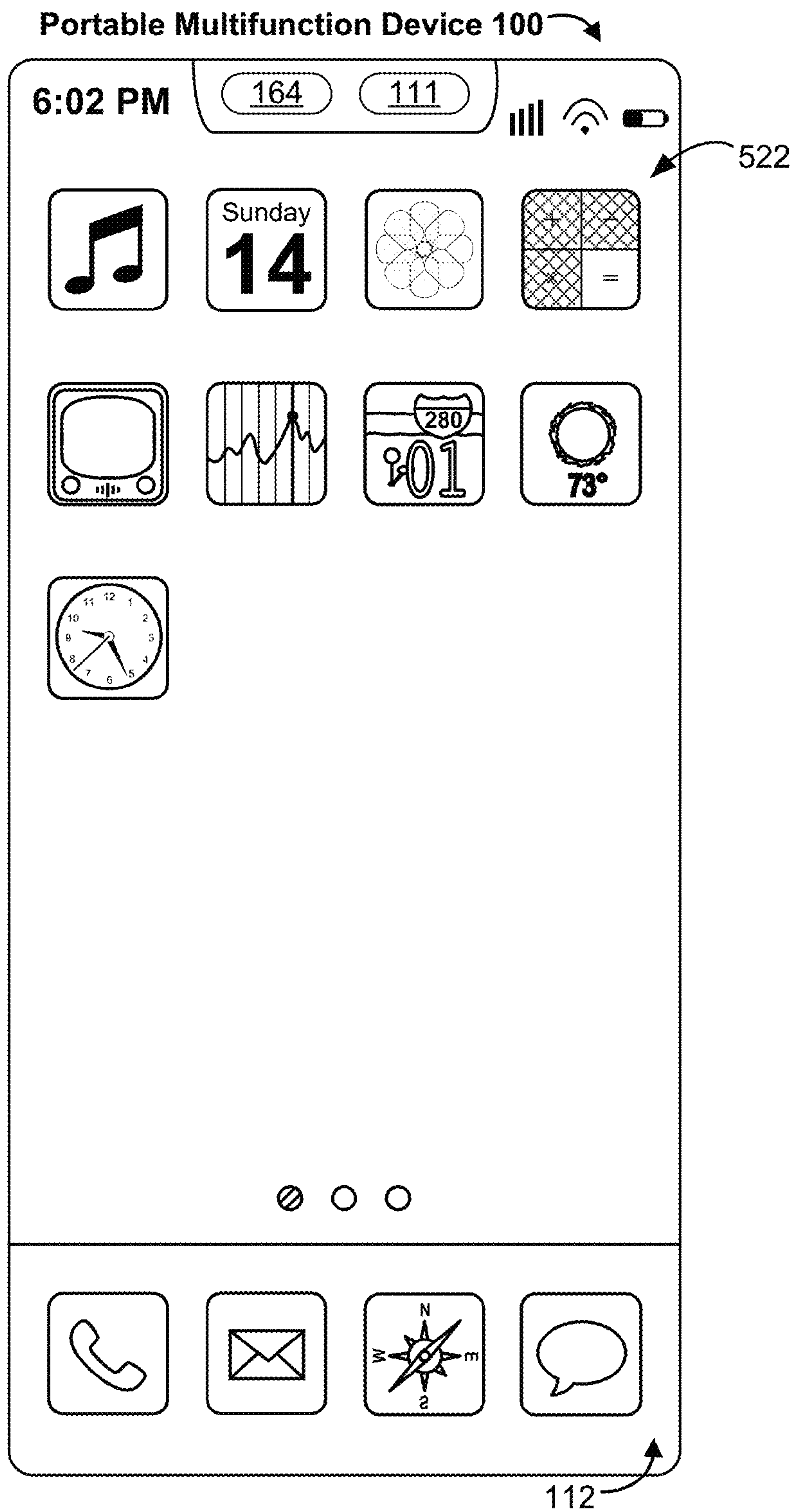
Figure 5A:
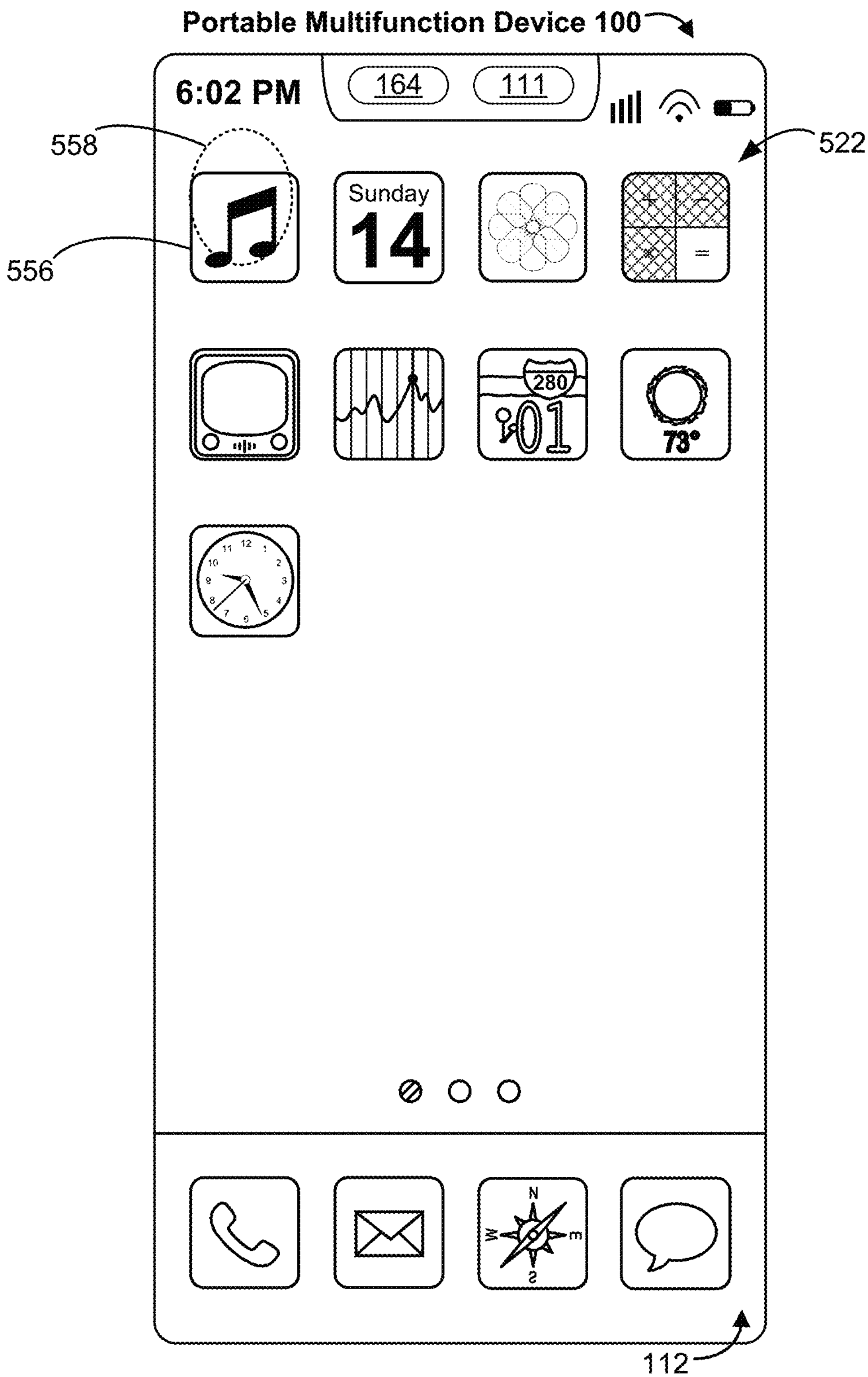
Figure 5A:
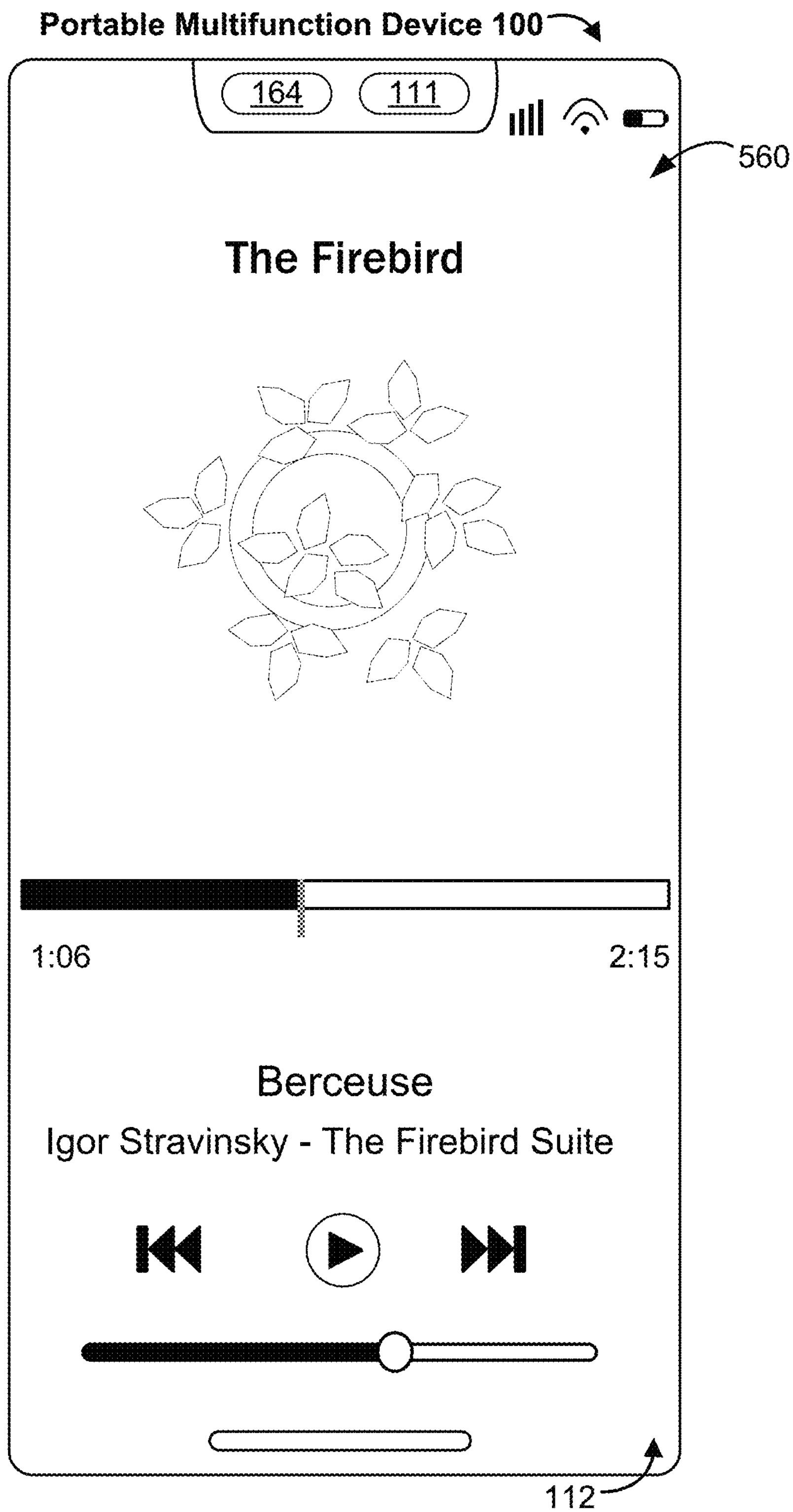
Figure 5A:
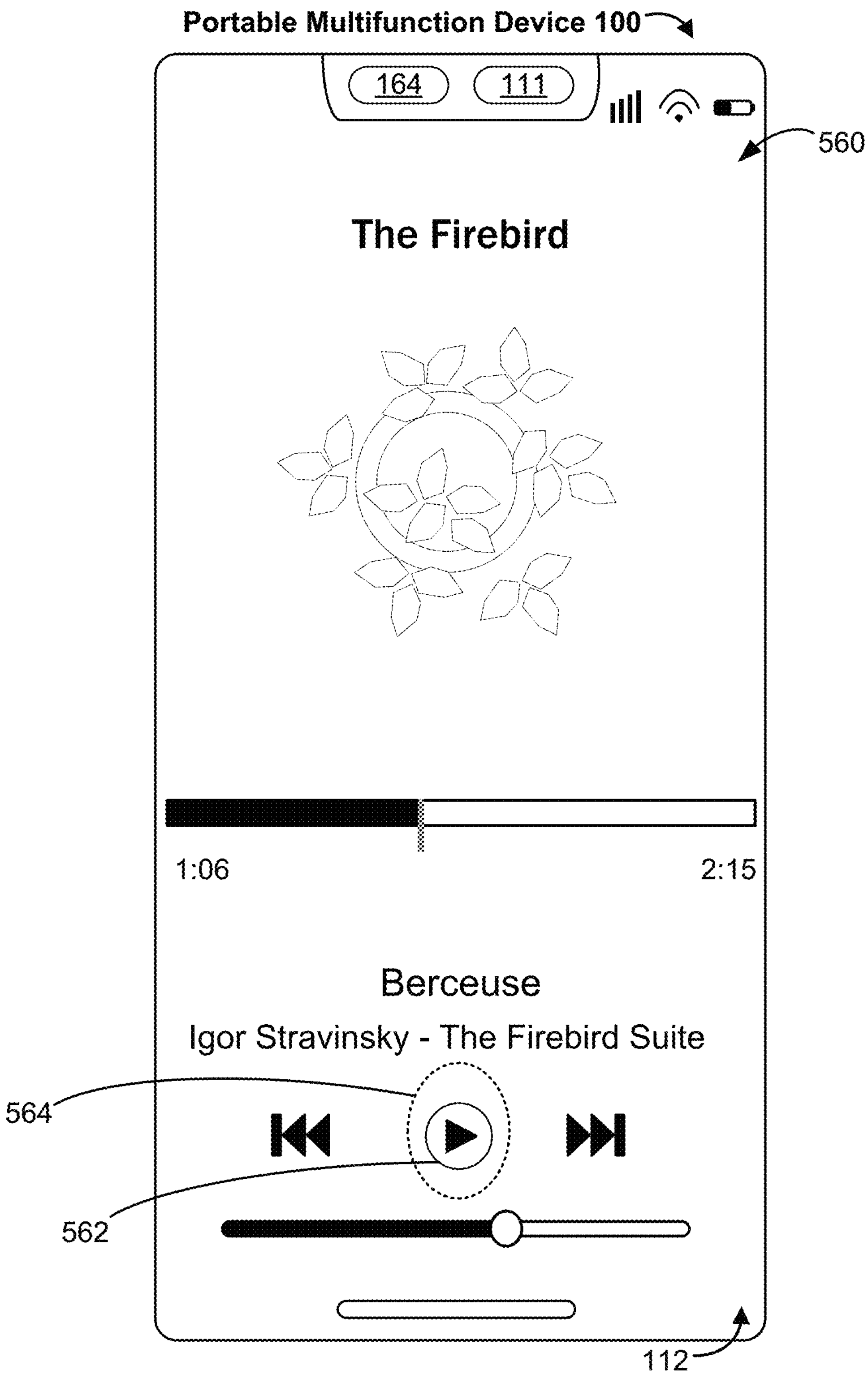
Figure 5A:
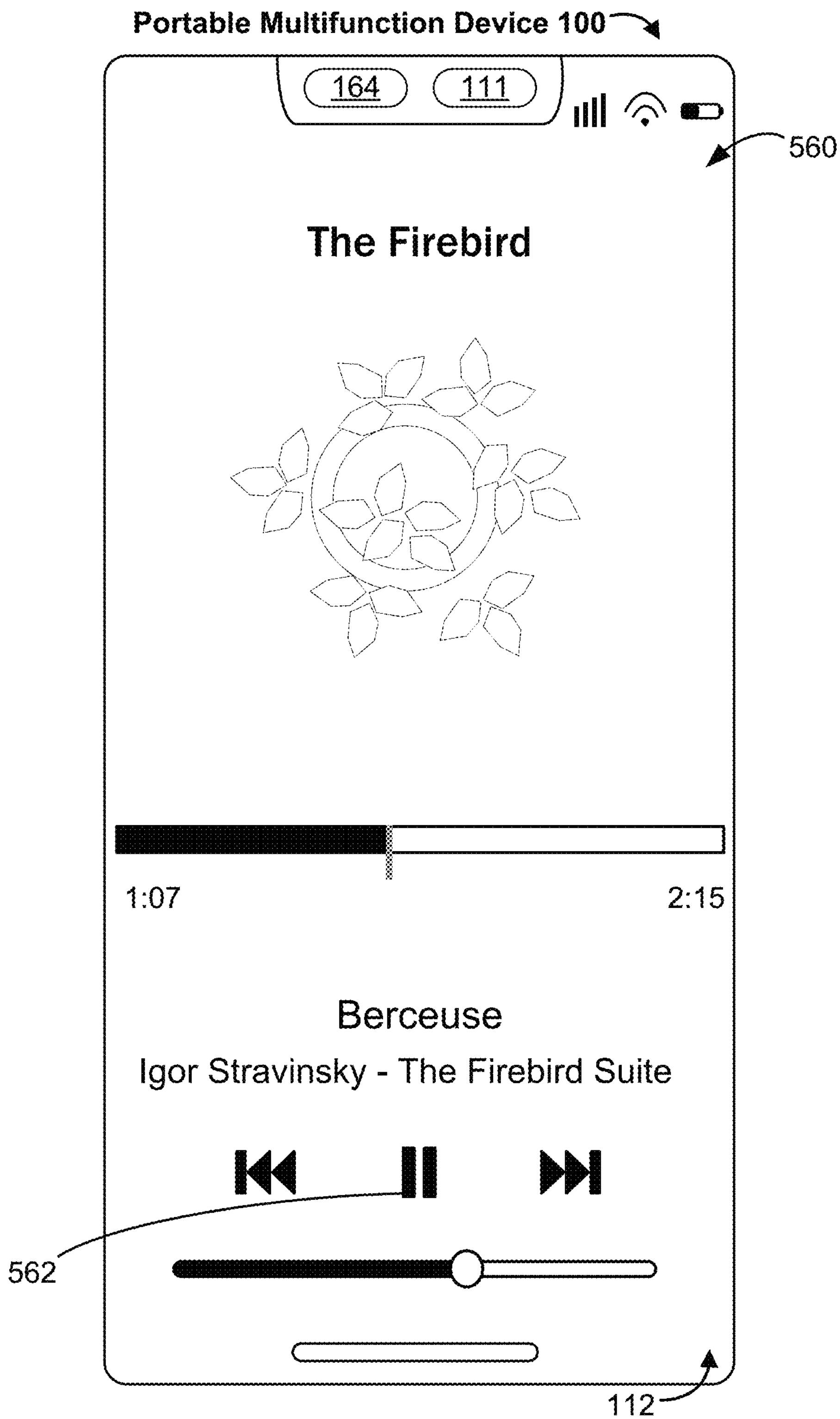
Figure 5A:
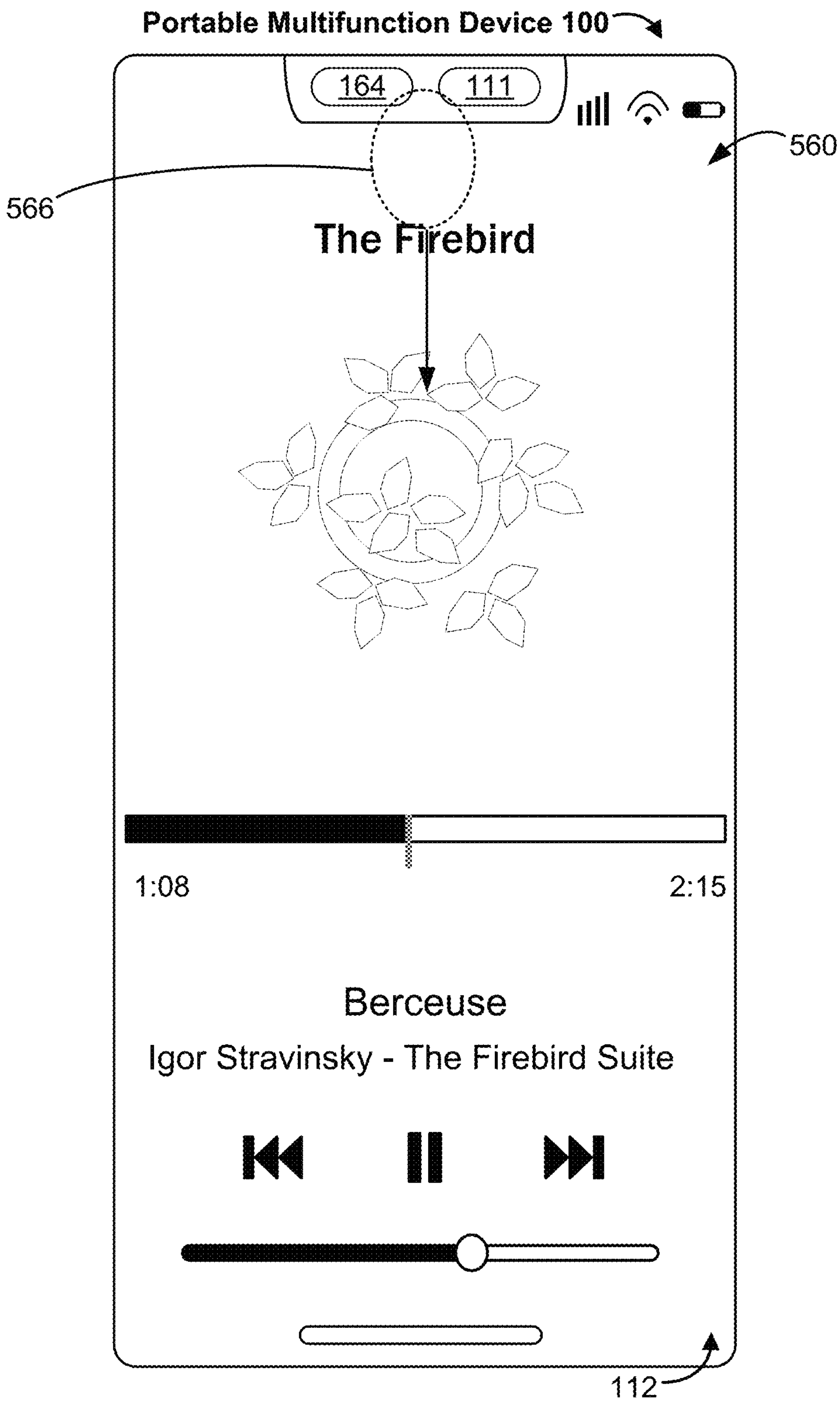
Figure 5A:
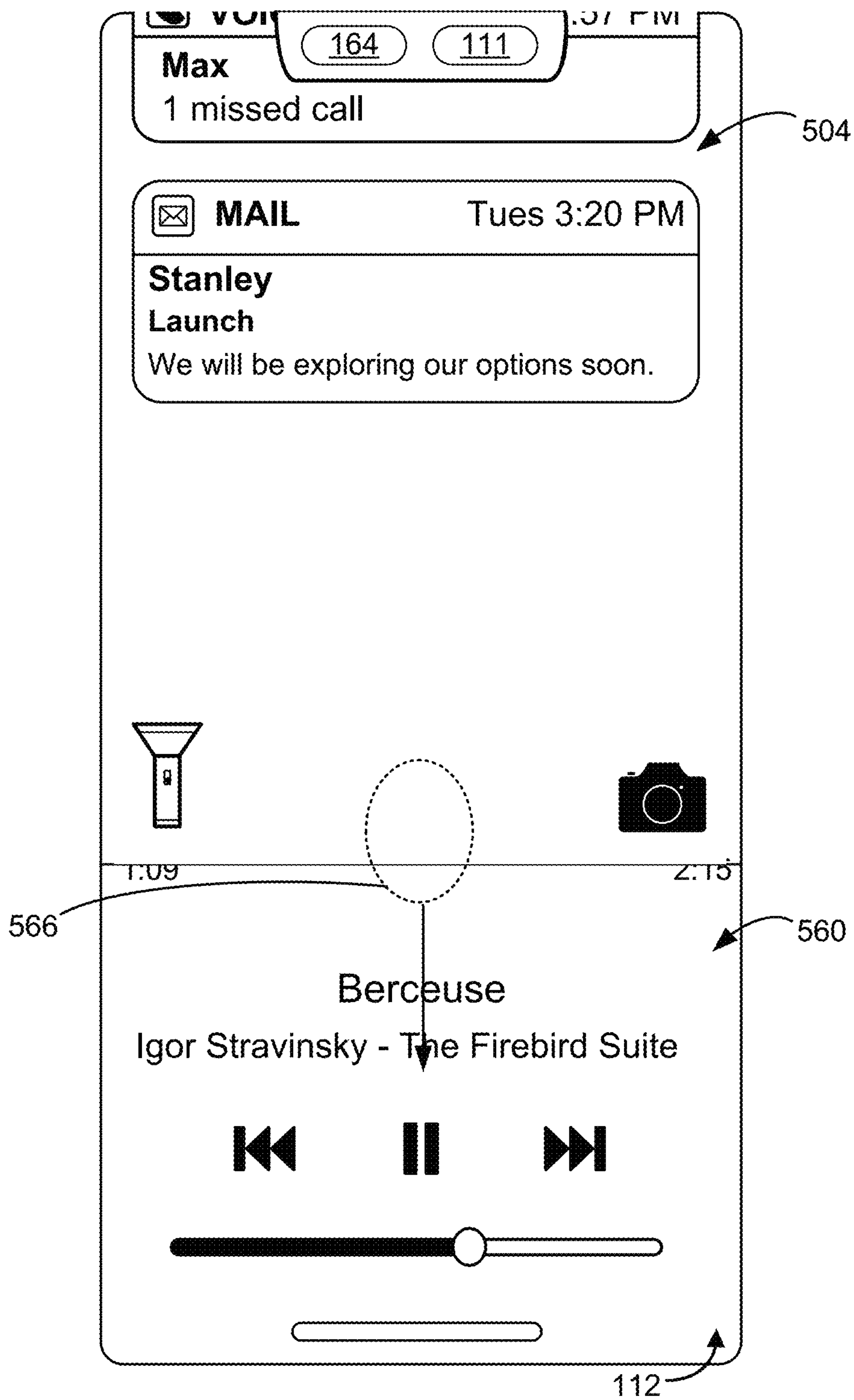
Figure 5A:
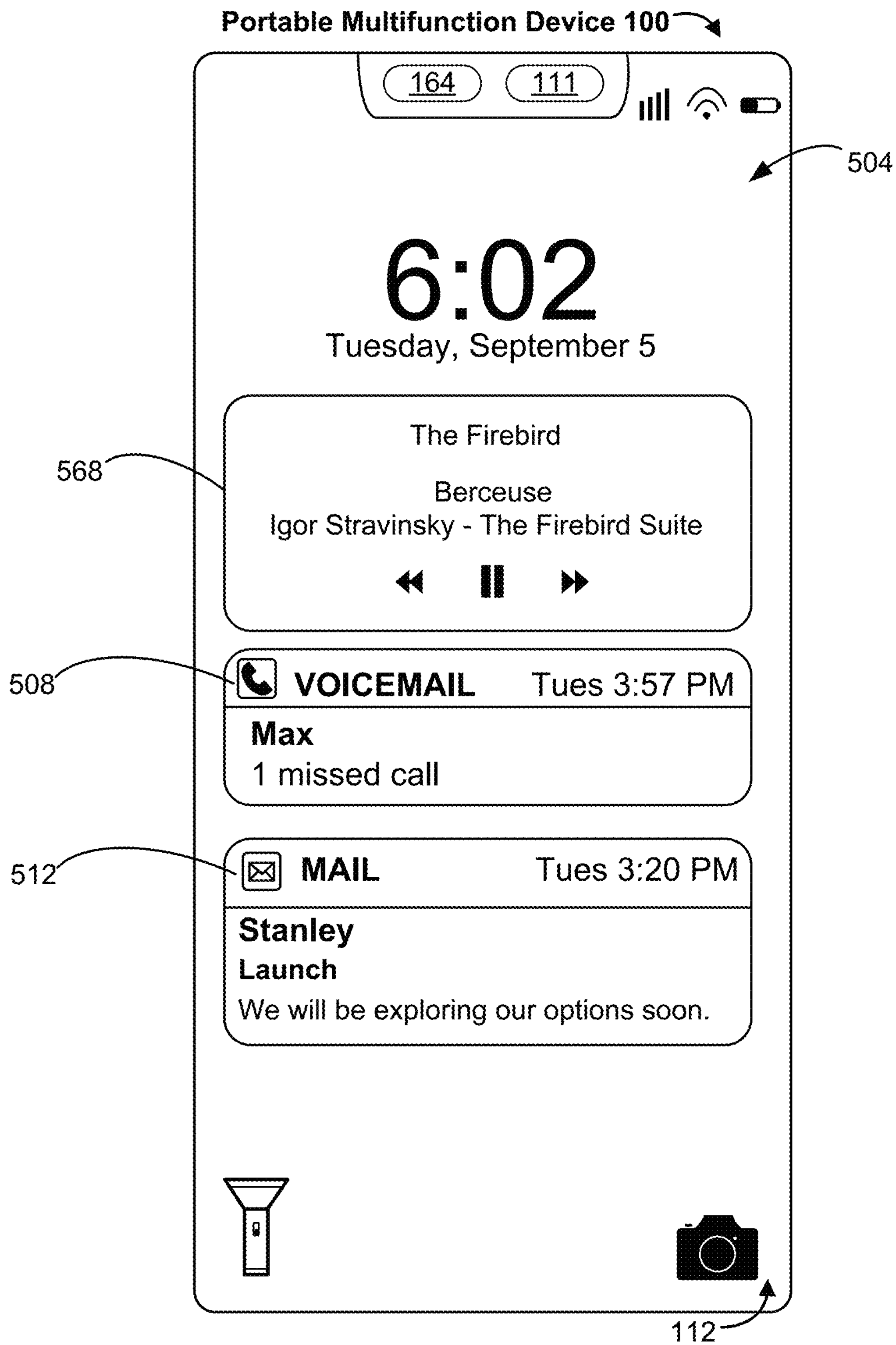
Figure 5A:
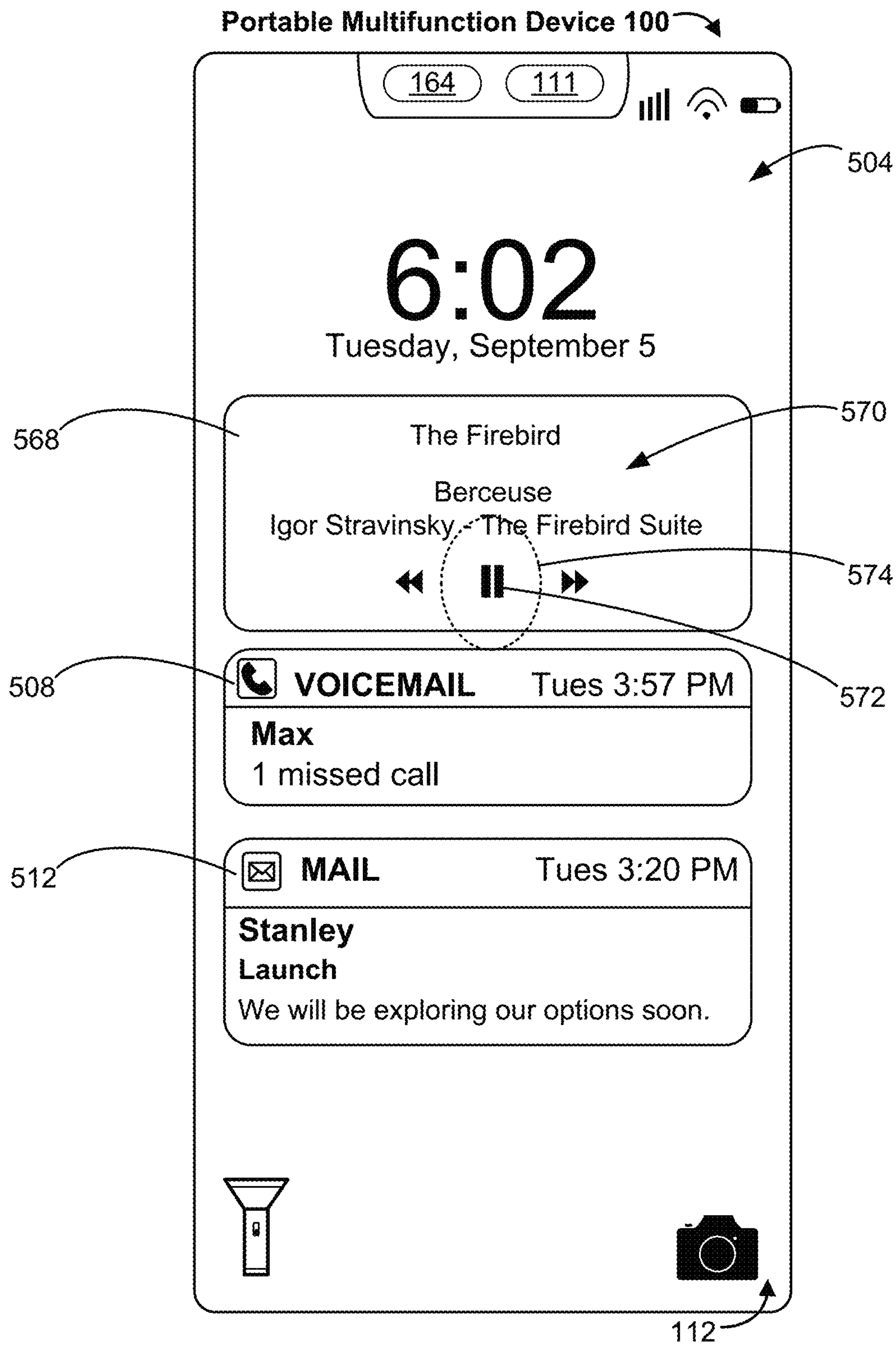
Figure 5A:
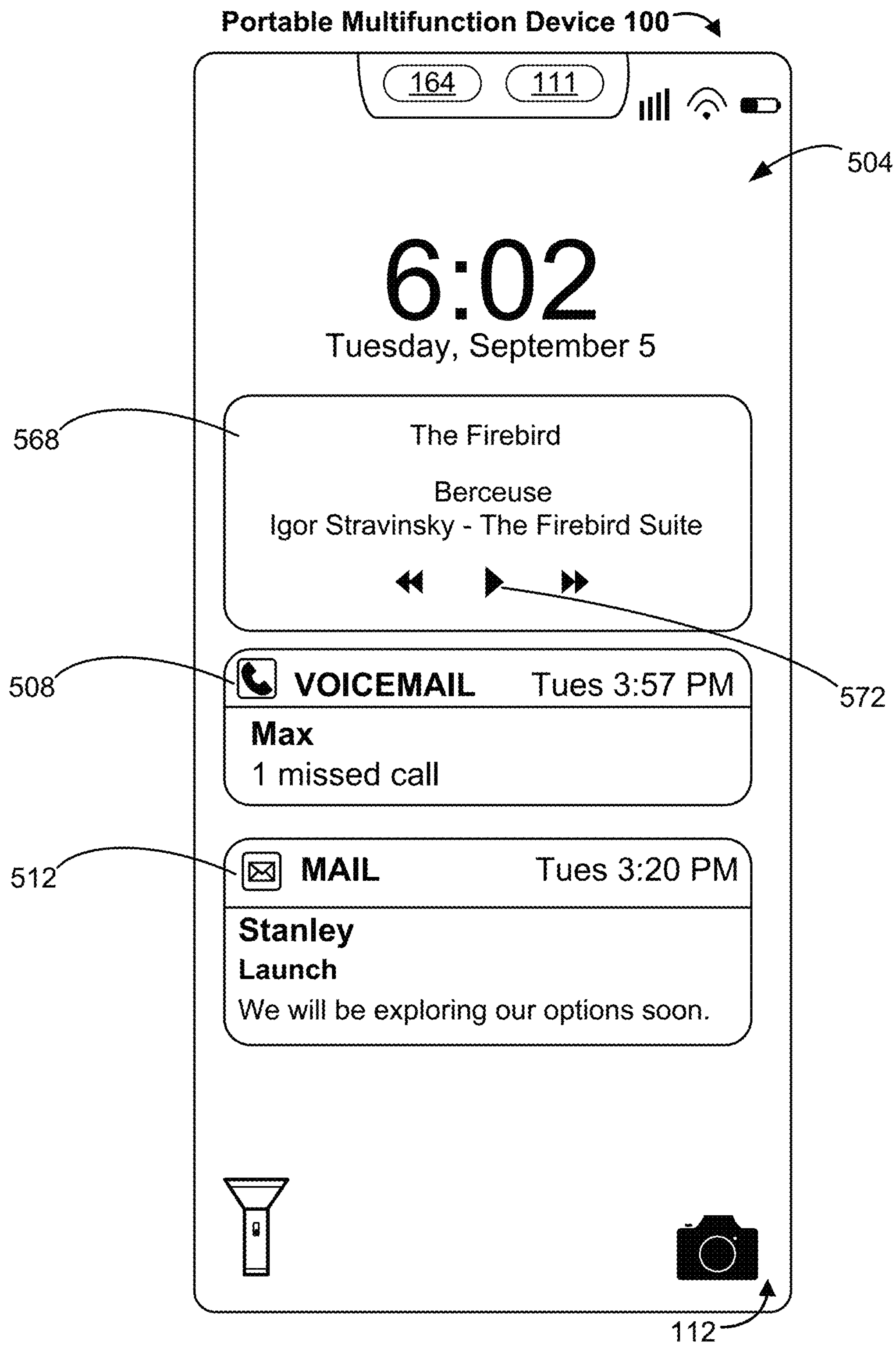
Figure 5A:
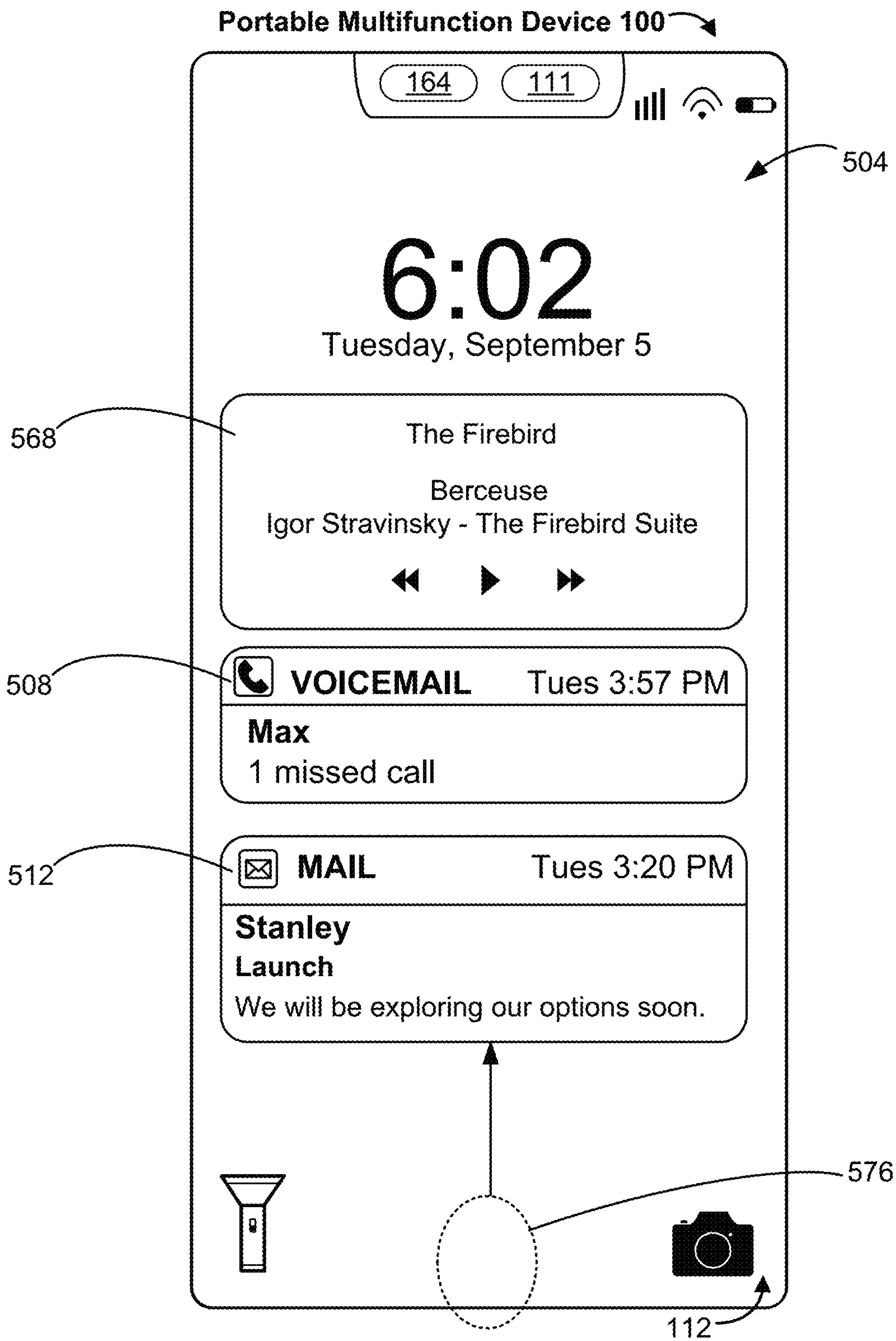
Figure 5A:
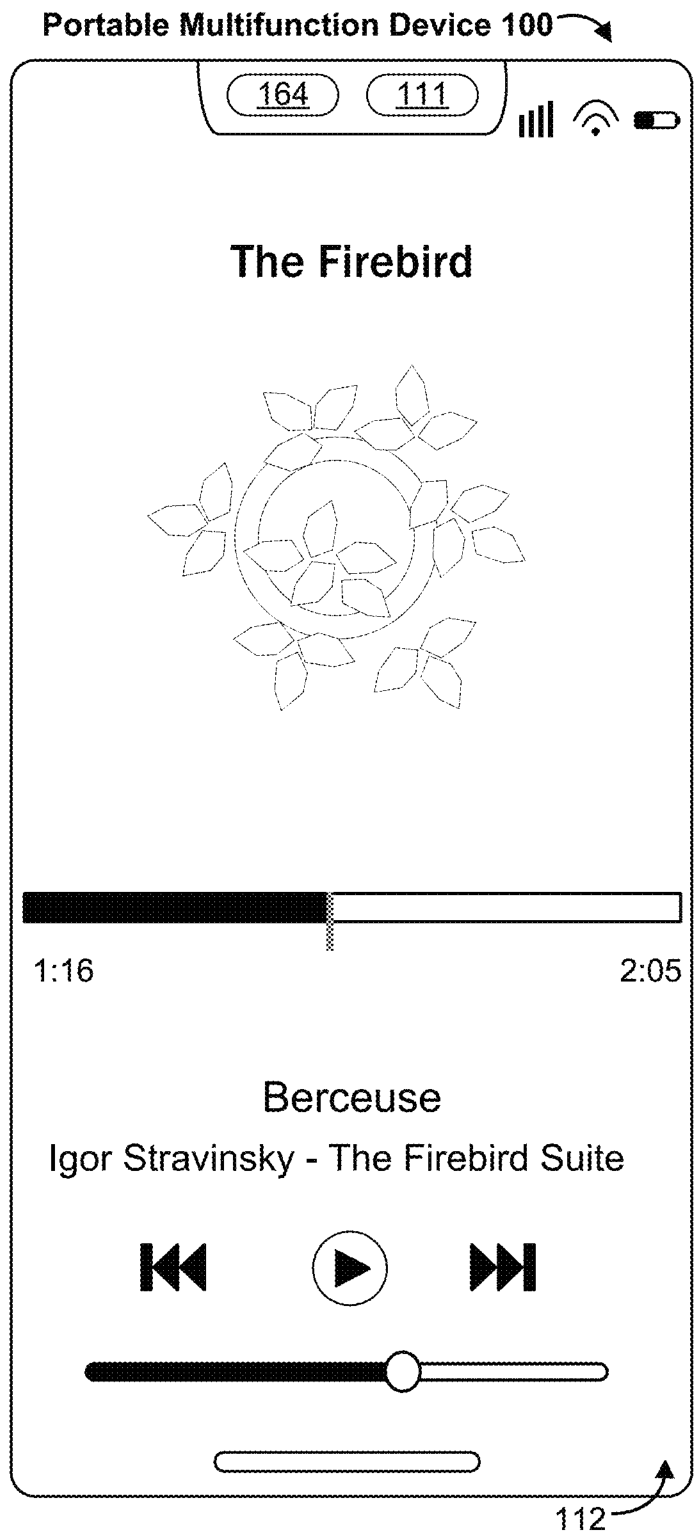
Figure 5A:
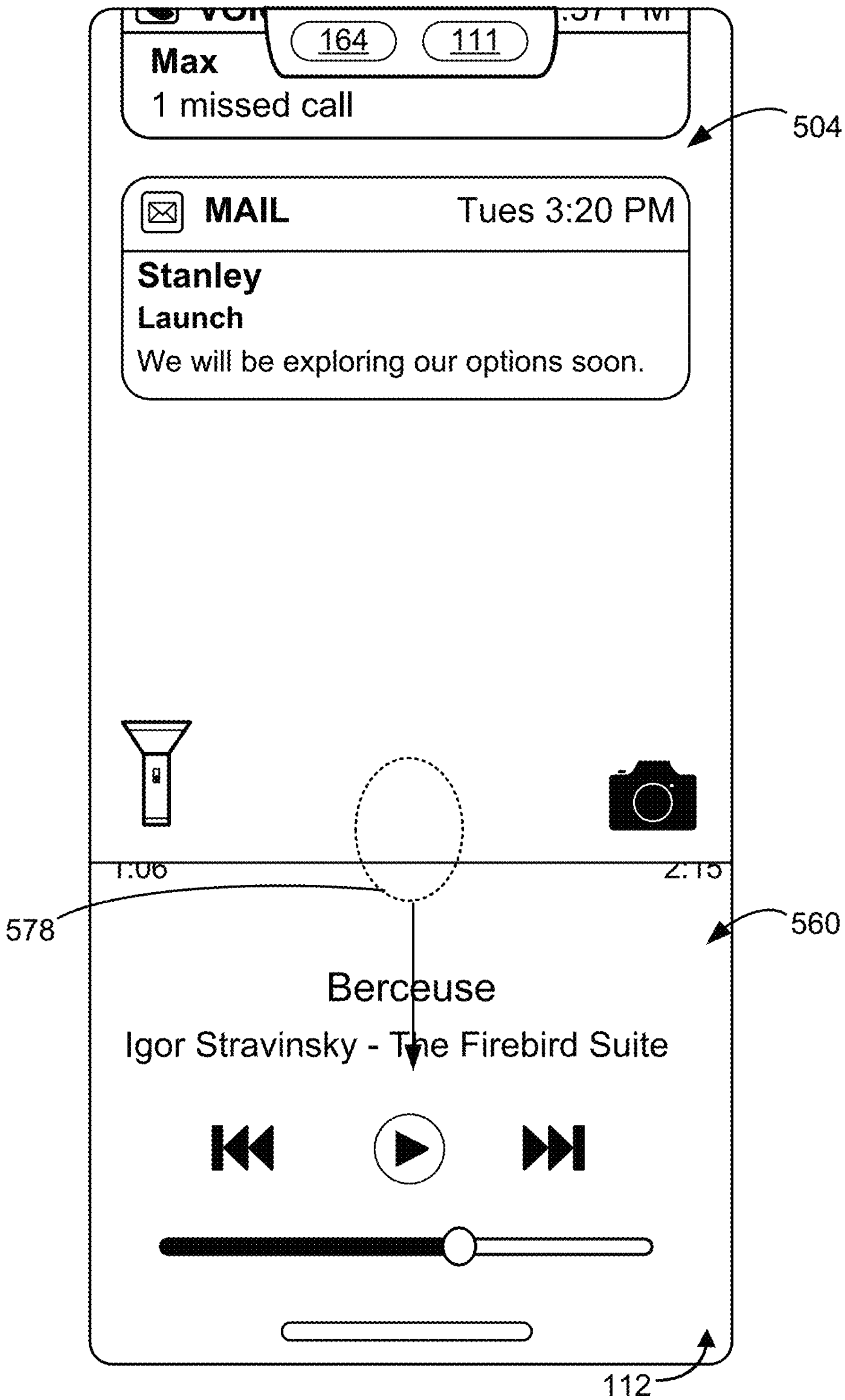
Figure 5A:
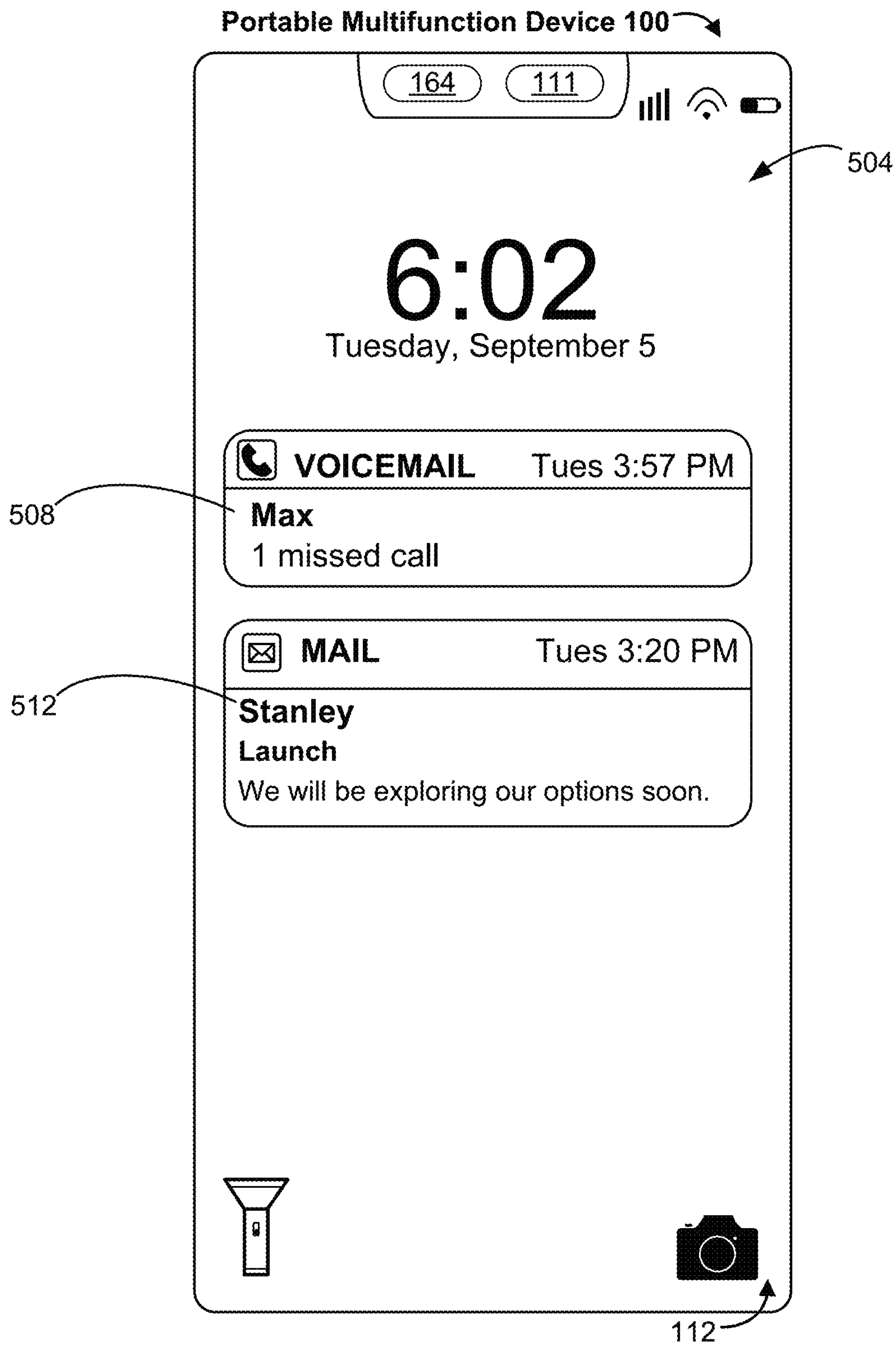
Figure 5A:
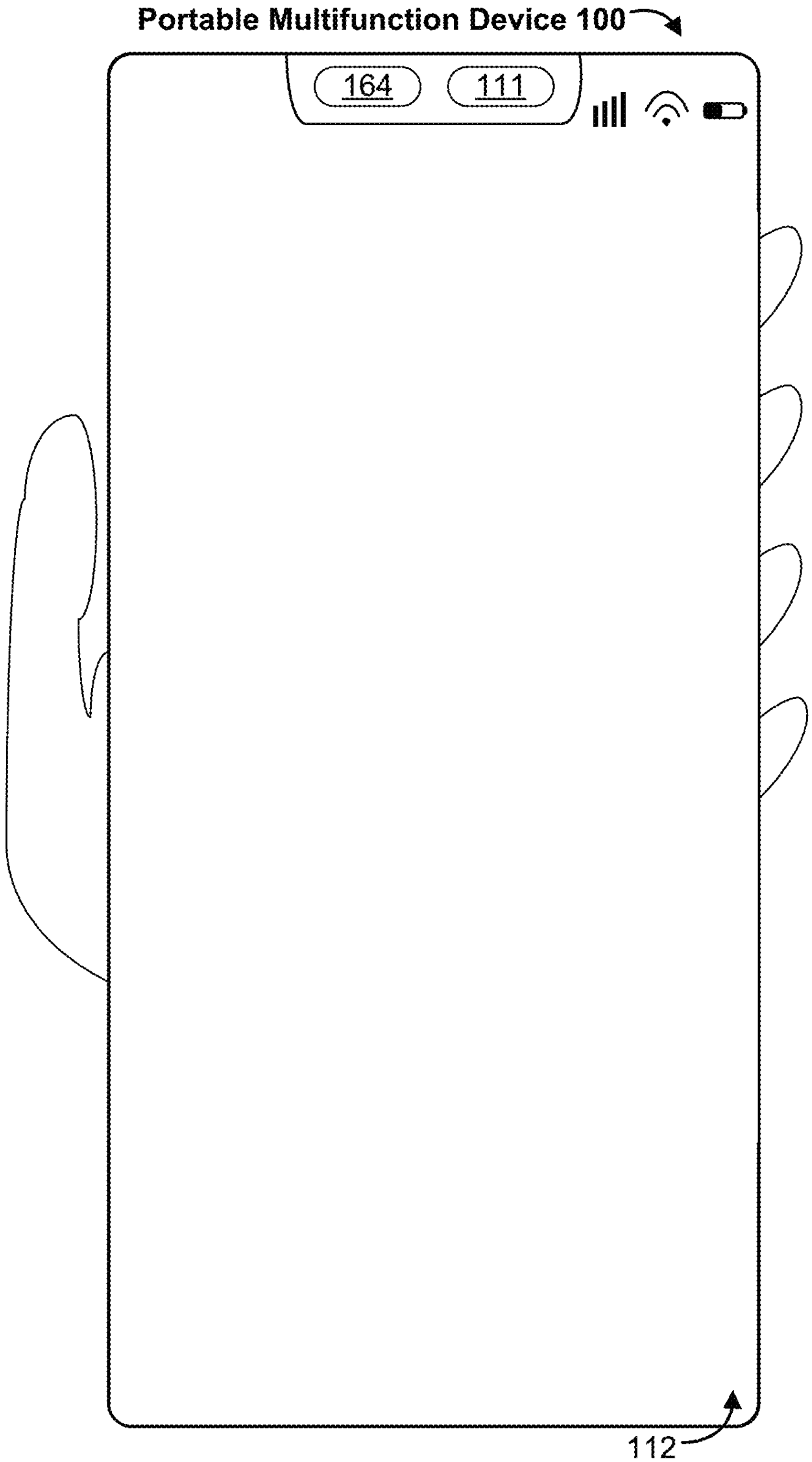
Figure 5A:
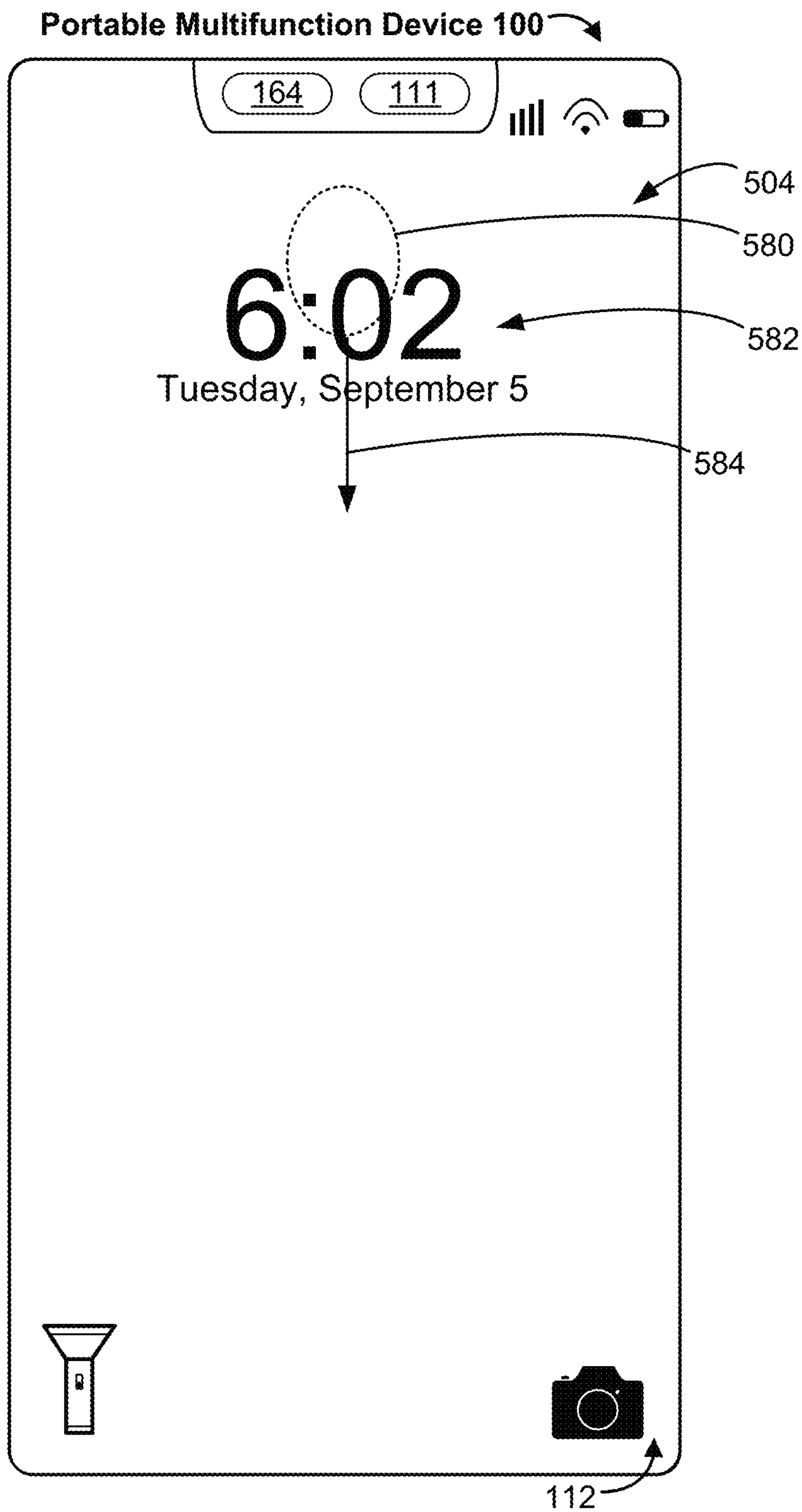
Figure 5A:
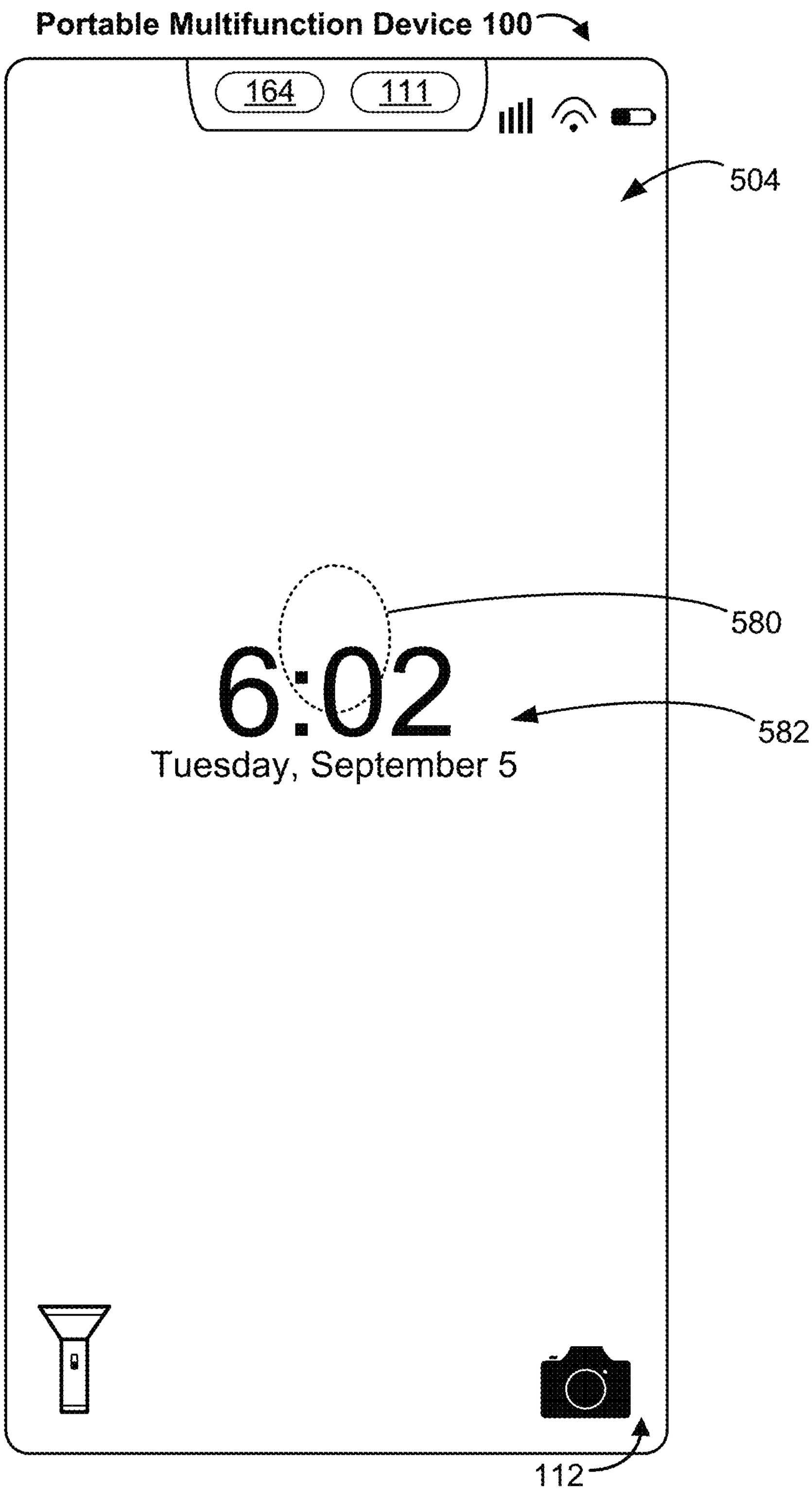
Figure 5A:
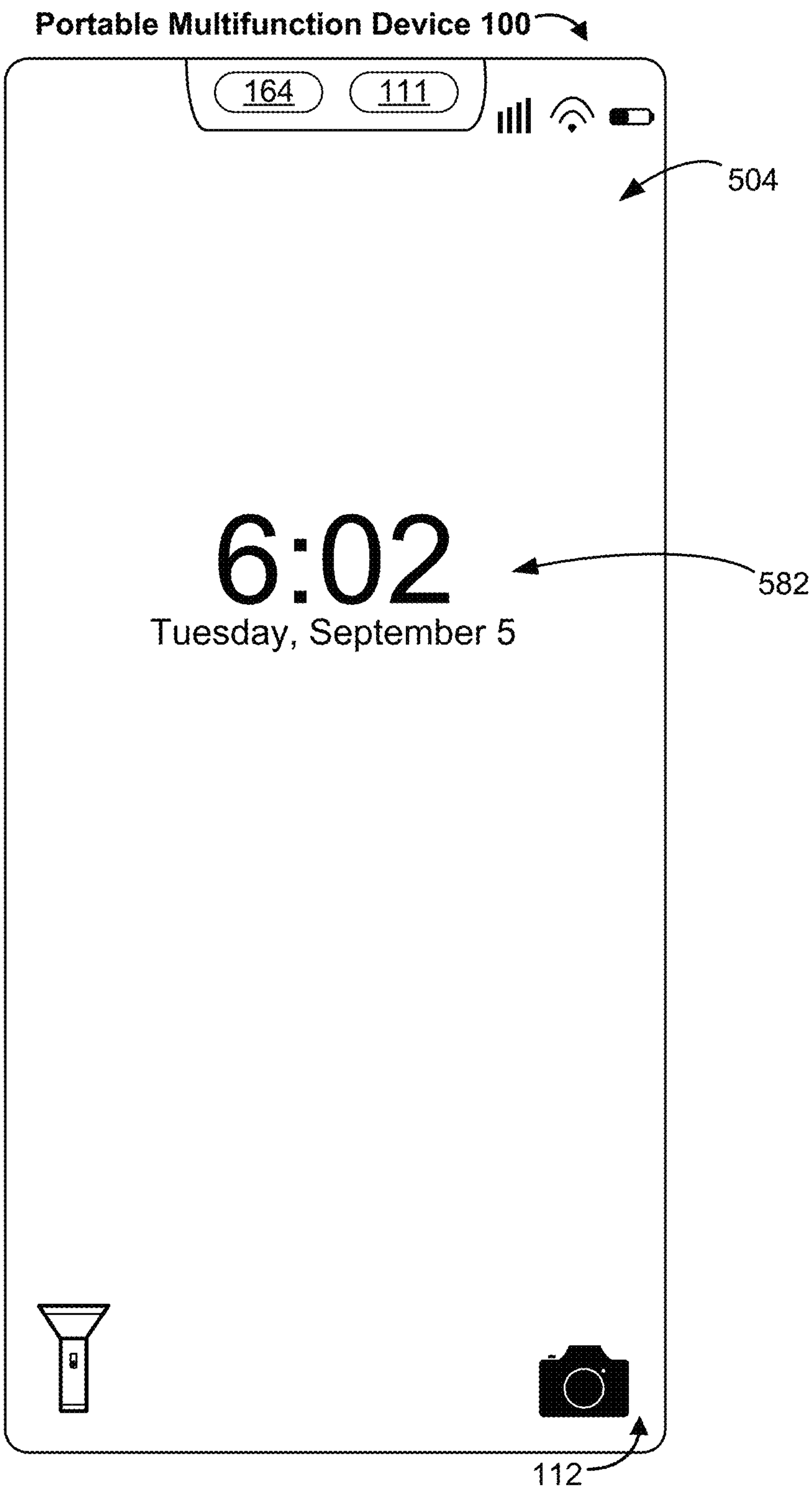
Figure 5A:
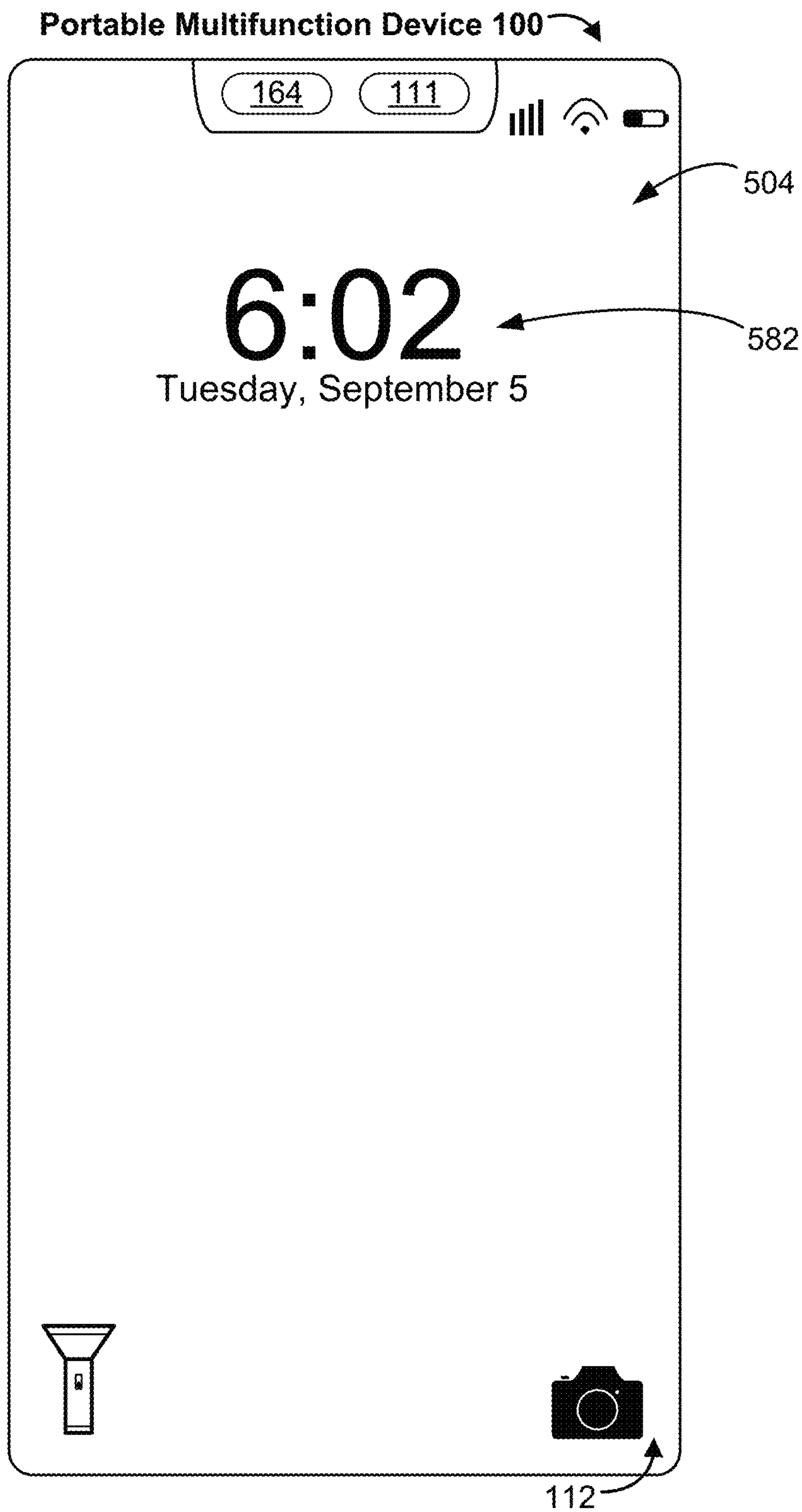
Figure 5B:
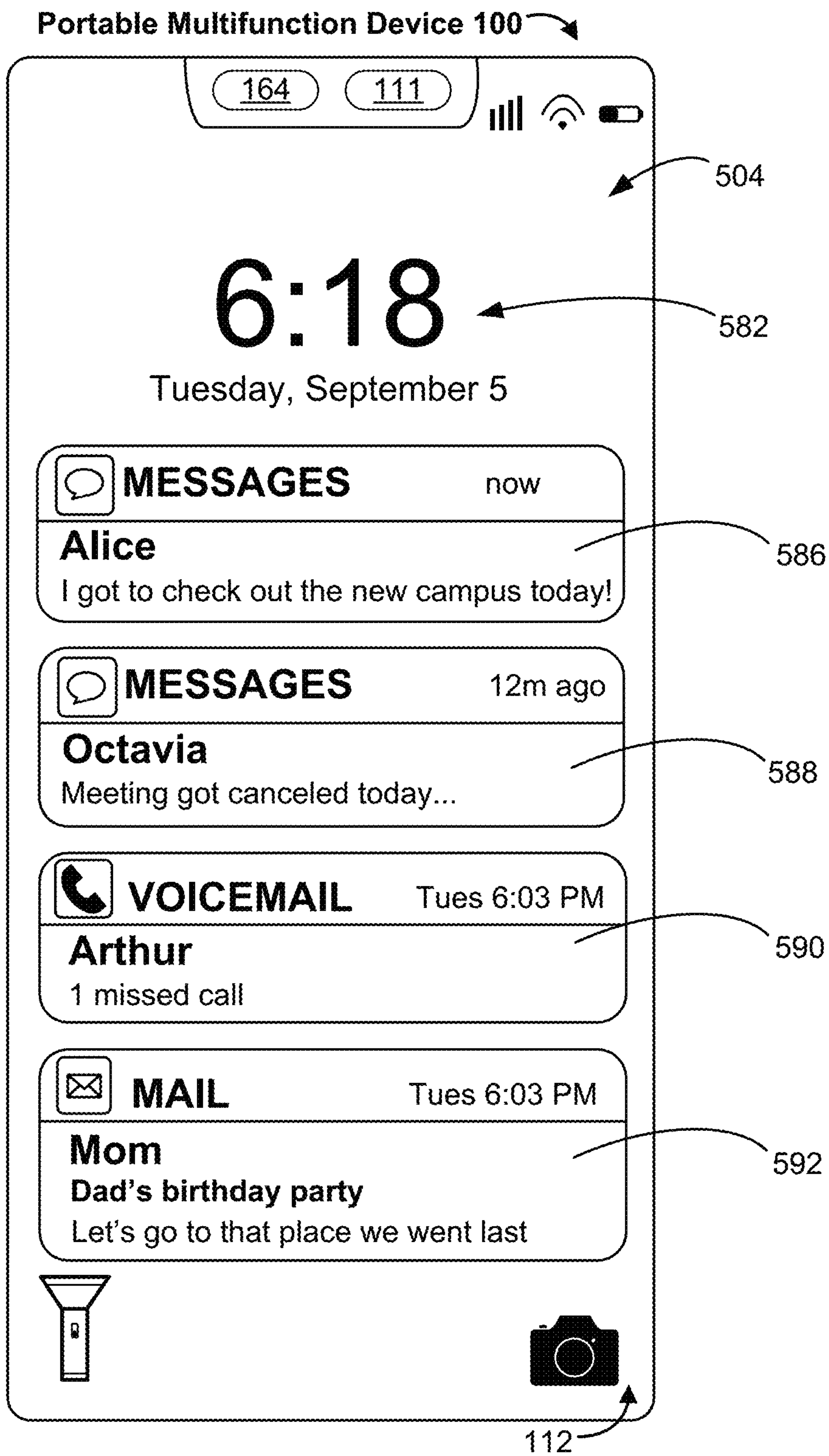
Figure 5B:
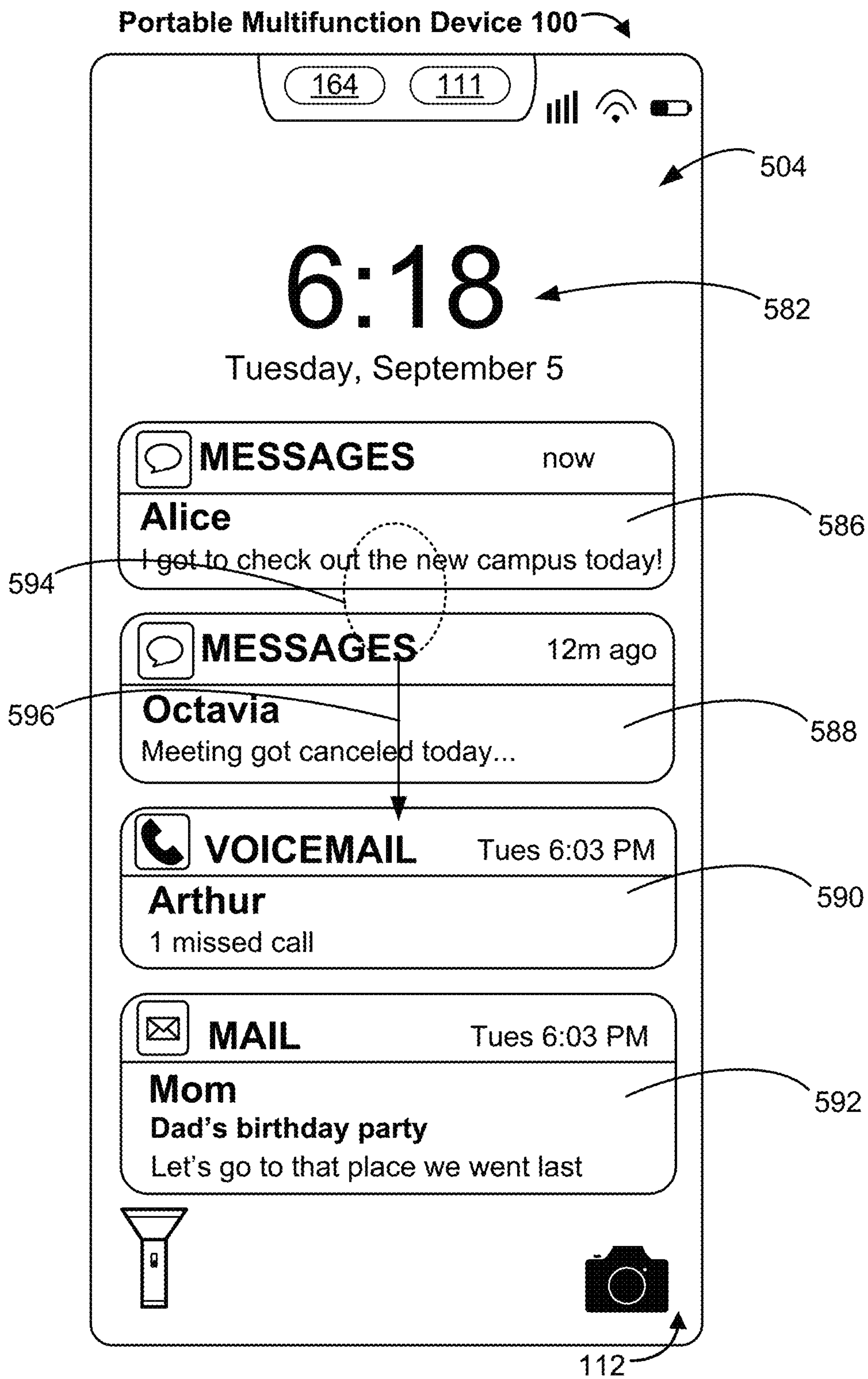
Figure 5B:
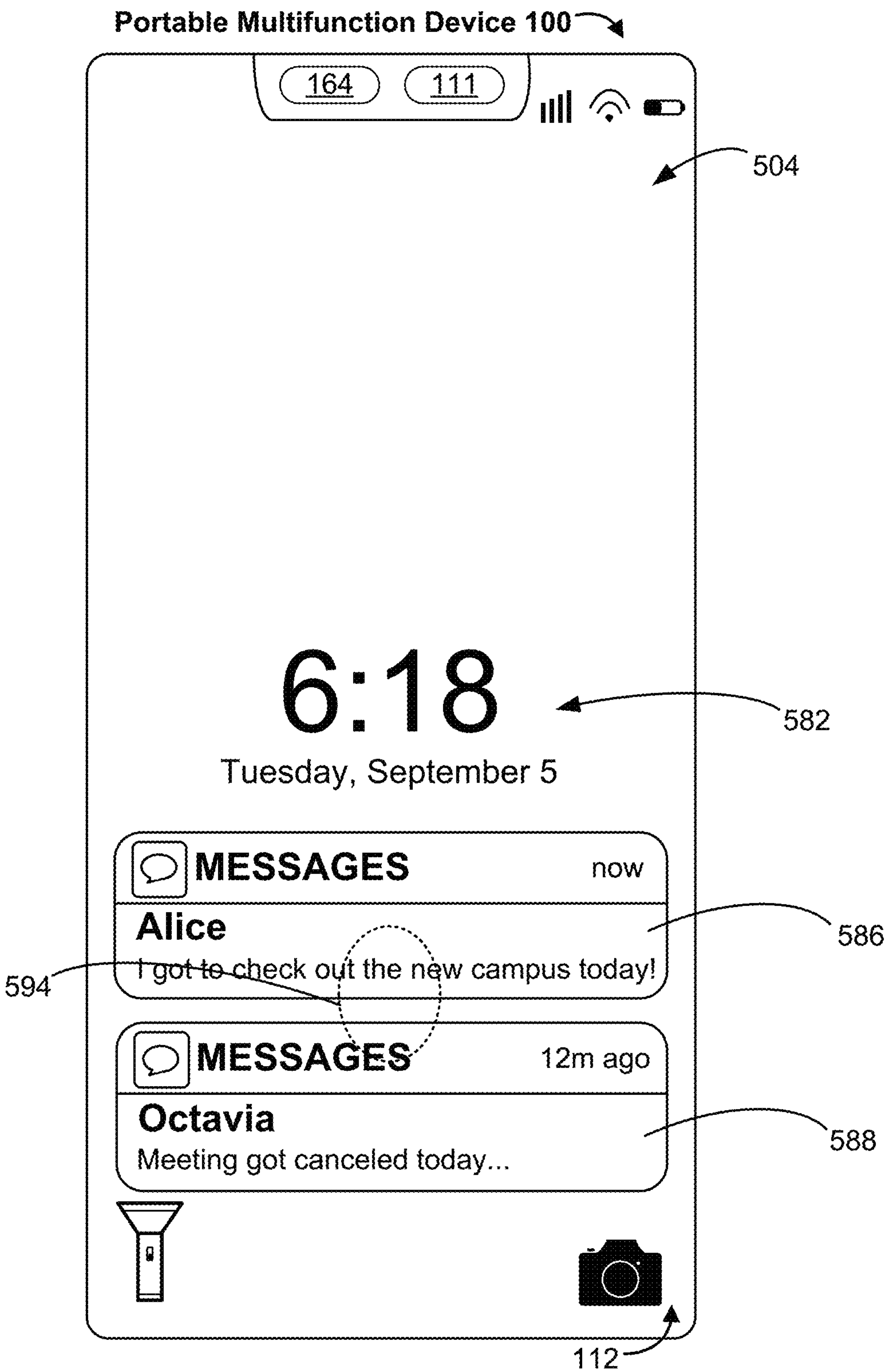
Figure 5B:
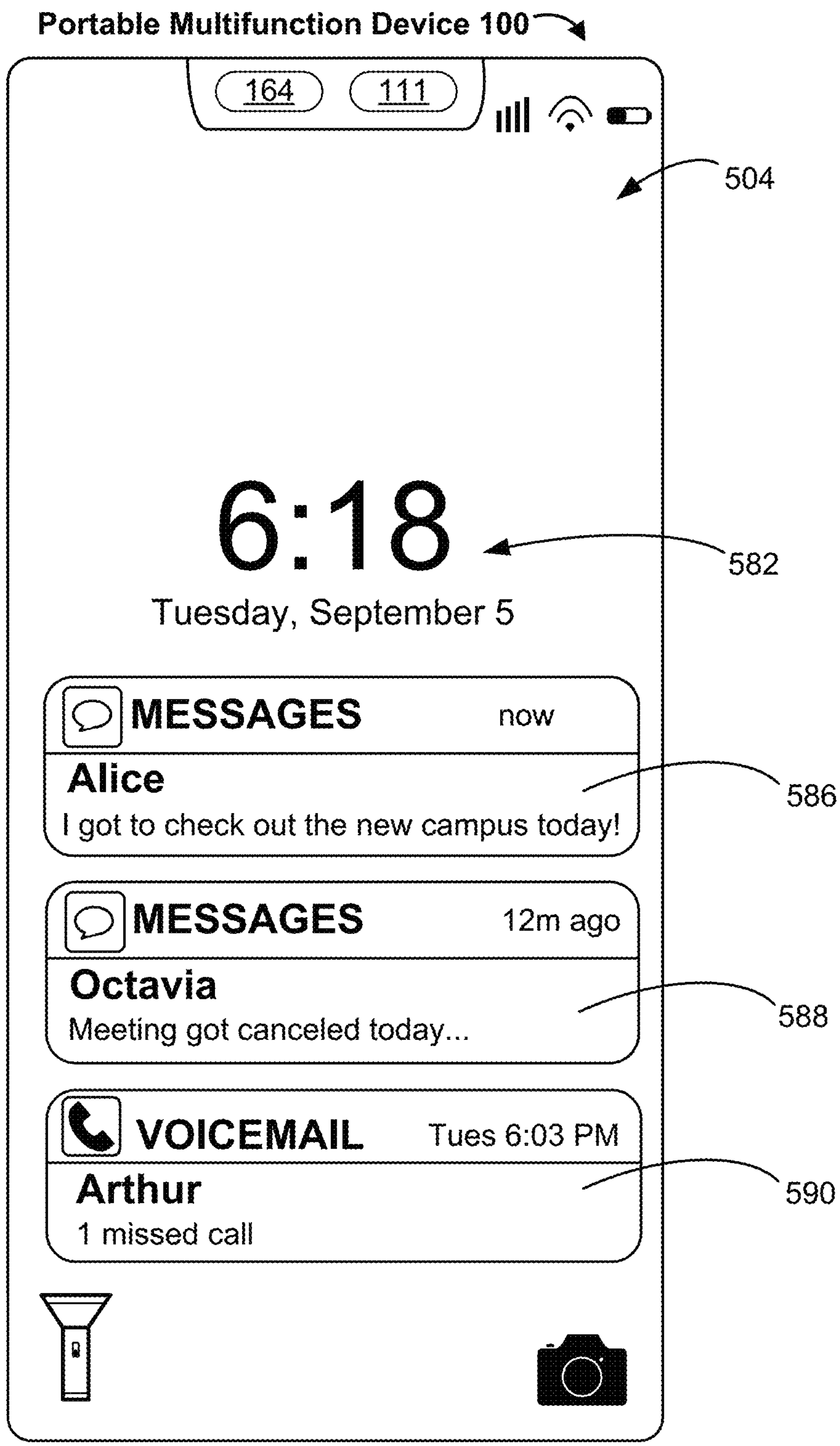
Figure 5B:
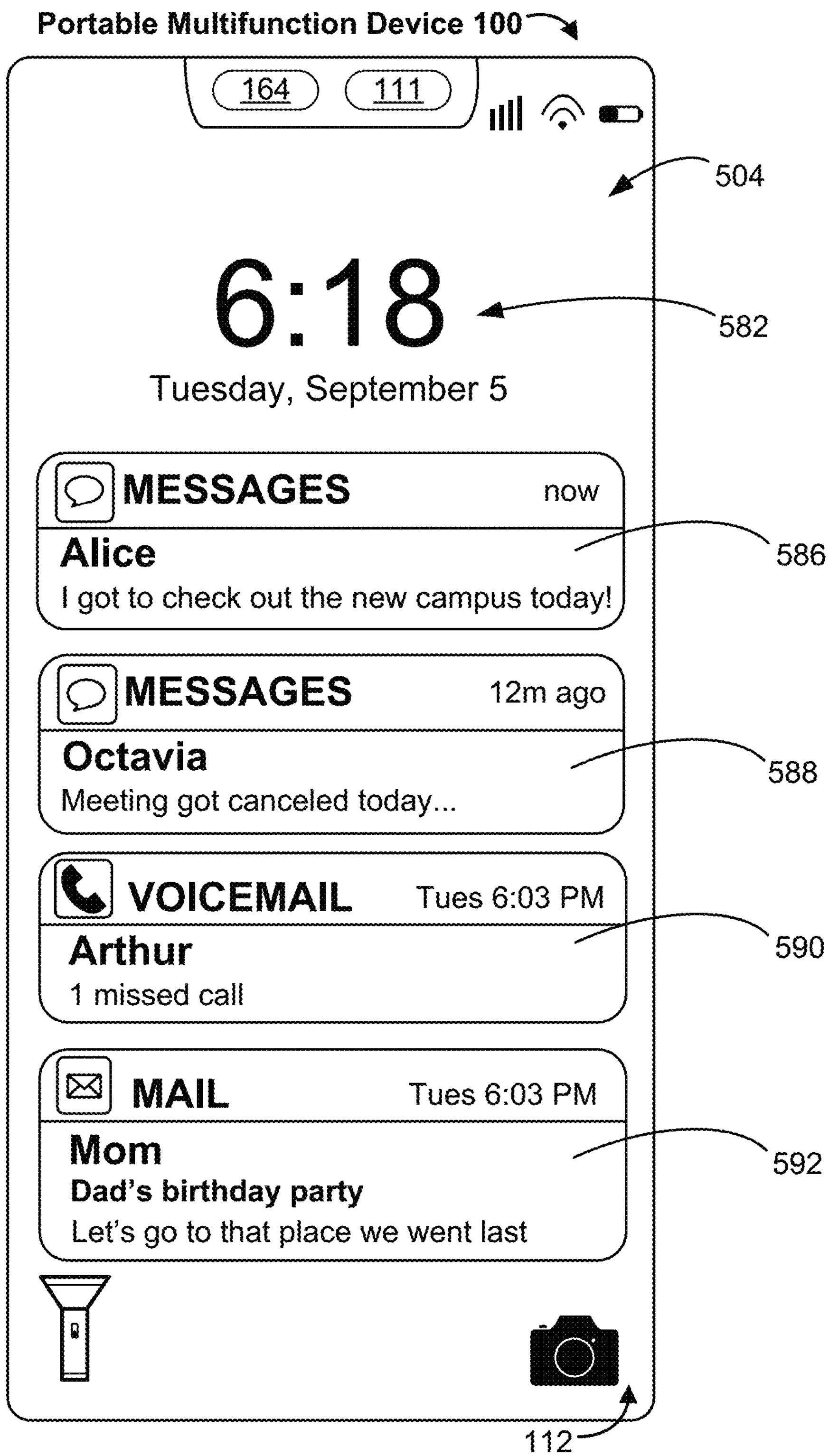
Figure 5B:
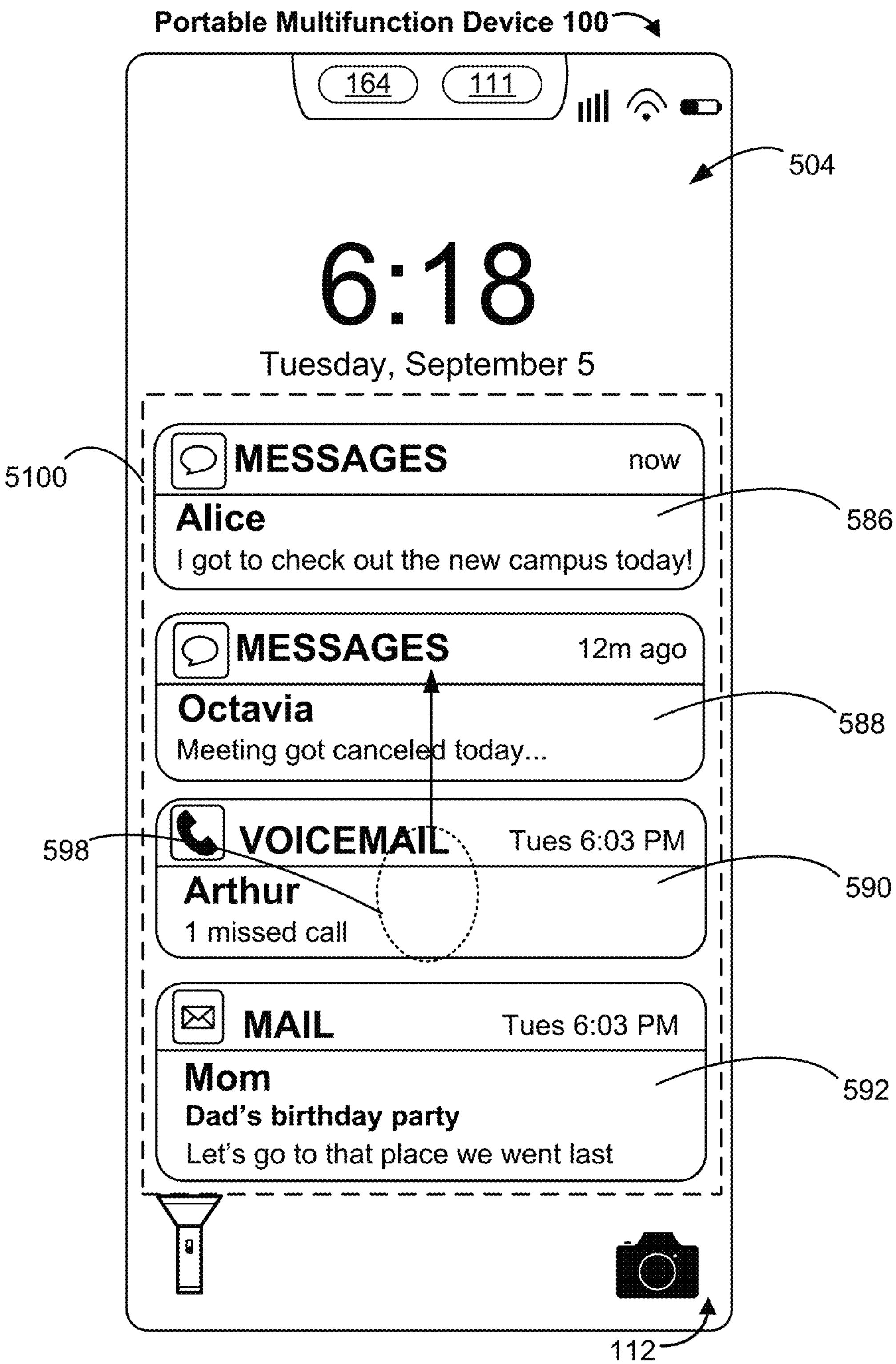
Figure 5B:
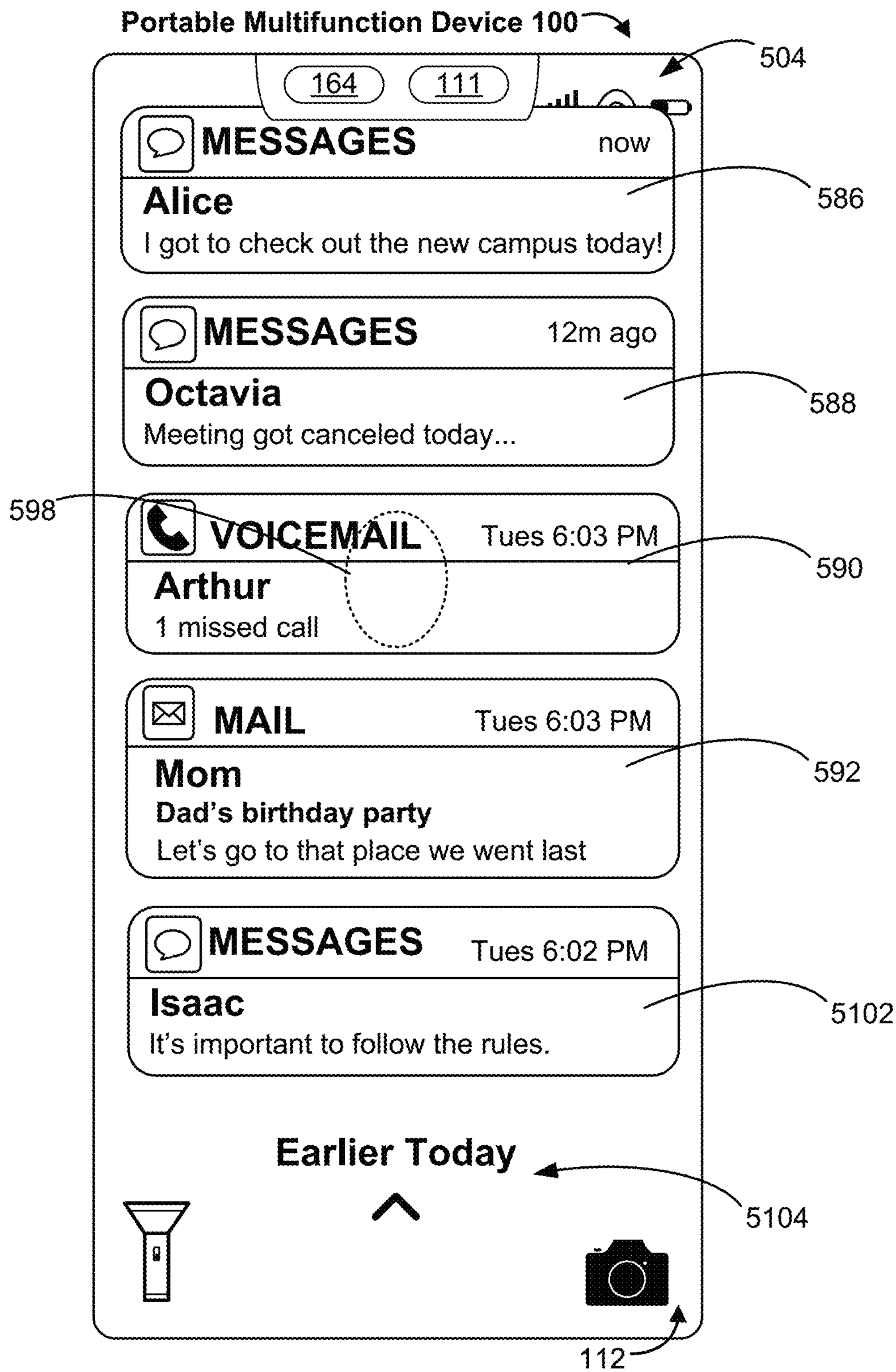
Figure 5B:
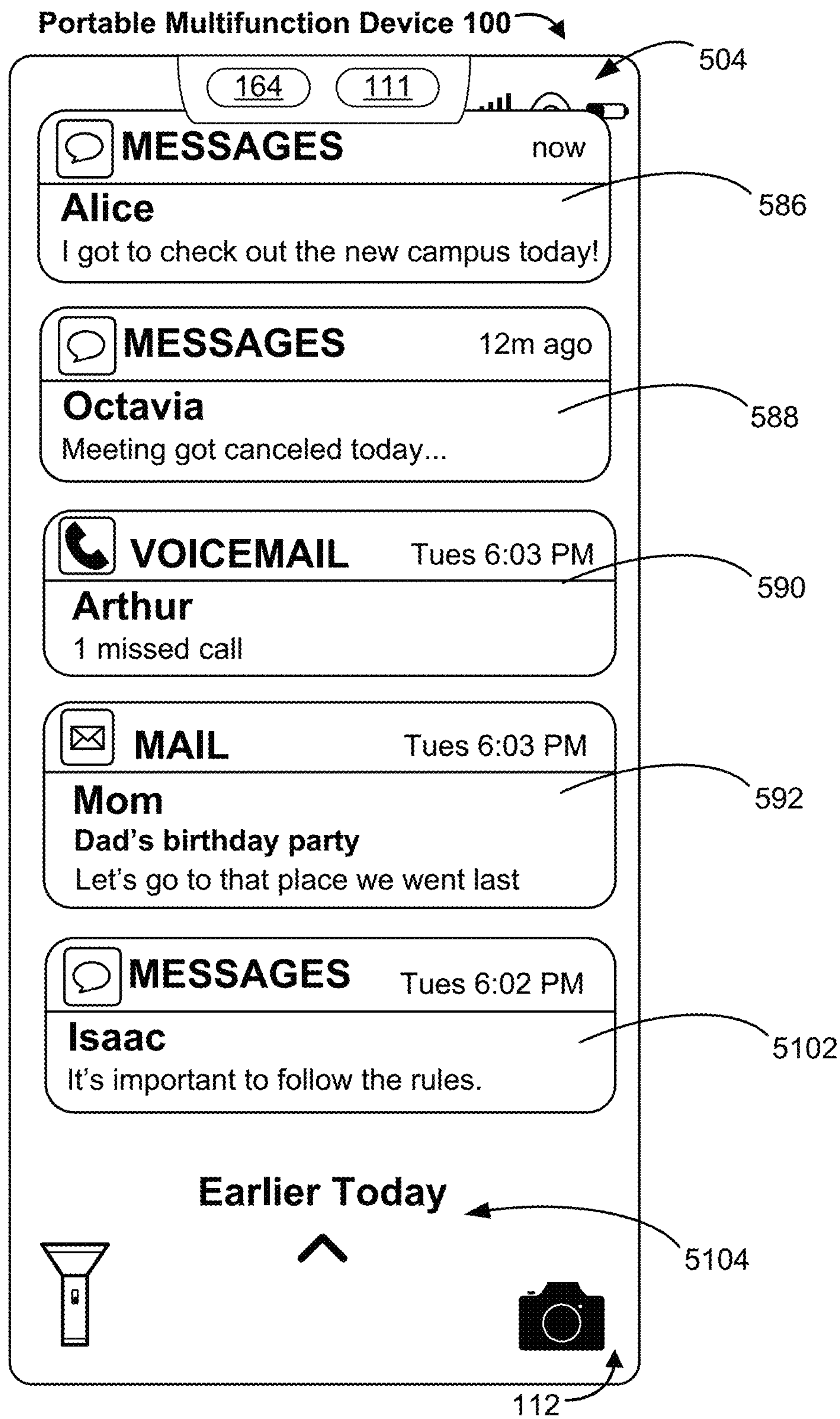
Figure 5B:
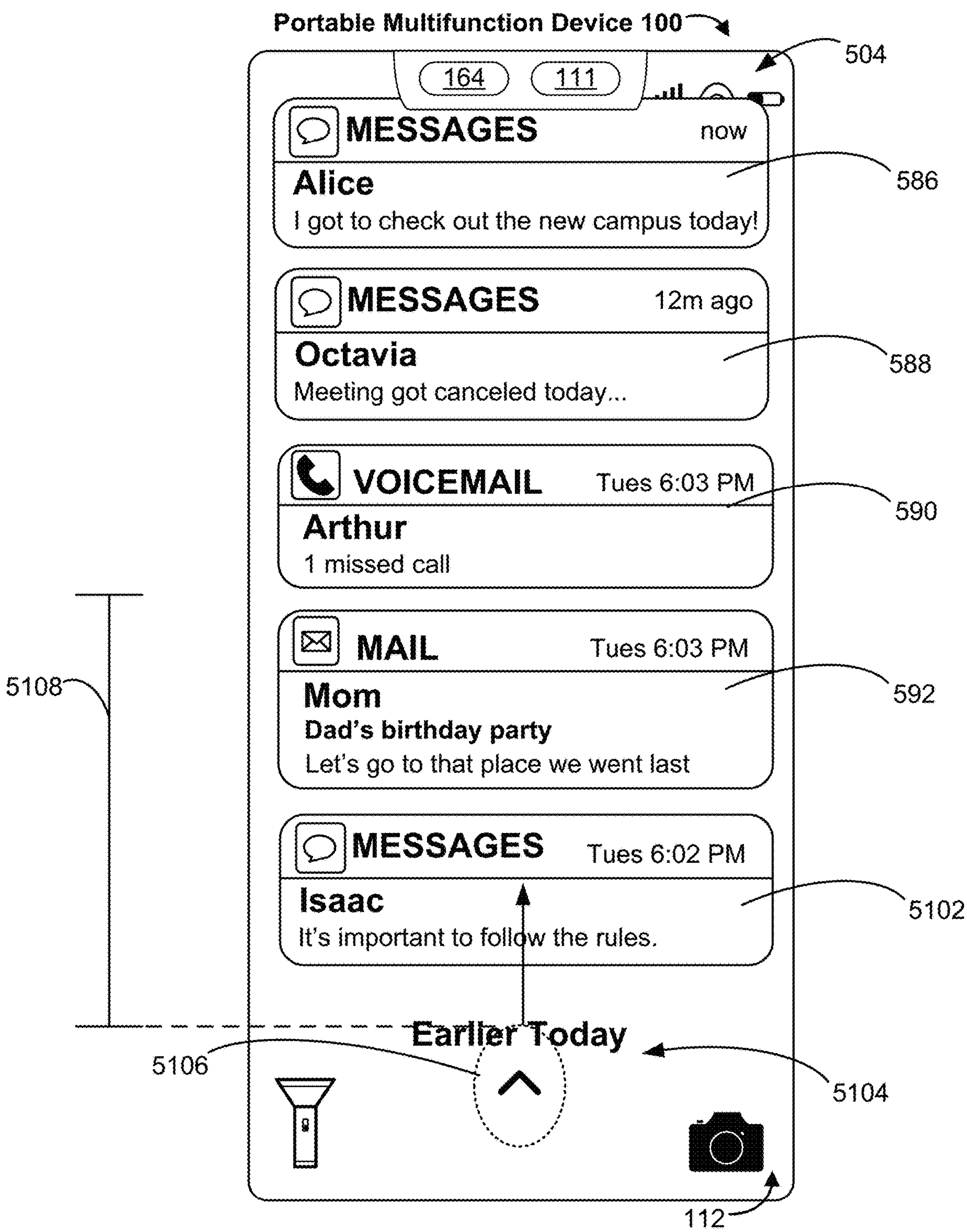
Figure 5B:
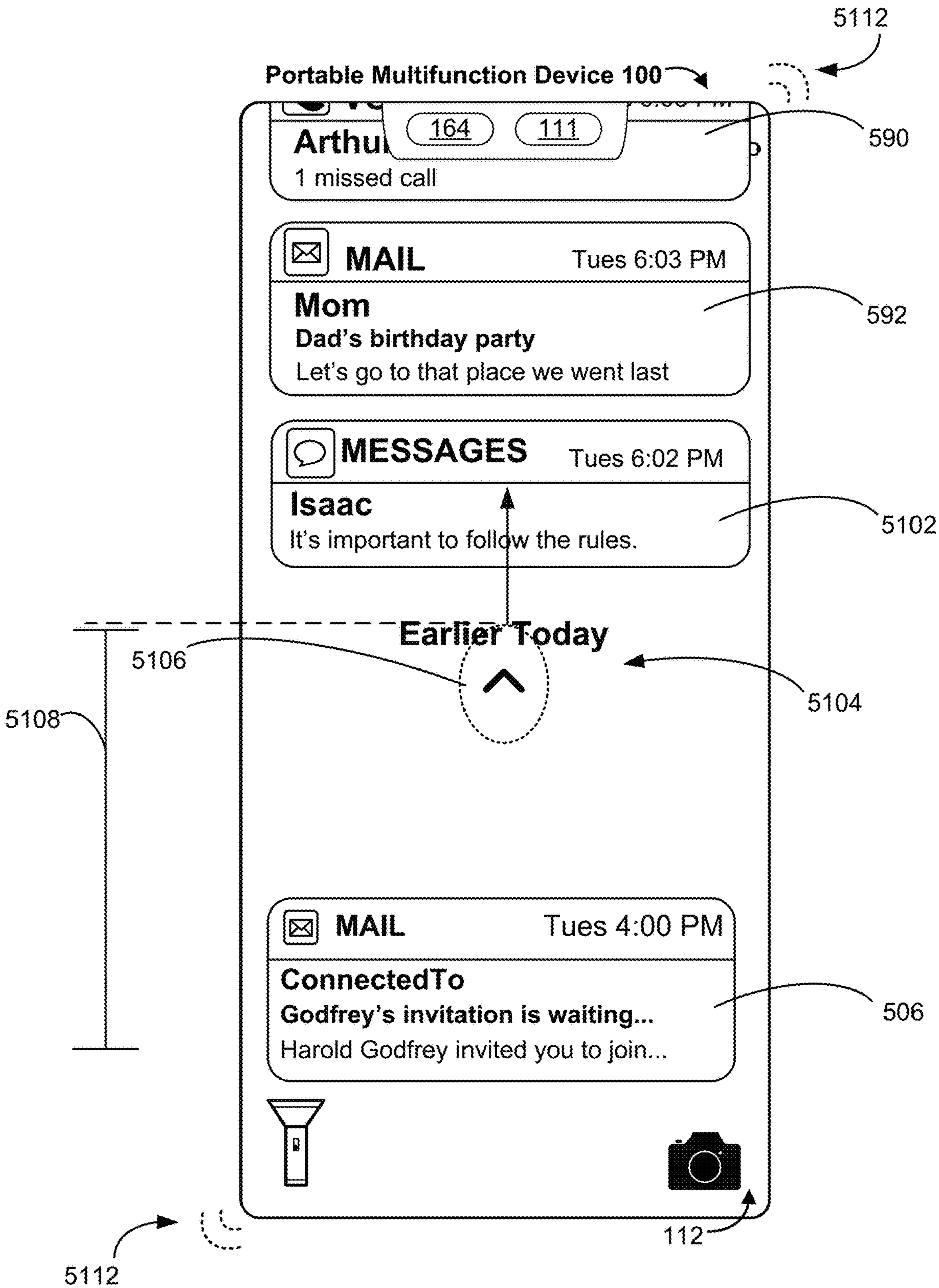
Figure 5B:
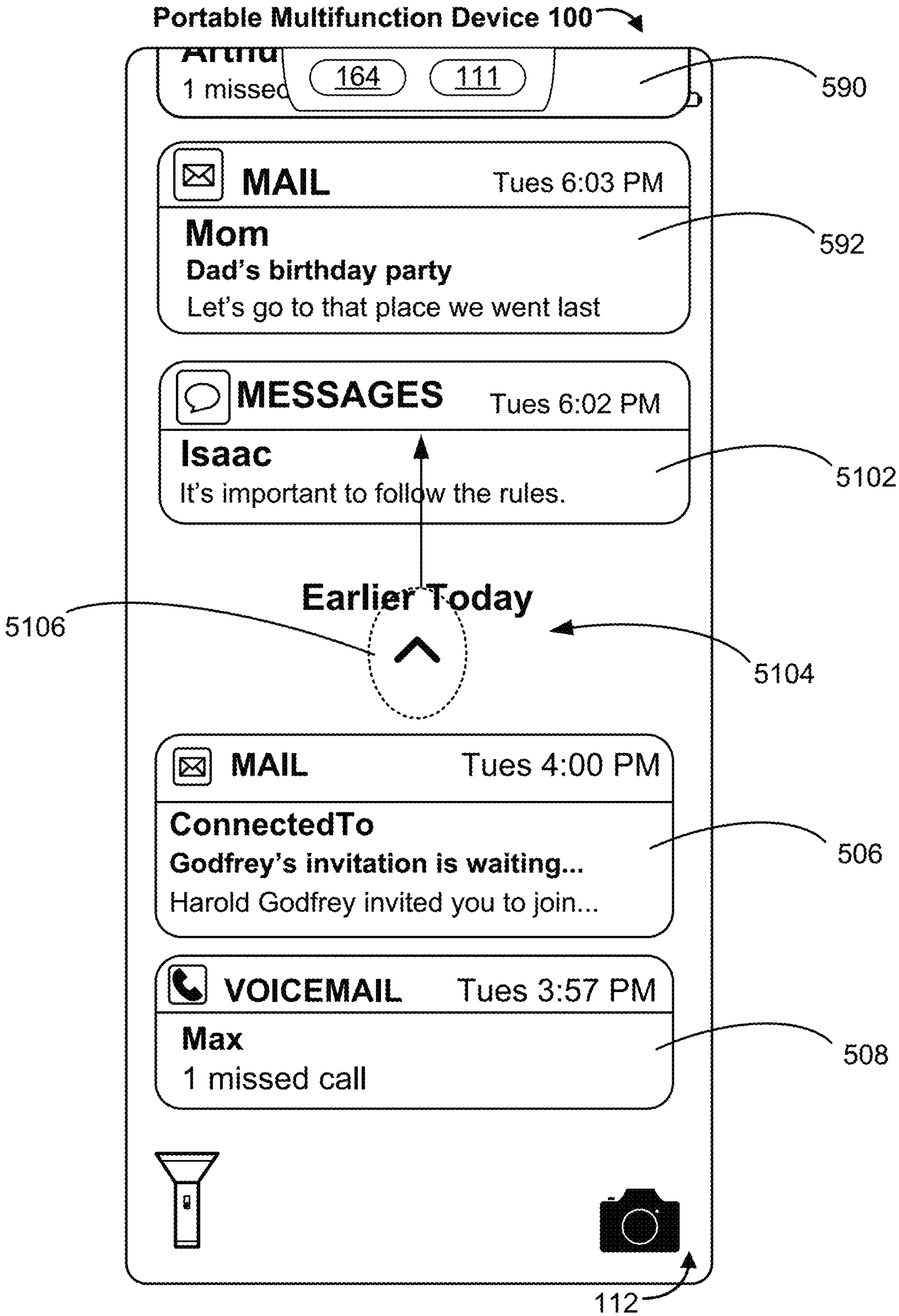
Figure 5B:
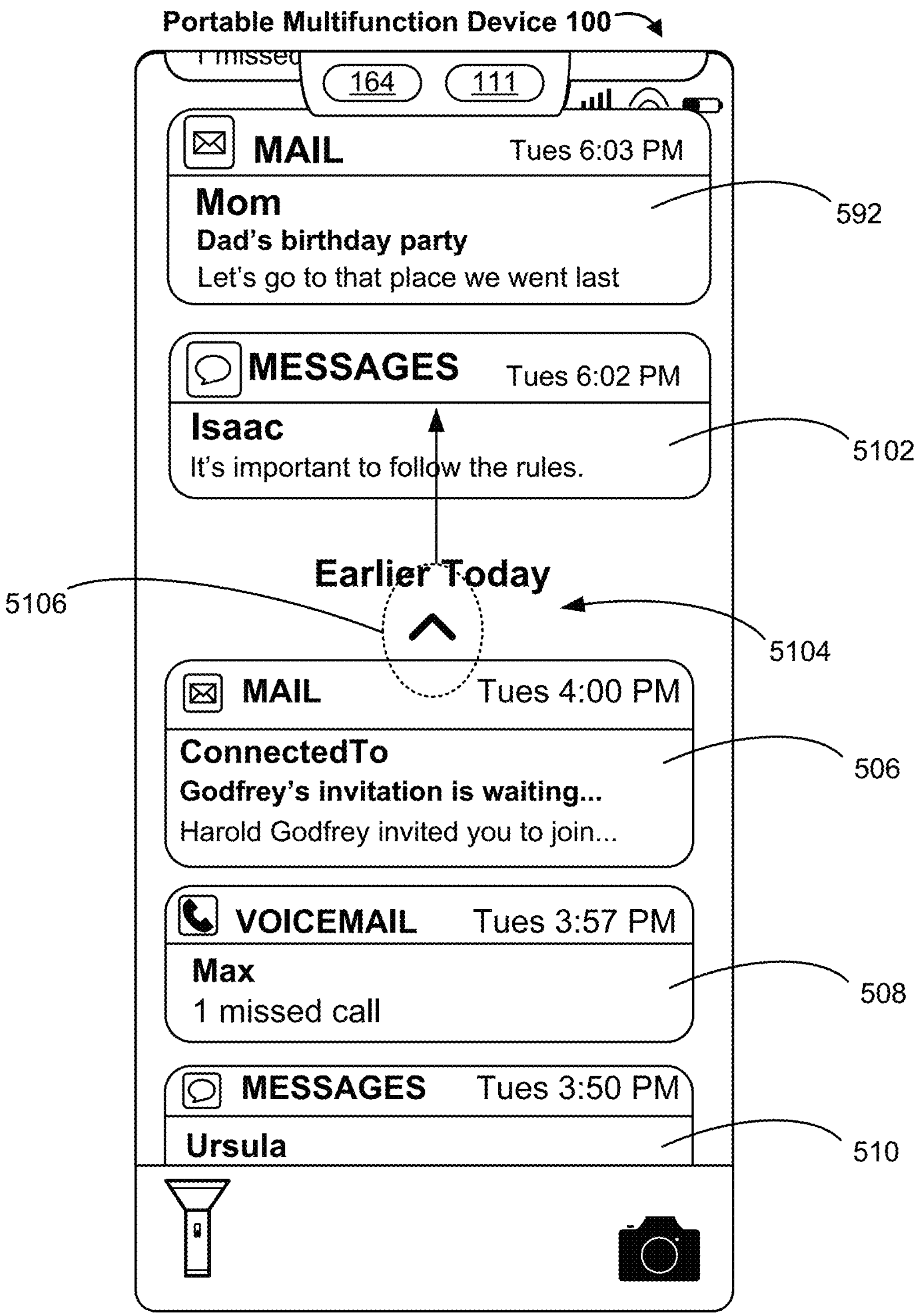
Figure 5B:
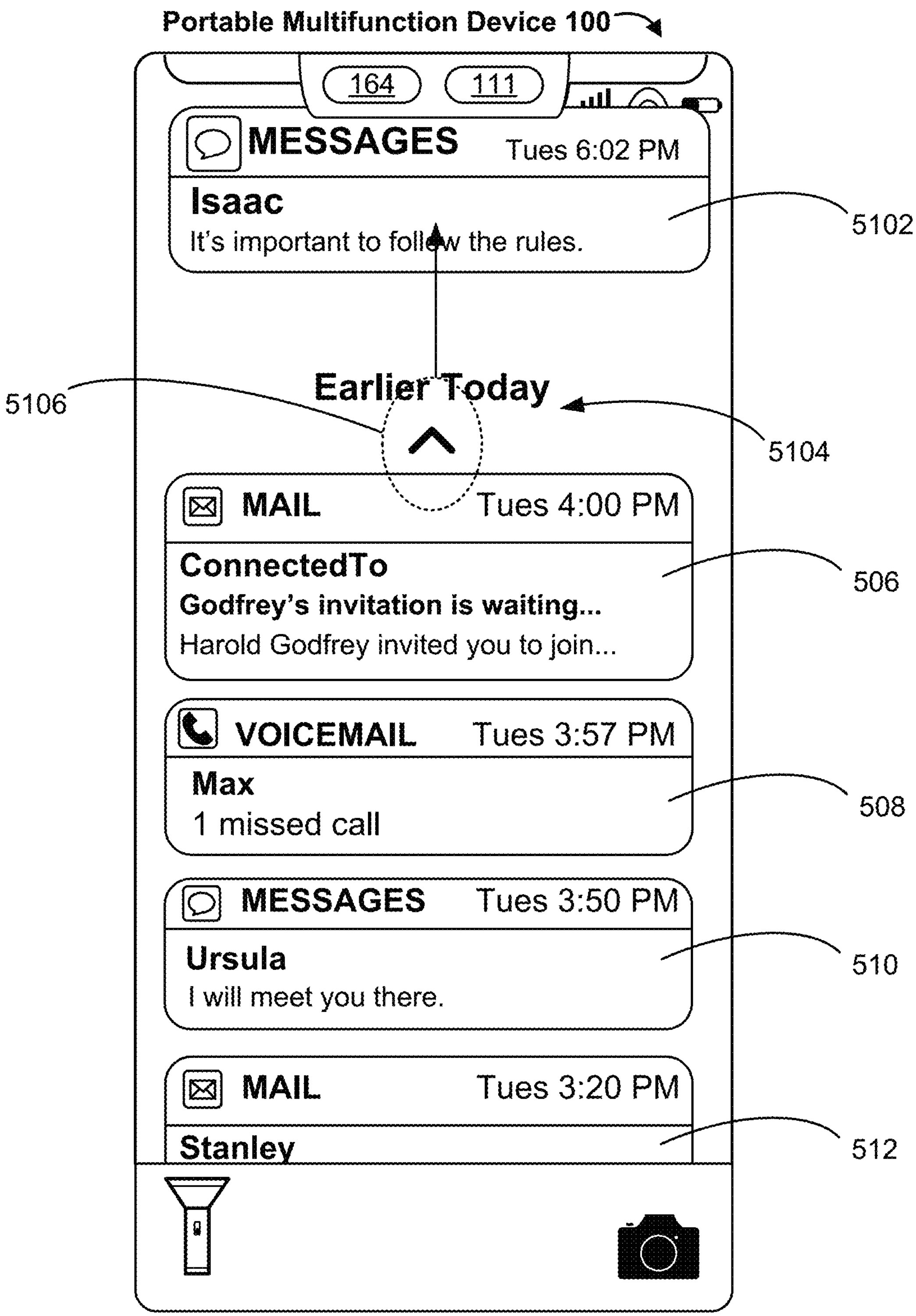
Figure 5B:
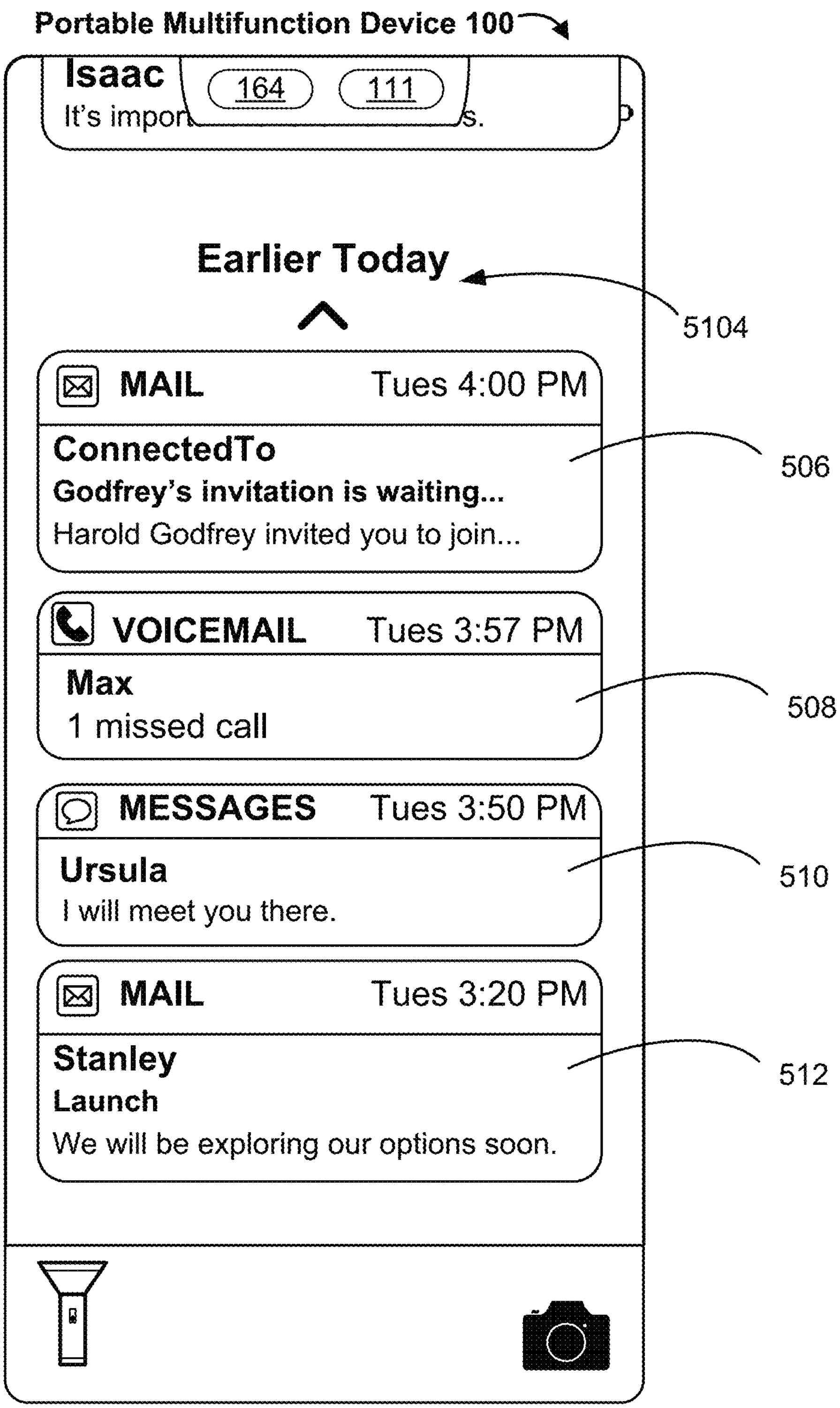
Figure 5B:
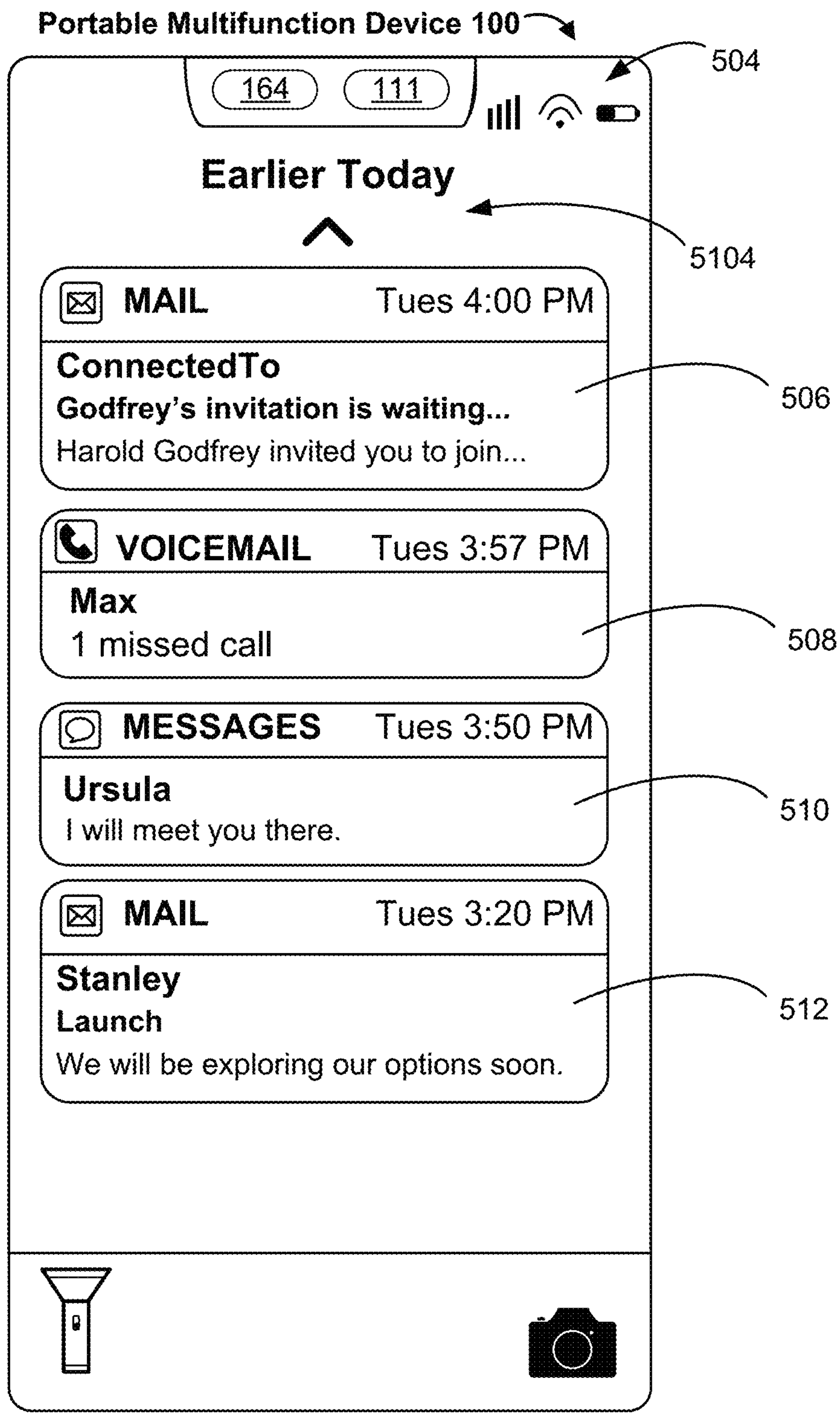
Figure 5B:
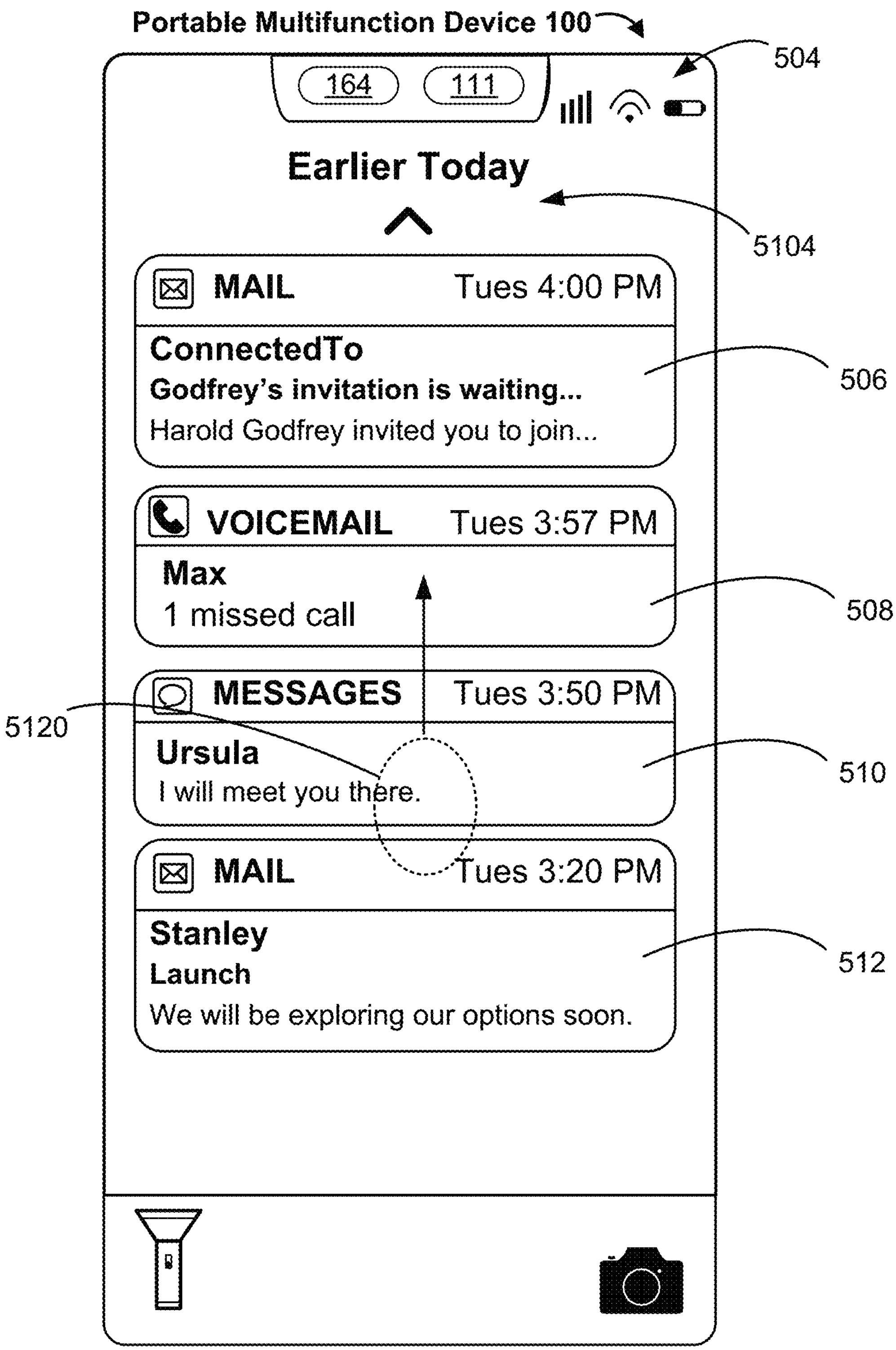
Figure 5B:
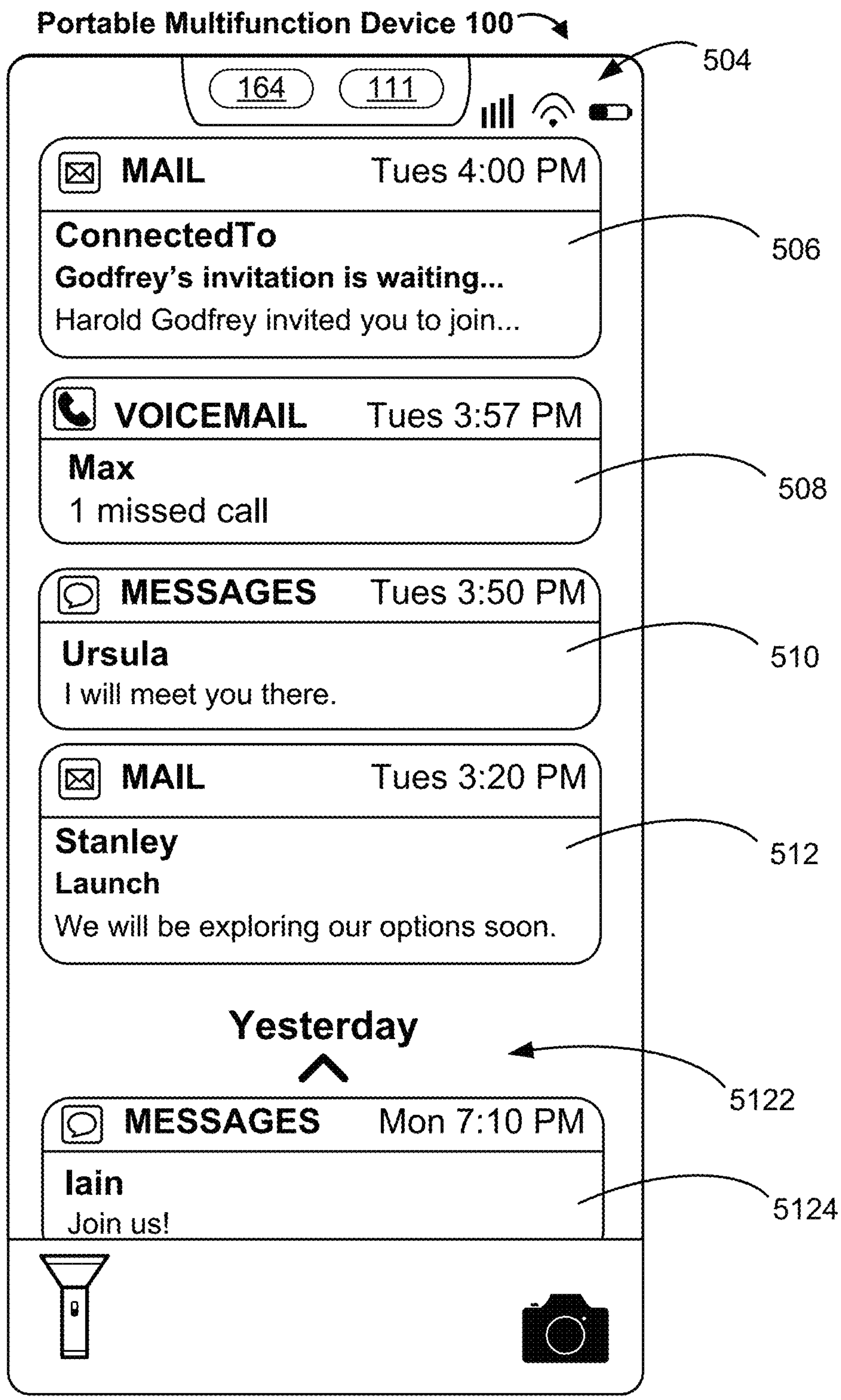
Figure 5B:
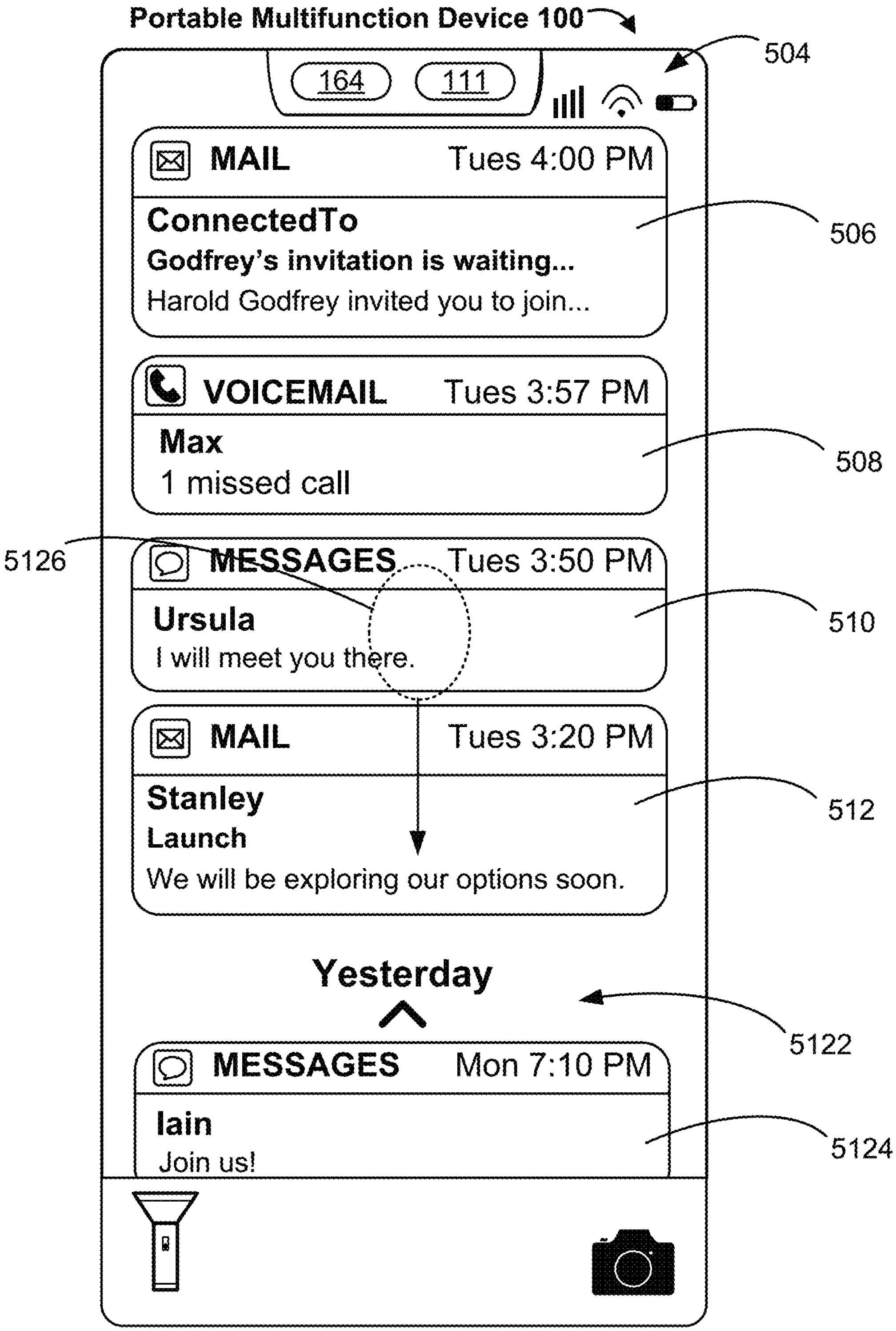
Figure 5B:
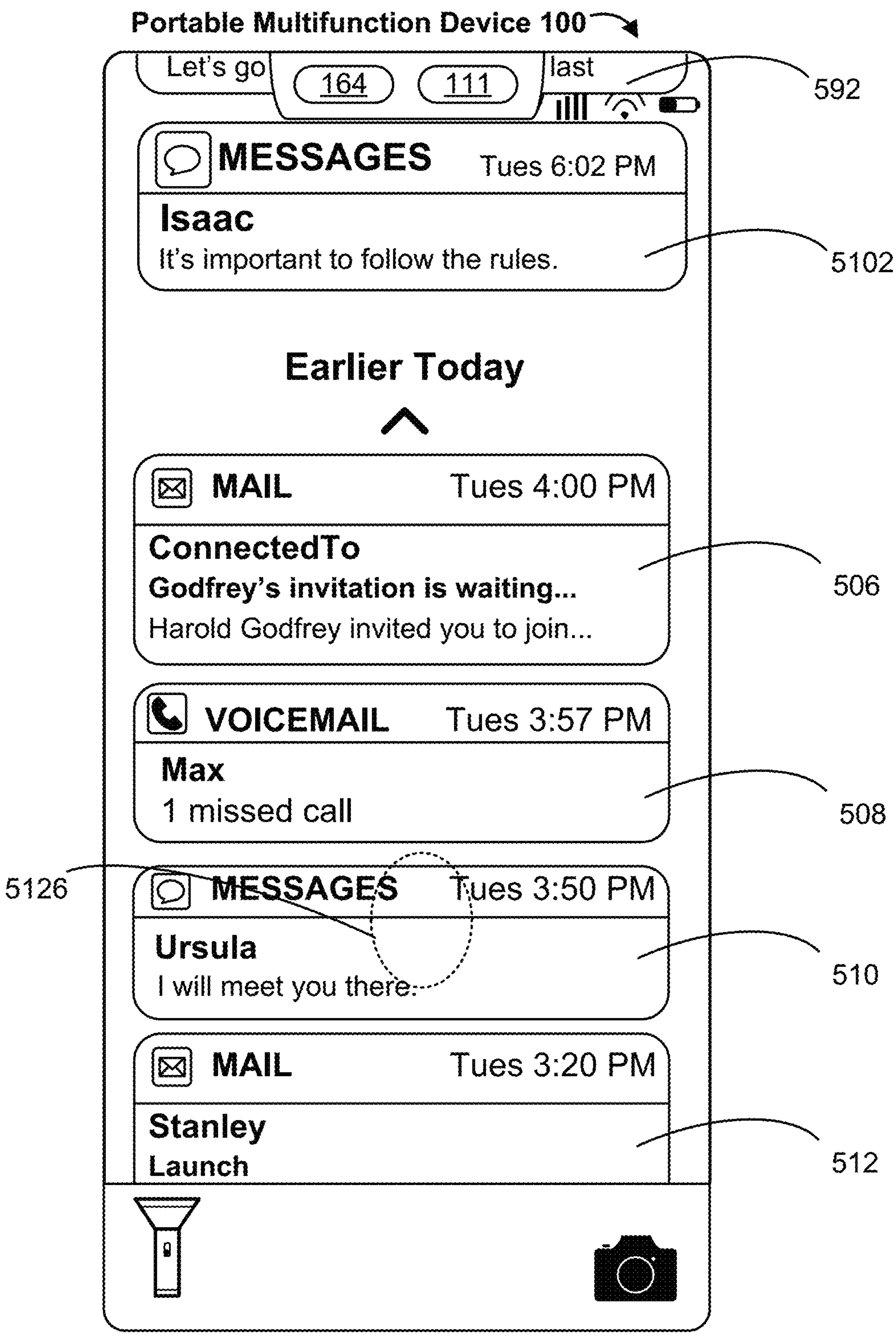
Figure 5B:
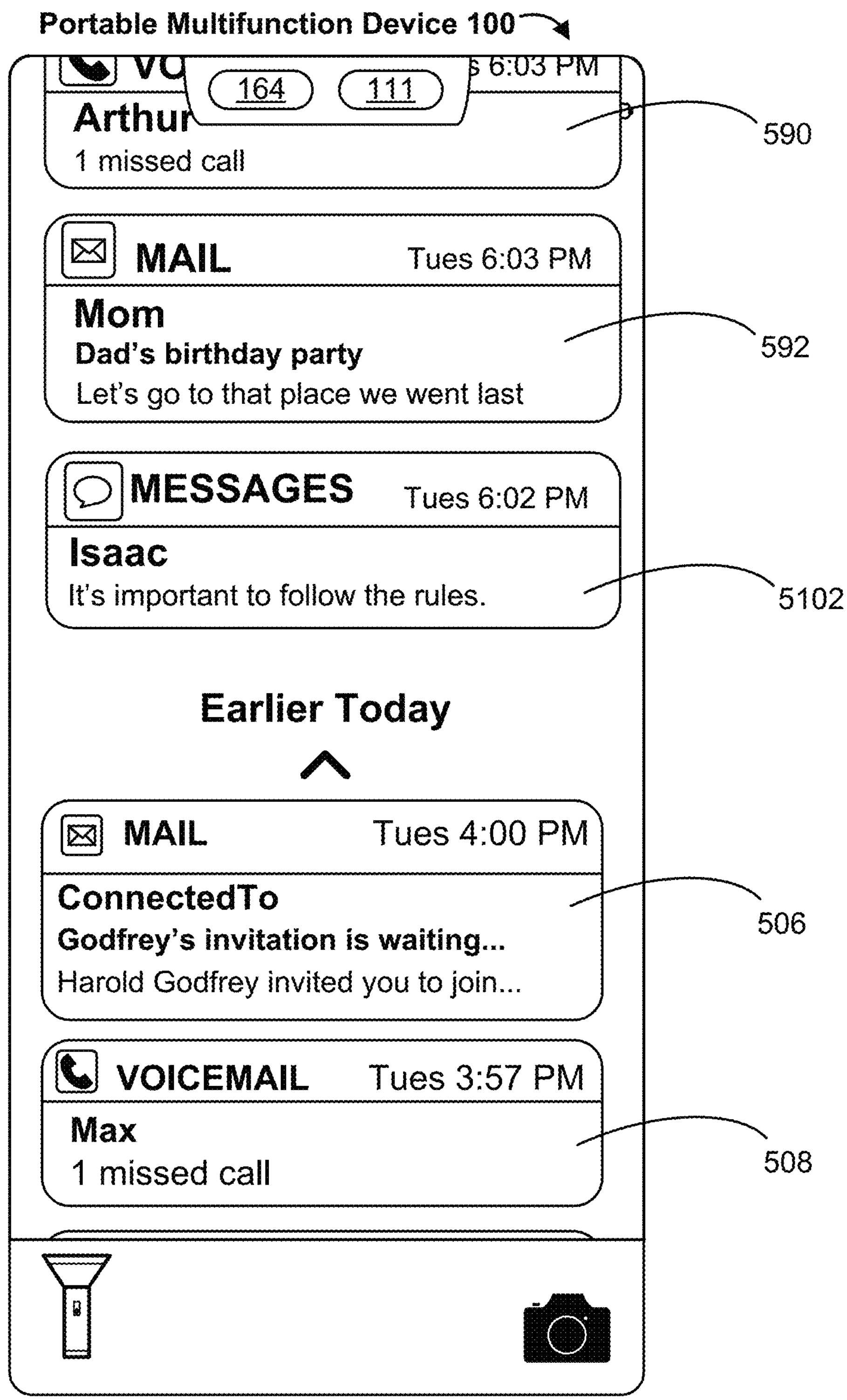
Figure 5B:
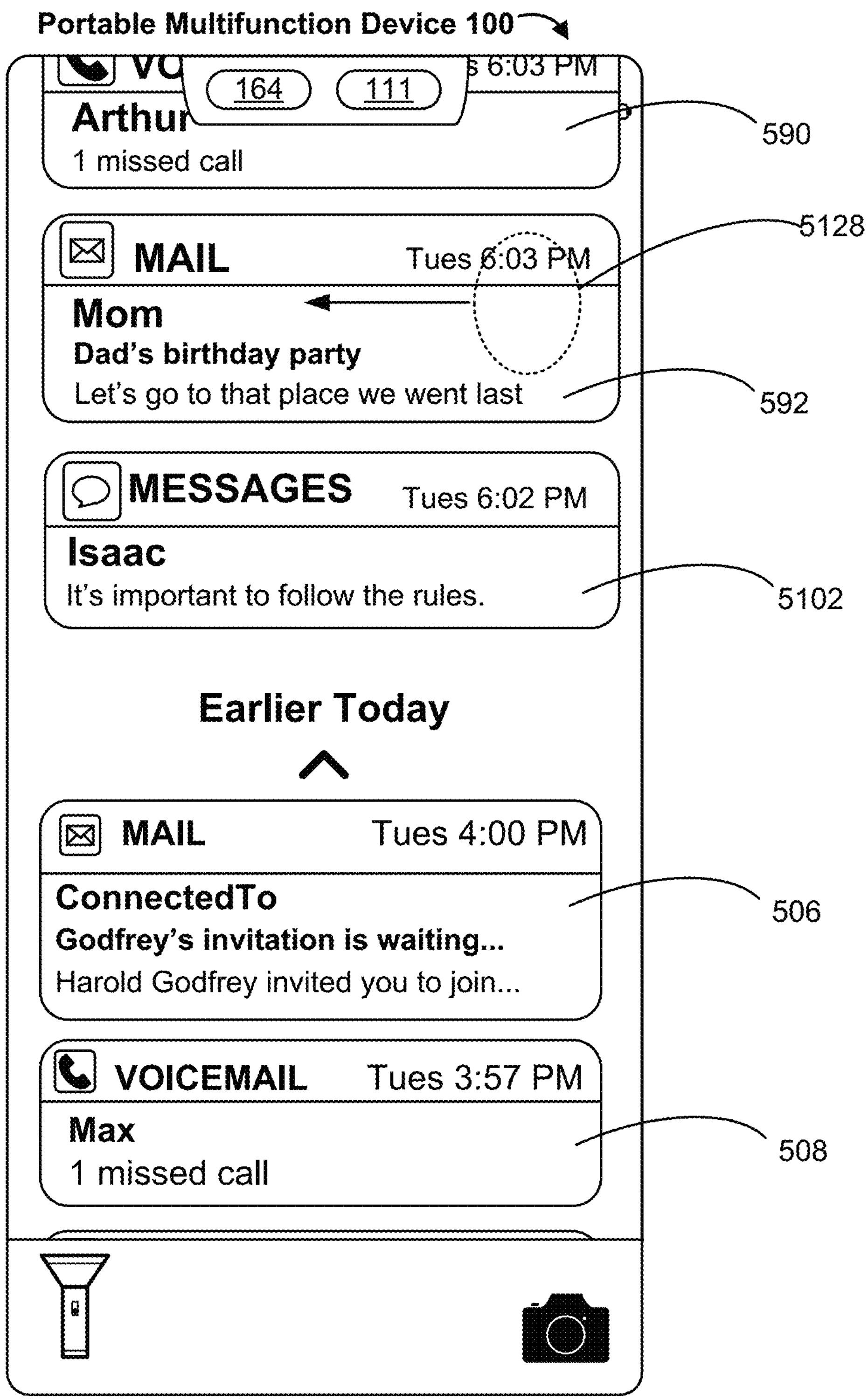
Figure 5B:
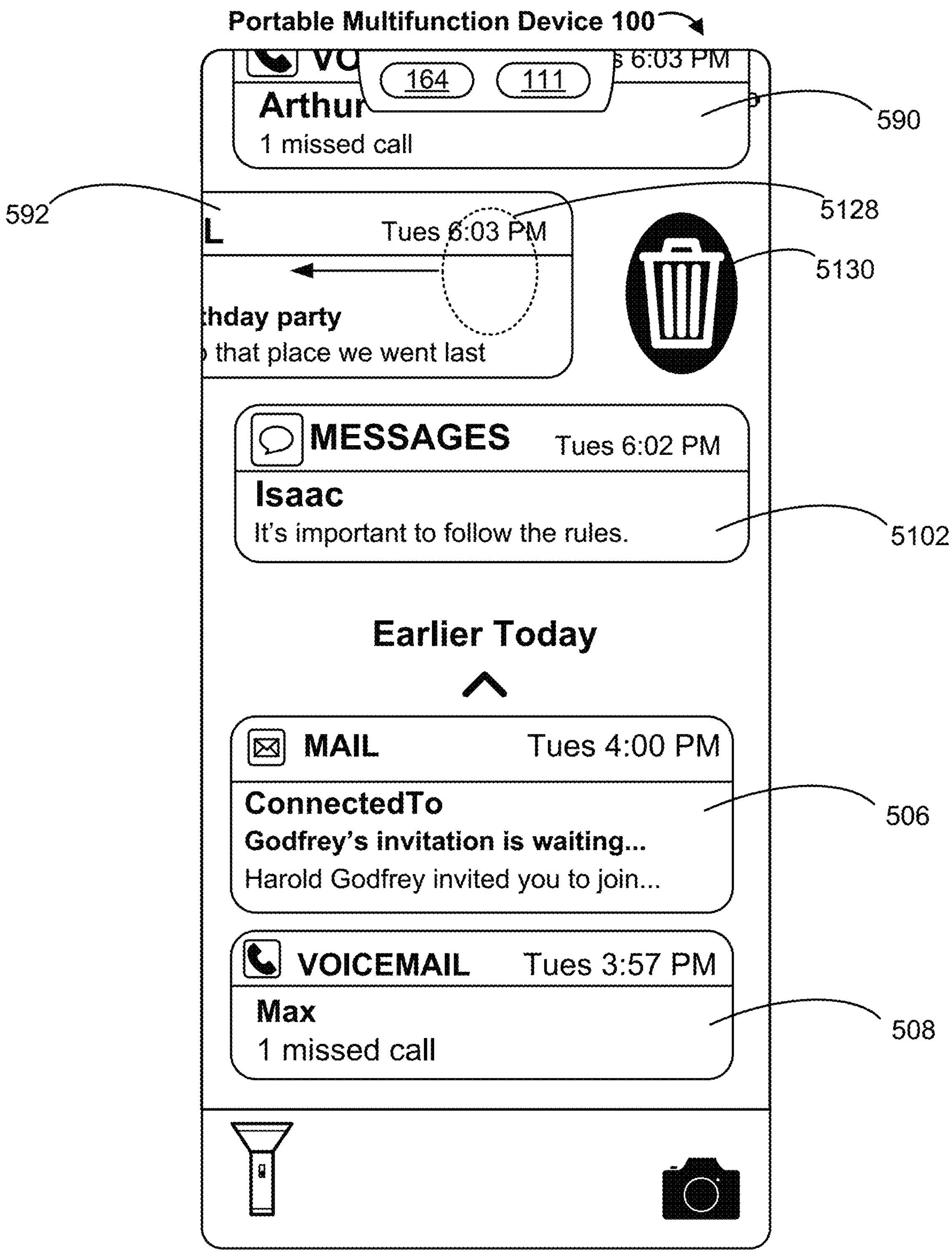
Figure 5B:
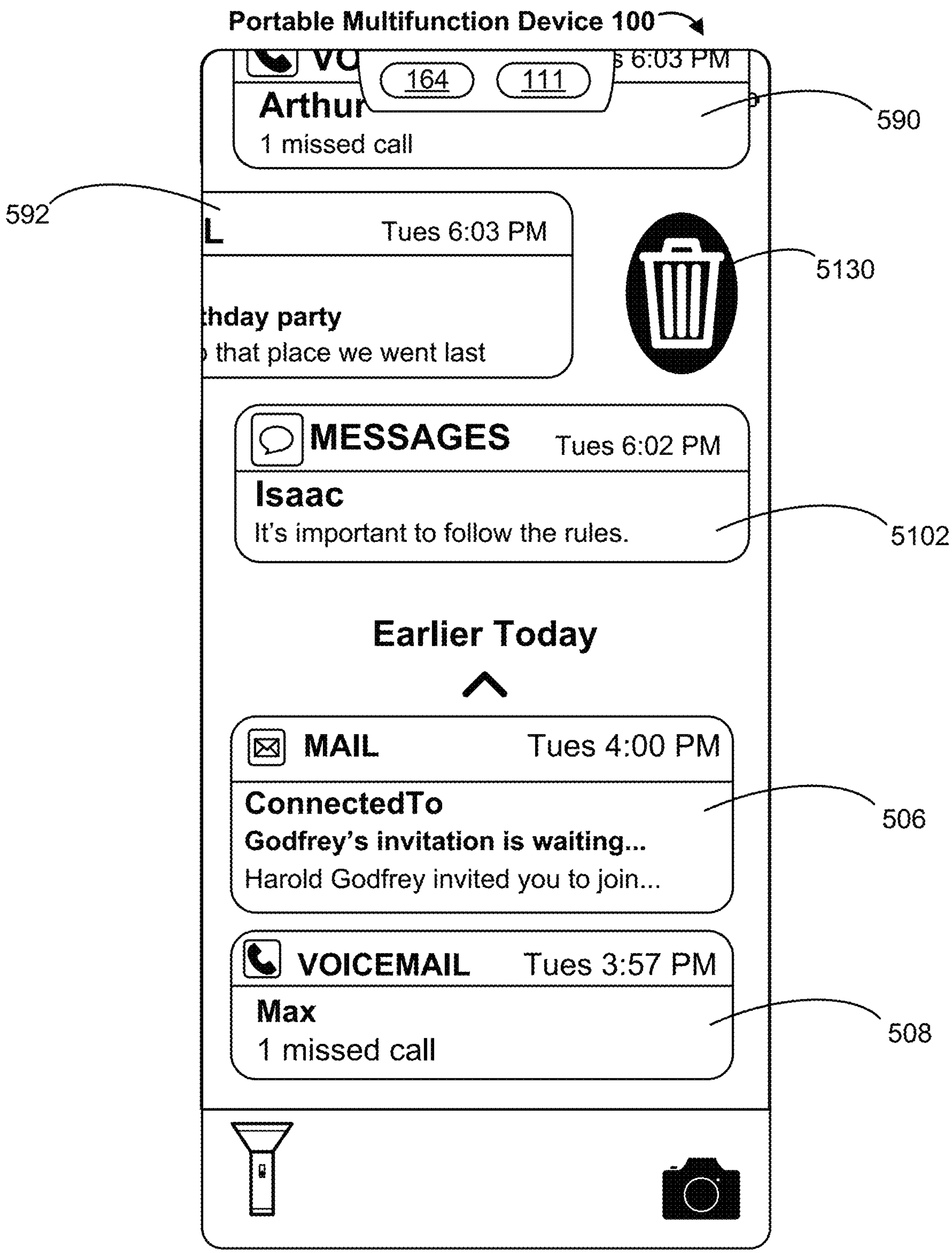
Figure 5B:
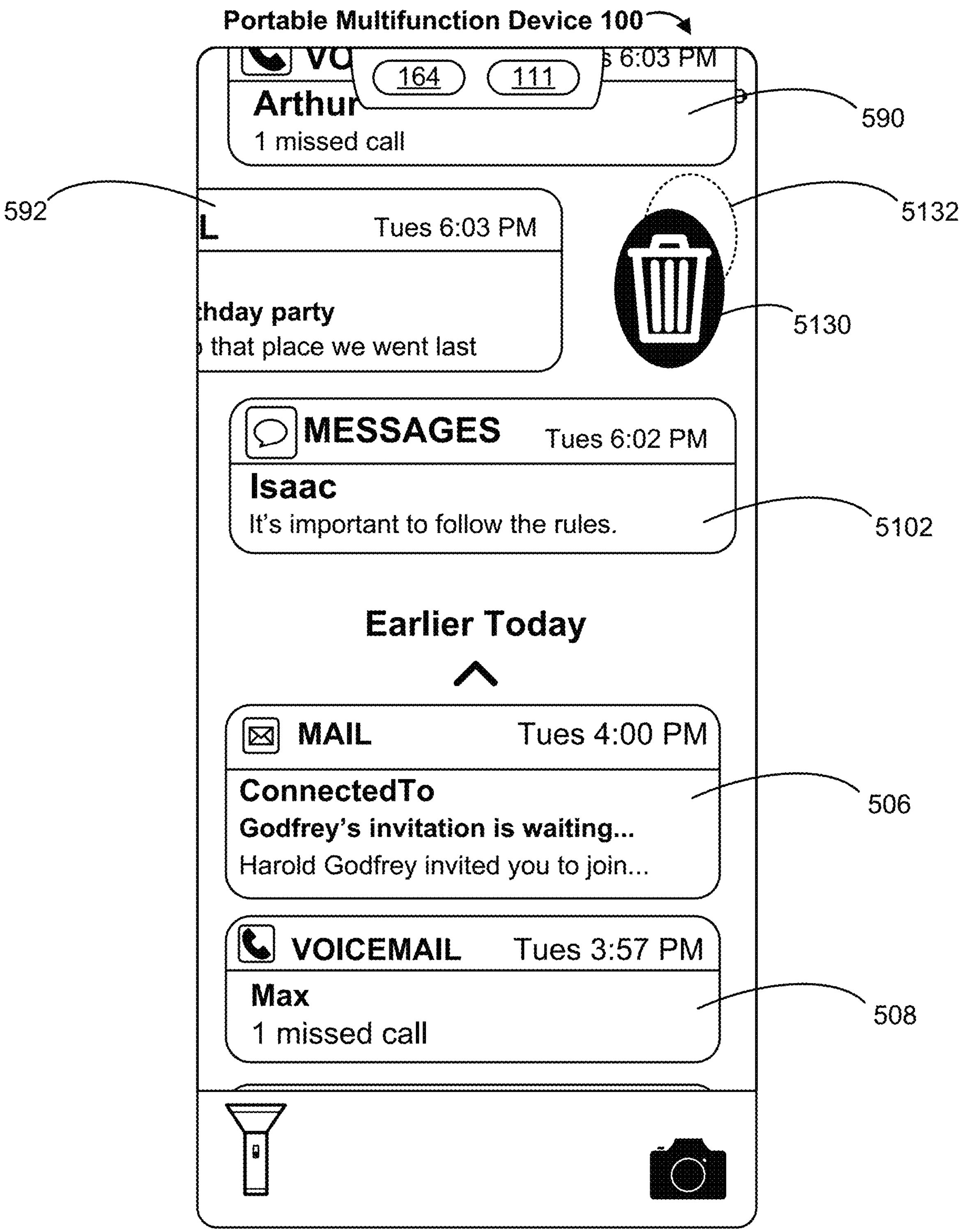
Figure 5B:
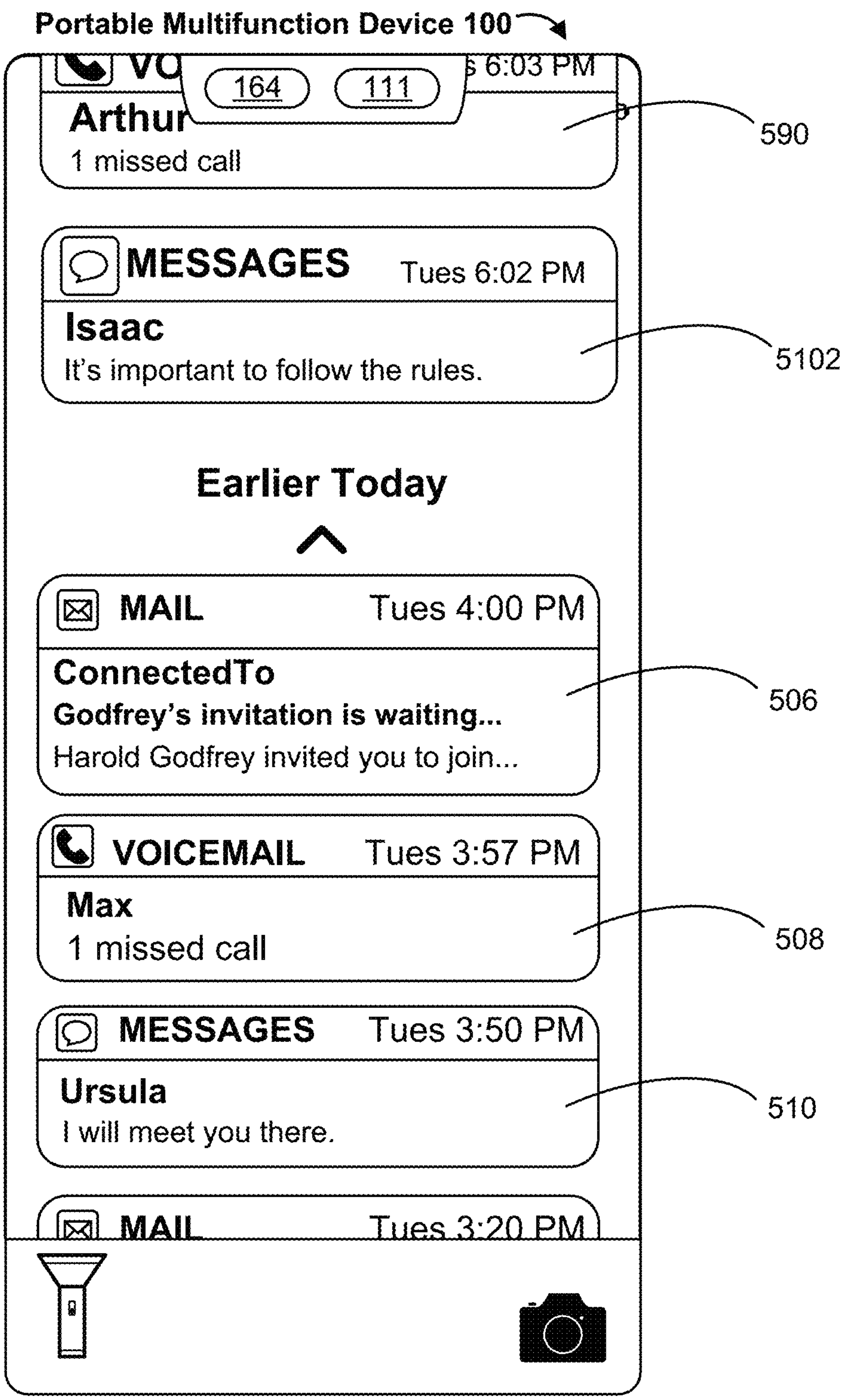
Figure 5C:
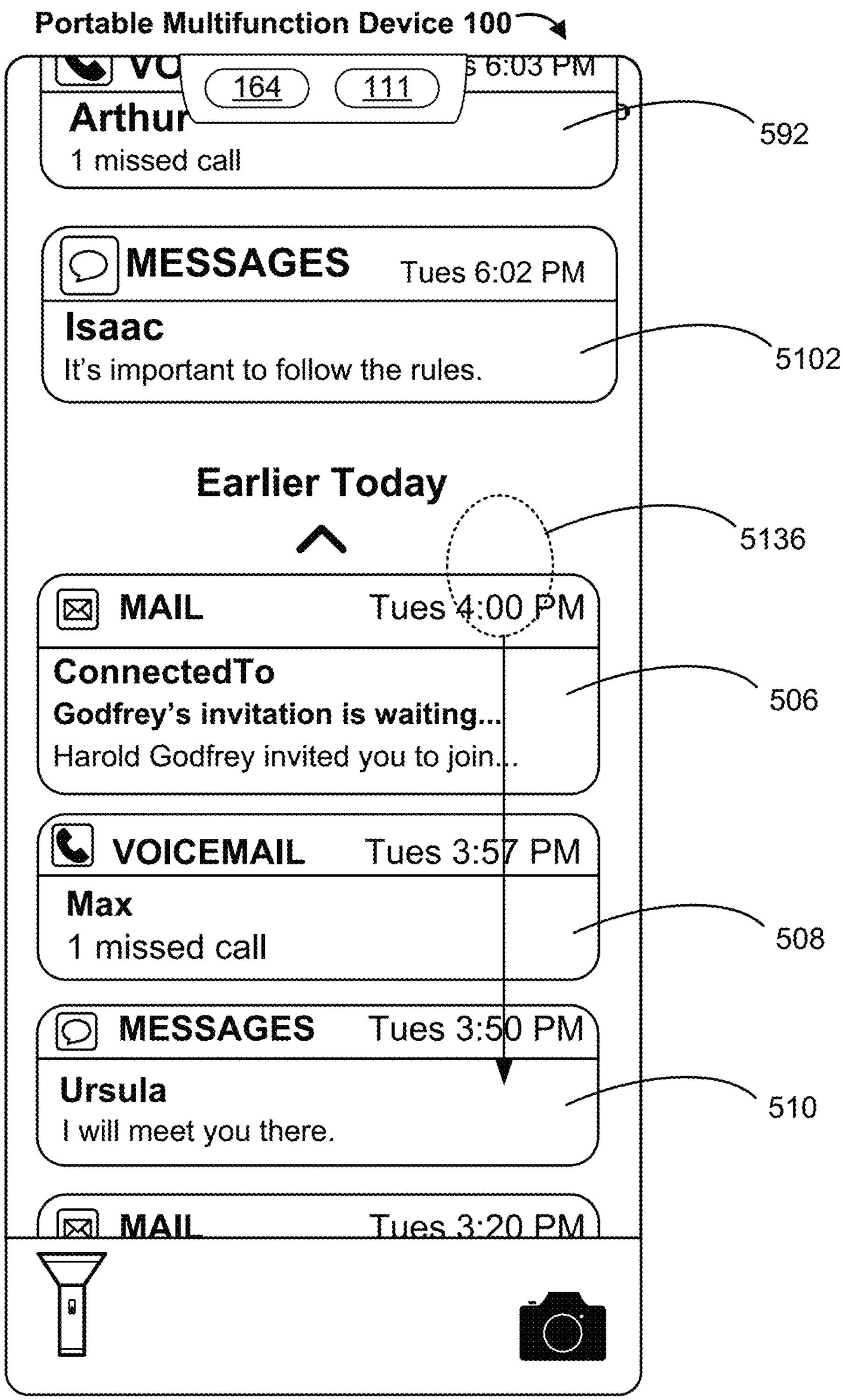
Figure 5C:
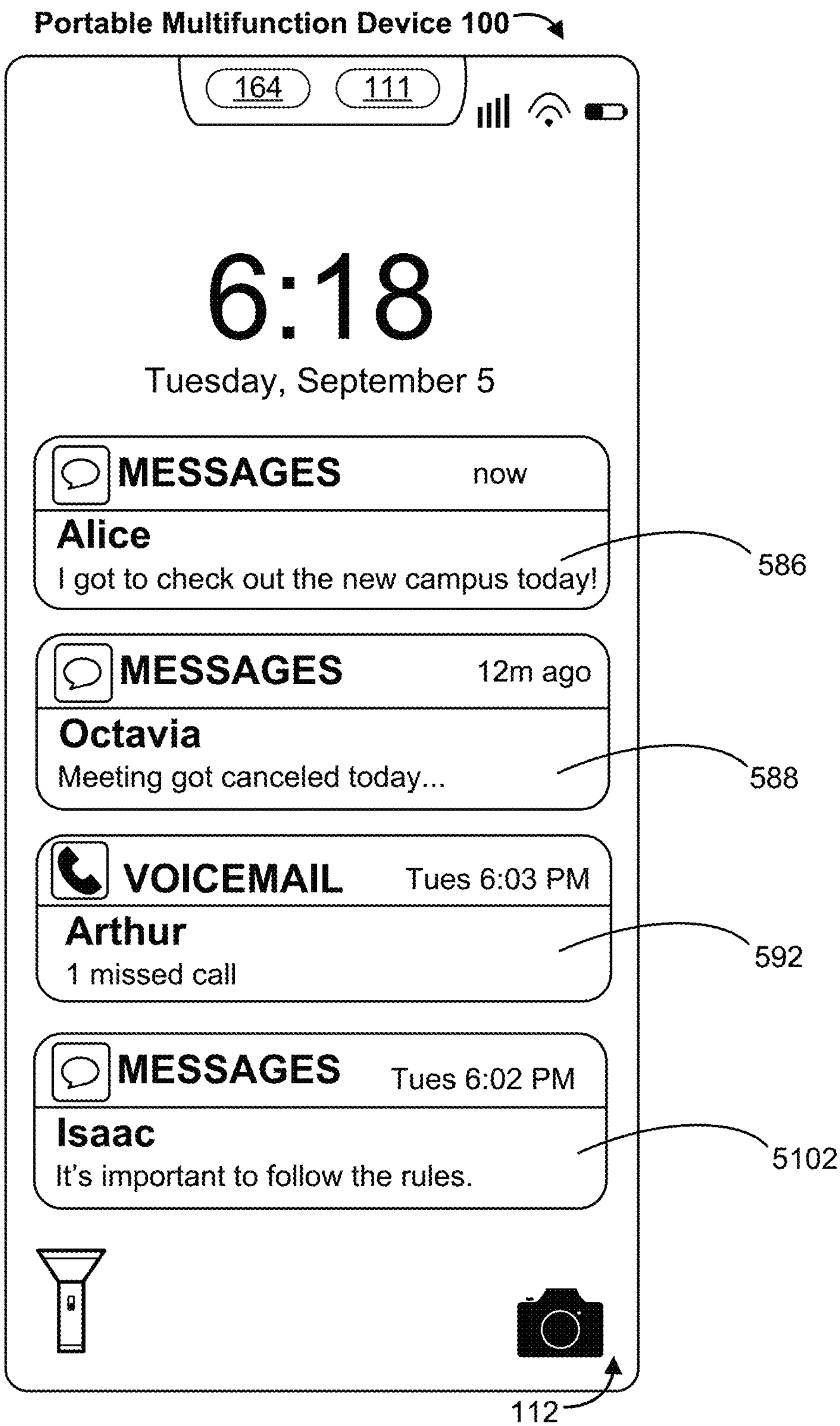
Figure 5C:
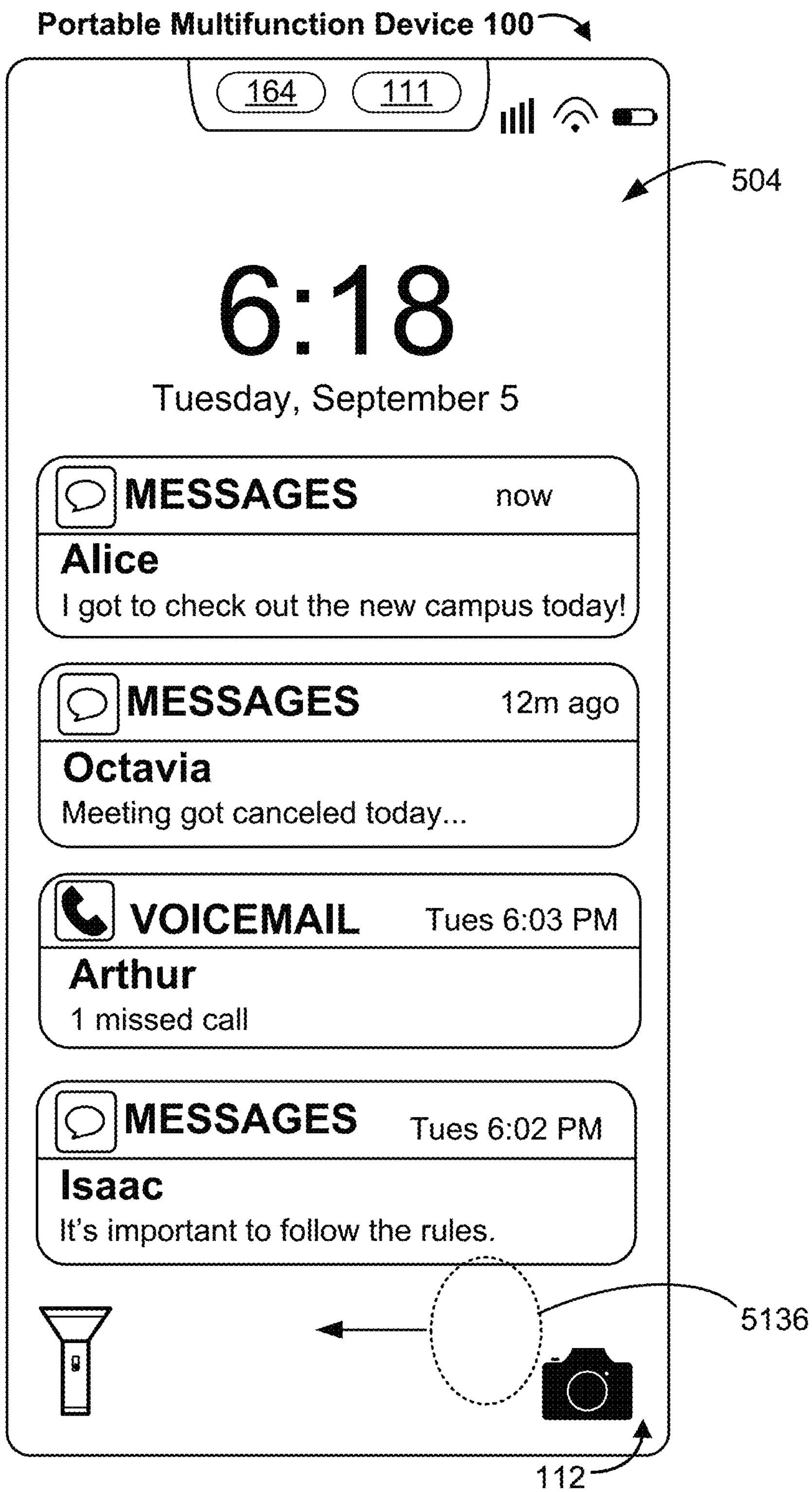
Figure 5C:
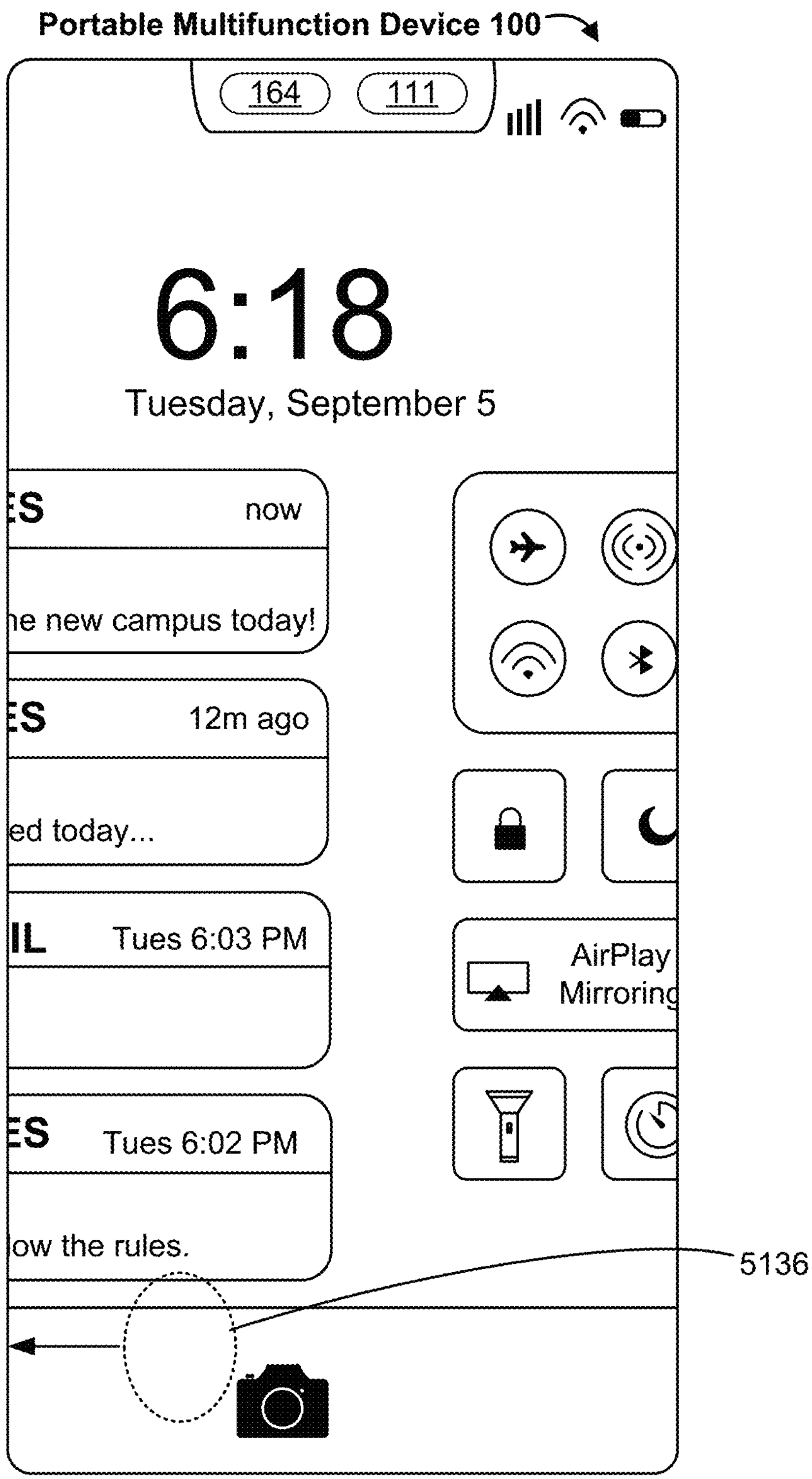
Figure 5C:
Figure 5C:
Figure 5C:
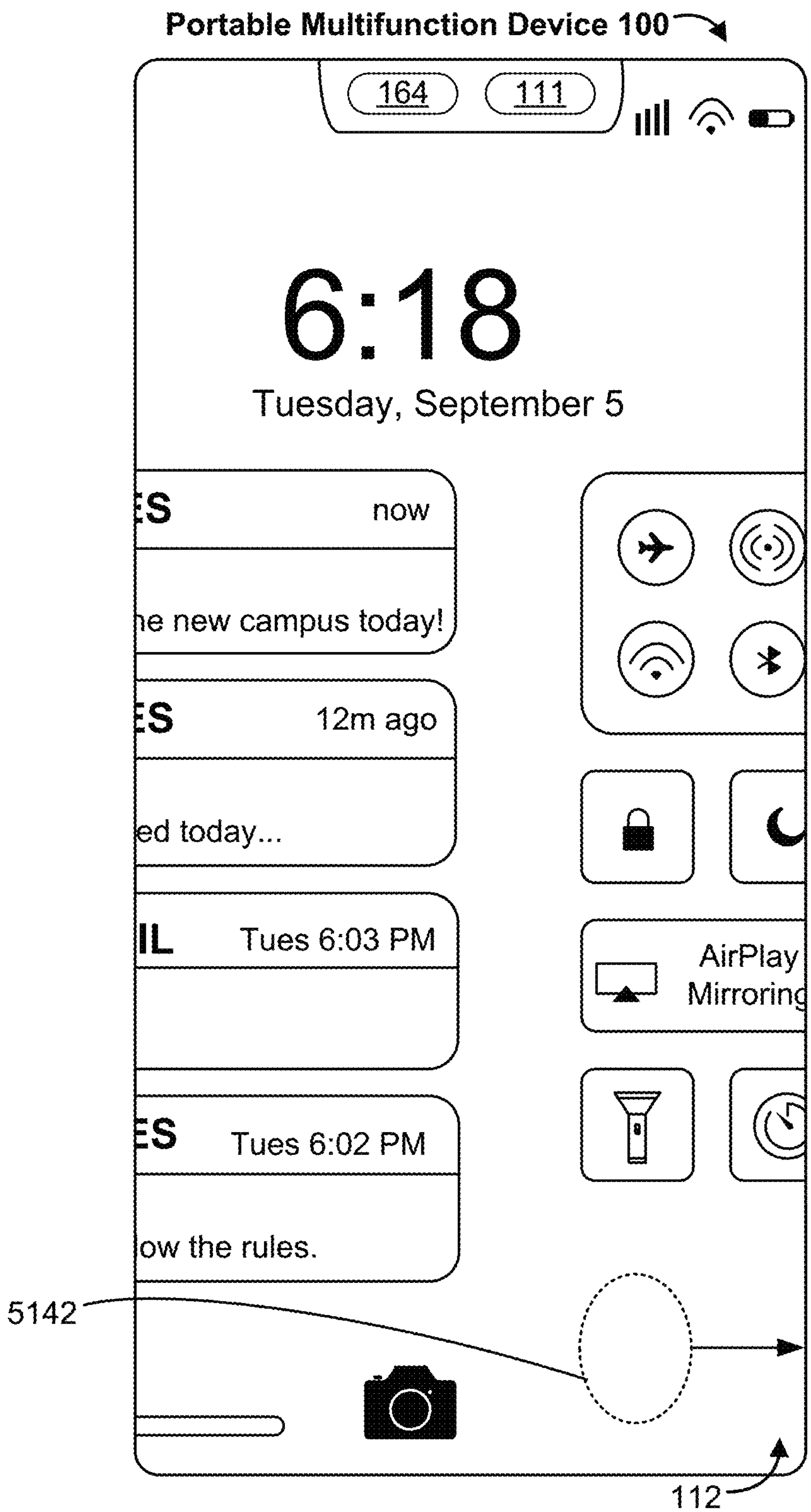
Figure 5C:
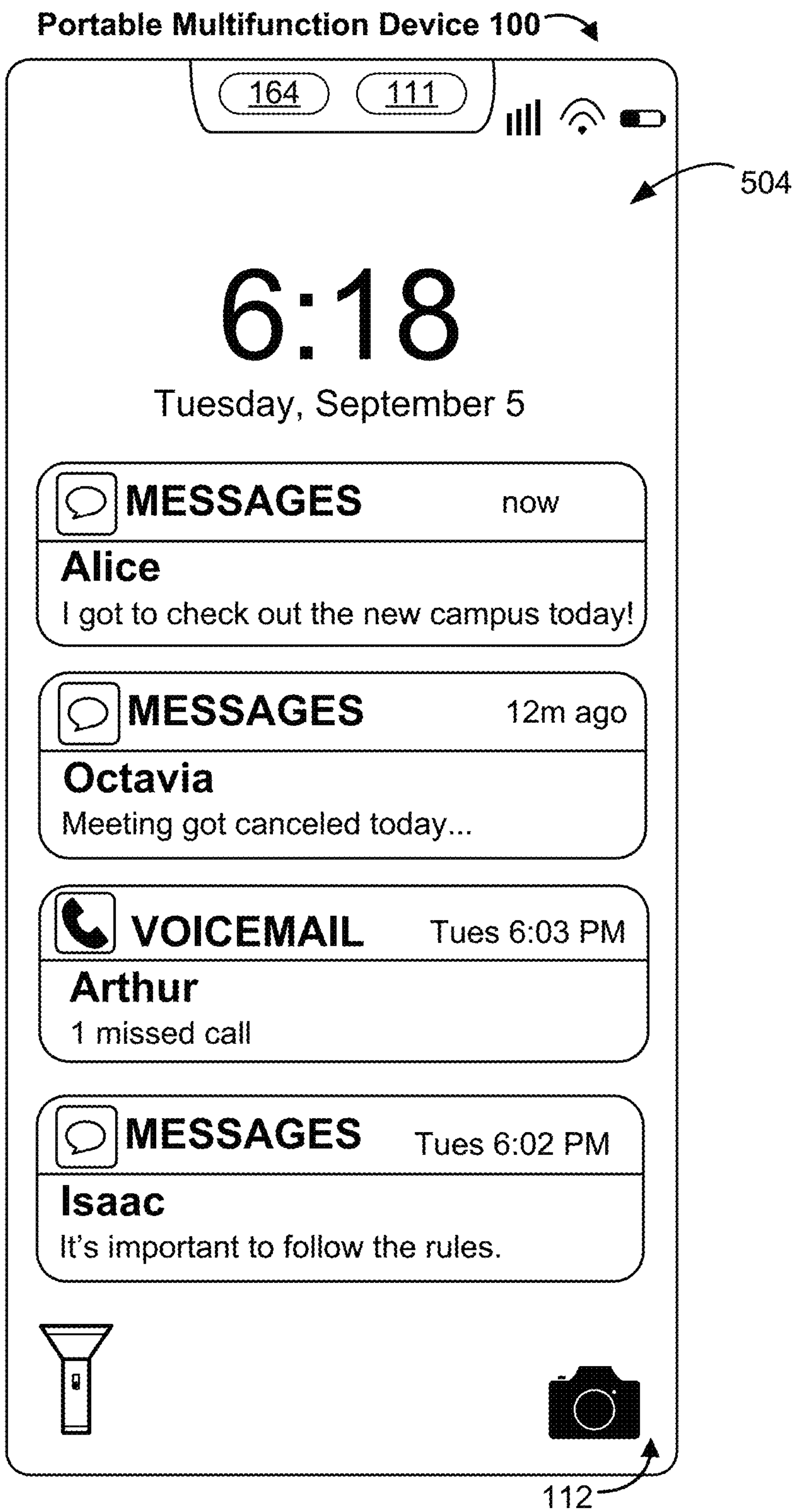
Figure 5C:
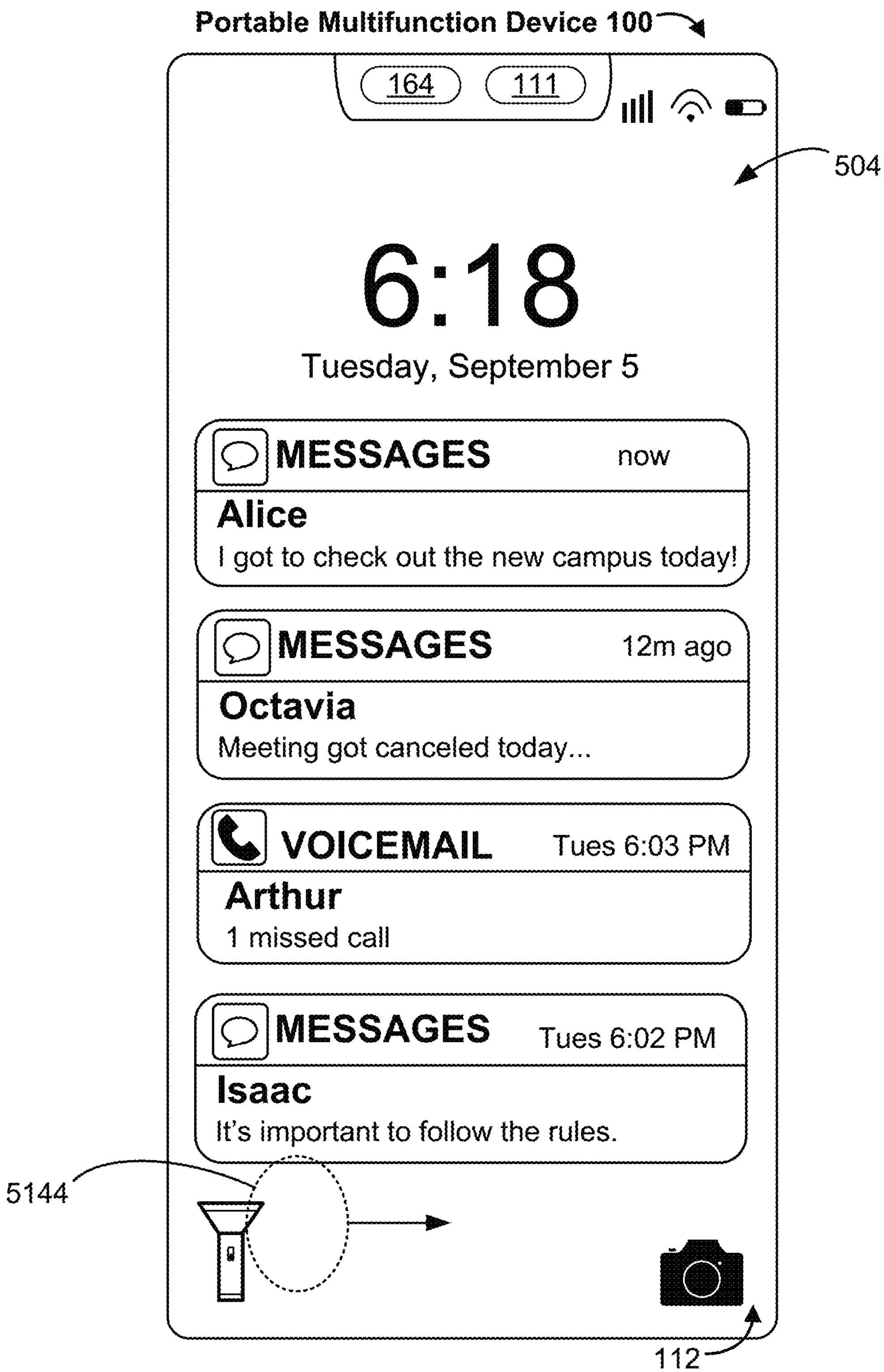
Figure 5C:
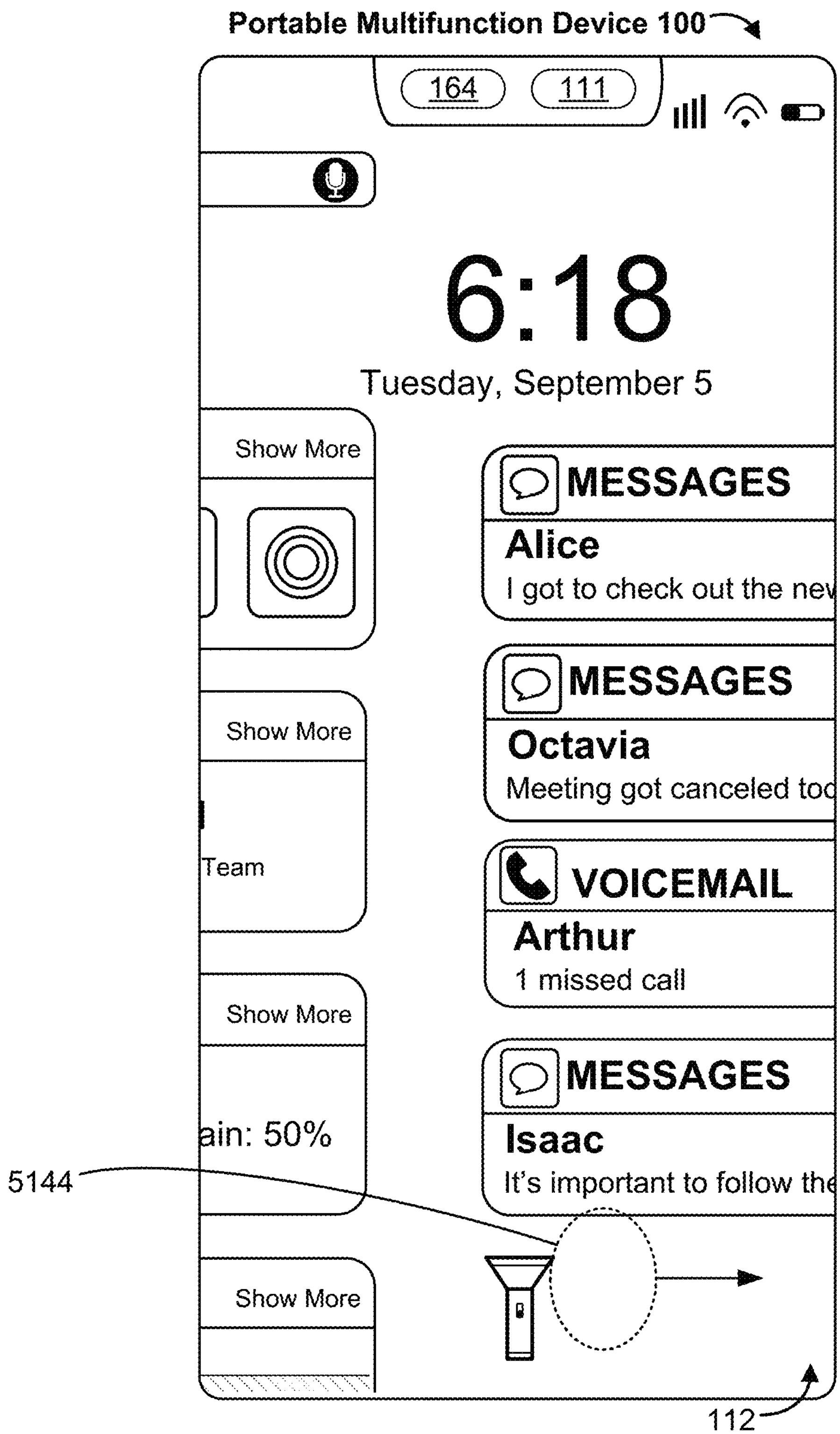
Figure 5C:
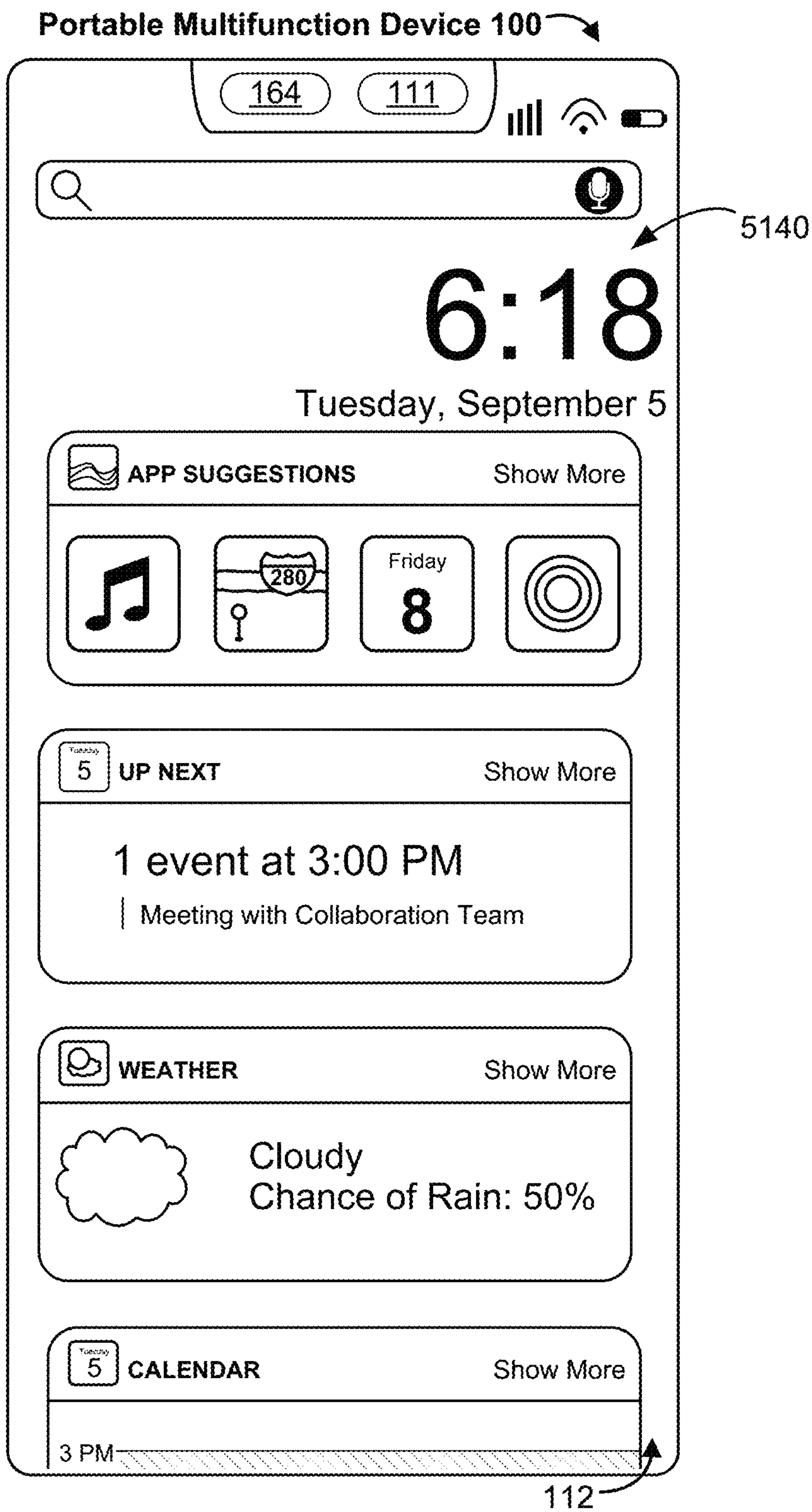
Figure 5C:
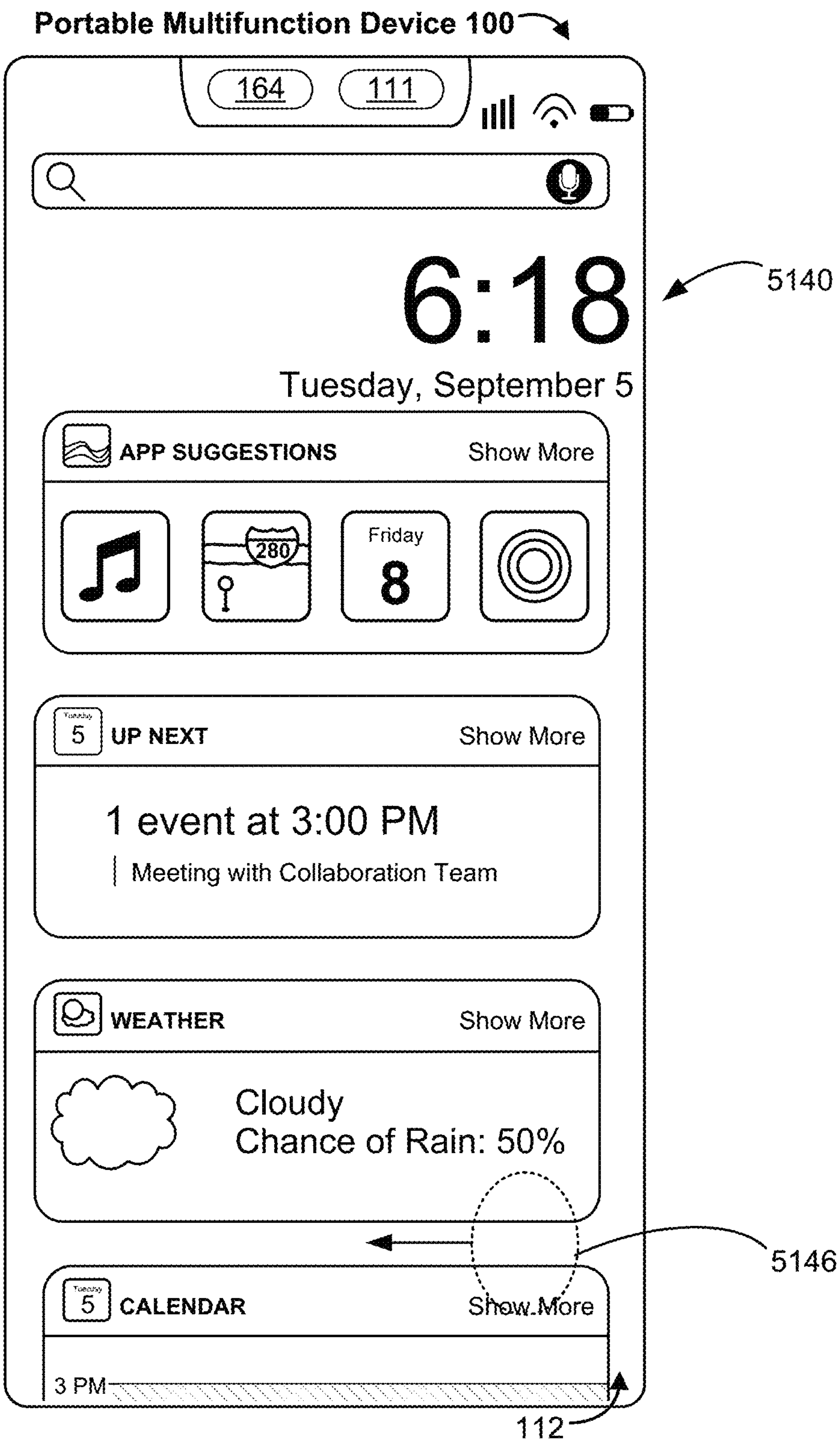
Figure 5C:
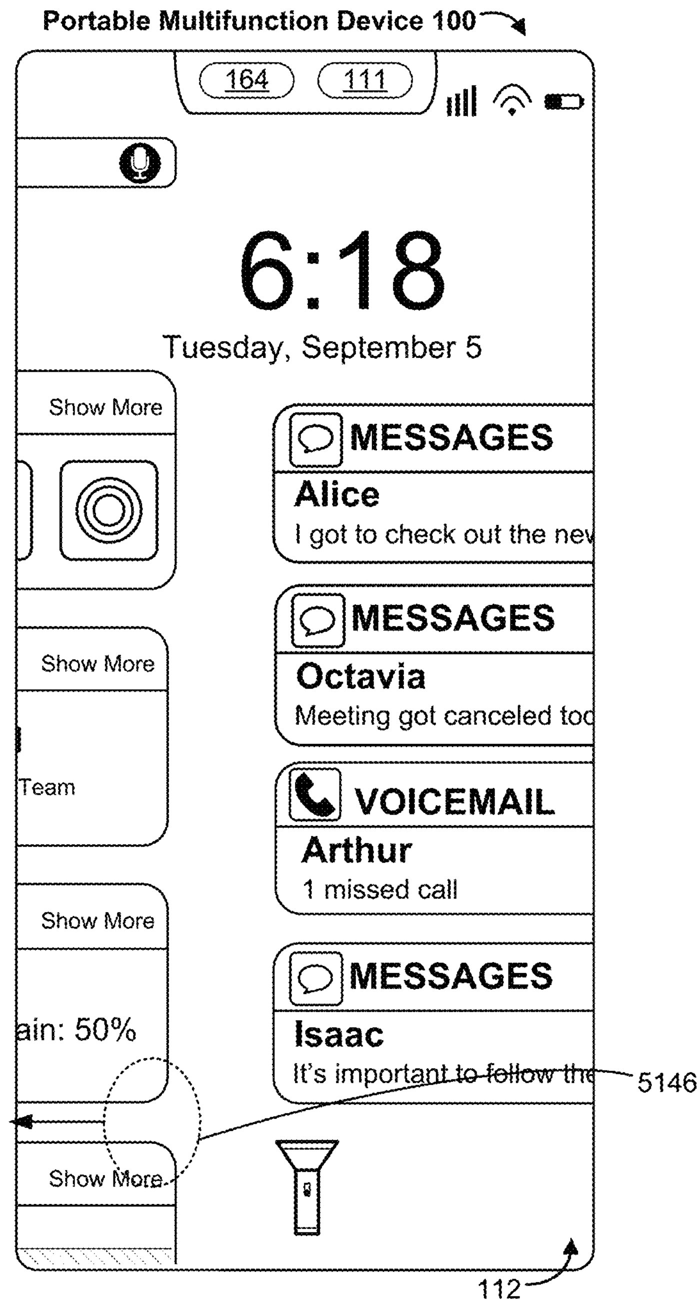
Figure 5C:
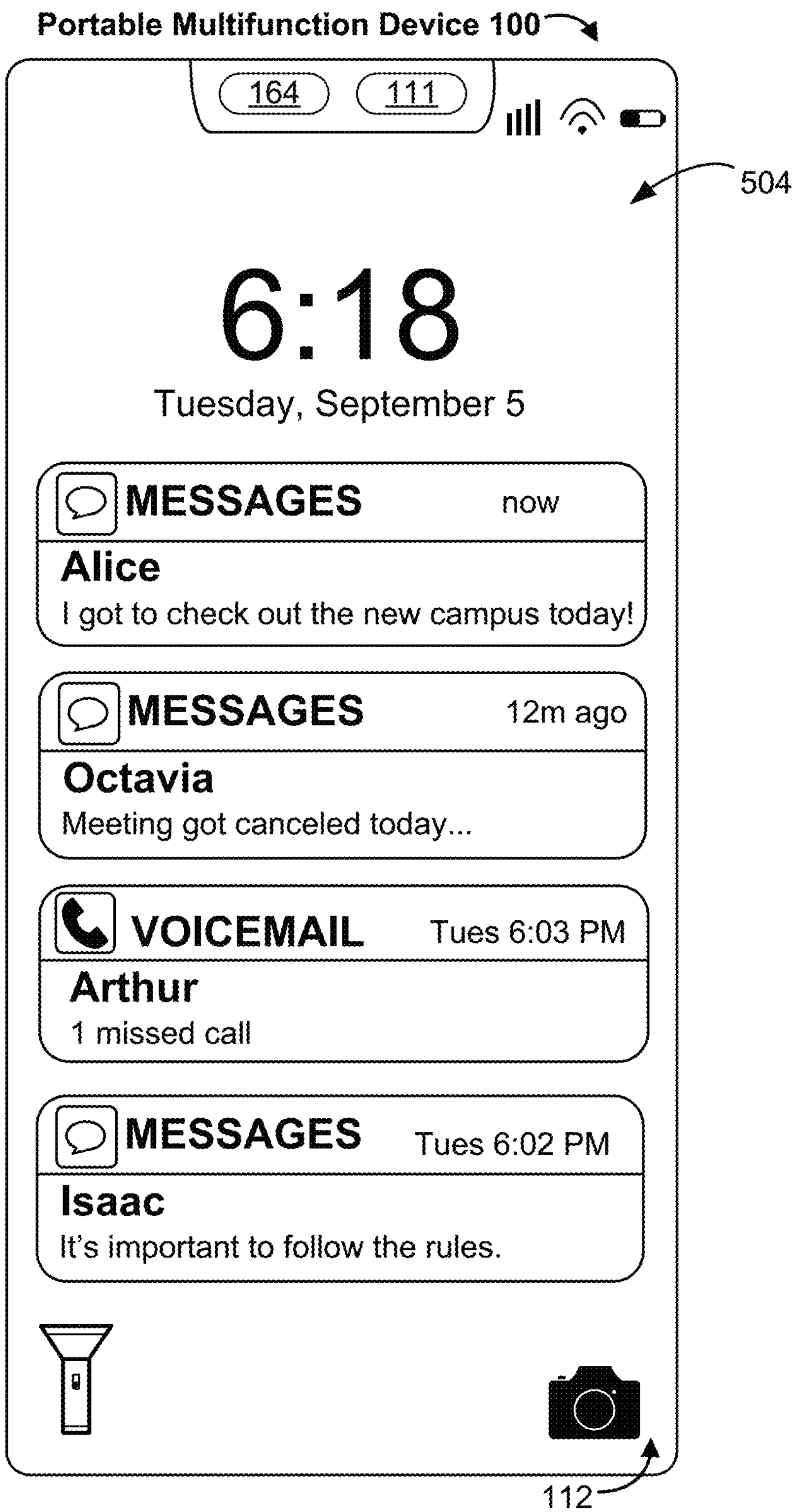
Figure 5C:
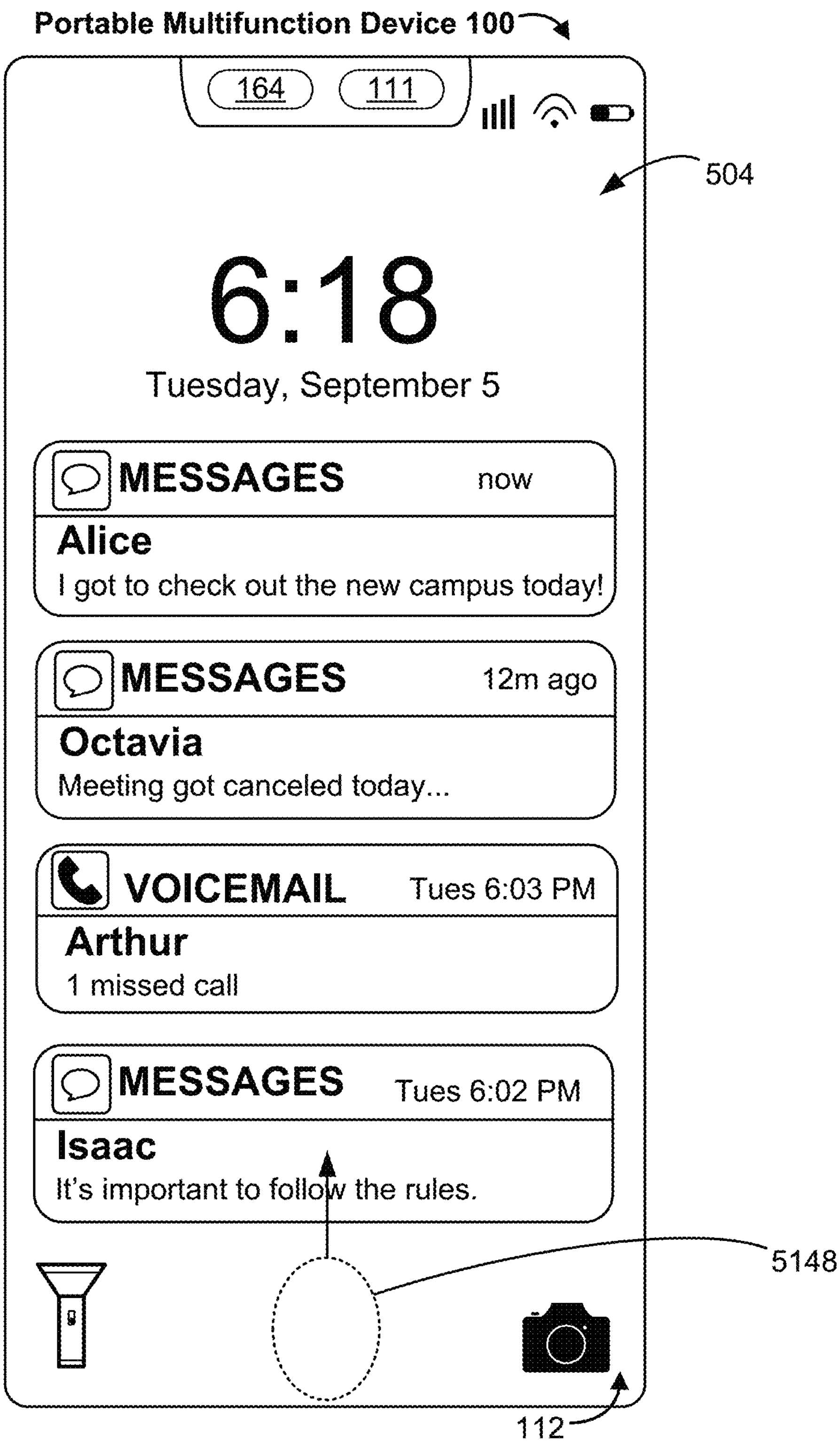
Figure 5C:
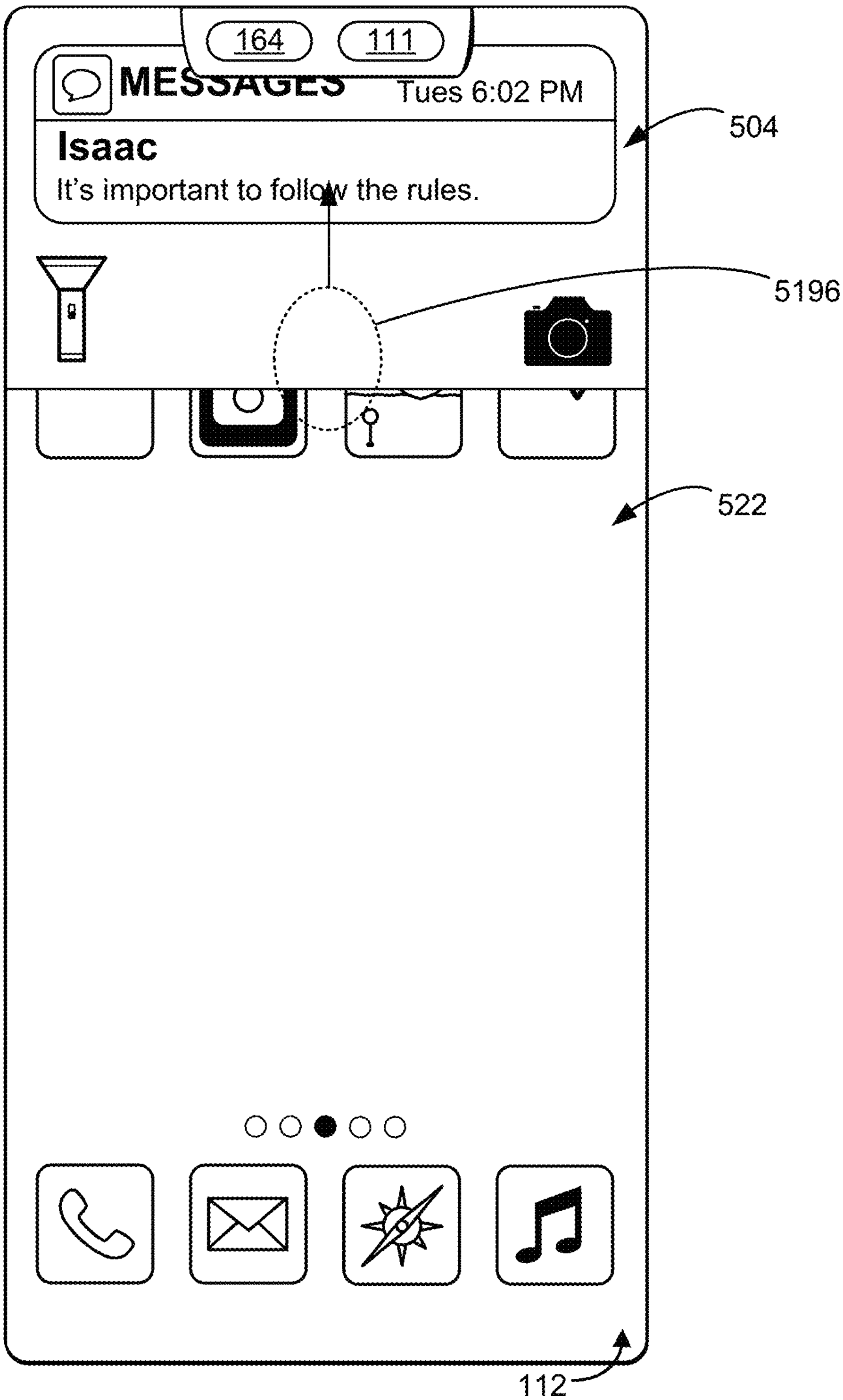
Figure 5C:
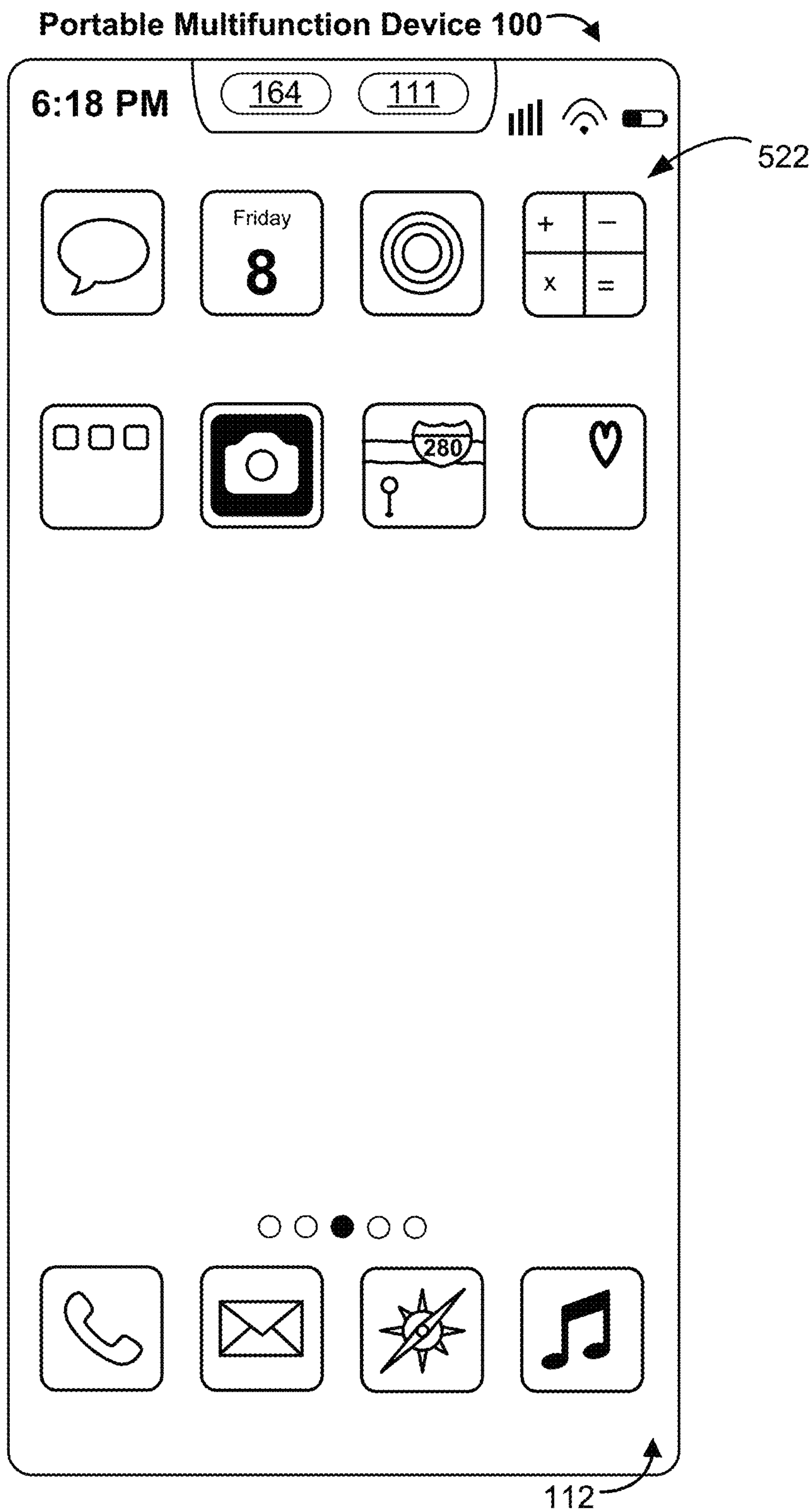
Figure 5C:
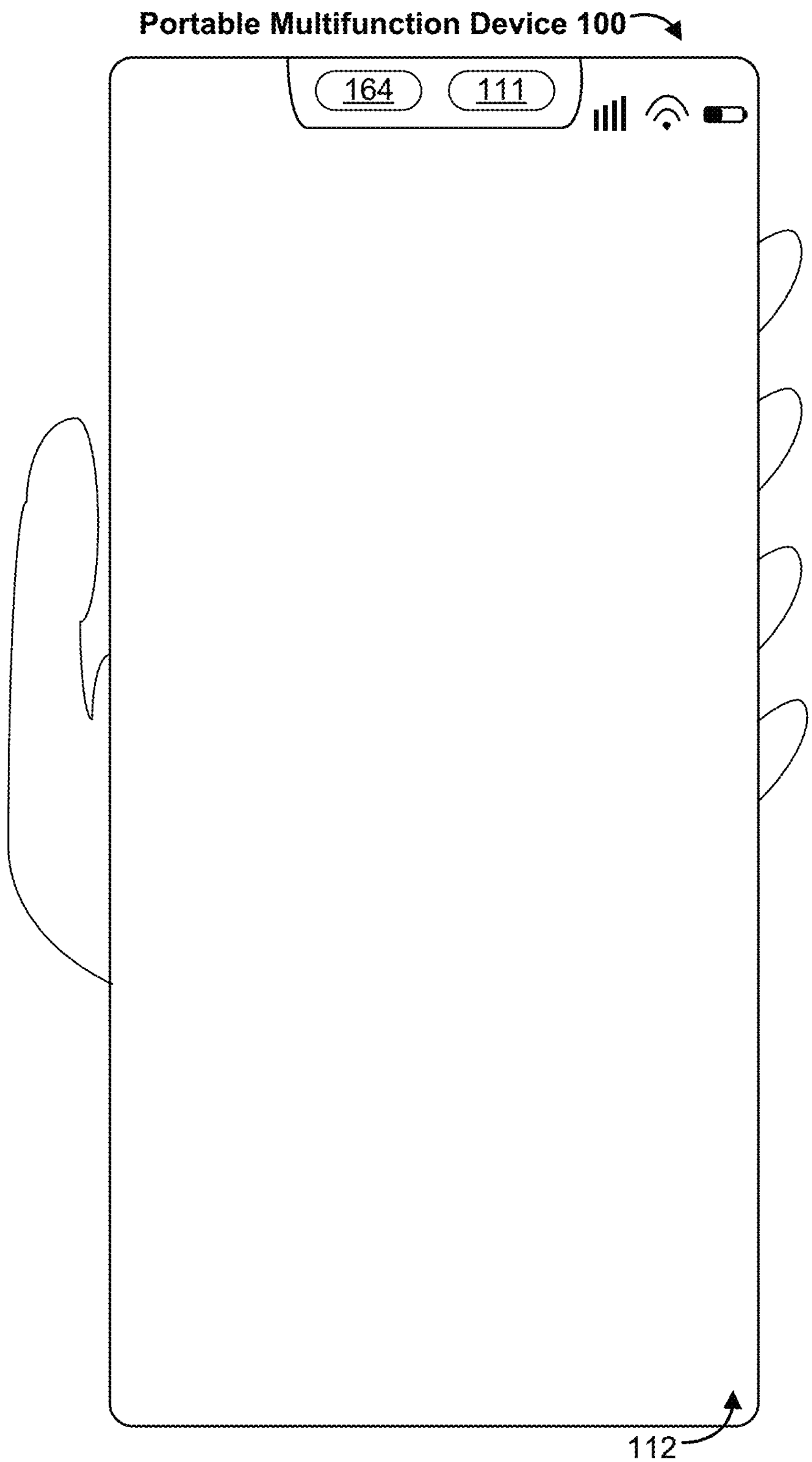
Figure 5C:
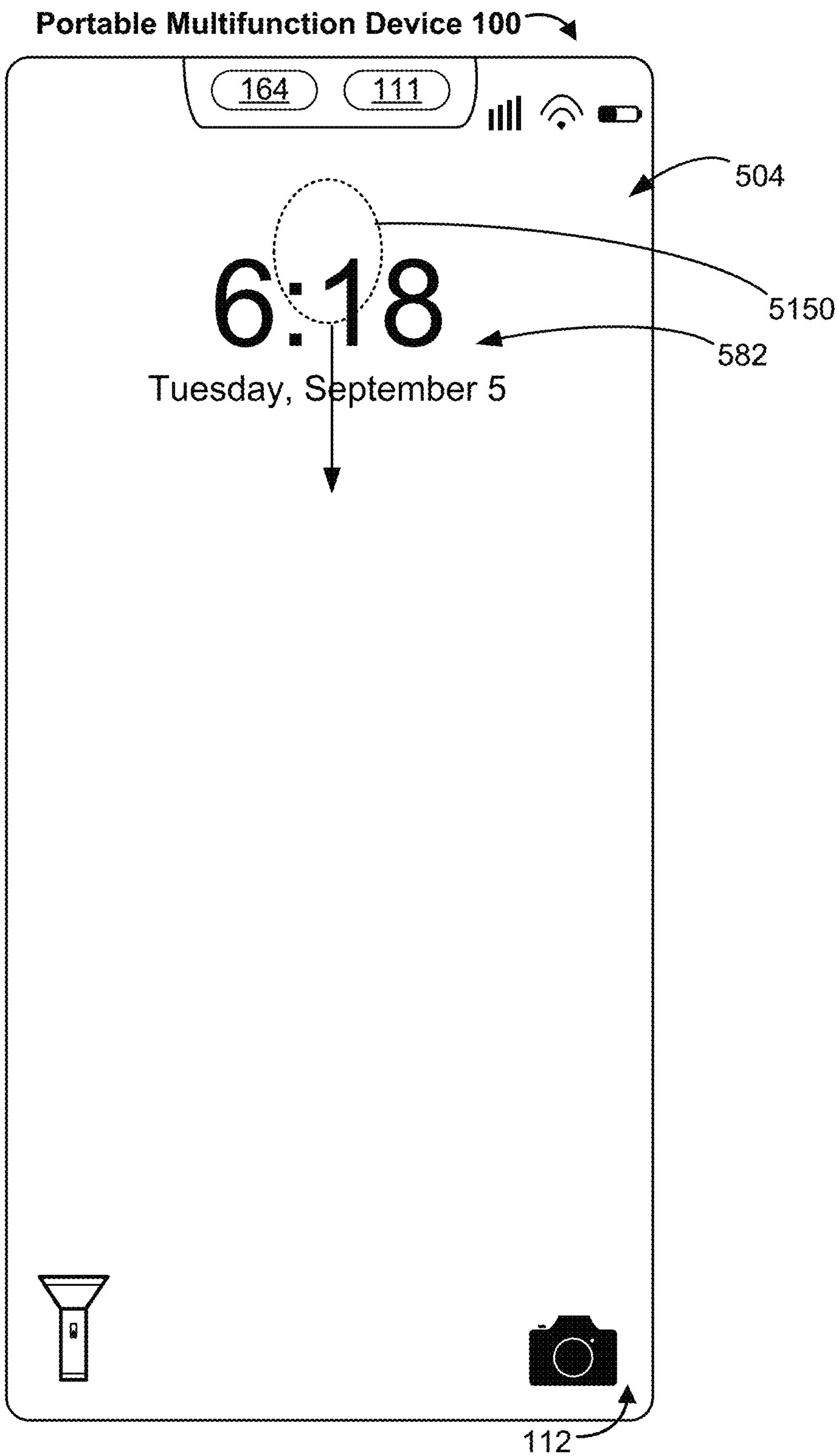
Figure 5C:
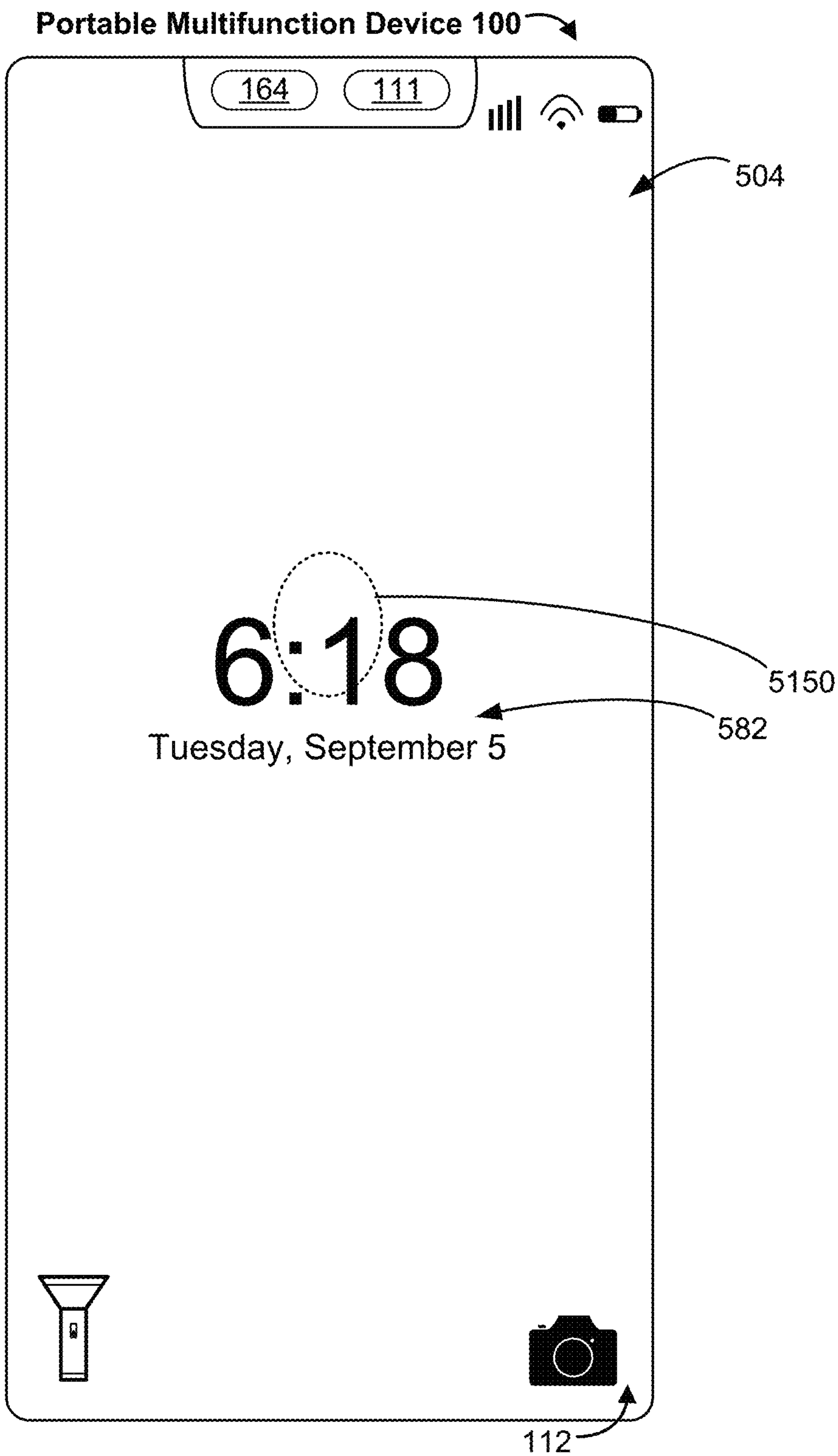
Figure 5C:
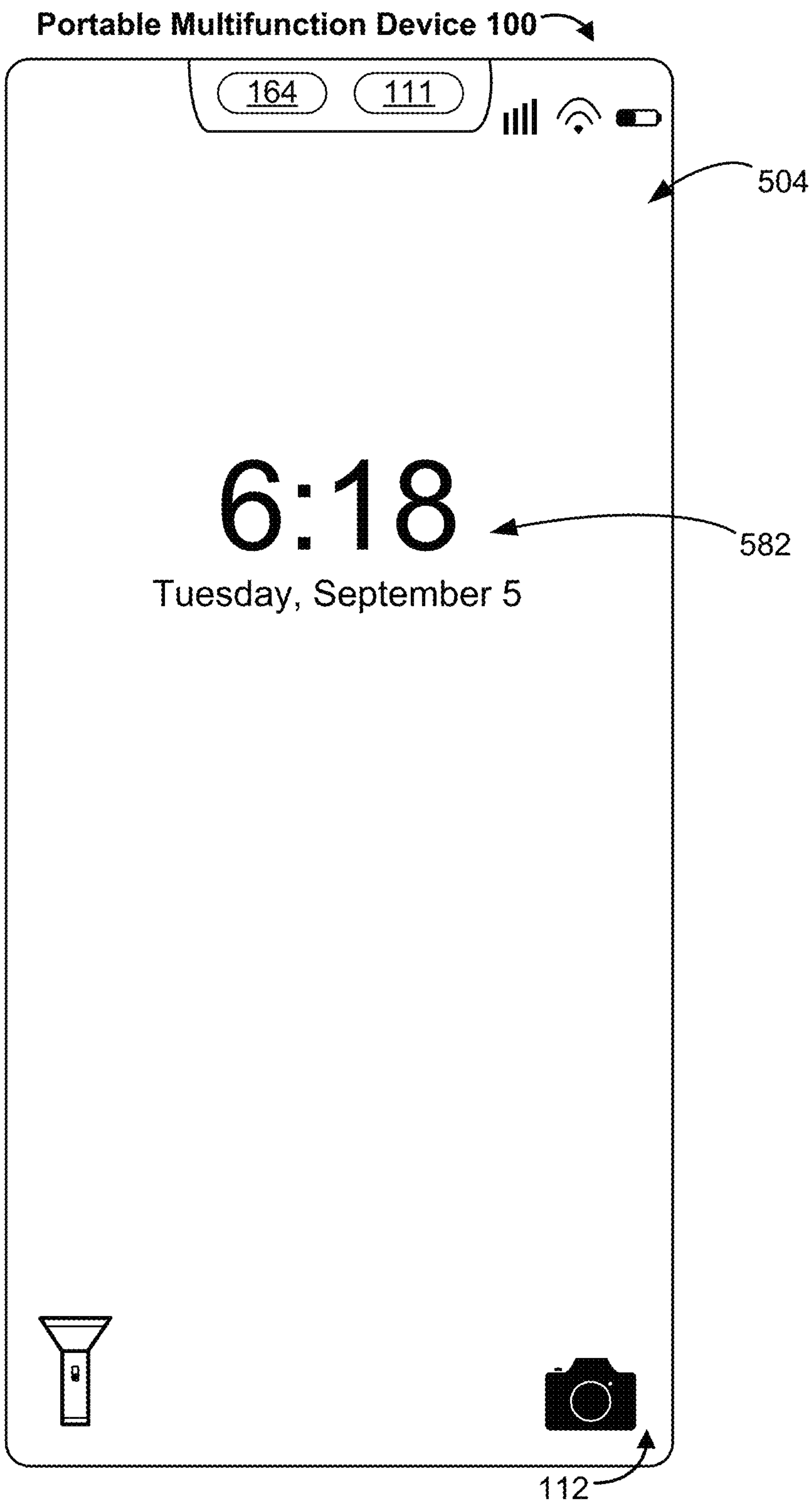
Figure 5C:
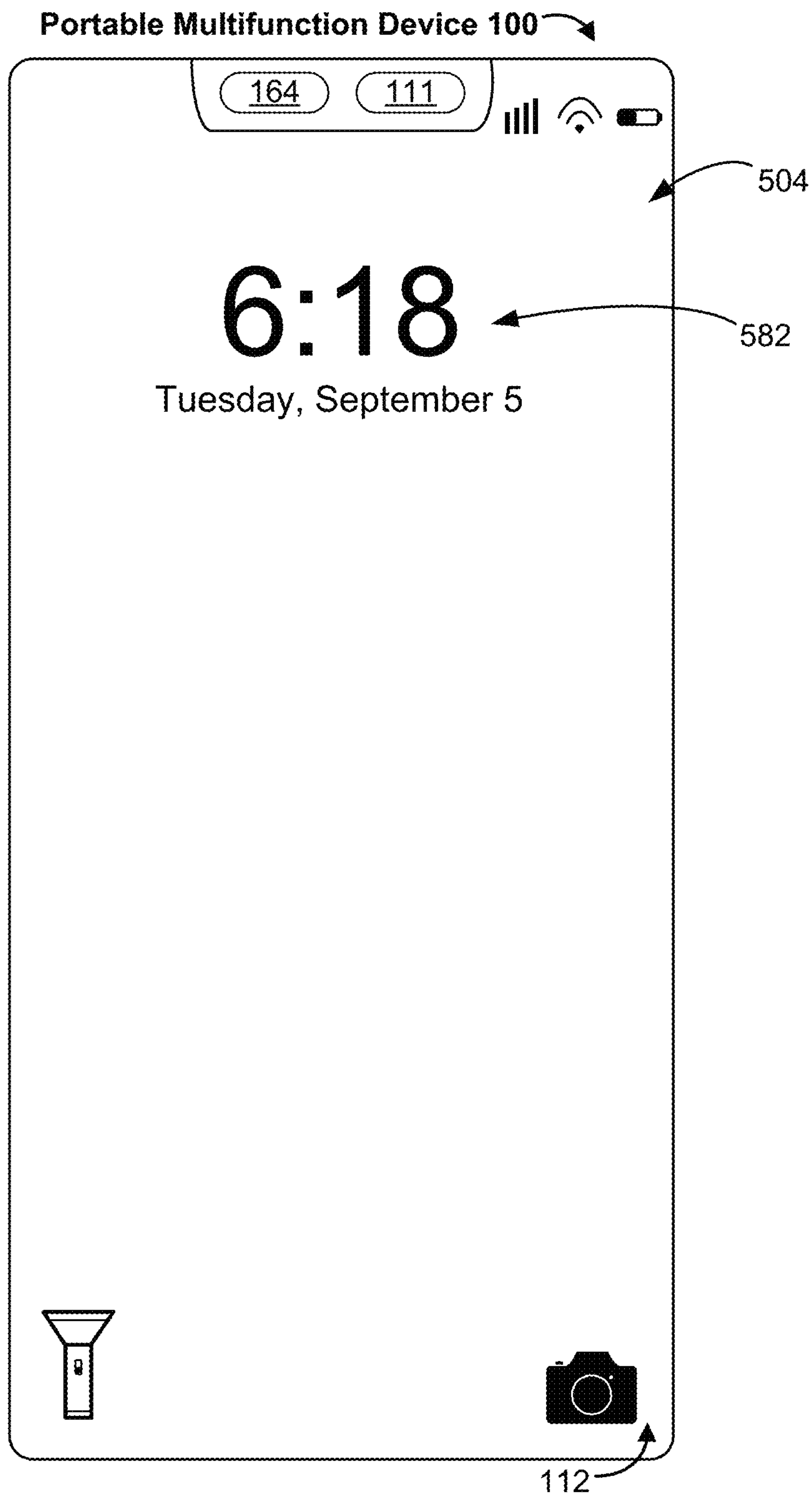
Figure 5C:
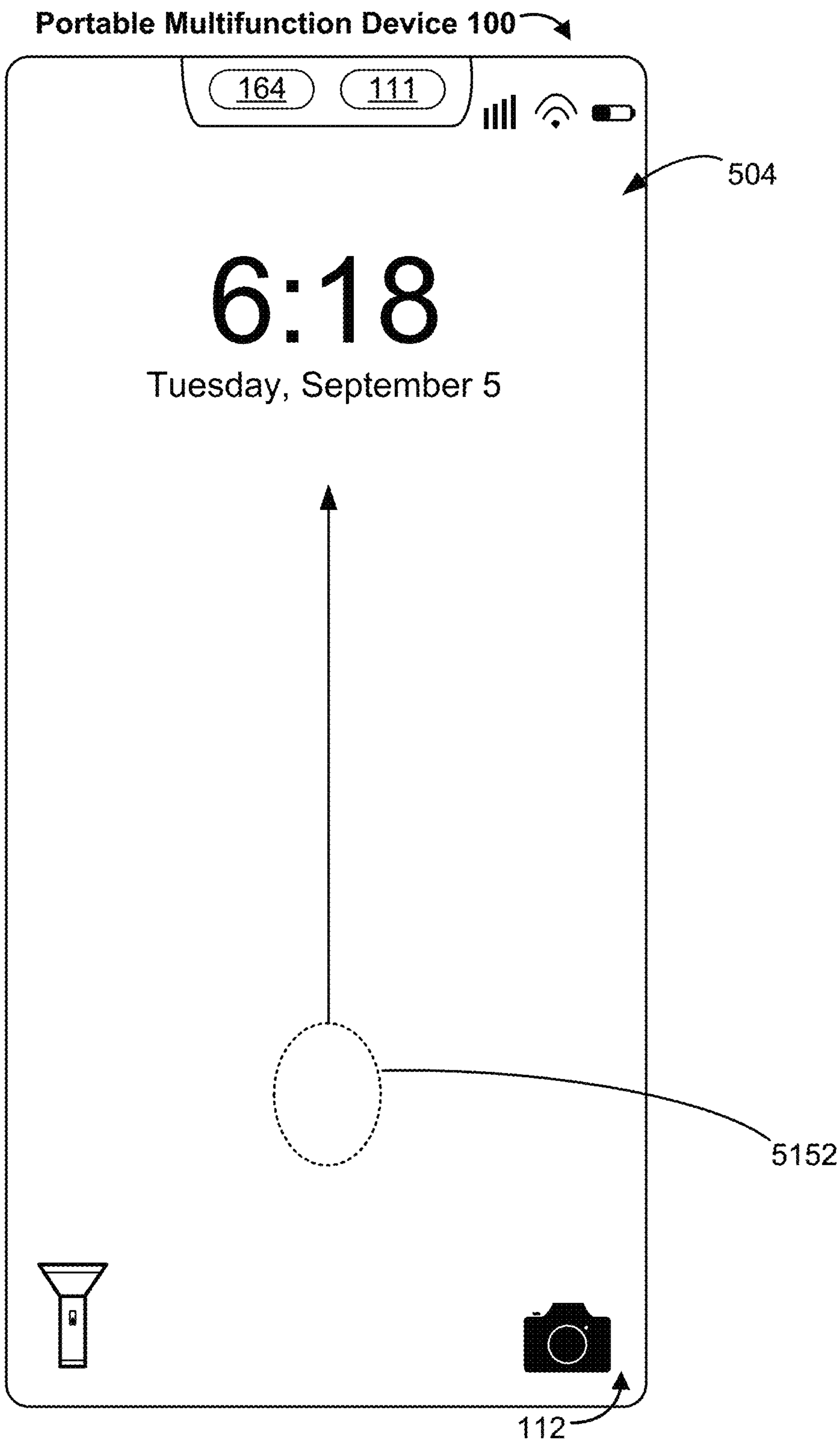
Figure 5C:
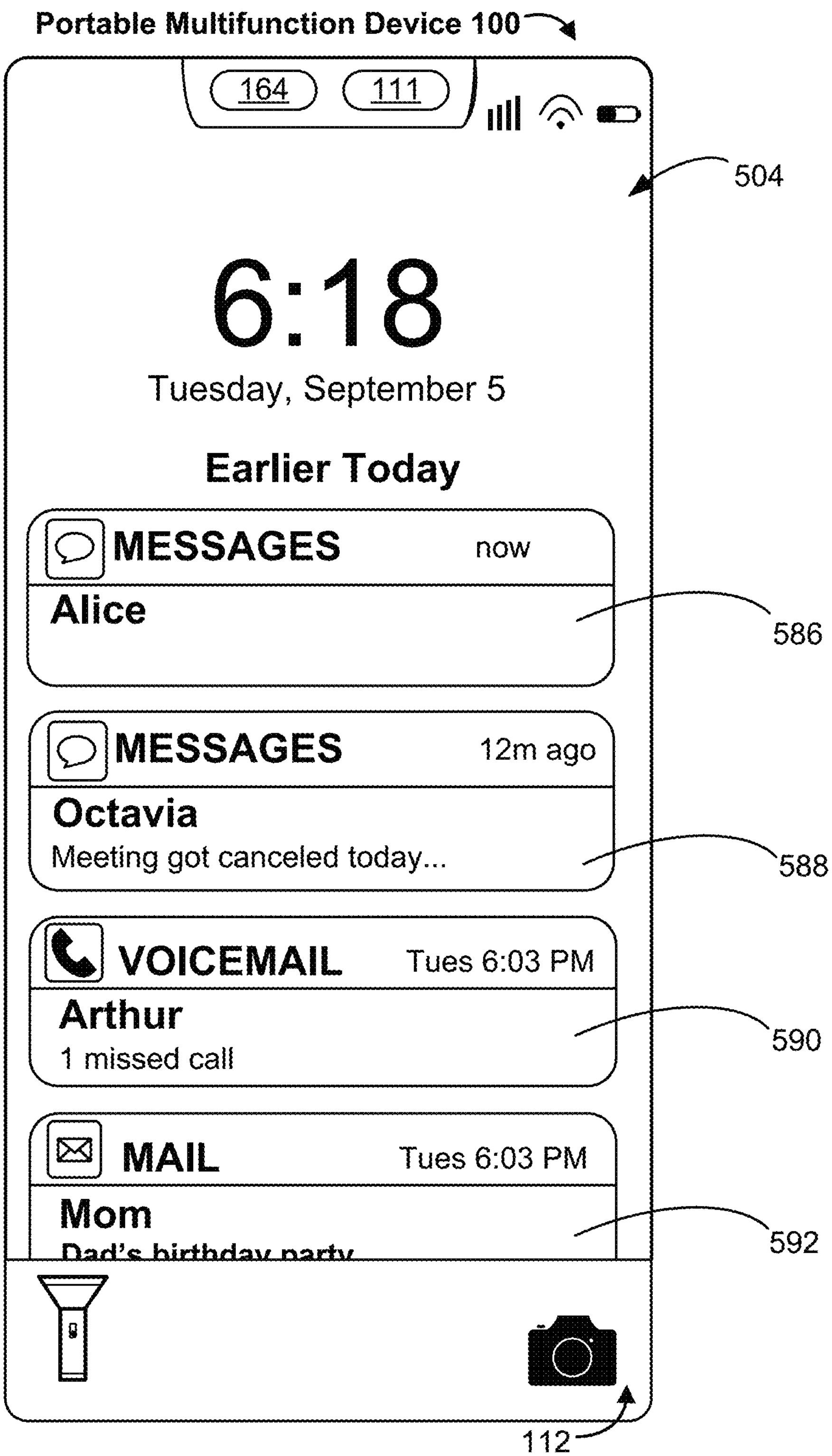
Figure 5C:
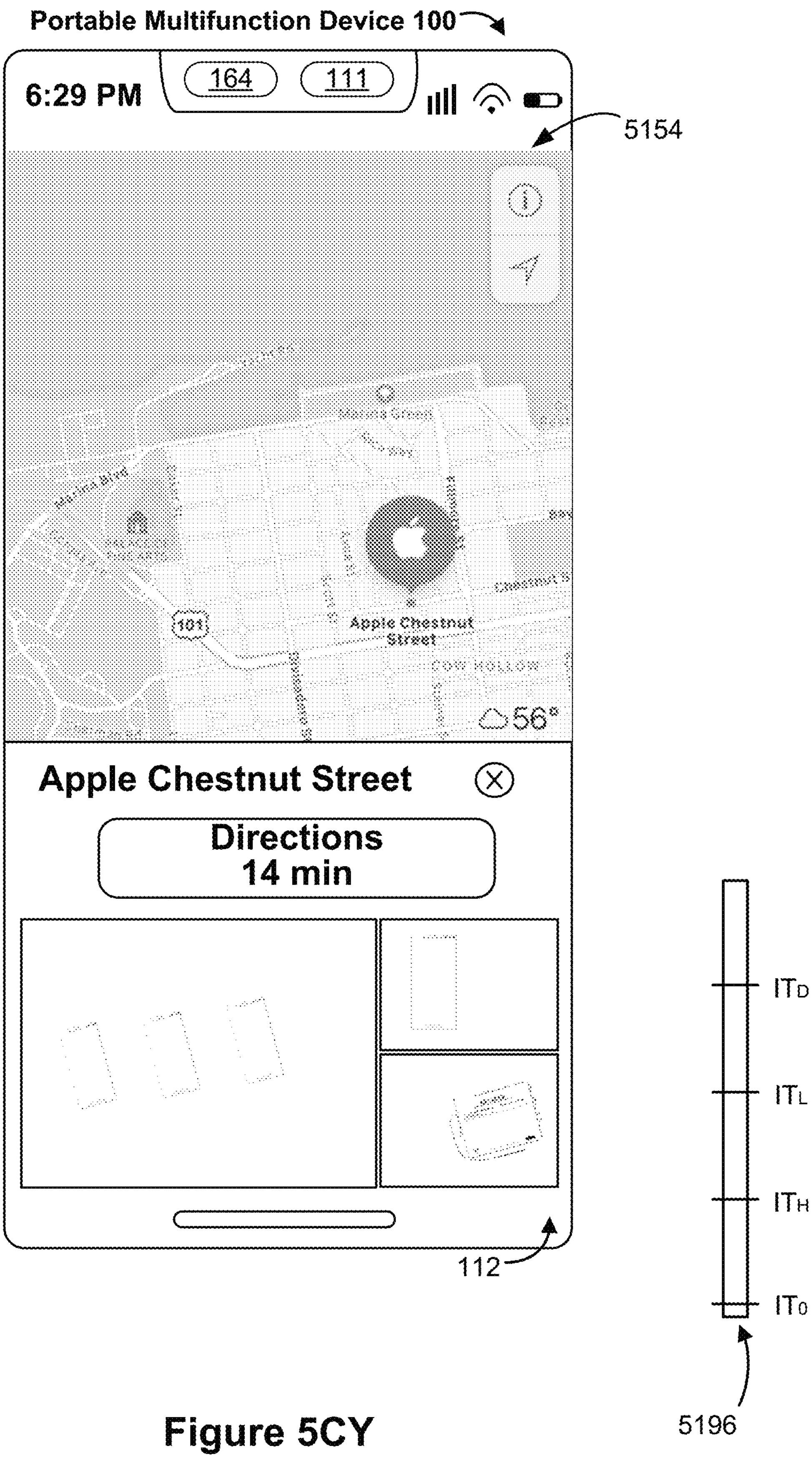
Figure 5C:
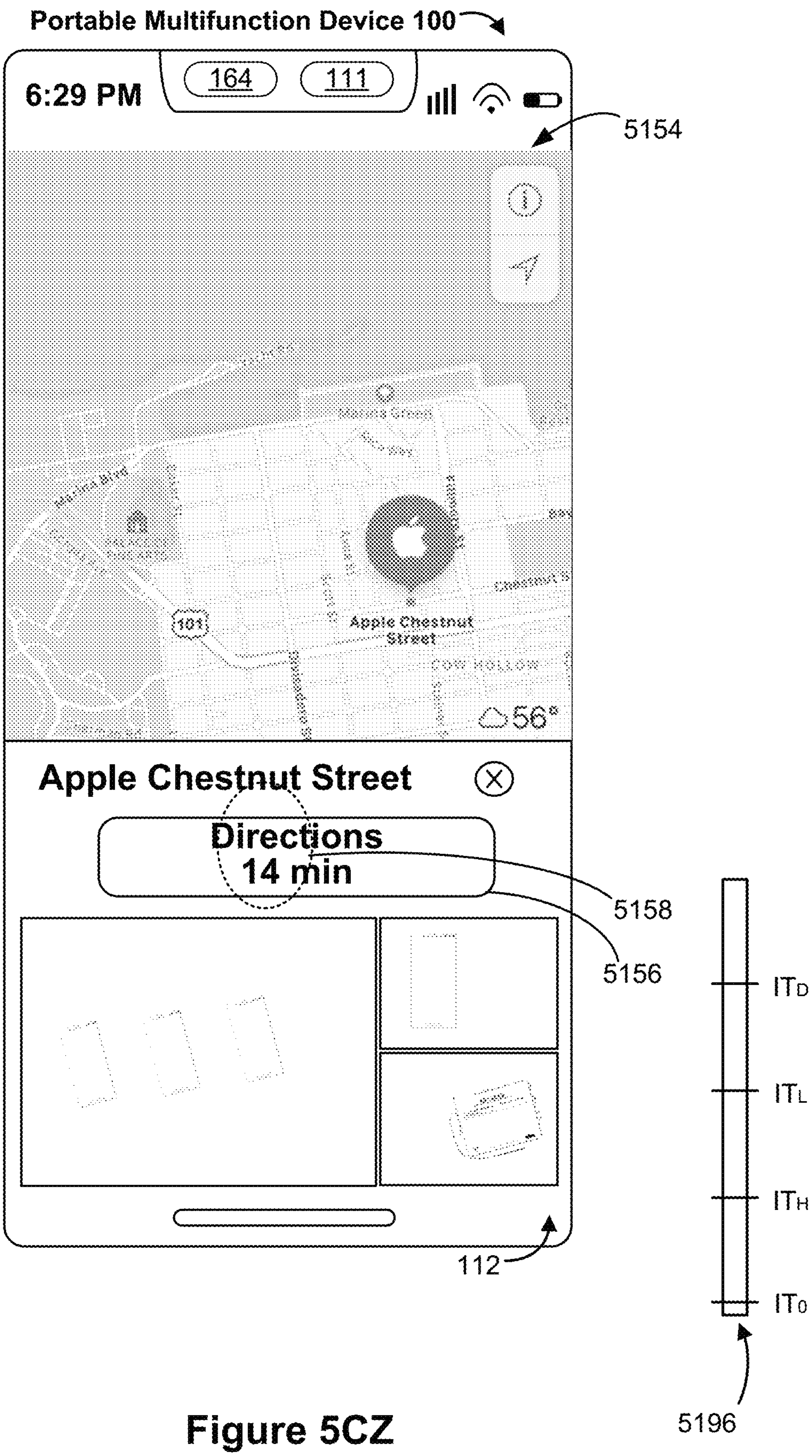
Figure 5D:
Figure 5D:
Figure 5D:
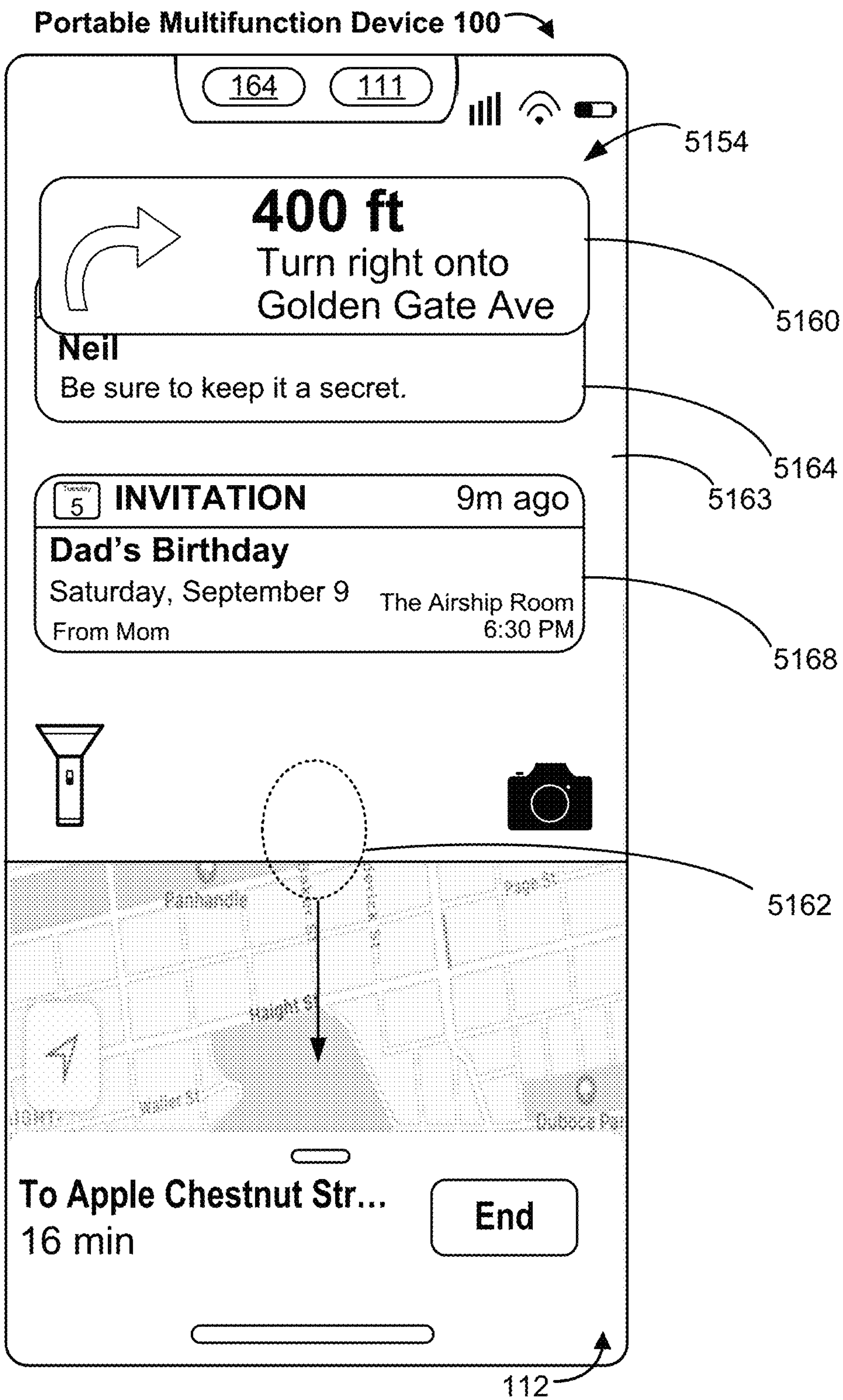
Figure 5D:
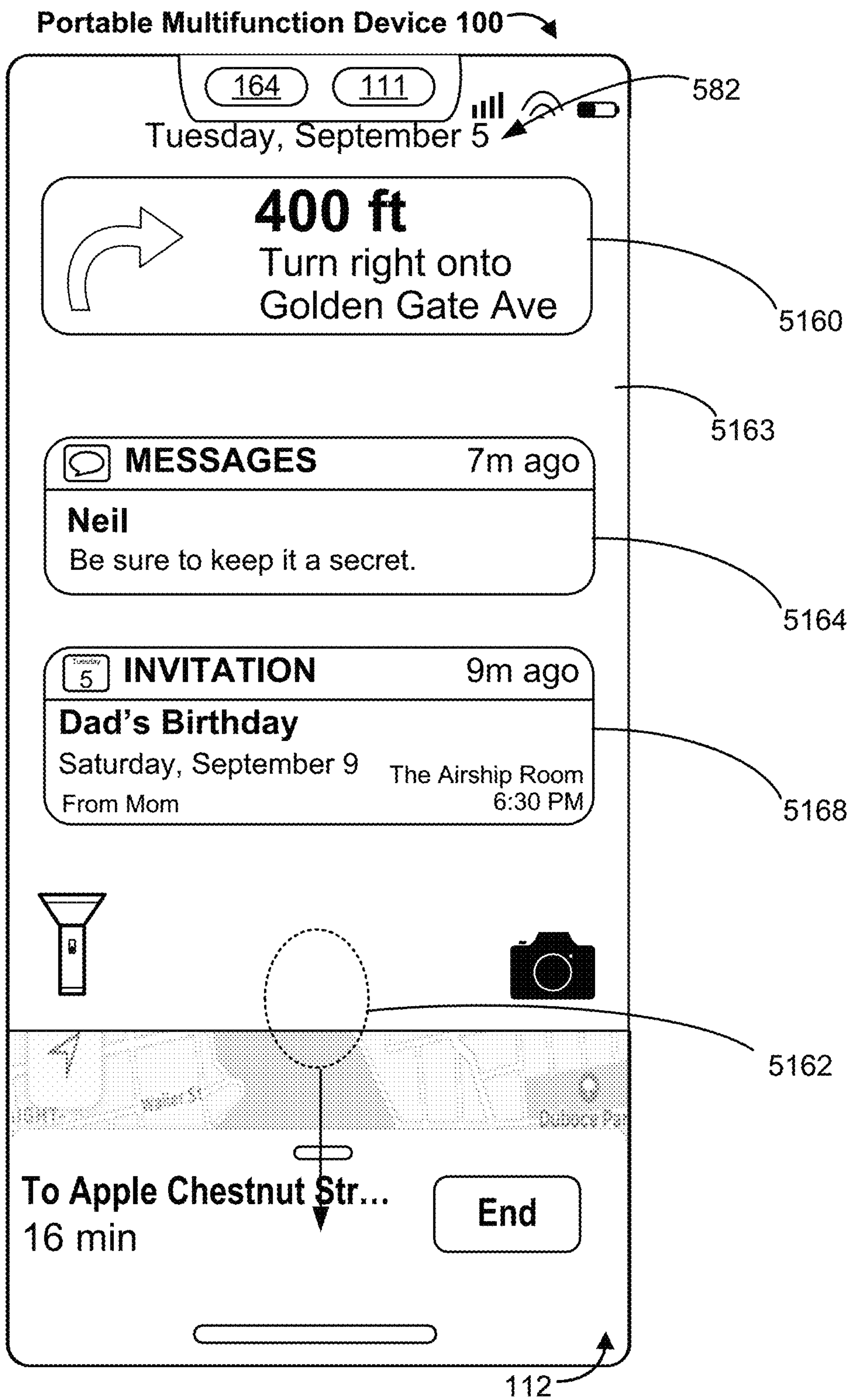
Figure 5D:
Figure 5D:
Figure 5D:
Figure 5D:
Figure 5D:
Figure 5D:
Figure 5D:
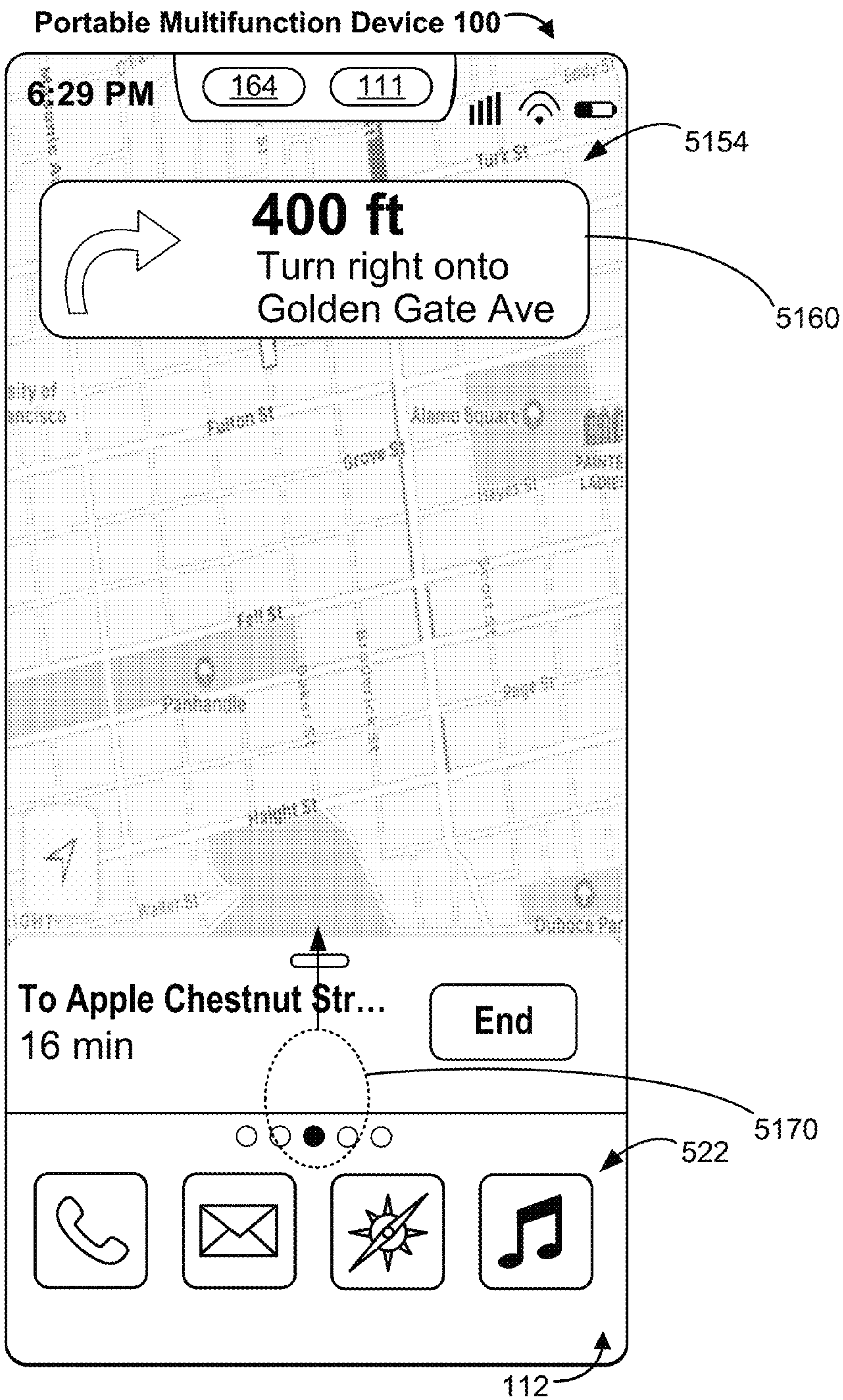
Figure 5D:
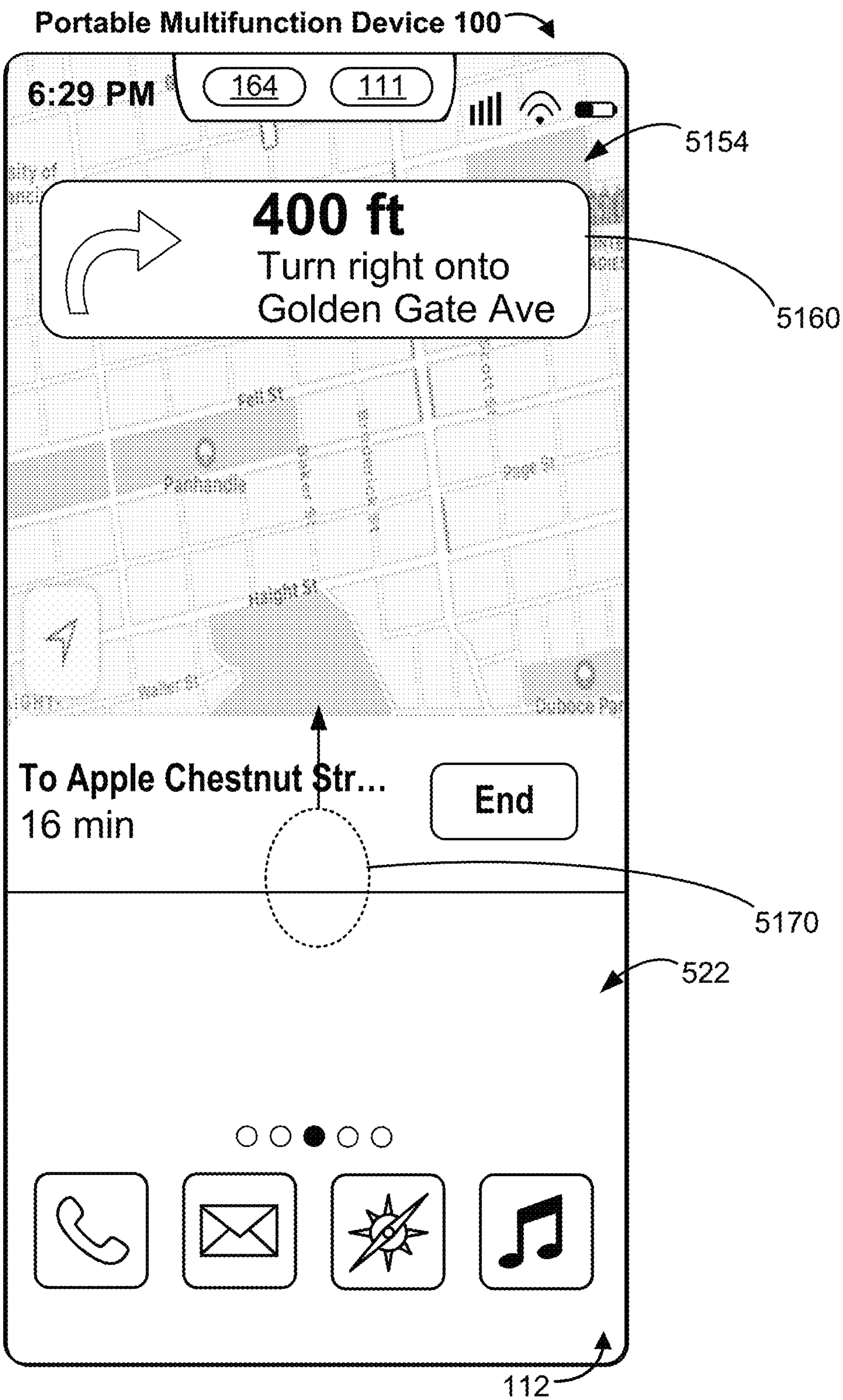
Figure 5D:
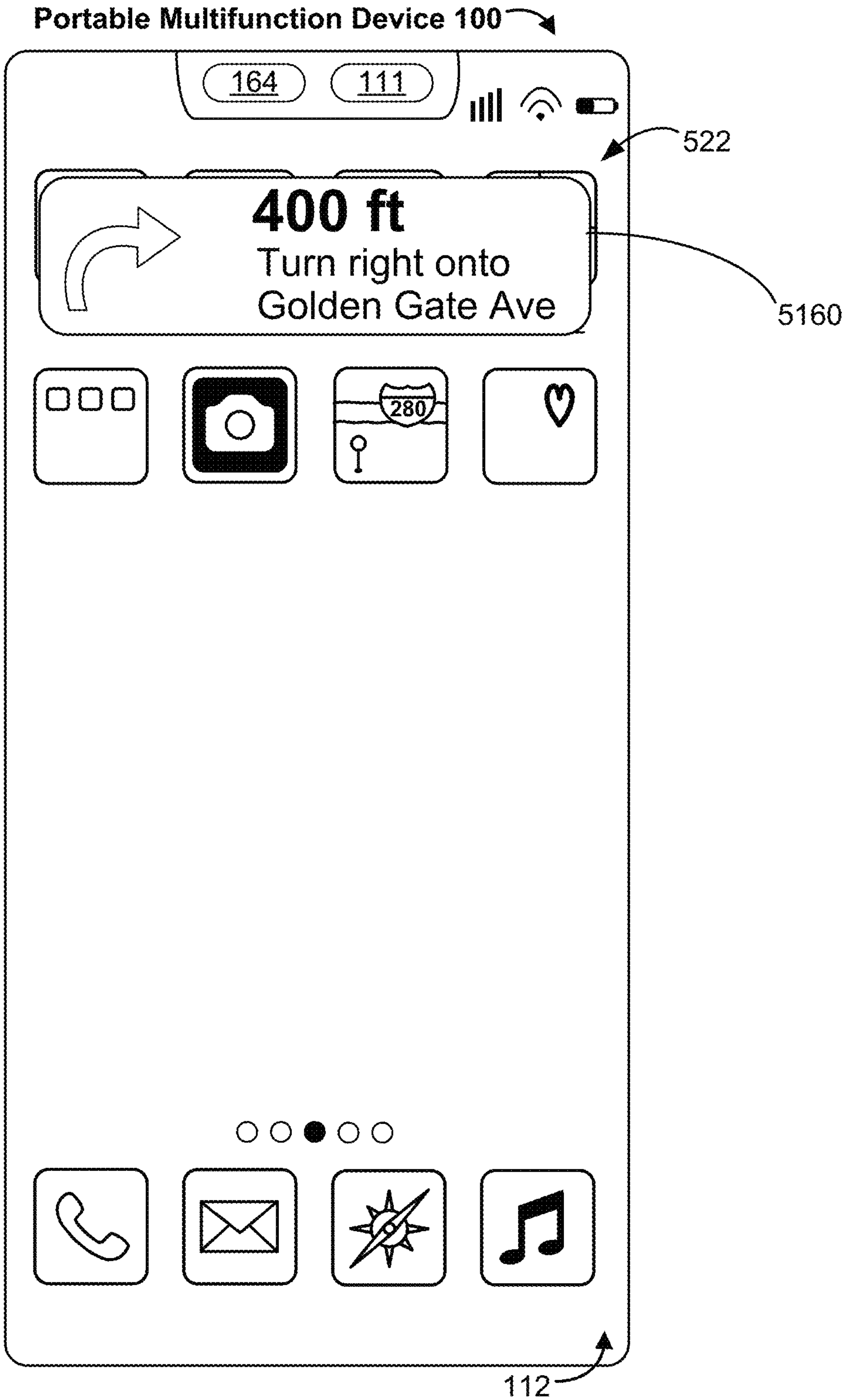
Figure 5D:
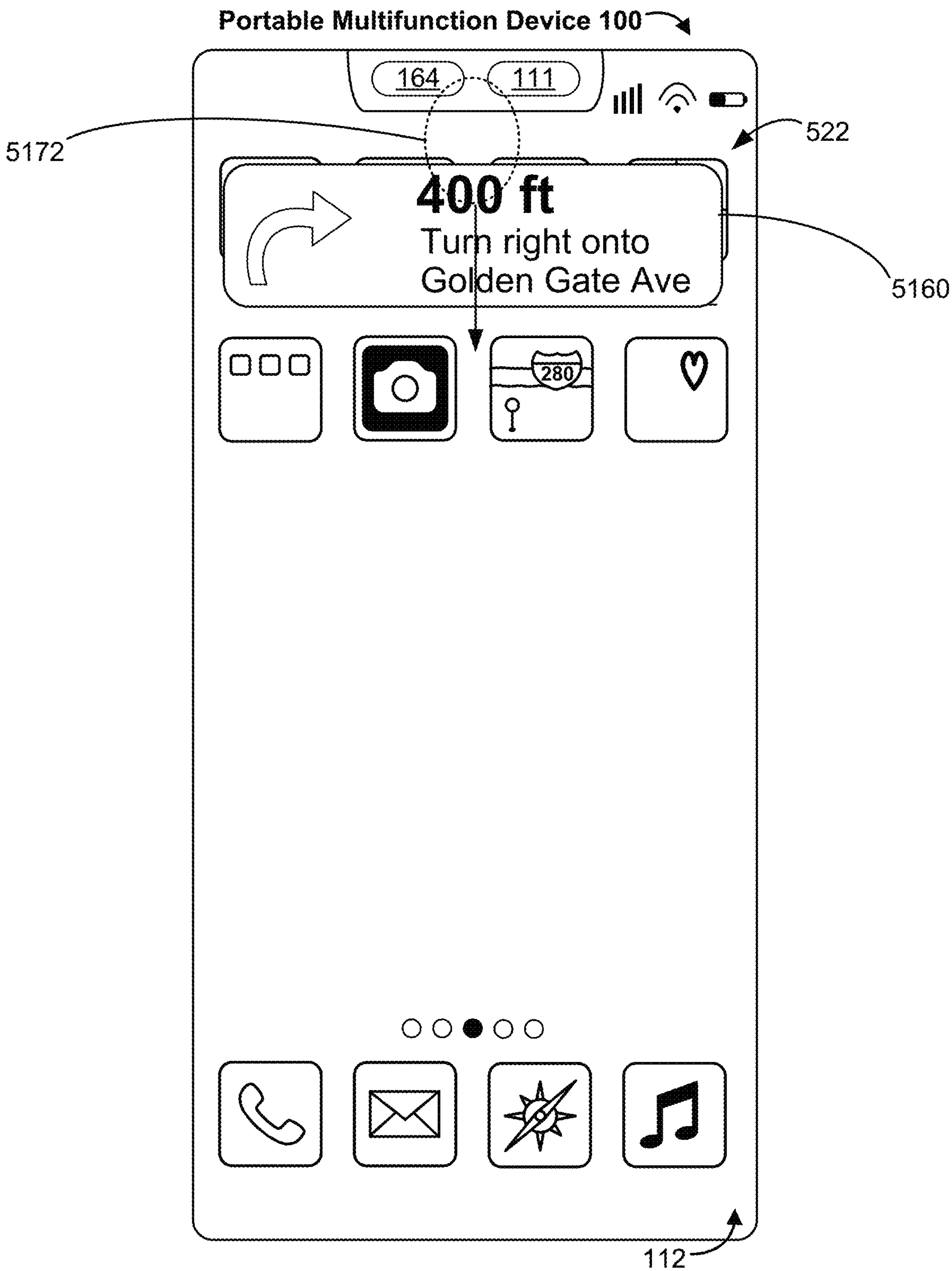
Figure 5D:
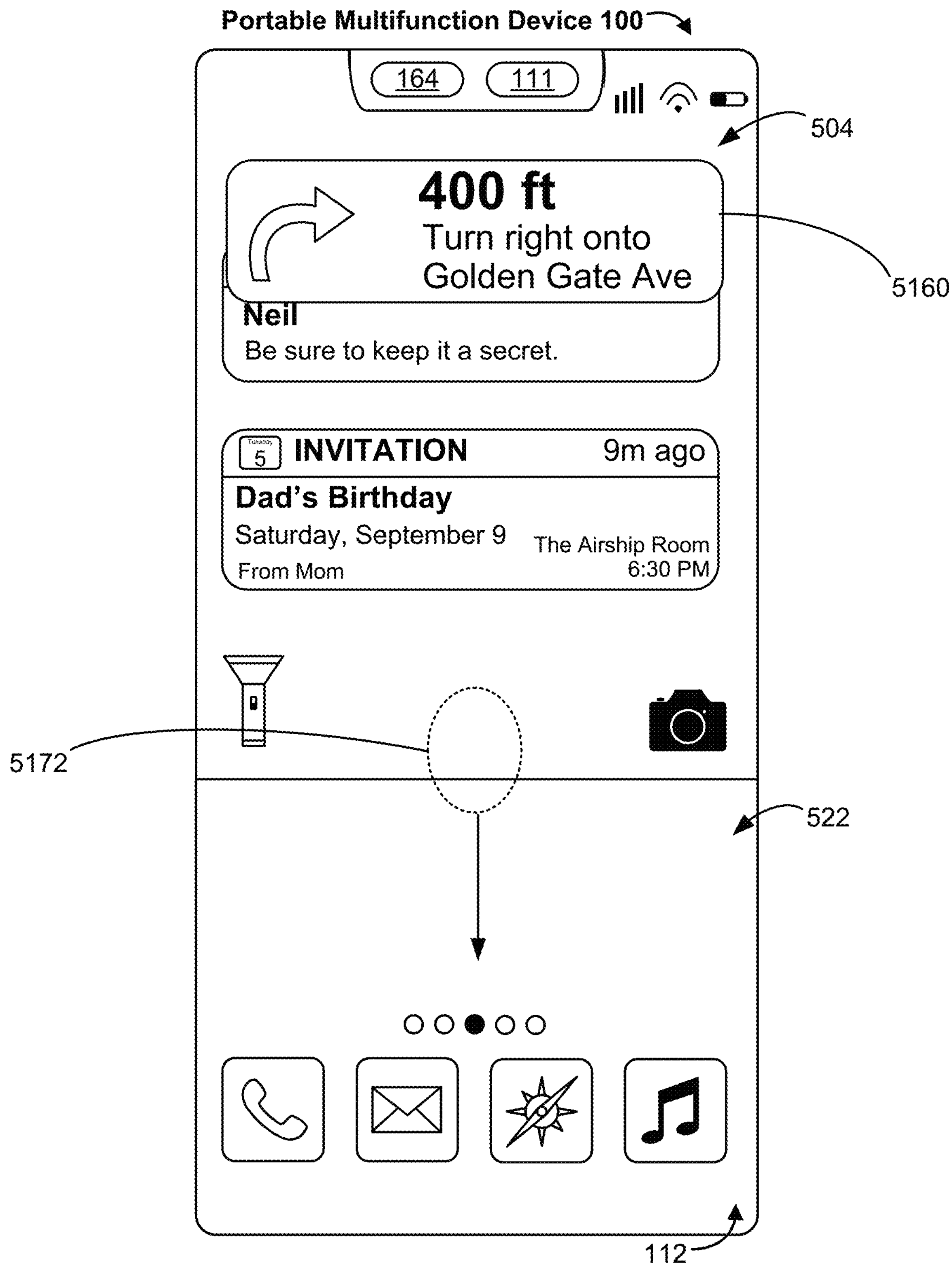
Figure 5D:
Figure 5D:
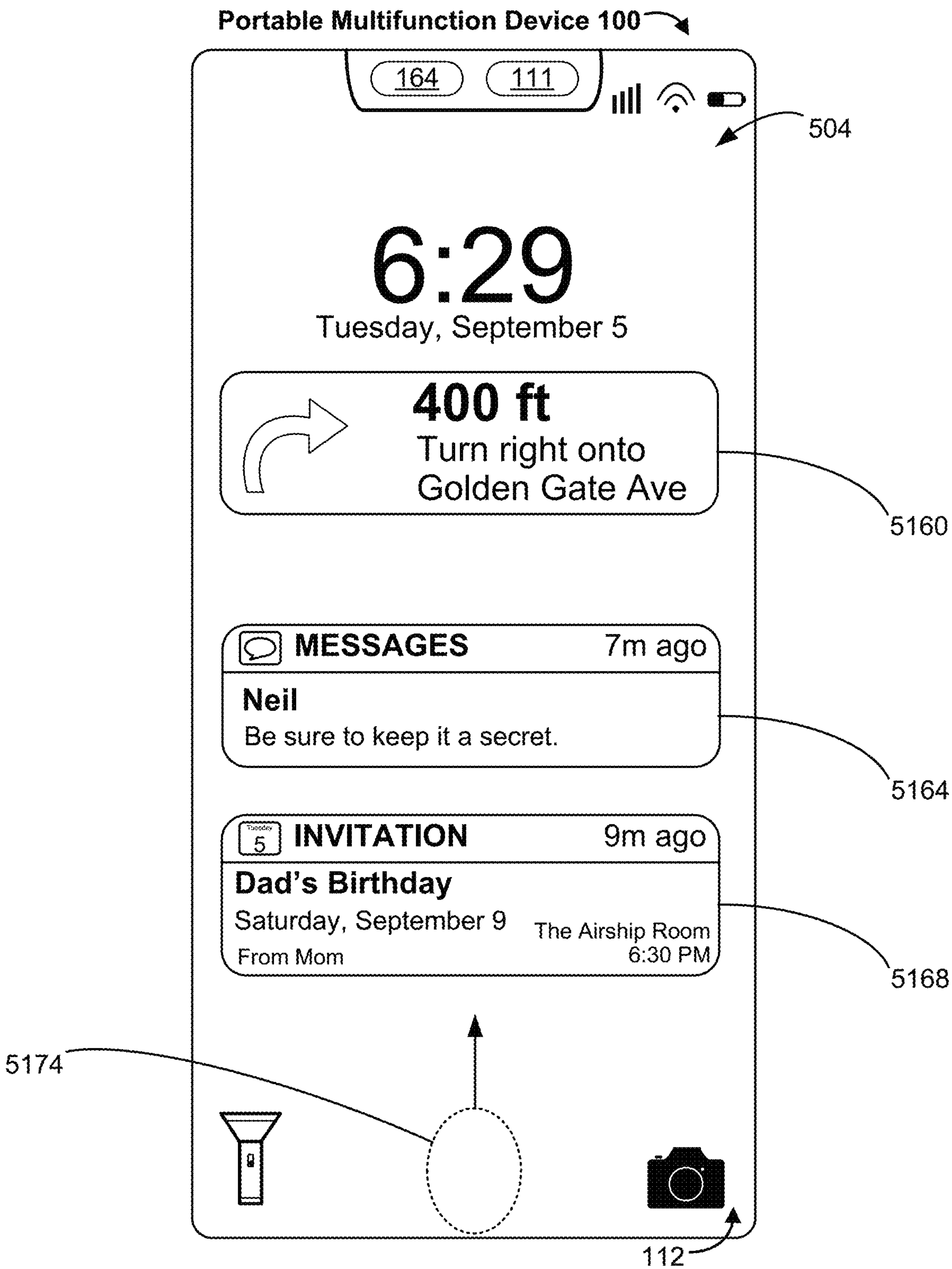
Figure 5D:
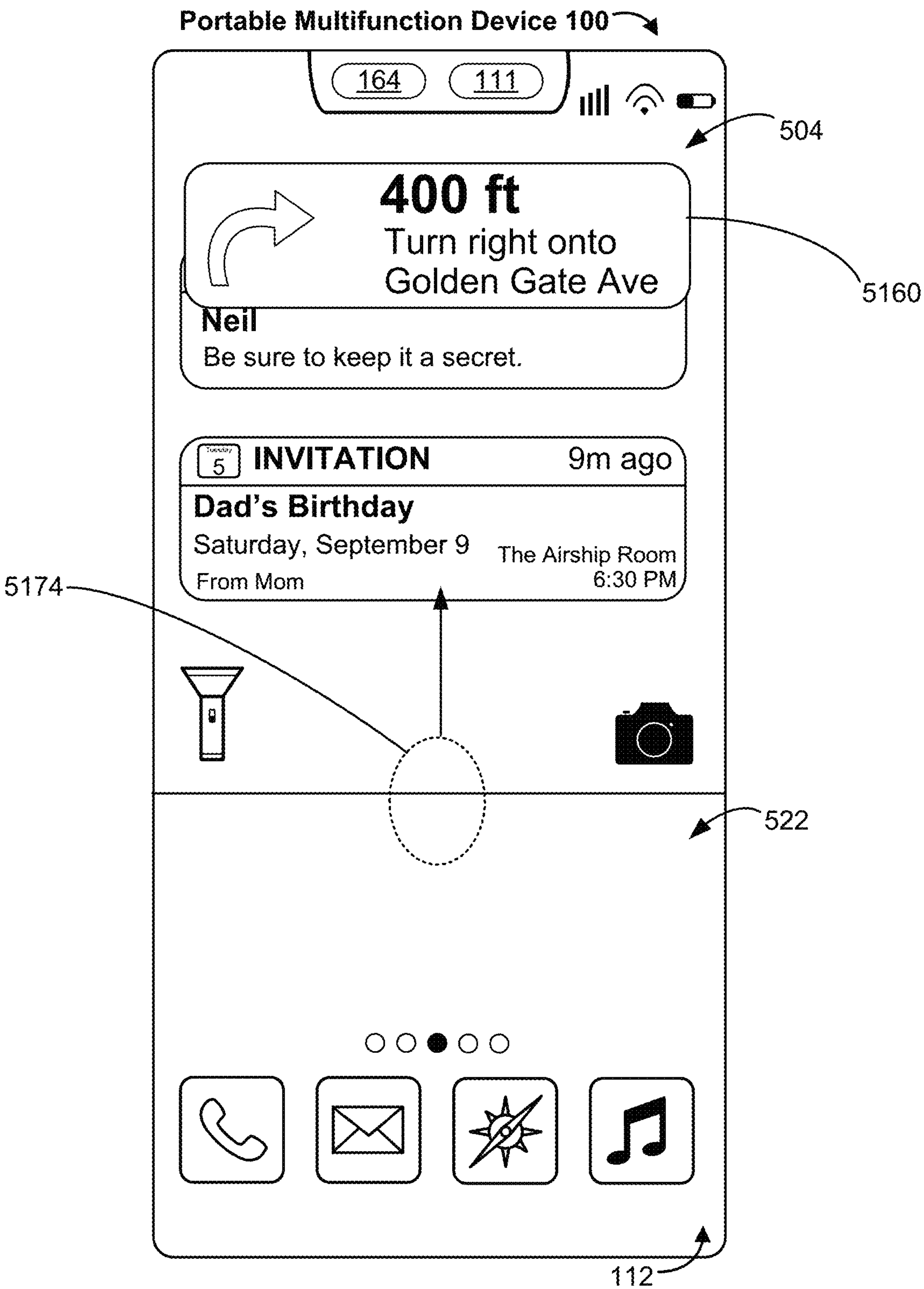
Figure 5D:
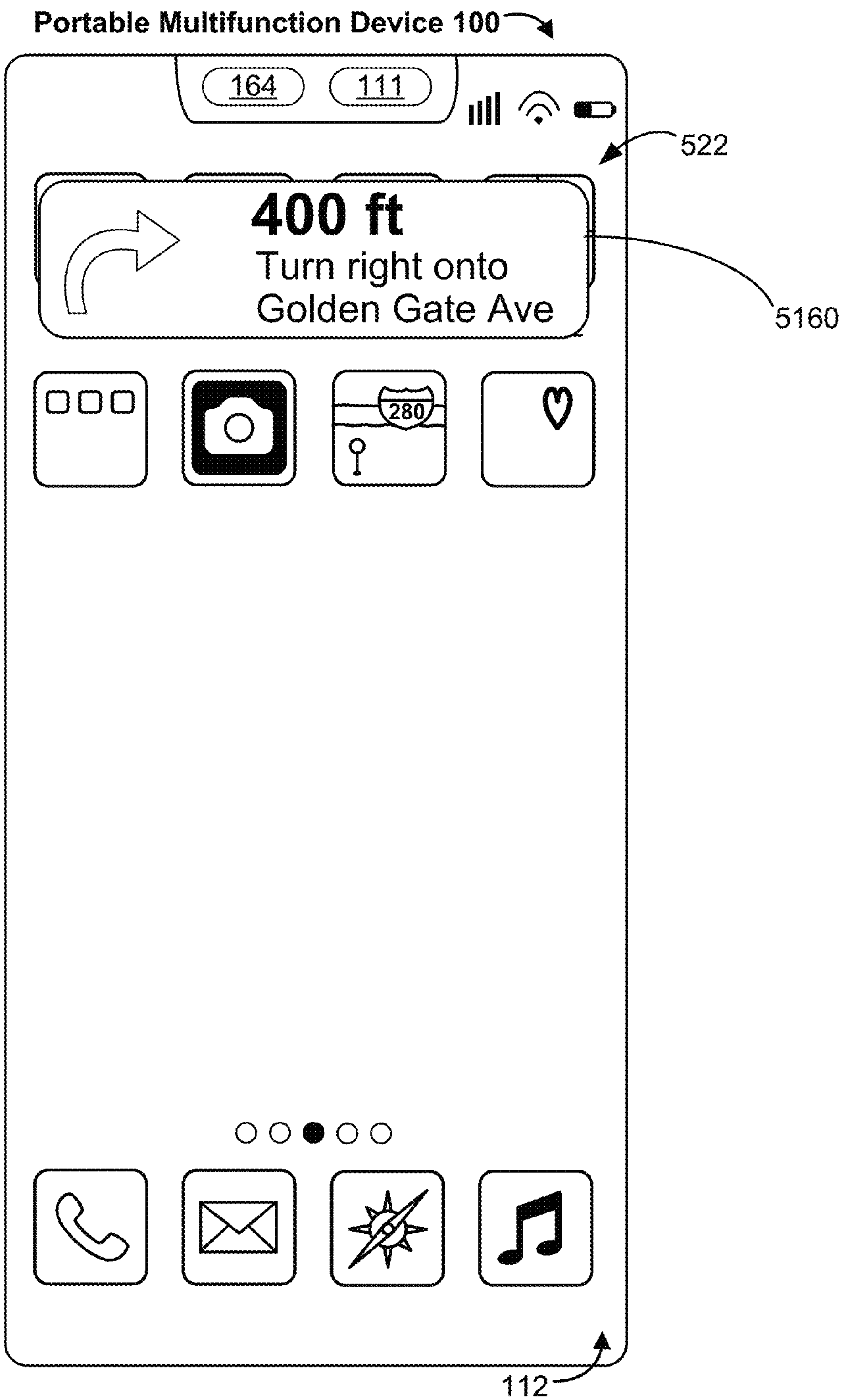
Figure 5D:
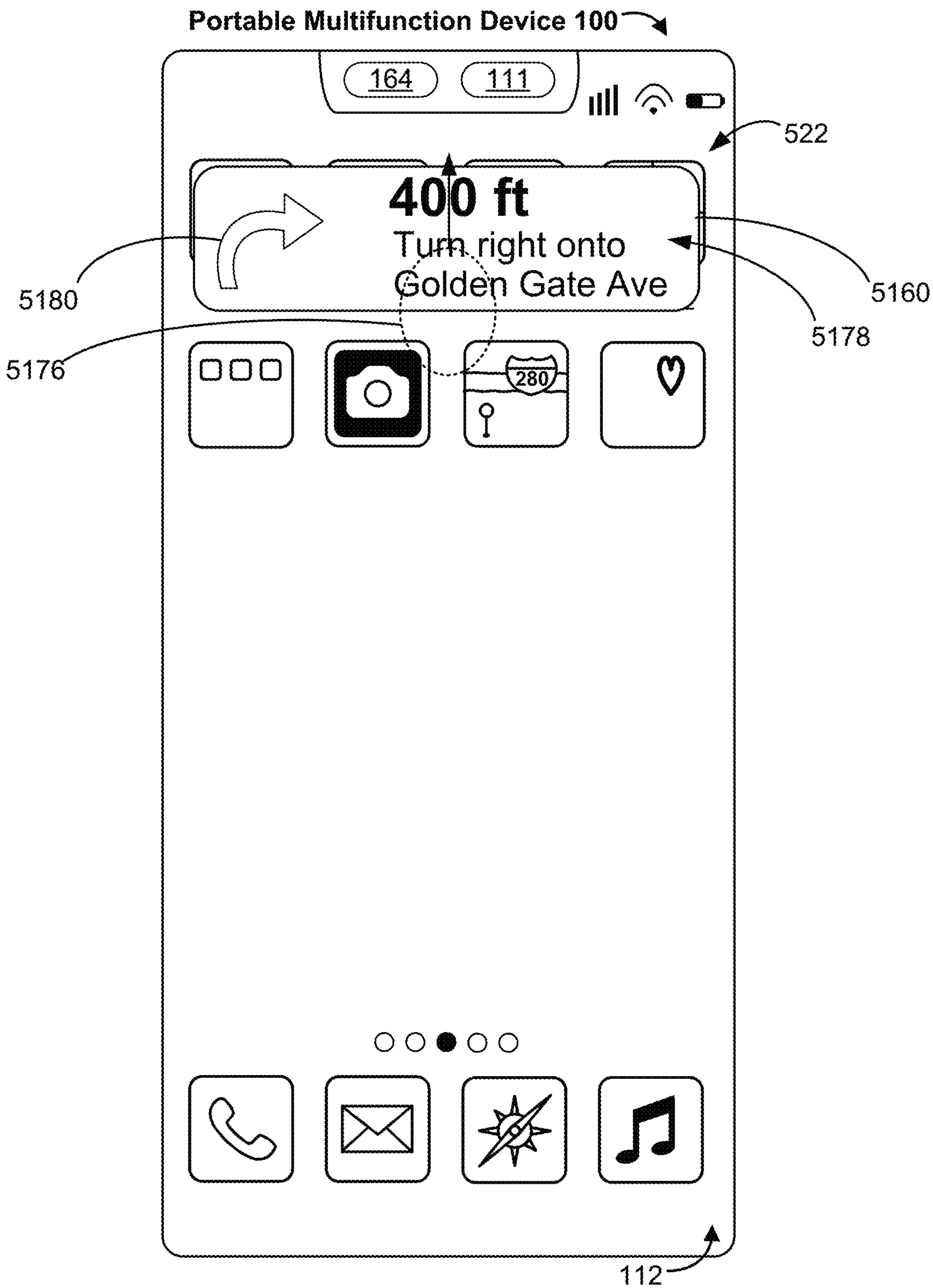
Figure 5D:
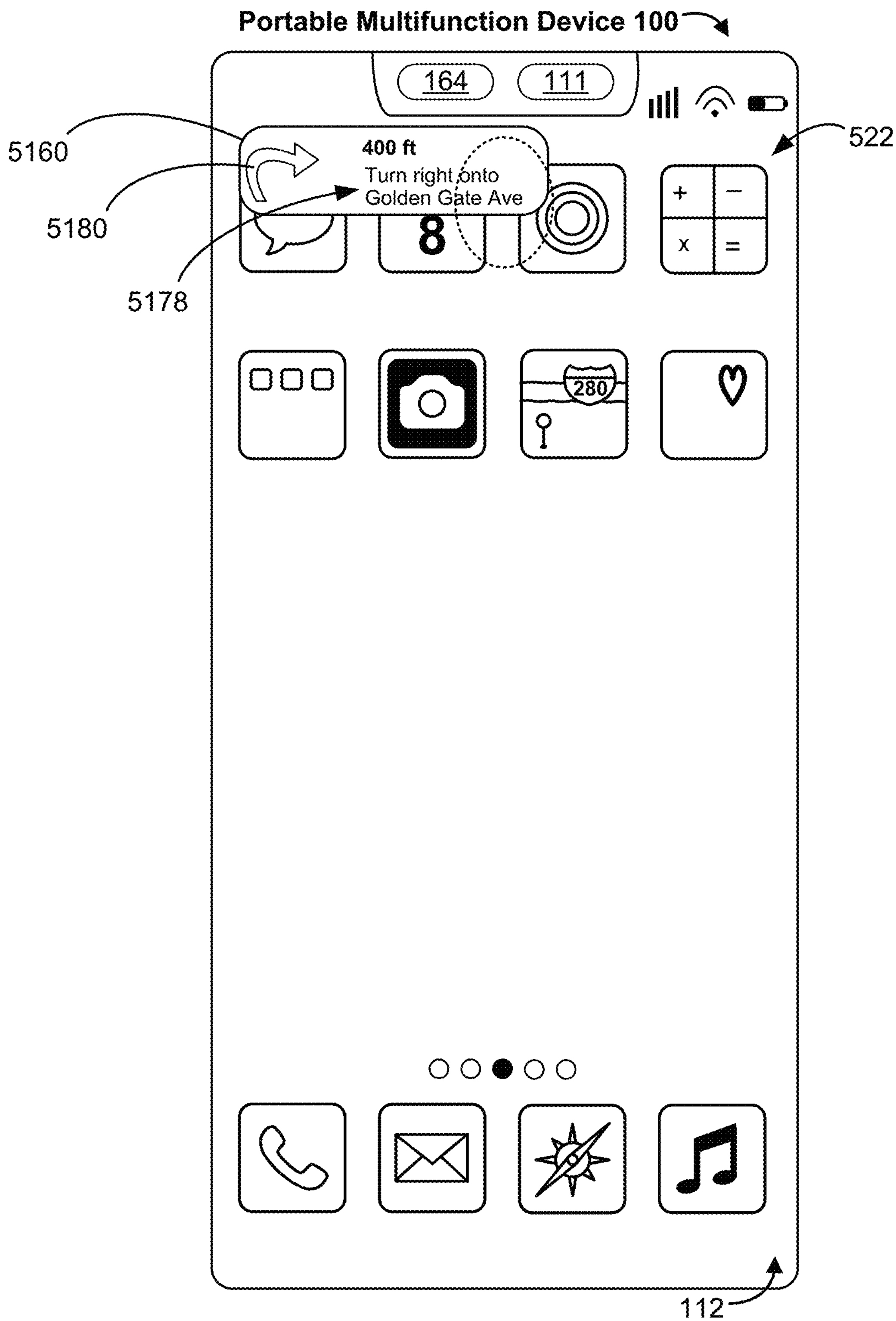
Figure 5D:
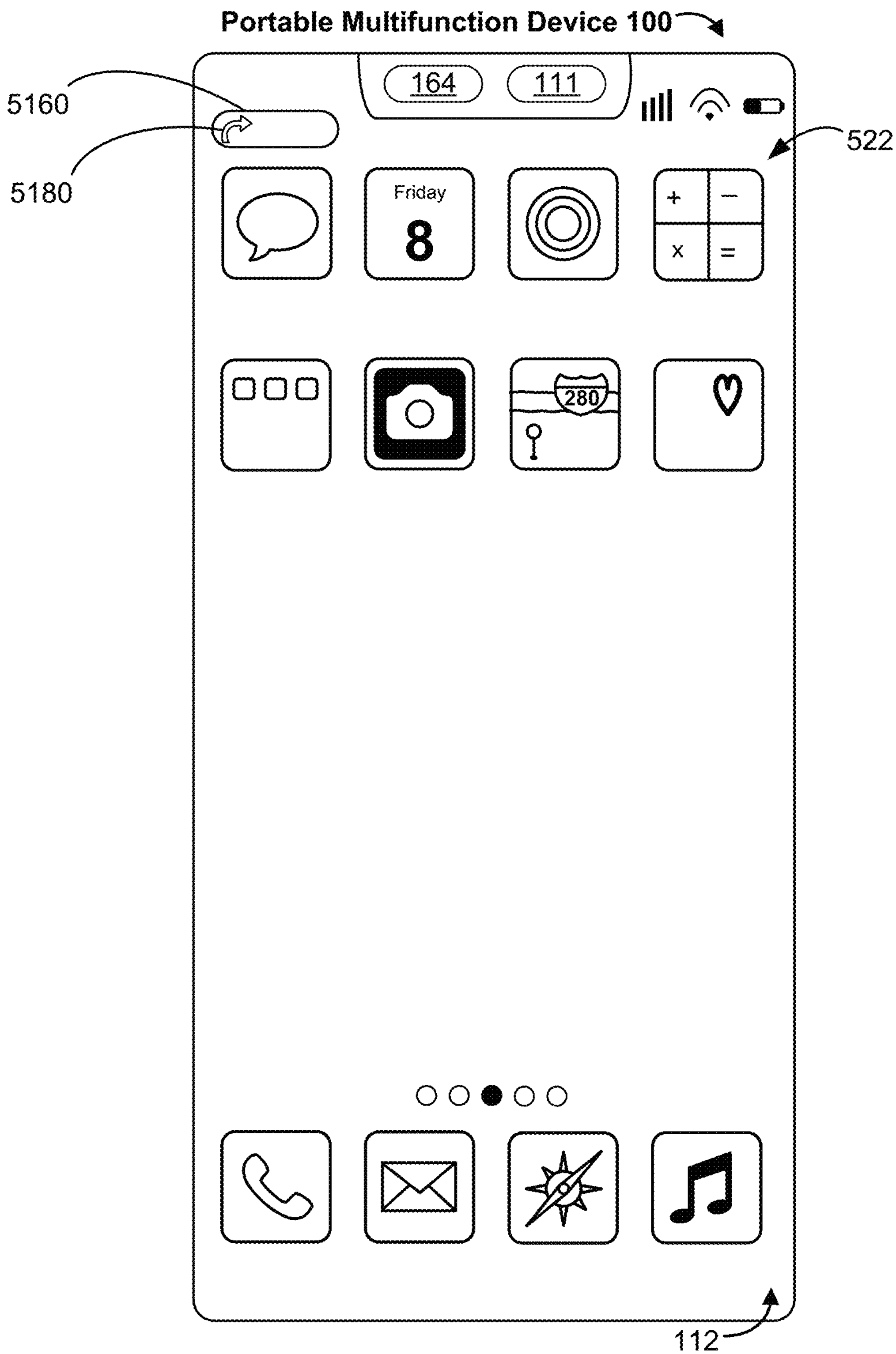
Figure 5D:
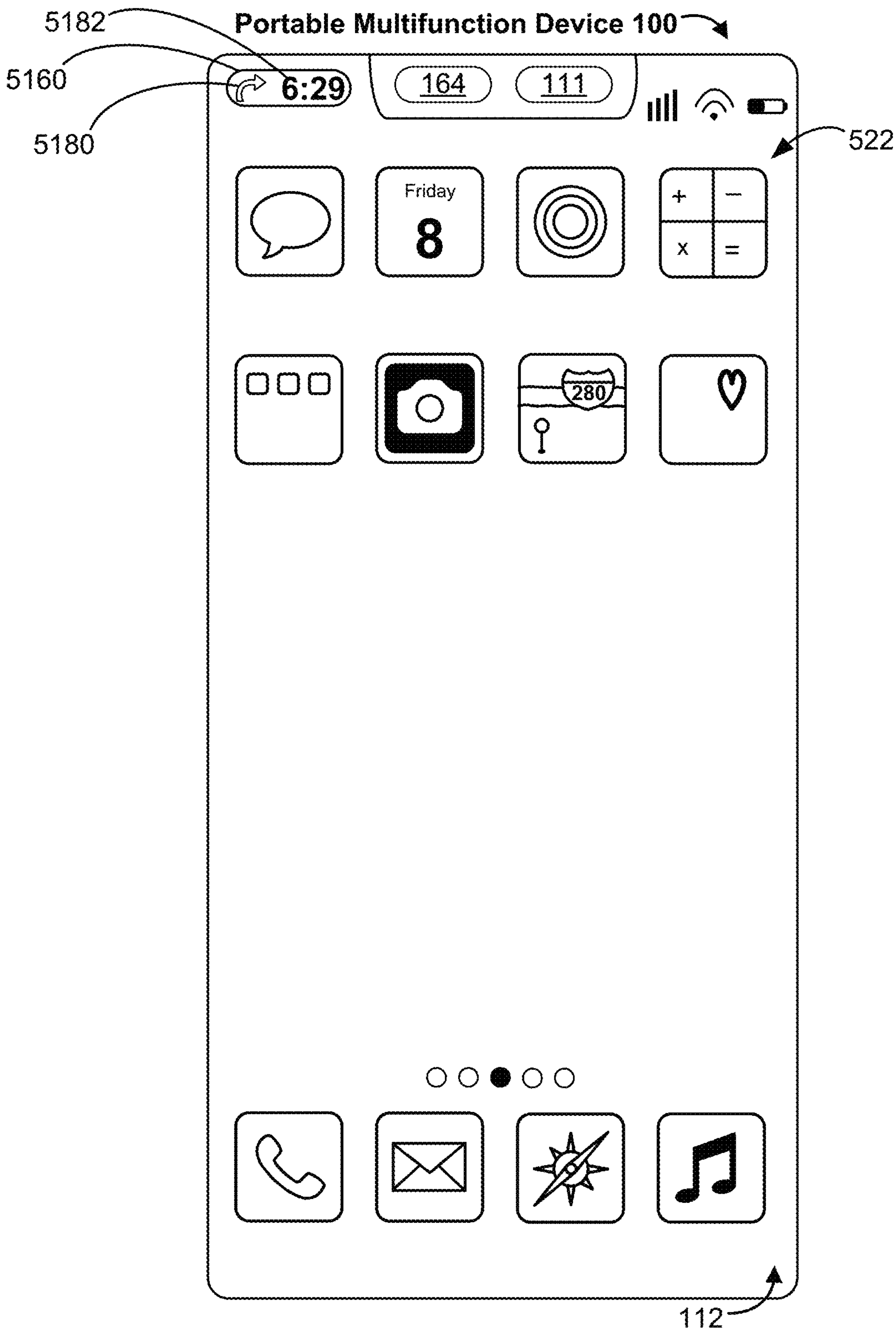
Figure 5D:
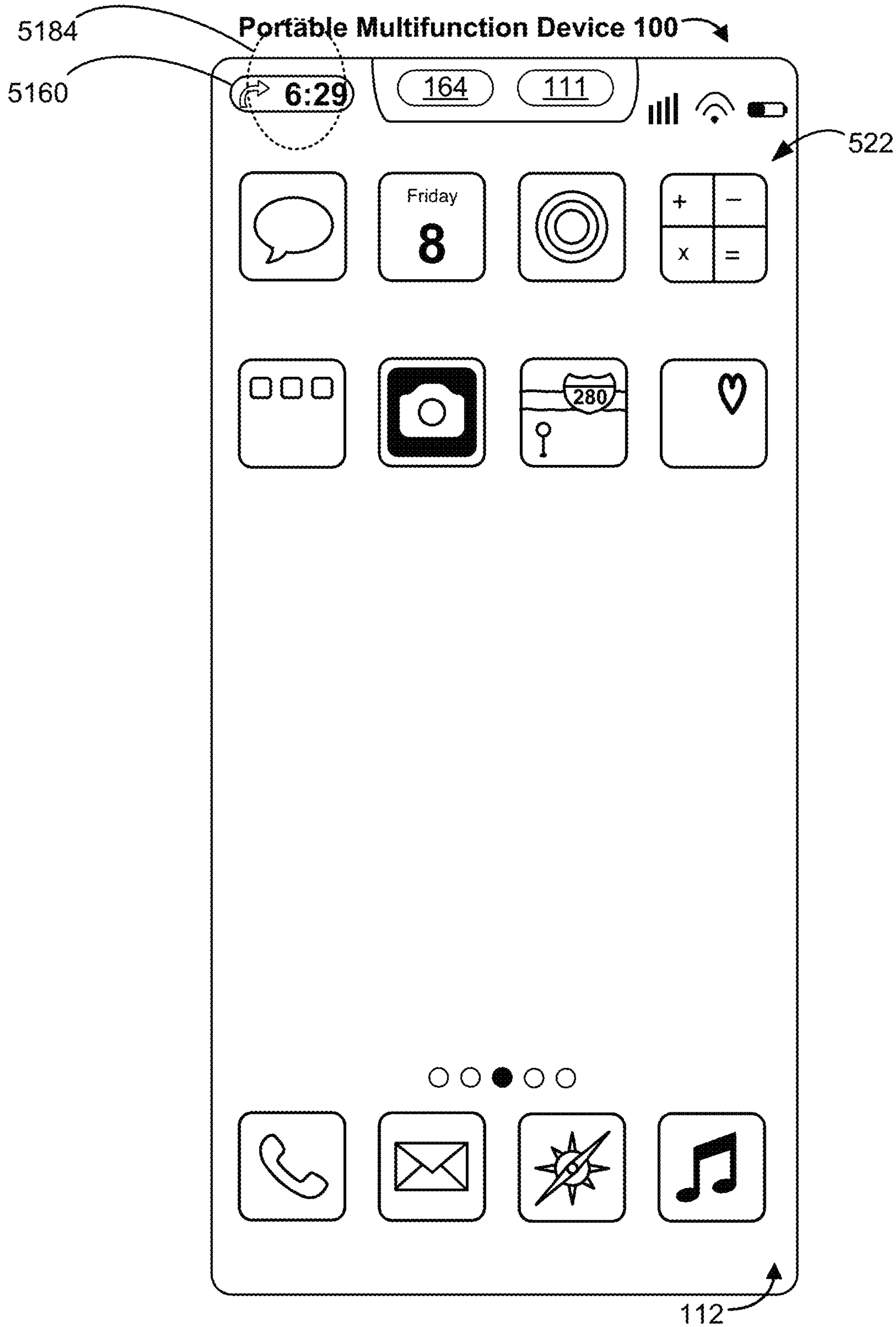
Figure 5D:
Figure 5D:
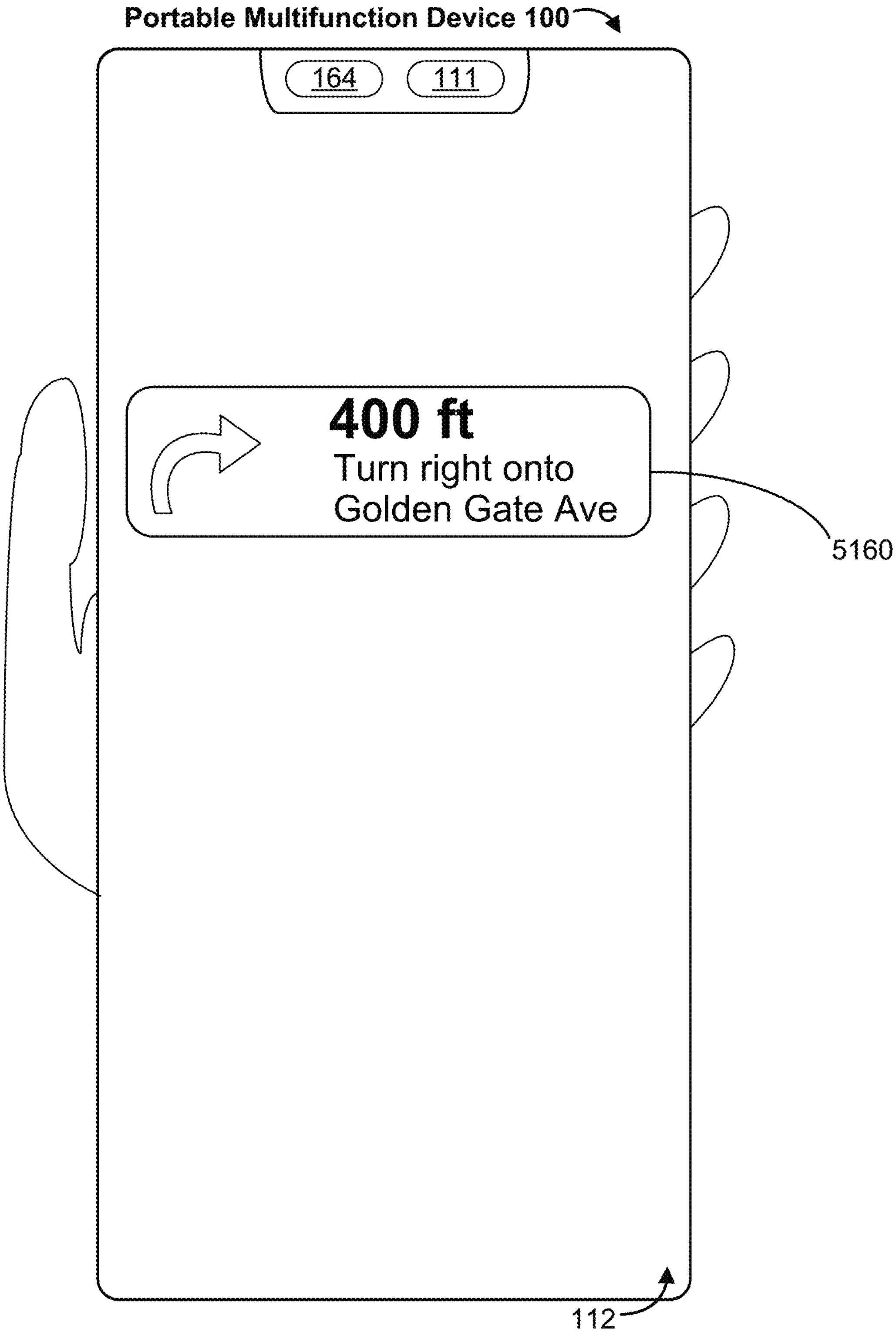
Figure 5E:
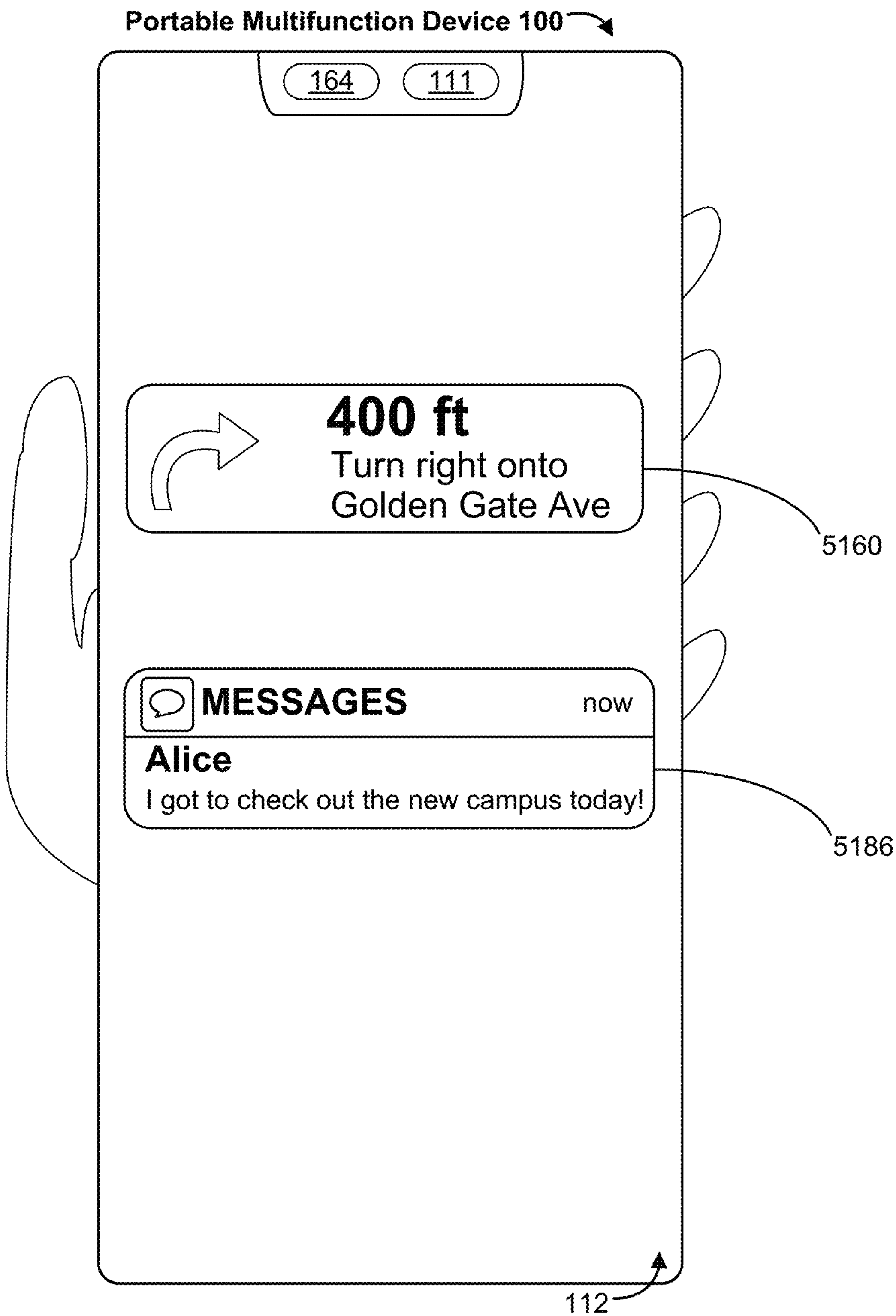
Figure 5E:
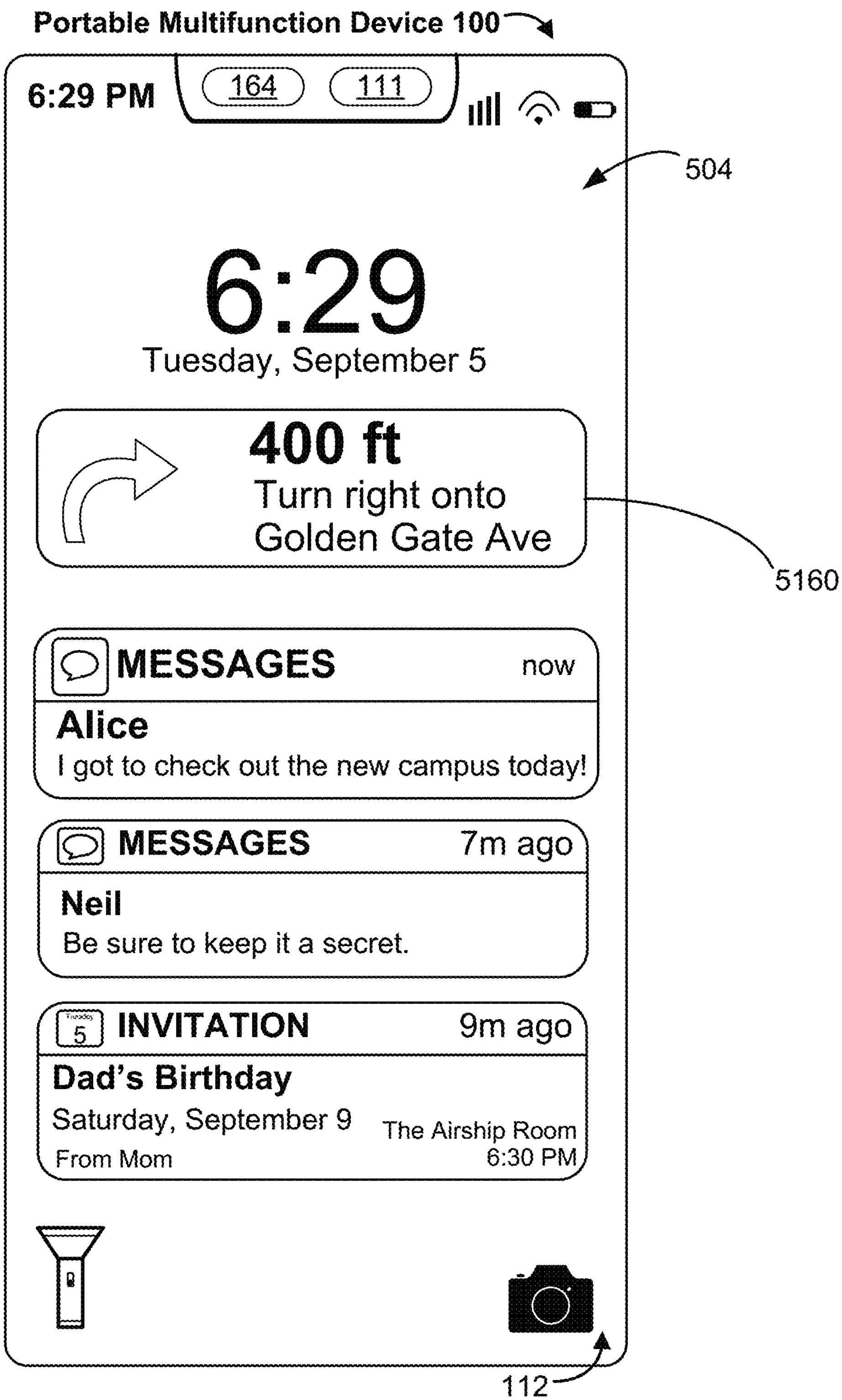
Figure 5E:
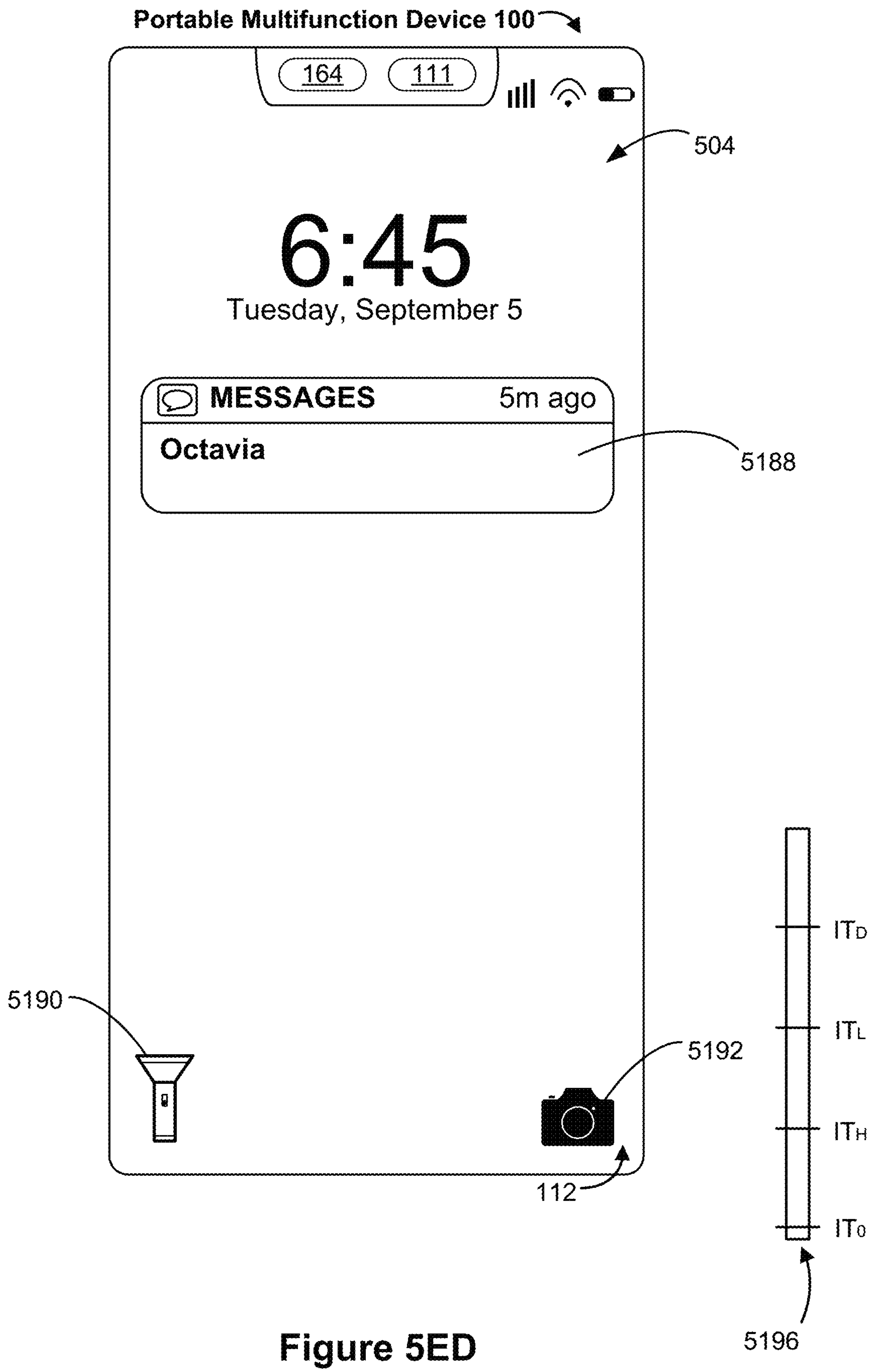
Figure 5E:
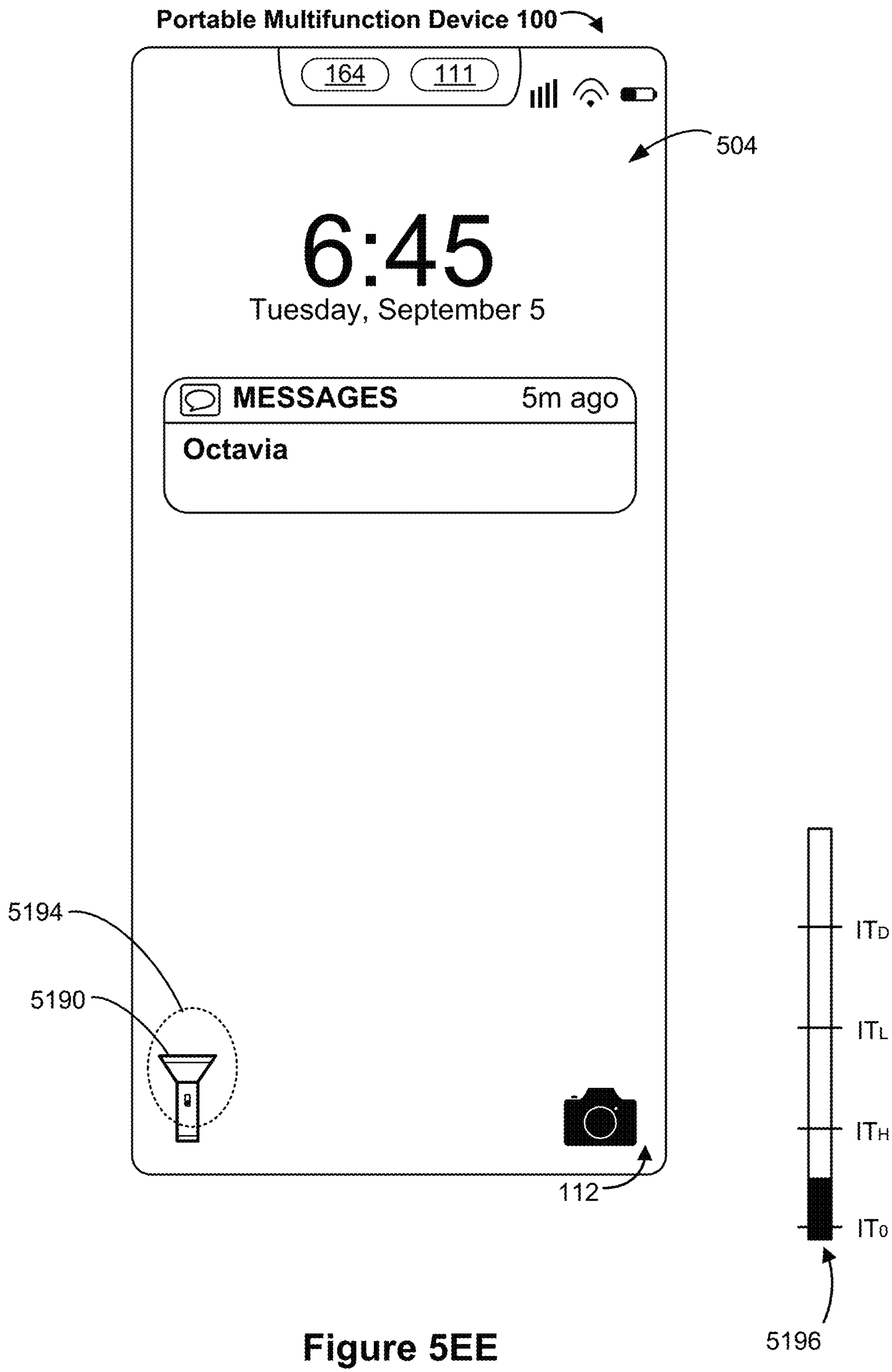
Figure 5E:
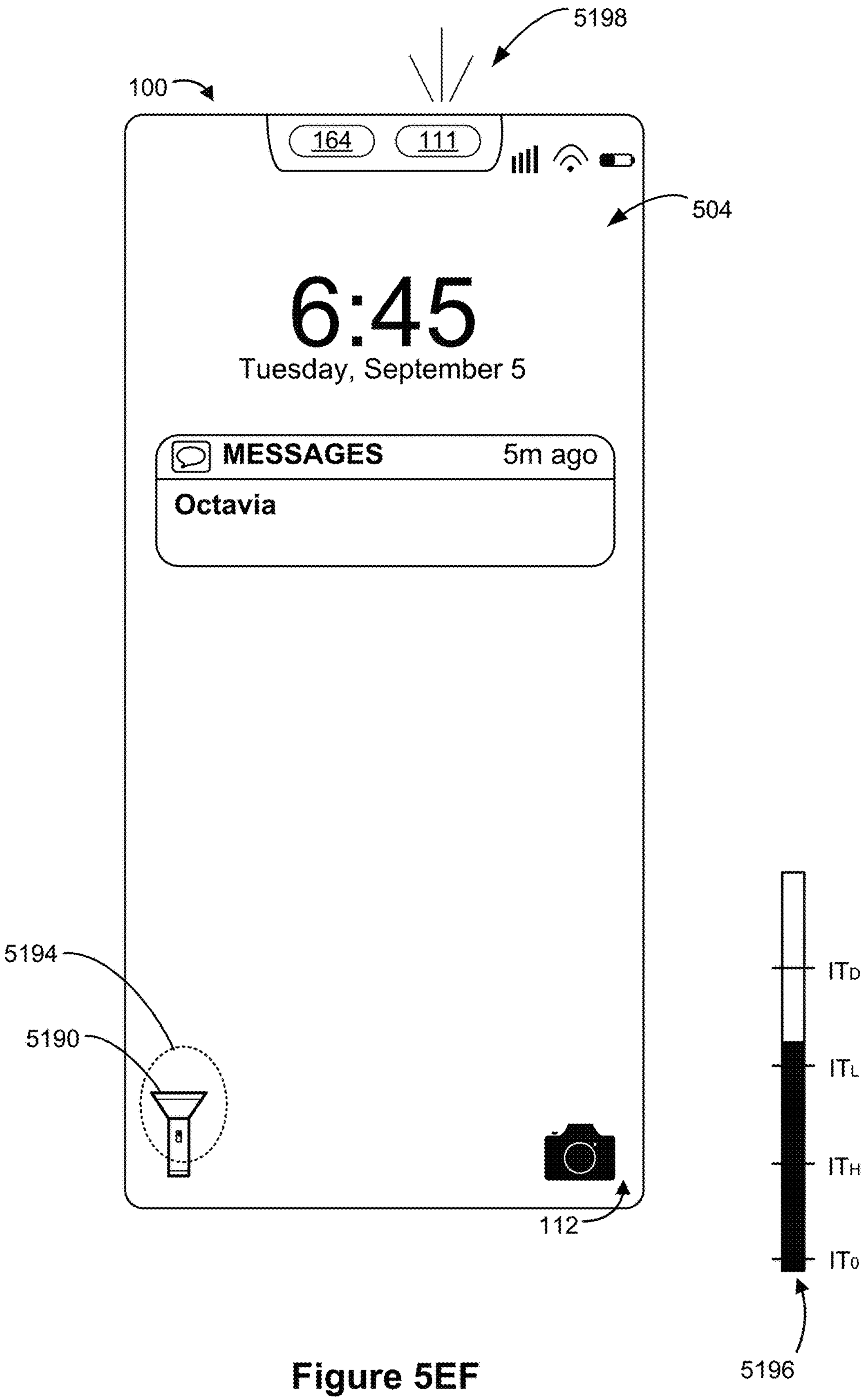
Figure 5E:
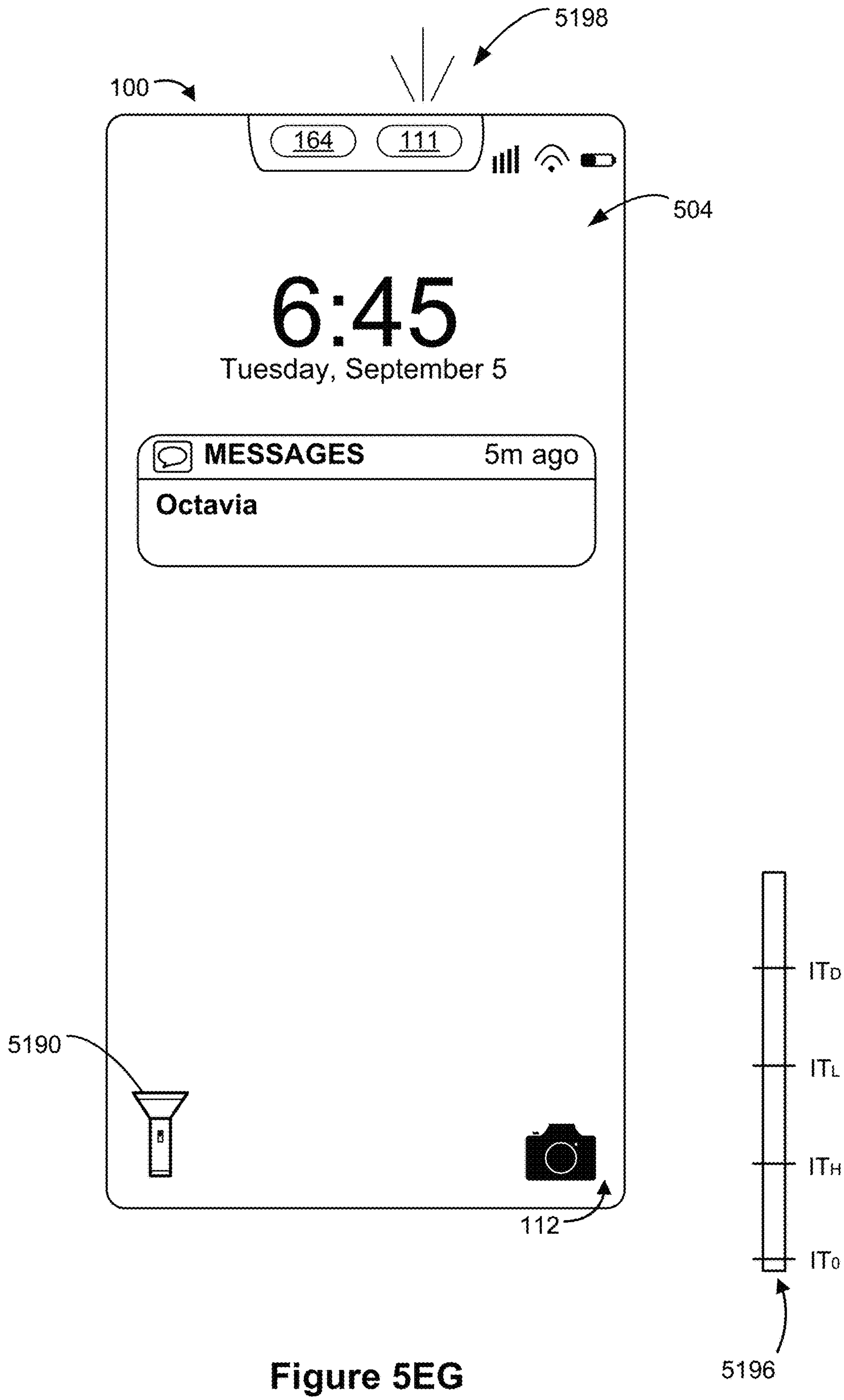
Figure 5E:
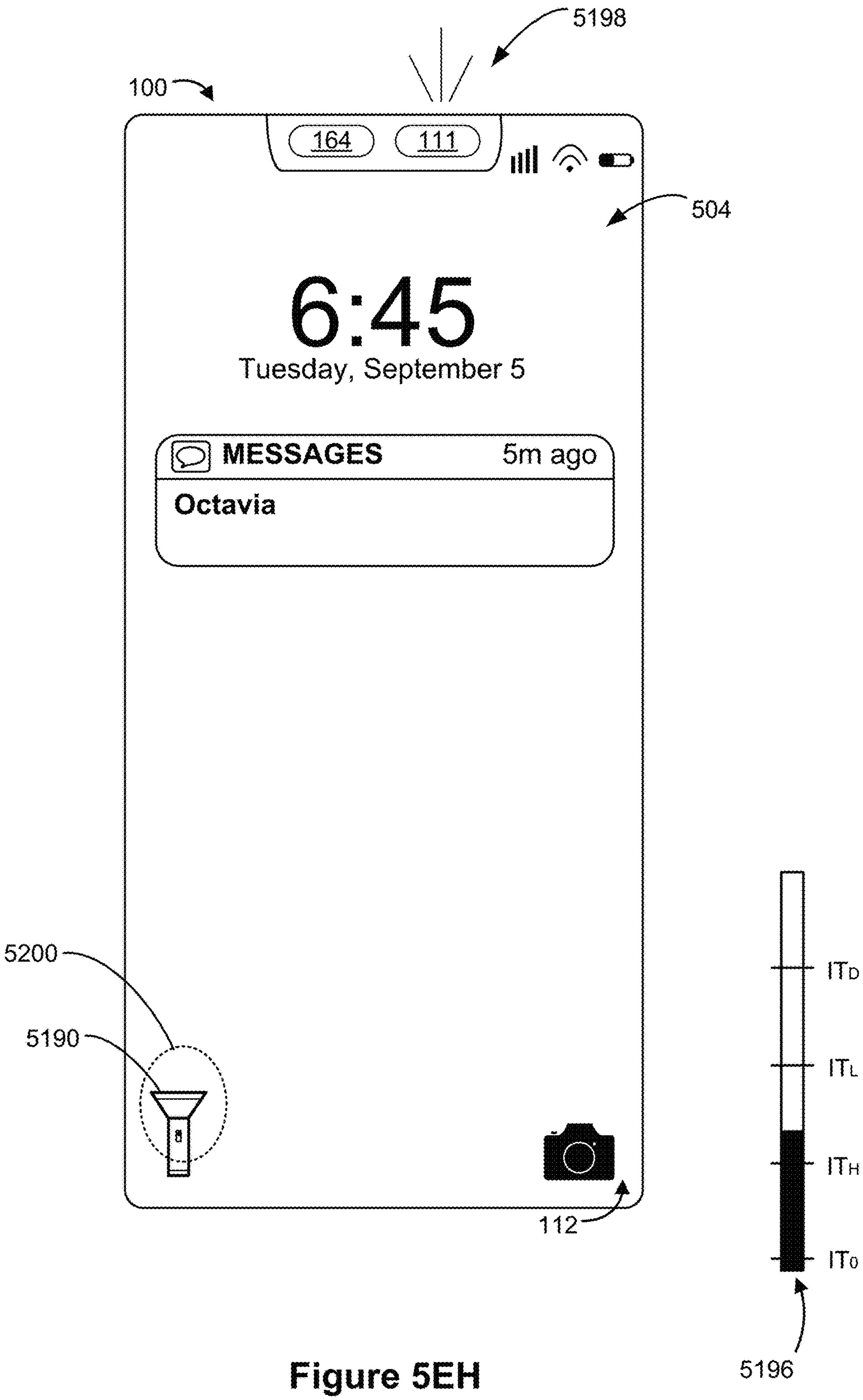
Figure 5E:
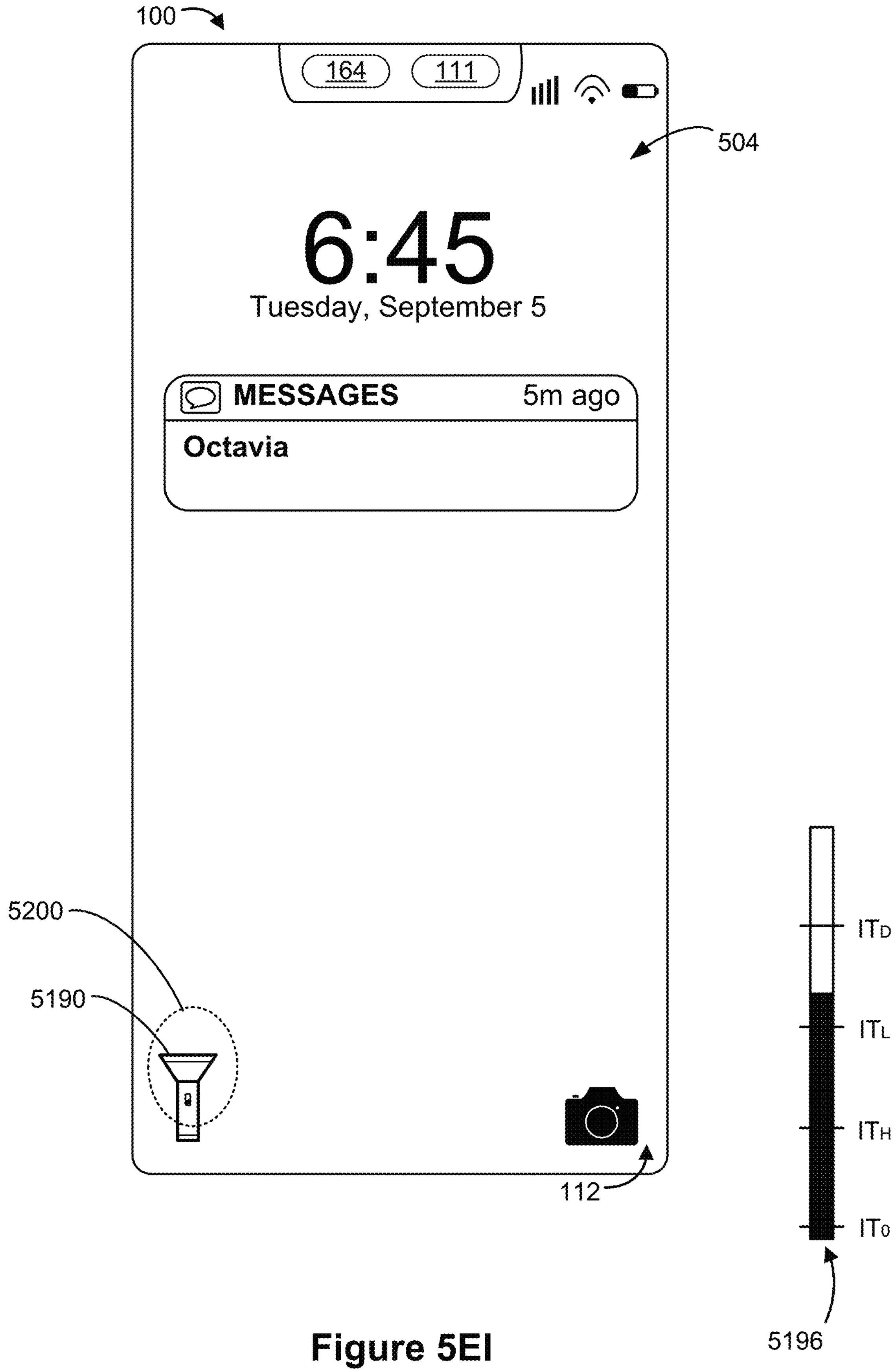
Figure 5E:
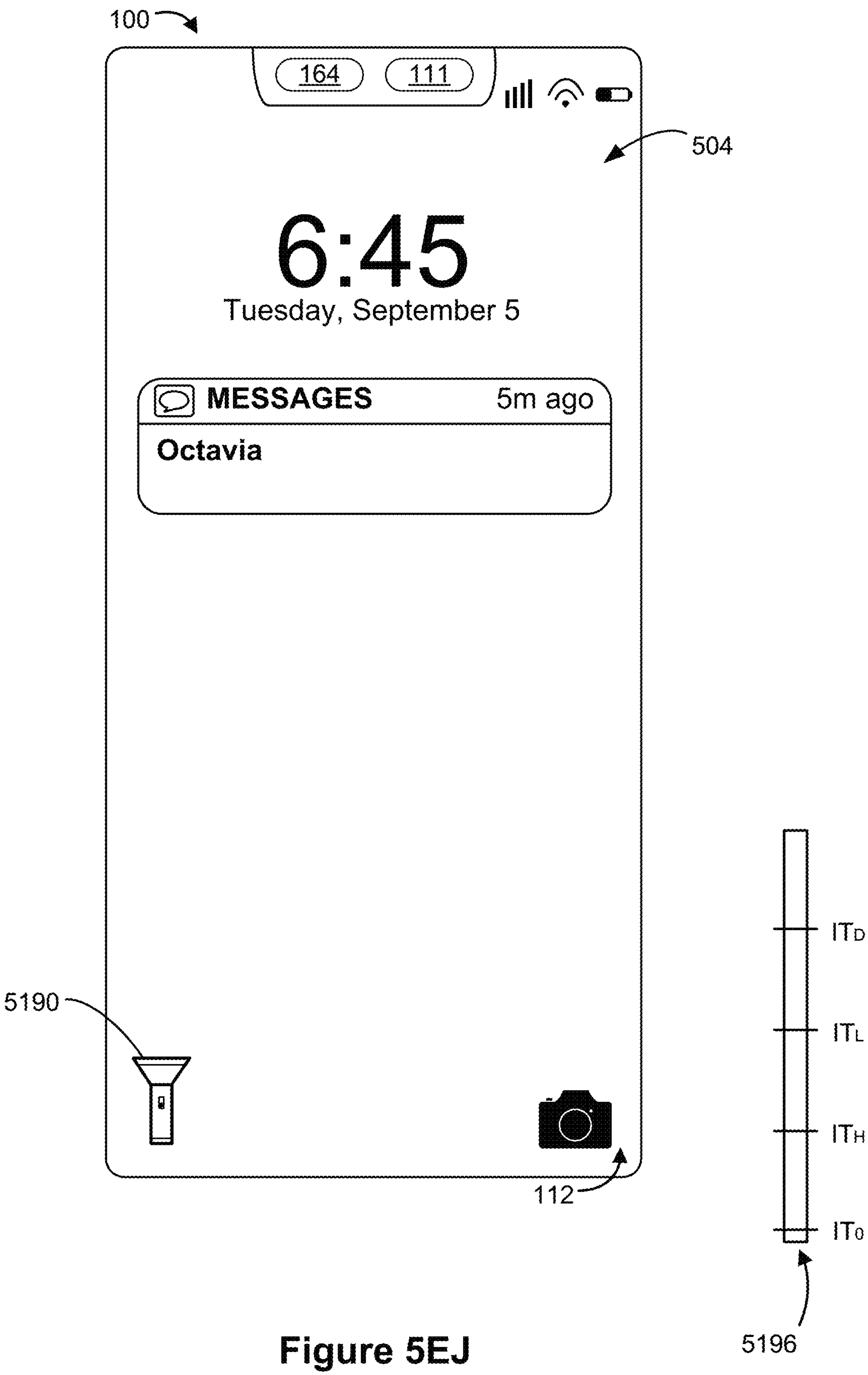
Figure 5E:
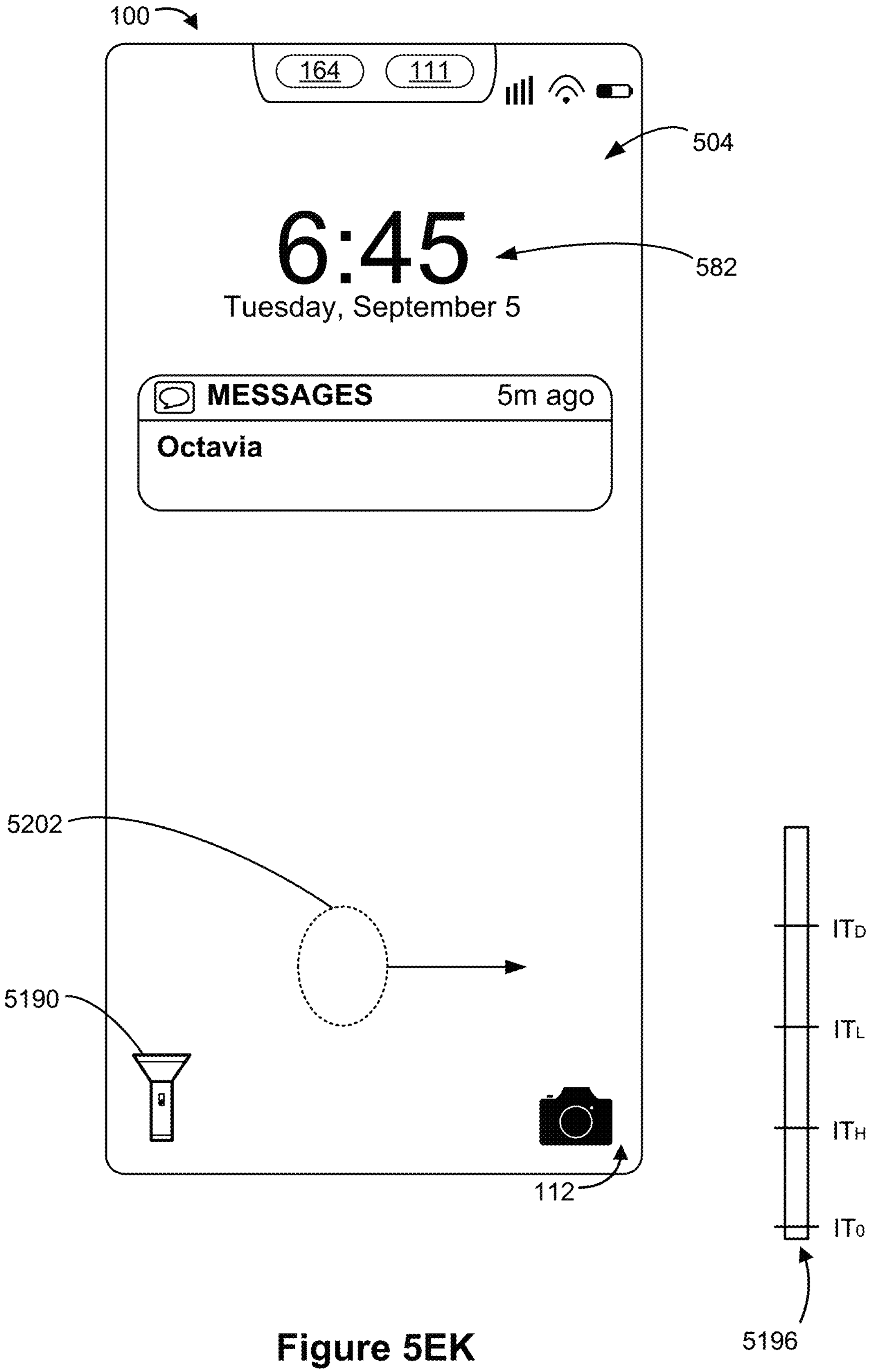
Figure 5E:
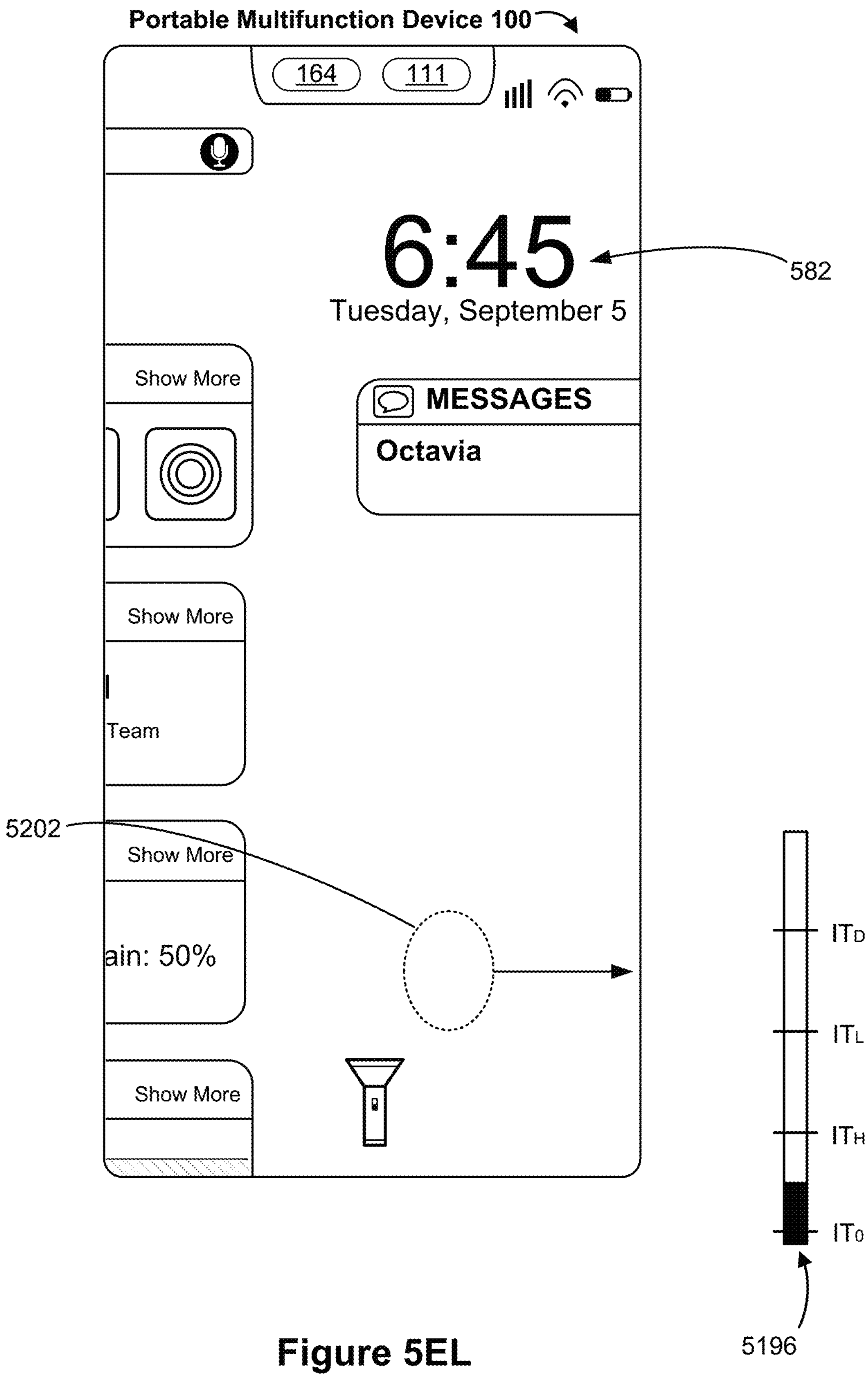
Figure 5E:
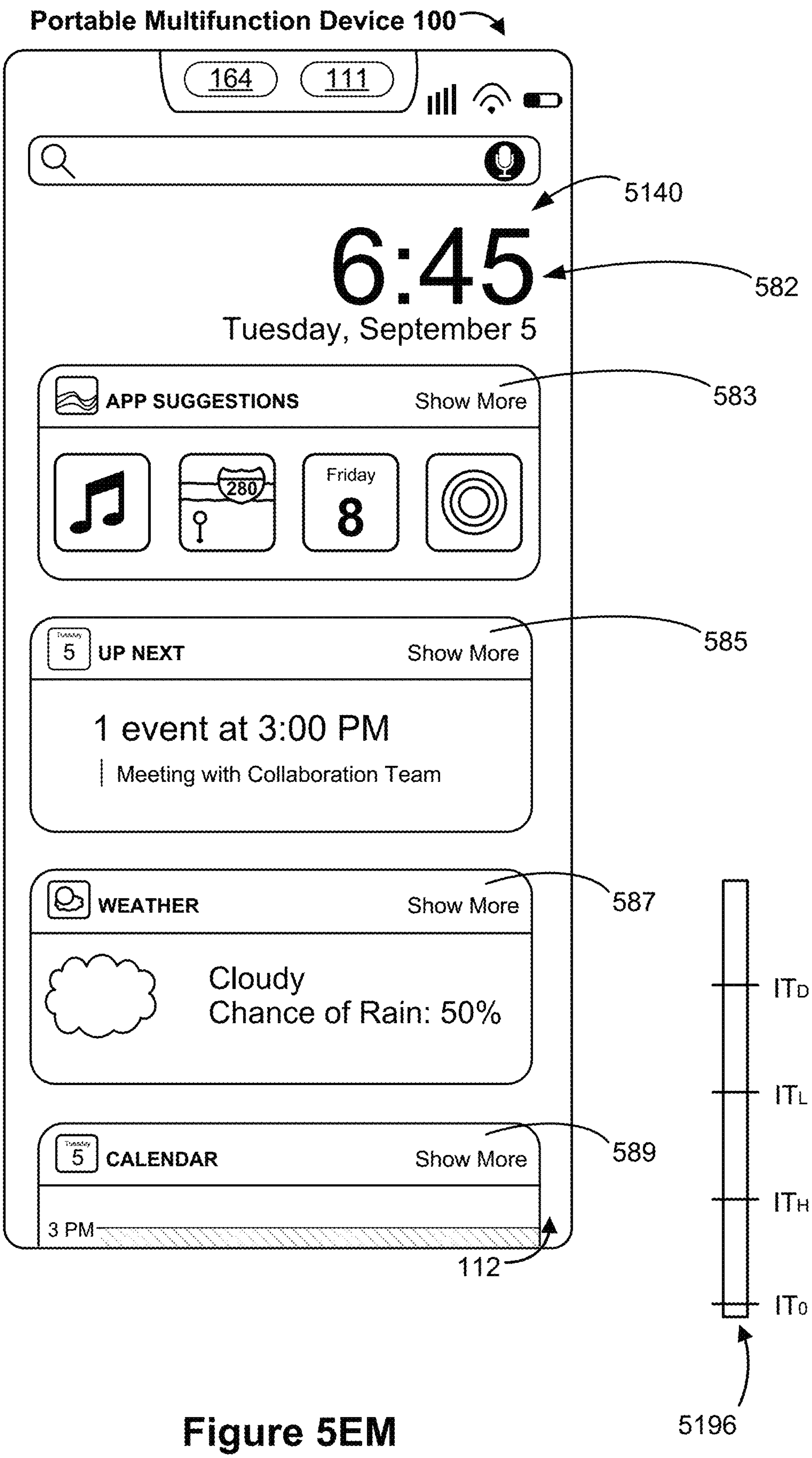
Figure 5E:
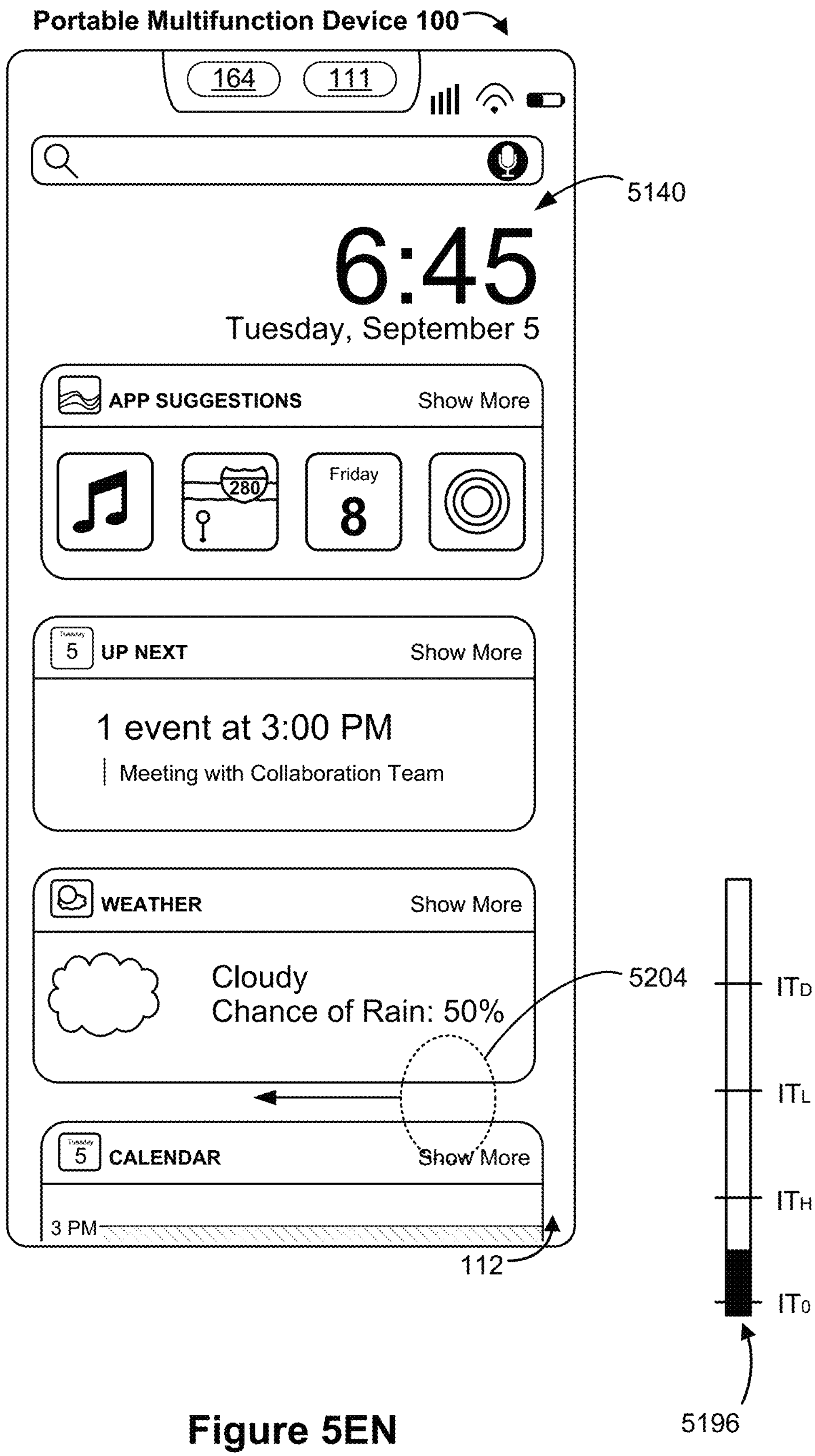
Figure 5E:
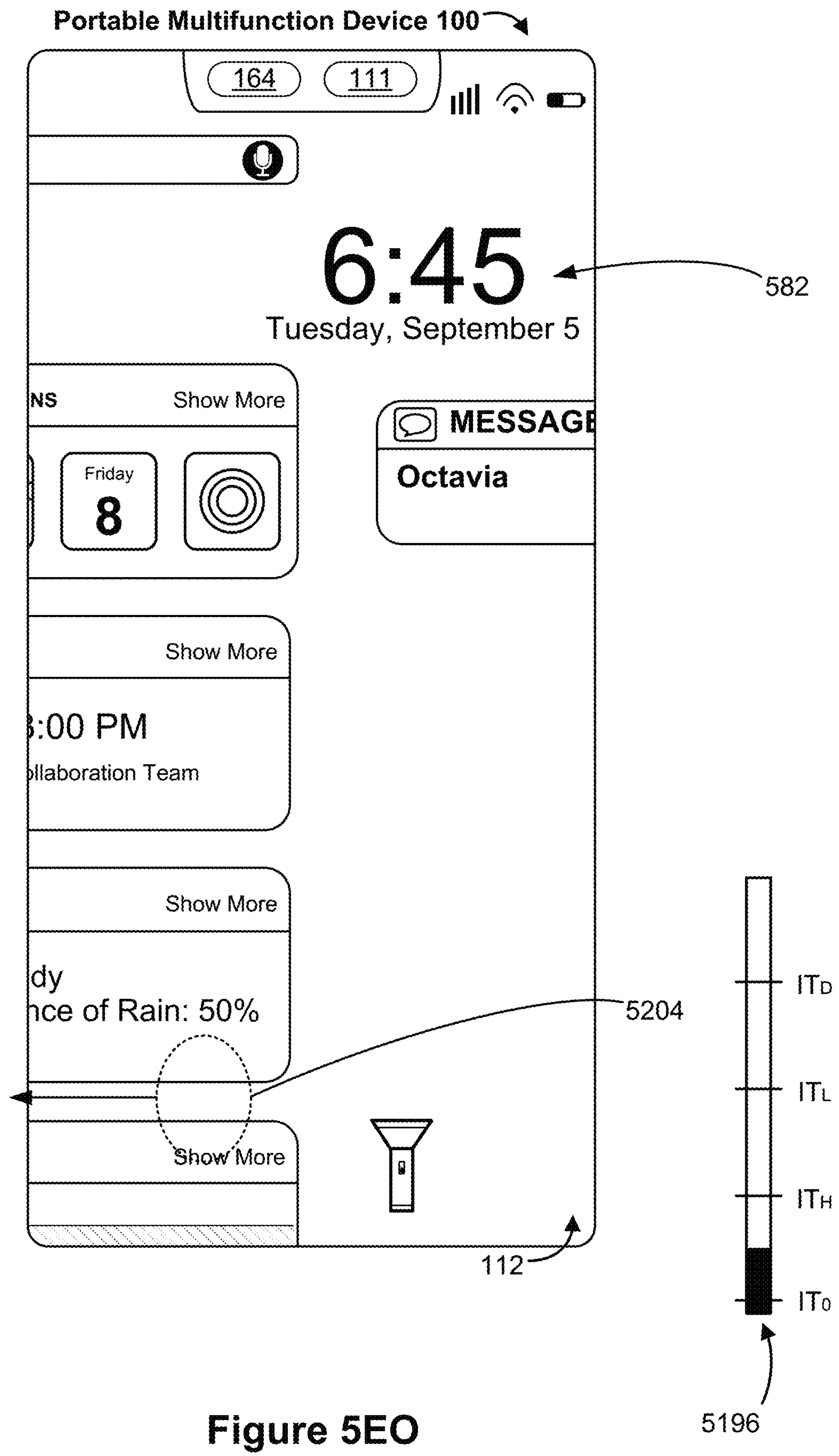
Figure 5E:
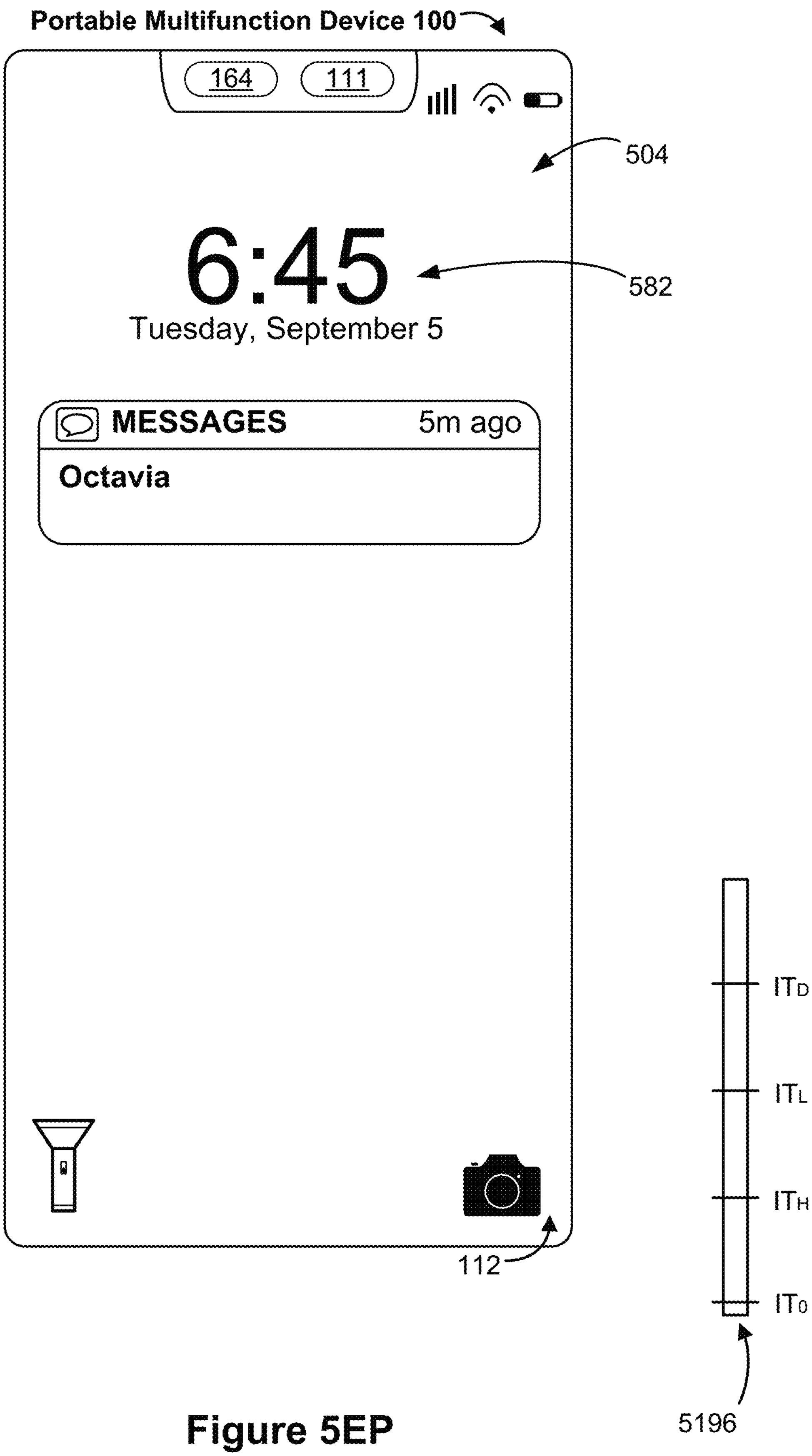
Figure 5E:
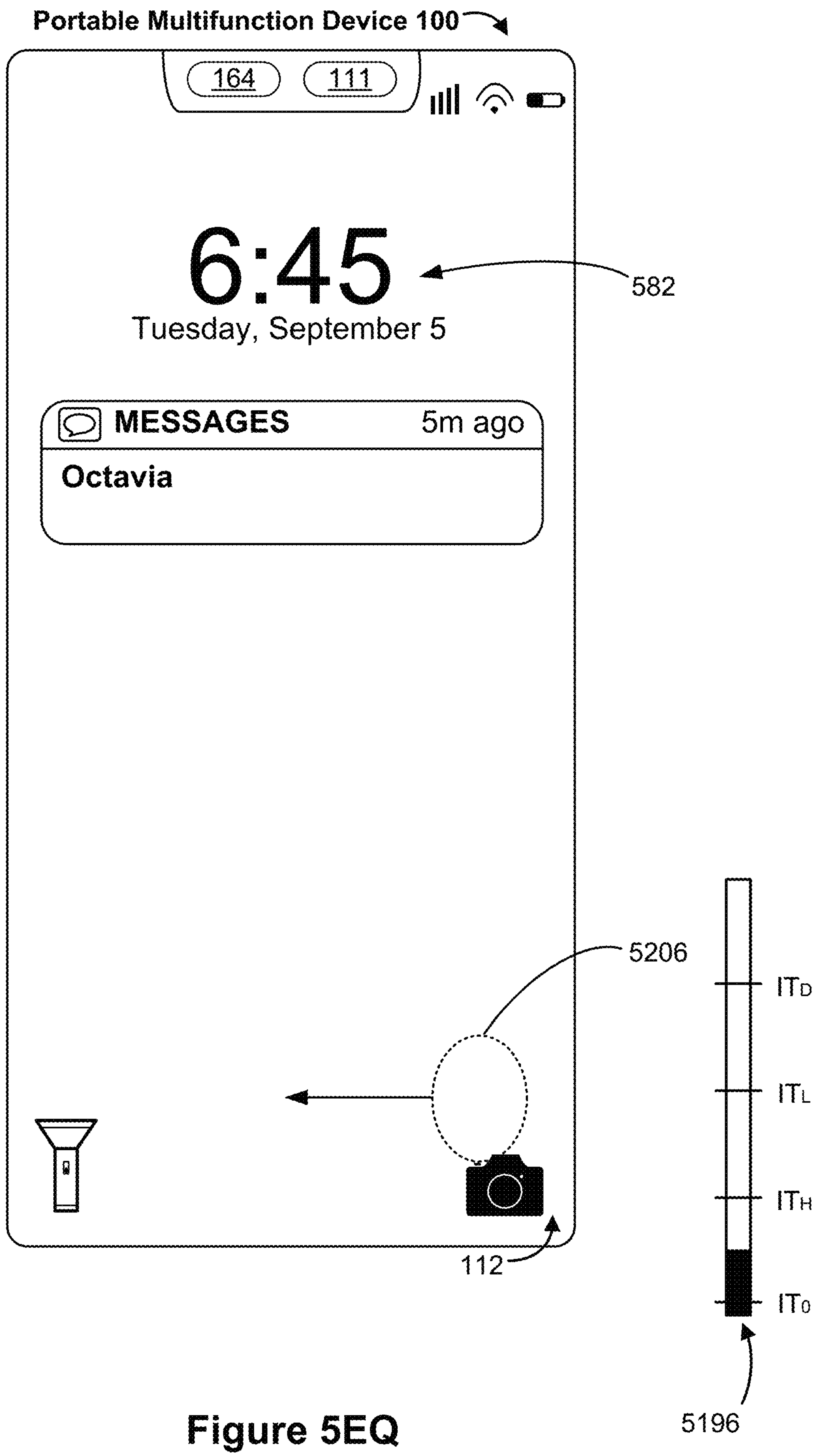
Figure 5E:
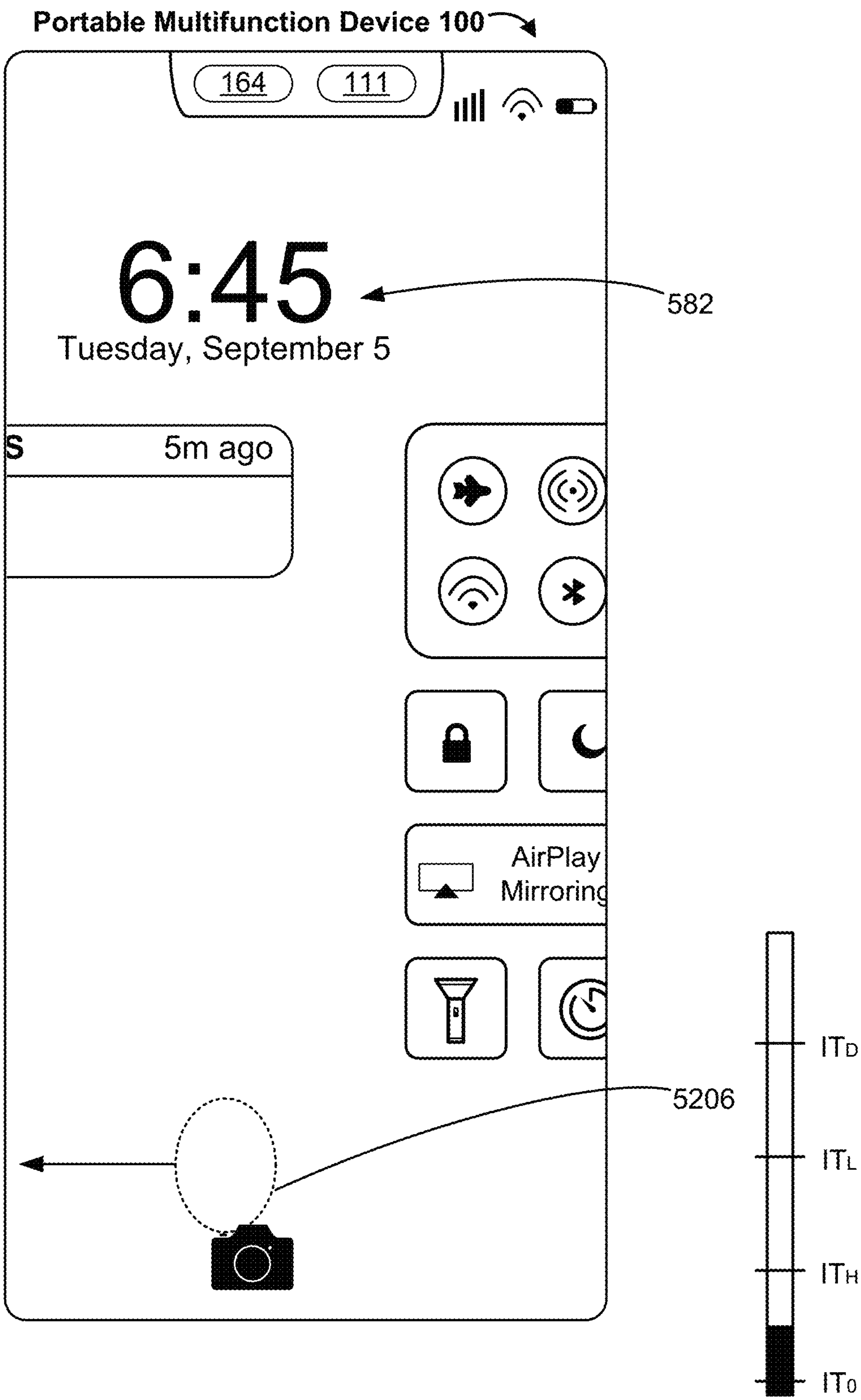
Figure 5E:
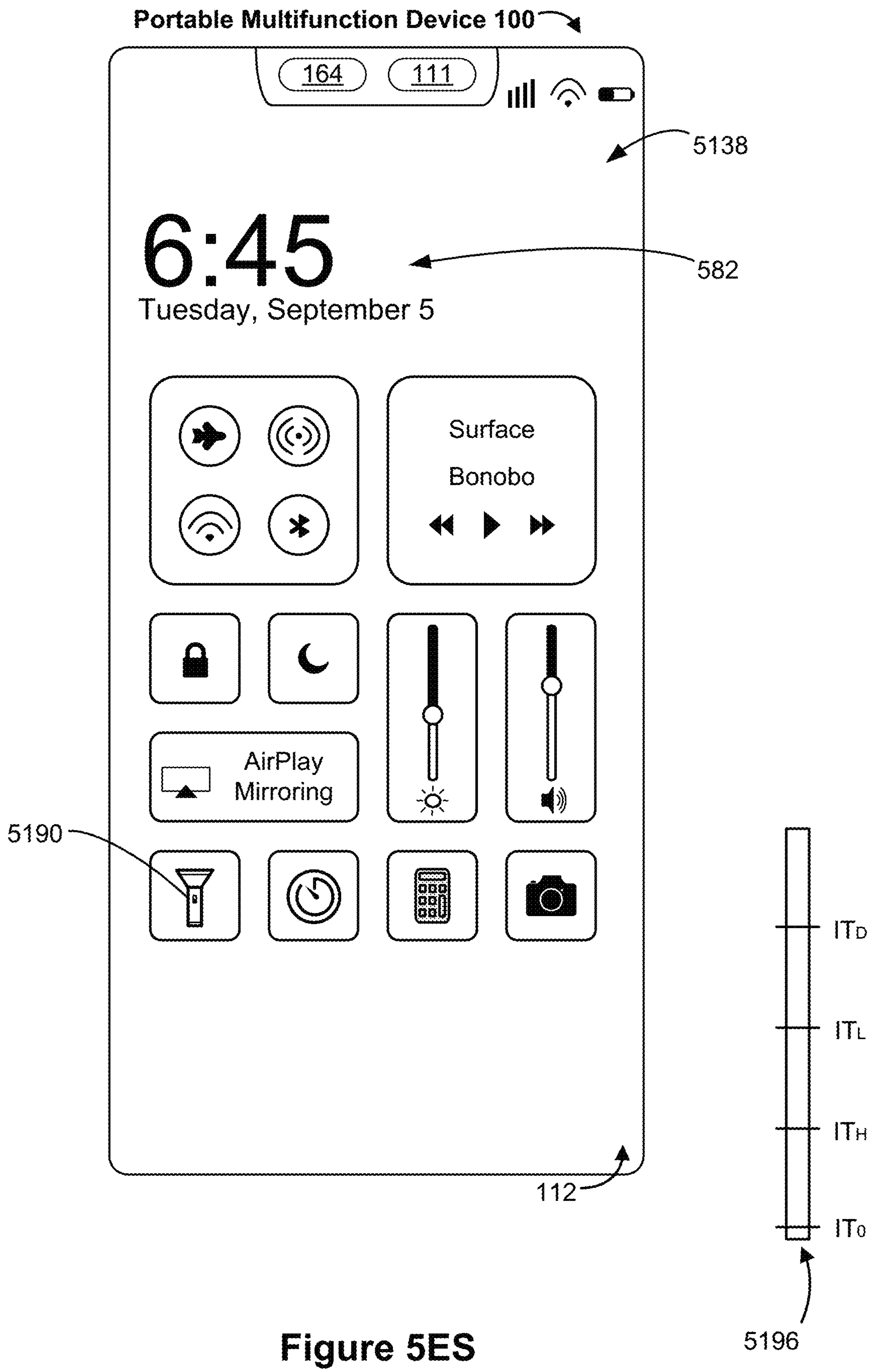
Figure 5E:
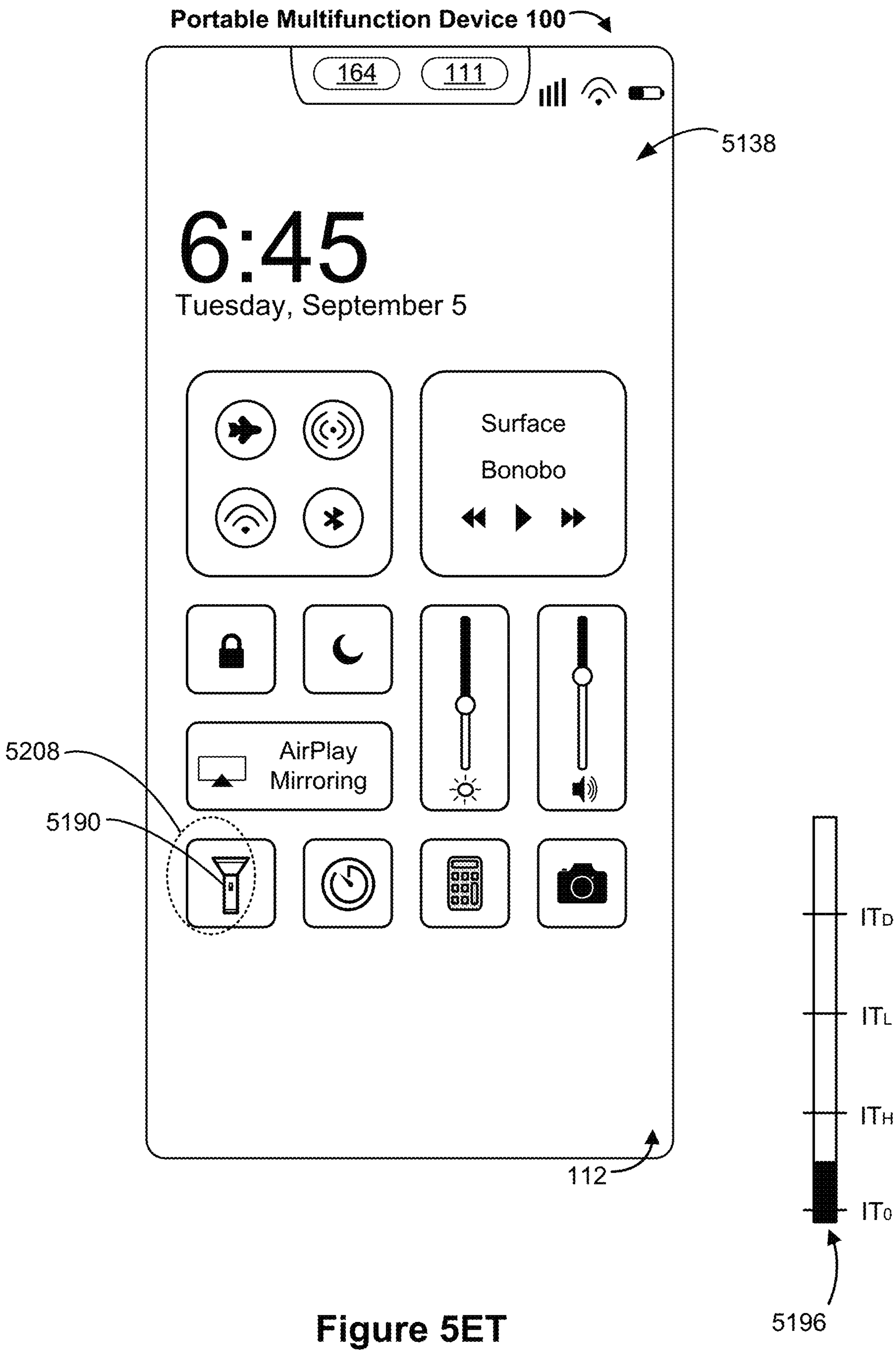
Figure 5E:
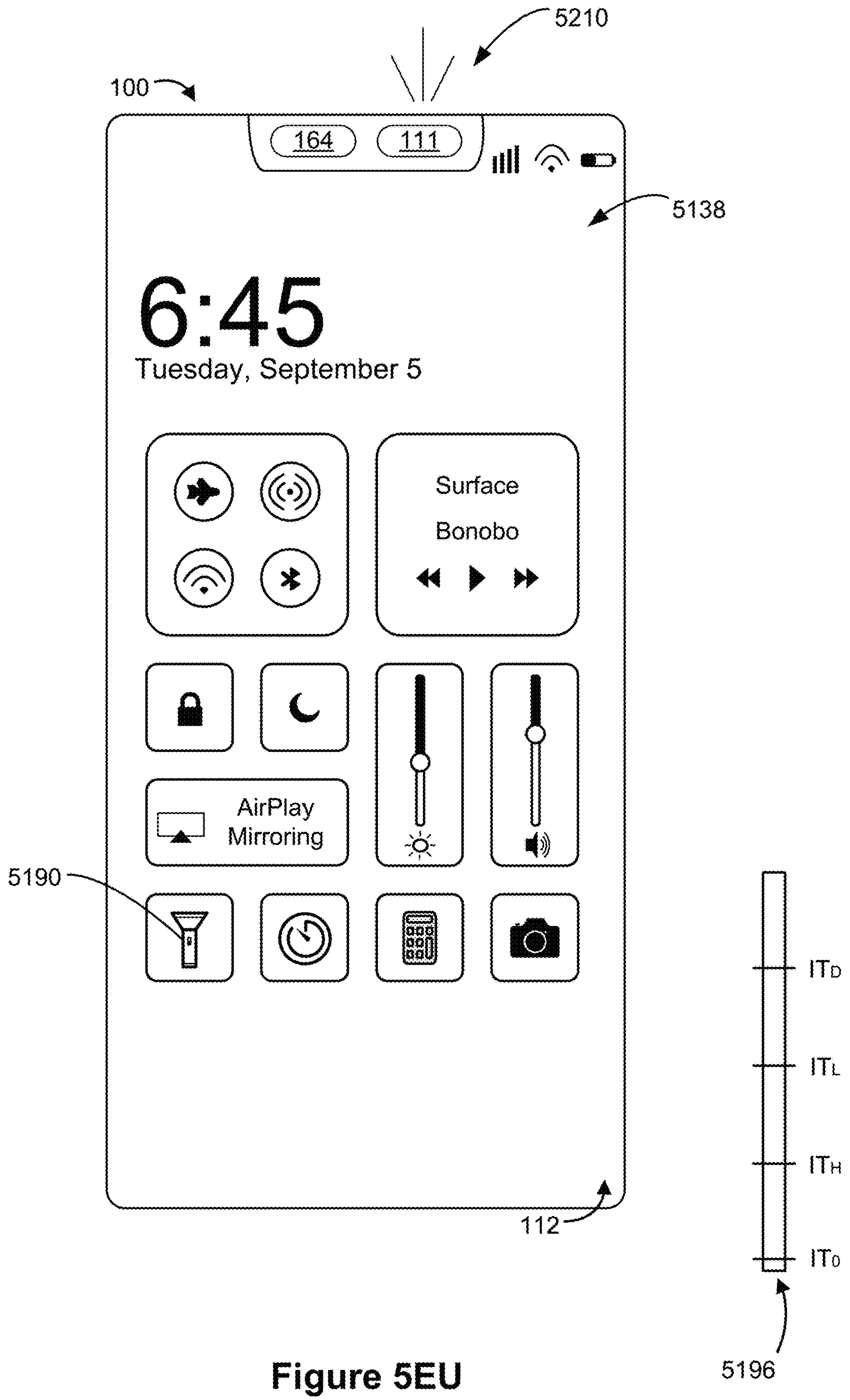
Figure 5E:
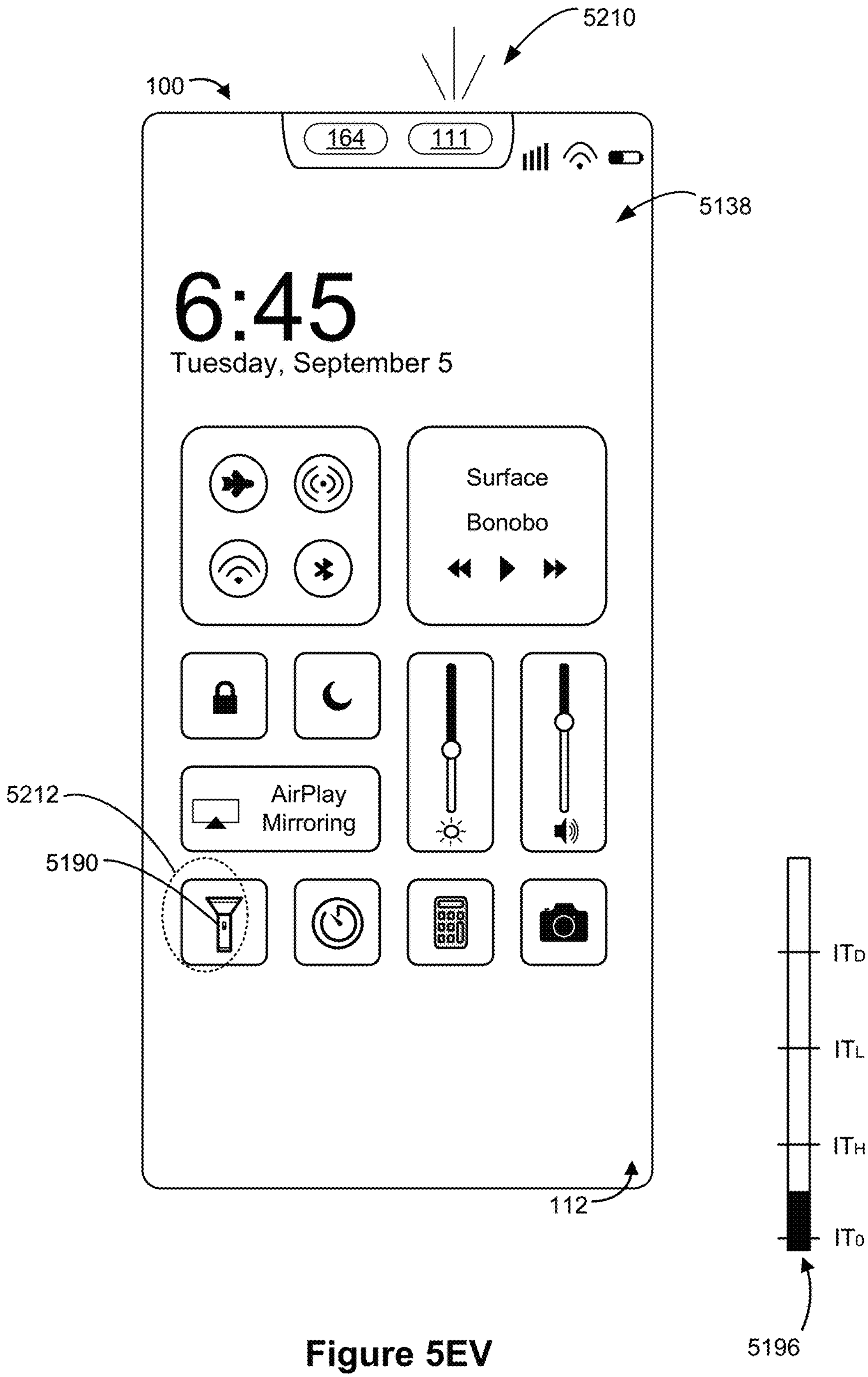
Figure 5E:
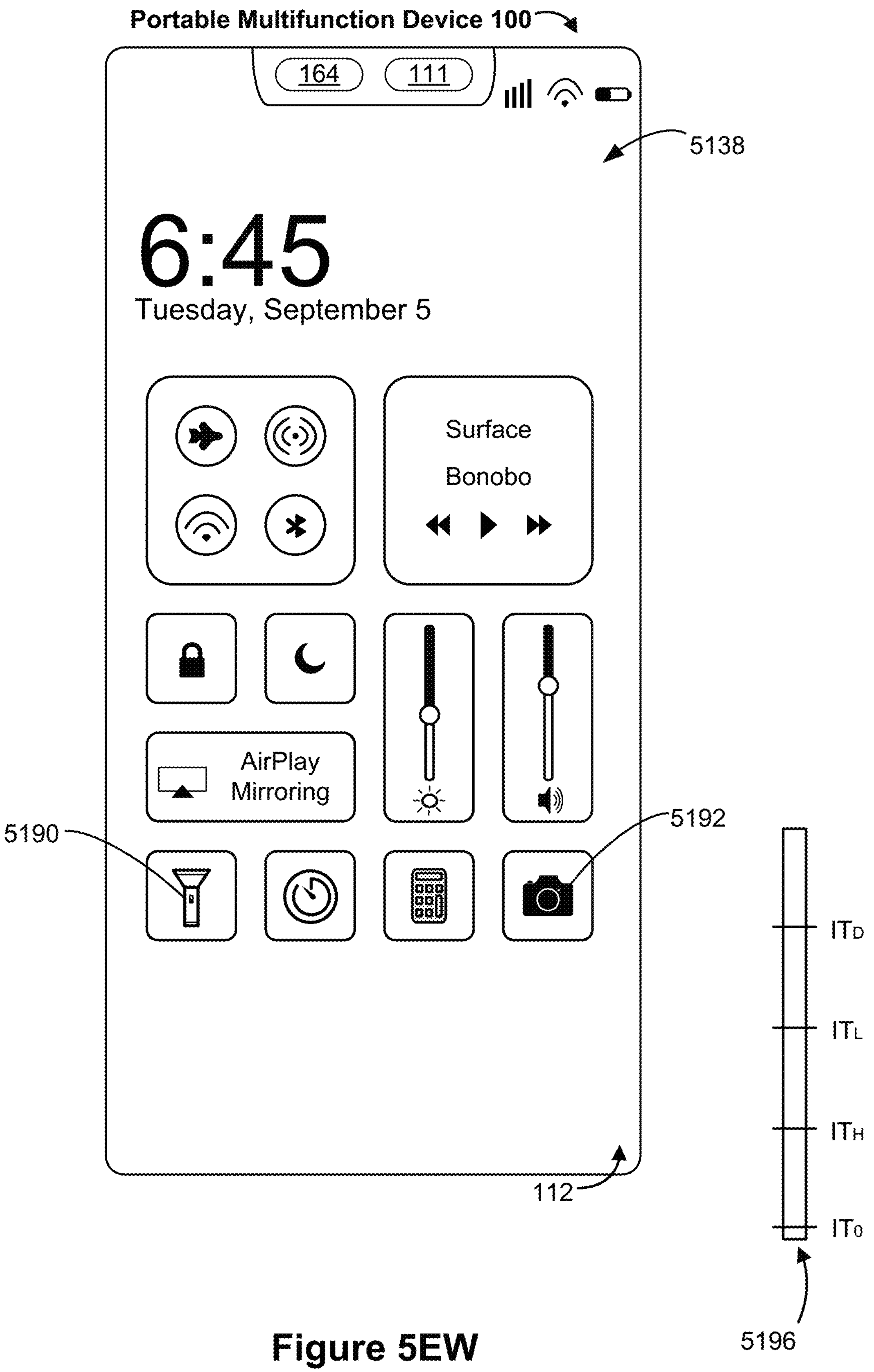
Figure 5E:
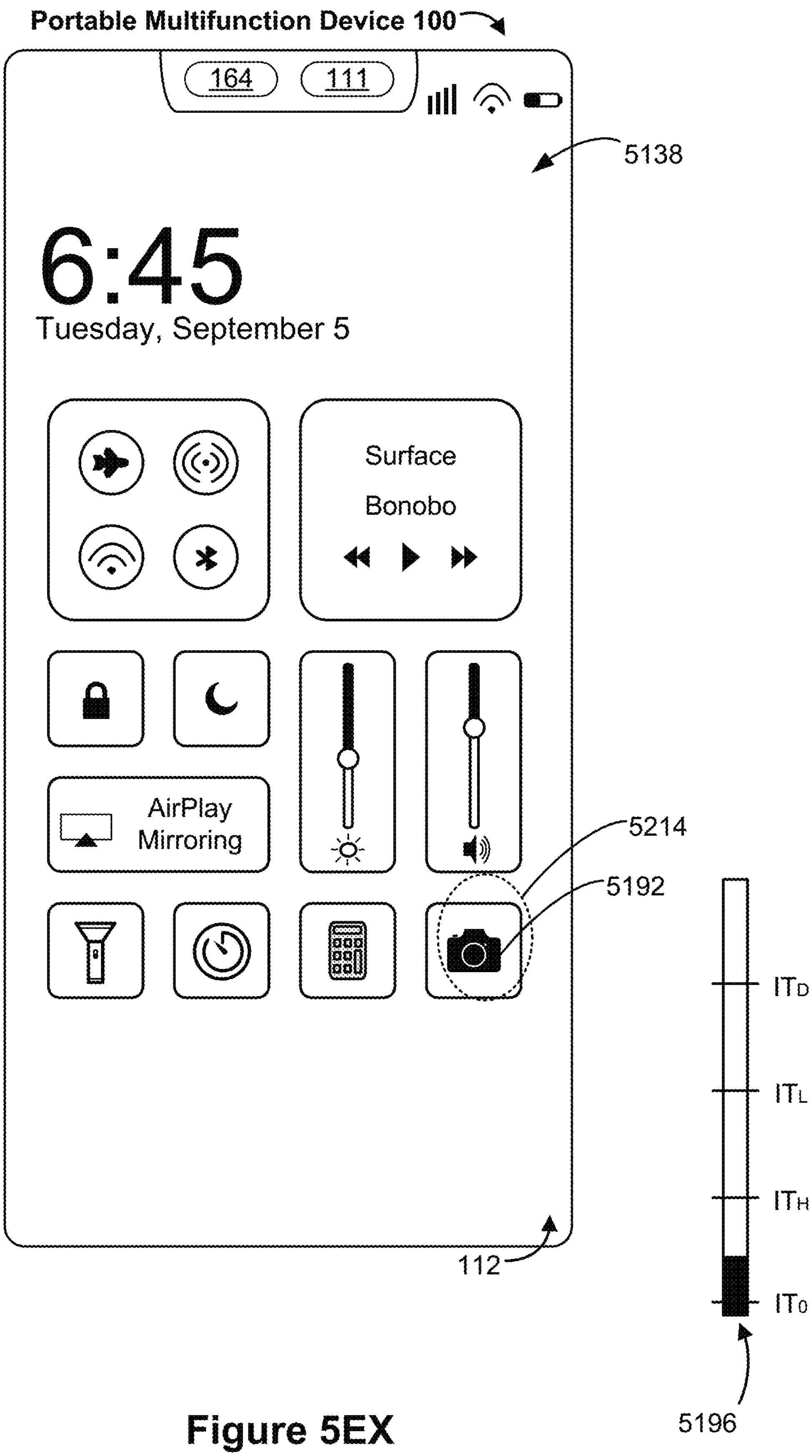
Figure 5E:
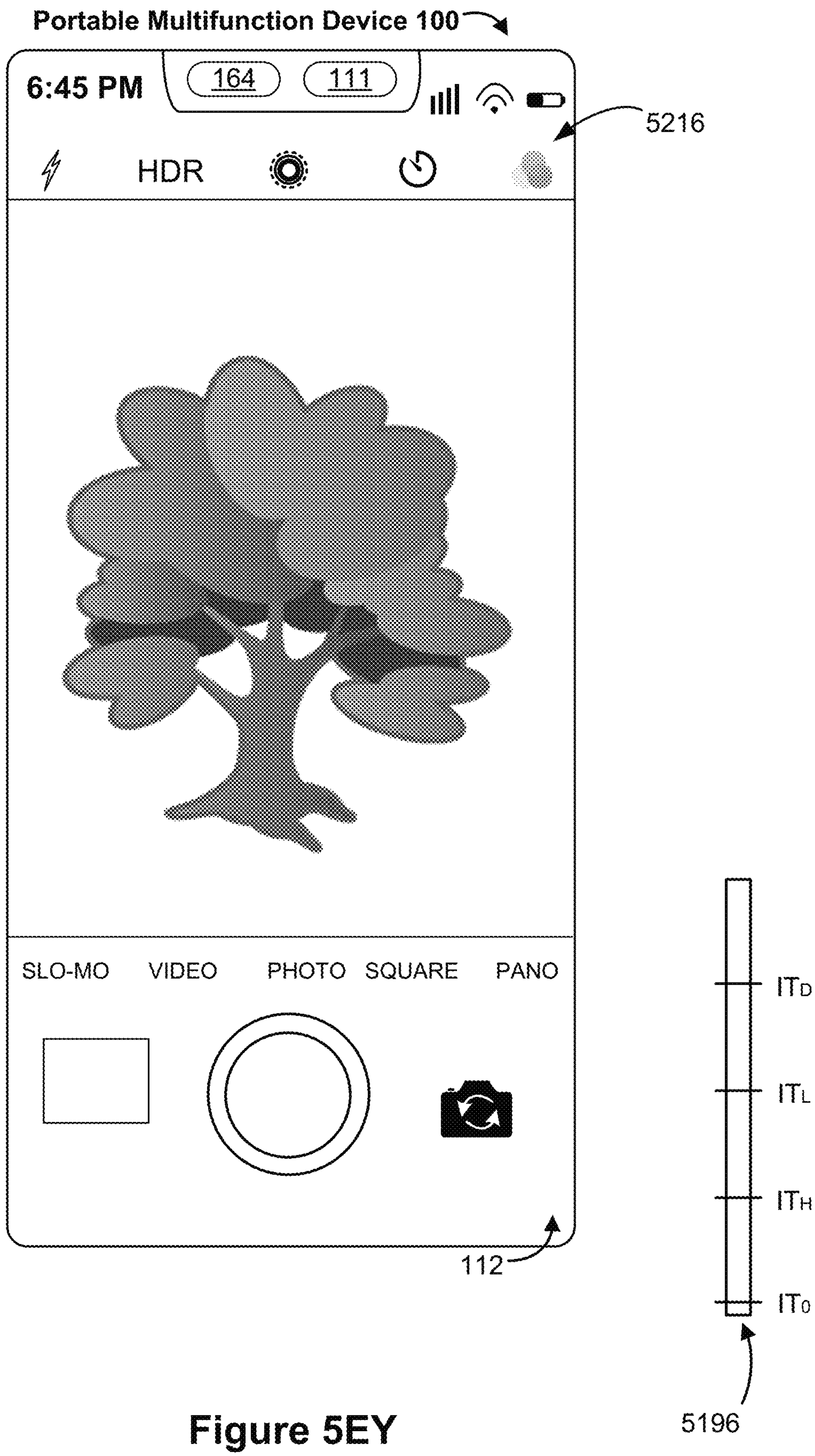
Figure 5E:
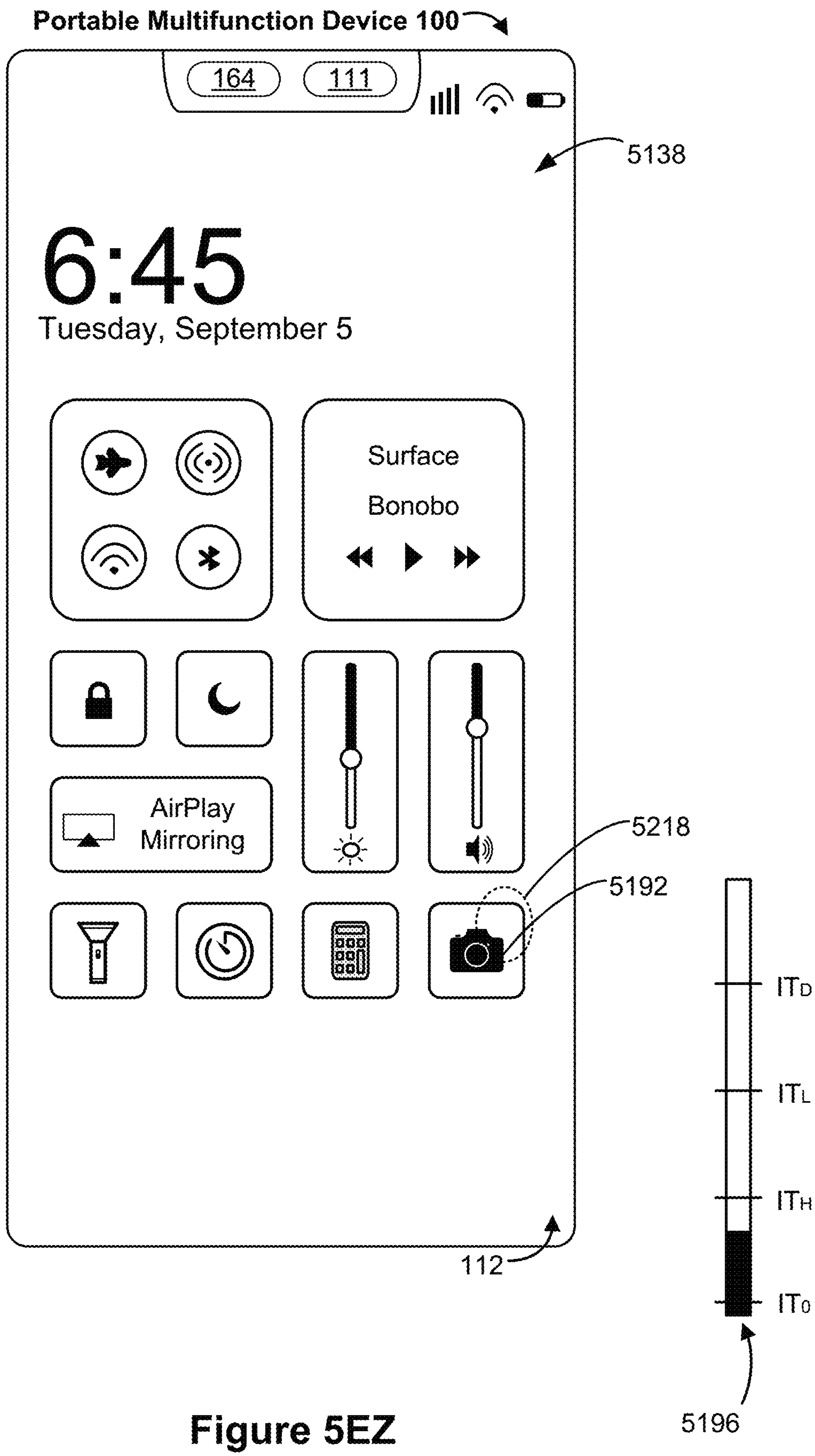
Figure 5F:
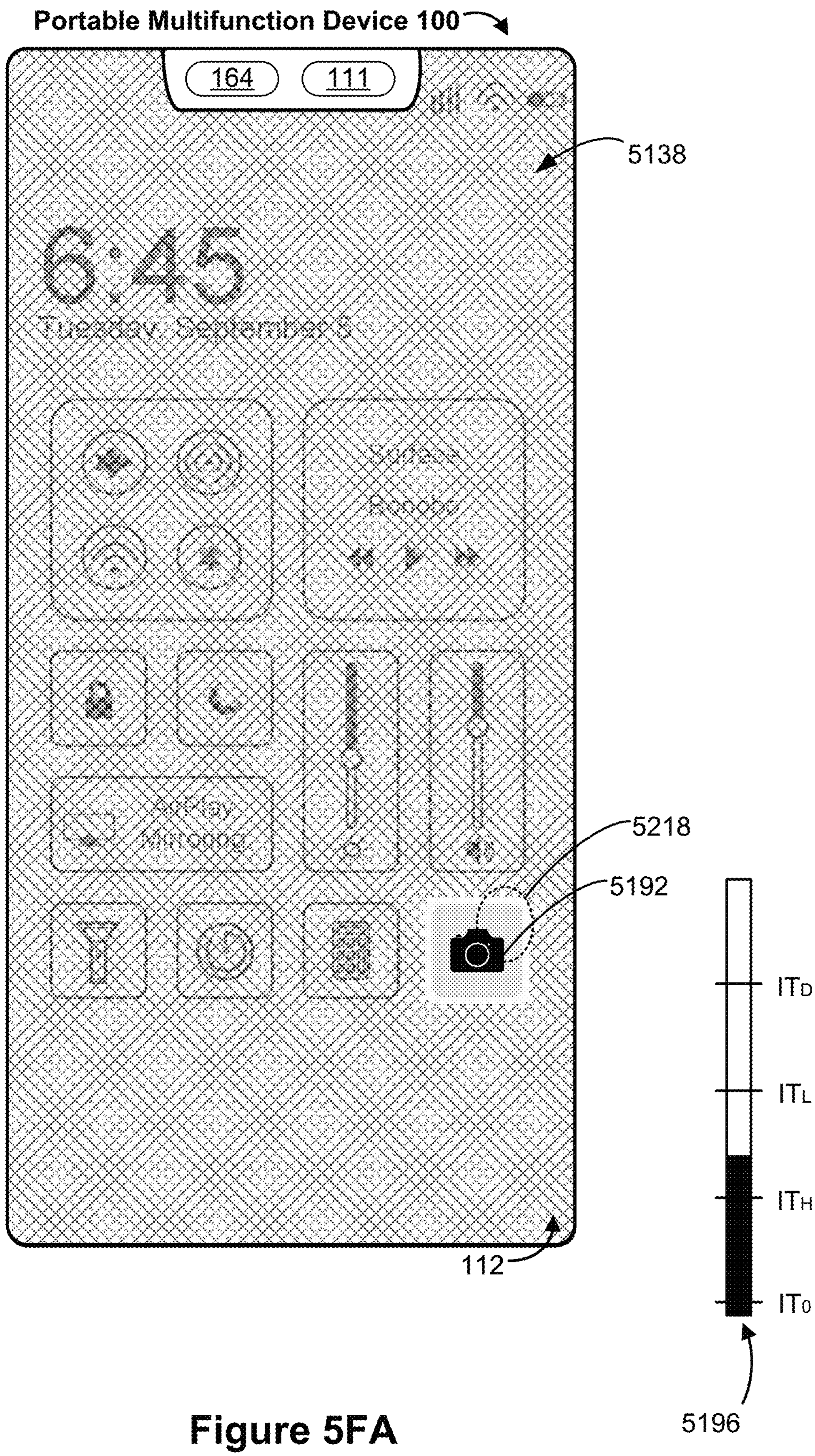
Figure 5F:
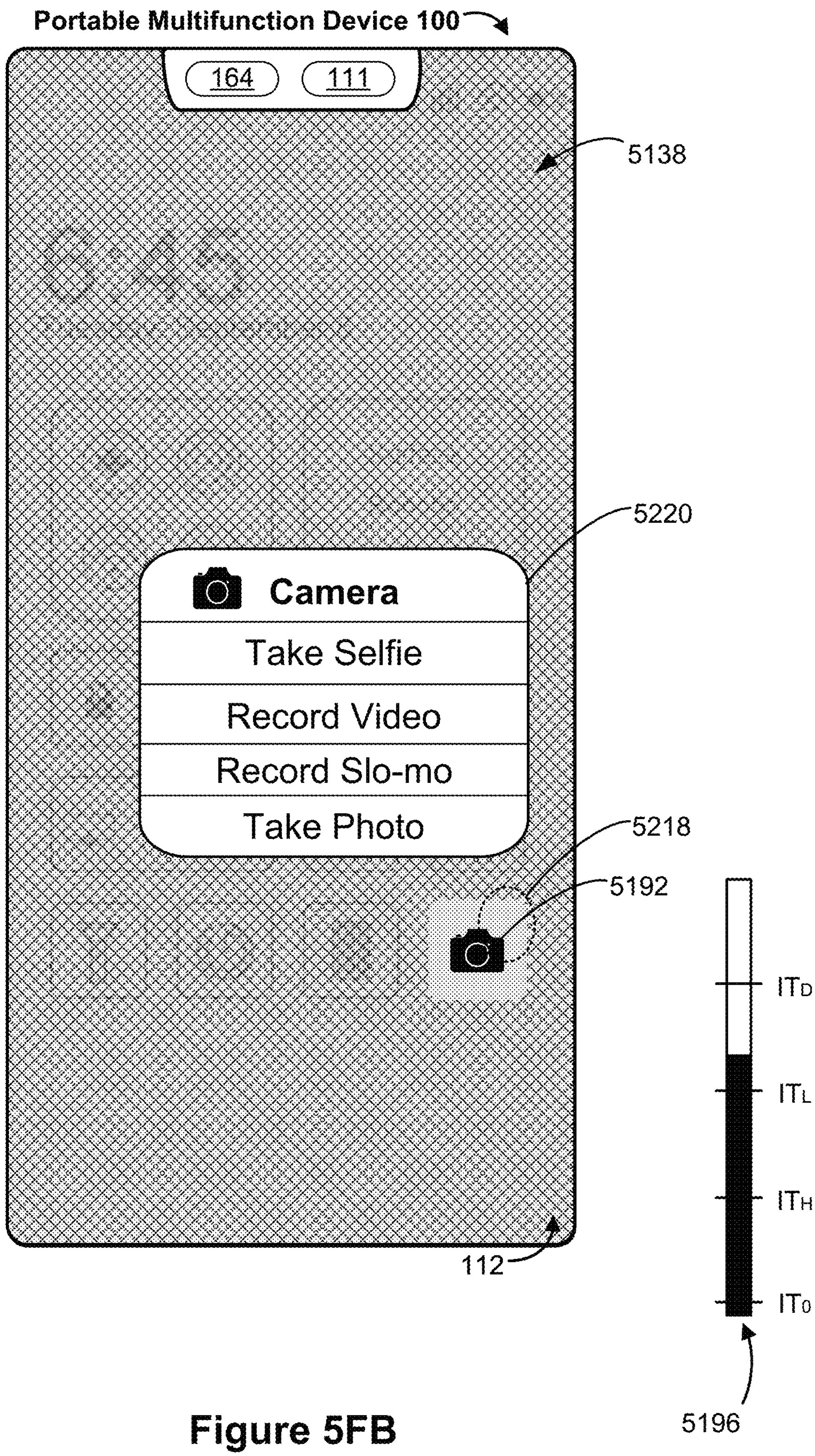
Figure 5F:
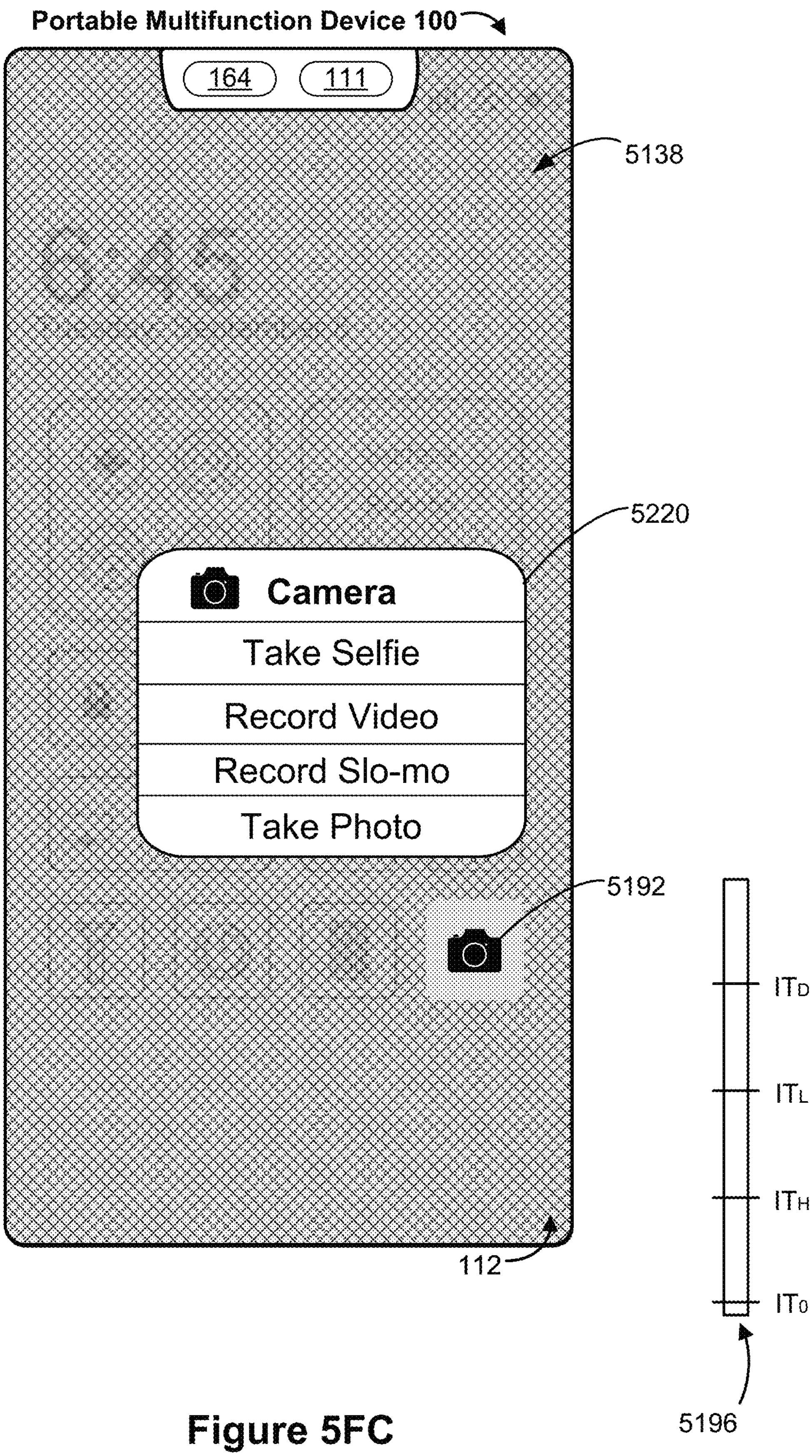
Figure 5F:
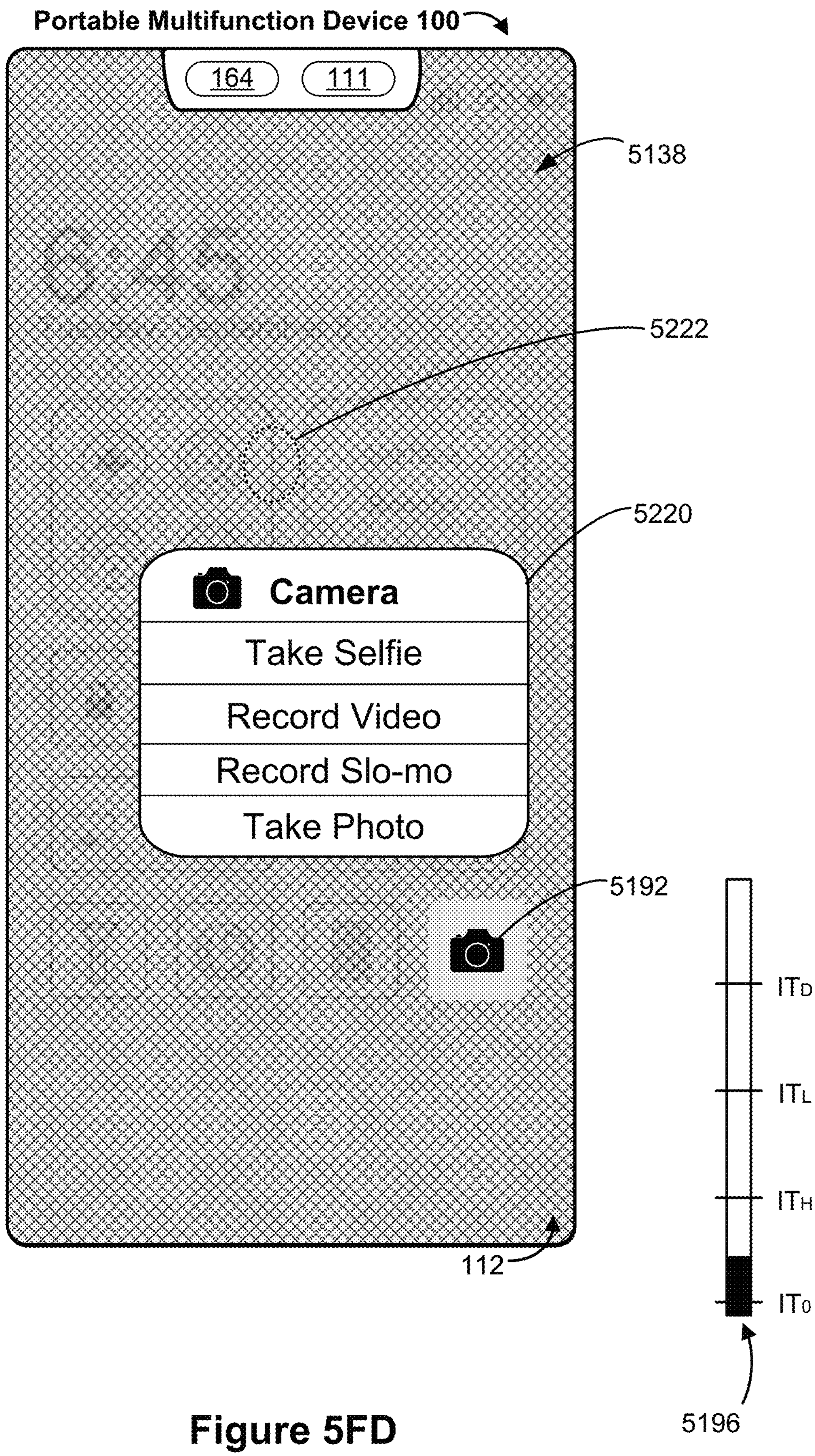
Figure 5F:
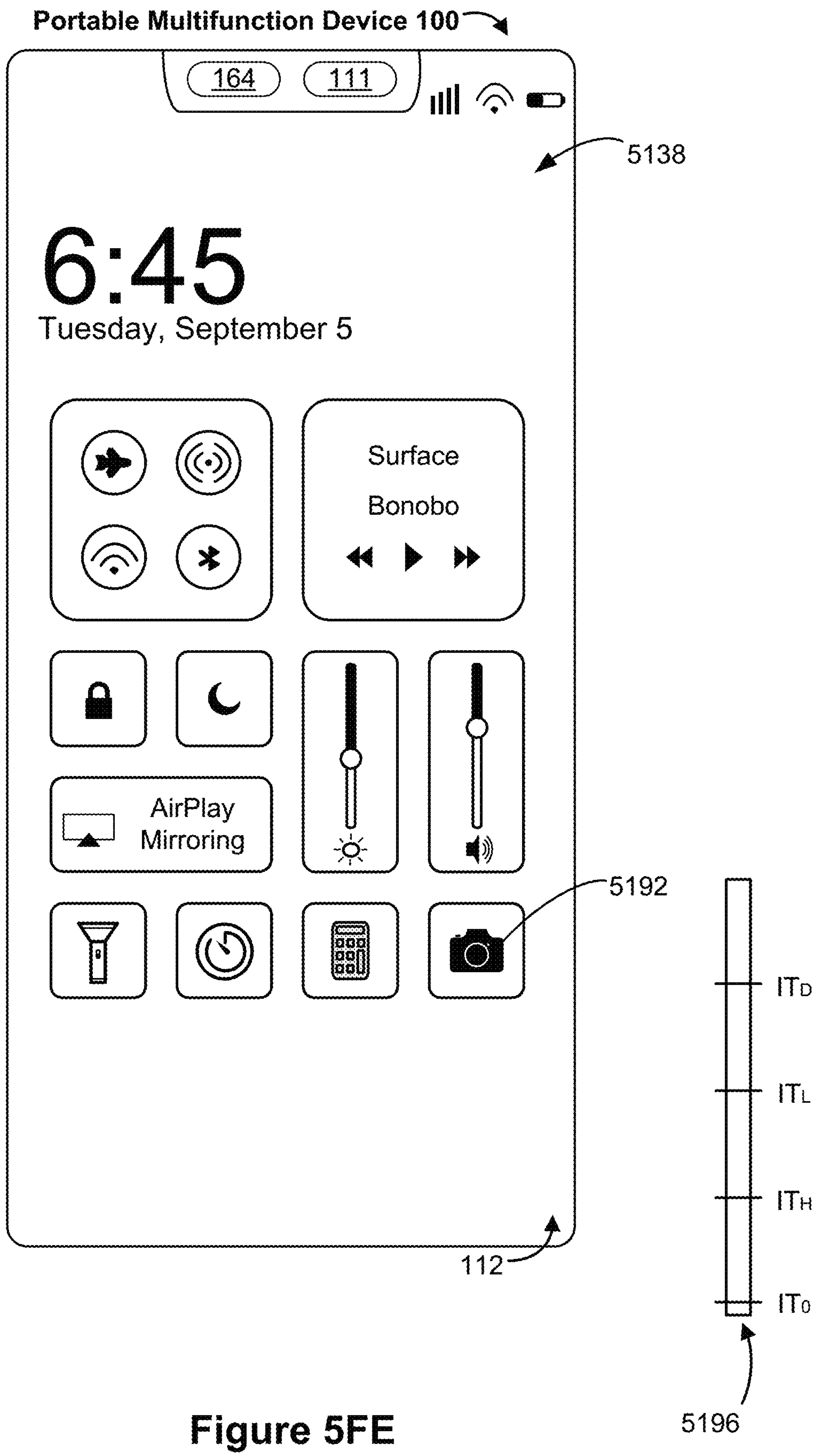
Figure 5F:
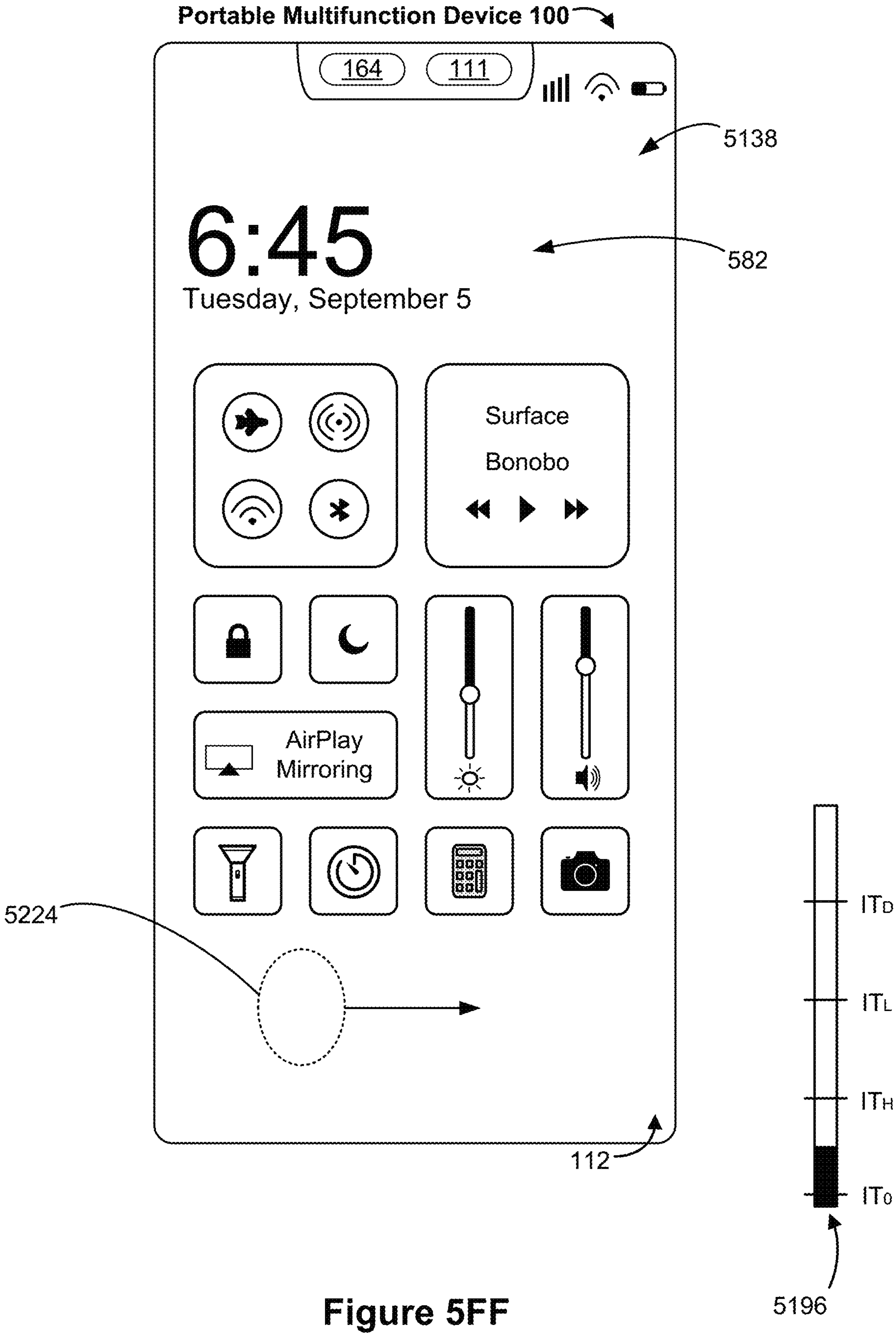
Figure 5F:
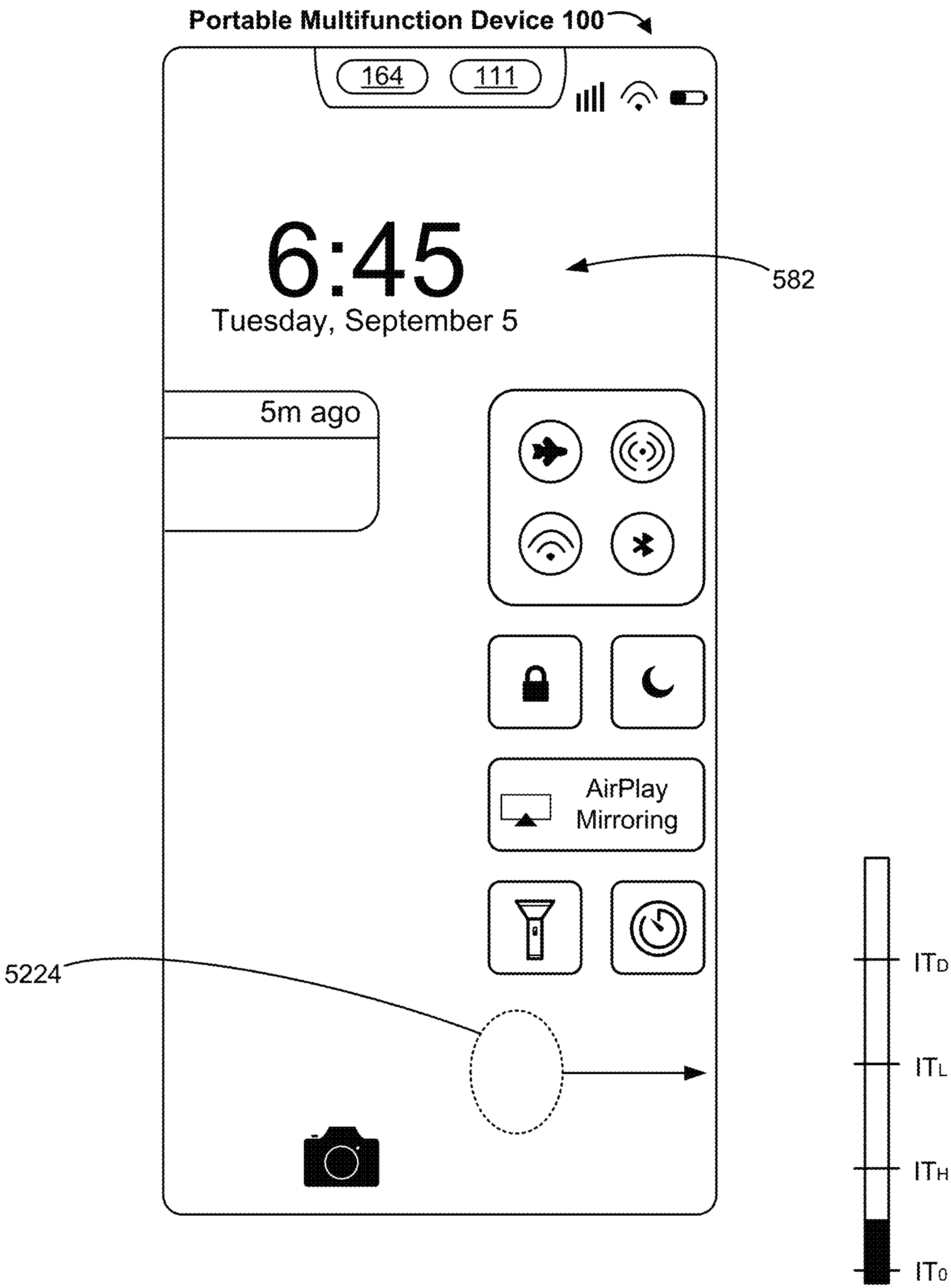
Figure 5F:
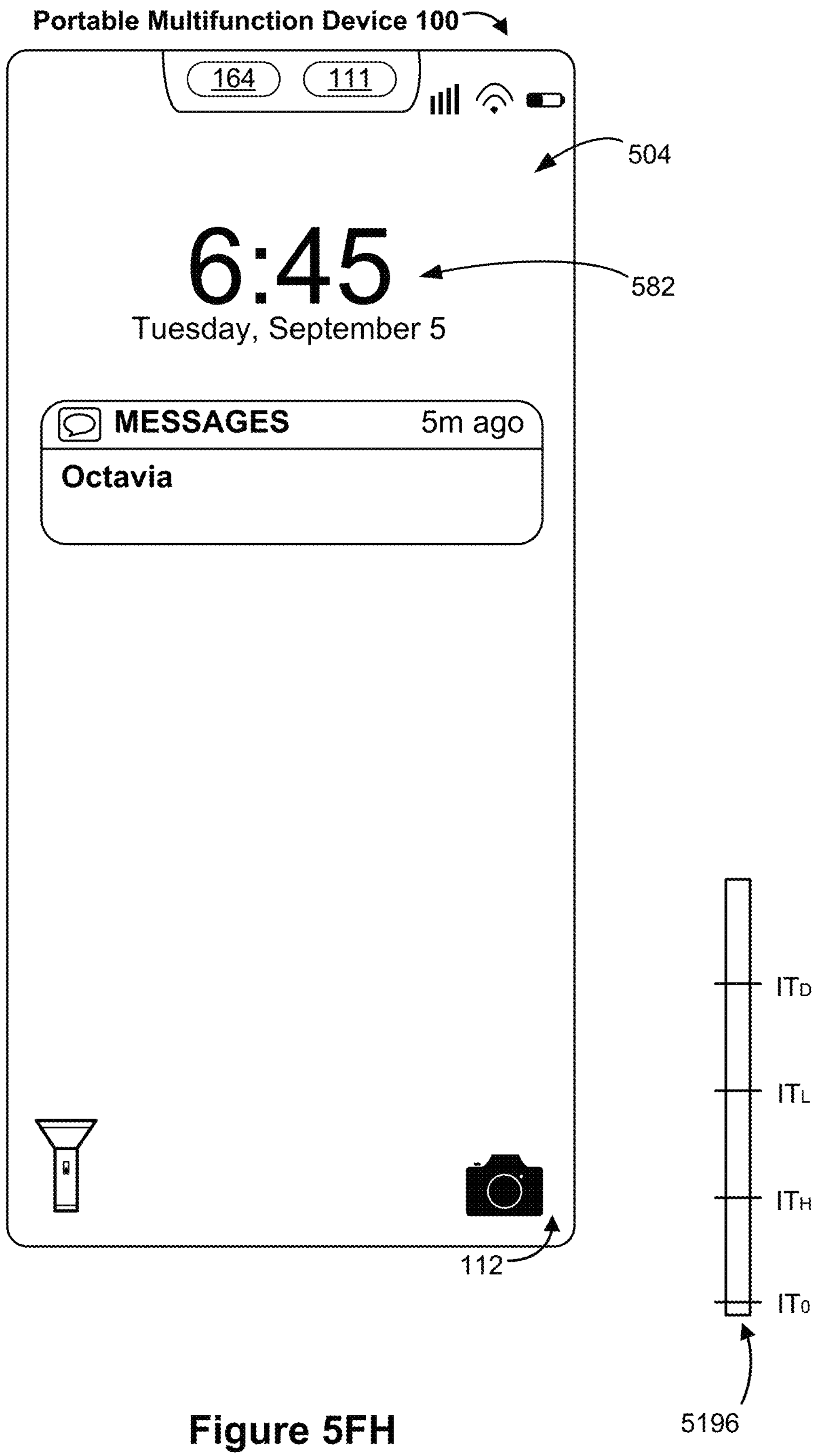
Figure 5F:
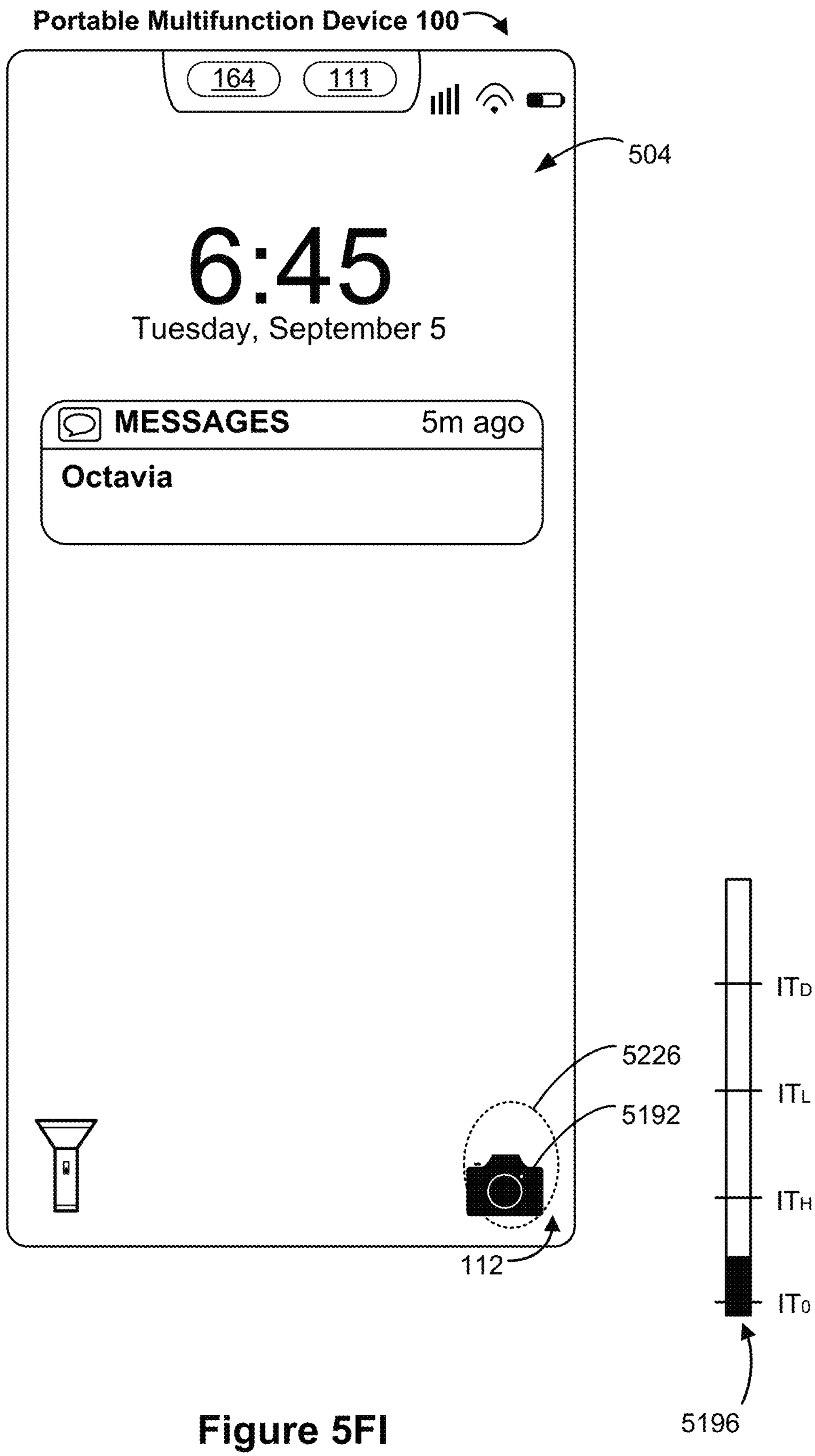
Figure 5F:
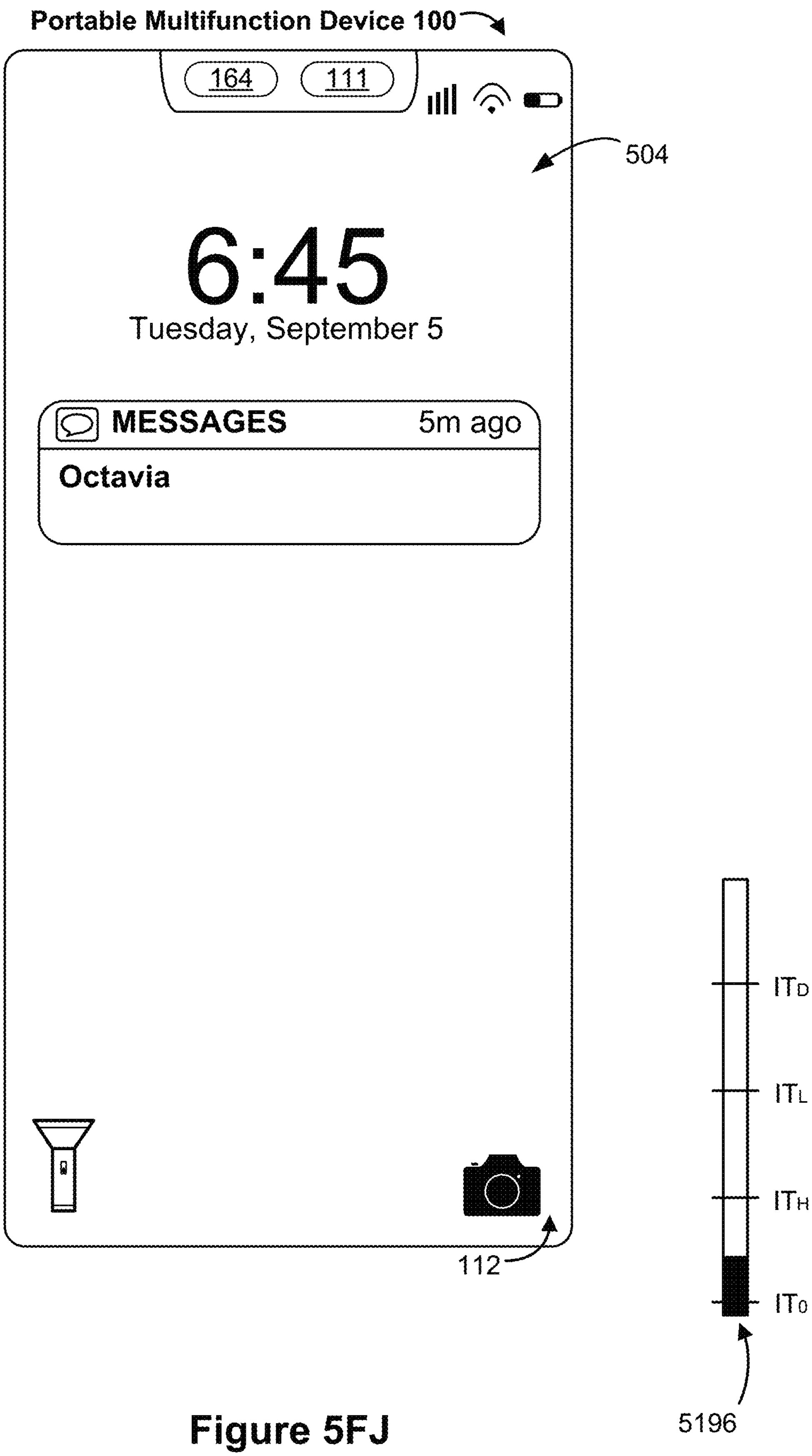
Figure 5F:
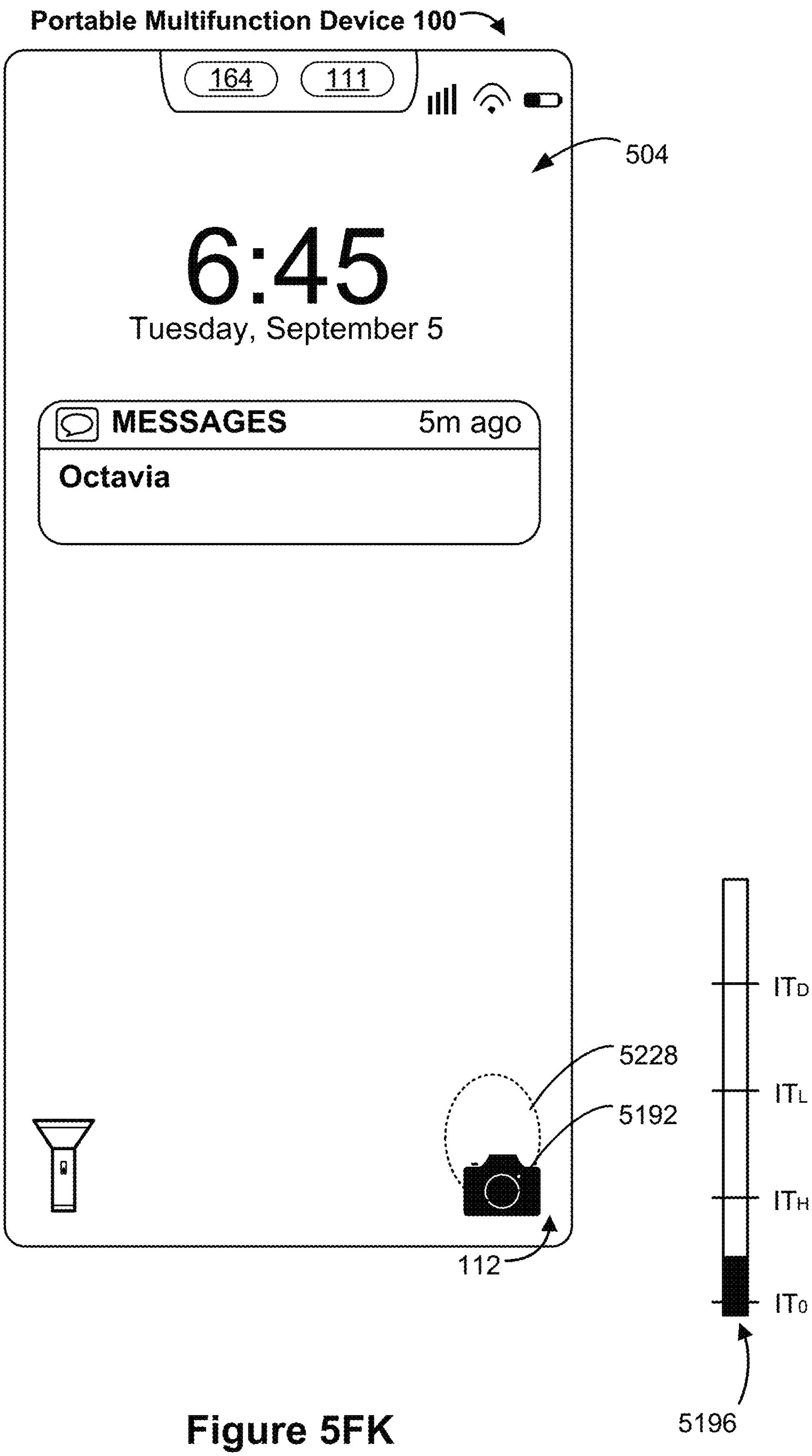
Figure 5F:
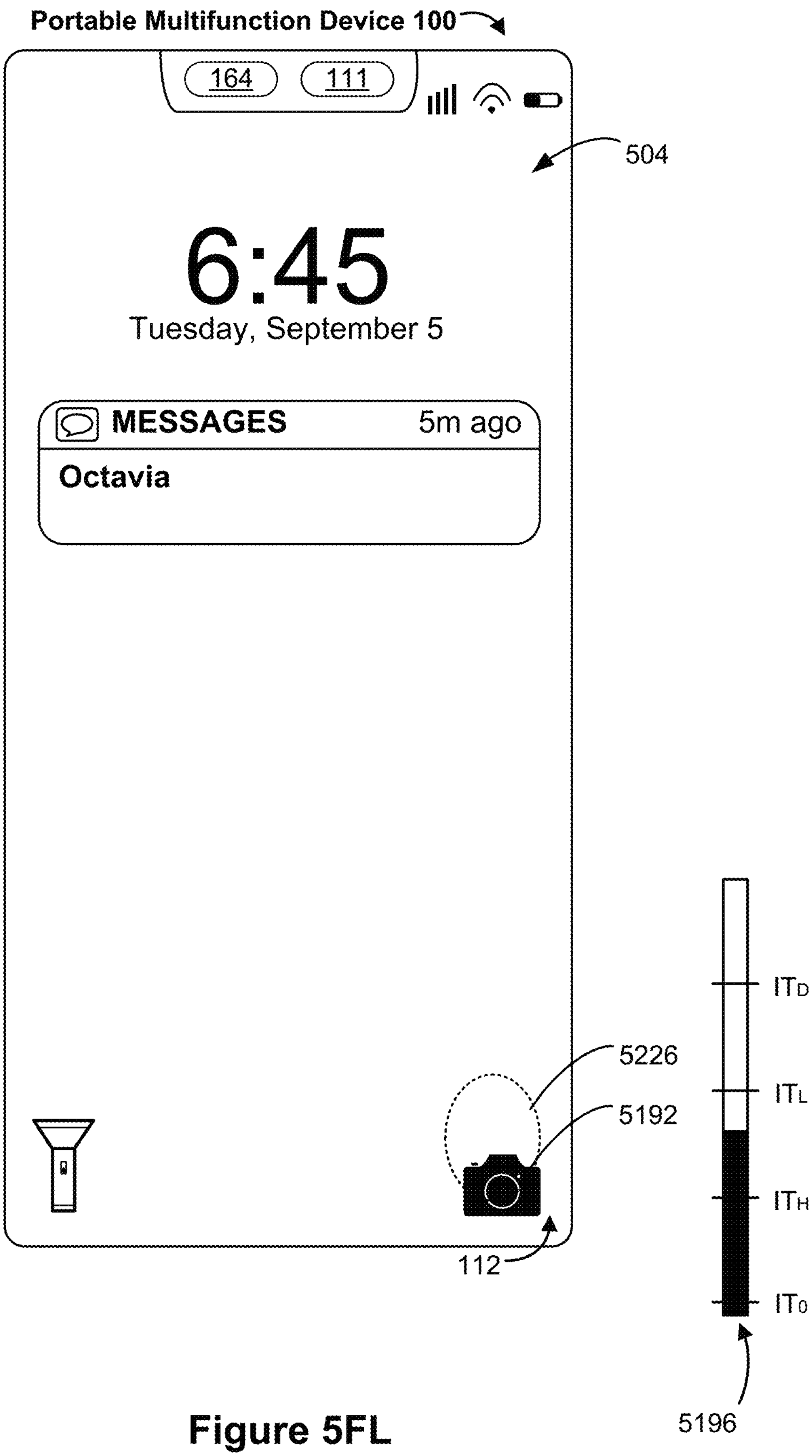
Figure 5F:
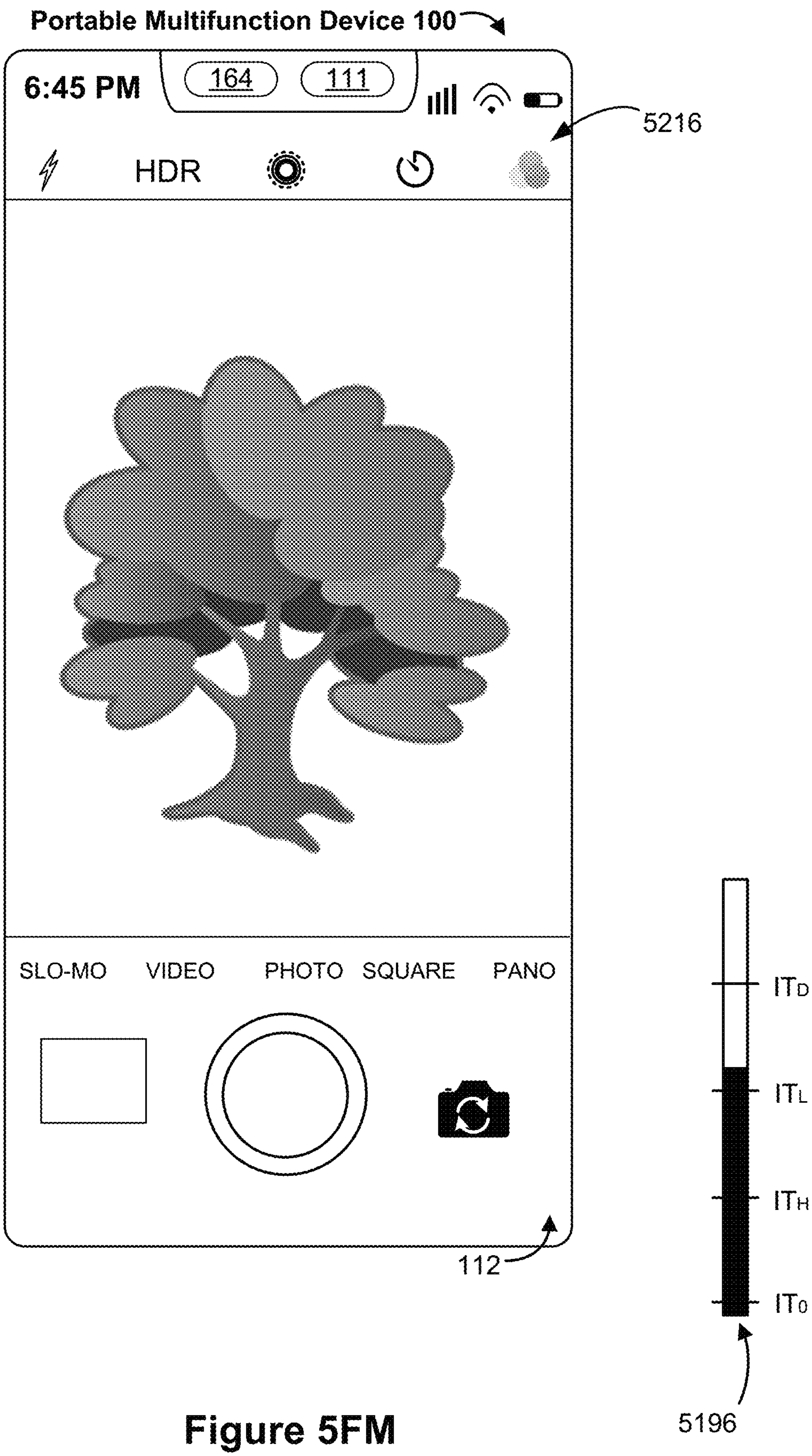
Figure 5F:
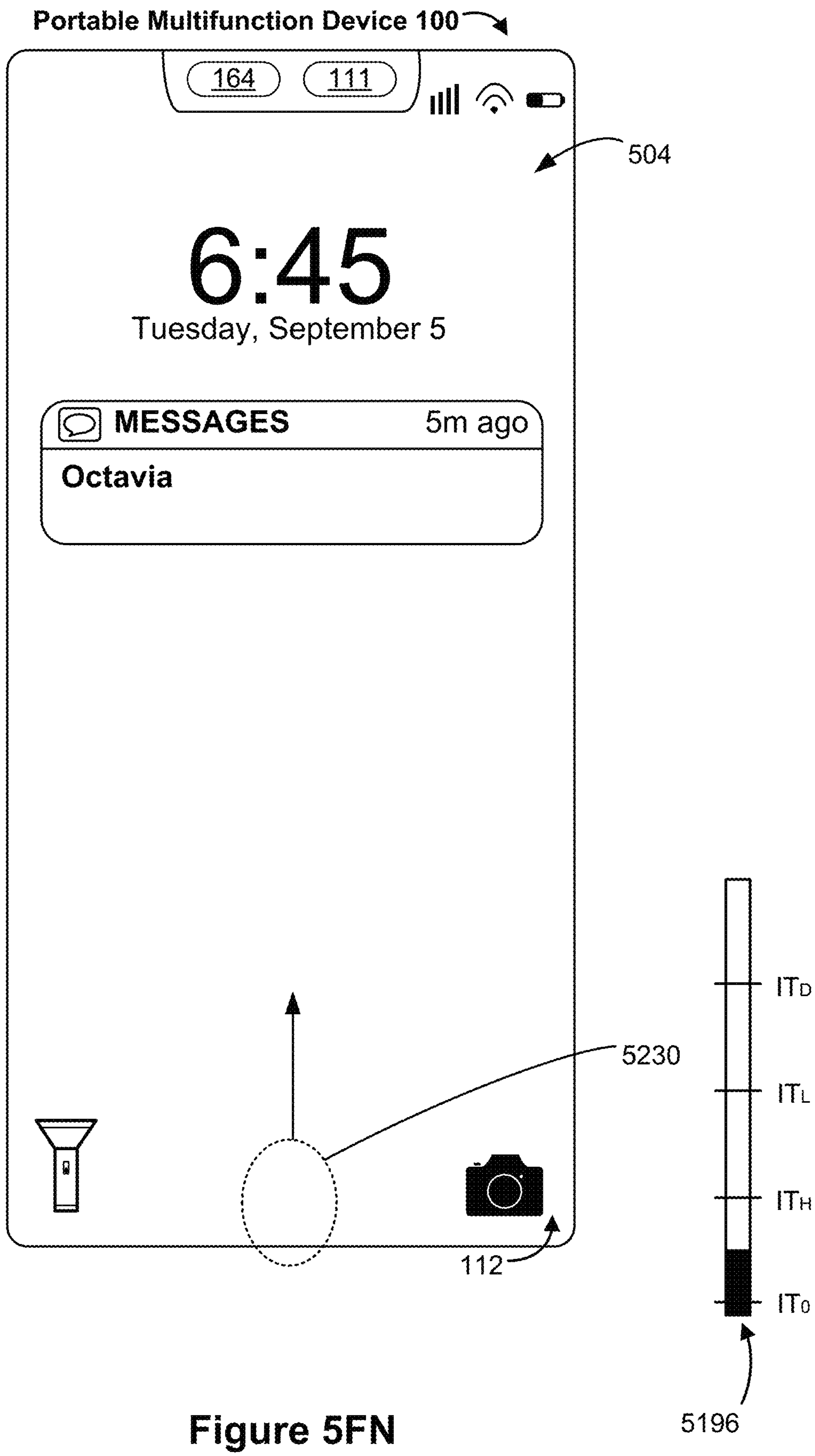
Figure 5F:
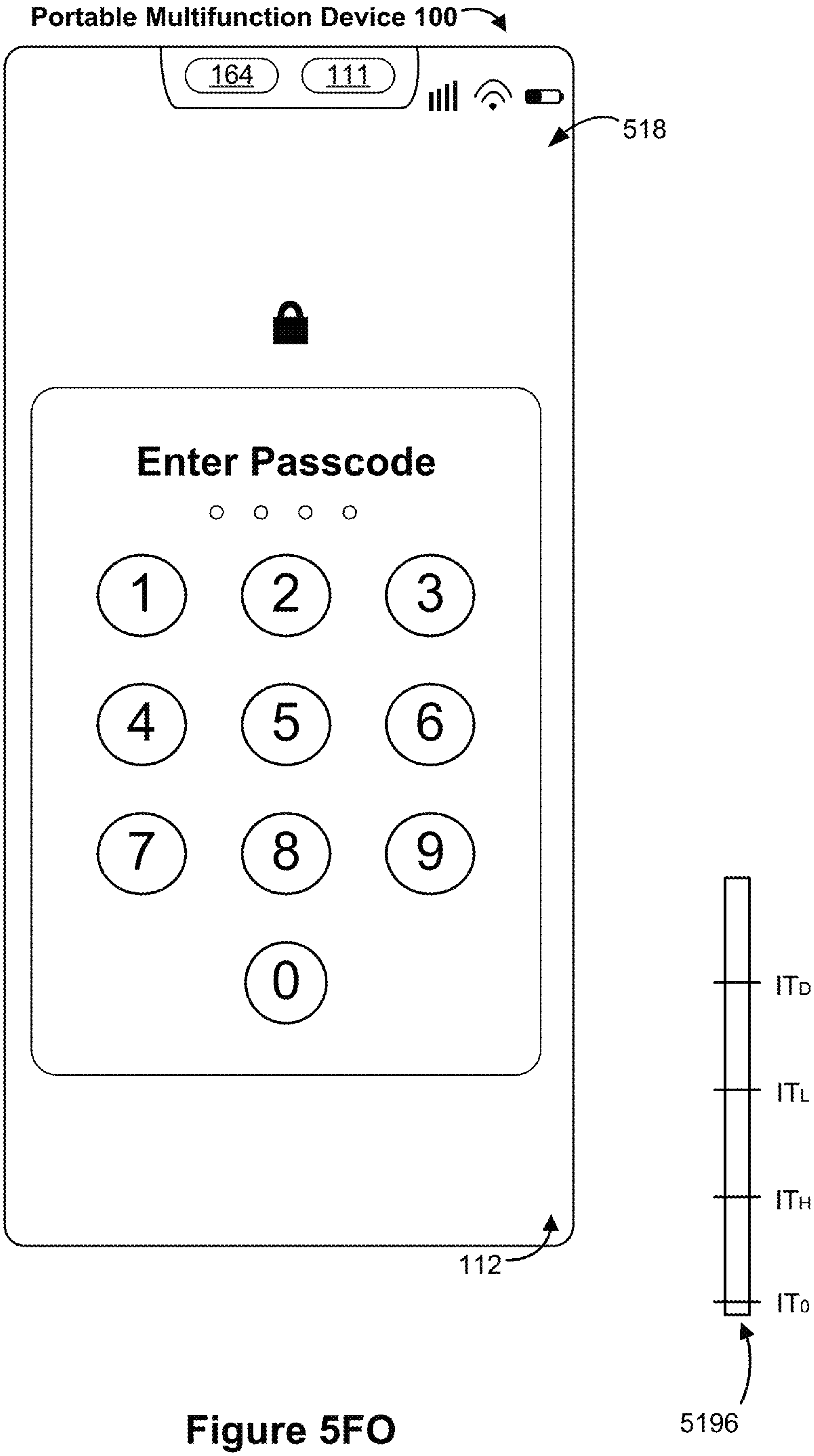
Figure 5F:
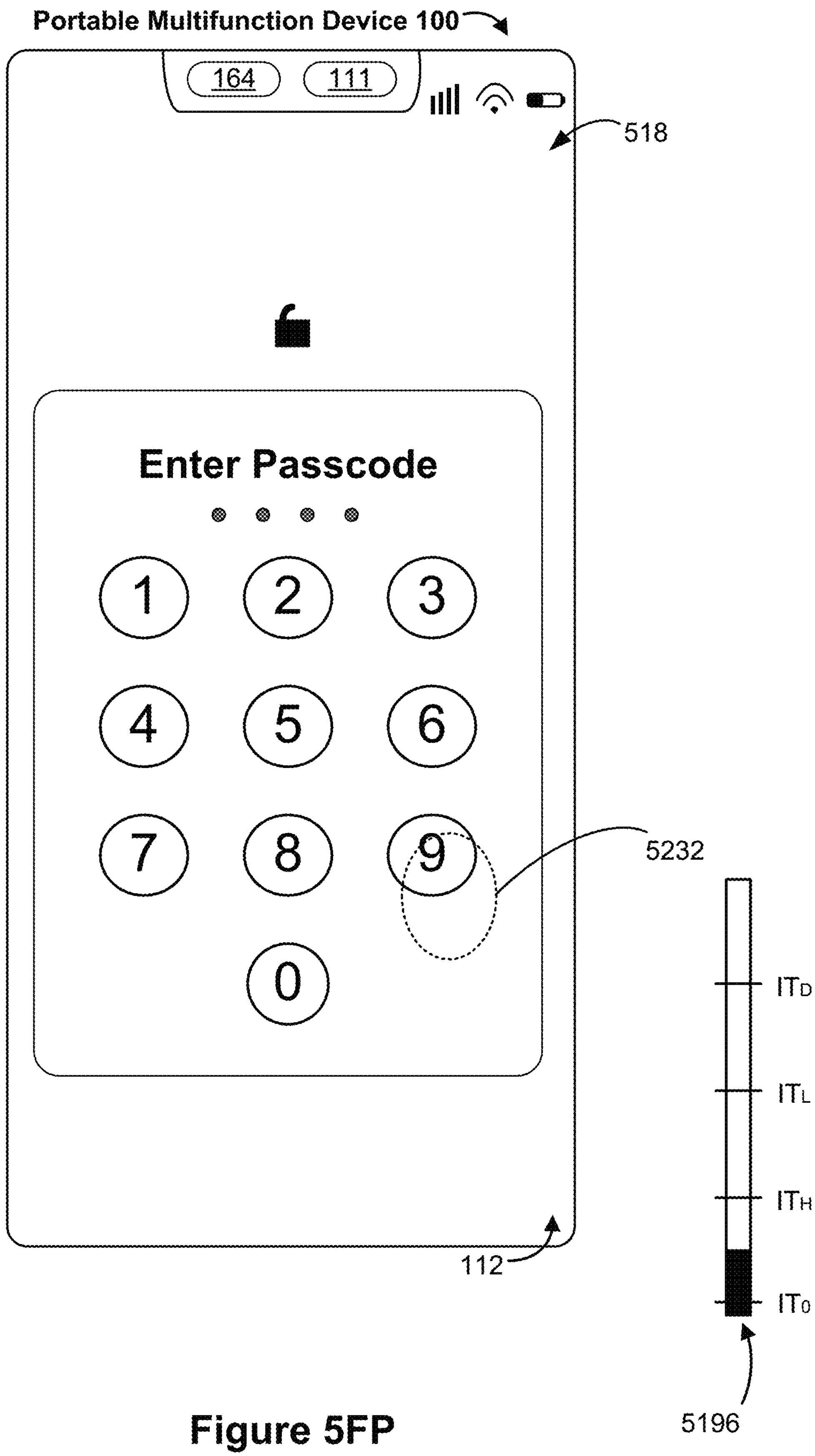
Figure 5F:
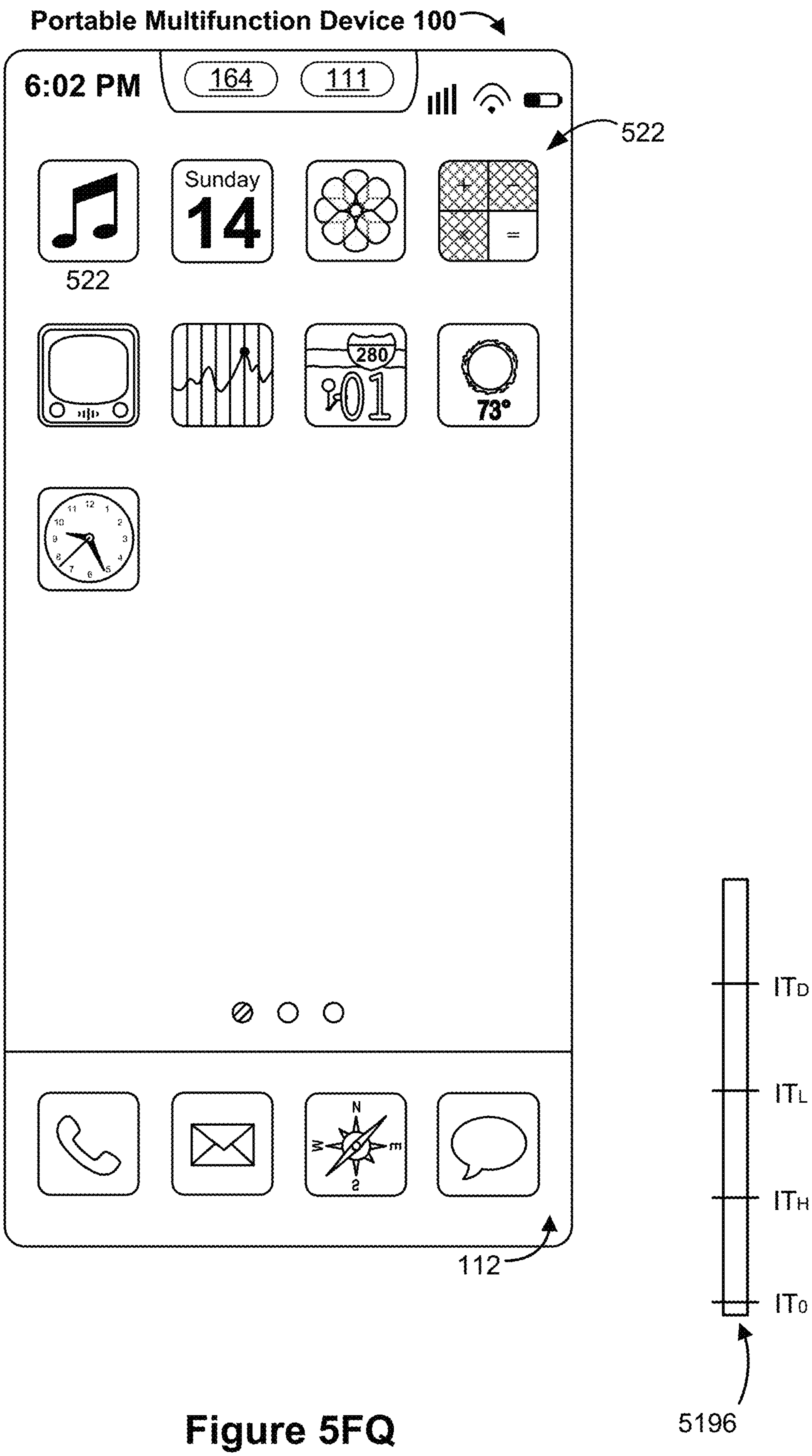
Figure 5F:
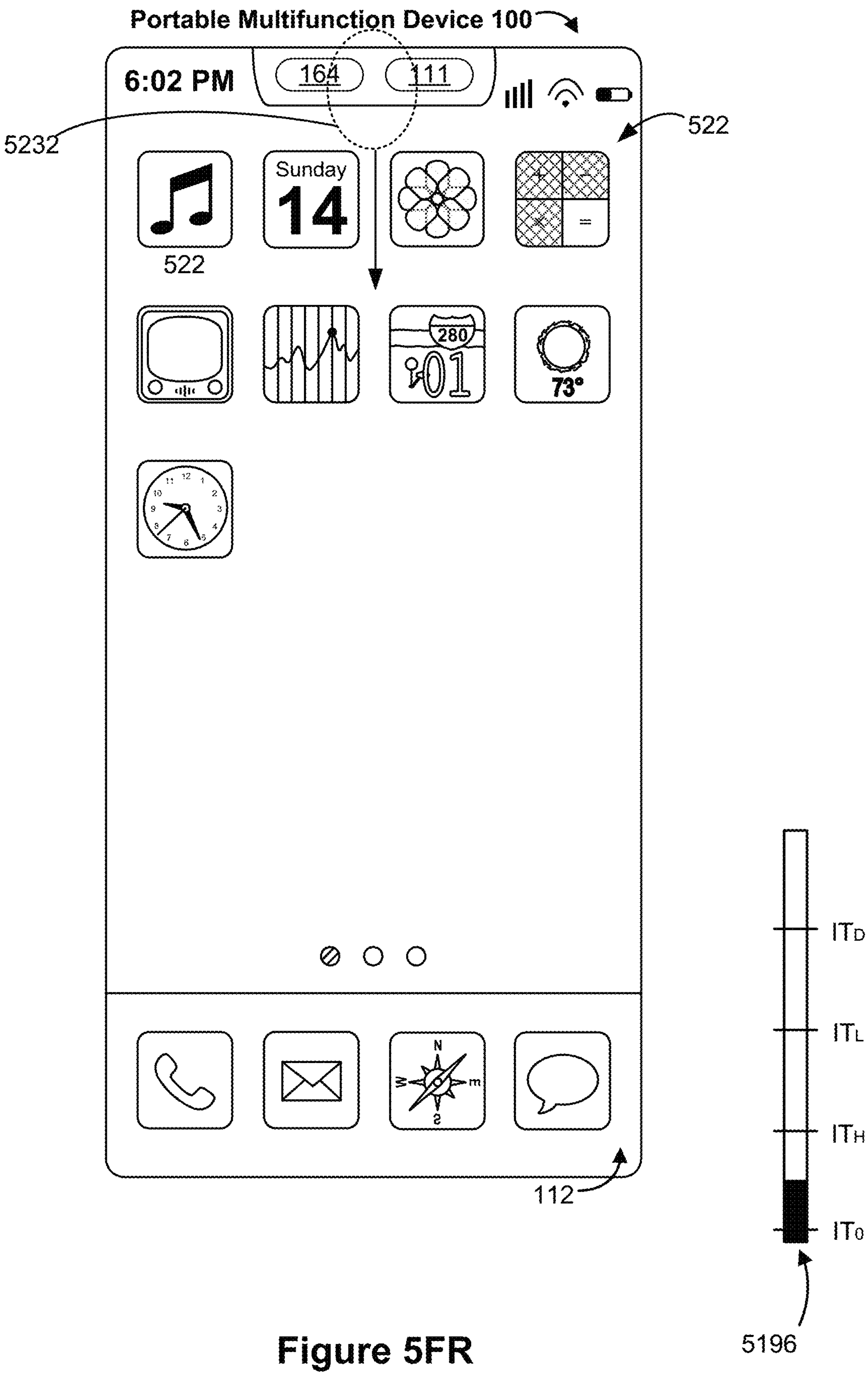
Figure 5F:
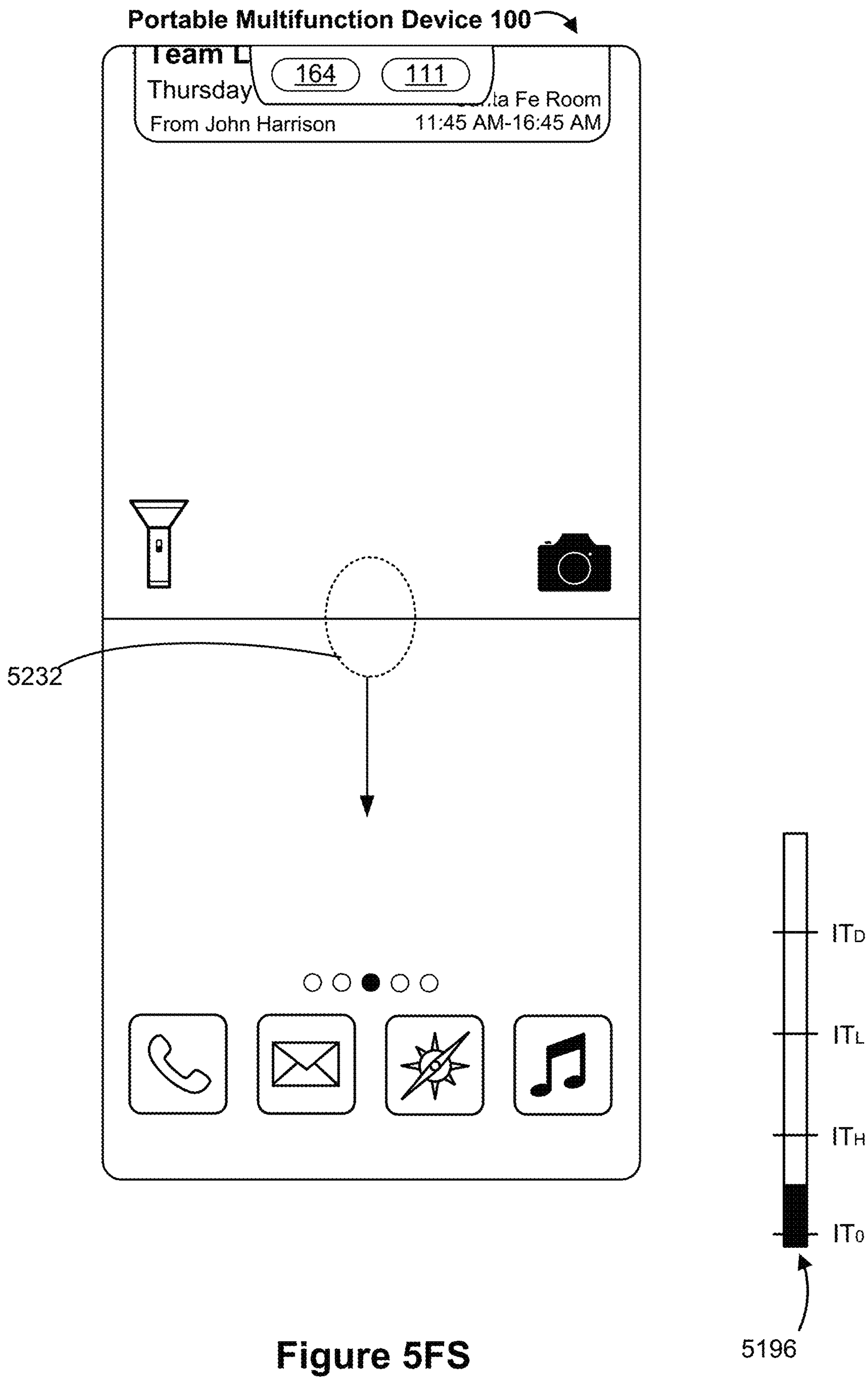
Figure 5F:
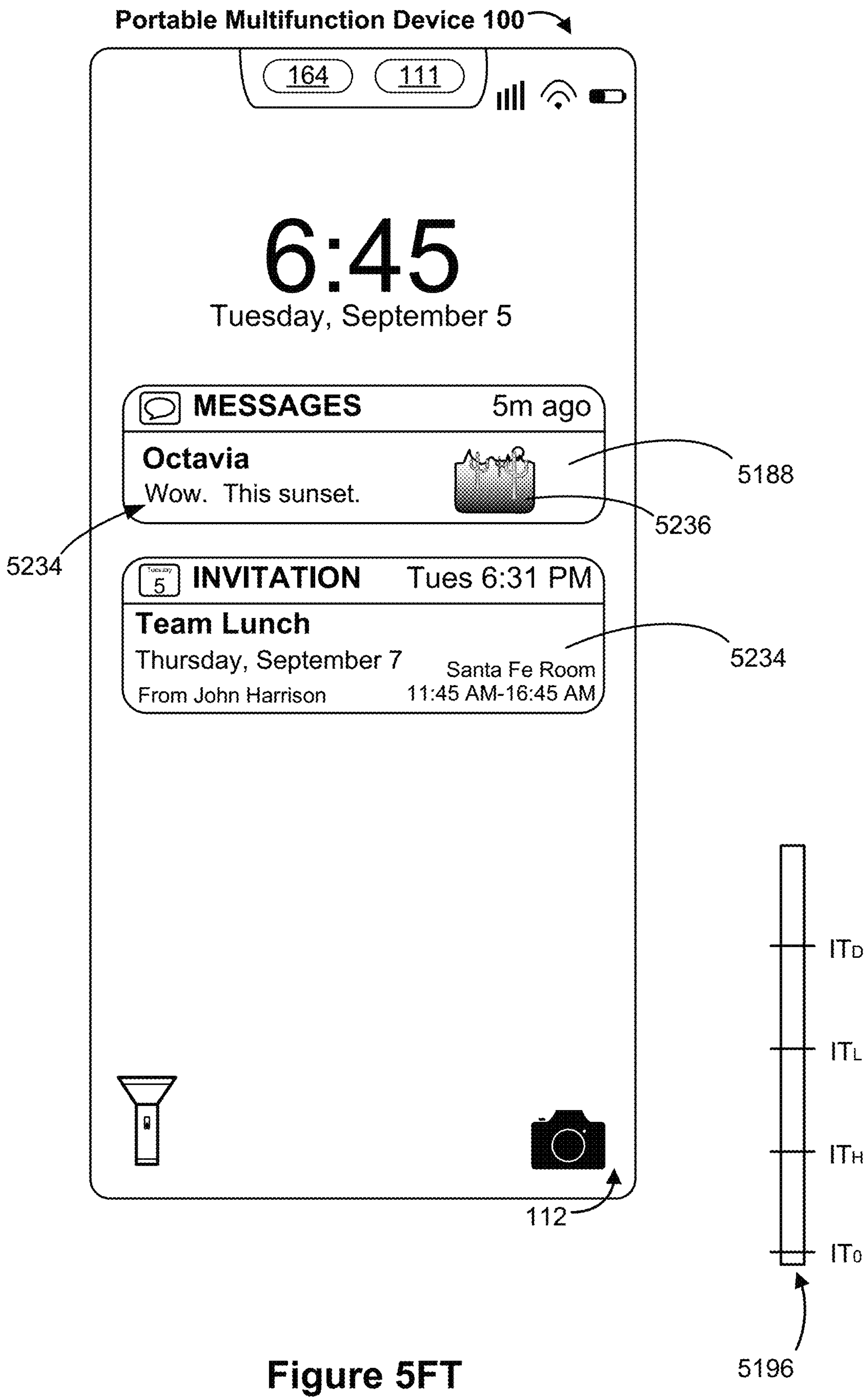
Figure 5F:
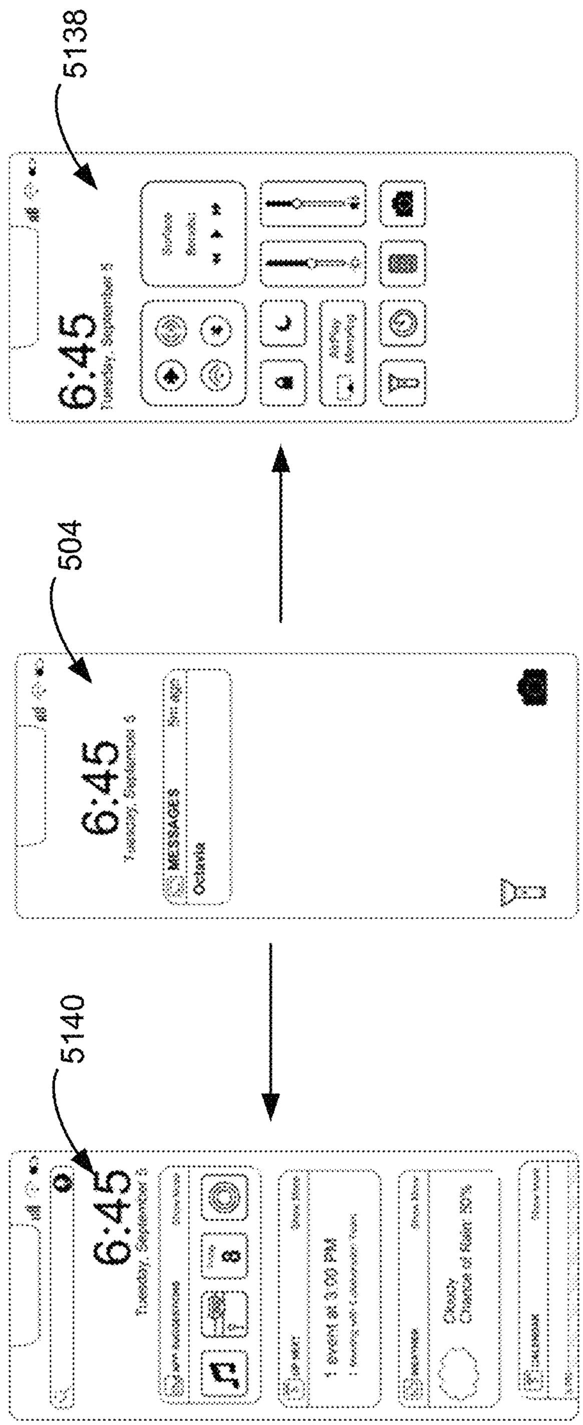
Figure 5F:
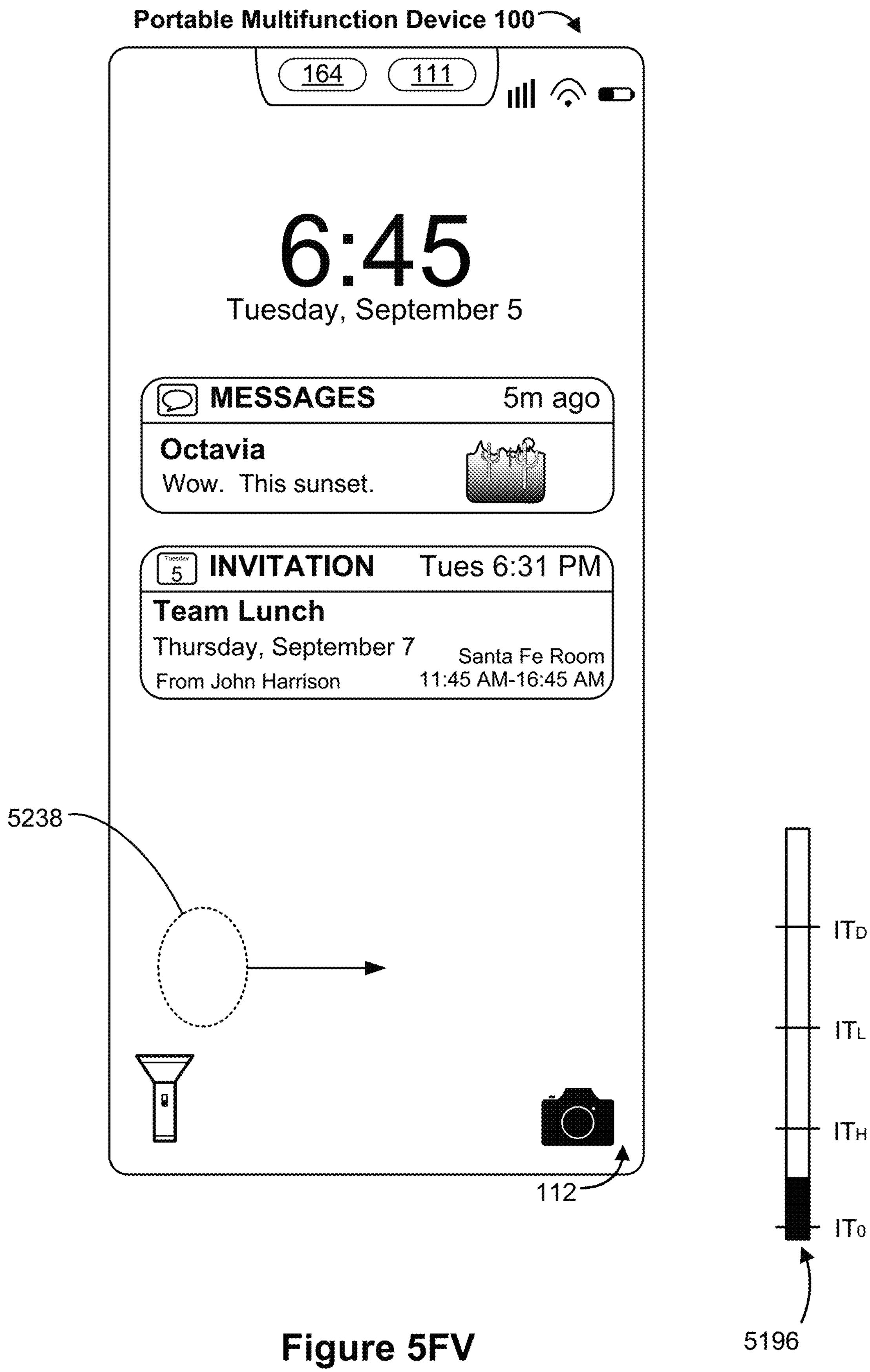
Figure 5F:
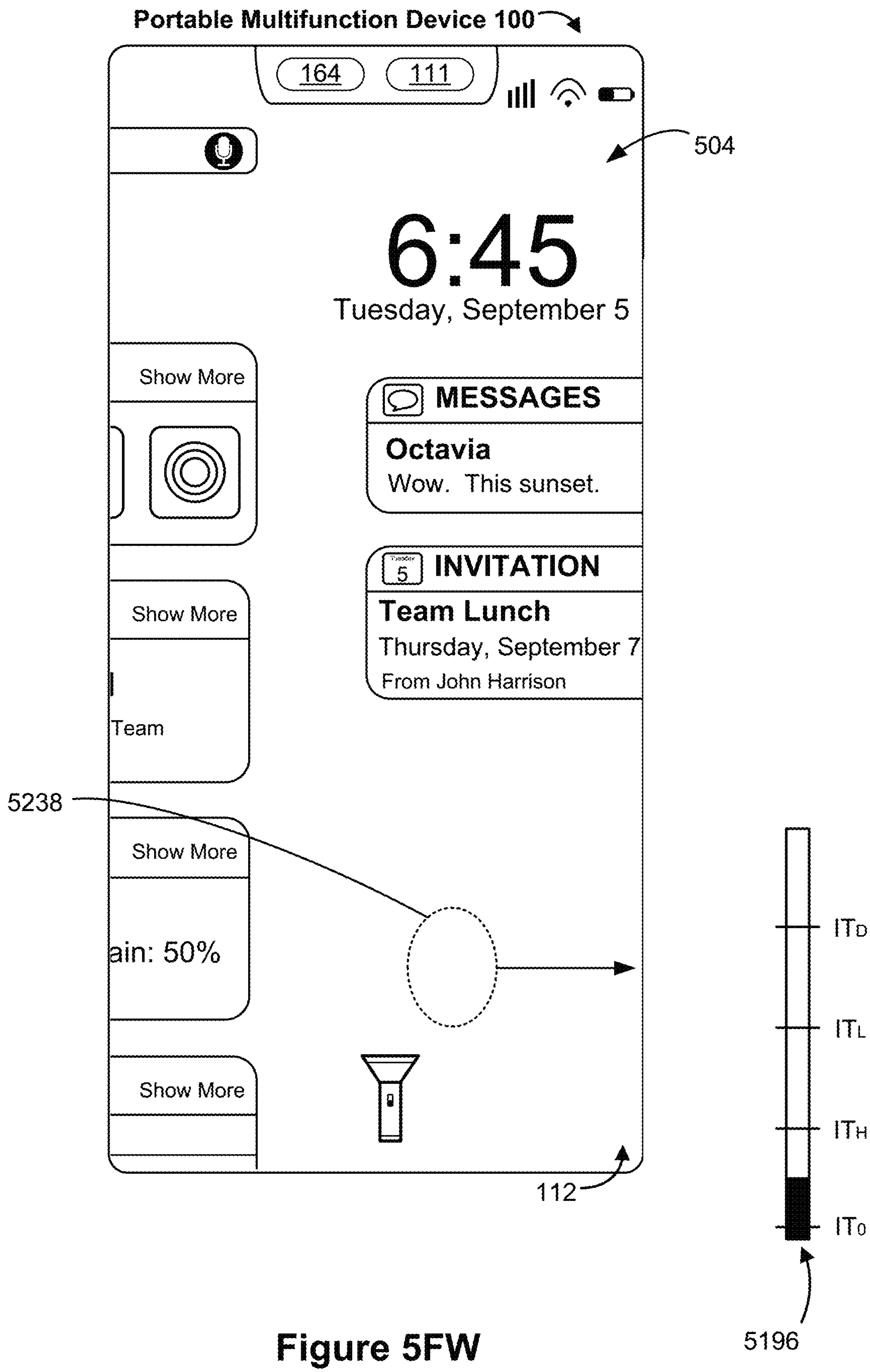
Figure 5F:
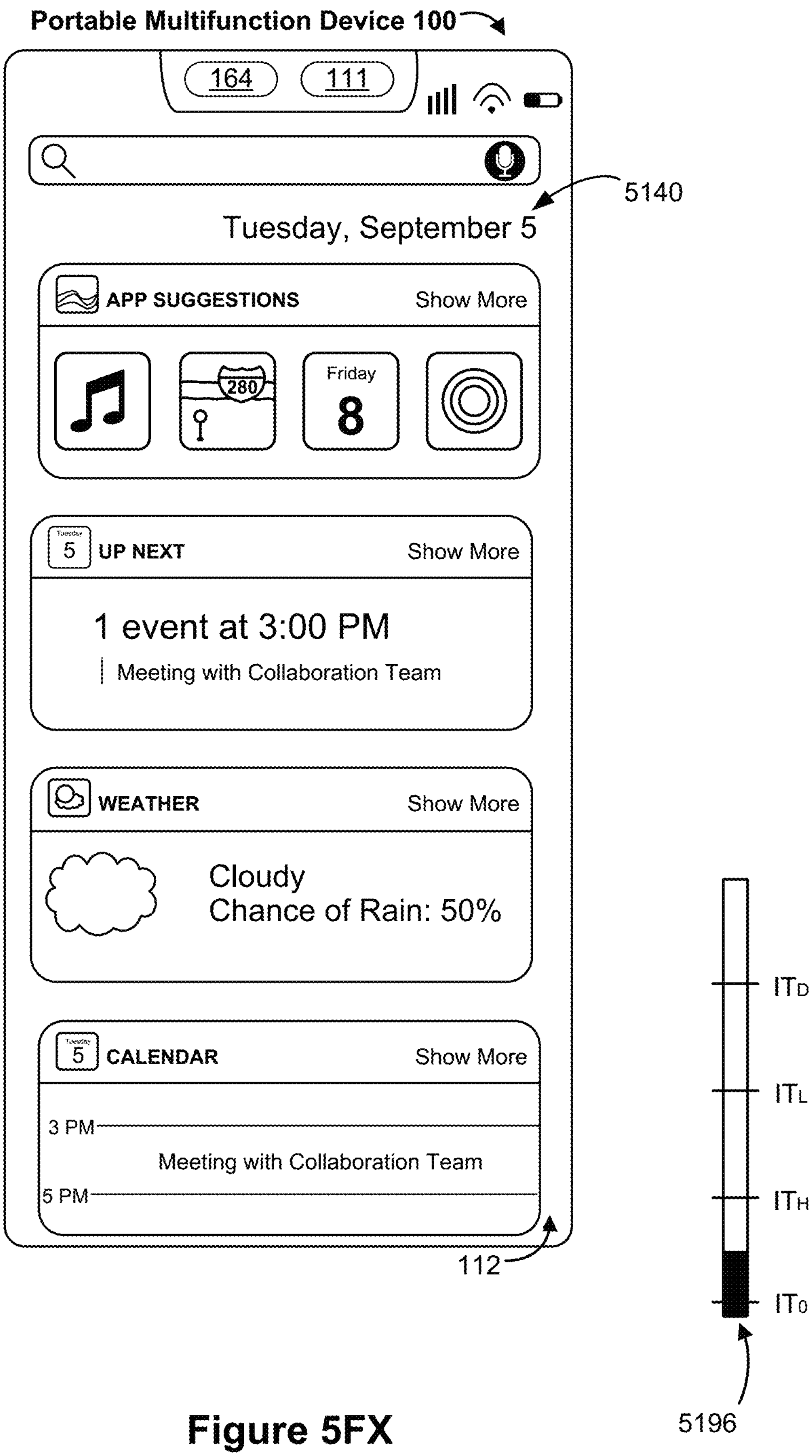
Figure 5F:
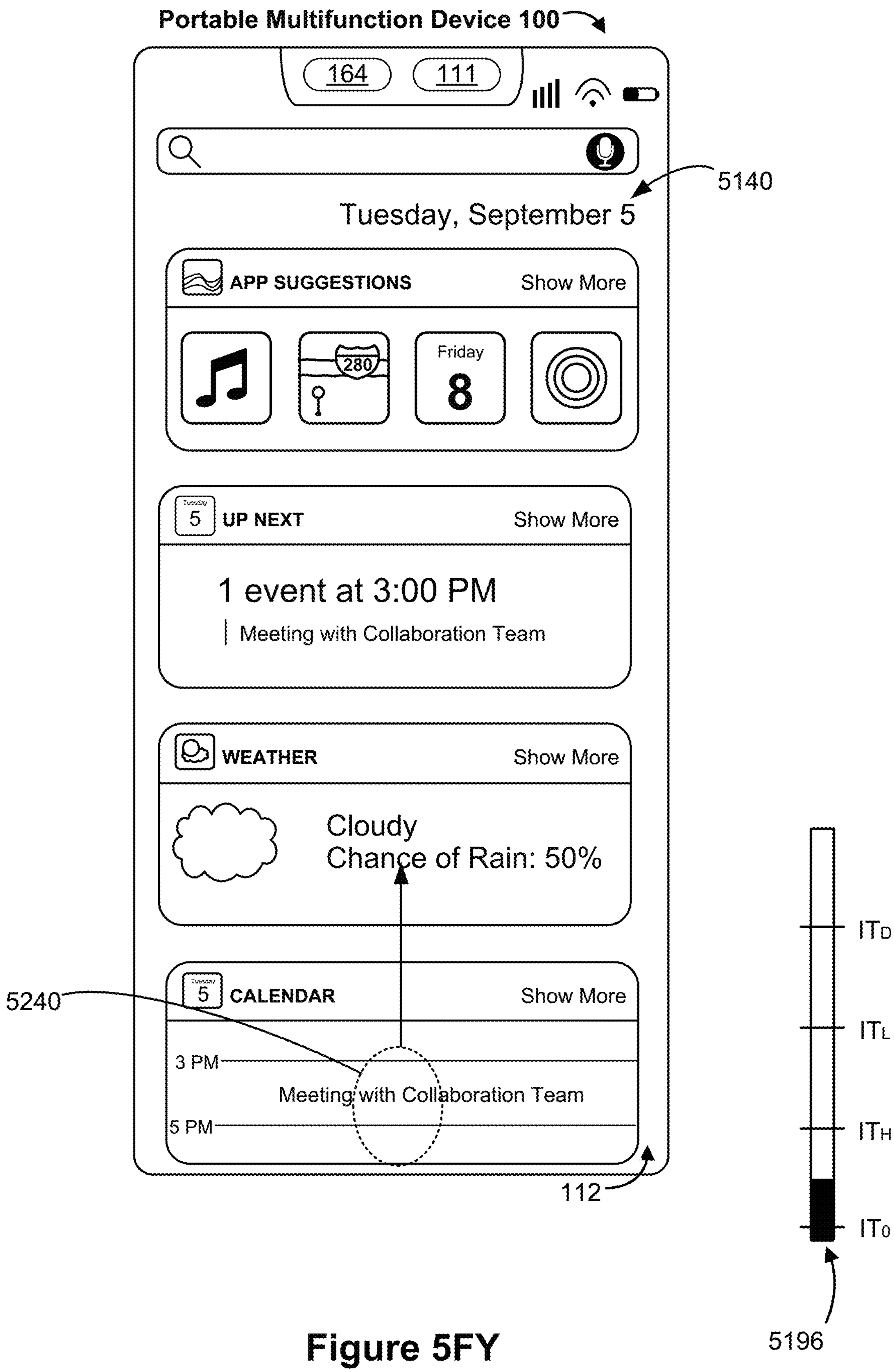
Figure 5F:
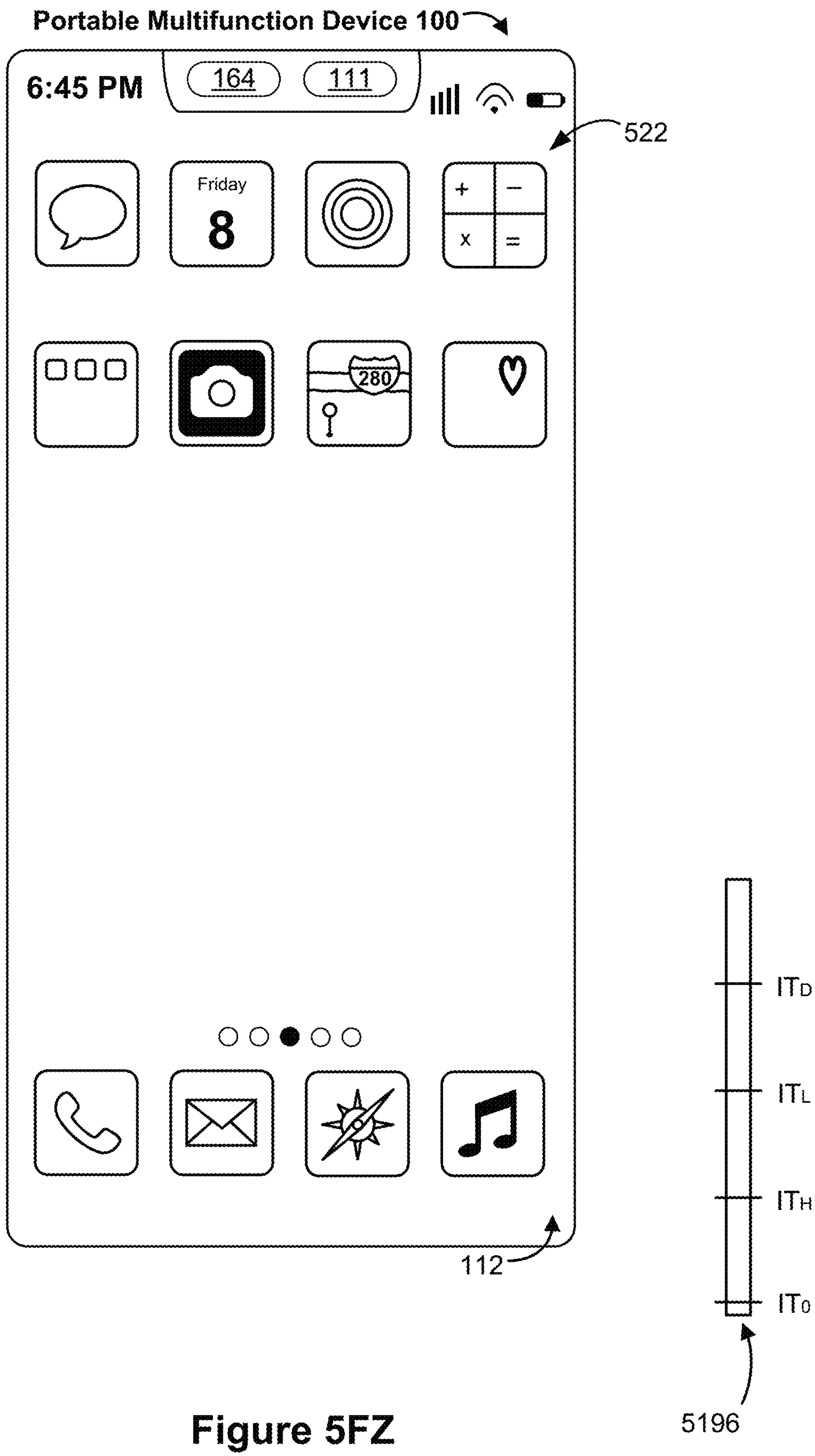
Figure 5G:
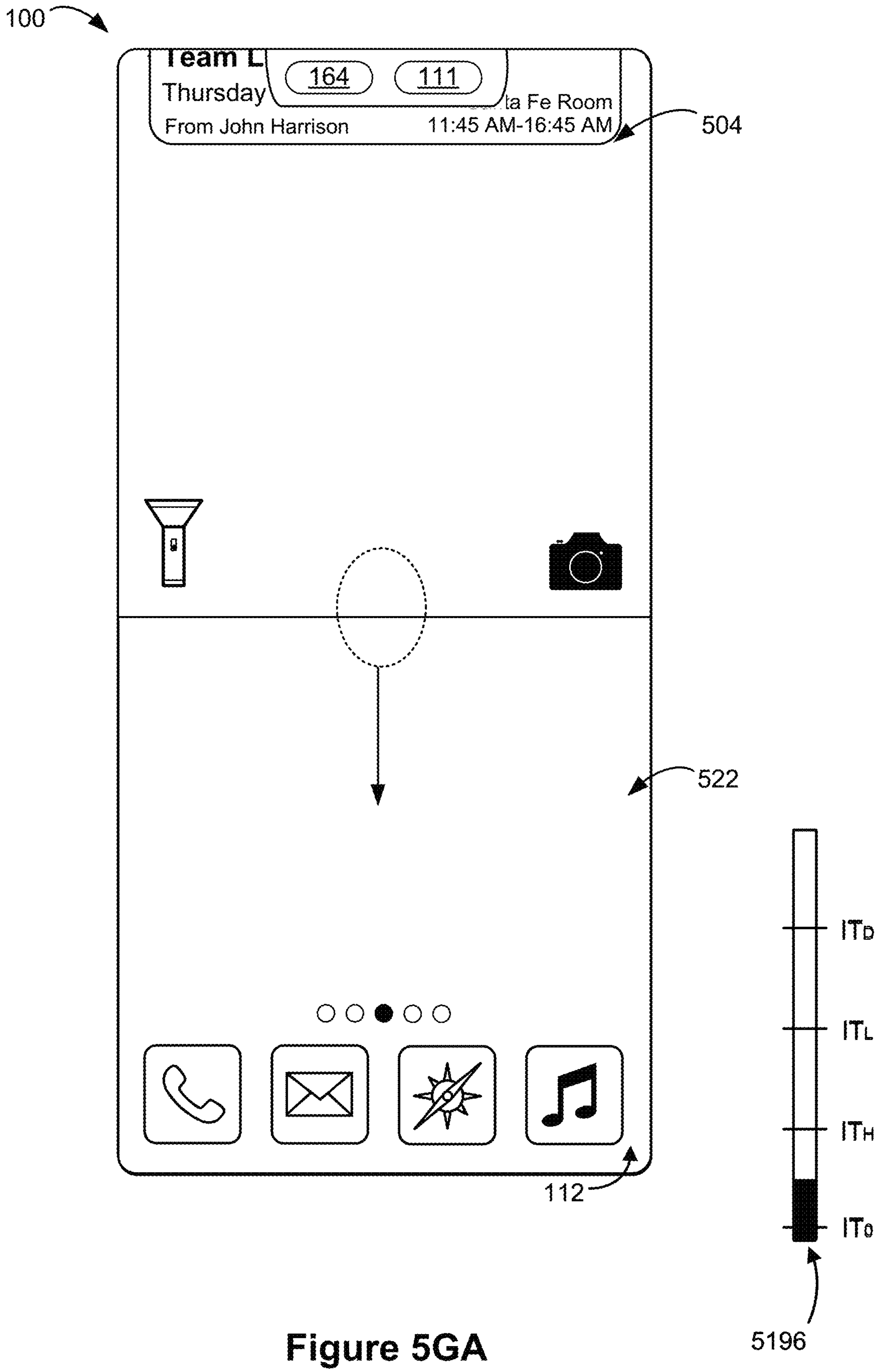
Figure 5G:
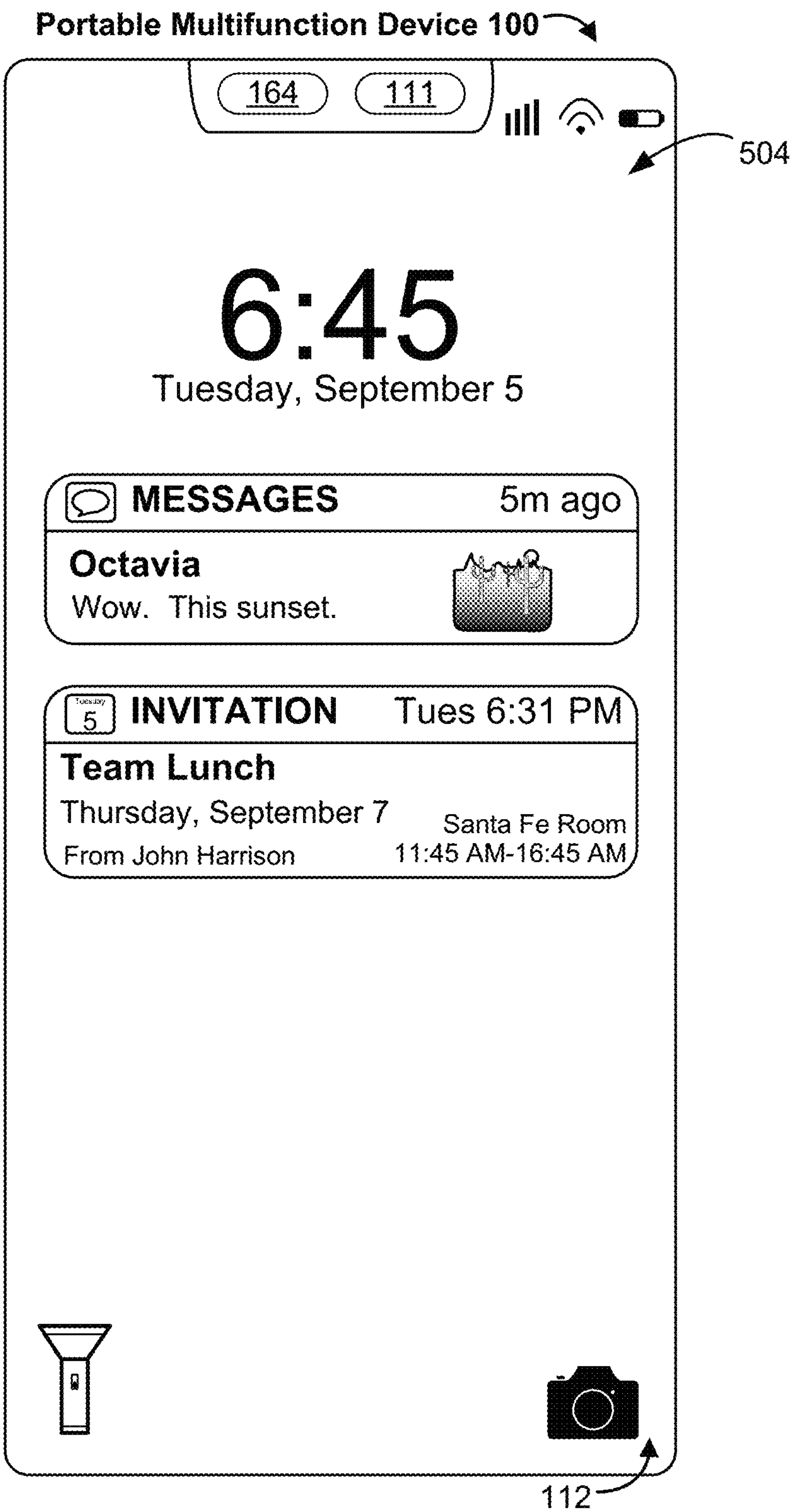
Figure 5G:
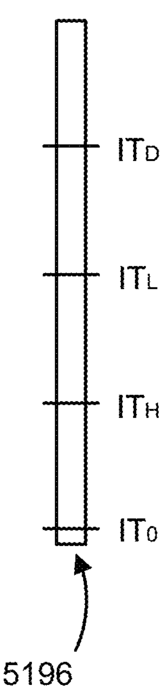
Figure 5G:
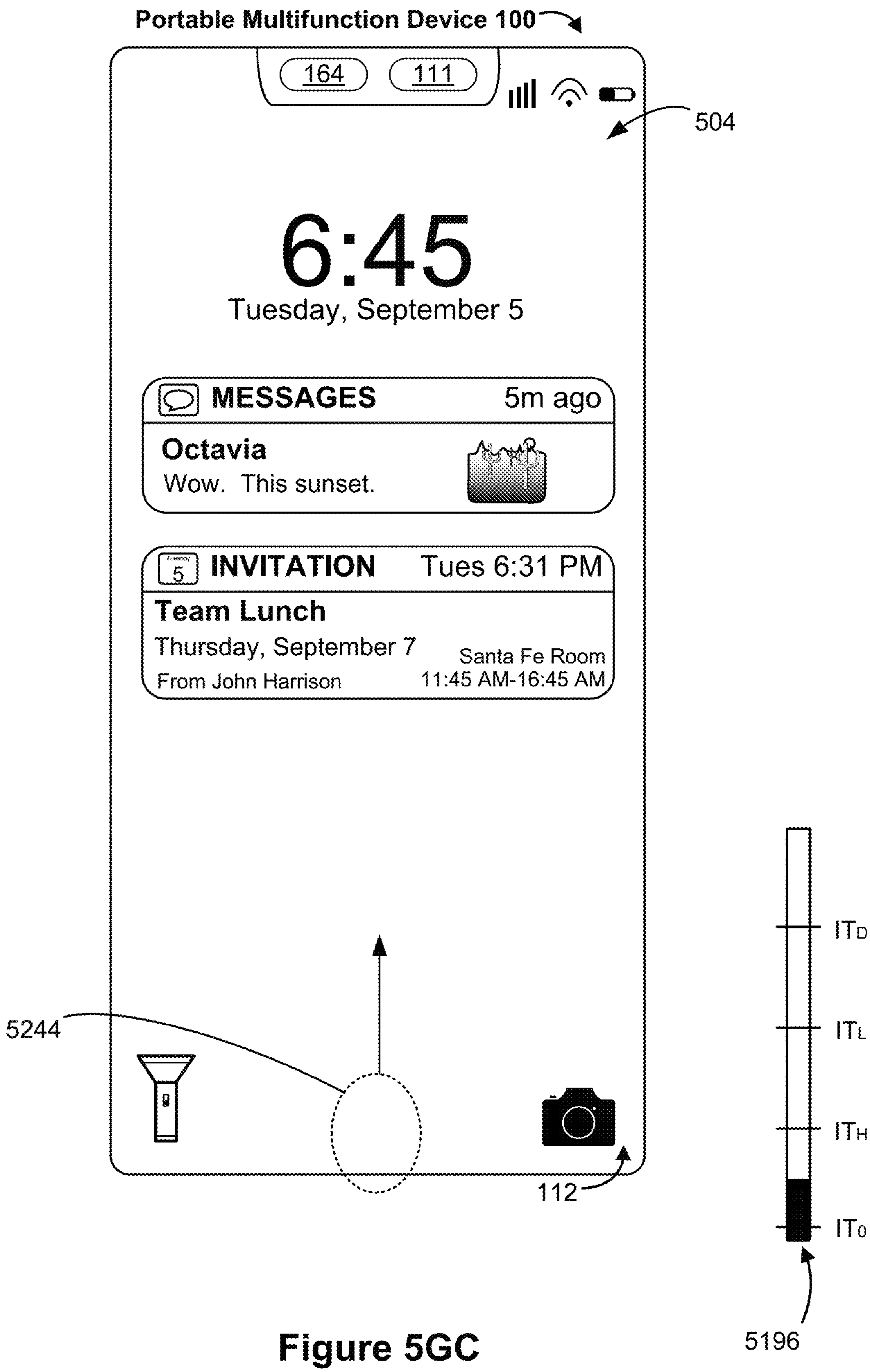
Figure 5G:
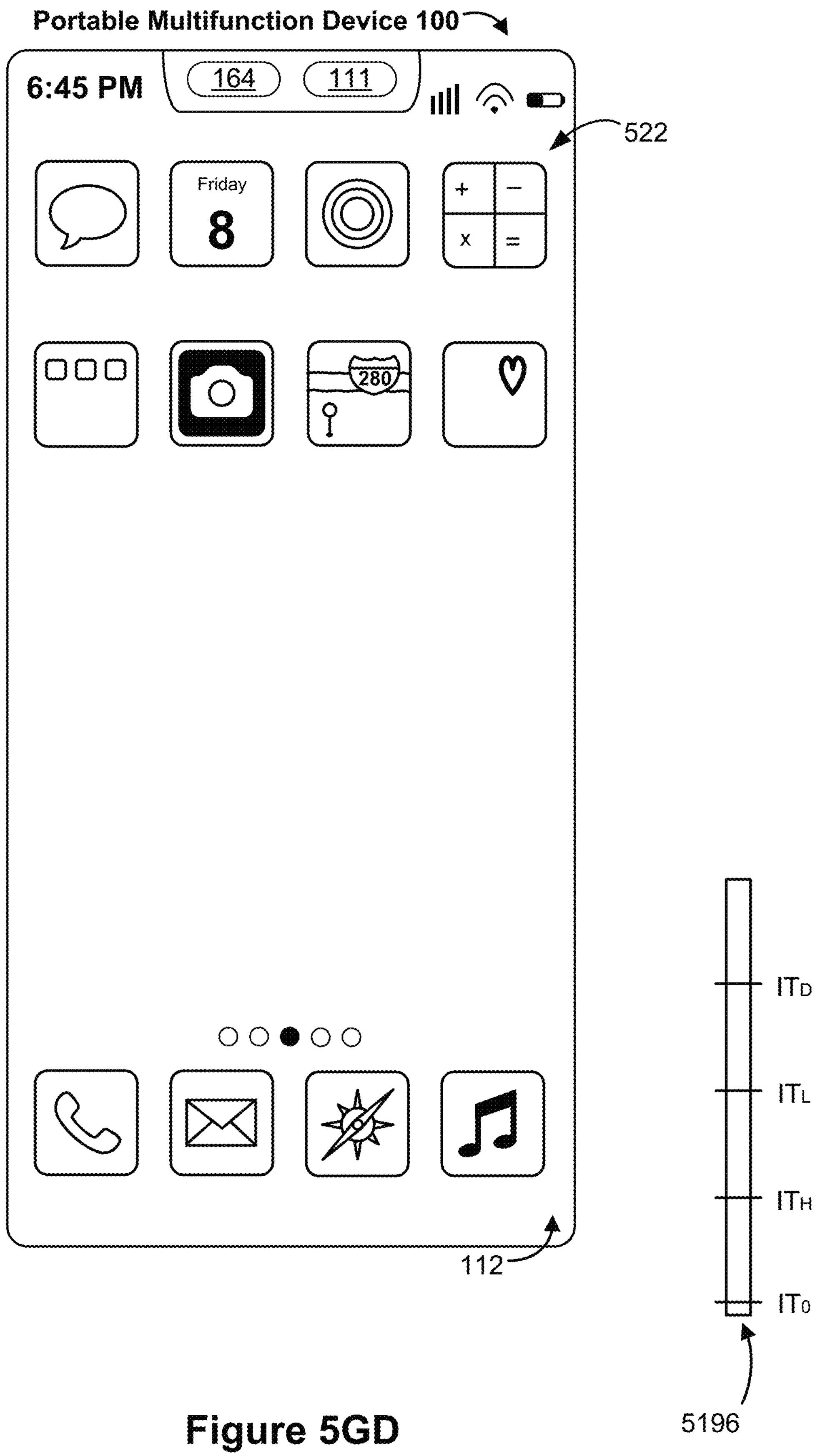
Figure 5G:
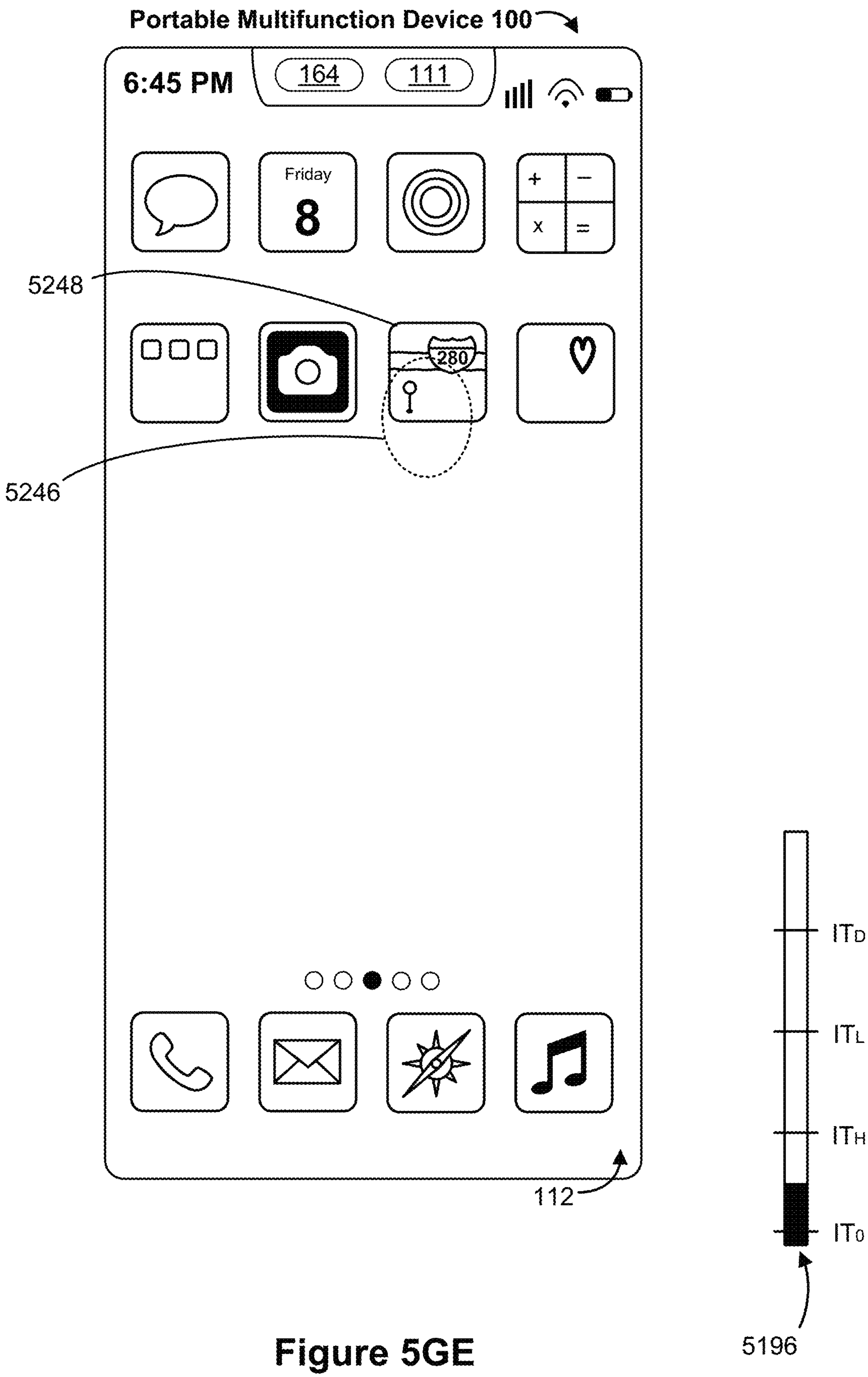
Figure 5G:
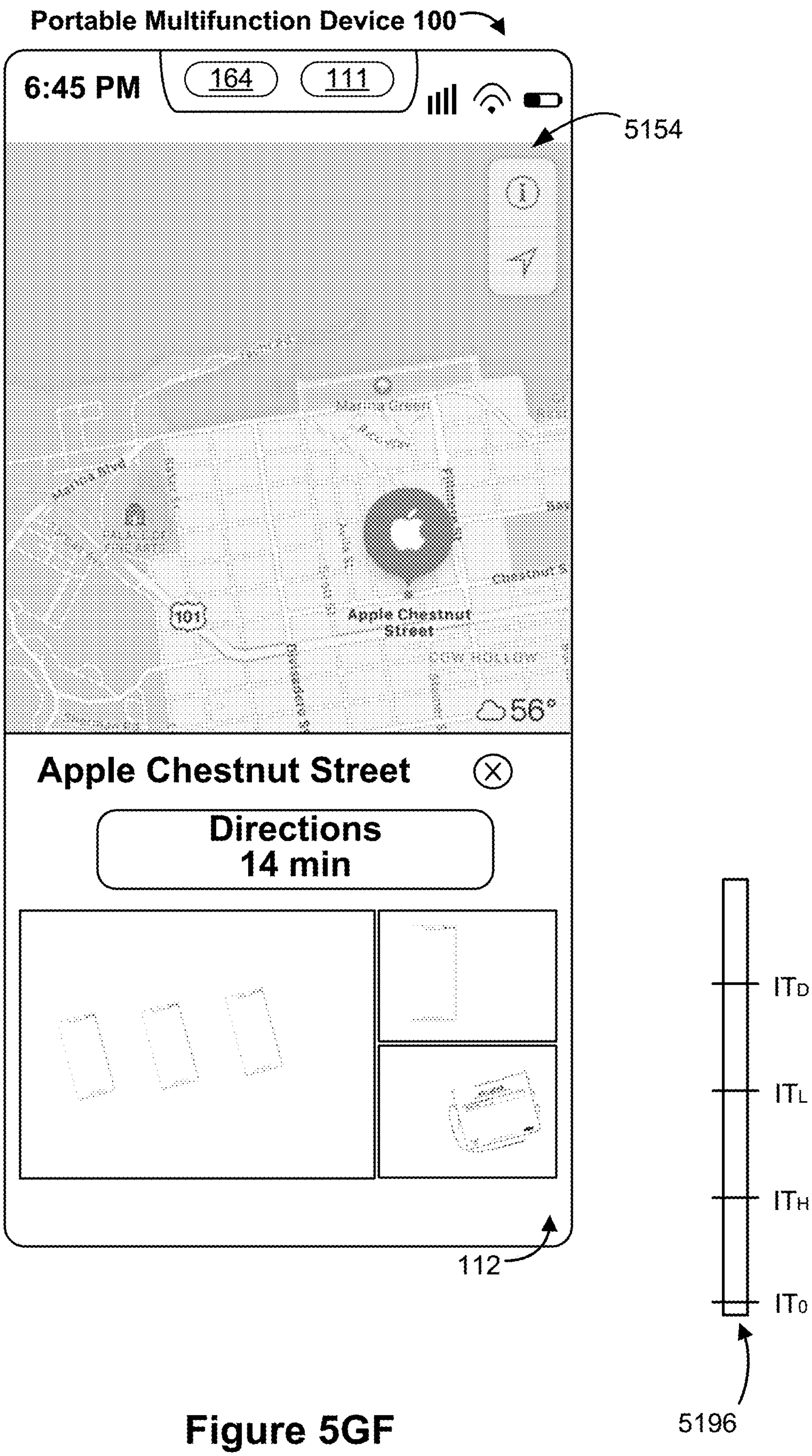
Figure 5G:
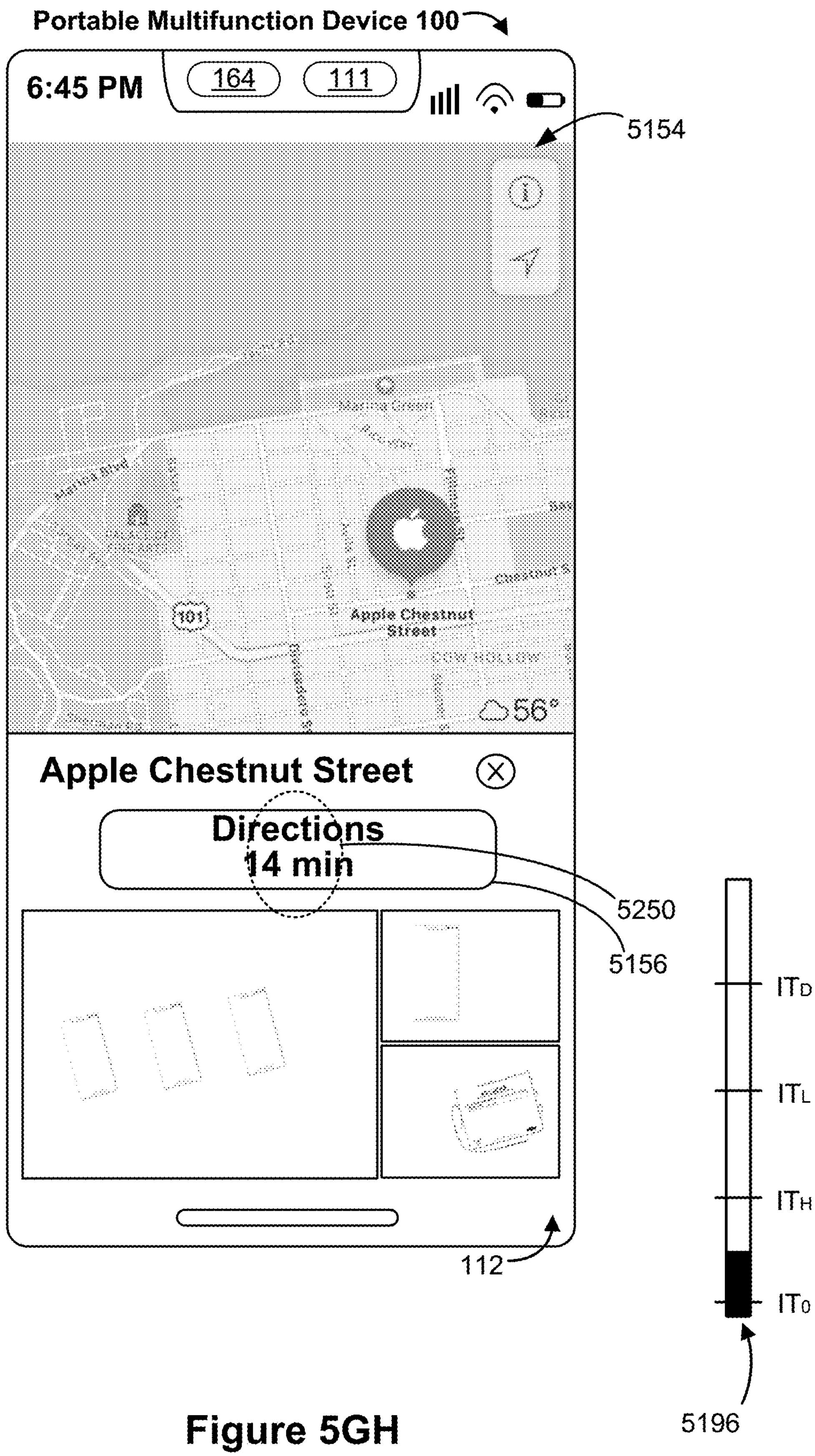
Figure 5G:
Figure 5G:
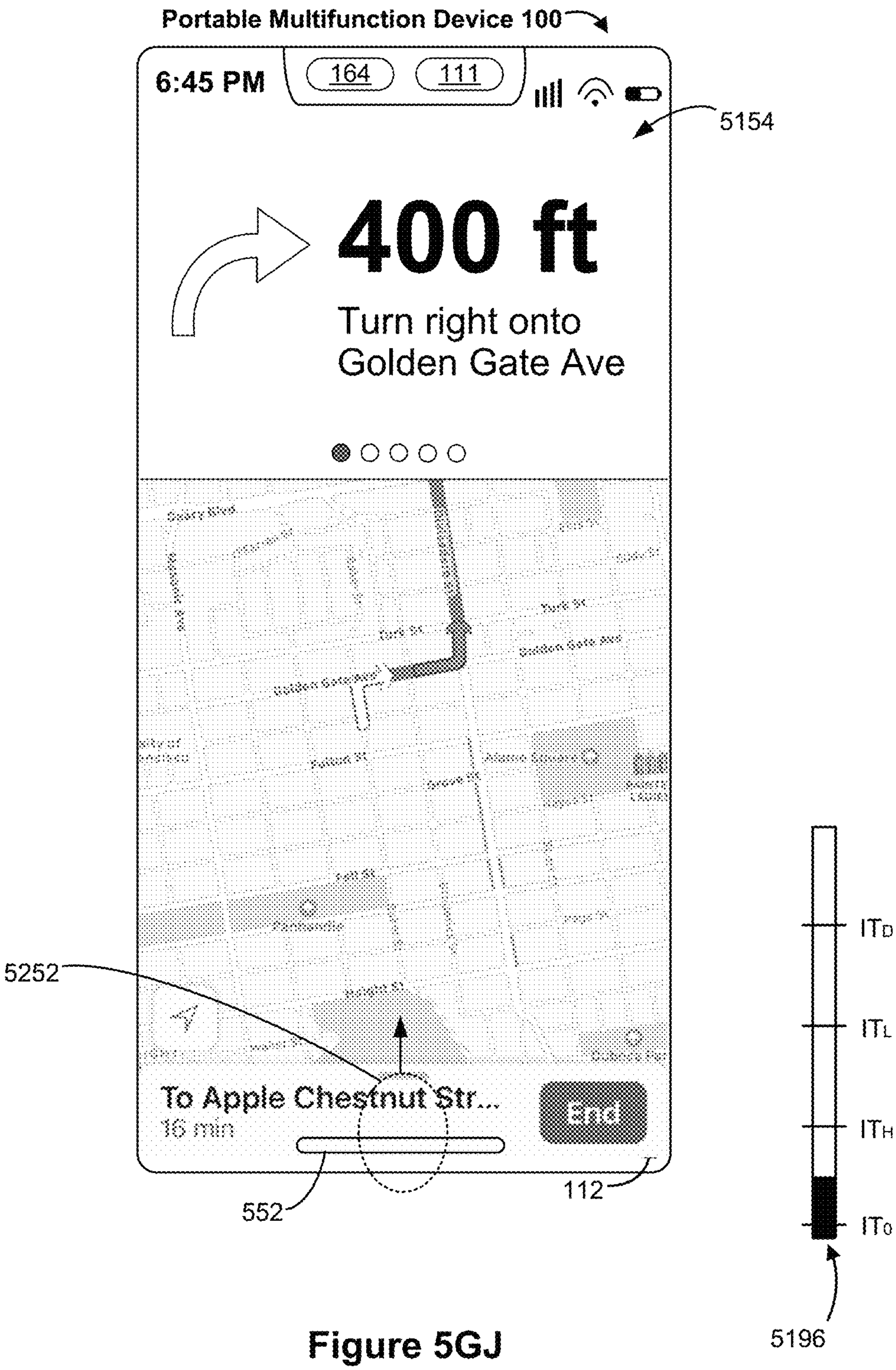
Figure 5G:
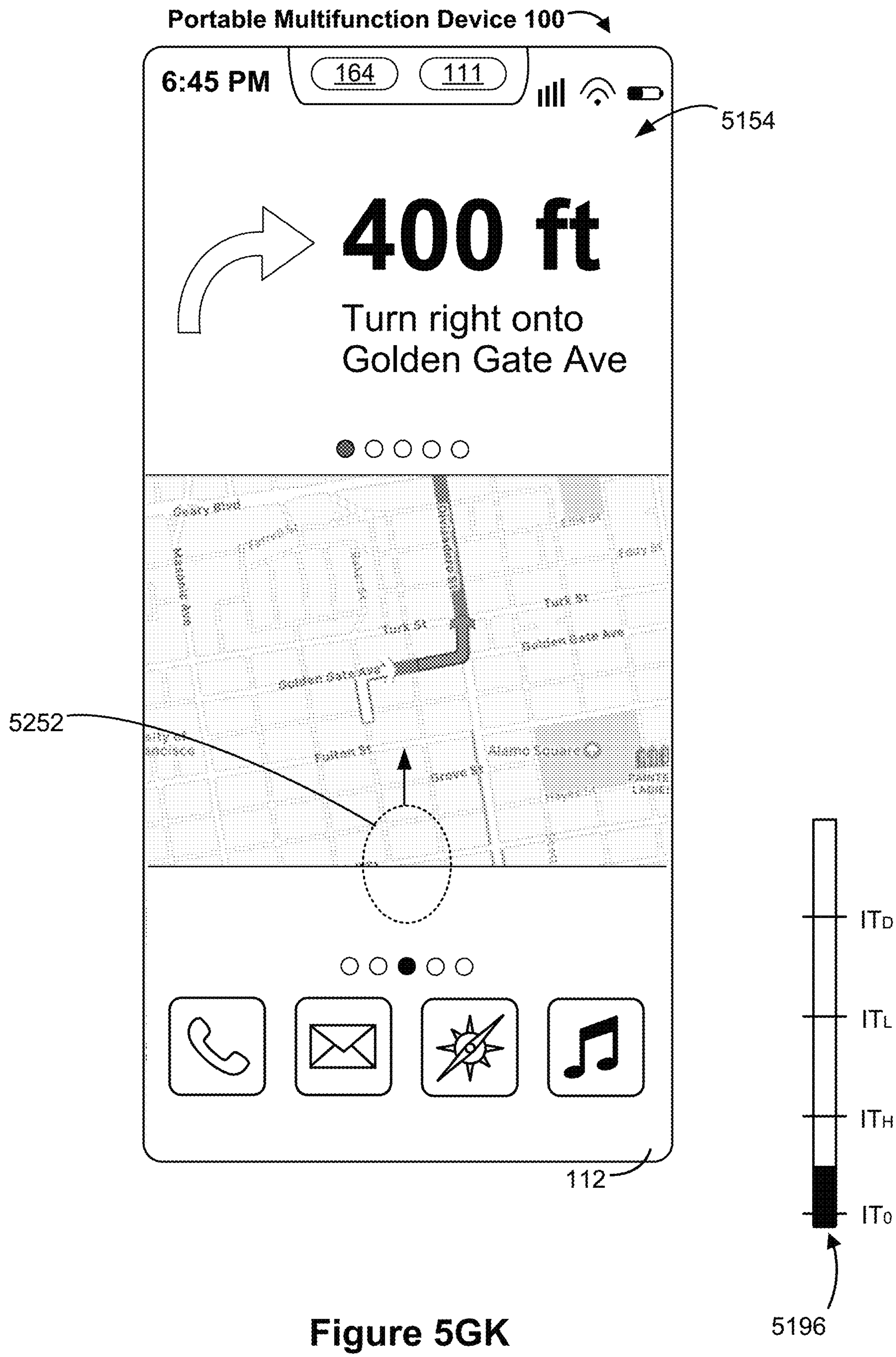
Figure 5G:
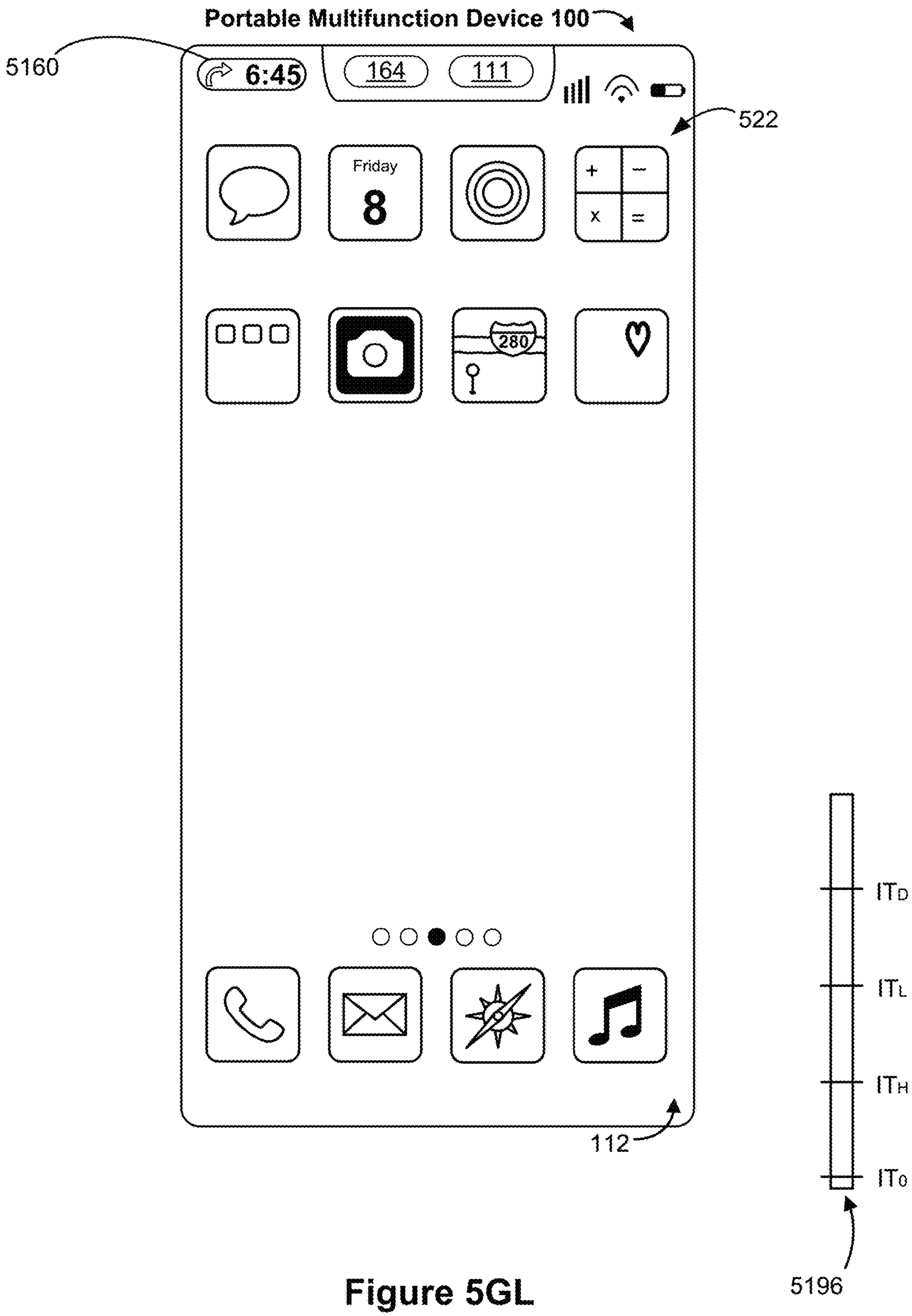
Figure 5G:
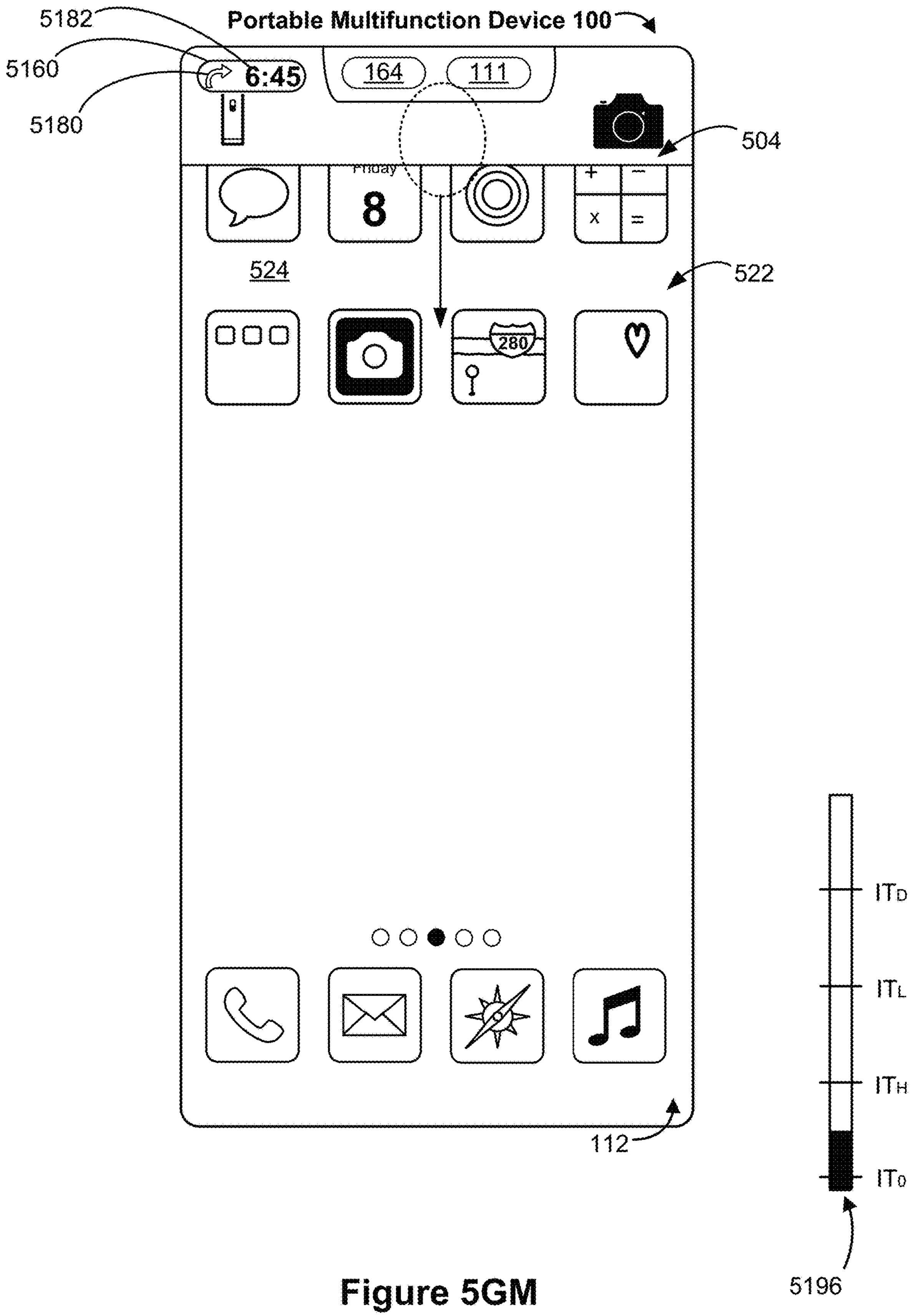
Figure 5G:
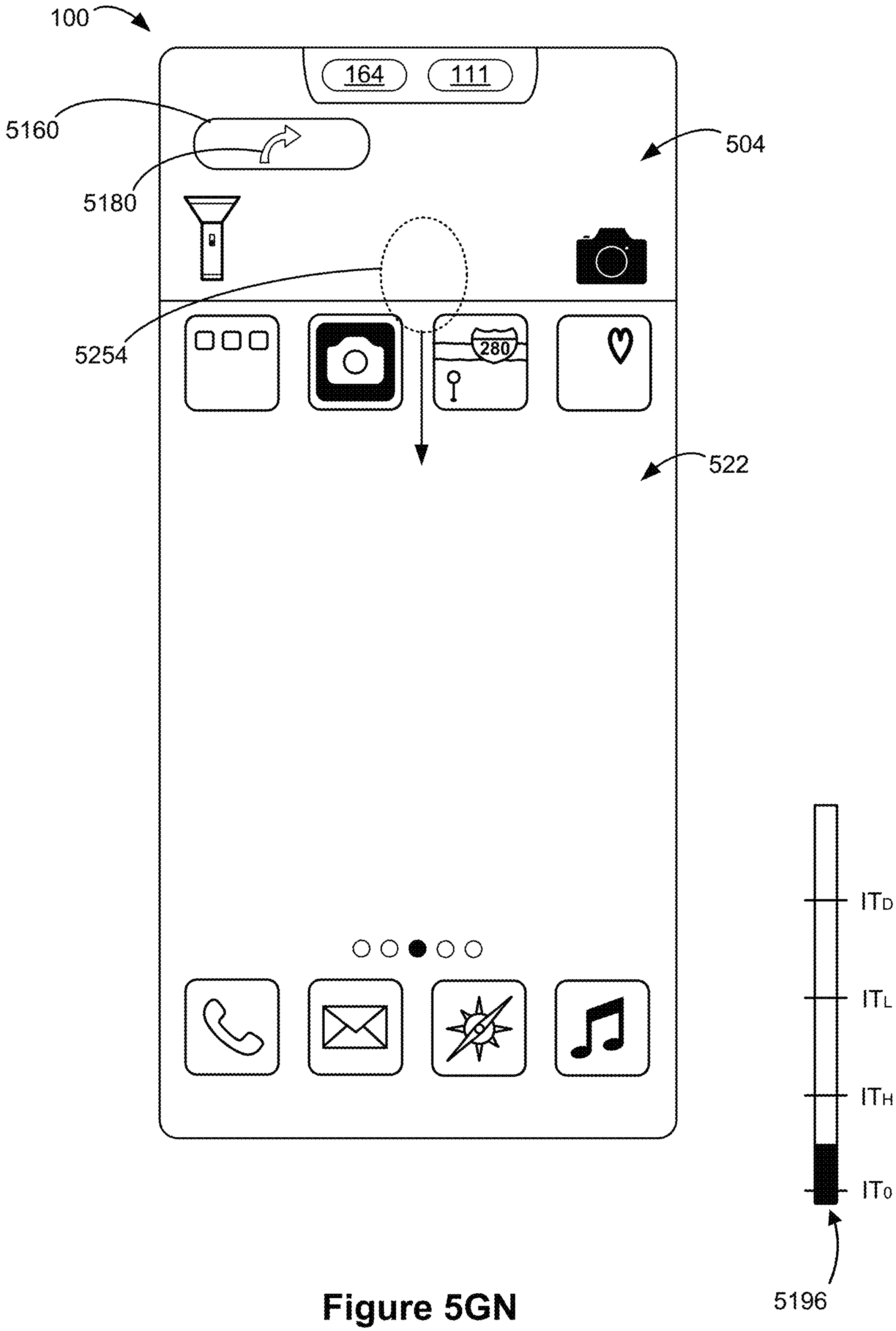
Figure 5G:
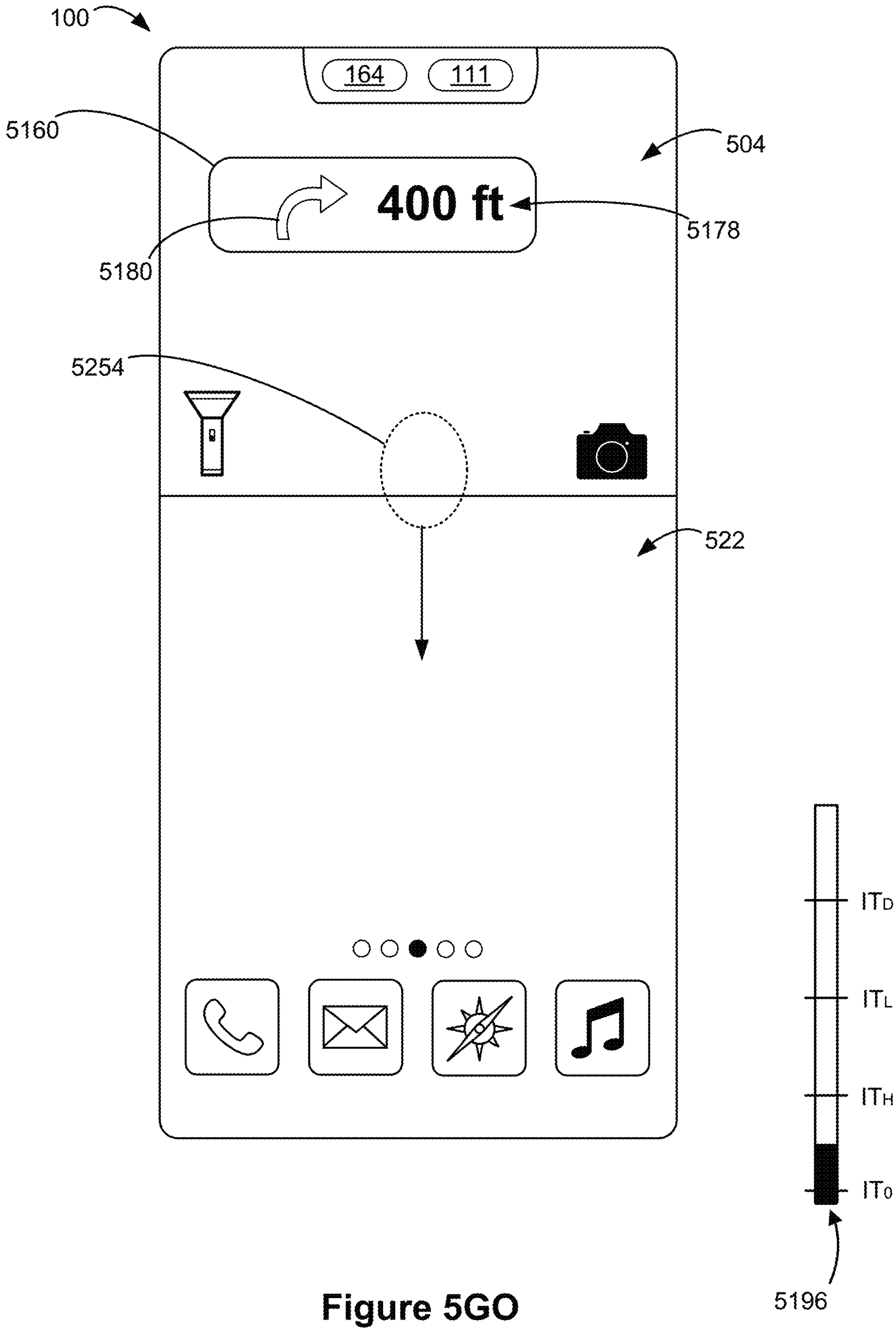
Figure 5G:
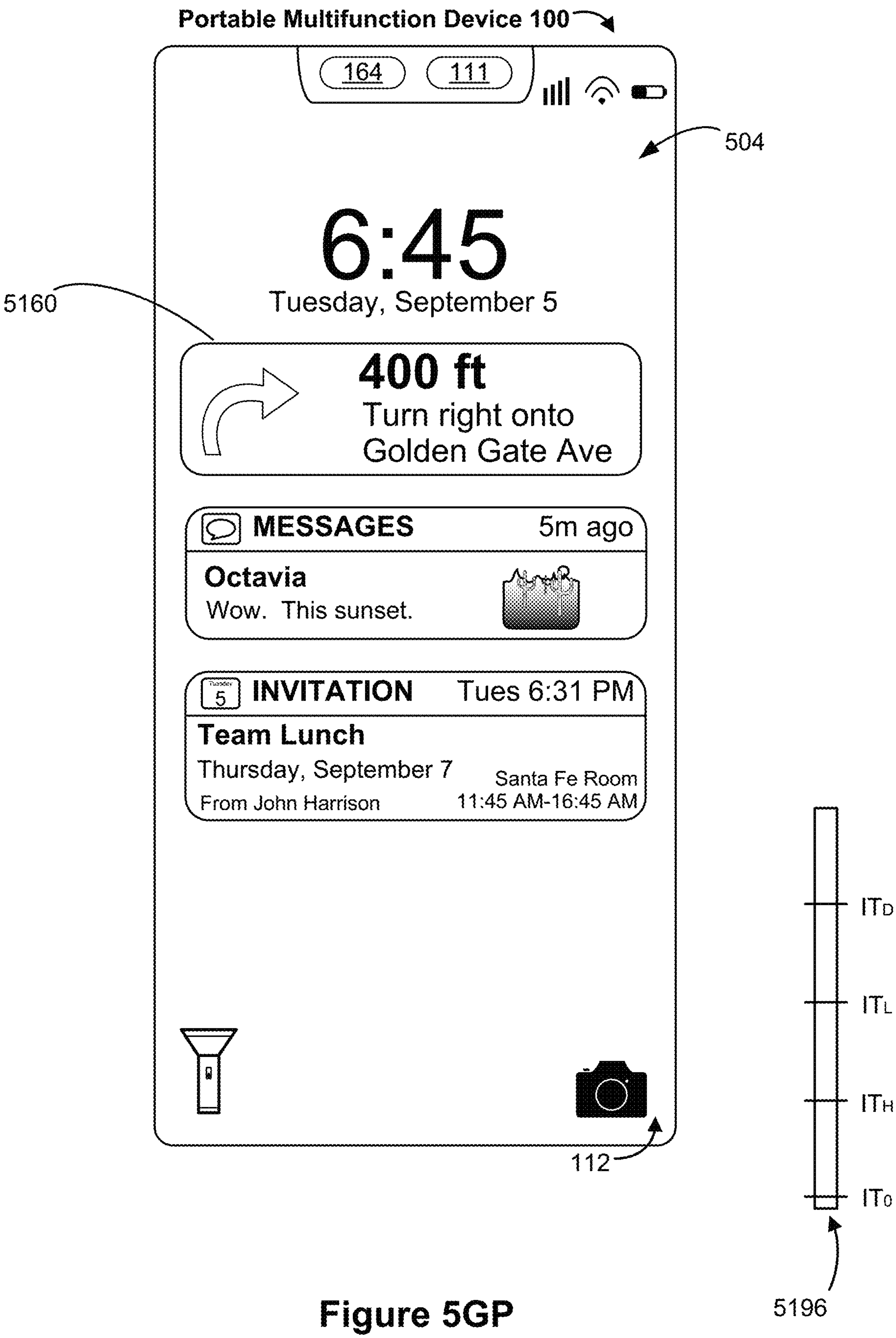
Figure 5G:
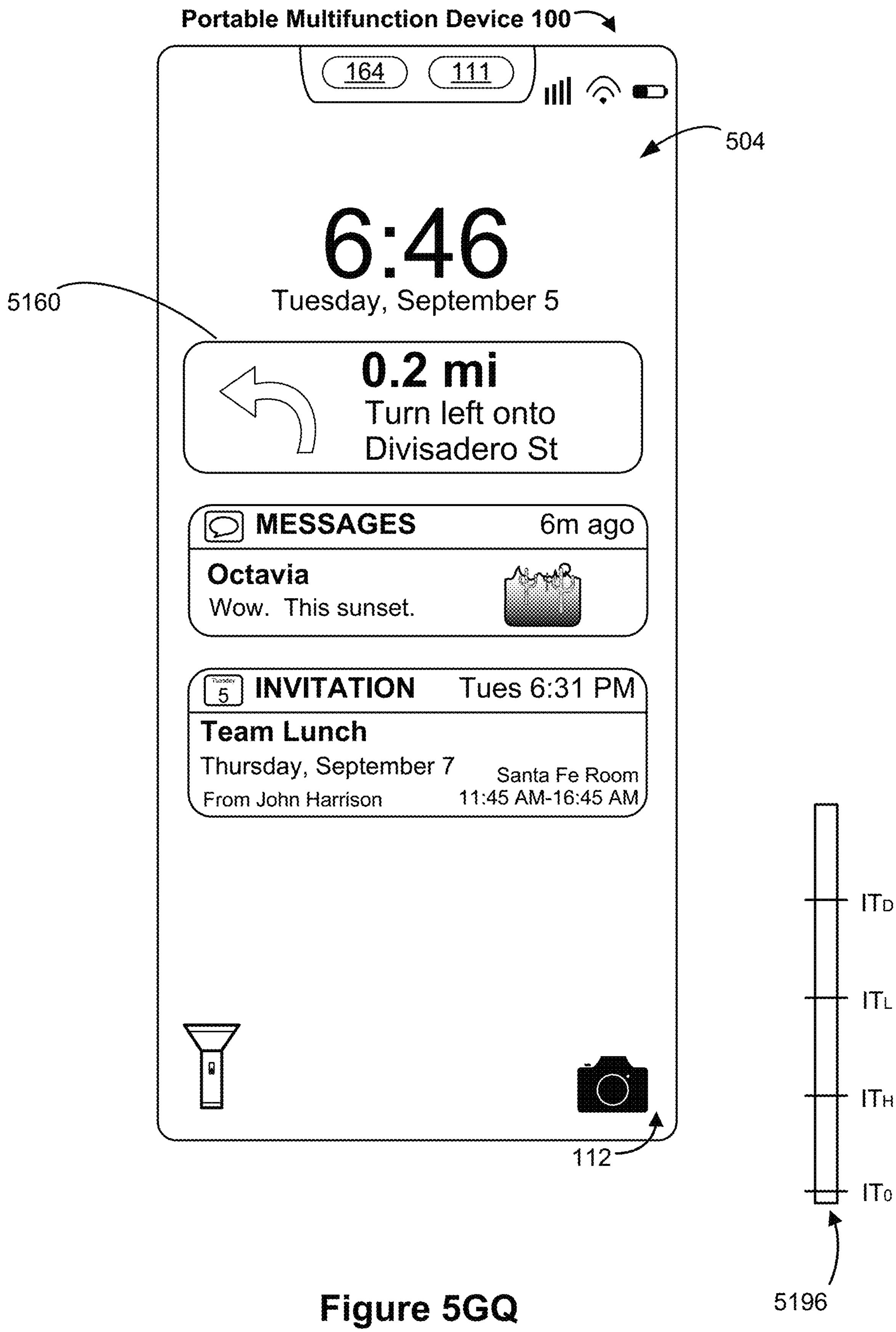
Figure 5G:
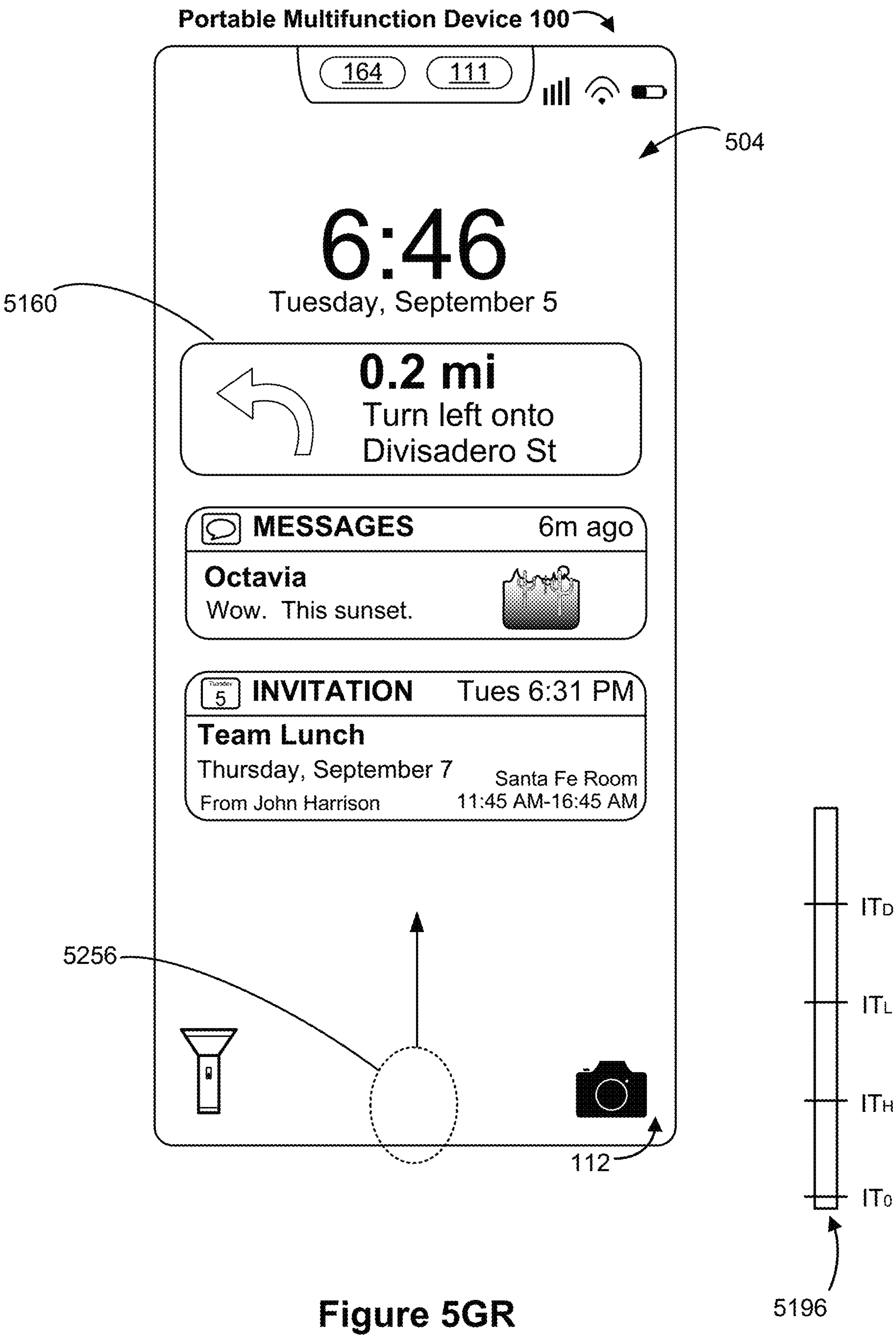
Figure 5G:
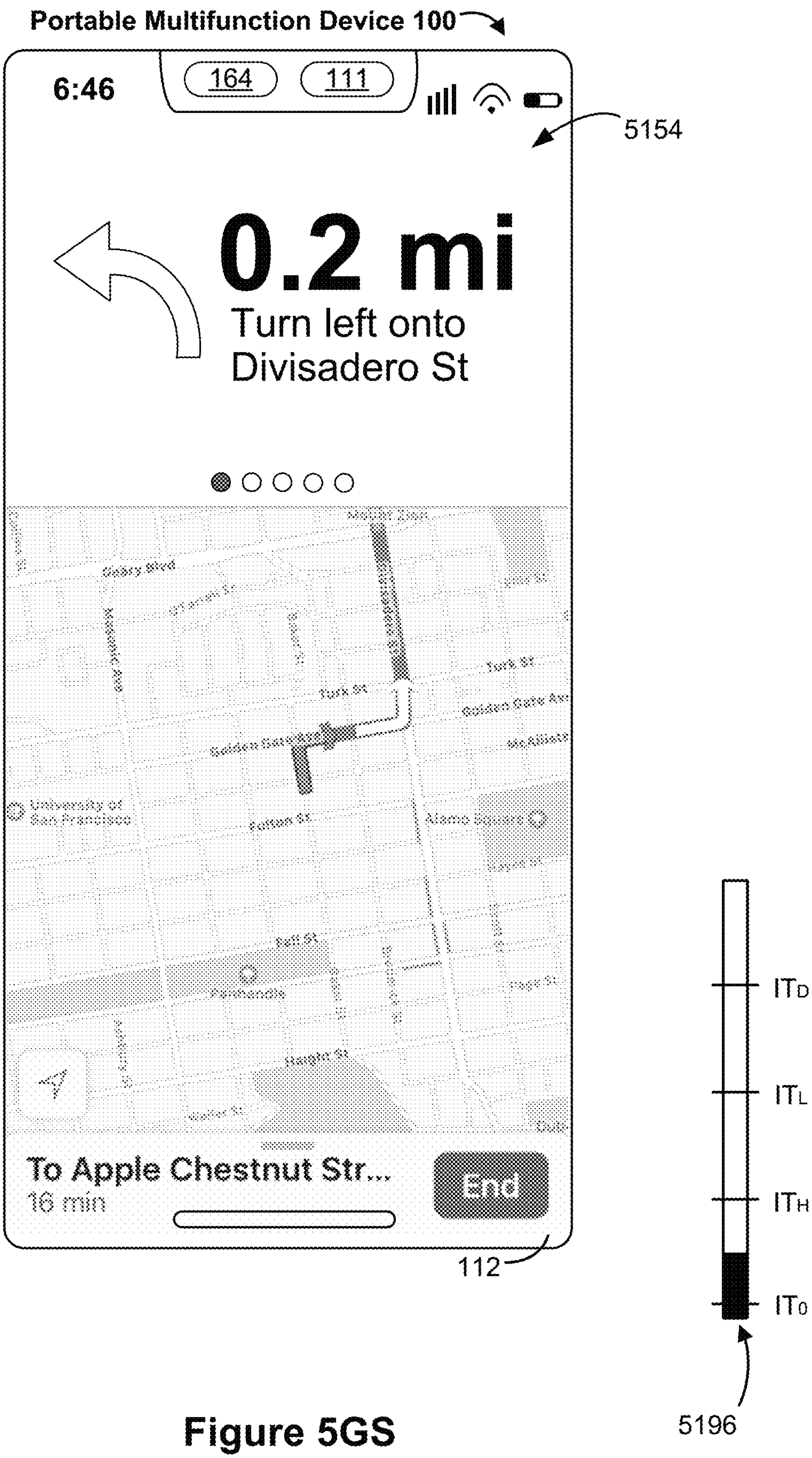
Figure 5G:
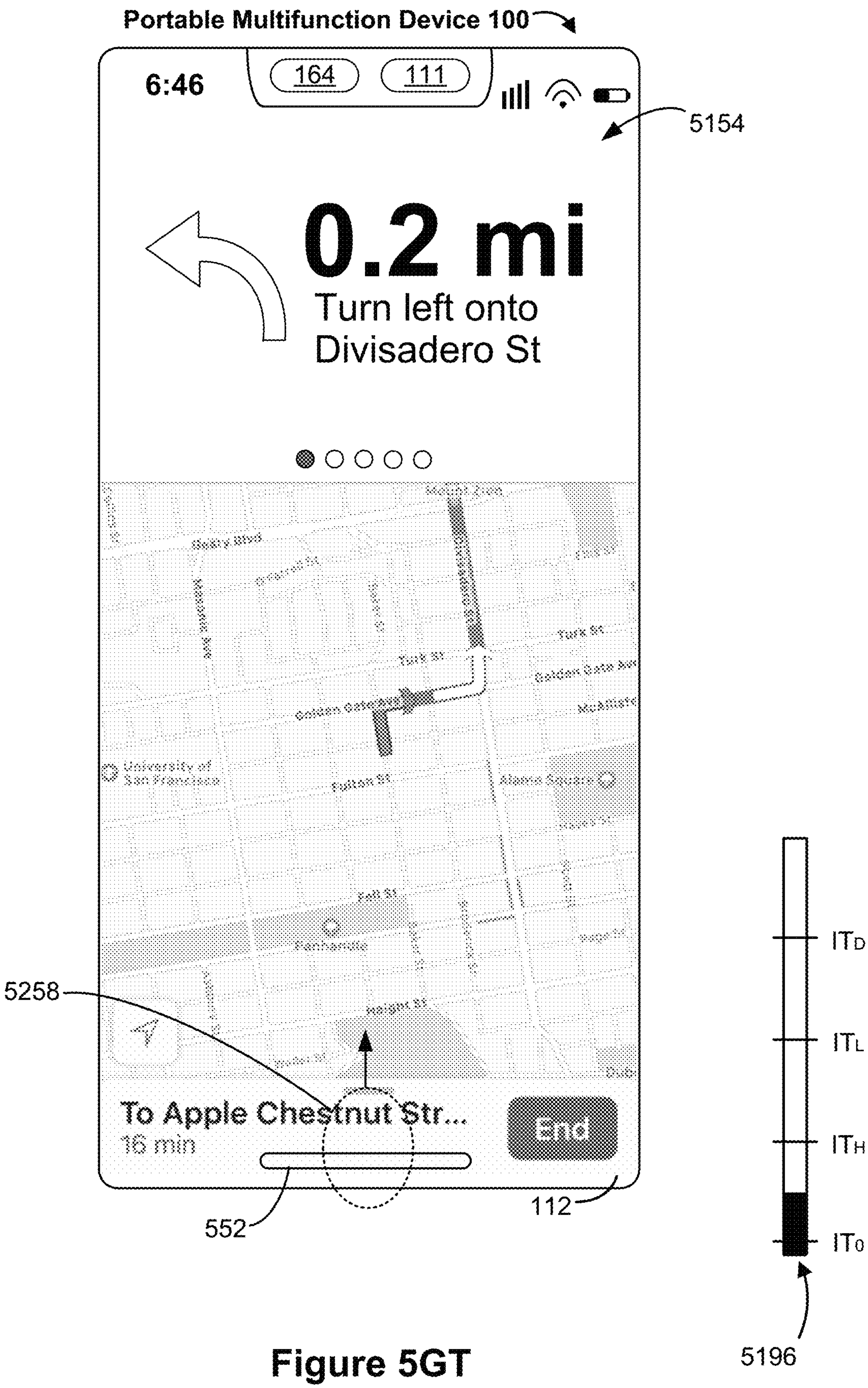
Figure 5G:
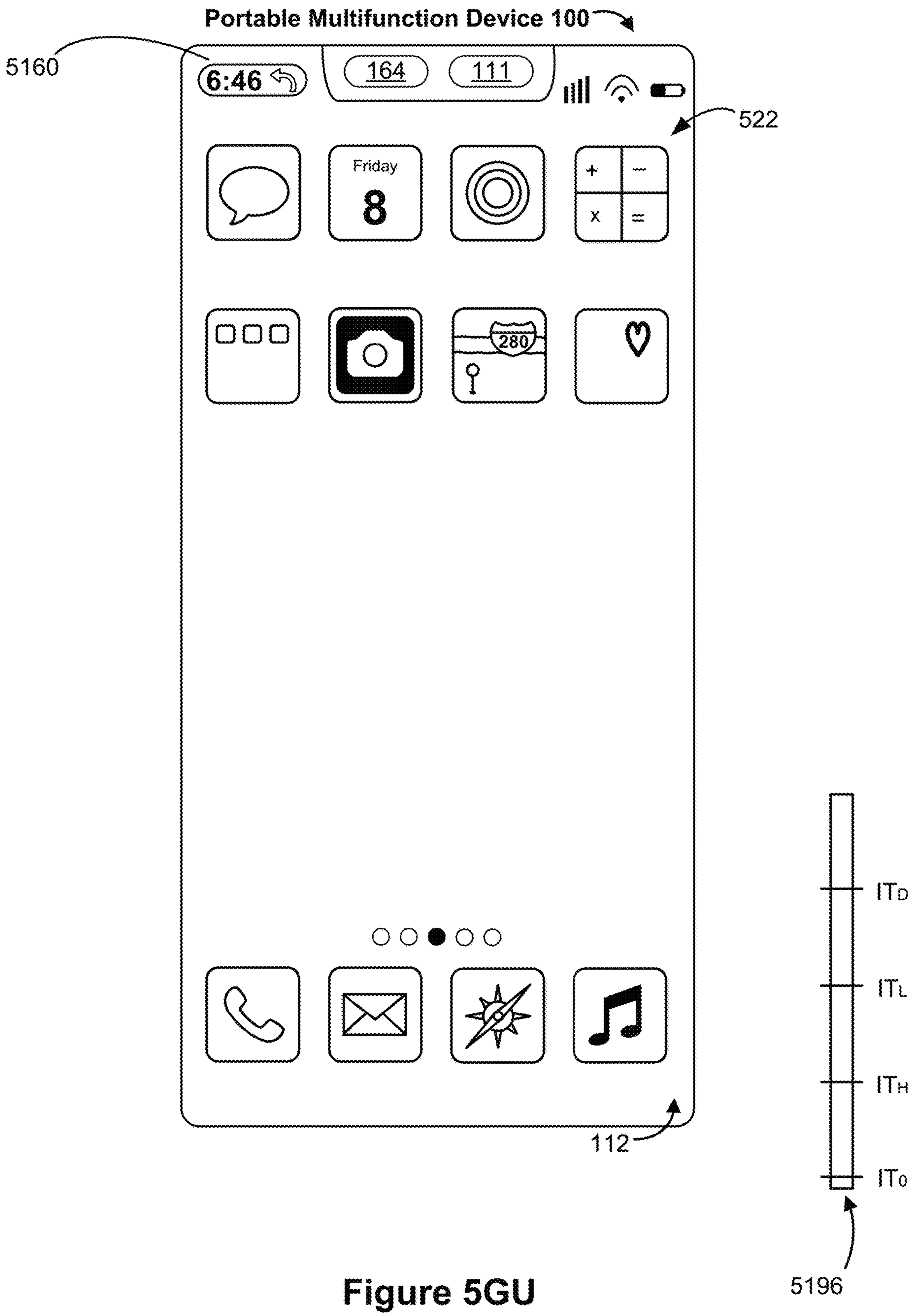
Figure 5G:
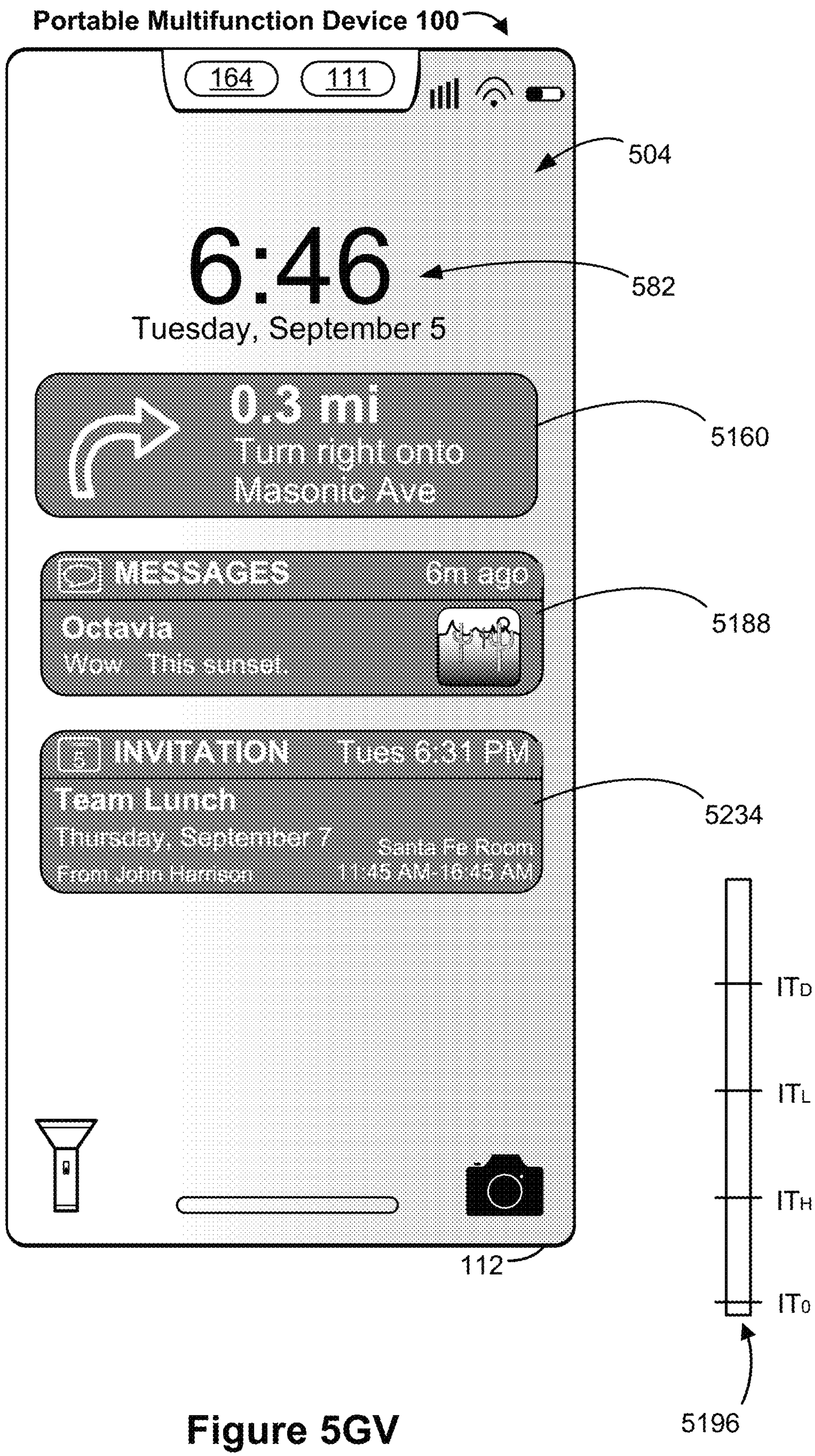
Figure 5G:
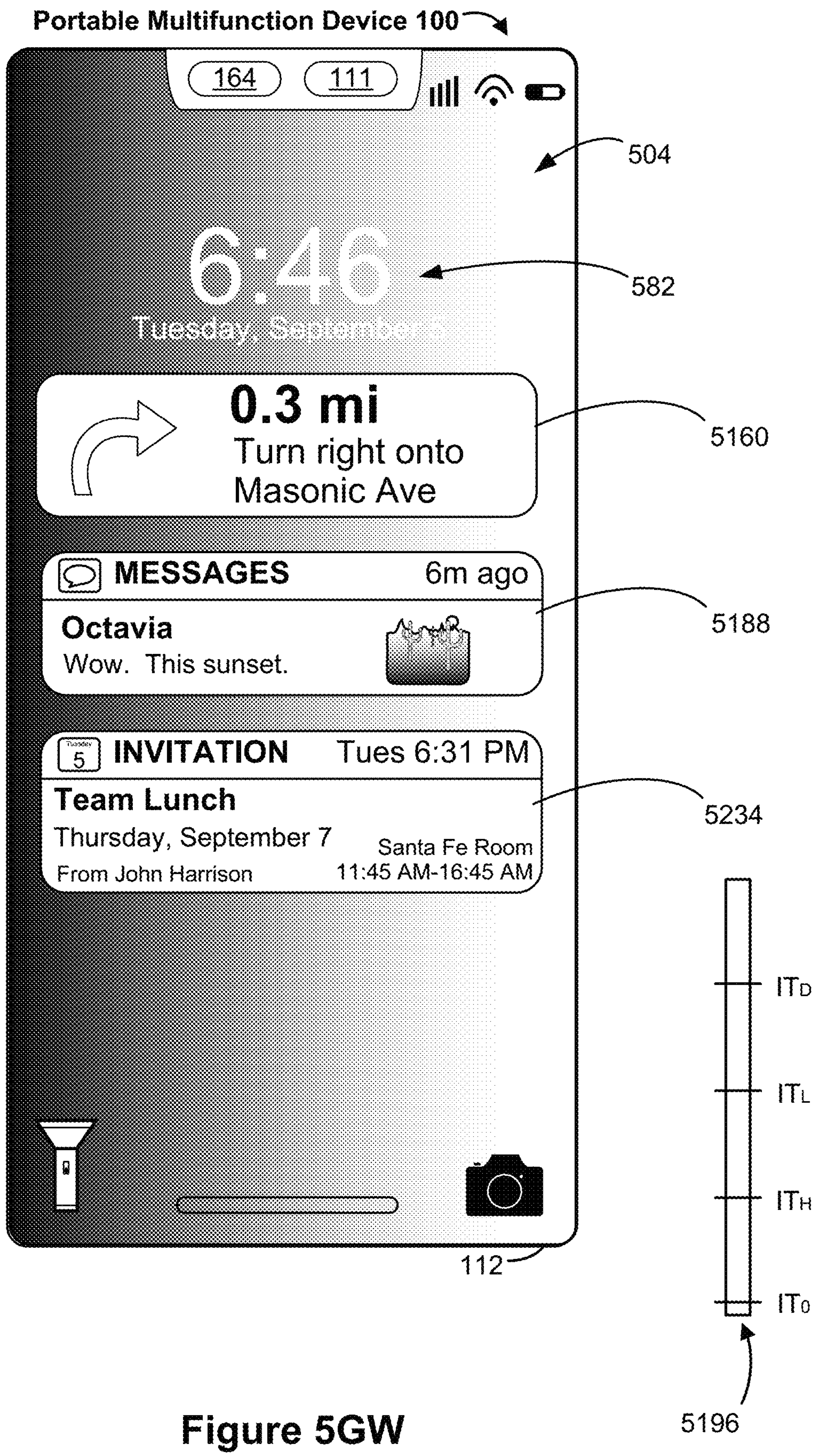
Figure 5G:
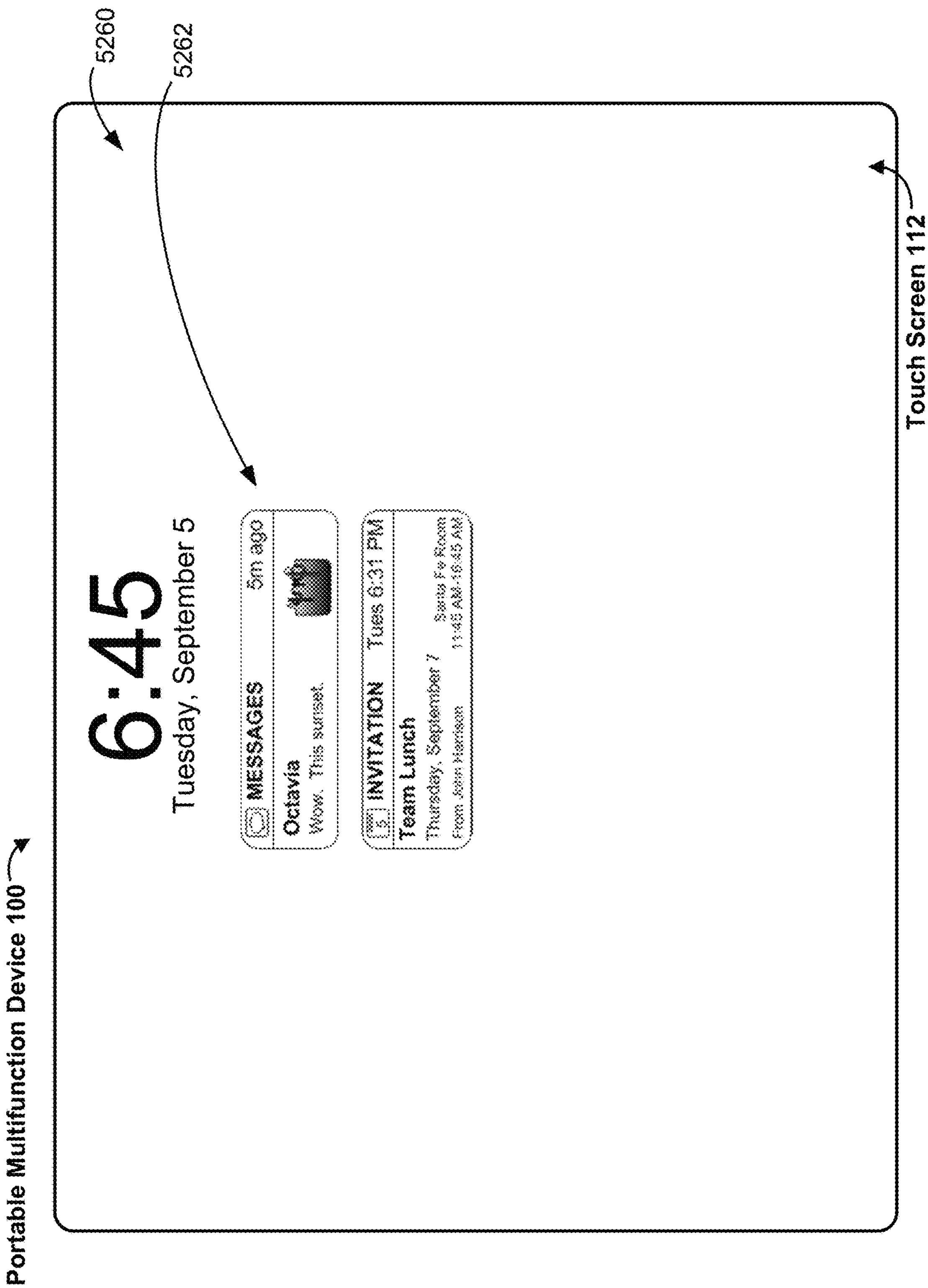
Figure 5G:
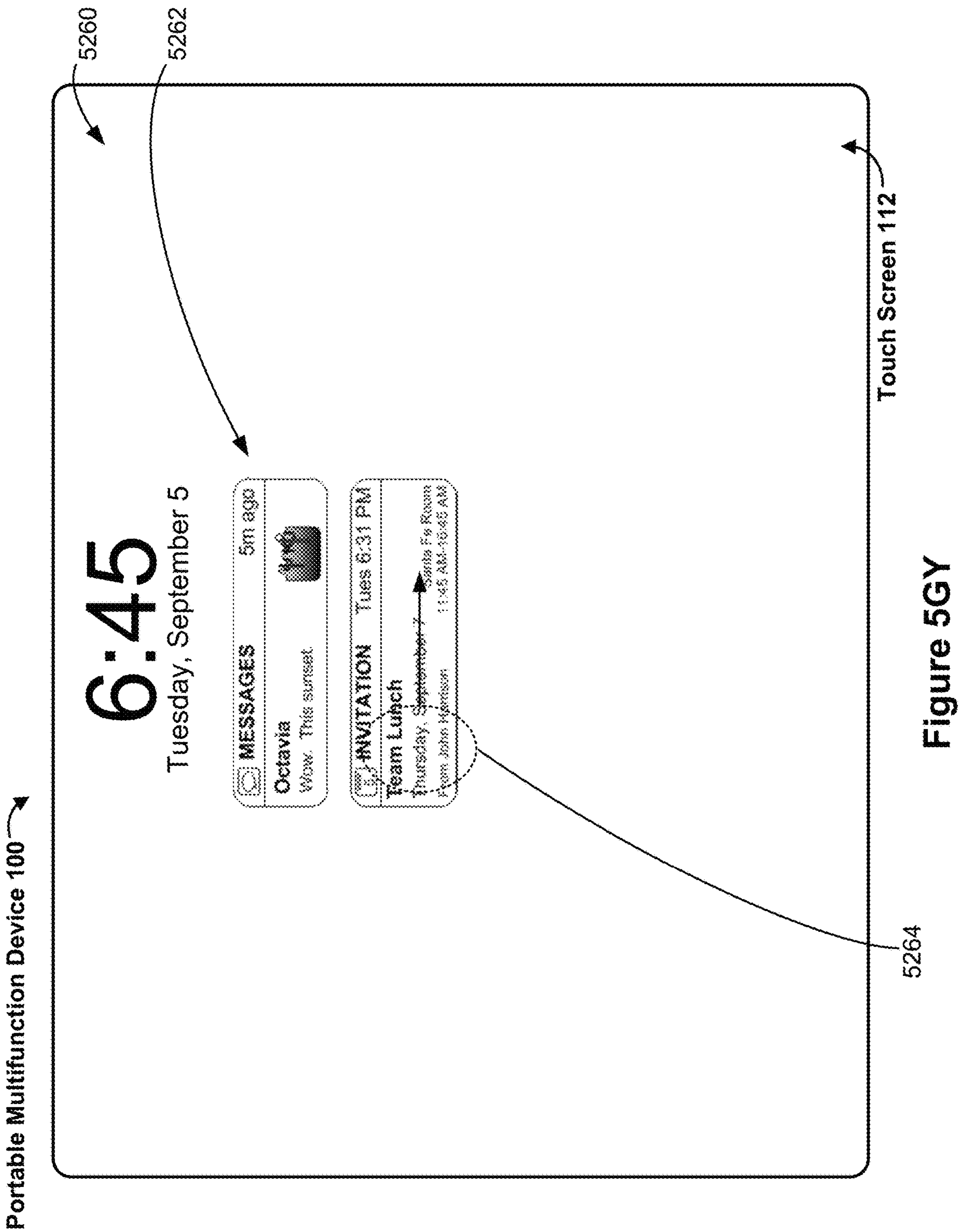
Figure 5G:
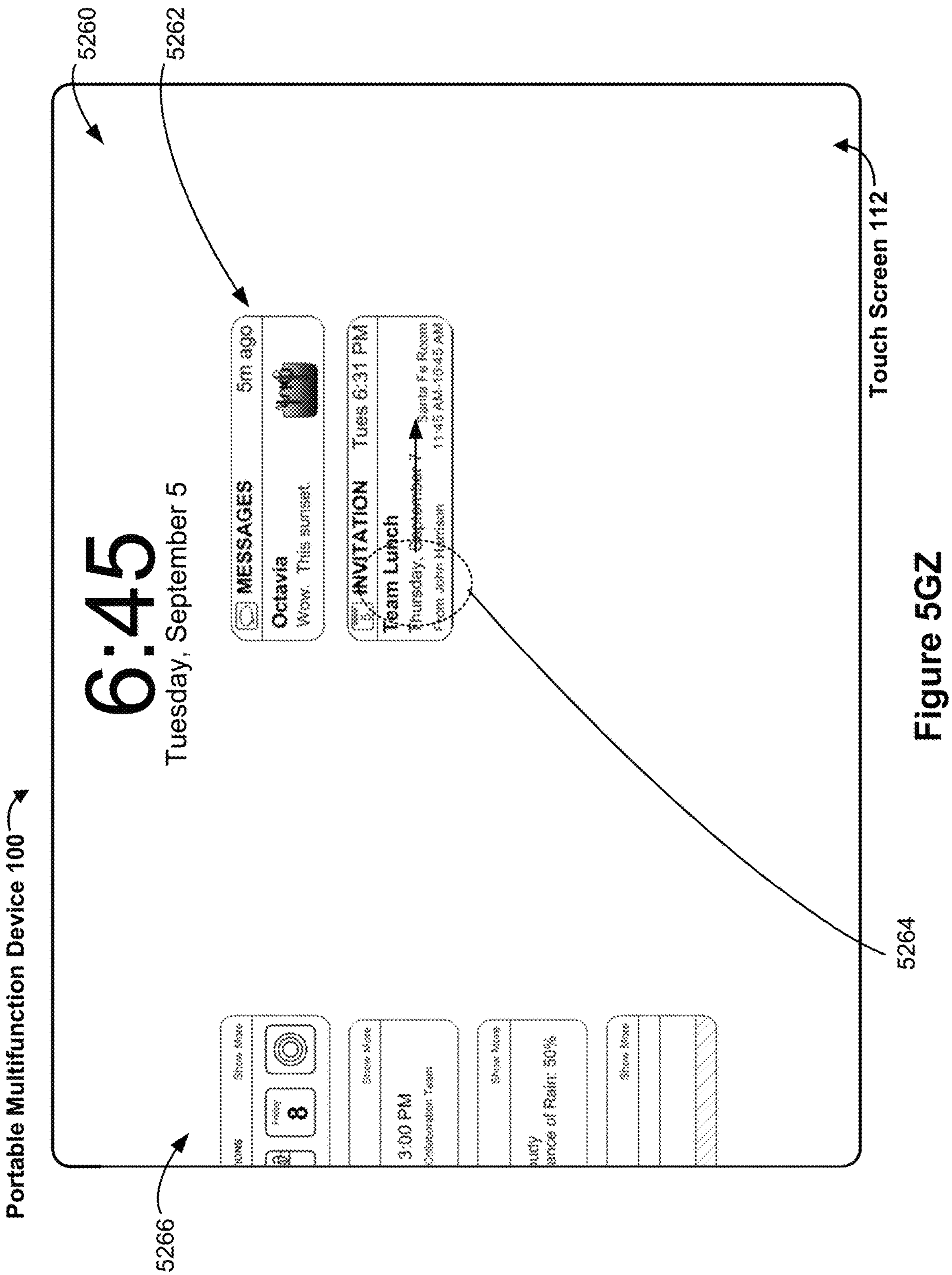
Figure 5H:
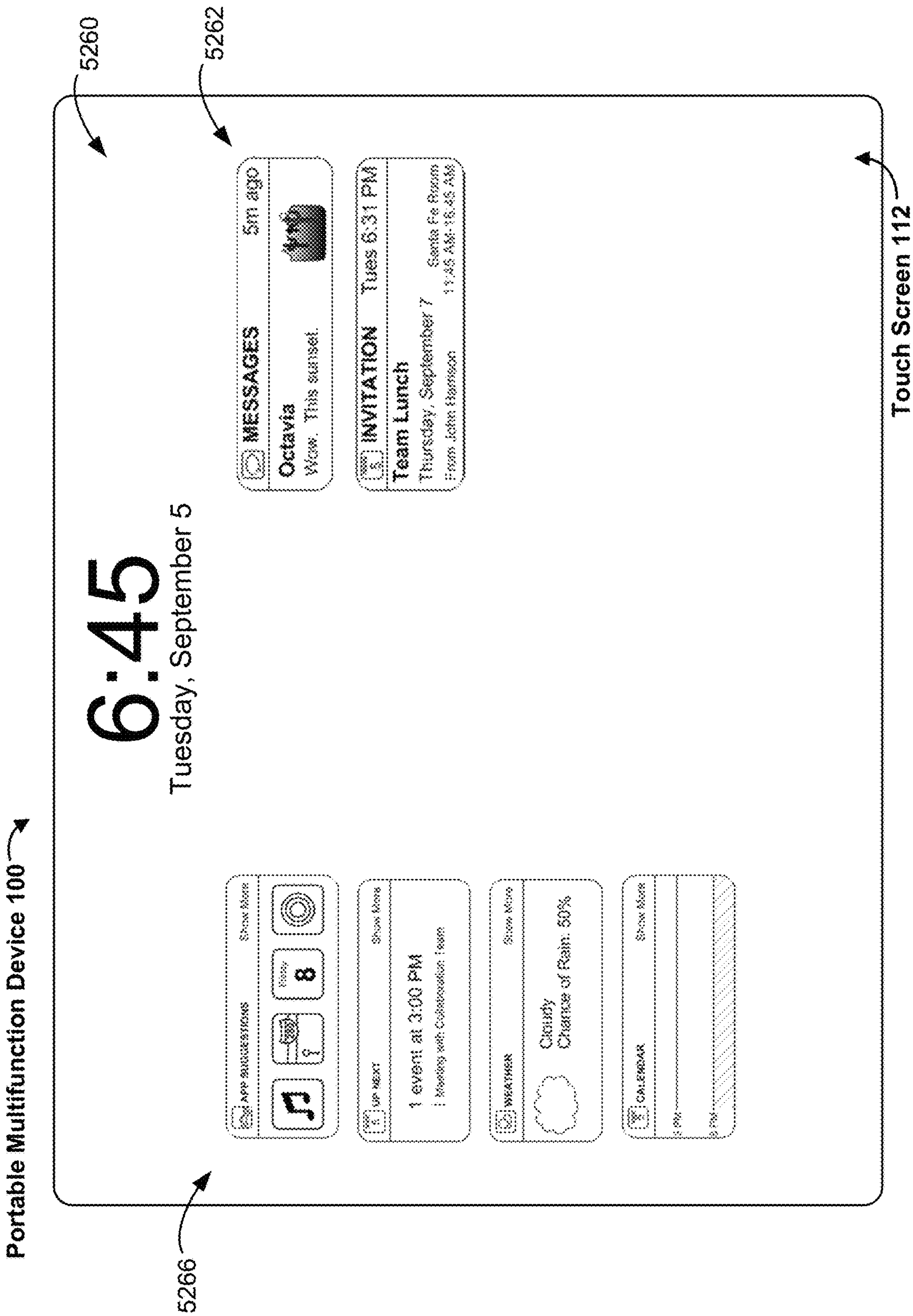
Figure 5H:
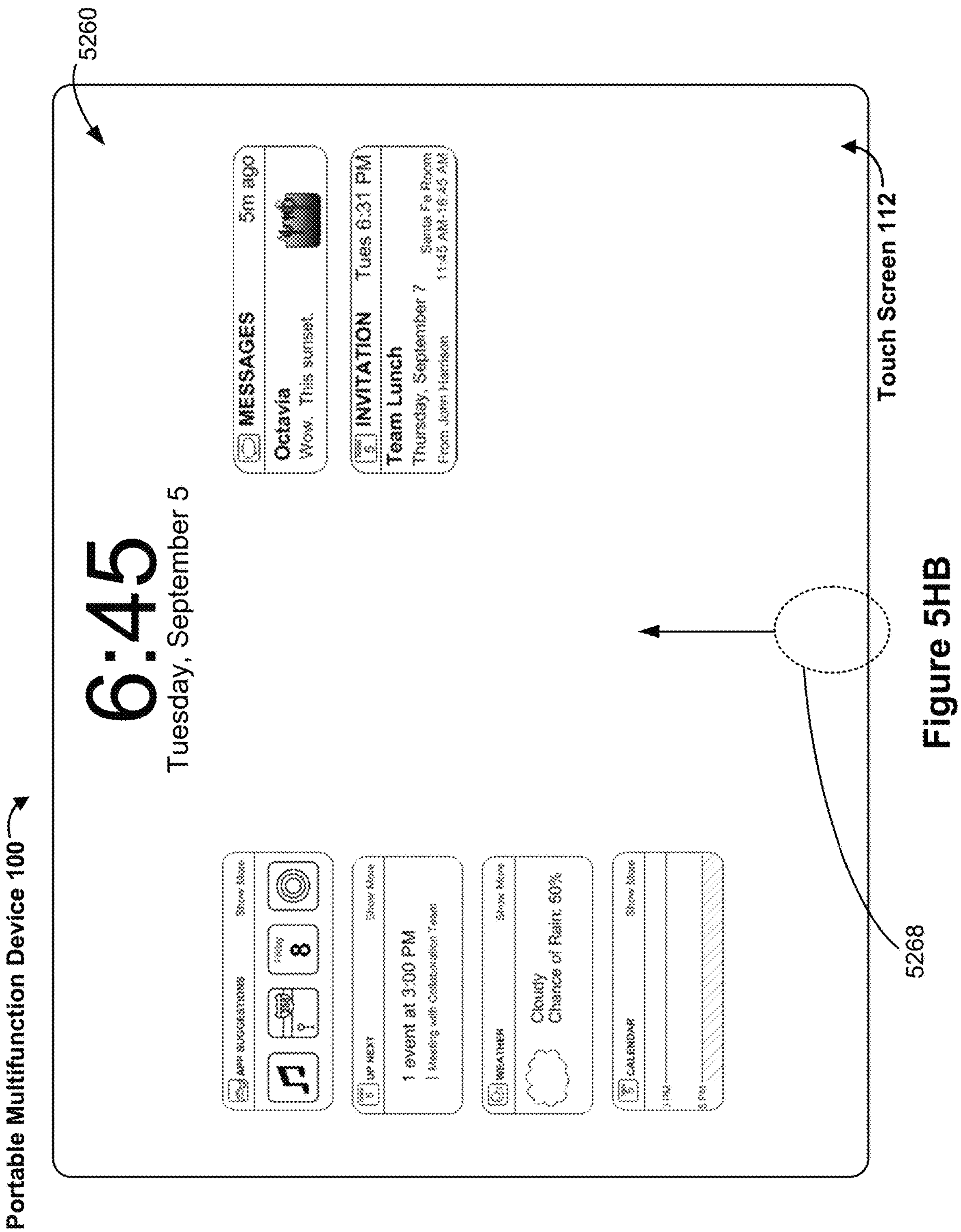
Figure 5H:
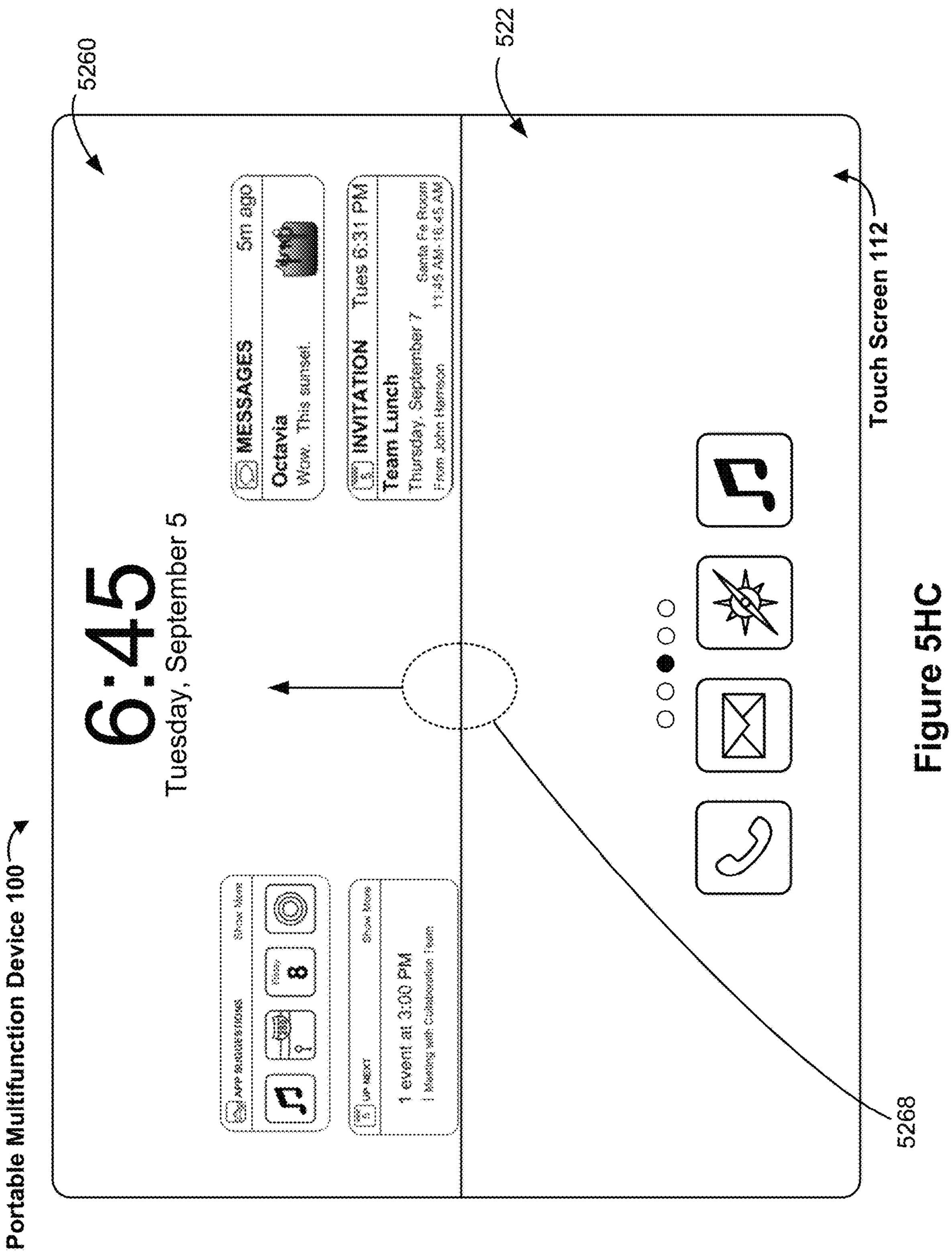
Figure 5H:
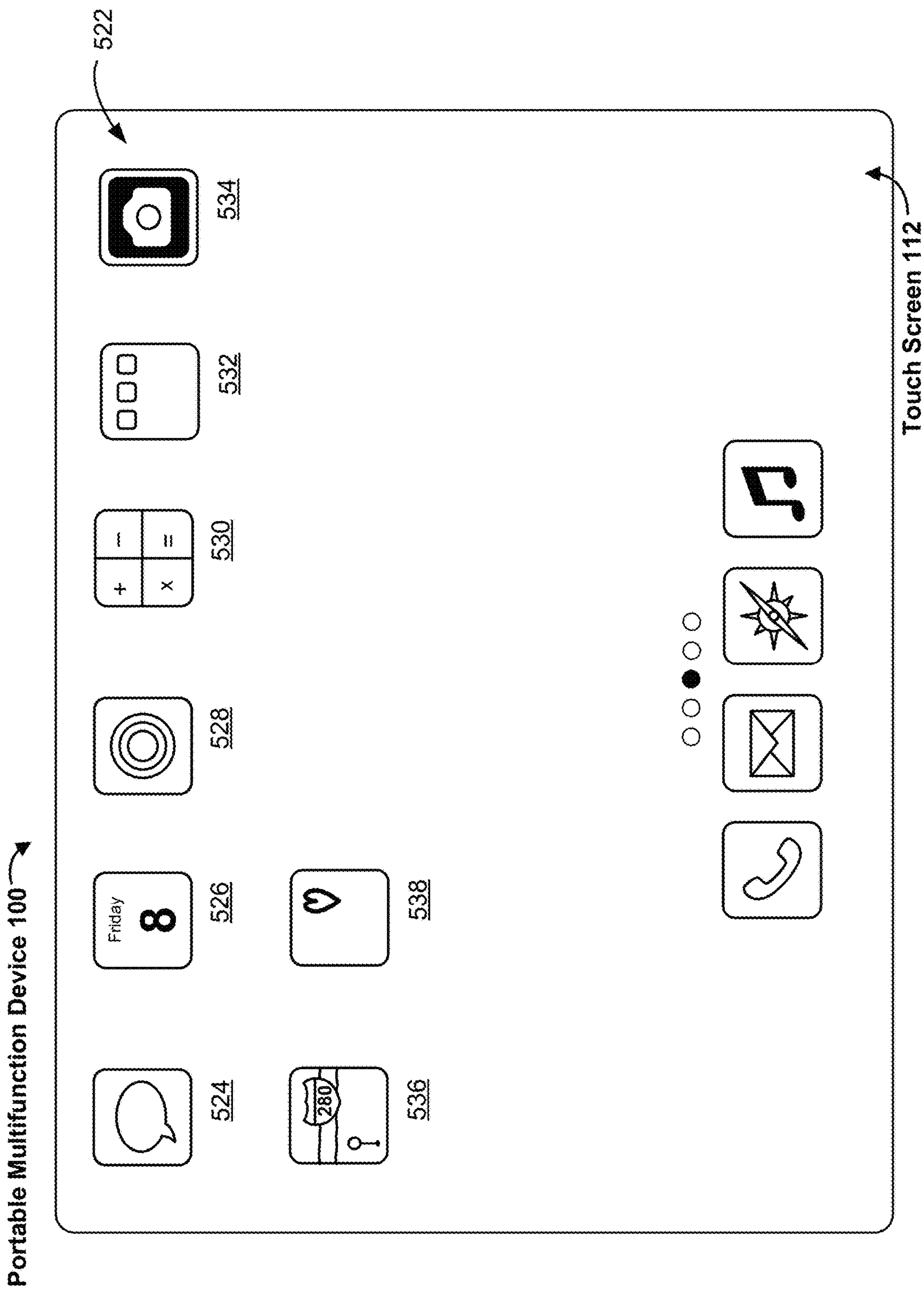
Figure 5H:
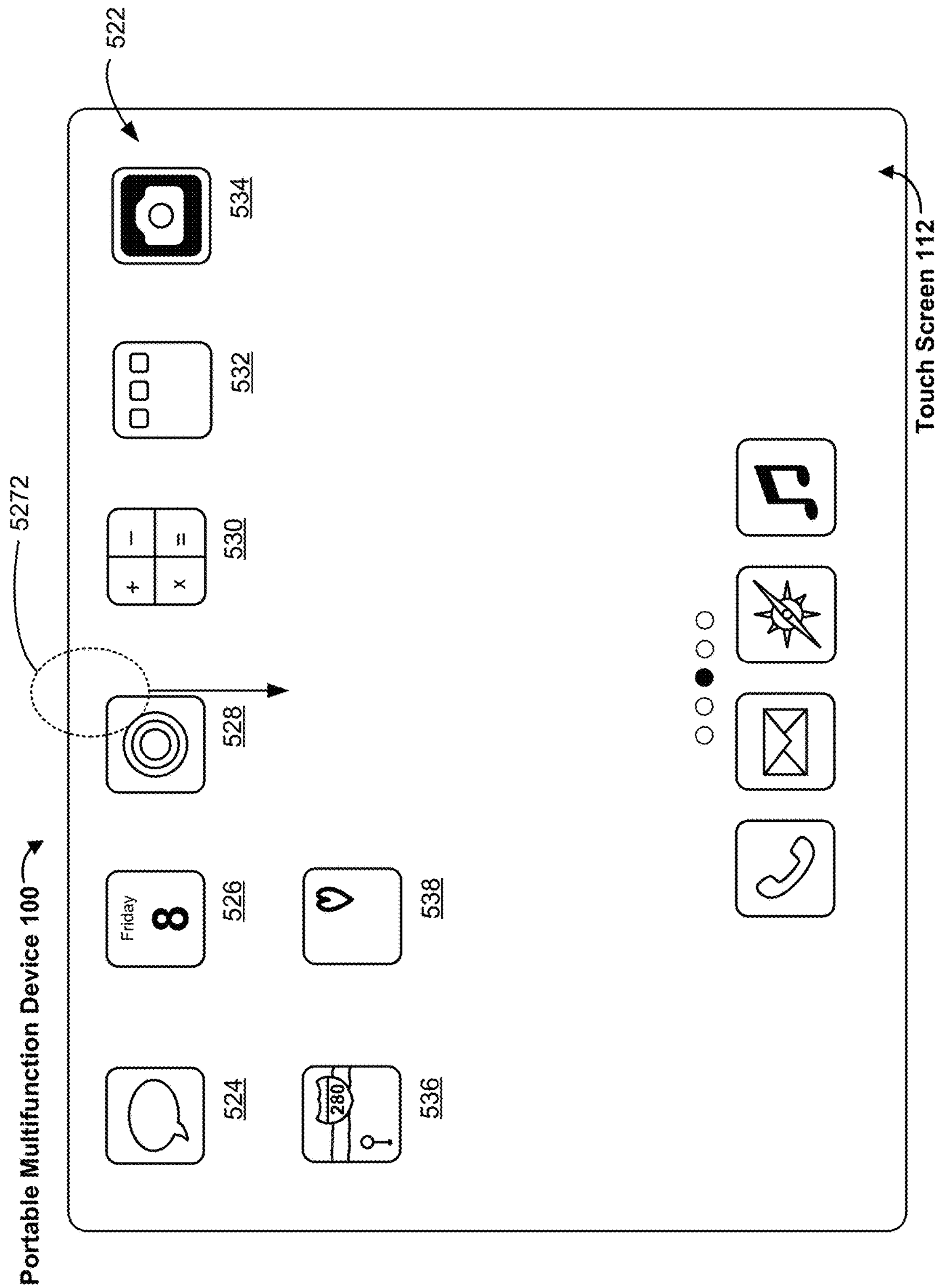
Figure 5H:
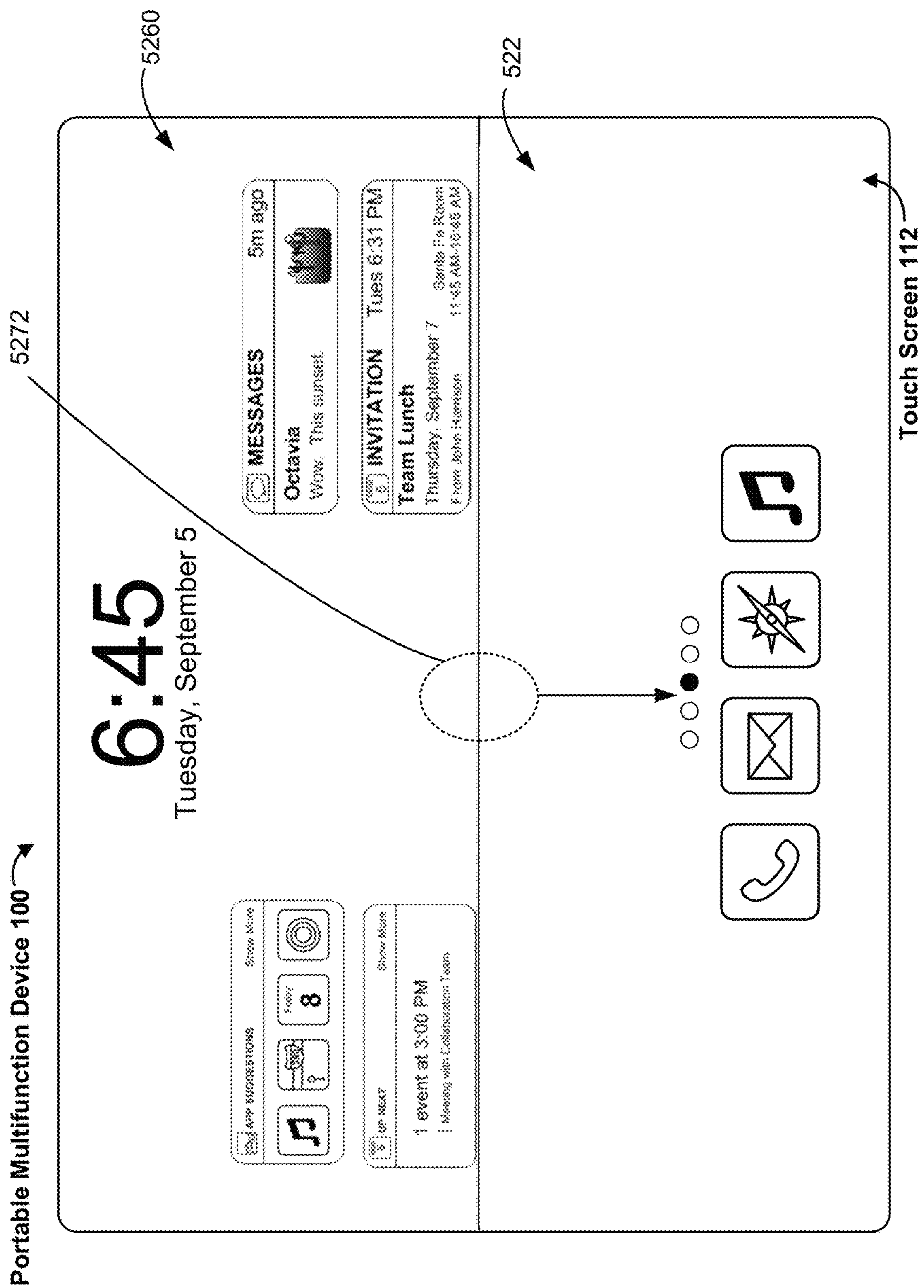
Figure 5H:
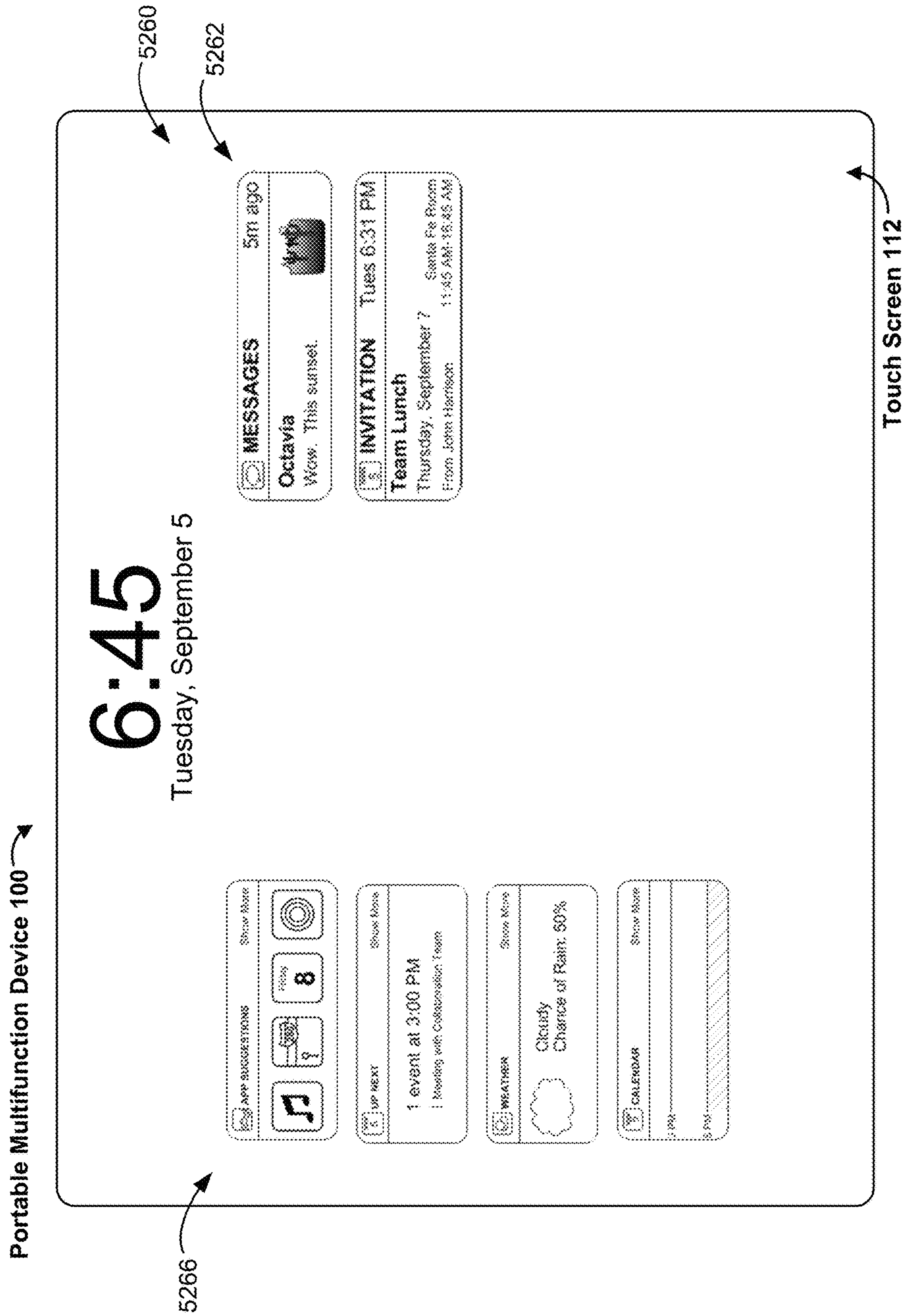
Figure 5H:
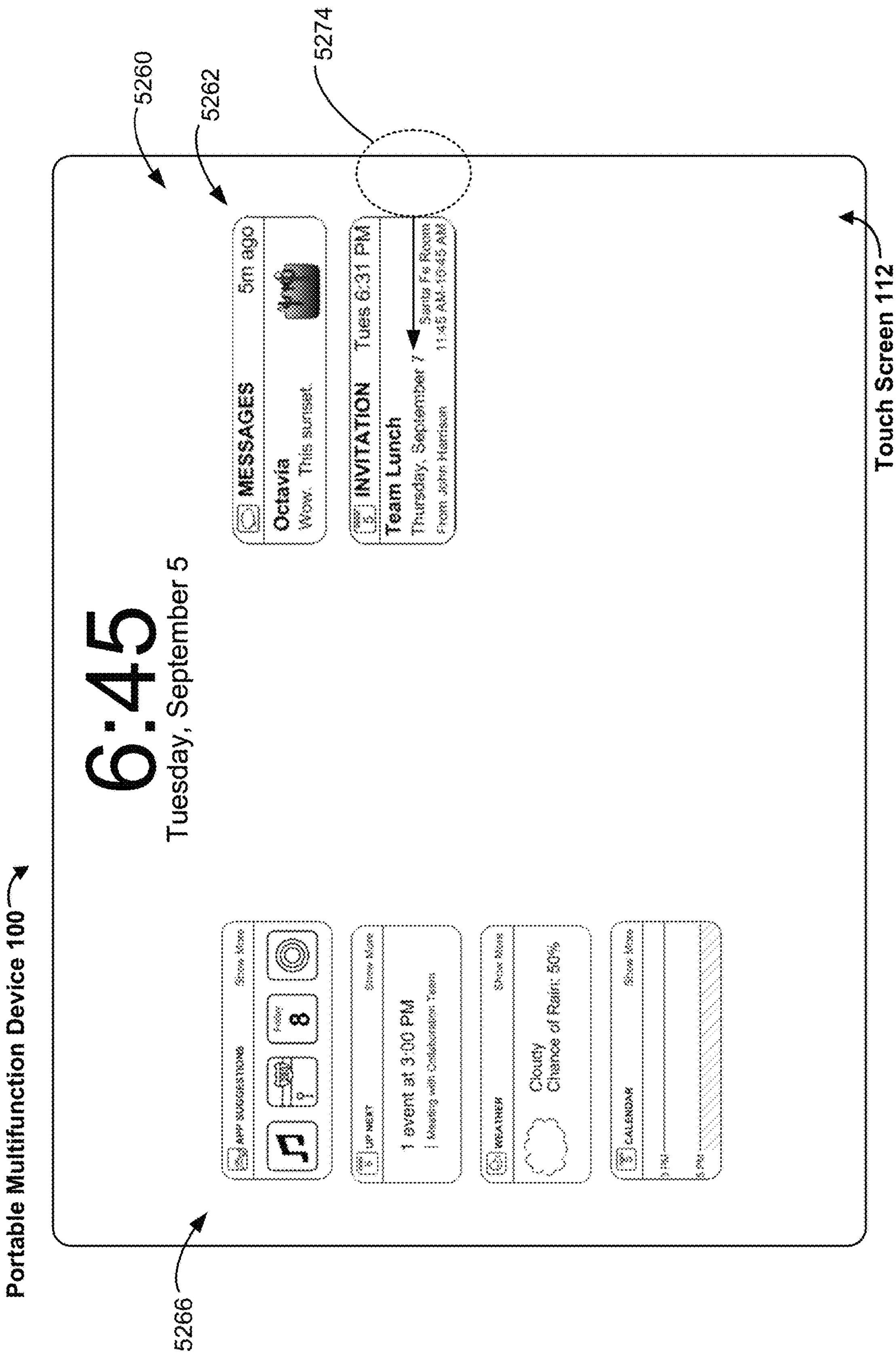
Figure 5H:
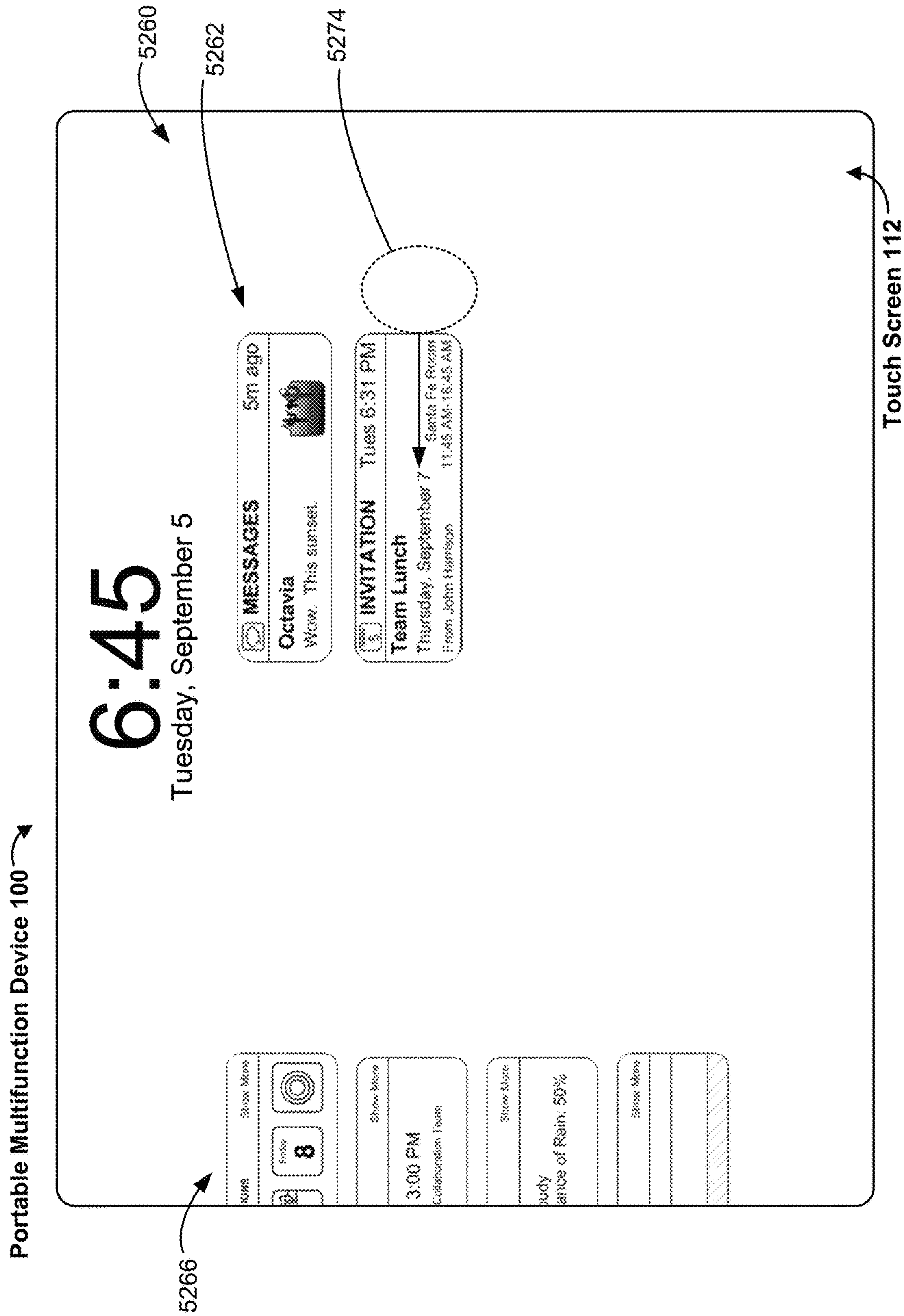
Figure 5H:
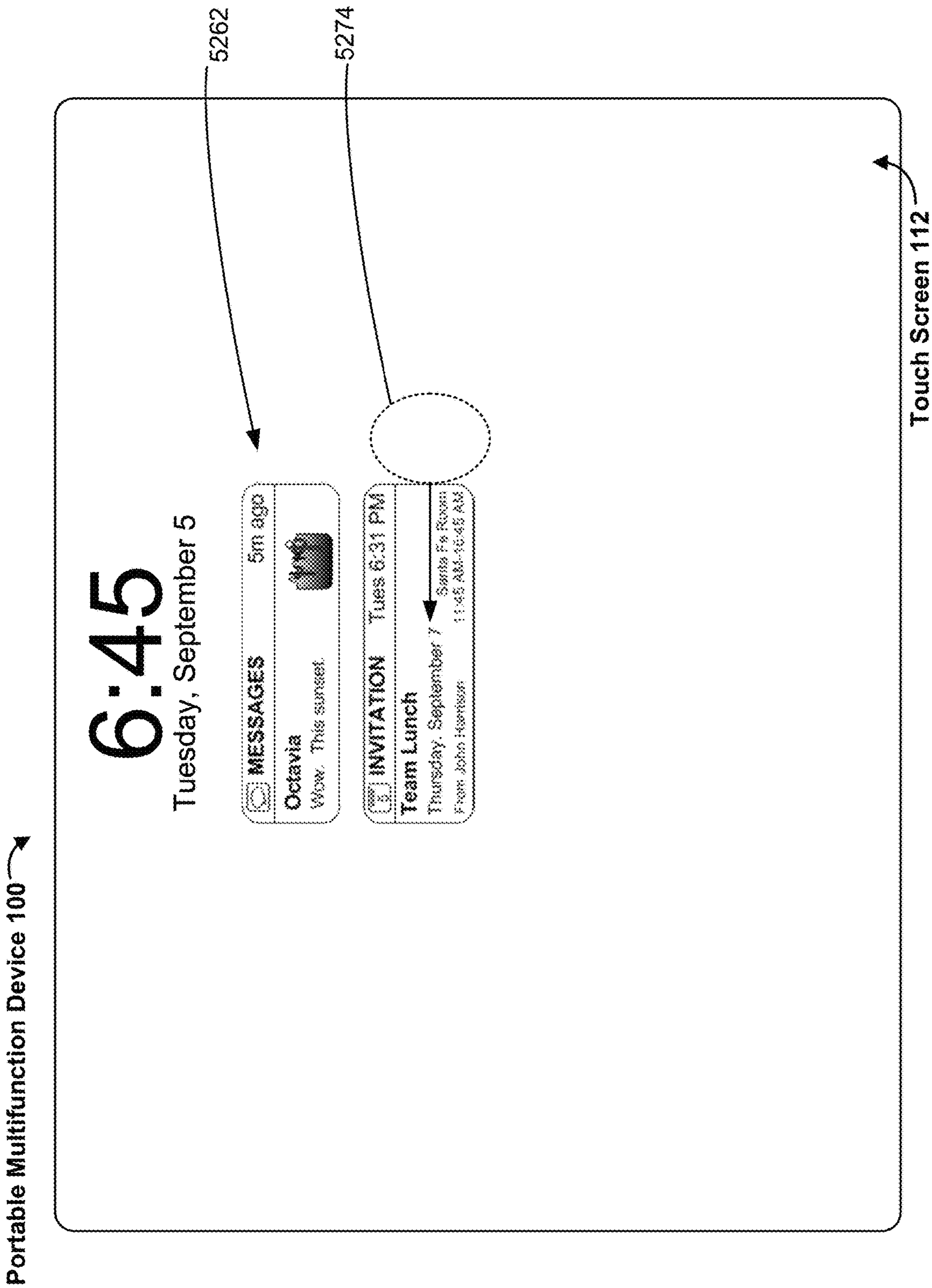
Figure 5H:
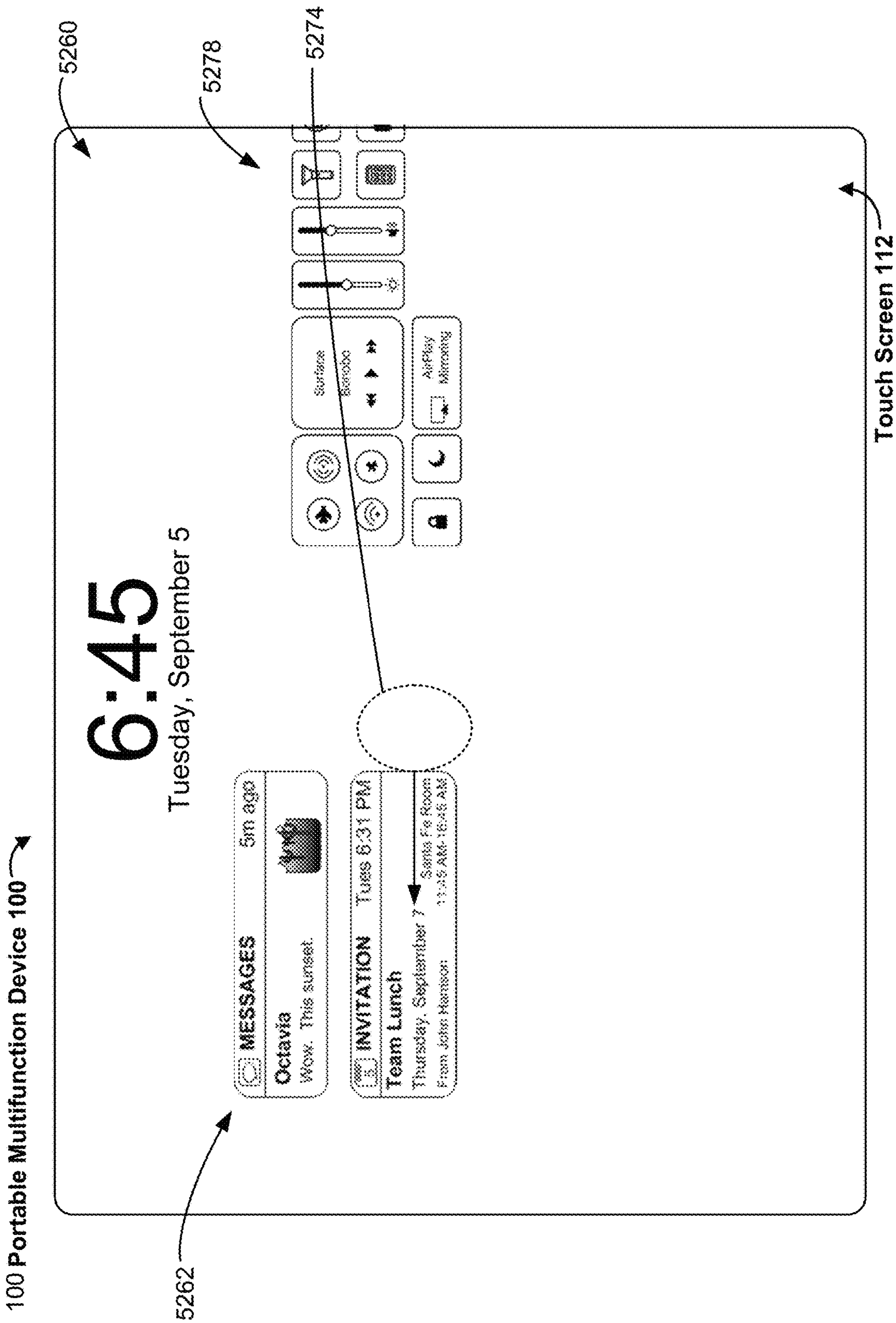
Figure 5H:
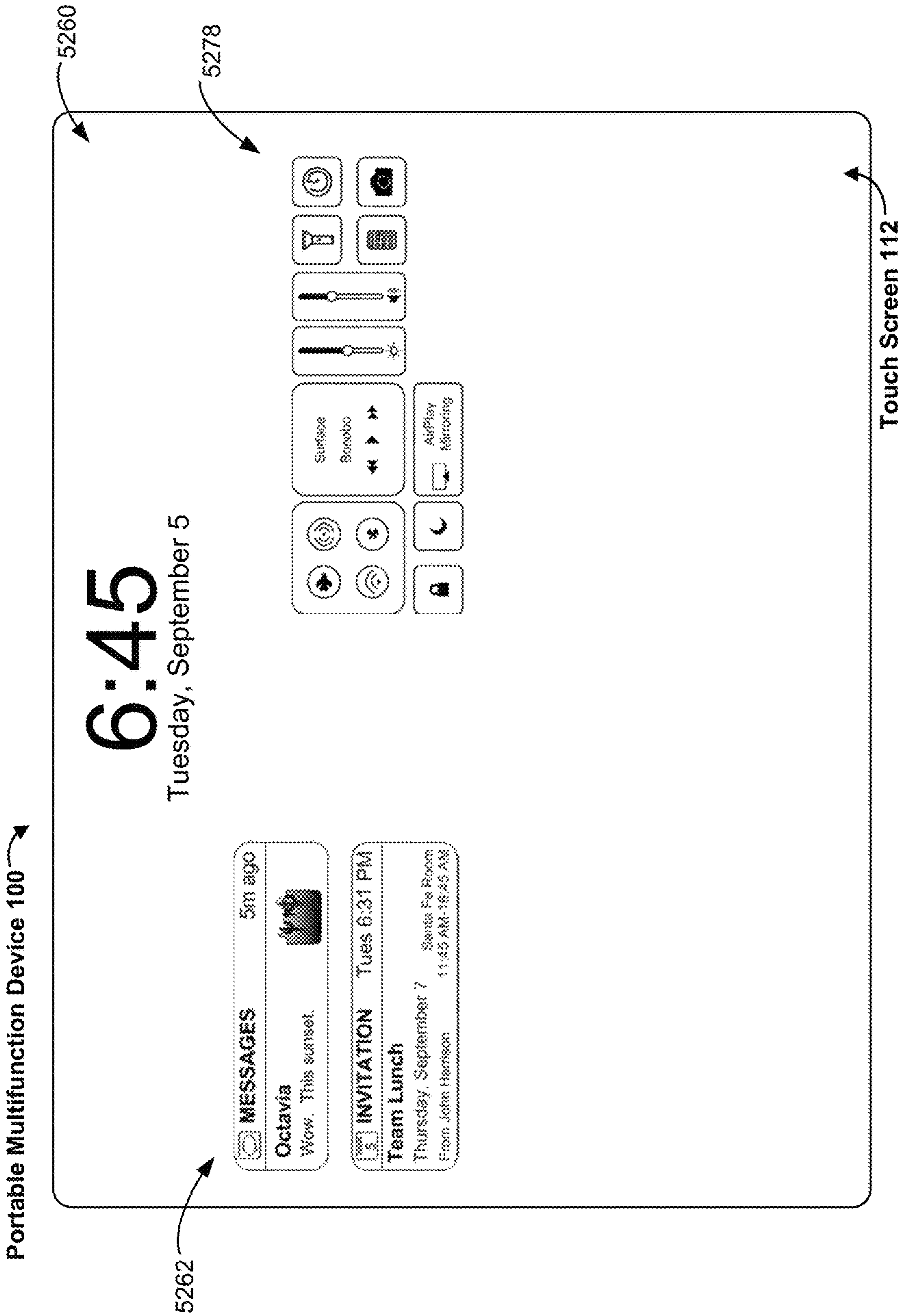
Figure 5H:
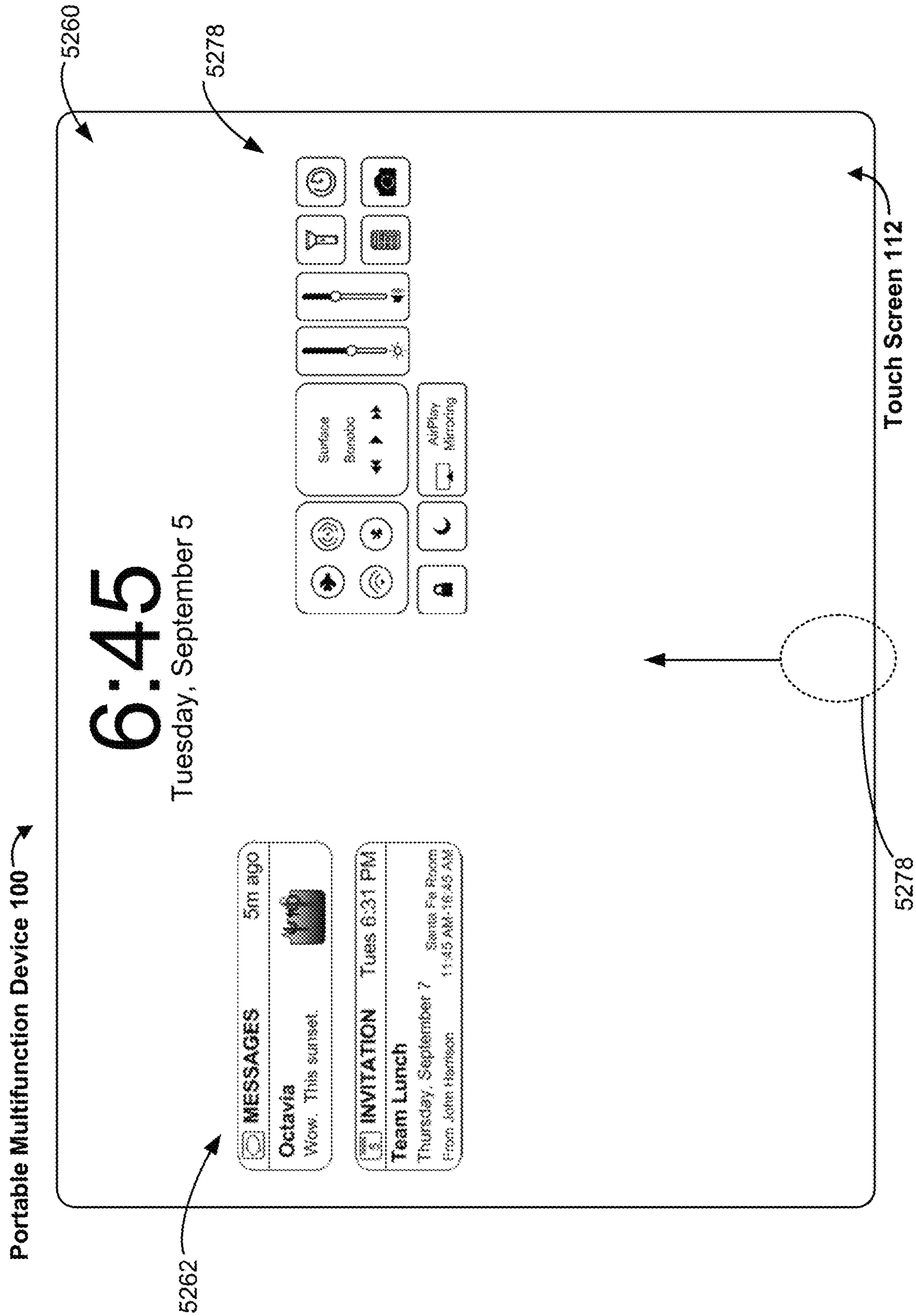
Figure 5H:
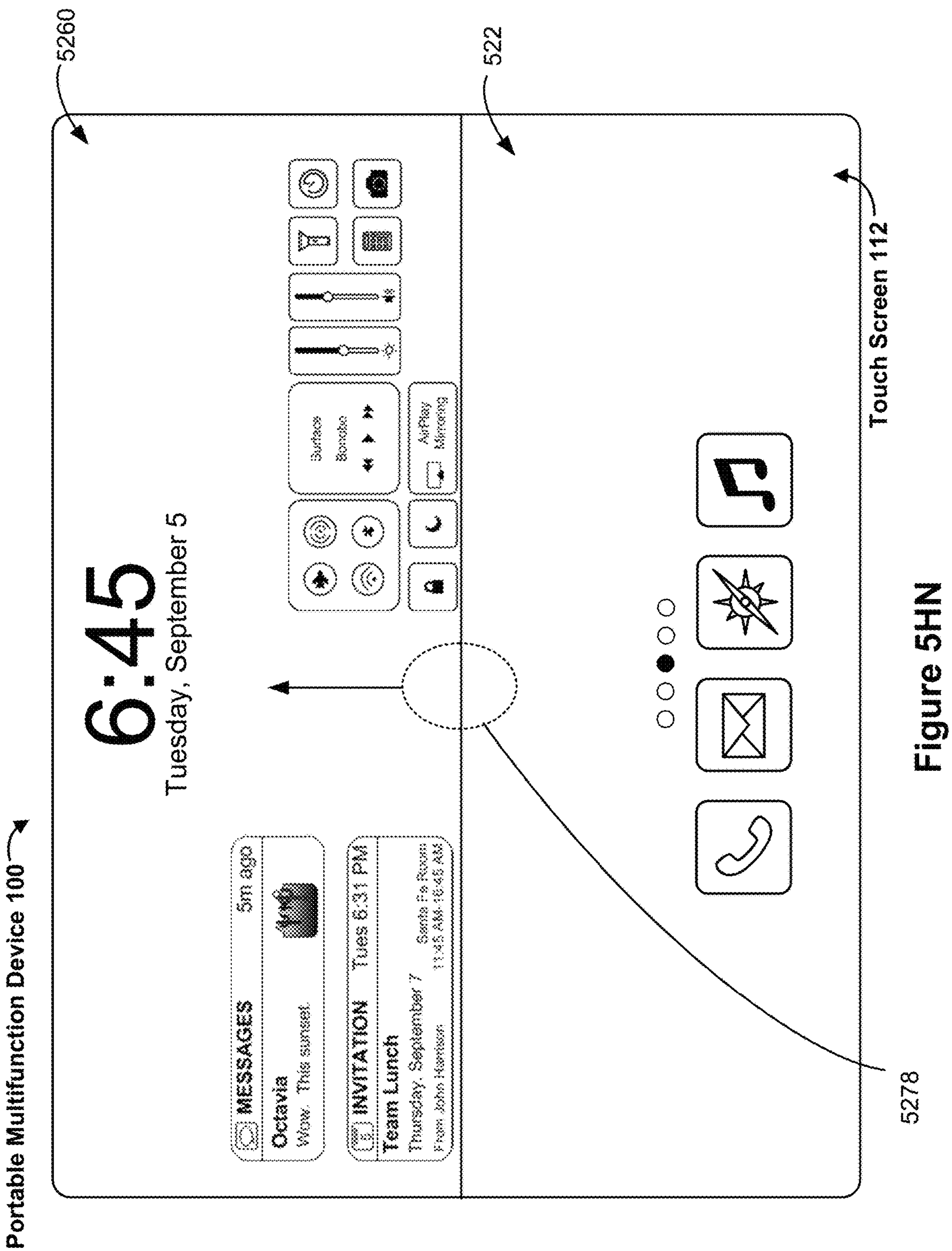
Figure 5H:
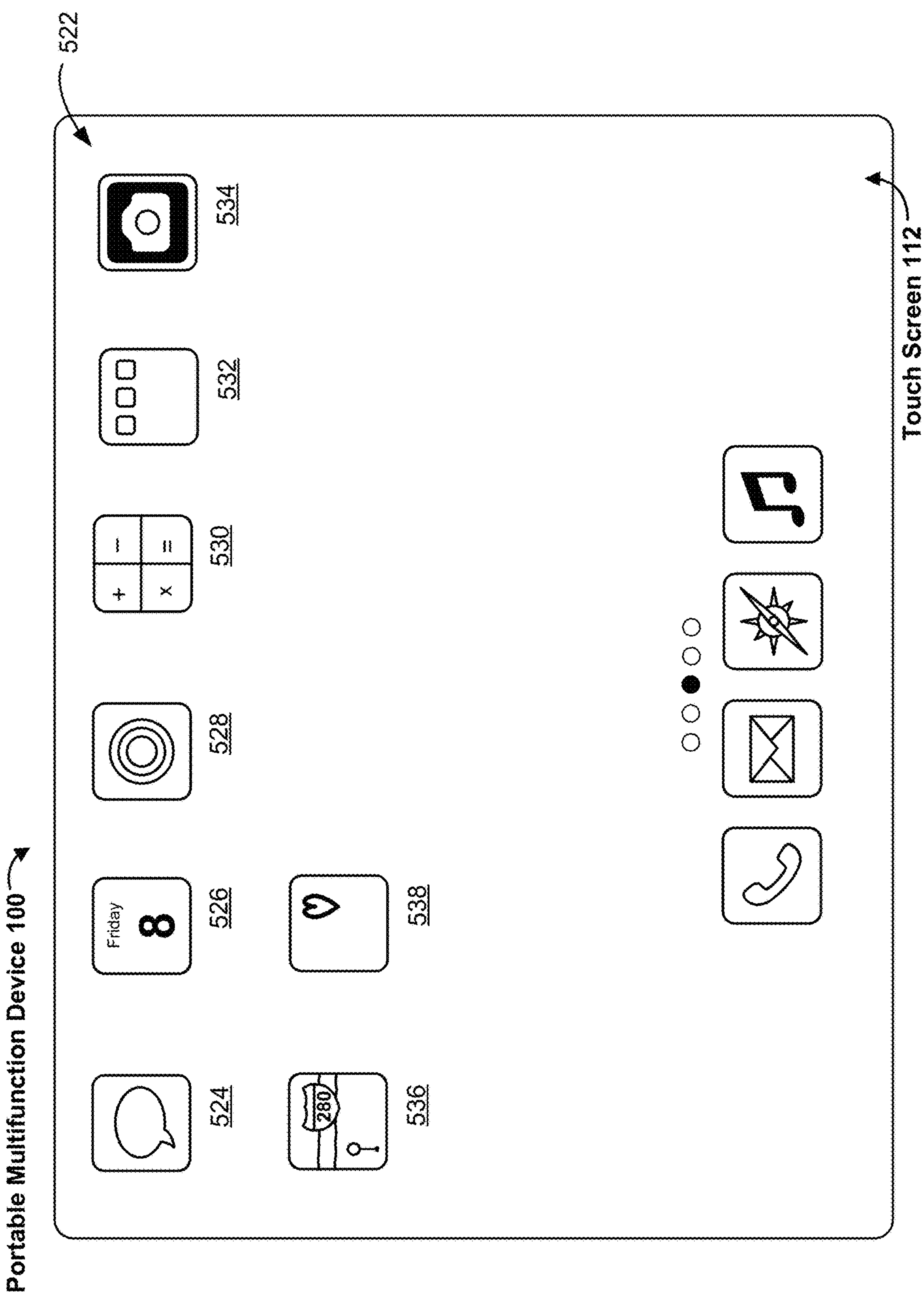
Figure 5H:
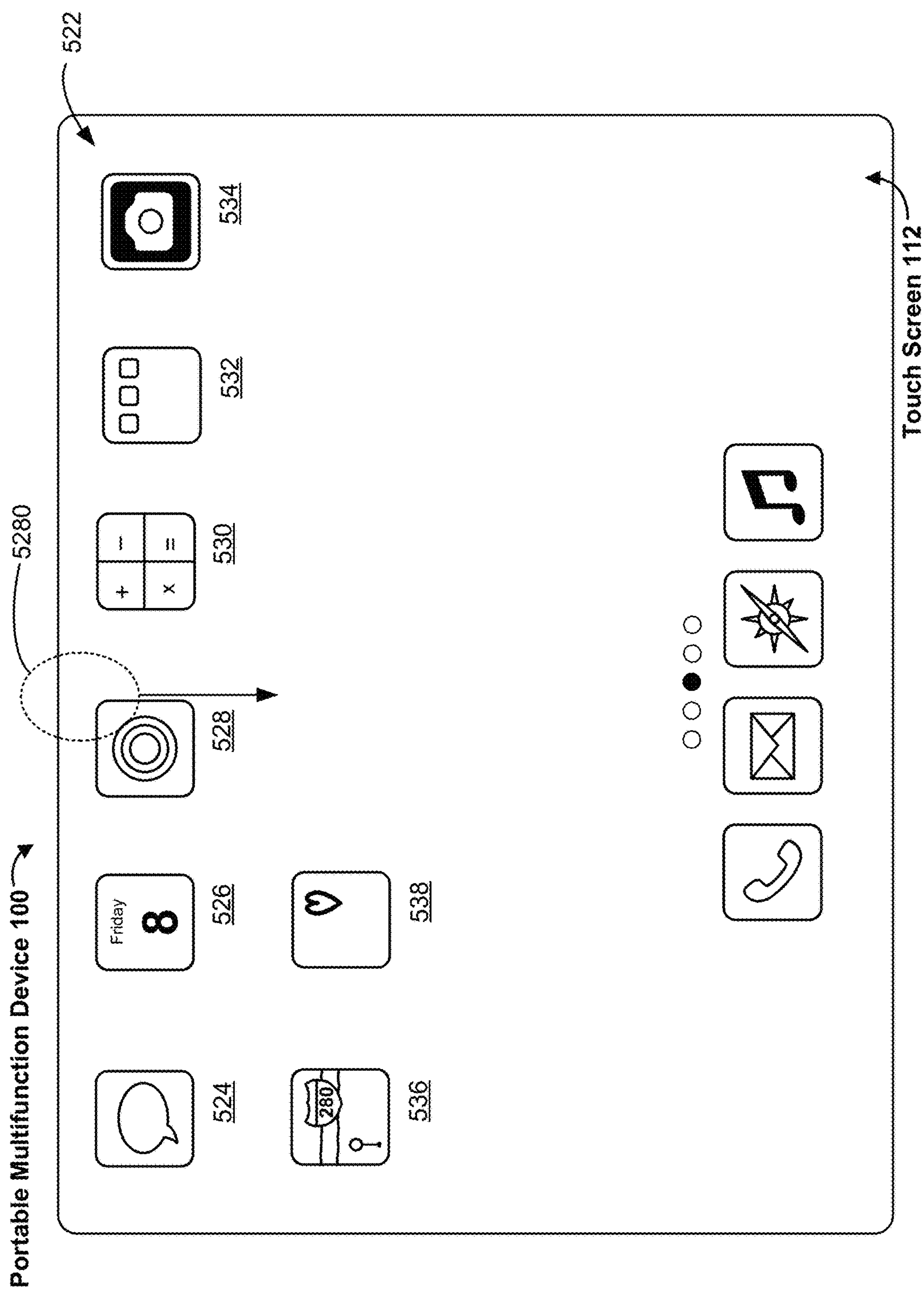
Figure 5H:
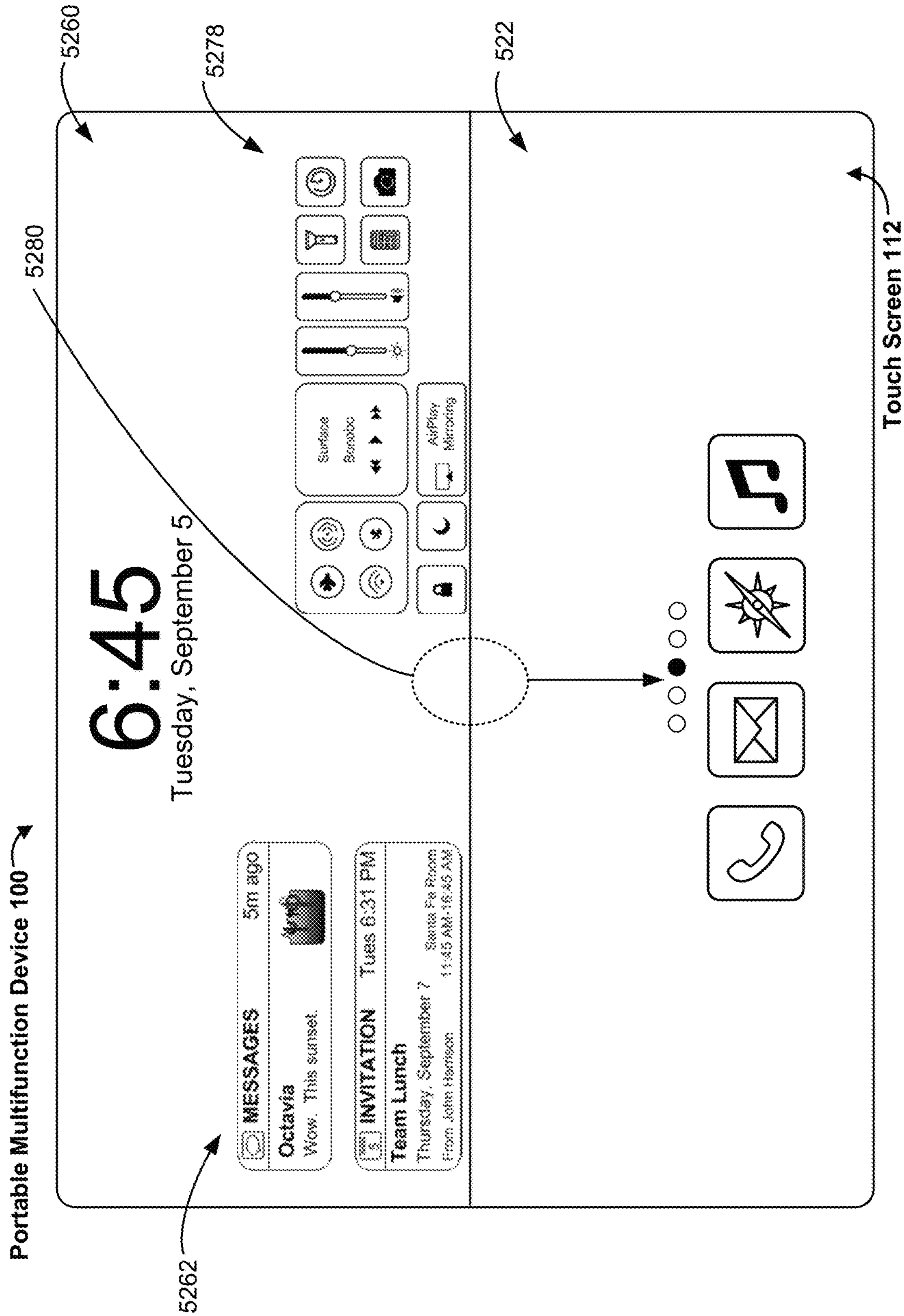
Figure 5H:
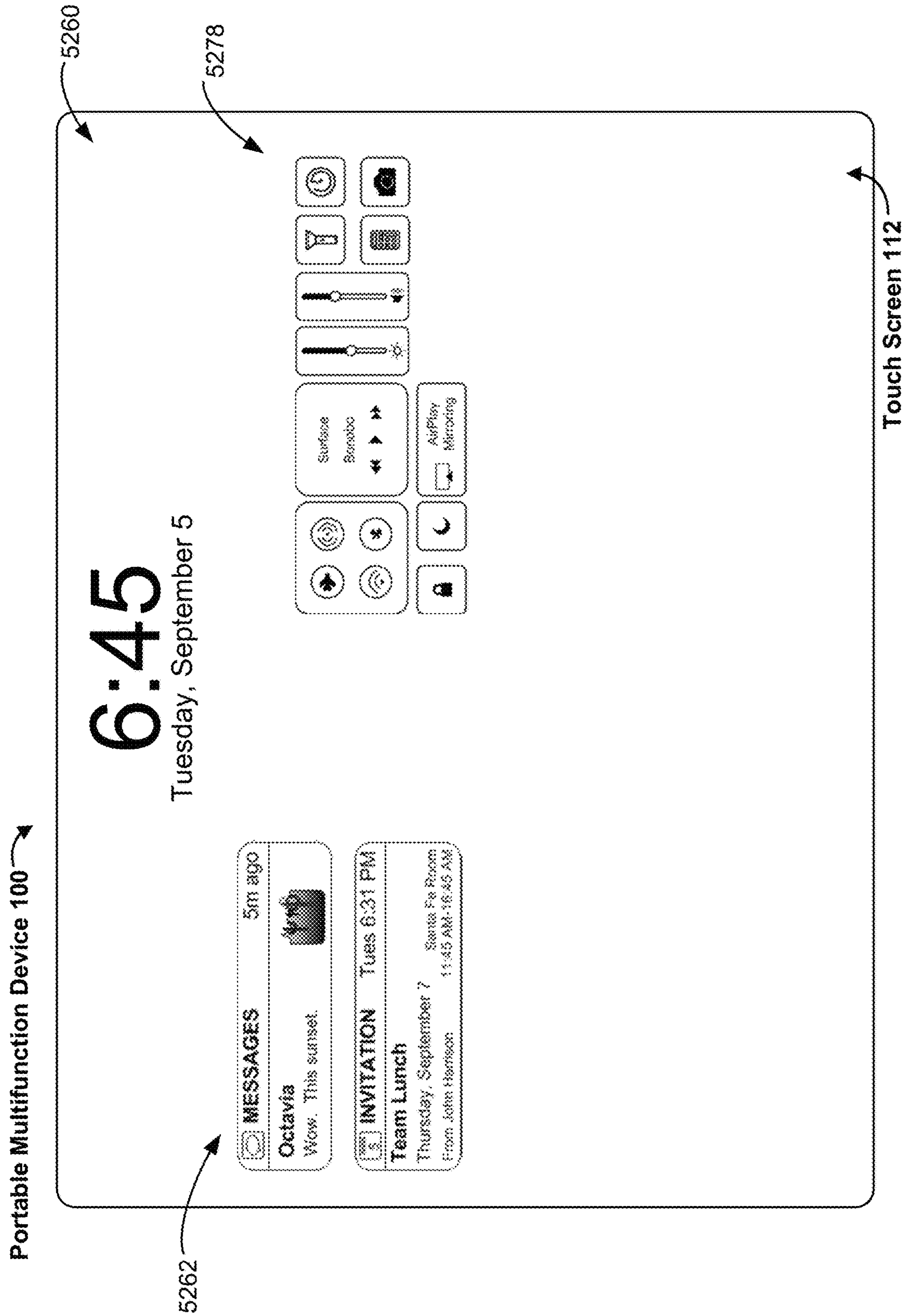

FIGS. 5A-5AZ illustrate example user interfaces for clearing sets of notifications in accordance with some embodiments. The user interfaces in these figures are used to illustrate the processes described below, including the processes in FIGS. 6A-6G. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A1 to 5A4 illustrate activation of a display (e.g., touch-sensitive display 112) in response to changing an orientation of device 100. When the display has been activated, notifications that were received while the device was in a screen-off state were received. These notifications are displayed when the device transitions to a screen-on state. In some embodiments, the device uses one or more sensors (e.g., accelerometer, gyro, audio sensor, heat sensor, and/or light sensor) to determine whether an orientation of the device has changed. For example, the device determines whether the device has been rotated by more than a threshold angle (e.g., rotated along an axis of the device, such as tilted from a position in which the device is substantially horizontal to a position in which the device is substantially vertical). In FIG. 5A1, the device is in a screen-off state while it is held flat in a user's hand 502, such that the device display is substantially horizontal. In FIG. 5A2, the device is tilted such that the display is more vertical than in FIG. 5A1. Because a tilt angle of the device has not increased above a threshold tilt angle in FIG. 5A2, the display is not activated. In FIG. 5A3, the device is tilted such that the display is more vertical than in FIG. 5A2. Because a tilt angle of the device has increased above a threshold tilt angle in FIG. 5A3, the display has transitioned from a screen-off state to a screen-on state and wake screen user interface 504 is displayed by the display 112. In FIG. 5A4, the display 112 is substantially vertical.

In some embodiments, wake screen user interface 504 is a user interface that is displayed when the device transitions from a screen-off state to a screen-on state (e.g., while the device 100 is in a locked state) and wake screen user interface 504 is available to be redisplayed (e.g., to allow a user to view notifications, access a mini application user interface and/or access a control center user interface, as described further below) after the device is unlocked. In some embodiments, when wake screen user interface 504 is accessed after the device is unlocked, wake screen user interface 504 is referred to as a cover sheet user interface. The terms "wake screen user interface" and "cover sheet user interface" are used interchangeably herein to refer to wake screen user interface 504.

FIG. 5B illustrates a wake screen user interface 504, in accordance with some embodiments. Wake screen user interface 504 displays missed notifications 506, 508, 510, and 512 that were received and/or generated by device 100 (e.g., while device 100 was in a screen-off state).

In some embodiments, the missed notifications that are displayed on the wake screen user interface 504 are cleared individually in response to user interaction with a notification (e.g., when a user accesses an application that corresponds to a notification, as illustrated at FIGS. 5L-5M, or when a user provides input to delete a notification, as illustrated at FIGS. 5Y-5AC). In some embodiments, a set of all missed notifications are collectively cleared when notification clearance criteria are satisfied, e.g., when input is received at a time that is (1) after a respective notification of the one or more notifications has been cleared through direct user interaction with the respective notification or an application that corresponds to the respective notification and (2) after the device has transitioned from the screen-on state to the screen-off state at least once since the last direct user interaction that dismissed a respective notification.

In FIGS. 5B-5D, the device transitions from a screen-on state to a screen-off state. Since this transition has not occurred after a user interaction to dismiss a notification, the missed notifications remain displayed, as shown in FIG. 5D.

After device 100 transitions from a screen-off state, as shown in FIG. 5A, to a screen-on state, as shown in FIG. 5B, the device 100 transitions from the screen-on state back to a screen-off state, as shown in FIG. 5C. In some embodiments, a transition from a screen-on state to a screen-off state (and/or from a screen-off state to a screen-on state) occurs in response to an input detected at a control (e.g., a push button 206) of device 100. In some embodiments, a transition from a screen-on state to a screen-off state occurs when a time during which no input has been detected by the device increases beyond a threshold duration.

In FIG. 5D, the device has transitioned from the screen-off state shown in FIG. 5C back to a screen-on state. Notifications 506, 508, 510, and 512 continue to be displayed after the transition from a screen-on state (as shown in FIG. 5B) to a screen-off state (as shown in FIG. 5C) and back to a screen-on state (as shown in FIG. 5D).

In FIGS. 5E-5K, a set of missed notifications remains available on wake screen user interface 504 after user input is provided to unlock the device.

FIG. 5E illustrates an input (e.g., an upward swipe) by a contact on touch screen 112 that is initiated at a lower edge of touch screen 112, as indicated by focus selector 514. In response to the input, in accordance with a determination that the device is locked, an authentication user interface 518 is displayed, as shown in FIG. 5F.

In FIG. 5G, an authentication input (e.g., a tap input) by a contact on touch screen 112 is detected at a location within authentication user interface 518, as indicated by focus selector 520. In response to the authentication input, the device is unlocked and home screen user interface 522 (e.g., a user interface for a menu of applications as described with regard to FIG. 4A) is displayed, as shown in FIG. 5H.

FIGS. 5I-5J illustrate an input (e.g., a downward swipe) that is initiated by a contact at an upper edge of touch screen 112, as indicated by focus selector 524. In response to the input, wake screen user interface 504 slides down from the upper edge of display 112, as shown in FIGS. 5I-5K. As indicated in FIG. 5K, notifications 506, 508, 510, and 512 continue to be displayed on the wake screen user interface 504 when wake screen user interface 504 is revealed after the device is unlocked and home screen user interface 522 is displayed.

FIGS. 5L-5M illustrate a user interaction with notification 510 that causes the notification to be dismissed (as shown in FIG. 5P), while notifications 506, 508, and 512 remain displayed on wake screen user interface 504 (e.g., because no transition from the screen-on state to the screen-off state has occurred since the user interaction to dismiss notification 510).

In FIG. 5L, an input (e.g., a tap input) by a contact on touch screen 112 is detected at a location that corresponds to notification 510, as indicated by focus selector 528. In response to the input, wake screen user interface 504 ceases to be displayed and an application user interface (e.g., messages application user interface 530) that corresponds to the notification 510 is displayed, as shown in FIG. 5M.

FIGS. 5N-5O illustrate an input (e.g., a downward swipe) that is initiated by a contact on touch screen 112 at an upper edge of touch screen 112, as indicated by focus selector 532. In response to the input, wake screen user interface 504 slides down from the upper edge of display 112, as shown in FIGS. 5N-5P. As indicated in FIG. 5P, as a result of the interaction with notification 510 (e.g., the tap input on notification 510 that caused the messages application user interface 530 to be displayed) notification 510 is no longer displayed on wake screen user interface 504. In FIG. 5P, notifications 506, 508, and 512 continue to be displayed on the wake screen user interface 504.

In FIGS. 5Q-5X, after navigation to a first application user interface and from the first application user interface to a second application user interface, notifications 506, 508, and 512 continue to be displayed (as shown in FIG. 5X).

FIG. 5Q illustrates an input (e.g., a upward swipe) that is initiated by a contact at a location near the lower edge of touch screen 112, as indicated by focus selector 534. In response to the input, wake screen user interface 504 slides up from the lower edge of display 112 to redisplay the underlying messages application user interface 530 (that was previously covered by wake screen user interface 504), as shown in FIGS. 5Q-5R.

FIG. 5S illustrates an input by a contact on touch screen 112 that is initiated by a contact at a location near the lower edge of touch screen 112, as indicated by focus selector 536. In response to the input, during which the focus selector moves along a path indicated by arrow 538, messages application user interface 530 moves along the path indicated by arrow 538 to reveal web browser application user interface 540, as shown in FIGS. 5S-5U.

FIGS. 5V-5W illustrate an input (e.g., a downward swipe) that is initiated by a contact at a location near the upper edge of touch screen 112, as indicated by focus selector 542. In response to the input, wake screen user interface 504 slides down from the lower edge of display 112, as shown in FIGS. 5V-5X.

FIGS. 5Y-5AC illustrate a user interaction with notification 506 that causes notification 506 to be dismissed (as shown in FIG. 5AC), while notifications 508 and 512 remain displayed on wake screen user interface 504 (e.g., because no transition from the screen-on state to the screen-off state has occurred since the user interaction to dismiss notification 510 and no transition from the screen-on state to the screen-off state has occurred since the user interaction to dismiss notification 506).

FIGS. 5AD-5AO illustrate user input to access a music application user interface 560 and to initiate an active playback mode of the music application. While the music application is in an active playback mode, a media banner 568 is displayed on wake screen user interface 504, as shown in FIG. 5AO. FIGS. 5AP-5AU illustrate input to stop media playback. When music application is not in an active playback mode, media banner 568 is no longer displayed on wake screen user interface 504, as shown in FIG. 5AU.

FIGS. 5Y-5Z illustrate an input (e.g., a horizontal drag input) by a contact on touch screen 112 at a location that corresponds to notification 506, as indicated by focus selector 544. In response to the input, deletion affordance 546 is revealed at a location that is adjacent to notification 506, as shown in FIG. 5Z. In FIG. 5AA, the contact indicated by focus selector 544 has lifted off of touch screen 112.

In FIG. 5AB, an input (e.g., a tap input) is detected at a location that corresponds to deletion affordance 546, as indicated by focus selector 548. In response to the input, notification 506 ceases to be displayed on wake screen user interface 504, as shown in FIG. 5AC. In FIG. 5AC, notifications 508 and 512 continue to be displayed on the wake screen user interface 504.

FIGS. 5AD-5AE illustrate an input (e.g., an upward swipe) that is initiated by a contact at a location near the upper edge of touch screen 112, as indicated by focus selector 550. In response to the input, wake screen user interface 504 slides up from the lower edge of display 112 to redisplay the underlying web browser application user interface 540 (that was previously covered by wake screen user interface 504), as shown in FIGS. 5AD-5AF.

FIG. 5AG illustrates an input (e.g., an upward swipe) by a contact on touch screen 112 that is initiated by a contact at location that corresponds to home affordance 552, as indicated by focus selector 554. In response to the input, display of web browser application user interface 540 is replaced by display of home screen user interface 522, as shown in FIGS. 5AG-5AH.

In FIG. 5AI, an input (e.g., a tap input) is detected at a location that corresponds to affordance 556 for displaying a music application interface, as indicated by focus selector 558. In response to the input, a music application user interface 552 is displayed, as shown in FIG. 5AJ.

In FIG. 5AK, an input (e.g., a tap input) is detected at a location that corresponds to media playback control affordance 562, as indicated by focus selector 564. In response to the input, the music application transitions to an active playback mode (e.g., music playback is initiated) as shown in FIG. 5AL (e.g., as indicated by the changed state of media playback control affordance 562).

FIGS. 5AM-5AN illustrate an input (e.g., a downward swipe) that is initiated by a contact at a location near the upper edge of touch screen 112, as indicated by focus selector 566. In response to the input, wake screen user interface 504 slides down from the upper edge of display 112, as shown in FIGS. 5AM-5AO.

FIG. 5AO shows a wake screen user interface 504 that displays a media banner 568 that corresponds to the ongoing music playback initiated from the music application. As indicated in FIG. 5AP, media banner 568 includes media track information 570 and a banner playback control affordance 572.

In FIG. 5AP, an input (e.g., a tap input) is detected at a location that corresponds to banner playback control affordance 572, as indicated by focus selector 574. In response to the input, music playback is paused as shown in FIG. 5AQ (e.g., as indicated by the changed state of banner playback control affordance 572).

FIG. 5AR illustrates an input (e.g., a upward swipe) that is initiated by a contact near the lower edge of touch screen 112, as indicated by focus selector 576. In response to the input, wake screen user interface 504 slides up from the lower edge of display 112 to redisplay the underlying music user interface 522 (that was previously covered by wake screen user interface 504), as shown in FIGS. 5AR-5AS.

FIG. 5AT illustrates an input (e.g., a downward swipe) by a contact on touch screen 112, as indicated by focus selector 578. In response to the input, wake screen user interface 504 slides down from the upper edge of display 112, as shown in FIGS. 5AT-5AU.

In FIG. 5AU, media banner 568 is no longer displayed on wake screen user interface 504 (e.g., because the input to display wake screen user interface 504 was received while the music application was not in an active media playback mode).

FIGS. 5AV-5AW illustrate a transition from the screen-on state to the screen-off state that occurs after the user interaction to dismiss notification 510 (e.g., as described with regard to FIGS. 5L-5P) and after the user interaction to dismiss notification 606 (as described with regard to FIGS. 5Y-5AC). As shown in FIG. 5AW, because notification clearance criteria are satisfied (e.g., input (to transition the device from the screen-off state to the screen-on state) is received at a time that is (1) after a respective notification of the one or more notifications has been cleared through direct user interaction with the respective notification or an application that corresponds to the respective notification and (2) after the device has transitioned from the screen-on state to the screen-off state at least once since the last direct user interaction that dismissed a respective notification), all notifications have been cleared from wake screen user interface 504.

In FIG. 5AV, device 100 has transitioned from the screen-on state, as shown in FIG. 5AU, to a screen-off state.

After the screen has transitioned from a screen-off state, as shown in FIG. 5AV, back to a screen-on state, as shown in Figure AW (and after the user has interacted with at least one notification, e.g., as described with regard to FIGS. 5L-5P and/or as described with regard to FIGS. 5Y-5AC), wake screen user interface 504 is displayed with no notifications.

FIGS. 5AW-5AZ illustrate a "rubber band" effect that occurs when an input by a contact with touch screen 112 (as indicated by focus selector 580) drags a time/date indicator 582 downward, and then the time/date indicator moves back to its original position in response to lift off of the contact from the touch sensitive surface. As focus selector 580 moves across touch screen 112 along a path indicated by arrow 584, time/date indicator 582 moves in accordance with the movement of the focus selector 580, as shown in FIGS. 5AW-5AX. When focus selector 580 lifts off of touch screen 112, the time/date indicator 582 returns to its original position, as shown in FIGS. 5AY-5AZ.

FIGS. 5BA-5CX illustrate example user interfaces for displaying notification history, in accordance with some embodiments. The user interfaces in these figures are used to illustrate the processes described below, including the processes in FIGS. 7A-7E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5BA displays wake screen user interface 504 (e.g., in response to an event that triggered a transition from a screen-off state to a screen-on state). Wake screen user interface 504 displays missed notifications 586, 588, 590, and 592.

FIGS. 5BB-5BE illustrate a "rubber band" effect that occurs when an input by a contact with touch screen 112 (as indicated by focus selector 594) drags missed notifications 586, 588, 590, and 592 and time/date indicator 582 downward, and then the missed notifications 586, 588, 590, and 592 and time/date indicator 582 move back to their original positions in response to lift off of the contact from the touch sensitive surface. As focus selector 594 moves across touch screen 112 along a path indicated by arrow 596, missed notifications 586, 588, 590, and 592 and time/date indicator 582 move in accordance with the movement of the focus selector 594, as shown in FIGS. 5BB-5BC. When focus selector 594 lifts off of touch screen 112, notifications 586, 588, 590, and 592 and time/date indicator 582 return to their original positions, as shown in FIGS. 5BD-5BE.

FIGS. 5BF-5BG illustrate an input (e.g., an upward swipe) that causes missed notifications to scroll upwards, but that does not meet criteria for displaying previously received notifications. In FIG. 5BF, an input is initiated by a contact with touch screen 112, as indicated by focus selector 598, within a region on wake screen interface 504 (e.g., a region delineated by dotted line 5100) in which notifications 586-592 are displayed. In response to the input, missed notifications 586-592 move upward, as shown in FIGS. 5BF-5BG, revealing an additional missed notification 5102 and a previously received notification indicator 5104, as shown in FIG. 5BH.

FIGS. 5BI-5BN illustrate an input that meets criteria for displaying previously received notifications. In FIG. 5BI, an input (e.g., an upward swipe) is initiated by a contact with touch screen 112 (e.g., at a location that corresponds to previously received notification indicator 5102), as indicated by focus selector 5106. In response to the input, missed notifications 586-592 move upward, as shown in FIGS. 5BJ-5BP. As shown in FIG. 5BK, when movement of the focus selector 5106 across touch screen 112 has increased above a threshold distance (as indicated by 5108), previously received notification 506 is displayed, and the device generates a tactile output (as indicated at 5112). After the focus selector 5106 moves beyond the threshold distance, additional previously received notifications 508 and 510 are displayed, and the previously received notifications 506, 508, and 510 move at a faster rate than the rate of movement of focus selector 5106 and missed notifications 590, 592 and 5102 (e.g., to provide a visual effect of the previously received notifications 506, 508, and 510 "rushing to catch up" with the missed notifications 590, 592 and 5102), as shown in FIGS. 5BK-5BM. In FIGS. 5BM-5BN, focus selector 5106 continues to move upward across touch screen 112, and previously received notification 512 is revealed. In FIGS. 5BO-5BP, after the contact indicated by focus selector 5106 has lifted off from touch screen 112, previously received notifications 506, 508, 510, and 512 continue to move upward.

FIGS. 5BQ-5BR illustrate an input that displays additional previously received notifications. In FIG. 5BQ, an input (e.g., an upward swipe) is initiated by a contact with touch screen 112, as indicated by focus selector 5120, within a region on wake screen interface 504 in which previously received notifications 506-512 are displayed. In response to the input, previously received notifications 506-512 move upward, as shown in FIGS. 5BQ-5BR. In FIG. 5BR, a second previously received notification indicator 5122 (e.g., for notifications received on the previous day) and a previously received notification 5124 (e.g., received on the previous day) are displayed on wake screen user interface 504.

FIGS. 5BS-5BT illustrate an input to redisplay missed notifications. In FIG. 5BS, an input (e.g., a downward swipe) is initiated by a contact with touch screen 112, as indicated by focus selector 5126, within a region on wake screen interface 504 in which previously received notifications 506-512 and 5124 are displayed. In response to the input, previously received notifications 506-512 and 5124 scroll downwards and missed notifications 590, 592, and 5102 are redisplayed on wake screen user interface 504, as shown in FIGS. 5BS-5BU.

FIGS. 5BV-5BZ illustrate a user interaction with notification 592 that causes the notification to be dismissed (as shown in FIG. 5BZ), while missed notifications other than 592 and previously received notifications remain displayed on wake screen user interface 504 (e.g., because no transition from the screen-on state to the screen-off state has occurred since the user interaction to dismiss notification 592).

FIGS. 5BV-5BW illustrate an input (e.g., a horizontal drag input) by a contact on touch screen 112 at a location that corresponds to notification 592, as indicated by focus selector 5128. In response to the input, deletion affordance 5130 is revealed at a location that is adjacent to notification 592, as shown in FIG. 5BW. In FIG. 5BX, the contact indicated by focus selector 5130 has lifted off of touch screen 112.

In FIG. 5BY, an input (e.g., a tap input) is detected at a location that corresponds to deletion affordance 5130, as indicated by focus selector 5132. In response to the input, notification 592 ceases to be displayed on wake screen user interface 504, as shown in FIG. 5BZ.

FIG. 5CA illustrates an input that meets criteria for dismissing previously dismissed notifications. In response to the input, only missed notifications remain displayed on wake screen user interface 504, as shown in FIG. 5CB.

FIGS. 5CA-5CB illustrate an input (e.g., a downward swipe) that is initiated by a contact with touch screen 112, as indicated by focus selector 5136, within a region on wake screen interface 504 in which missed notifications (e.g., 592 and 5102) and/or previously received notifications (e.g., 506-510) are displayed. In response to the input, previously received notifications 506-510 scroll downwards and missed notifications 586, 588, 592, and 5102 are redisplayed on wake screen user interface 504, as shown in FIG. 5CA-5CB.

FIGS. 5CC-5CQ illustrate input for accessing a control center user interface 5138, a mini application user interface 5140, and a user interface underlying wake screen user interface (e.g., home screen user interface 522) from wake screen user interface 504.

FIGS. 5CC-5CD illustrate an input (e.g., a leftward swipe) that is initiated by a contact on touch screen 112, as indicated by focus selector 5136. In response to the input, wake screen user interface 504 slides to the left and control center user interface 5138 is revealed, as shown in FIG. 5CC-5CE.

FIGS. 5CF-5CG illustrate an input (e.g., a rightward swipe) that is initiated by a contact on touch screen 112, as indicated by focus selector 5142. In response to the input, control center user interface 5138 slides to the right and wake screen user interface 504 is revealed, as shown in FIG. 5CF-5CH.

FIGS. 5CI-5CJ illustrate an input (e.g., a rightward swipe) that is initiated by a contact on touch screen 112, as indicated by focus selector 5144. In response to the input, wake screen user interface 504 slides to the right and mini application user interface 5140 is revealed, as shown in FIG. 5CI-5CK.

FIGS. 5CL-5CM illustrate an input (e.g., a leftward swipe) that is initiated by a contact on touch screen 112, as indicated by focus selector 5146. In response to the input, mini application user interface 5140 slides to the left and wake screen user interface 504 is revealed, as shown in FIG. 5CL-5CN.

FIG. 5CO illustrates an input by a contact on touch screen 112 that is initiated at a lower edge of touch screen 112, as indicated by focus selector 5146. In response to the input, display of wake screen user interface 504 is replaced by display of home screen user interface 522, as shown in FIGS. 5CO-5CQ.

FIGS. 5CR-5CS illustrate a transition from the screen-on state to the screen-off state that occurs after the user interaction to dismiss notification 592 (e.g., as described with regard to FIGS. 5BV-5BZ). As shown in FIG. 5CS, because notification clearance criteria are satisfied (e.g., input (to transition the device from the screen-off state to the screen-on state) is received at a time that is (1) after a respective notification of the one or more notifications has been cleared through direct user interaction with the respective notification or an application that corresponds to the respective notification and (2) after the device has transitioned from the screen-on state to the screen-off state at least once since the last direct user interaction that dismissed a respective notification), all notifications have been cleared from wake screen user interface 504.

In FIG. 5CR, device 100 has transitioned from the screen-on state, as shown in FIG. 5CQ, to a screen-off state.

After the screen has transitioned from a screen-off state, as shown in FIG. 5CR, back to a screen-on state, as shown in FIG. 5CS (and after the user has interacted with at least one notification, e.g., as described with regard to FIGS. 5BV-5BZ), wake screen user interface 504 is displayed with no notifications.

FIGS. 5CS-5CV illustrate a "rubber band" effect that occurs when an input by a contact with touch screen 112 (as indicated by focus selector 5150) drags a time/date indicator 582 downward, and then the time/date indicator moves back to its original position in response to lift off of the contact from the touch sensitive surface.

After all notifications have been cleared, as shown at FIG. 5CS, the cleared notifications can be recalled, as shown at FIGS. 5CW-5CX. FIG. 5CW illustrates an input (e.g., an upward swipe) that is initiated by a contact with touch screen 112 at a location on wake screen user interface 504, as indicated by focus selector 5152. In response to the input, the notifications that were displayed as missed notifications 586-592 and subsequently cleared (as described with regard to FIGS. 5BA, 5BV-5BZ, and 5CR-5CS) move upward when movement of the focus selector 5152 across touch screen 112 has increased above a threshold distance. In FIG. 5CX, the notifications that were displayed as missed notifications 586-592 are displayed as previously received notifications.

FIGS. 5CY-5EB illustrate example user interfaces for displaying updating information from an application in a floating banner, in accordance with some embodiments. The user interfaces in these figures are used to illustrate the processes described below, including the processes in FIGS. 8A-8C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5CY-5DA illustrate input for activating a navigation mode of a maps application and displaying a navigation banner 5160 that corresponds to the active navigation mode of the maps application.

FIG. 5CY shows a maps application user interface 5154 displayed by display 112 of device 100.

In FIG. 5CZ, an input (e.g., a tap input) by a contact on touch screen 112 is detected at a location that corresponds to a control 5156 for activating a navigation mode of the maps application, as indicated by focus selector 5158. In response to the input, the navigation mode of the maps application is initiated, and a navigation mode user interface is displayed in maps application user interface 5154, as indicated at Figure DA. A navigation banner 5160 (e.g., that includes navigation direction text and/or a navigation direction image, such as a direction arrow) is displayed on the navigation mode user interface of the maps application user interface 5154.

In FIGS. 5DB-5DF, the "floating" aspect of navigation banner 5160 is illustrated, as navigation banner 5160 continues to be displayed overlying cover sheet user interface 504 (referred to above as wake screen user interface 504) as cover sheet user interface 504 slides down to cover maps application user interface 5154. FIGS. 5DD-5DE illustrate how navigation banner 5160 is anchored to time/date object 582 in cover sheet user interface 504.

FIGS. 5DB-5DF illustrate an input (e.g., a downward swipe) by a contact on touch screen 112 that is initiated at an upper edge of touch screen 112, as indicated by focus selector 5162. In response to the input, cover sheet user interface 504 slides down from the upper edge of display 112, as shown in FIGS. 5DC-5DF. As shown in FIGS. 5DC-5DD, notifications 5164 and 5168 that are displayed on cover sheet user interface 504 descend as cover sheet user interface 504 slides down, while navigation banner 5160 remains at a fixed position on cover sheet user interface 504 (e.g., cover sheet user interface 504 and its notifications 5164 and 5168 appear to slide down behind navigation banner 5160). As shown in FIGS. 5DD-5DE, in accordance with a determination that cover sheet user interface 504 has descended a threshold distance relative to navigation banner 5160, navigation banner 5160 becomes "attached" to the cover sheet user interface and begins to move downward while cover sheet user interface 504 moves downward. As shown in FIGS. 5DD-5DF, a time/date object 582 that is displayed on cover sheet user interface 504 is gradually revealed as cover sheet user interface 504 moves downward. In accordance with a determination that the time/date object 582 has reached a predefined location on the display, time/date object 582 and navigation banner 5160 cease to move as the cover sheet user interface 504 continues its descent (and notifications 5164 and 5168 continue to move downward with the cover sheet user interface 504).

In FIG. 5DG, the contact indicated by focus selector 5162 has lifted off of cover sheet user interface 504.

FIGS. 5DH-5DI illustrate input at navigation banner 5160 to display the user interface 5154 of the corresponding maps application.

In FIG. 5DH, an input (e.g., a tap input) by a contact on touch screen 112 is detected at a location that corresponds to navigation banner 5160, as indicated by focus selector 5168. In response to the input, cover sheet user interface 504 ceases to be displayed and maps application user interface 5154 is redisplayed, as indicated at FIG. 5DI. In FIG. 5DI, navigation banner 5160 is displayed on the navigation mode user interface of the maps application user interface 5154.

FIGS. 5DJ-5DS illustrate input to display a home screen user interface 522 (over which navigation banner 5160 continues to be displayed), to pull down cover sheet user interface 504 over home screen user interface 522, and to show the continuous display of navigation banner 5160 as home screen user interface 522 is revealed from under cover sheet 522.

FIG. 5DJ illustrates an input by a contact on touch screen 112 that is initiated by a contact at location that corresponds to home affordance 552, as indicated by focus selector 5170. In response to the input, display of map application user interface 5154 is replaced by display of home screen user interface 522, as shown in FIGS. 5DJ-5DM. Navigation banner 5160 remains displayed at the same position during the transition from displaying map application user interface 5154 to displaying home screen user interface 522. Navigation banner 5160 is displayed overlaying home screen user interface 522.

FIGS. 5DN-5DO illustrate an input (e.g., a downward swipe) that is initiated by a contact at a location near the upper edge of touch screen 112, as indicated by focus selector 5172. In response to the input, cover sheet user interface 504 slides down from the upper edge of display 112, as shown in FIGS. 5DN-5DP.

FIG. 5DQ illustrates an input (e.g., an upward swipe input) by a contact on touch screen 112 that is initiated by a contact at location indicated by focus selector 5174. In response to the input, display of cover sheet user interface 504 is replaced by display of home screen user interface 522, as shown in FIGS. 5DQ-5DS.

FIG. 5DT-5DW illustrate input that causes transition of navigation banner 5160 from a banner form (as shown in FIG. 5DT) to pill form (as shown in FIG. 5DW).

FIGS. 5DT-5DU illustrate an input (e.g., an upward swipe) that is initiated by a contact at a location that corresponds to navigation banner 5160, as indicated by focus selector 5176. In response to the input, navigation banner 5160 gradually transitions from a banner format, as shown in FIG. 5DT, to a pill format, as shown in FIG. 5DW. For example, as navigation banner 5160 gradually transitions from a banner format to a pill format, an animation is displayed in which navigation text 5178 in navigation banner 5160 ceases to be displayed, navigation direction arrow 5180 shrinks, navigation banner 5160 gradually shrinks and moves leftward, and a time 5182 is displayed (e.g., adjacent to navigation direction arrow 5180) in the pill format of navigation banner 5160.

FIGS. 5DX-5DW illustrate input on navigation banner 5160 (in the pill format) that causes an application that corresponds to the banner to be displayed.

In FIG. 5DX, an input (e.g., a tap input) by a contact on touch screen 112 is detected at a location that corresponds to navigation banner 5160 (in the pill format), as indicated by focus selector 5184. In response to the input, because the content of navigation banner 5160 (in the pill format) corresponds to the navigation mode of the map application, home screen user interface 522 ceases to be displayed and maps application user interface 5154 is redisplayed, as indicated at FIG. 5DY. In FIG. 5DY, navigation banner 5160 is displayed on the navigation mode user interface of the maps application user interface 5154.

FIGS. 5DZ-5EA illustrate banners that are displayed on device 100 when device 100 is in a screen-off state.

In FIG. 5DZ, device 100 has transitioned from the screen-on state, as shown in FIG. 5DY, to a screen-off state. Because the navigation mode of the map application was active when the device 100 transitioned to the screen-off state, navigation banner 5160 is displayed on device 100 while the device is in the "screen-off" state (e.g., aside from displaying the navigation banner 5160, the display 112 is blank).

In FIG. 5EA, while the device 100 is in the "screen-off" state, a notification 5186 is received. The received notification 5186 is displayed on display 112 of device 100 while the device 100 is in the "screen-off state" (e.g., aside from displaying the received notification 5186 and/or the navigation banner 5160, the display 112 is blank).

In FIG. 5EB, device 100 has transitioned from the screen-off state, as shown in FIGS. 5DZ-5EA, to a screen-on state, and cover sheet user interface 504 is displayed on the display 112 of device 100.

FIGS. 5EC-5GU illustrate example user interfaces for navigation using a cover sheet in accordance with some embodiments. The user interfaces in these figures are used to illustrate the processes described below, including the processes in FIGS. 9A-9C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5EC1 to 5EC4 illustrate activation of a display (e.g., touch-sensitive display 112) in response to changing an orientation of device 100. When the display has been activated, notifications that were received while the device was in a screen-off state were received. These notifications are displayed when the device transitions to a screen-on state. In FIG. 5EC1, the device is in a screen-off state while it is held flat in a user's hand 502, such that the device display is substantially horizontal. In FIG. 5EC2, the device is tilted such that the display is more vertical than in FIG. 5EC1. Because a tilt angle of the device has not increased above a threshold tilt angle in FIG. 5EC2, the display is not activated. In FIG. 5EC3, the device is tilted such that the display is more vertical than in FIG. 5EC2. Because a tilt angle of the device has increased above a threshold tilt angle in FIG. 5EC3, the display has transitioned from a screen-off state to a screen-on state and wake screen user interface 504 (also referred to herein as a cover sheet user interface 504) is displayed by the display 112. In FIG. 5EC4, the display 112 is substantially vertical.

FIG. 5ED illustrates a wake screen user interface 504, in accordance with some embodiments. Wake screen user interface 504 displays missed notification 5188 that was received and/or generated by device 100 (e.g., while device 100 was in a screen-off state). In some embodiments, wake screen user interface 504 additionally displays controls, such as a subset of controls from a control center user interface 5138 (e.g., a flashlight control 5190 and a camera control 5192).

In some embodiments, different input criteria must be met to activate a flashlight control 5190 when it is displayed on a wake screen user interface 504 and when it is displayed in a control center user interface 5138, as illustrated in FIGS. 5EE-5EJ and 5ET-5EW. Because wake screen user interface 504 may be displayed (e.g., in response to tilting the device) at a time when the user does not wish to provide input, more stringent criteria are applied for operating controls displayed on the wake screen user interface to prevent unintentional operation of the controls.

In some embodiments, input that has one effect when it is applied to a control (e.g., camera control 5192) when it is displayed in control center user interface 5138 has a different effect when the control is displayed in wake screen user interface 504. For example, a light press input on camera control 5192 causes a menu 5220 to be displayed when camera control 5192 is displayed in control center user interface 5138, and the light press input on camera control 5192 causes activation of a camera application when camera control 5192 is displayed in wake screen user interface 504, as illustrated by FIGS. 5EX-5FN.

In some embodiments, a time/date object 582 shifts horizontally as input for navigating from wake screen user interface 504 to adjacent user interfaces (control center user interface 5138 and widget user interface 5140) to indicate the direction of input needed to return to the wake screen user interface 504, as illustrate at FIGS. 5EJ-5EP and FIGS. 5EQ-5ES and 5FF-5FH. An overview of the arrangement wake screen user interface 504 to adjacent user interfaces control center user interface 5138 and widget user interface 5140 is shown in FIG. 5FR.

FIGS. 5EE-5EG illustrate a first flashlight activation input (e.g., a light press input) by a contact with touch screen 112, as indicated by focus selector 5194, at a location that corresponds to a flashlight control 5190 that is displayed on wake screen user interface 504. In FIG. 5EE, a characteristic intensity of the contact is above a detection threshold $IT_0$, as indicated by intensity level meter 5196, and below a light press intensity level $IT_L$. In FIG. 5EF, in accordance with a determination that a characteristic intensity of the contact has increased above a light press intensity threshold, as indicated by $IT_L$ on intensity level meter 5196, a flashlight is activated, as indicated by flashlight beam 5198. In FIG. 5EG, the contact indicated by focus selector 5194 has lifted off of touch screen 112.

FIGS. 5EH-5EI illustrate a first flashlight deactivation input (e.g., a light press input) by a contact with touch screen 112 at a location that corresponds to flashlight control 5190, as indicated by focus selector 5200. In FIG. 5EI, in accordance with a determination that a characteristic intensity of the contact has increased above a light press intensity threshold, as indicated by $IT_L$ on intensity level meter 5196 while the flashlight is on, the flashlight is shut off. In FIG. 5EJ, the contact indicated by focus selector 5200 has lifted off of touch screen 112.

FIGS. 5EK-5EL illustrate an input (e.g., a rightward swipe) that is initiated by a contact on touch screen 112, as indicated by focus selector 5202. In response to the input, wake screen user interface 504 slides to the right and mini application user interface 5140 is revealed, as shown in FIGS. 5EK-5EM. Mini application user interface 5140 displays mini application objects 583, 585, 587, and 589 that include a subset of content from application. As wake screen user interface 504 slides to the right, time/date object 582 moves from a position in the center of the display 112, as shown in FIG. 5EK, to a position at the right of the display 112, as shown in FIG. 5EM. Repositioning time/date object 582 provides a visual indication to the user of the direction of the swipe input needed to return to wake screen user interface 504.

In some embodiments, a mini application object (e.g., as illustrated by mini application objects 583, 585, 587, and 589) is configured to perform a subset, less than all, of the functions of a corresponding application. In some embodiments, a mini application object displays an identifier for the corresponding application. In some embodiments, a mini application object displays a portion of the content the corresponding application. In some embodiments, a predefined input on a mini application object launches the corresponding application. In some embodiments, a mini application object operates as a standalone application residing in memory of the device, distinct from an associated application also residing in the memory of the device. For example, a mini application object corresponding to a social networking application operates as a single-purpose or streamlined application with a subset, less than all, of the functionality of the corresponding application, but is associated with the full-featured social networking application. In this example, the mini application object operates independently of the social networking application, and in a scenario where the social networking application is not running, the mini application object continues to operate. In some embodiments, a mini application object operates as an extension or component of an associated application on the device.

FIGS. 5EN-5EO illustrate an input (e.g., a leftward swipe) that is initiated by a contact on touch screen 112, as indicated by focus selector 5204. In response to the input, mini application user interface 5140 slides to the left and wake screen user interface 504 is revealed, as shown in FIG. 5EN-5EP. As mini application user interface 5140 slides to the left, time/date object 582 moves from a position in at the right of the display 112, as shown in FIG. 5EN, to a position in the center of the display 112, as shown in FIG. 5EP. Repositioning time/date object 582 provides a visual indication to the user of the direction of the swipe input needed to return to wake screen user interface 504.

FIGS. 5EQ-5ER illustrate an input (e.g., a leftward swipe) that is initiated by a contact on touch screen 112, as indicated by focus selector 5206. In response to the input, wake screen user interface 504 slides to the left and control center user interface 5138 is revealed, as shown in FIG. 5EQ-5ES. As wake screen user interface 5140 slides to the left, time/date object 582 moves from a position in at the center of the display, as shown in FIG. 5EQ, to a position at the left of the display, as shown in FIG. 5ES. Repositioning time/date object 582 provides a visual indication to the user of the direction of the swipe input needed to return to wake screen user interface 504.

FIG. 5ET illustrates a second flashlight activation input (e.g., a tap input) by a contact with touch screen 112, as indicated by focus selector 5208, at a location that corresponds to a flashlight control 5190 that is displayed on control center user interface 5138. In response to the input, a flashlight is activated, as indicated by flashlight beam 5210 in Figure EU. Because a wake screen user interface 504 is displayed on waking the device (e.g., when the device is tilted as described with regard to FIGS. 5EC1-5EC4), input that meets threshold intensity criteria (e.g., light press intensity criteria) is needed to activate the flashlight using a flashlight control 5190 displayed in the wake screen user interface 504. In this way, accidental activation of the flashlight is avoided. When the user has provided input to navigate to control center user interface 5138, a tap input (as described with regard to FIGS. 5ET-5EU) is sufficient to activate the flashlight.

FIG. 5EV illustrates a second flashlight deactivation input (e.g., a tap input) by a contact with touch screen 112 at a location that corresponds to flashlight control 5190, as indicated by focus selector 5212. In response to the input, the flashlight is shut off, as indicated at FIG. 5EW.

FIG. 5EX illustrates a control center camera application activation input (e.g., a tap input) by a contact with touch screen 112, as indicated by focus selector 5214, at a location that corresponds to a camera control 5192 that is displayed on control center user interface 5138. In response to the control center camera application activation input, display of the control center user interface 5138 is replaced by display of a camera application user interface 5216, as shown in FIG. 5EY.

FIGS. 5EZ-5FB illustrate camera menu display input (e.g., a light press input) by a contact with touch screen 112, as indicated by focus selector 5218, at a location that corresponds to a camera control 5192 that is displayed on control center user interface 5138. In FIG. 5FA, a characteristic intensity of the contact is above a detection threshold $IT_0$, as indicated by intensity level meter 5196, and below a light press intensity level $IT_L$. In FIG. 5FB, in accordance with a determination that a characteristic intensity of the contact increases above a light press intensity threshold, as indicated by $IT_L$ on intensity level meter 5196, a camera menu 5220 is displayed overlaying control center user interface 5138.

In FIG. 5FC, the contact indicated by focus selector 5218 has lifted off from touch screen 112.

In FIG. 5FD, an input (e.g., a tap input) by a contact on touch screen 112 is detected at a location outside of camera menu 5220, as indicated by focus selector 5222. In response to the input, camera menu 5220 ceases to be displayed overlaying control center user interface 5138, as shown in FIG. 5FE.

FIGS. 5FF-5FG illustrate an input (e.g., a rightward swipe) that is initiated by a contact on touch screen 112, as indicated by focus selector 5224. In response to the input, control center user interface 5138 slides to the right and wake screen user interface 504 is redisplayed, as shown in FIGS. 5FG-5FH. As control center user interface 5138 slides to the right, time/date object 582 moves from a position in the left of the display, as shown in FIG. 5FF, to a position at the center of the display, as shown in FIG. 5FH.

FIG. 5FI illustrates an input (e.g., a tap input) by a contact with touch screen 112, as indicated by focus selector 5226, at a location that corresponds to a camera control 5192 that is displayed on wake screen user interface 504. As shown in FIGS. 5FI-5FJ, a tap input on camera control 5192 that is displayed on wake screen user interface 504 has no effect (unlike a tap input on camera control 5192 displayed in control center user interface 5138, which causes a camera application user interface 5216 to be displayed, as discussed with regard to FIGS. 5EX-5EY).

Whereas a light press input on a camera control displayed in control center user interface 5138 causes a camera menu 5220 to be displayed, a light press input on a camera control displayed in wake screen user interface 504 causes a camera application user interface 5216 to be displayed. FIGS. 5FK-5FL illustrate a wake screen camera activation input (e.g., a light press input) by a contact with touch screen 112, as indicated by focus selector 5228, at a location that corresponds to a camera control 5192 that is displayed on wake screen user interface 504. In FIGS. 5FK-5FL, a characteristic intensity of the contact is above a detection threshold $IT_0$, as indicated by intensity level meter 5196, and below a light press intensity level $IT_L$. In FIG. 5FM, in accordance with a determination that a characteristic intensity of the contact has increased above a light press intensity threshold, as indicated by $IT_L$ on intensity level meter 5196, display of the wake screen user interface 504 is replaced by display of a camera application user interface 5216.

FIGS. 5FN-5FT illustrate that, in response to authentication input (e.g., as shown in FIG. 5FP, additional notification information is displayed on wake screen user interface 504.

FIG. 5FN illustrates an input (e.g., an upward swipe) by a contact on touch screen 112 that is initiated at a lower edge of touch screen 112, as indicated by focus selector 5230. In response to the input, in accordance with a determination that the device is locked, an authentication user interface 518 is displayed, as shown in FIG. 5FO.

In FIG. 5P, an authentication input (e.g., a tap input) by a contact on touch screen 112 is detected at a location within authentication user interface 518, as indicated by focus selector 5232. In response to the authentication input, the device is unlocked and home screen user interface 522 is displayed, as shown in FIG. 5FQ.

FIG. 5FR illustrates an input (e.g., a downward swipe) that is initiated by a contact at a location near the upper edge of touch screen 112, as indicated by focus selector 5232. In response to the input, wake screen user interface 504 slides down from the upper edge of display 112, as shown in FIGS. 5FR-5FT. When wake screen user interface 504 is displayed while device 100 is unlocked, as shown in FIG. 5FT, notification 5188 is displayed with information (e.g., message text 5234 and an image 5236) that were not displayed while device 100 was locked (see, e.g., FIG. 5ED), and an additional notification 5190 is displayed.

FIG. 5FU illustrates an arrangement of wake screen user interface 504 and adjacent user interfaces control center user interface 5138 and widget user interface 5140. As discussed above with regard to FIGS. 5EK-5EP, a rightward swipe on wake screen user interface 504 causes widget user interface 5140 to be displayed, and a leftward swipe on widget user interface 5140 causes wake screen user interface 504 to be displayed. As discussed above with regard to FIGS. 5EQ-5ES and FIGS. 5FF-5FH, a leftward swipe on wake screen user interface 504 causes control center user interface 5138 to be displayed, and a rightward swipe on control center user interface 5138 causes wake screen user interface 504 to be displayed. An upward swipe on wake screen user interface 504 causes a previously displayed user interface (e.g., home screen user interface 522, an application user interface, or a settings user interface) to be displayed.

As illustrated in FIGS. 5FV-5GB, when input to display widget user interface 5140 or control center user interface 5138 is received, the state of a user interface that is adjacent to wake screen user interface 504 being displayed is not "sticky," in that when widget user interface 5140 or control center user interface 513 are displayed and subsequently dismissed, a subsequent downward swipe input from the upper edge of display 112 will cause wake screen user interface 504 (and not widget user interface 5140 or control center user interface 513) to be displayed.

FIGS. 5FV-5FW illustrate an input (e.g., a rightward swipe) that is initiated by a contact on touch screen 112, as indicated by focus selector 5238. In response to the input, wake screen user interface 504 slides to the right and mini application user interface 5140 is revealed, as shown in FIGS. 5FV-5FX.

FIG. 5FY illustrates an input (e.g., an upward swipe) by a contact on touch screen 112 that is initiated at a lower edge of touchscreen 112 by a contact at location that is indicated by focus selector 5240. In response to the input, display of mini application user interface 5140 is replaced by display of home screen user interface 522, as shown in FIGS. 5FY-5FZ.

In FIGS. 5FZ-5GB, after an input is received for navigation to a user interface that is adjacent to wake screen user interface 504 (e.g., to navigate to mini application user interface 5140 or control center user interface 5138) and a subsequent input is received to dismiss the user interface that is adjacent to wake screen user interface 504 (e.g., the input in FIG. 5FY to reveal home screen 522), a downward swipe reveals wake screen user interface 504 (and not the adjacent interface that was displayed prior to the dismissal input). For example, in FIG. 5FZ, an input (e.g., a downward swipe) is initiated by a contact at a location near the upper edge of touch screen 112, as indicated by focus selector 5242. In response to the input, wake screen user interface 504 (and not mini application user interface 5140) slides down from the upper edge of display 112, as shown in FIGS. 5FZ-5GB.

FIGS. 5GC-5GP illustrate input to display a maps application, activate a navigation mode of the maps application and display a navigation banner 5160, and transition the navigation banner 5160 from a pill form, as shown in FIG. 5FM, to a banner form, as shown in FIG. 5GP, in accordance with some embodiments.

FIG. 5GC illustrates an input (e.g., an upward swipe) by a contact on touch screen 112 that is initiated by a contact at location that corresponds to home affordance 552, as indicated by focus selector 5244. In response to the input, display of wake screen user interface 504 is replaced by display of home screen user interface 522, as shown in FIGS. 5GC-5GD.

In FIG. 5GE, an input (e.g., a tap input) is detected at a location that corresponds to affordance 5248 for displaying a maps application interface, as indicated by focus selector 5246. In response to the input, a maps application user interface 5154 is displayed, as shown in FIG. 5GF.

In FIG. 5GH, an input (e.g., a tap input) by a contact on touch screen 112 is detected at a location that corresponds to a control 5156 for activating a navigation mode of the maps application, as indicated by focus selector 5250. In response to the input, the navigation mode of the maps application is initiated, and a navigation mode user interface is displayed in maps application user interface 5154, as indicated at FIG. 5GI.

FIG. 5GJ illustrates an input (e.g., an upward swipe) by a contact on touch screen 112 that is initiated by a contact at location that corresponds to home affordance 552, as indicated by focus selector 5252. In response to the input, display of wake screen user interface 504 is replaced by display of home screen user interface 522, as shown in FIGS. 5GK-5GL. In FIG. 5GL, a navigation banner 5160 is displayed in a pill format within home screen user interface 522.

FIGS. 5GM-5GO illustrate an input (e.g., a downward swipe) that is initiated by a contact at a location near the upper edge of touch screen 112, as indicated by focus selector 5254. In response to the input, wake screen user interface 504 slides down from the upper edge of display 112, as shown in FIGS. 5GM-5GP. As wake screen user interface 504 slides down, navigation banner 5160 transitions from a pill format, as shown in FIG. 5GM, to a banner format, as shown in FIG. 5GP. For example, as navigation banner 5160 gradually transitions from a pill format to a banner format, an animation is displayed in which navigation text 5178 is displayed in navigation banner 5160, navigation direction arrow 5180 grows, navigation banner 5160 gradually grows and moves toward the center of display 112, and time 5182 ceases to be displayed.

From FIG. 5GP to FIG. 5GQ, the information displayed in navigation banner 5160 has updated (e.g., in accordance with a changed location of the phone as the user proceeds along the navigation route), indicating that the content of navigation banner 5160 updates (e.g., in real time) while navigation banner 5160 is displayed.

FIG. 5GR illustrates an input (e.g., an upward swipe) by a contact on touch screen 112 that is initiated at a location near the lower edge of touch screen 112, as indicated by focus selector 5256. In response to the input, wake screen user interface 504 slides up from the lower edge of display 112 to redisplay the underlying maps user interface 5154 (that was previously covered by wake screen user interface 504).

FIG. 5GT illustrates an input (e.g., an upward swipe) by a contact on touch screen 112 that is initiated by a contact at location that corresponds to home affordance 552, as indicated by focus selector 5258. In response to the input, display of wake screen user interface 504 is replaced by display of home screen user interface 522, as shown in FIGS. 5GT-5GU. In FIG. 5GU, because the navigation mode of maps application 5154 is still active, a navigation banner 5160 is displayed in a pill format within home screen user interface 522.

From FIG. 5GL to FIG. 5GU, the information displayed in the pill format version of navigation banner 5160 has updated (e.g., in accordance with a changed location of the phone as the user proceeds along the navigation route), indicating that the content of the pill format version of navigation banner 5160 updates (e.g., in real time) while navigation banner 5160 is displayed.

In FIGS. 5GV-5GW, the color of one or more objects on wake screen user interface 504 (e.g., time/date object 582, navigation banner 5188, notification 5188, and/or notification 5234) are altered in accordance with a change in a background color and/or image of wake screen user interface 504.

FIGS. 5GX-5HR illustrate a panel-based cover sheet user interface 5260 (e.g., a wake screen displayed on a device with a large format display, such as a tablet device). In some embodiments, when panel-based cover sheet user interface 5260 is dismissed and subsequently recalled, a state of the panel-based cover sheet user interface 5260 when panel-based cover sheet user interface 5260 is recalled is the same as the state of panel-based cover sheet user interface 5260 prior to the dismissal.

In FIG. 5GX, panel-based cover sheet user interface 5260 is displayed on display 112. A notification panel 5262 is displayed on panel-based cover sheet user interface 5260.

FIGS. 5GY-5GZ illustrate an input (e.g., a rightward swipe) that is initiated by a contact on touch screen 112, as indicated by focus selector 5264. In response to the input, notification panel 5262 slides to the right and a mini application panel 5266 is revealed, as shown in FIGS. 5GZ-5HA. In FIG. 5HA, notification panel 5262 and mini application panel 5266 are simultaneously displayed on panel-based cover sheet user interface 5260.

FIGS. 5HB-5HC illustrate an input (e.g., an upward swipe) by a contact on touch screen 112 that is initiated at a lower edge of touchscreen 112 by a contact at location that is indicated by focus selector 5268. In response to the input, panel-based cover sheet user interface 5260 slides upward to reveal home screen user interface 522, as shown in FIGS. 5HB-5HD.

FIGS. 5HE-5HF illustrate an input (e.g., a downward swipe) by a contact on touch screen 112 that is initiated at an upper edge of touchscreen 112 by a contact at location that is indicated by focus selector 5272. In response to the input, panel-based cover sheet user interface 5272 slides downward over home screen user interface 522, as shown in FIGS. 5HE-5HG. Notification panel 5262 and mini application panel 5266, which were simultaneously displayed on panel-based cover sheet user interface 5260 prior to dismissal of panel-based cover sheet user interface 5272, continue to be displayed when panel-based cover sheet user interface 5260 is redisplayed.

FIGS. 5HH-5HI illustrate an input (e.g., a leftward swipe) that is initiated by a contact on touch screen 112, as indicated by focus selector 5274. In response to the input, notification panel 5274 slides to the left, until notification panel 5274 ceases to be displayed, and a control center panel 5278 is revealed, as shown in FIGS. 5HH-5HL. In FIG. 5HL, notification panel 5262 and control center panel 5278 are simultaneously displayed on panel-based cover sheet user interface 5260.

FIGS. 5HM-5HN illustrate an input (e.g., an upward swipe) by a contact on touch screen 112 that is initiated at a lower edge of touchscreen 112 by a contact at location that is indicated by focus selector 5278. In response to the input, panel-based cover sheet user interface 5260 slides upward to reveal home screen user interface 522, as shown in FIGS. 5HM-5HO.

FIGS. 5HP-5HF illustrate an input (e.g., a downward swipe) by a contact on touch screen 112 that is initiated at an upper edge of touchscreen 112 by a contact at location that is indicated by focus selector 5280. In response to the input, panel-based cover sheet user interface 5272 slides downward over home screen user interface 522, as shown in FIGS. 5HP-5HR. Notification panel 5262 and control center panel 5278, which were simultaneously displayed on panel-based cover sheet user interface 5260 prior to dismissal of panel-based cover sheet user interface 5272, continue to be displayed when panel-based cover sheet user interface 5260 is redisplayed.

FIGS. 6A-6G are flow diagrams illustrating method 600 of clearing sets of notifications, in accordance with some embodiments. Method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way to clear sets of notifications. The method reduces the number, extent, and/or nature of the inputs from a user when clearing sets of notifications, thereby creating a more efficient human-machine interface. For battery-operated electronic devices, enabling a user to clear sets of notifications faster and more efficiently conserves power and increases the time between battery charges.

While the device is in a screen-off state (e.g., as shown in FIGS. 5A1-5A2), the device receives (602) one or more notifications.

After receiving the one or more notifications (e.g., while the device remains in the screen-off state, or while the one or more notifications are displayed on a dark screen of the screen-off state), the device detects (604) a first input from a user for waking the device from the screen-off state to a screen-on state (e.g., the device detects a state change indicating that the device has been picked up, as described with regard to FIGS. 5A1-5A4, or the device detects an input at a control, such as push button 106, for waking the device).

In response to detecting the first input for waking the device from the screen-off state to the screen-on state, the device (606): transitions the device from the screen-off state to the screen-on state (e.g., as shown at FIGS. 5A2-5A3), displays a wake screen user interface 504 on the display 112 (as shown in FIGS. 5A3 and 5B), and displays the one or more notifications (e.g., notifications 506, 508, 510, and 512 shown in FIG. 5B) on the wake screen user interface 504 (e.g., the notifications are displayed as a list of notification banners below a time-date object 582). These notifications are sometimes also referred to as "missed notifications" because they were received while the device was in the screen-off state. In some embodiments, the wake screen user interface 504 is also a cover sheet user interface that is displayed to cover a currently displayed user interface when a downward edge swipe gesture (e.g., a downward swipe that starts from an upper edge of the touch-sensitive surface 112) is detected on the display 112. In some embodiments, the wake screen user interface 504 includes a time-date object 582 showing the current time and date, and/or one or more prompts or affordances for unlocking the device from a locked state to an unlocked state.

While displaying the wake screen user interface 504 and while at least one of the one or more notifications remains displayed on the wake screen user interface 504 (e.g., at a later time after the user has interacted with the device which may include interactions that cause the dismissal and then redisplay of the wake screen user interface one or more times), the device detects (608) a second input for dismissing the wake screen user interface (e.g., an upward swipe input to reveal an underlying user interface or an input (e.g., on a power button) to shut off the display).

In response to detecting the second input for dismissing the wake screen user interface, the device ceases (610) to display the wake screen user interface 504 and the at least one of the one or more notifications (e.g., notifications 506, 508, 510, and 512 shown in FIG. 5B). In some embodiments, the device reveals an underlying interface such as a home screen user interface 522, a settings user interface, or an application user interface (e.g., messages user interface 530, web browser user interface 540, music user interface 560, or maps user interface 5154.

After ceasing to display the wake screen user interface 504 and the at least one of the one or more notifications in response to the second input, the device detects (612) a third input for redisplaying the wake screen user interface (e.g., the third input may be an input for waking the device again after the device has transitioned back to the screen-off state, or an input (e.g., a downward swipe from the top of the touch-screen) for redisplaying the wake screen user interface after the wake screen user interface has been dismissed while the device remains in the screen-on state).

In response to detecting the third input for redisplaying the wake screen user interface 504 (614), in accordance with a determination that the third input meets notification-clearance criteria (e.g., notification-clearance criteria are criteria for completely removing all remaining missed notifications from the wake screen user interface and, optionally, deleting the notifications or saving them to notification history), the device redisplays the wake screen user interface 504 without displaying the at least one of the one or more notifications on the redisplayed wake screen user interface 504 (e.g., all previously displayed missed notifications are cleared from the wake screen user interface). The notification-clearance criteria require that the third input is detected at a time that is (1) after a respective notification of the one or more notifications has been cleared through direct user interaction with the respective notification or an application that corresponds to the respective notification and (2) after the device has transitioned from the screen-on state to the screen-off state at least once since the detection of the second input (e.g., since the last input for dismissing the wake screen user interface was detected). Examples of user interaction with the respective notification include an input to activate a displayed deletion control, such as an "x" icon displayed adjacent to the notification (e.g., a tap gesture by a contact at a location that corresponds to the displayed control), an input (such as a deep press or swipe gesture) on the notification to dismiss or delete the notification or to reveal a control for dismissing the notification followed by an input to activate a control for dismissing the notification, or an input to open the notification in an application (e.g., a tap gesture by a contact at a location that corresponds to the notification). For example, the input described with regard to FIGS. 5AV-5AW (e.g., the input to wake the device) is detected at a time that is (1) after a respective notification of the one or more notifications has been cleared through direct user interaction with the respective notification or an application that corresponds to the respective notification (e.g., described with regard to FIGS. 5L-5P and FIGS. 5Y-5AC) and (2) after the device has transitioned from the screen-on state to the screen-off state at least once since the detection of the second input (e.g., as described with regard to FIGS. 5AU-5AW). In accordance with a determination that the third input does not meet the notification-clearance criteria: the device redisplays the wake screen user interface, and redisplays the at least one of the one or more notifications on the redisplayed wake screen user interface (e.g., continuing to display all of the notifications that were not dismissed by the user through direct user interaction (e.g., all or a subset of all the missed notifications that were received during the screen-off state)).

This heuristic allows a device to either automatically clear a set of missed notifications or to redisplay a set of missed notifications displayed on a wake screen depending on whether notification-clearance criteria are met. Automatically clearing a set of missed notifications in accordance with a determination that notification-clearance criteria are met makes the user-device interface more efficient and enhances the operability of the device by providing the user with the ability to clear multiple notifications without requiring the user to manually dismiss each notification, while retaining the ability of the user to individually clear missed notifications in the set of multiple notifications (e.g., by maintaining the device in a screen-on session while interacting with the individual notifications). Enabling the user to use the device more quickly and efficiently reduces power usage and improves battery life of the device.

In some embodiments, in response to detecting the third input for redisplaying the wake screen user interface, and in accordance with the determination that the third input does not meet the notification-clearance criteria (616), in accordance with a determination that one or more notification-clearance interactions have occurred (e.g., through a direct user interaction with a notification or interaction with an application that corresponds to a notification), the device forgoes display of one or more notifications that are cleared by the one or more notification-clearance interactions on the redisplayed wake screen user interface 504. For example, notification-clearance interactions are described with regard to FIGS. 5L-5P and FIGS. 5Y-5AC. In FIG. 5P, notification 510 is not displayed due to interaction with notification 510 that occurred in FIG. 5L (to cause display of messages application 530). In FIG. 5AC, notification 506 is not displayed due to the interaction with notification 506 that occurred in Figure AB (to cause deletion of the notification). In some embodiments, in accordance with a determination that no notification-clearance interactions have occurred, all of the one or more notifications are redisplayed on the redisplayed wake screen user interface.

Forgoing display of one or more notifications that are cleared by the one or more notification-clearance interactions on the redisplayed wake screen user interface reduces the amount of information displayed on the redisplayed wake screen. Reducing the amount of information displayed on the redisplayed wake screen makes the user-device interface more efficient and enhances the operability of the device by allowing a user to access notification information that the user has not previously reviewed without having to navigate past information that the user has previously reviewed.

In some embodiments, after detecting the first input for waking the device from the screen-off state to the screen-on state and prior to detecting the second input for dismissing the wake screen user interface (618), the device detects a plurality of intermediate inputs, the plurality of intermediate inputs including: a first intermediate input for dismissing the wake screen user interface (in response to which the wake screen is dismissed and a background user interface is revealed, or in response to which the device goes into the screen-off state and the screen is dark with no interface displayed), and a second intermediate input for redisplaying the wake screen user interface (in response to which the wake screen is redisplayed over a currently displayed user interface, or in response to which the device is woken to the screen-on state and the wake-screen user interface is displayed as soon as the display is turned on). For example, in FIGS. 5B-5C, the device transitions from a screen-on state to a screen-off state (e.g., in response to a user input to shut off the display), and at FIGS. 5C-5D, the device transitions back to a screen-on state (e.g., in response to a user input to wake the display). In FIGS. 5Q-5R, wake screen user interface 504 is dismissed, and in FIGS. 5V-5X, wake screen user interface 504 is redisplayed.

Maintaining display of a set of missed notifications after detecting intermediate inputs for dismissing and redisplaying a wake screen user interface makes the user-device interface more efficient and enhances the operability of the device by allowing a user to display the wake screen repeatedly (e.g., to view the time or check for an incoming notification) while maintaining a list of missed notifications for the user to handle when the user is ready to interact with the notifications (without requiring the user to provide input for redisplaying the missed notifications while the wake screen is displayed).

In some embodiments (620), the second input for dismissing the wake screen user interface is an input for displaying a first user interface (e.g., an application user interface such as messages user interface 530 or music user interface 560, a settings management user interface, a springboard user interface (home screen user interface 522) that includes a plurality of application launch icons, etc.) that is distinct from the wake screen user interface, the first user interface is displayed in response to the second input (e.g., after the wake screen user interface is dismissed, the first user interface is revealed from underneath the wake screen user interface), and the third input for redisplaying the wake screen user interface was received while the first user interface is displayed. For example, in FIGS. 5L-5M, an wake screen user interface 504 is dismissed in response to user input that causes messages user interface 530 to be displayed. While messages user interface 530 is displayed, input to redisplay wake screen user interface is received as described with regard to FIGS. 5N-5P.

Redisplaying the wake screen in response to input received while a first user interface (such as an application user interface, a springboard user interface, or a settings management user interface) is displayed allows a user to access the wake screen (and any missed notifications displayed on the wake screen) at all times while using the device. This makes the user-device interface more efficient and enhances the operability of the device by allowing a user to access the wake screen without requiring the user to navigate through multiple interfaces to gain access to the wake screen).

In some embodiments (622), the third input for redisplaying the wake screen user interface 504 is received while a content playback application is active (e.g., in response to an activation input as described with regard to FIG. 5AK), and redisplaying the wake screen user interface includes displaying (e.g., above the one or more missed notifications) at least one media playback control 572 (e.g., in a media playback control panel 568) in the wake screen user interface 504. In some embodiments, the playback controls are displayed on the wake screen user interface 504 whenever the wake screen user interface is displayed while the content playback application is active (e.g., media playback is ongoing).

Displaying at least one media playback control on the wake screen user interface (e.g., in addition to the time and/or missed notifications) while a content playback application is active allows a user to control playback via the displayed media playback control immediately upon waking the device, or by accessing the wake screen at any time while using the device. This makes the user-device interface more efficient and enhances the operability of the device by allowing a user to view the time and/or missed notifications while accessing the device to control media playback without needing to unlock the device and/or navigate through multiple interfaces.

In some embodiments, while the wake screen user interface 504 is displayed, the device detects (624) a fourth input by a contact on the touch-sensitive surface, including detecting movement of the contact along the touch-sensitive surface in a first direction (e.g., downwards) and detecting lift-off of the contact after the movement (e.g., as described with regard to FIGS. 5AW-5AZ). In response to detecting the fourth input, the device: moves at least one object (e.g., an object 582 that displays a current time and/or date) displayed on the wake screen user interface 504 (e.g., in the first direction) in accordance with the movement of the contact, and reverses the movement of the at least one object (e.g., moving in a second direction opposite the first direction, e.g., upwards) upon lift-off of the contact.

Providing visual feedback, such as a "rubber band effect" simulated by moving at least one object in accordance with movement of a contact and reversing the movement of the at least one object upon lift-off of the contact, enhances operability of the device by providing an intuitive indication to the user that the wake screen is responsive to input such as a swipe input) to view additional notifications and thereby helping the user to provide proper inputs to achieve a desired outcome. The indication is intuitive because the user receives the information without the need to display additional instruction to the user for understanding the feature).

In some embodiments, while displaying the one or more notifications on the wake screen user interface, the device detects (626) a fifth input by a contact on the touch-sensitive surface (e.g., a tap input) at a location that corresponds to a first notification of the one or more notifications. In response to detecting the fifth input, the device ceases to display the wake screen user interface and displays a first application user interface for a first application that corresponds to the first notification. For example, in FIG. 5L, an input at a location that corresponds to notification 510 is detected. In FIG. 5M, in response to the detected input, messages application user interface 530 is displayed.

Displaying an application user interface for an application that corresponds to a notification in response to input detected at a location that corresponds to the notification makes the user-device interface more efficient and enhances the operability of the device by allowing a user to interact with an application with minimal input immediately upon waking the device or otherwise accessing a missed notification on the wake screen user interface.

In some embodiments, while displaying the first application user interface for the first application that corresponds to the first notification (e.g., messages application user interface 530, as shown in FIGS. 5M-5N), the device detects (628) a sixth input for redisplaying the wake screen user interface (e.g., an input as described with regard to FIGS. 5N-5O). In response to detecting the sixth input for redisplaying the wake screen user interface, the device ceases to display the first application user interface (e.g., as shown in FIG. 5O), displays the wake screen user interface (e.g., as shown in FIG. 5P), displays at least one second notification of the one or more notifications on the wake screen user interface (e.g., notifications 506, 508, and 512), wherein the at least one second notification corresponds to a second application that is distinct from the first application, and forgoes display of the first notification (and, optionally, any other notifications among the one or more missed notifications that correspond to the first application) on the wake screen user interface 504 with the at least one second notification. For example, in FIG. 5P, notification 510 is no longer displayed.

Forgoing display of a notification on the wake screen user interface after displaying an application interface of an application that corresponds to the notification reduces the amount of information displayed on the redisplayed wake screen. Reducing the amount of information displayed on the redisplayed wake screen makes the user-device interface more efficient and enhances the operability of the device by allowing a user to access notification information that the user has not previously reviewed without having to navigate past information that the user has previously reviewed (e.g., when accessing an application interface for an application that corresponds to the notification).

In some embodiments, after detecting the sixth input, while displaying the wake screen user interface 504, the device detects (630) a seventh input for dismissing the wake screen user interface (e.g., including detecting an upward swipe gesture on the touch-sensitive surface). In response to detecting the seventh input for dismissing the wake screen user interface, the device ceases to display the wake screen user interface (e.g., by pulling the wake screen user interface 504, which is used as a "cover sheet" user interface, upward), and redisplays the first application user interface for the first application. For example, FIGS. 5Q-5R show an input that causes wake screen user interface 504 to slide up to reveal the underlying messages application user interface 530.

Redisplaying a last displayed user interface after dismissing the wake screen user interface allows the user to return to a previous operating context without requiring multiple inputs, thereby making the user-device interface more efficient (e.g., by reducing the number of inputs needed to return to a previously viewed user interface).

In some embodiments, while the first application user interface for the first application (e.g., messages user interface 530 for a messages application) is redisplayed, the device detects (632) an eighth input (e.g., as described with regard to FIGS. 5S-5T) for invoking a third application that is distinct from the first application and the second application. In response to detecting the eighth input for invoking the third application, the device displays a third application user interface of the third application (e.g., browser application user interface 540 for a web browser application). After detecting the eighth input, while displaying the third application user interface, the device detects a ninth input (e.g., as described with regard to FIG. 5V-5W) for redisplaying the wake screen user interface (e.g., including detecting a downward edge swipe gesture (e.g., a downward swipe that starts from an upper edge of the touch-sensitive surface 112)). In response to detecting the ninth input for redisplaying the wake screen user interface 504, the device ceases to display the third application user interface, displays the wake screen user interface 504 (e.g., pull down the wake screen user interface over the second application user interface), and redisplays the at least one second notification of the one or more notifications on the wake screen user interface without redisplaying the first notification (or, optionally, any missed notifications that correspond to the first application and the third application). For example, in FIG. 5X, wake screen user interface 504 is displayed with notifications 506, 508, and 512.

Maintaining display of a set of missed notifications after detecting intermediate inputs for dismissing and redisplaying a wake screen user interface makes the user-device interface more efficient and enhances the operability of the device by allowing a user to display the wake screen repeatedly (e.g., to view the time or check for an incoming notification) while maintaining a list of missed notifications for the user to handle when the user is ready to interact with the notifications (without requiring the user to provide input for redisplaying the missed notifications while the wake screen is displayed).

In some embodiments, after displaying the at least one second notification without displaying the first notification on the wake screen user interface (e.g., in FIG. 5AU, notifications 508 and 512 are displayed and notifications 506 and 510 are no longer displayed), the device detects (634) a first transition from the screen-on state to the screen-off state (e.g., the transition is triggered when an amount of time that has passed since a last input was received increased above a threshold time, or when an input is received at a control for shutting off the display) followed by a second transition from the screen-off state to the screen-on state (e.g., when an input is received to wake the device or turn on the display). For example, FIGS. 5AU-5AV illustrate a transition from the screen-on state to the screen-off state and FIGS. 5AV-5AW illustrate a transition from the screen-off-state to the screen-on state. In response to detecting the first transition followed by the second transition: the device redisplays the wake screen user interface without displaying any of the one or more notifications on the wake screen user interface (e.g., the notification-clearance criteria are met, and all of the missed notifications that were still remaining on the wake screen are now cleared). For example, in FIG. 5AW, no notifications are displayed.

Automatically clearing a set of missed notifications in accordance with a determination that notification-clearance criteria are met makes the user-device interface more efficient and enhances the operability of the device by providing the user with the ability to clear multiple notifications without requiring the user to manually dismiss each notification. Enabling the user to use the device more quickly and efficiently reduces power usage and improves battery life of the device.

In some embodiments, while displaying the wake screen user interface with all of the one or more notifications (e.g., before the user interacted with one of the notifications or opened an application that corresponds to one of the one or more notifications), the device detects (636) a third transitioning from the screen-on state to the screen-off state (e.g., the transition is triggered when an amount of time that has passed since a last input was received increased above a threshold time, or when an input is received at a control for shutting off the display) followed by a fourth transition from the screen-off state to the screen-on state (e.g., when an input is received to wake the device or turn on the display). For example, a transition from the screen-on state to the screen-off state is shown in FIGS. 5B-5C and a transition from the screen-off state to the screen-on state is shown in FIGS. 5C-5D. In response to detecting the third transition followed by the fourth transition, the device redisplays the wake screen user interface with the one or more notifications on the wake screen user interface (e.g., all of the missed notifications still remain on the wake screen). For example, in FIG. 5D, all of the notifications 506-512 displayed in FIG. 5B are redisplayed.

Maintaining display of a set of missed notifications after a transition from the screen-on state to the screen-off state followed by a transition from the screen-off state to the screen-on state makes the user-device interface more efficient and enhances the operability of the device by allowing a user to display the wake screen repeatedly (e.g., to view the time or check for an incoming notification) while maintaining a list of missed notifications for the user to handle when the user is ready to interact with the notifications (without requiring the user to provide input for redisplaying the missed notifications while the wake screen is displayed).

In some embodiments, while displaying the wake screen user interface with the one or more notifications, the device detects (638) a tenth input (e.g., an upward swipe gesture on the touch-sensitive surface) for displaying an authentication user interface 518 (e.g., including a password input prompt, such as a number pad). In response to detecting the tenth input for displaying the authentication user interface: the device ceases to display the wake screen user interface 504 and displays the authentication user interface 518. For example, in response to an input described with regard to FIG. 5E, authentication user interface 518 is displayed in FIG. 5F. While the authentication user interface 518 is displayed, the device detects an authorization input (e.g., a passcode entered via the number pad). In accordance with a determination that the authorization input is valid, the device displays a second user interface (e.g., an application user interface, a settings user interface, or a home screen user interface). For example, in response to detecting the authorization input shown in FIG. 5G, home screen user interface 522 is displayed in FIG. 5H. While displaying the second user interface, the device detects an eleventh input for redisplaying the wake screen user interface 504 (e.g., detecting a downward swipe gesture on the touch-sensitive surface (e.g., a downward swipe gesture that started from the top edge of the touch-sensitive surface)). In response to detecting the eleventh input, the device ceases to display the second application user interface; and redisplays the wake screen user interface with the one or more notifications. For example, an input for redisplaying wake screen user interface 504 received while home screen user interface 522 is displayed is shown in FIGS. 5I-5J. In some embodiments, in accordance with a determination that the authorization input is not valid, the second user interface is not displayed and/or the user is prompted for additional authorization input. In some embodiments, the authentication is automatically performed, and detecting an upward swipe gesture dismisses the wake screen user interface and reveals the last active user interface prior to the device's transition from the screen-on state to the screen-off state, or the last active user interface prior to the device's transition from the unlocked state to the locked state.

Maintaining display of a set of missed notifications after detecting intermediate inputs for dismissing and redisplaying a wake screen user interface makes the user-device interface more efficient and enhances the operability of the device by allowing a user to display the wake screen repeatedly (e.g., to view the time or check for an incoming notification) while maintaining a list of missed notifications for the user to handle when the user is ready to interact with the notifications (without requiring the user to provide input for redisplaying the missed notifications while the wake screen is displayed).

In some embodiments, in accordance with the determination that the third input meets the notification-clearance criteria, the device adds (640), to a set of recent notifications, one or more cleared notifications that correspond to the at least one of the one or more notifications not displayed on the wake screen user interface. In some embodiments, when the notification-clearance criteria are met, all of the missed notifications are cleared from the wake screen user interface/cover sheet user interface, and are added to a list of recent notifications. In some embodiments, when a missed notification is individually cleared by direct user interaction with that notification, that notification is added to the list of recent notifications.

Adding a cleared notification to a set of recent notifications makes the cleared notification available for future user access. Making a cleared notification available for future user access makes the user-device interface more efficient by allowing a user to view notification content associated with multiple applications without individually accessing each application).

In some embodiments, after adding the one or more cleared notifications to the set of recent notifications, while the wake screen user interface is displayed, the device detects (642) a twelfth input (e.g., an upward swipe on the touch-screen that pulls on a currently displayed notification, or an input on a control for revealing recent notifications). In response to detecting the twelfth input, in accordance with a determination that the twelfth input meets recent-notification-display criteria, the device displays at least a portion of the set of recent notifications (e.g., overlaid on the wake screen user interface). For example, in FIGS. 5BJ-5BO, notifications 506-512, that were cleared as discussed with regard to 5A-5AW, are redisplayed in response to an input that meets recent-notification-display criteria.

Displaying notifications from a set of recent notifications in response to input on the wake screen user interface allows a user to view a sequential list of notification content (e.g., including notifications that were previously cleared). Allowing a user to view a sequential list of notification content received by the device makes the user-device interface more efficient by allowing a user to view notification content associated with multiple applications without individually accessing each application).

It should be understood that the particular order in which the operations in FIGS. 6A-6G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6G. For example, the contacts, gestures, user interface objects, tactile outputs, focus selectors, and animations described above with reference to method 600 optionally have one or more of the characteristics of the contacts, gestures, user interface objects, tactile outputs, focus selectors, and animations described herein with reference to other methods described herein (e.g., methods 700, 800, and 900). For brevity, these details are not repeated here.

The operations described above with reference to FIGS. 6A-6G are, optionally, implemented by components depicted in FIGS. 1A-1B. For example, receiving operation 602, detection operation 604, transitioning operation 606, and displaying operation 606, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7E are flow diagrams illustrating method 700 of displaying notification history in accordance with some embodiments. Method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an intuitive way to display a notification history. The method reduces the number, extent, and/or nature of the inputs from a user when displaying a notification history, thereby creating a more efficient human-machine interface. For battery-operated electronic devices, enabling a user to display a notification history faster and more efficiently conserves power and increases the time between battery charges.

The device displays (702), on display 112, a first user interface, including displaying one or more missed notifications in a first scrollable arrangement (e.g., a first scrollable list) on the first user interface. For example, in FIG. 5BA, notifications 586, 588, 590, and 592 are displayed on wake screen user interface 504. In some embodiments, the first user interface is a wake screen user interface 504 that is displayed upon the display transitioning from a display-off state to a display-on state (e.g., in response to detecting an input or event that wakes the device from the display-off state, such as a sleep state or other power-saving or inactive state). For example, FIGS. 5A1-5A4 show the display transitioning from a display-off state to a display-on state. In some embodiments, the first user interface is a cover sheet user interface (also depicted as 504) that is displayed to cover a currently displayed user interface when a downward edge swipe gesture (e.g., a downward swipe that starts from an upper edge of the touch-sensitive surface) is detected on the display. In some embodiments, the cover sheet user interface is also the wake screen user interface that is displayed when the device transitions from the screen-off state to the screen-on state.

While displaying the first user interface with the one or more missed notifications, the device detects (704) a first swipe gesture (e.g., as shown in FIGS. 5BF-5BG), including detecting a first contact at a location on the touch-sensitive surface that corresponds to the first scrollable arrangement (e.g., as indicated by region 5100), and detecting first movement of the first contact across the touch-sensitive surface in a first direction (e.g., upward).

In response to detecting the first swipe gesture, the device scrolls (706) the first scrollable arrangement in accordance with the first movement of the first contact (e.g., notifications 586-592 move upward in response to the input illustrated at FIGS. 5BF-5BG).

After scrolling the first scrollable arrangement in accordance with the first movement of the first contact, the device detects (708) a second swipe gesture, including detecting a second contact at a location on the touch-sensitive surface that corresponds to the first scrollable arrangement and detecting second movement of the second contact across the touch-sensitive surface in the first direction (e.g., as shown in FIGS. 5BI-5BN).

In response to detecting the second swipe gesture (710): in accordance with a determination that the second movement of the second contact meets notification-history-display criteria, the device displays a plurality of previously received notifications that are distinct from the one or more missed notifications in a second scrollable arrangement on the first user interface (e.g., the device displays previously received notifications 506-512, which are distinct from missed notifications 586-592). The notification-history-display criteria require (1) that the second movement of the second contact is detected after an end (e.g., a bottommost missed notification 5102) of the first scrollable arrangement has been reached in accordance with the first movement of the first contact and (2) that the second movement exceeds a first threshold amount of movement (e.g., as indicated at 5108) in the first direction. In accordance with the determination that the second movement of the first contact does not meet the notification-history-display criteria, the device forgoes displaying the plurality of previously received notifications (and, optionally, continuing to scroll the first scrollable arrangement in accordance with the second movement of the second contact).

This method relates to a way to combine the functions of a wake screen user interface and a notification history screen into a wake screen user interface. The wake screen user interface displays missed notifications, and in response to specific inputs notification history is displayed in the wake screen user interface as well. Displaying previously received notifications in accordance with a determination that movement of a contact meets notification history display criteria allows a user to view a sequential list notification content received by the device (e.g., including notifications that were previously cleared). The notifications in the second scrollable arrangement remain undisplayed when swipe input does not meet the notification-history-display criteria, so that the user does not unintentionally reveal previously cleared notifications. Allowing a user to view a sequential list of notification content received by the device makes the user-device interface more efficient by allowing a user to view notification content associated with multiple applications without individually accessing each application. Leaving the notifications in the second scrollable arrangement undisplayed when swipe input does not meet the notification-history-display criteria allows the user to navigate among the missed notifications in the first scrollable arrangement without unintentionally viewing previously cleared notifications.

In some embodiments (712), the first user interface is a wake screen user interface 504, and the first user interface is displayed immediately upon waking the device from the display-off state to the display-on state. For example, FIGS. 5A1-5A4 show display of a wake screen user interface 504 when device 100 transitions from a display-off state to a display-on state.

In some embodiments, while displaying the one or more missed notifications in the first scrollable arrangement on the first user interface, the device detects (714) a missed notification dismissal input for dismissing a respective notification of the one or more missed notifications in the first scrollable arrangement. For example, input to dismiss notification 592 is illustrated in FIGS. 5BV-5BY. A dismissal input for dismissing a respective notification is, e.g., an input to activate a displayed control (e.g., a tap gesture by a contact at a location that corresponds to the displayed control) for dismissing the notification; an input (such as a deep press or swipe gesture) on the notification to dismiss the notification, or to reveal a control for dismissing the notification followed by an input to activate a control for dismissing the notification, or an input to open the notification in an application (e.g., a tap gesture by a contact at a location that corresponds to the notification)). After detecting the missed notification dismissal input for dismissing the respective notification, the device ceases to display the respective notification of the one or more notifications on the first user interface, and adds the respective notification to the plurality of previously received notifications. For example, if the wake screen is displayed again without the respective notification, and a swipe gesture that meets notification-history-display criteria is detected on the first scroll arrangement including the remaining missed notifications, the respective notification is displayed among the plurality of previously received notifications in the second scrollable arrangement.

Ceasing to display a notification after detecting a missed notification dismissal input for dismissing the notification reduces the number of notifications displayed on the first user interface after the user has provided input that indicates the notification has been viewed and/or handled by the user. Reducing the number of notifications displayed on the first user interface makes the user-device interface more efficient by allowing a user to more quickly locate and address notifications that have not been previously viewed and/or handled by the user.

In some embodiments, while the first user interface is displayed, the device detects (716) a third swipe gesture (e.g., as shown at FIGS. 5BB-5BC), including detecting a third contact at a location on the touch-sensitive surface that corresponds the first scrollable arrangement and detecting third movement of the third contact across the touch-sensitive surface in a second direction that is distinct from the first direction (e.g., downwards). In response to detecting the third swipe gesture, the device translates the first scrollable arrangement (and optionally, at least one object (e.g., an object that displays a current time and/or date)) in accordance with the third movement of the third contact (e.g., translating the first scrollable arrangement relative to other objects currently displayed on the first user interface in the downward direction, or translating the first user interface as a whole in the downward direction to display an extension of the first user interface at the top that was not displayed prior to detecting the third swipe gesture). For example, notifications 586-592 move downward in accordance with the movement of the input shown in FIGS. 5BB-5BC. The device detects lift-off of the third contact from the touch-sensitive surface (e.g., the touch-screen display) after detecting the third movement (e.g., the contact indicated by focus selector 594 in FIG. 5BC has lifted off of touch screen 112, as shown in FIG. 5BD). In response to detecting the liftoff of the third contact, the device reverses the translation of the first scrollable arrangement that was made in accordance with the third movement of the third contact (e.g., restoring the position of the first scrollable arrangement relative to the other objects currently displayed on the first user interface, or restoring the first user interface as a whole and ceasing to display the extension of the first user interface at the top). As shown in FIGS. 5BD-5BE, in response to the liftoff that occurred, the notifications move 586-592 upward.

Providing visual feedback, such as a "rubber band effect" simulated by translating the scrollable arrangement of missed notifications in accordance with movement of a contact and reversing the translation of the scrollable arrangement upon lift-off of the contact, enhances operability of the device by providing an intuitive indication to the user that the first user interface is responsive to input (such as a swipe input) to view additional notifications.

In some embodiments, while displaying the plurality of previously received notifications in the second scrollable arrangement on the first user interface, the device detects (718) a fourth swipe gesture (e.g., as shown at FIG. 5CA), including detecting a fourth contact at a location on the touch-sensitive surface that corresponds to the second scrollable arrangement (e.g., notifications 506-512) and detecting fourth movement of the fourth contact across the touch-sensitive surface in a second direction opposite the first direction (e.g., the fourth swipe gesture is a downward swipe gesture directed to the second scrollable arrangement). In response to detecting the fourth swipe gesture, in accordance with a determination that the fourth movement of the fourth contact meets notification-history-dismissal criteria, the device ceases to display the plurality of previously received notifications on the first user interface. In some embodiments, the notification-history-dismissal criteria require (1) that the fourth movement of the fourth contact is detected after an end (e.g., an uppermost notification) of the second scrollable arrangement has been reached and (2) that the fourth movement exceeds a second threshold amount of movement in the second direction opposite the first direction. In accordance with the determination that the fourth movement of the fourth contact does not meet the notification-history-dismissal criteria, the device scrolls the plurality of previously received notifications in the second scrollable arrangement in accordance with the fourth movement of the fourth contact. In some embodiments, scrolling the plurality of previously received notifications in the second scrollable arrangement causes at least one of the one or more missed notifications in the first scrollable arrangement to be revealed (e.g., if the at least one of the one or more missed notifications in the first scrollable arrangement was scrolled beyond the edge of the display in response to the first swipe gesture and/or the second swipe gesture). In some embodiments, scrolling previously received notifications causes missed notifications in the first scrollable arrangement to be revealed (e.g., as shown in FIGS. 5BT-5BU), allowing a user to navigate between notifications that have been cleared and notifications that have not yet been cleared for a comprehensive view of notifications that have been received by the device. Providing the user with a comprehensive view of notifications that have been received by the device makes the user-device interface more efficient by allowing a user to view recent notification content without needing to individually access each application for which the content was received and/or generated.

Scrolling through the notification history or dismissing the notification history based on the same swipe gesture in accordance with whether the notification-history-dismissal criteria are met enhances the operability of the user interface and makes the user-device interface more efficient (e.g., by performing different functions based on whether predefined conditions are met), which additionally improves the battery life of the device.

In some embodiments, while displaying the first user interface, the device detects (720) a first user interface dismissal input for input (e.g., as shown at FIG. 5CO) for dismissing the first user interface (e.g., a swipe gesture, including fifth movement of a fifth contact from a location that corresponds to an edge of the display (such as a location that is at or proximate to the bottom edge of the display) across the touch-sensitive surface in the first direction (e.g., upward from the bottom edge of the display). In response to detecting the first user interface dismissal input, the device ceases to display the first user interface (e.g., along with any missed notifications and/or recent notifications that are currently displayed on the first user interface), and, in some embodiments, the device reveals an underlying interface such as a home screen user interface 522, a settings user interface, or an application user interface. For example, in FIGS. 5CO-5CQ, home screen user interface 522 is revealed in response to an input for dismissing wake screen user interface 504.

In some embodiments, the device includes one or more tactile output generators (722), and while the first user interface is displayed, in accordance with the determination that the second movement of the second contact meets the notification-history-display criteria (e.g., as described with regard to FIG. 5BK), the device generates, with the one or more tactile output generators, a tactile output (e.g., tactile output 5112) to indicate that the criteria for displaying the plurality of previously received notifications have been met.

Generating a tactile output to indicate that criteria for displaying the plurality of previously received notifications have been met provides the user with feedback about the input that is required to meet notification-history-display criteria. Providing the user with feedback about the input that is required to meet notification-history-display criteria makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (724), the first contact moves with a first rate of movement during the first swipe gesture, scrolling the first scrollable arrangement occurs at a first scroll rate that corresponds to the first rate of movement by the first contact (e.g., the scroll rate matches the first rate of movement); the second contact moves with a second rate of movement during the second swipe gesture; and displaying the plurality of previously received notifications in the second scrollable arrangement includes scrolling a first previously received notification of the plurality of previously received notifications in the second scrollable arrangement at a second scroll rate that is greater than the second rate of movement by the second contact (e.g., to provide an appearance of the previously received notifications in the second scrollable arrangement "catching up" with the second contact). For example, as the contact indicated by focus selector 5106 moves along touch screen 112 as shown in FIGS. 5BI-5BN, missed notifications 586-592 in a first scrollable arrangement move at the rate of movement of the contact, and, in FIGS. 5BK-5BN, previously received notifications 506-512 in a second scrollable arrangement move faster than the rate of movement of the contact. In some embodiments, a second previously received notification of the plurality of previously received notifications is scrolled at a third scroll rate that is distinct from the second scroll rate.

Scrolling a first previously received notification of the plurality of previously received notifications in the second scrollable arrangement at a second scroll rate that is greater than the second rate of movement by the second contact provides the user with visual feedback about the input that is required to meet notification-history-display criteria (e.g., by giving the user of a sense of the notifications in the second scrollable arrangement "racing to catch up" with the second contact when the criteria are met). Providing the user with feedback about the input that is required to meet notification-history-display criteria makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the device detects (726) a fifth swipe gesture, including detecting a fifth contact at a first location on the touch-sensitive surface and detecting fifth movement of the fifth contact across the touch-sensitive surface in a third direction that is perpendicular to the first direction (e.g., leftward or rightward). In response to detecting the fifth swipe gesture, in accordance with a determination that the first location on the touch-sensitive surface corresponds to a first notification among the one or more missed notifications or the plurality of previously received notifications, the device moves the first notification in accordance with the movement of the fifth contact (e.g., the input shown in FIG. 5BV-5BW drags notification 592). In accordance with a determination that the first location on the touch-sensitive surface corresponds to a location outside of the first scrollable arrangement and the second scrollable arrangement, the device replaces display of the first user interface with display of a second user interface (e.g., a control center user interface 5138 or mini application user interface 5140). For example, FIGS. 5CC-5CE illustrate a swipe gesture by contact at a location outside of the first scrollable arrangement and the second scrollable arrangement that causes control center user interface 5138 to be displayed, and FIGS. 5CI-5CK illustrate a swipe gesture by contact at a location outside of the first scrollable arrangement and the second scrollable arrangement that causes mini application user interface 5140 to be displayed.

This heuristic allows a swipe gesture (e.g., a horizontal swipe gesture) to have different responses depending on whether the gesture corresponds to a missed notification or corresponds to a location outside of scrollable arrangements of missed notifications. This heuristic enhances operability of the device by providing different responses to the same gesture depending on the location of the gesture rather than requiring the device to provide a different gesture type (in turn requiring the user to learn the additional gesture type) to obtain the different responses.

In some embodiments, the device detects (728) that criteria for dismissing all of the one or more missed notifications in the first scrollable arrangement are met (e.g., via one or more inputs that include user interaction with all of the missed notifications, via one or more inputs for accessing one or more applications associated with the missed notifications, and/or by satisfying notification clearance criteria that require input that is received at a time that is (1) after a respective notification of the one or more notifications has been cleared through direct user interaction with the respective notification or an application that corresponds to the respective notification and (2) after the device has transitioned from the screen-on state to the screen-off state at least once since the last direct user interaction that dismissed a respective notification). In response to detecting that the criteria for dismissing all of the one or more missed notifications are met, the device adds, to the plurality of previously received notifications, all of the one or more missed notifications (and forgoing displaying those one or more missed notifications the next time that the first user interface is displayed). For example, in FIG. 5CS, all notifications have been cleared (e.g., as a result of input as shown at FIGS. 5BV-5BZ and FIGS. 5CQ-5CS). In FIG. 5CX, in response to input shown in 5CW, notifications 586-592 that had been cleared and added to the plurality of previously received notifications are redisplayed.

In some embodiments, while displaying the first user interface without any missed notifications (e.g., after detecting that the criteria for dismissing all of the one or more missed notifications in the first scrollable arrangement have been met and adding the one or more missed notifications to the plurality of previously received notifications), the device detects (730) a sixth swipe gesture (e.g., as shown in FIG. 5CW), including a sixth contact at a location on the touch-sensitive surface that corresponds to the location at which the first scrollable arrangement was previously displayed, and the device detects sixth movement of the sixth contact across the touch-sensitive surface in the first direction. In response to detecting the sixth swipe gesture: in accordance with a determination that the sixth movement of the sixth contact exceeds the first threshold amount of movement in the first direction, the device displays the plurality of previously received notifications (including the one or more missed notifications that were dismissed and added to the plurality of previously received notifications). For example, in FIG. 5CX, in response to input shown in 5CW, notifications 586-592 are redisplayed. In accordance with the determination that the sixth movement of the sixth contact does not exceed the first threshold amount of movement in the first direction, the device forgoes displaying the plurality of previously received notifications.

Displaying a plurality of previously received notifications after displaying the first user interface without any missed notifications allows a user to recall missed notifications (e.g., even after providing input to clear all missed notifications). Enabling the user to recall the missed notifications makes the user-device interface more efficient and by allowing the user to view content received and/or generated by the device without needing to access multiple applications. Additionally, a user can provide input to clear notifications with the knowledge that the notification will be recoverable if the user subsequently wishes to view the notification content.

In some embodiments, while the first user interface is displayed without any missed notifications (e.g., after detecting that the criteria for dismissing all of the one or more missed notifications in the first scrollable arrangement have been met and adding the one or more missed notifications to the plurality of previously received notifications), the device detects (732) a seventh swipe gesture (e.g., as shown at FIGS. 5CS-5CT), including detecting a seventh contact at a location on the touch-sensitive surface that corresponds to the location at which the first scrollable arrangement was previously displayed and detecting seventh movement of the seventh contact across the touch-sensitive surface in a second direction opposite the first direction (e.g., downward). In response to detecting the seventh swipe gesture, the device translates at least one object (e.g., an object 582 that displays a current time and/or date) displayed on the first user interface in the second direction in accordance with the seventh movement of the seventh contact. After translating the at least one object, the device detects lift-off of the seventh contact (e.g., as shown at FIG. 5CU). In response to detecting liftoff of the seventh contact from the touch-sensitive surface, the device reverses the translation of the at least one object that have been made in accordance with the seventh movement of the seventh contact.

Providing visual feedback, such as a "rubber band effect" simulated by translating at least one object in accordance with movement of a contact and reversing the translation of the at least one object upon lift-off of the contact, enhances operability of the device by providing an intuitive indication to the user that the wake screen is responsive to input (such as a swipe input) to view notifications (e.g., even when the user is viewing a first user interface that does not include display of any missed notifications).

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, and 900) are also applicable in an analogous manner to method 700 described above with respect to FIGS. 7A-7E. For example, the contacts, gestures, user interface objects, tactile outputs, focus selectors, and animations described above with reference to method xxx optionally have one or more of the characteristics of the contacts, gestures, user interface objects, tactile outputs, focus selectors, and animations described herein with reference to other methods described herein (e.g., methods 600, 800, and 900). For brevity, these details are not repeated here.

The operations described above with reference to FIGS. 7A-7E are, optionally, implemented by components depicted in FIGS. 1A-1B. For example, display operation 702, detection operation 704, and scrolling operation 706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8C are flow diagrams illustrating method 800 of displaying updating information from an application using a floating banner in accordance with some embodiments. Method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an intuitive way to display updating information from an application in a floating banner. The method reduces the number, extent, and/or nature of the inputs from a user when accessing information that is displayed in the floating banner, thereby creating a more efficient human-machine interface. For battery-operated electronic devices, displaying updating information from an application in floating banner that is visible in various operating contexts allows the user to operate the device faster and more efficiently, which conserves power and increases the time between battery charges.

The device displays (802) a first user interface (e.g., an application user interface, a home screen user interface, a lock screen user interface, etc.) on the display. For example, in FIG. 5DA, the device displays a map application user interface 5154.

The device displays (804) a first user interface object overlaid on a first portion of the first user interface (e.g., the device displays a banner object, such as navigation banner 5160, overlaid on a user interface of an application, such as map application user interface 5154), where the banner object is initially stationary relative to the user interface of the application. In some embodiments, the first user interface object is displayed when a persistent banner display mode of an application is active. In some embodiments, persistent banner display modes include a navigation mode of a maps application, and the first user interface object is a banner that includes navigation information, such as text and/or an icon indicating information associated with a next step in a navigation sequence (e.g., navigation information includes navigation text 5178 and navigation direction image 5180, as shown in FIG. 5DT). In some embodiments, persistent banner display modes include a content playback mode of a media application, and the first user interface object is a banner that includes media playback information, such as text and/or an image that correspond to a playing content item and/or one or more playback controls (see, e.g., media banner 568 shown in FIG. 5AO). In some embodiments, persistent banner display modes include a telephone call session of a telephone application, and the first user interface object is a banner that includes text with information about the call in progress, such as elapsed time and/or contact information. In some embodiments, the first user interface object is a notification.

While displaying the first user interface object overlaid on the first portion of the first user interface, the device detects (806) a first input (e.g., a downward swipe input from an upper edge of the display 112, as shown at FIG. 5DB) for displaying a cover sheet user interface 504. In some embodiments, the cover sheet user interface 504 is also a wake screen user interface that is displayed when the device transitions from a screen-off state to a screen-on state. The cover sheet user interface 504 includes a first content object (e.g., one or more missed notifications, such as missed notifications 5164 and 5168 shown in FIG. 5DD) and a second content object (e.g., a time-date object 582 that displays a current time and date) displayed on a background object (e.g., a cover sheet platter or substrate with a predefined background).

In response to detecting the first input for displaying the cover sheet user interface 504, the device moves (808) the cover sheet user interface 504 across the display in a first direction (e.g., downward). For example, cover sheet user interface 504 slides down over map application user interface 5154, as shown at FIGS. 5DC-5DD. Moving the cover sheet user interface 504 across the display in a first direction includes moving the background object 5163 of the cover sheet user interface 504 across the display (e.g., to obscure an increasing portion of the first user interface without obscuring the first user interface object that is overlaid on the first user interface). In some embodiments, the background object 5163 of the cover sheet user interface slides onto the display in a z-layer that is located between the z-layer of the first user interface and the z-layer of the first user interface object.

Many electronic devices display user interface objects that have a layer order (i.e., a z-order or front-to-back order of the user interface objects). A user typically interacts with such objects by repositioning them on the display, and overlapping objects are displayed on the display in accordance with their front-to-back order (e.g., an object that is "in front" of another object is displayed where the two objects overlap). As used in the specification, a "layer order" is the front-to-back order of objects in a user interface (e.g., in an electronic document). Thus, if two objects overlap, the object that is higher in the layer order (e.g., the object that is "on top of" or "in front of") is displayed at any points where the two objects overlap, thereby partially obscuring the object that is lower in the layer order (e.g., the object that is "beneath" or "behind" or "in back of" the other object).

In accordance with a determination that the first user interface object has not reached a predefined threshold position relative to the cover sheet user interface (e.g., relative to a position between the first content object (e.g., missed notifications 5164 and/or 5168) and the second content object (e.g., time/date object 582) in the cover sheet user interface 504), the device moves the first content object and the second content object (e.g., in unison) with the background object 5163 while maintaining a current position of the first user interface object (e.g., navigation banner 5160) on the display (e.g., as shown in FIGS. 5DC-5DD). In accordance with a determination that the first user interface object (e.g., navigation banner 5160) has reached the predefined threshold position relative to the cover sheet user interface, the device moves the first user interface object (e.g., in unison) with the background object (e.g., as shown in FIGS. 5DD-5DE). In some embodiments, the device also moves the first content object (e.g., missed notifications 5164 and 5168), the second content object (e.g., time/date object 582), and the first user interface object (e.g., navigation banner 5160) in unison with the background object 5163. For example, in FIG. 5DD, the time/date object 582 catches the banner object 5160 on its way down and pushes the banner object downward with the time/date object.

Method 800 relates to combining display of a user interface object that is overlaid on an initial user interface (e.g., a home screen user interface) with a newly displayed user interface (e.g., a cover sheet user interface). Specifically, some of the objects on the newly displayed user interface move past the first user interface object, while other objects on the newly displayed user interface "catches" the first user interface object and pushes it to its final position on the newly displayed user interface. This heuristic brings attention to the first user interface object (e.g., a banner object) by moving or not moving the first user interface object with the background object depending on whether the first user interface object has reached a predefined threshold position relative to a cover sheet interface. Bringing attention to the first user interface object improves the user-device interface, e.g., by helping the user to understand the connection between the banner content and the application from which the banner content originated. Displaying the banner improves the operability of the device by allowing the user to view content from an application without needing to navigate to the application, reducing the number of inputs required from the user to obtain banner content (e.g., navigation information).

In some embodiments, moving the cover sheet user interface 504 across the display in the first direction includes (810), in accordance with a determination that the second content object (e.g., the time and date object 582) has reached a first predefined location (e.g., the default position for the time and date on the display when the cover sheet is fully displayed) on the display, ceasing to move the second content object (e.g., the time and date 582) and the first user interface object (e.g., the banner 5160) and continuing to move the first content object (the one or more missed notifications) in the first direction (e.g., to make room for the banner object 5160 between the top missed notifications (e.g., notifications 5164 and 5168) and the current time and date object 582. For example, as cover sheet user interface 504 slides down in FIGS. 5DC-5DF, time/date object 582 and the navigation banner 5160 stop moving in FIG. 5DE, while missed notifications 5164 and 5168 continue to move downward in FIGS. 5DE-5DF.

Ceasing to move some of the content object while continuing to move other content objects on the cover sheet user interface allows the cover sheet user interface to be rearranged to accommodate the first user interface object (e.g., the banner), while providing visual continuity to the user, thereby reducing user mistakes when operating the device and enhance the operability of the device.

In some embodiments, the device ceases (812) to continue to move the first content object (e.g., the one or more missed notifications) in the first direction in accordance with a determination that the first content object has reached a second predefined location on the display (e.g., ceasing to move the missed notifications once the missed notifications have completely moved past the banner object).

Continuing to move the content objects on the cover sheet user interface until they reach their final locations allows the cover sheet user interface to be rearranged to accommodate the first user interface object (e.g., the banner), while providing visual continuity to the user, thereby reducing user mistakes when operating the device and enhance the operability of the device.

In some embodiments, the device transitions (814) from a screen-on state (as shown in FIG. 5DY) to a screen-off state (as shown in FIG. 5DZ) in accordance with a determination that display shutoff criteria are met (e.g., a power button is pressed or a period of user inactivity is detected). While the display is in the screen-off state, the device displays the first user interface object (e.g., the banner 5160) on a dark screen corresponding to the screen-off state (e.g., in accordance with a determination that an application associated with the first user interface object is in a persistent banner display mode, such as a navigation mode of a map application, a playback mode of a media application, or a call mode of a phone application). For example, in FIG. 5DZ, navigation banner 5160 is displayed on an otherwise dark display 112.

Displaying a first user interface object (e.g., a banner) when the device is in a screen-off state (e.g., displaying the first user interface object on an otherwise dark screen or on a screen that displays only one or more received notifications in addition to the first user interface object) provides the user with high priority information (e.g., navigation information) while the display forgoes displaying other content. Displaying the first user interface object (and/or the one or more missed notifications) while forgoing display of other content makes the user-device interface more efficient by reducing the amount of power required for the display. Additionally, displaying the first user interface object (and/or the one or more missed notifications) while forgoing display of other content eliminates the need for the user to wake the display from a screen-off state to display the first user interface object.

In some embodiments, while the display is in the screen-off state and the first user interface object is displayed on the display, the device receives (816) one or more notifications and, in response to receiving the one or more notifications, the device displays the first user interface object (e.g., the banner) and a third content object (e.g., the one or more notifications) on the first user interface (e.g., the one or more missed notifications are displayed under the first user interface object). For example, in FIG. 5EA, the device displays banner 5160 and missed notification 5186 on otherwise dark display 112. In some embodiments, while the display is in the screen-off state, the device detects a notification event and displays a notification object (e.g., for a new notification) under the banner. In some embodiments, one or more previously received notifications are displayed on the display (e.g., under the banner and/or above the new notification) while the display is in the screen-off state.

Displaying one or more received notifications when the device is in a screen-off state (e.g., displaying the one or more received notifications on an otherwise dark screen or on a screen that displays only a first user interface object in addition to the one or more received notifications) provides the user with high priority information (e.g., navigation information) while the display forgoes displaying other content. Displaying the one or more received notifications (and/or the first user interface object) while forgoing display of other content makes the user-device interface more efficient by reducing the amount of power required for the display. Additionally, displaying the one or more missed notifications (and/or the first user interface object) while forgoing display of other content eliminates the need for the user to wake the display from a screen-off state to display the one or more missed notifications.

In some embodiments, the device transitions (818) the device from a screen-off state to a screen-on state (e.g., as shown in FIGS. 5A1-5A3 and 5EA-5EB) in accordance with a determination that display-waking criteria are met (e.g., a power button is pressed or the device orientation is changed in a certain way (e.g., picked up by a user), or a notification event is detected). In response to transitioning the device from the screen-off state to the screen-on state, the device displays the first user interface object (and no other objects) on a dark screen that corresponds to the display-off state. For example, in FIG. 5DZ, navigation banner 5160 is displayed on an otherwise dark display 112.

Displaying a first user interface object (e.g., a banner) when the device is in a screen-off state (e.g., displaying the first user interface object on an otherwise dark screen or on a screen that displays only one or more received notifications in addition to the first user interface object) provides the user with high priority information (e.g., navigation information) while the display forgoes displaying other content. Displaying the first user interface object (and/or the one or more missed notifications) while forgoing display of other content makes the user-device interface more efficient by reducing the amount of power required for the display. Additionally, displaying the first user interface object (and/or the one or more missed notifications) while forgoing display of other content eliminates the need for the user to wake the display from a screen-off state to display the first user interface object.

In some embodiments, while the cover sheet interface is displayed, the device detects (820) a third input (e.g., as shown at FIGS. 5DQ-5DR) for dismissing the cover sheet user interface 504. The third input includes a swipe gesture by a contact on the touch-sensitive surface (e.g., a upward swipe that started from the bottom edge of the touch-screen). In response to detecting the third input for dismissing the cover sheet user interface, the device ceases to display the cover sheet user interface 504, maintains display of the first user interface object (e.g., navigation banner 5160), and displays a home screen user interface 522. The first user interface object is overlaid on the home screen user interface. For example, in response to detecting an upward swipe gesture from the bottom edge of the touch-screen (e.g., as shown in FIGS. 5DQ-5DR), the cover sheet user interface 504 slides upward to reveal the home screen interface 522 underneath, while the first user interface (e.g., navigation banner 5160) remains stationary in a display layer above the cover sheet user interface 504, and appears overlaid on the home screen user interface 522 after the cover sheet user interface 504 is completely removed from view. In some embodiments, instead of the home screen user interface 522, a user interface of an application is displayed when the input for dismissing the cover sheet user interface 504 is detected, and the first user interface object is overlaid on the user interface of the application.

Displaying the first user interface object (e.g., a banner, such as navigation banner 5160) overlaid on the home screen makes the user-device interface more efficient by allowing the user to view the first user interface object after accessing the home screen without needing to navigate from the home screen to the application that generated the content of the first user interface object.

In some embodiments, while displaying the first user interface object overlaid on the home screen user interface (or a user interface of an application), the device detects (822) an input for minimizing the first user interface object (e.g., a upward swipe gesture on the banner, as shown at FIG. 5DT). In response to detecting the input for minimizing the first user interface object, the device transitions the first user interface object (e.g., banner mode of navigation banner 5160, as shown in FIG. 5DT) into a second user interface object (e.g., a "pill" that has a smaller area than the first user interface object, as shown at 5160 FIG. 5DW). The first user interface object has a first size and the second user interface object has a second size that is smaller than the first size. In some embodiments, the second user interface object pulsates or blinks (e.g., at least a portion of the pill, such as the background of the pill, periodically changes color and/or size over time) to indicate that an application mode or process associated with the banner object is still active. In some embodiments, the second user interface object displays at least a portion of information displayed by the first user interface object. For example, in FIG. 5DT, navigation banner 5160 in banner mode displays navigation direction arrow 5180, which is also displayed in the pill mode of navigation banner 5160 in FIG. 5DW. In some embodiments, the device displays an animated transition showing the banner shrinking and morphing into the "pill" while moving and settling into a upper corner of the touch-screen (e.g., as shown at FIGS. 5DT-5DW). In some embodiments, the second user interface object (e.g., navigation banner 5160 in pill form) displays media playback information (e.g., a play/pause toggle control). In some embodiments, the second user interface object displays information (e.g., a turn icon) associated with a navigation instruction.

Transitioning the first user interface object into a second user interface object in response to detecting input for minimizing the first user interface object makes the user-device interface more efficient by allowing the user to simultaneously view content of the home screen user interface that would otherwise be covered by the first user interface object and information from the first user interface object that is contained in the second user interface object (e.g., without needing to navigate from the home screen to the application that generated the content of the first user interface object).

In some embodiments, while the second user interface object is displayed, the device determines (824) that the display shutoff criteria are met. In response to determining that the display shutoff criteria are met, the device transitions the device from the screen-on state to a screen-off state, transitions the second user interface object into the first user interface object; and displays the first user interface object overlaid a dark screen corresponding to the screen-off state (e.g., a direct transition from FIG. 5DX to FIG. 5DZ).

Transitioning the second user interface object into a first user interface object in response to determining that display shutoff criteria are met provides the user with a larger object for increased visibility when the device is likely to be distant from the user (e.g., on a table or in a car rather than in the user's hand). Providing the user with a larger object for increased visibility reduces power usage and improves battery life by providing information without requiring the user to wake the device and/or navigate to an application that generated the content of the first user interface object.

In some embodiments, while the second user interface object is displayed, the device detects (826) an input for activating the second user interface object (e.g., a tap input on the second user interface object). For example, in FIG. 5DX, an input is detected at a location corresponding to navigation banner 5160 in pill form, as indicated by focus selector 5160 in FIG. 5DX. In response to detecting the input for activating the second user interface object, the device displays an application user interface of an application that corresponds to the second user interface object. For example, in response to the input described with regard to FIG. 5DX, map application 5154 is displayed, as shown in FIG. 5DY.

Displaying an application user interface of an application that corresponds to the second user interface object in response to detecting input for activating the second user interface object provides the user with direct access to an application that corresponds to the second user interface object (e.g., the user can access the application that corresponds to the second user interface object from any page of a multi-page home screen without needing to provide input to navigate to an application launch icon on a different page of the home screen, within a folder on the home screen, etc.). This makes the user-device interface more efficient and enhances the operability of the device by reducing the number of inputs required to access an application user interface of an application that corresponds to the second user interface object.

In some embodiments, while the first user interface object is displayed (e.g., overlaid over the first user interface or overlaid over the cover sheet user interface 504), the device detects (828) an input that activates the first user interface object (e.g., a tap input on the first user interface object). For example, in FIG. 5DH, an input, as indicated by focus selector 5168, is detected at a location that corresponds to the navigation object 5160 displayed overlaid over cover sheet user interface 504. In response to detecting the input that activates the first user interface object, the device displays the application user interface of the application that corresponds to the information displayed in the first user interface object. For example, in response to the input, maps application 5154 is displayed, as shown in FIG. 5DI.

In some embodiments, the application that corresponds to the second user interface object is an application that also corresponds to the first user interface object.

Displaying an application user interface of an application that corresponds to the first user interface object in response to detecting input for activating the first user interface object provides the user with direct access to an application that corresponds to the first user interface object (e.g., the user can access the application that corresponds to the first user interface object directly from the first user interface or the cover sheet user interface without providing input to navigate to the home screen.) This makes the user-device interface more efficient and enhances the operability of the device by reducing the number of inputs required to access an application user interface of an application that corresponds to the first user interface object.

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., 600, 700, and 900) are also applicable in an analogous manner to method 800 described above with respect to FIGS. 8A-8C. For example, the contacts, gestures, user interface objects, focus selectors, animations described above with reference to method xxx optionally have one or more of the characteristics of the contacts, gestures, user interface objects, focus selectors, animations described herein with reference to other methods described herein (e.g., methods 600, 700, and 900). For brevity, these details are not repeated here.

The operations described above with reference to FIGS. 8A-8C are, optionally, implemented by components depicted in FIGS. 1A-1B. For example, display operation 802, detection operation 806, and object moving operation 808 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9C are flow diagrams illustrating method 900 of navigation using a cover sheet, in accordance with some embodiments. Method 900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 900 provides an intuitive way to navigate using a cover sheet. The method reduces the number, extent, and/or nature of the inputs from a user for accessing various controls that are available from user interfaces that are accessible via input provided at the cover sheet, thereby creating a more efficient human-machine interface. For battery-operated electronic devices, enabling a user to navigate using a cover sheet faster and more efficiently conserves power and increases the time between battery charges.

While the device is in a screen-off state, the device detects (902) a first input for waking the device from the screen-off state to a screen-on state (e.g., the device detects a state change indicating that the device has been picked up, as described with regard to FIGS. 5EC1-5EC4, or the device detects an input at a control, such as push button 106, for waking the device).

In response to detecting the first input for waking the device from the screen-off state to the screen-on state, the device transitions (904) the device from the screen-off state to the screen-on state (e.g., as shown at FIGS. 5EC2-5EC3), and displays a wake screen user interface 504 on the display 112. In some embodiments, the wake screen user interface 504 is redisplayed as a cover sheet user interface that covers an existing user interface in response to a cover sheet call-up command, and re-reveals the existing user interface that was covered by the cover sheet user interface in response to a cover-sheet dismissal command.

While displaying the wake screen user interface, the device detects (906) a first swipe gesture on the touch-sensitive surface 112 (e.g., a swipe gesture as shown at FIGS. 5EK-5EL or a swipe gesture as shown at FIGS. 5EQ-5ER), including detecting a first contact on the touch-sensitive surface and detecting movement of the first contact across the touch-sensitive surface.

In response to detecting the first swipe gesture, the device (908) ceases to display the wake screen user interface 504 and displays a first user interface. In accordance with a determination that the first swipe gesture is in a first direction (e.g., rightward, as shown in FIGS. 5EK-5EL), the displayed first user interface is a mini-application-object user interface 5140. The mini-application-object user interface 5140 includes one or more mini-application objects (e.g., mini-application objects 583, 585, 587, and 589) that each provide a subset of functions of a corresponding application without launching the corresponding application. In accordance with a determination that the first swipe gesture is in a second direction (e.g., leftward, as shown in FIGS. 5EQ-5ER), that is opposite the first direction, the displayed first user interface is a control panel user interface 5138. The control panel user interface 5138 includes one or more device controls (e.g., flashlight control 5190 and camera control 5192) for controlling one or more device functions of the device.

The wake screen user interface 504 has a fixed positional relationship relative to the mini-application-object screen 5140 and the control panel user interface 5138. Allowing the user to use directional gestures to navigate to either the mini-application-object screen or the control panel user interface enhances the operability of the device (e.g., by reducing the number of controls displayed on a wake screen user interface) and makes the user-device interface more efficient (e.g., by reducing visual clutter and reducing user mistakes due to the visual clutter), which, additionally, improves the battery life of the device.

In some embodiments, while the wake screen user interface 504 is displayed, the device displays (910) one or more notifications (e.g., notification 5188, as shown in FIG. 5ED) on the wake screen user interface. The device detects a second input for transitioning the device from an unauthenticated state to an authenticated state (e.g., as described with regard to FIGS. 5FN-5FQ). In response to detecting the second input, the device displays, on the wake screen user interface 504, restricted notification information corresponding to at least one of the one or more notifications. For example, as shown in FIG. 5FT, an additional notification 5234 is displayed and notification 5188 displays text 5234 and image 5236 that were not displayed prior to authentication. In some embodiments, restricted notification information is, e.g., notification content and/or other notification information that is subject to restricted access by a setting, such as a privacy and/or security setting of the device. In some embodiments, the restricted notification information includes one or more notifications that are not displayed when the device is an unauthenticated state, such as notifications from one or more applications with settings that restrict display of notifications when the device is in an unauthenticated state. In some embodiments, the restricted notification information includes contextual information, such as earlier communication content in a notification and/or calendar information for a range of time that corresponds to a time associated with a calendar appointment notification. In some embodiments, when the device is in the unlocked mode of the display-on state, the second user interface includes longer versions of the notifications that are shown in the second user interface when the device is in the locked mode of the display-on state. The longer version of a notification includes expanded notification content that, for example, includes all of the content in the short version or standard version of the notification, and some additional content that is not included in the short version or standard version of the notification. In some embodiments, the expanded notification content includes more complete versions of the notification content shown in the short version of the notification. In some embodiments, the expanded notification content includes images, interactive controls, and/or selectable options for performing actions with respect to the notification, that are not included in the short versions of the notification.

Displaying restricted notification information in response to detecting a second input for transitioning the device from an unauthenticated state to an authenticated state allows the device to provide a user with an indication that a notification was received without disclosing full notification information to unauthenticated individuals able to view the device display. This makes the user-device interface more efficient and enhances the operability of the device by allowing a user to view information about incoming notifications without needing to wake the device (e.g., without jeopardizing the privacy of the notification content).

In some embodiments, while displaying the first user interface in response to the first swipe gesture, the device detects (912) a second swipe gesture (e.g., as shown in FIG. 5FN and or as shown in FIG. 5GC) in a third direction (e.g., upward, such as upward from a location proximate to the lower edge of the display) that is perpendicular to the first direction and the second direction. In accordance with a determination that the device is in an unauthenticated state, the device displays an authentication user interface 518, as shown at FIG. 5FO. In accordance with a determination that the device is in an authenticated state, the device displays a second user interface. The second user interface is a last displayed user interface that was displayed prior to the display of the wake screen user interface (e.g., either a home screen user interface or a user interface of an application). For example, FIG. 5GC is displayed when home screen user interface 522 was the last displayed user interface before wake screen user interface 504 was displayed, so in response to the swipe input illustrated at FIG. 5GC, home screen user interface 522 is redisplayed, as shown in FIG. 5GD. In some embodiments if the home screen user interface 522 was the last displayed user interface before the wake screen user interface 504 was displayed, then a swipe up from the control center user interface 5138 or mini application user interface 5140 reveals the home screen user interface 522 and if an application user interface (e.g., map application user interface 5154) was the last displayed user interface before the wake screen user interface 504 was displayed, then the swipe up reveals the application user interface. In some embodiments, the wake screen user interface 504 is displayed immediately upon waking the device, before authentication is made, and when authentication fails. In some embodiments, an indicator (e.g., an open lock icon and/or text indicating an unlocked state) is displayed briefly on the wake screen upon authentication. In some embodiments, an indicator changes state (e.g., a lock icon changes state from a closed lock icon to an open lock icon) in accordance with a determination that authentication has been successfully performed.

Redisplaying a last displayed user interface after dismissing the first user interface (e.g., the wake screen user interface/cover sheet user interface) enhances the operability of the device by reducing the number of steps needed to navigate back to the previous user interface, and the consistent behavior also reduces user mistakes which makes the user-device interface more efficient.

In some embodiments, in accordance with a determination that the second user interface is a home screen user interface 522, the device displays (914), in the home screen user interface, an object (e.g., navigation banner 5160) that displays content from a first active application (e.g., an application that has updating content, such as an application that last had focus and includes updating content, or an application that has a highest priority among multiple applications that includes updating content). In accordance with a determination that a state of the first active application has changed, the device updates the content displayed in the object in accordance with the changed state of the first active application. For example, navigation content shown in navigation object 5160 (shown in pill form in FIGS. 5GM and 5GU) updates (e.g., in accordance with a determined change in location of the device). In some embodiments, navigation content shown in navigation object 5160 (shown in banner form in FIGS. 5GP-5GQ) updates (e.g., in accordance with a determined change in location of the device). In some embodiments, the object also includes a region 5182 that displays a current time. In some embodiments, the object on the home screen user interface 522 is a "pill" (e.g., an object having a pill shape). In some embodiments, the object on the home screen user interface 522 is displayed in a region of the device display that is beyond a main display area (e.g., a rectangular display area) of the display. In some embodiments, the object displays live directions from a maps application operating in navigation mode. In some embodiments, the object displays live playback information from a media player application operating in playback mode. In some embodiments, the object displays live recording information from a screen recording or video recording application operating in recording mode. In some embodiments, the object corresponding to the first active application is also displayed when a user interface of a second active application distinct from the first active application is the currently displayed user interface.

Updating the content displayed in an object in the home screen user interface in accordance with a changed state of an active application provides information to a user from an active application without displaying the full application user interface. This makes the user-device interface more efficient by allowing a user to determine that an application is operating in an active mode without providing input to navigate from the home screen to the application user interface.

In some embodiments, while displaying the second user interface in response to the second swipe gesture, the device detects (916) a third swipe gesture (e.g., as shown at FIG. 5FR) in a fourth direction (e.g., downward) that is opposite the third direction; and in response to detecting the third swipe gesture in the fourth direction, the device ceases to display the second user interface (e.g., home screen user interface 522) and redisplays the wake screen user interface 504 (e.g., as shown in FIGS. 5FR-5FT).

In some embodiments, the control center user interface 5138 is displayed in response to a left swipe on the wake screen user interface 504 (e.g., as shown at FIGS. 5EQ-5ES) both when the wake screen user interface 504 is first displayed on waking the device, and when the wake screen user interface 504 is subsequently redisplayed (e.g., as a cover sheet layer over an application user interface or over a home screen user interface). In some embodiments, the mini-application-object user interface 5140 is displayed in response to a right swipe on the wake screen user interface 504 (e.g., as shown at FIGS. 5EK-5EM) both when the wake screen user interface 504 is first displayed, and when the wake screen user interface 504 is subsequently redisplayed. In some embodiments, as the third swipe gesture in the fourth direction is received, the object on the home screen (the "pill") morphs into a second affordance (a floating banner) that is displayed on the wake screen user interface 504 (e.g., as shown by navigation banner 5160 in FIGS. 5GM-5GP). The morphing includes, e.g., a change in the size of the object, addition of content to the object (e.g., a direction icon 5180 and/or text), and/or removal of content (e.g., a time 5182) from the object.

Redisplaying the first user interface from any user interface (e.g., the home screen user interface or an application user interface) using the same gesture enhances the operability of the device (e.g., by reducing the number of steps needed to navigate to the first user interface), and makes the user-device interface more efficient (e.g., by providing a consistent way to bring about the first user interface and thereby reducing user mistakes).

In some embodiments, the wake screen user interface is displayed (918) with an affordance (e.g., a navigation banner 5160) that displays content from a second active application (e.g., an application, that is the same as the first active application or distinct from the first active application, that has updating content (such as an application that last had focus and includes updating content, or an application that has a highest priority among multiple applications that includes updating content)). For example, navigation banner 5160 shown in FIG. 5GP-5GQ includes updating content from maps application 5154. While displaying the wake screen user interface 504 with the affordance, in accordance with a determination that a state of the second active application has changed (e.g., a location of the device has changed, requiring an updated navigation instruction), the device updates the content displayed in the affordance in accordance with the changed state of the second active application (as indicated by the changed content from FIG. 5GP to FIG. 5GQ). For example, an affordance that corresponds to a maps application includes navigation information (such as next turn information) that updates in real time, or an affordance that corresponds to a media player includes media playback information that updates in real time. In some embodiments, the wake screen user interface 504 includes an intelligently selected app icon, e.g., a hand-off application. In some embodiments, the first affordance is displayed in addition to one or more additional objects on the wake screen (e.g., in addition to time indicator, notification affordances, and/or device control affordances). In some embodiments, the content from the active application displayed in the object (e.g., the pill object) on the home screen user interface is a miniaturized version of the content displayed in the first affordance on the wake screen user interface. For example, in comparison with content displayed in the first affordance on the wake screen, a miniaturized version of the content includes a reduced amount of text, text with reduced size, no text, a reduced number of icons, icons with reduced size, and/or no icons. In some embodiments, content displayed in the first affordance on the wake screen includes navigation instruction text and a navigation instruction icon having a first size, and the miniaturized version of the content includes no navigation instruction text and a navigation instruction icon having a second size that is smaller than the first size.

Updating the content displayed in the affordance displayed in the wake screen user interface in accordance with a changed state of an active application provides information to a user from an active application without displaying the full application user interface. This makes the user-device interface more efficient by allowing a user to receive information from the application without providing input to navigate from the wake screen user interface to the application user interface.

In some embodiments, the wake screen user interface 504 includes (920) a first control (e.g., flashlight control 5190 and/or camera control 5192) of the one or more device controls of the control panel user interface 5138 (e.g., as shown in FIGS. 5ED and 5EW). In some embodiments, the first control is, e.g., a flashlight control 5190 that corresponds to the flashlight control 5190 of the control panel user interface 5138. When operated, the flashlight control operates a device flashlight. In some embodiments, the affordance is, a camera control 5192 or another pre-selected (e.g., user-selected) control. In some embodiments, the wake screen user interface 504 includes one or more regions (e.g., lower left and lower right corners) that display affordances for pre-selected apps (e.g., a flashlight control icon 5190 and/or a camera application control icon 5192). In some embodiments, the wake screen user interface 504 includes at least one control affordance that does not correspond to a device control of the control panel user interface.

Providing controls from the control panel user interface on the wake screen user interface allows the user to access the same control functions from multiple locations, and thereby making the user-device interface more efficient (e.g., by reducing the number of steps needed to navigate to the control).

In some embodiments, the first control requires (922) a first type of input to activate a first function while displayed on the wake screen user interface and the first control requires a second type of input to activate the first function while displayed on the control panel user interface. In some embodiments, the first control requires different inputs for activating the same function (e.g., a press input is required to toggle the flashlight control 5190 on the wake screen user interface 504, as described with regard to FIGS. 5ED-5EJ, while a tap input is required to toggle the flashlight control 5190 in the control panel user interface 5138, as described with regard to FIGS. 5ES-5EW. In some embodiments, a plurality of pre-selected affordances are displayed on the wake screen. In some embodiments, the pre-selected affordances on the wake screen are user-customizable.

Requiring a different input to activate a function from the wake screen than the input that is required to activate the same function from the control center prevents accidental operation of the function (e.g., operation of the flashlight) when the phone wakes at a time that the user does not intend to operate the phone. This saves battery life (e.g., by not using battery to operate the flashlight when the flashlight is not needed).

In some embodiments, the first control (e.g., camera control 5192) is also displayed on the home screen user interface 522 (924), and a press input directed to the first control while displayed on the home screen user interface causes display of a plurality of selectable options (e.g., as shown in menu 5220), and a press input directed to the first control while displayed on the wake screen user interface does not cause display of the plurality of selectable options.

Displaying a plurality of selectable options in response to press input at control displayed on the home screen user interface and not displaying the plurality of selectable options when a press input is received at the same control displayed on the wake screen user interface prevents accidental access to functions among the plurality of selectable options (e.g., taking a photo) when the phone wakes at a time that the user does not intend to operate the phone. This saves battery life (e.g., by not using battery to operate the camera when the camera is not needed).

In some embodiments, the wake screen has a plurality of luminosity display modes (e.g., bright mode, as shown in FIG. 5GV, and dark mode, as shown in FIG. 5GW) that are applied to one or more objects (e.g., notifications 5160, 5188, 5234, and other platters and/or banners, such as navigation banner 5160) displayed on the wake screen user interface 504. In some embodiments, the device determines a luminosity of the background (e.g., by performing image analysis on a background image to determine a luminosity value. The background image of the wake screen is, e.g., e a default background image or a user-selected background image). The luminosity display mode switches based on the luminosity of the background. For example, a color of at least a portion of an area of one or more objects (e.g., a border around the object, a background of the object, text of the object, and/or an image displayed in the object) is changed when a luminosity mode changes (e.g., as described with regard to FIGS. 5GV-5GW). The change in color causes the object to have a greater degree of contrast with the background image to increase the visibility of the object relative to the background image.

In some embodiments, while displaying the wake screen user interface, the device displays (926) a first object (e.g., a time-date indicator 582) at a first position on the display 112 (e.g., the center of the first object is aligned with the horizontal symmetric center line of the display 112). In accordance with the determination that the first swipe gesture is in the first direction (e.g., as shown in FIGS. 5EK-5EL, the device displays the first object on the first user interface at a second position (e.g., as shown in FIG. 5EM) that is shifted in the first direction relative to the first position on the display). When the first swipe is a right swipe, as shown in FIGS. 5EK-5EL, the time indicator 582 is displayed on the right side of the mini-application-object user interface 5140 (e.g., in FIG. 5EM) to provide a visual indication of the input needed (a swipe to the left) to return to the wake screen. In accordance with the determination that the first swipe gesture is in the second direction (e.g., as shown at FIGS. 5EQ-5ER), the device displays the at least one object is at a third position (e.g., as shown in FIG. 5ES) that is shifted in the second direction relative to the first position on the display (e.g., when the first swipe is a left swipe, the time indicator 582 is displayed on the left side of the control panel user interface 5138 to provide a visual indication of the input needed (a swipe to the right) to return to the wake screen).

Shifting a position of a first object (e.g., a time-date indicator) in response to swipe gesture input provides an indication of a location of a current user interface relative to the wake screen user interface. Providing an indication of a location of a current user interface relative to the wake screen user interface reduces the number of inputs needed to return to the wake screen user interface by reducing the need for a user (e.g., a user that is new to the interface arrangement) to experimentally swipe in order to recall the location of a desired user interface relative to a current user interface.

It should be understood that the particular order in which the operations in FIGS. 9A-9C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 900 described above with respect to FIGS. 9A-9C. For example, the contacts, gestures, user interface objects, intensity thresholds, focus selectors, and animations described above with reference to method xxx optionally have one or more of the characteristics of the contacts, gestures, user interface objects, intensity thresholds, focus selectors, and animations described herein with reference to other methods described herein (e.g., methods 600, 700, and 800). For brevity, these details are not repeated here.

The operations described above with reference to FIGS. 9A-9C are, optionally, implemented by components depicted in FIGS. 1A-1B. For example, detection operation 902, transitioning operation 904, and displaying operation 908 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a display device and an input device:

concurrently displaying:

a first user interface corresponding to first software; and status information for an application that is different from the first software, wherein the status information includes content of the application, including, as a state of the application changes, updating the content of the application displayed in the status information;

while displaying a respective user interface object that includes the status information concurrently with the first user interface, detecting a first user input corresponding to a request to display a second user interface corresponding to second software, wherein the second user interface is different from the first user interface, and the second software is different from the first software; and in response to detecting the first user input:

ceasing to display the first user interface;

ceasing to display the respective user interface object that includes the status information; and displaying, via the display device, the second user interface, including displaying in the second user interface content of the application, including, as the state of the application changes, updating the content of the application displayed in the second user interface, wherein the content of the application displayed in the second user interface includes information that is different from the status information.

2. The method of claim 1, including, prior to concurrently displaying the first user interface and the status information:

displaying, via the display device, a third user interface that includes content of the application, including, as a state of the application changes, updating the content of the application displayed in the third user interface, wherein the third user interface corresponds to third software that is different from the first software and from the second software;

while displaying the third user interface, detecting, via the input device, a second user input corresponding to a request to dismiss the third user interface; and in response to detecting the second user input:

ceasing to display the third user interface;

wherein concurrently displaying the first user interface and the status information is performed in response to detecting the second user input.

3. The method of claim 2, wherein the third software is the application, the third user interface is a user interface of the application, and the second user interface is a wake screen user interface.

4. The method of claim 2, wherein the third user interface includes more content of the application than the second user interface.

5. The method of claim 2, including:

while displaying the third user interface, detecting one or more inputs; and in response to detecting the one or more inputs, initiating an active mode of the application;

wherein the content of the application is updated in accordance with a current state of the active mode of the application.

6. The method of claim 5, wherein initiating the active mode of the application includes initiating a navigation mode of a map application.

7. The method of claim 5, wherein initiating the active mode of the application includes initiating media playback of a media application.

8. The method of claim 1, wherein the second user interface includes more content of the application than the status information displayed concurrently with the first user interface.

9. The method of claim 1, wherein the first user interface is a home screen user interface that includes a plurality of application icons that are activatable to launch respective applications.

10. The method of claim 1, including:

in response to detecting the first user input:

transitioning the electronic device from a first state to a power-saving state in which the electronic device uses less power than in the first state;

wherein the second user interface corresponds to a user interface for the power-saving state.

11. The method of claim 1, wherein the first user input is directed to the status information that is displayed concurrently with the first user interface, and the second user interface is a user interface of the application.

12. The method of claim 1, wherein the first user input includes a swipe gesture that starts from a location that corresponds to an edge of the display device, and the second user interface is a wake screen user interface.

13. An electronic device, comprising:

a display device;

an input device;

one or more processors; and memory storing one or more programs, wherein the one or more programs are configured to be executed by the one or more processors, the one or more programs including instructions for:

concurrently displaying:

a first user interface corresponding to first software; and status information for an application that is different from the first software, wherein the status information includes content of the application, including, as a state of the application changes, updating the content of the application displayed in the status information;

while displaying a respective user interface object that includes the status information concurrently with the first user interface, detecting a first user input corresponding to a request to display a second user interface corresponding to second software, wherein the second user interface is different from the first user interface, and the second software is different from the first software; and in response to detecting the first user input:

ceasing to display the first user interface;

ceasing to display the respective user interface object that includes the status information; and displaying, via the display device, the second user interface, including displaying in the second user interface content of the application, including, as the state of the application changes, updating the content of the application displayed in the second user interface, wherein the content of the application displayed in the second user interface includes information that is different from the status information.

14. The electronic device of claim 13, wherein the one or more programs include instructions for, prior to concurrently displaying the first user interface and the status information:

displaying, via the display device, a third user interface that includes content of the application, including, as a state of the application changes, updating the content of the application displayed in the third user interface, wherein the third user interface corresponds to third software that is different from the first software and from the second software;

while displaying the third user interface, detecting, via the input device, a second user input corresponding to a request to dismiss the third user interface; and in response to detecting the second user input:

ceasing to display the third user interface;

wherein concurrently displaying the first user interface and the status information is performed in response to detecting the second user input.

15. The electronic device of claim 14, wherein the third software is the application, the third user interface is a user interface of the application, and the second user interface is a wake screen user interface.

16. The electronic device of claim 14, wherein the third user interface includes more content of the application than the second user interface.

17. A non-transitory computer readable storage medium storing one or more programs, the one or more programs comprising instructions that, when executed by an electronic device with a display device and an input device, cause the electronic device to:

concurrently display:

a first user interface corresponding to first software; and status information for an application that is different from the first software, wherein the status information includes content of the application, including, as a state of the application changes, updating the content of the application displayed in the status information;

while displaying a respective user interface object that includes the status information concurrently with the first user interface, detect a first user input corresponding to a request to display a second user interface corresponding to second software, wherein the second user interface is different from the first user interface, and the second software is different from the first software; and in response to detecting the first user input:

cease to display the first user interface;

cease to display the respective user interface object that includes the status information; and display, via the display device, the second user interface, including displaying in the second user interface content of the application, including, as the state of the application changes, updating the content of the application displayed in the second user interface, wherein the content of the application displayed in the second user interface includes information that is different from the status information.

18. The computer readable storage medium of claim 17, wherein the one or more programs include instructions that, when executed by the electronic device, cause the electronic device to, prior to concurrently displaying the first user interface and the status information:

display, via the display device, a third user interface that includes content of the application, including, as a state of the application changes, updating the content of the application displayed in the third user interface, wherein the third user interface corresponds to third software that is different from the first software and from the second software;

while displaying the third user interface, detect, via the input device, a second user input corresponding to a request to dismiss the third user interface; and in response to detecting the second user input:

cease to display the third user interface;

wherein concurrently displaying the first user interface and the status information is performed in response to detecting the second user input.

19. The computer readable storage medium of claim 18, wherein the third software is the application, the third user interface is a user interface of the application, and the second user interface is a wake screen user interface.

20. The computer readable storage medium of claim 18, wherein the third user interface includes more content of the application than the second user interface.

21. The electronic device of claim 14, wherein the one or more programs include instructions for:

while displaying the third user interface, detecting one or more inputs; and in response to detecting the one or more inputs, initiating an active mode of the application;

wherein the content of the application is updated in accordance with a current state of the active mode of the application.

22. The electronic device of claim 21, wherein initiating the active mode of the application includes initiating a navigation mode of a map application.

23. The electronic device of claim 21, wherein initiating the active mode of the application includes initiating media playback of a media application.

24. The electronic device of claim 13, wherein the second user interface includes more content of the application than the status information displayed concurrently with the first user interface.

25. The electronic device of claim 13, wherein the first user interface is a home screen user interface that includes a plurality of application icons that are activatable to launch respective applications.

26. The electronic device of claim 13, wherein the one or more programs include instructions for:

in response to detecting the first user input:

transitioning the electronic device from a first state to a power-saving state in which the electronic device uses less power than in the first state;

wherein the second user interface corresponds to a user interface for the power-saving state.

27. The electronic device of claim 13, wherein the first user input is directed to the status information that is displayed concurrently with the first user interface, and the second user interface is a user interface of the application.

28. The electronic device of claim 13, wherein the first user input includes a swipe gesture that starts from a location that corresponds to an edge of the display device, and the second user interface is a wake screen user interface.

29. The computer readable storage medium of claim 18, wherein the one or more programs include instructions that, when executed by the electronic device, cause the electronic device to:

while displaying the third user interface, detect one or more inputs; and in response to detecting the one or more inputs, initiate an active mode of the application;

wherein the content of the application is updated in accordance with a current state of the active mode of the application.

30. The computer readable storage medium of claim 29, wherein initiating the active mode of the application includes initiating a navigation mode of a map application.

31. The computer readable storage medium of claim 29, wherein initiating the active mode of the application includes initiating media playback of a media application.

32. The computer readable storage medium of claim 17, wherein the second user interface includes more content of the application than the status information displayed concurrently with the first user interface.

33. The computer readable storage medium of claim 17, wherein the first user interface is a home screen user interface that includes a plurality of application icons that are activatable to launch respective applications.

34. The computer readable storage medium of claim 17, wherein the one or more programs include instructions that, when executed by the electronic device, cause the electronic device to:

in response to detecting the first user input:

transition the electronic device from a first state to a power-saving state in which the electronic device uses less power than in the first state;

wherein the second user interface corresponds to a user interface for the power-saving state.

35. The computer readable storage medium of claim 17, wherein the first user input is directed to the status information that is displayed concurrently with the first user interface, and the second user interface is a user interface of the application.

36. The computer readable storage medium of claim 17, wherein the first user input includes a swipe gesture that starts from a location that corresponds to an edge of the display device, and the second user interface is a wake screen user interface.

* * * * *